US012650756B2

(12) United States Patent
Ryan et al.

(10) Patent No.: US 12,650,756 B2
(45) Date of Patent: Jun. 9, 2026

(54) USER INTERFACES FOR MANAGING MEDIA LIBRARIES

(71) Applicant: Apple Inc., Cupertino, CA (US)

(72) Inventors: Nicole R. Ryan, San Francisco, CA (US); Kellie L. Albert, San Francisco, CA (US); Chelsea L. Burnette, Mountain View, CA (US); Graham R. Clarke, Scotts Valley, CA (US); Damien Coin-Perard, Santa Clara, CA (US); Kaely Coon, San Francisco, CA (US); Aaron Moring, Fremont, CA (US); William A. Sorrentino, III, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/195,350

(22) Filed: May 9, 2023

(65) Prior Publication Data

US 2023/0376168 A1 Nov. 23, 2023

Related U.S. Application Data

(60) Provisional application No. 63/349,145, filed on Jun. 5, 2022, provisional application No. 63/340,410, filed on May 10, 2022.

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0484* (2013.01); *G06F 16/435* (2019.01); *G06F 16/438* (2019.01); *G06F 16/447* (2019.01)

(58) Field of Classification Search
CPC .... G06F 3/0482; G06F 3/0484; G06F 16/435; G06F 16/438; G06F 16/447
(Continued)

(56) References Cited

U.S. PATENT DOCUMENTS 5,416,895 A 5/1995 Anderson et al.
5,463,725 A 10/1995 Henckel et al.
(Continued)

FOREIGN PATENT DOCUMENTS

CN 1404233 A 3/2003
CN 1619541 A 5/2005
(Continued)

OTHER PUBLICATIONS

US 2002/0018582 A1, 02/2002, Hagiwara et al. (withdrawn)
(Continued)

*Primary Examiner* — Stephen S Hong
*Assistant Examiner* — Broderick C Anderson
(74) *Attorney, Agent, or Firm* — YHE Law LLP

(57) ABSTRACT

The present disclosure generally relates to methods and user interfaces concerning media libraries, such as methods and user interfaces for managing one or more media libraries, methods and user interfaces for notifying participants of changes to one or more media libraries, methods and user interfaces for managing captured media for one or more media libraries, methods and user interfaces for recommending media items for one or more media libraries, and methods and user interfaces for managing duplicate media.

44 Claims, 77 Drawing Sheets

(51) Int. Cl.
*G06F 16/435* (2019.01)
*G06F 16/438* (2019.01)
*G06F 16/44* (2019.01)

(58) Field of Classification Search
USPC .......................................................... 715/738
See application file for complete search history.

(56) References Cited

U.S. PATENT DOCUMENTS

| | | | |
|---|---|---|---|
| 5,565,888 | A | 10/1996 | Selker |
| 5,583,542 | A | 12/1996 | Capps |
| 5,604,861 | A | 2/1997 | Douglas et al. |
| 5,677,708 | A | 10/1997 | Matthews et al. |
| 5,724,985 | A | 3/1998 | Snell et al. |
| 5,757,368 | A | 5/1998 | Gerpheide et al. |
| 5,784,061 | A | 7/1998 | Moran et al. |
| 5,825,349 | A | 10/1998 | Meier et al. |
| 5,886,697 | A | 3/1999 | Naughton et al. |
| 5,956,035 | A | 9/1999 | Sciammarella et al. |
| 5,973,694 | A | 10/1999 | Steele et al. |
| 6,073,036 | A | 6/2000 | Heikkinen et al. |
| 6,154,210 | A | 11/2000 | Anderson |
| 6,167,469 | A | 12/2000 | Safai et al. |
| 6,237,010 | B1 | 5/2001 | Hui et al. |
| 6,252,596 | B1 | 6/2001 | Garland et al. |
| 6,272,246 | B1 | 8/2001 | Takai |
| 6,292,273 | B1 | 9/2001 | Dow et al. |
| 6,301,586 | B1 | 10/2001 | Yang et al. |
| 6,334,025 | B1 | 12/2001 | Yamagami et al. |
| 6,686,938 | B1 | 2/2004 | Jobs et al. |
| 6,741,268 | B1 | 5/2004 | Hayakawa et al. |
| 6,784,925 | B1 | 8/2004 | Tomat et al. |
| 6,920,619 | B1 | 7/2005 | Milekic |
| 6,950,989 | B2 | 9/2005 | Rosenzweig et al. |
| 6,985,854 | B1 | 1/2006 | Mitsui |
| 7,015,910 | B2 | 3/2006 | Card et al. |
| 7,139,982 | B2 | 11/2006 | Card et al. |
| 7,164,410 | B2 | 1/2007 | Kupka |
| 7,178,111 | B2 | 2/2007 | Glein et al. |
| 7,286,256 | B2 | 10/2007 | Herbert |
| 7,380,212 | B2 | 5/2008 | Cody et al. |
| 7,434,177 | B1 | 10/2008 | Ording et al. |
| 7,437,005 | B2 | 10/2008 | Drucker et al. |
| 7,587,671 | B2 | 9/2009 | Saft et al. |
| 7,627,828 | B1 | 12/2009 | Collison et al. |
| 7,724,242 | B2 | 5/2010 | Hillis et al. |
| 7,779,358 | B1 | 8/2010 | Gupta et al. |
| 7,823,080 | B2 | 10/2010 | Miyajima et al. |
| 7,865,215 | B2 | 1/2011 | Bells et al. |
| 7,970,240 | B1 | 6/2011 | Chao et al. |
| 8,024,658 | B1 | 9/2011 | Fagans et al. |
| 8,106,856 | B2 | 1/2012 | Matas et al. |
| 8,132,116 | B1 | 3/2012 | Schendel |
| 8,200,669 | B1 | 6/2012 | Iampietro et al. |
| 8,305,355 | B2 | 11/2012 | Forstall et al. |
| 8,339,420 | B2 | 12/2012 | Hiraoka et al. |
| 8,379,939 | B1 | 2/2013 | Bourdev et al. |
| 8,386,934 | B2 | 2/2013 | Takakura et al. |
| 8,418,075 | B2 | 4/2013 | Gallo et al. |
| 8,566,403 | B2 | 10/2013 | Pascal et al. |
| 8,572,513 | B2 | 10/2013 | Chaudhri et al. |
| 8,583,637 | B2 | 11/2013 | Berkner et al. |
| 8,698,762 | B2 | 4/2014 | Wagner et al. |
| 9,021,034 | B2 | 4/2015 | Narayanan et al. |
| 9,183,560 | B2 | 11/2015 | Abelow |
| 9,286,546 | B2 | 3/2016 | O'malley et al. |
| 9,338,242 | B1 | 5/2016 | Suchland et al. |
| 9,405,964 | B1 * | 8/2016 | Suchland ............... G06Q 30/02 |
| 9,459,792 | B2 | 10/2016 | Matas et al. |
| 9,857,894 | B2 | 1/2018 | Park |
| 9,857,941 | B2 | 1/2018 | Wagner et al. |
| 9,870,554 | B1 | 1/2018 | Leung et al. |
| 9,904,906 | B2 | 2/2018 | Kim et al. |
| 9,916,538 | B2 | 3/2018 | Zadeh et al. |
| 10,019,136 | B1 | 7/2018 | Ozog |
| 10,051,103 | B1 | 8/2018 | Gordon et al. |
| 10,204,338 | B2 | 2/2019 | Lee |
| 10,303,448 | B2 | 5/2019 | Steven et al. |
| 10,417,588 | B1 | 9/2019 | Kreisel et al. |
| 10,489,982 | B2 | 11/2019 | Johnson et al. |
| 10,509,907 | B2 | 12/2019 | Shear et al. |
| 10,540,400 | B2 | 1/2020 | Dumant et al. |
| 10,776,965 | B2 | 9/2020 | Stetson et al. |
| 10,796,480 | B2 | 10/2020 | Chen et al. |
| 11,592,959 | B2 | 2/2023 | Wagner et al. |
| 2001/0014184 | A1 | 8/2001 | Bubie et al. |
| 2001/0030715 | A1 | 10/2001 | Tabata |
| 2002/0000998 | A1 | 1/2002 | Scott et al. |
| 2002/0008763 | A1 | 1/2002 | Kawamura et al. |
| 2002/0015064 | A1 | 2/2002 | Robotham et al. |
| 2002/0021758 | A1 | 2/2002 | Chui et al. |
| 2002/0054233 | A1 | 5/2002 | Juen |
| 2002/0057461 | A1 | 5/2002 | Dow et al. |
| 2002/0070982 | A1 | 6/2002 | Hill et al. |
| 2002/0093531 | A1 | 7/2002 | Barile |
| 2002/0106199 | A1 | 8/2002 | Ikeda |
| 2002/0135621 | A1 | 9/2002 | Angiulo et al. |
| 2002/0196357 | A1 | 12/2002 | Battles et al. |
| 2003/0033296 | A1 | 2/2003 | Rothmuller et al. |
| 2003/0048291 | A1 | 3/2003 | Dieberger |
| 2003/0081011 | A1 | 5/2003 | Sheldon et al. |
| 2003/0081135 | A1 | 5/2003 | Boll |
| 2003/0090504 | A1 | 5/2003 | Brook et al. |
| 2003/0108241 | A1 | 6/2003 | Colmenarez et al. |
| 2003/0122787 | A1 | 7/2003 | Zimmerman et al. |
| 2003/0149990 | A1 | 8/2003 | Anttila et al. |
| 2003/0160824 | A1 | 8/2003 | Szumla |
| 2003/0161003 | A1 | 8/2003 | Herbert |
| 2003/0197687 | A1 | 10/2003 | Shetter |
| 2004/0019640 | A1 | 1/2004 | Bartram et al. |
| 2004/0046886 | A1 | 3/2004 | Ambiru et al. |
| 2004/0119758 | A1 | 6/2004 | Grossman et al. |
| 2004/0135904 | A1 | 7/2004 | Shiota et al. |
| 2004/0143590 | A1 | 7/2004 | Wong et al. |
| 2004/0158555 | A1 | 8/2004 | Seedman et al. |
| 2004/0183830 | A1 | 9/2004 | Cody et al. |
| 2004/0205504 | A1 | 10/2004 | Phillips |
| 2004/0207722 | A1 | 10/2004 | Koyama et al. |
| 2004/0212617 | A1 | 10/2004 | Fitzmaurice et al. |
| 2005/0018082 | A1 | 1/2005 | Larsen et al. |
| 2005/0020317 | A1 | 1/2005 | Koyama |
| 2005/0041035 | A1 | 2/2005 | Nagatomo et al. |
| 2005/0052427 | A1 | 3/2005 | Wu et al. |
| 2005/0062130 | A1 | 3/2005 | Ciancio et al. |
| 2005/0071736 | A1 | 3/2005 | Schneider et al. |
| 2005/0071767 | A1 | 3/2005 | Kirkland et al. |
| 2005/0073601 | A1 | 4/2005 | Battles et al. |
| 2005/0083406 | A1 | 4/2005 | Cozier |
| 2005/0102635 | A1 | 5/2005 | Jiang et al. |
| 2005/0104848 | A1 | 5/2005 | Yamaguchi et al. |
| 2005/0108253 | A1 | 5/2005 | Metsatahti et al. |
| 2005/0134719 | A1 | 6/2005 | Beck |
| 2005/0149872 | A1 | 7/2005 | Fong et al. |
| 2005/0160377 | A1 | 7/2005 | Sciammarella et al. |
| 2005/0183026 | A1 | 8/2005 | Amano et al. |
| 2005/0188326 | A1 | 8/2005 | Ikeda |
| 2005/0192924 | A1 | 9/2005 | Drucker et al. |
| 2005/0195221 | A1 | 9/2005 | Berger et al. |
| 2005/0198024 | A1 | 9/2005 | Sakata et al. |
| 2005/0210399 | A1 | 9/2005 | Filner et al. |
| 2005/0275636 | A1 | 12/2005 | Dehlin et al. |
| 2006/0001652 | A1 | 1/2006 | Chiu et al. |
| 2006/0004685 | A1 | 1/2006 | Pyhalammi et al. |
| 2006/0017692 | A1 | 1/2006 | Wehrenberg et al. |
| 2006/0022961 | A1 | 2/2006 | Kaminaga |
| 2006/0025218 | A1 | 2/2006 | Hotta |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0061663 | A1 | 3/2006 | Park |
| 2006/0072028 | A1 | 4/2006 | Hong |
| 2006/0077266 | A1 | 4/2006 | Nurmi et al. |
| 2006/0080386 | A1 | 4/2006 | Roykkee et al. |
| 2006/0088228 | A1 | 4/2006 | Marriott et al. |

(56) References Cited

U.S. PATENT DOCUMENTS

2006/0125799 A1 6/2006 Hillis et al.
2006/0136839 A1 6/2006 Makela et al.
2006/0156228 A1 7/2006 Gallo et al.
2006/0164535 A1 7/2006 Oyama
2006/0184540 A1 8/2006 Kung et al.
2006/0233536 A1 10/2006 Shuhami
2006/0265643 A1 11/2006 Saft et al.
2007/0016868 A1 1/2007 Nurmi
2007/0031115 A1 2/2007 Oshikiri et al.
2007/0040810 A1 2/2007 Dowe et al.
2007/0081740 A1 4/2007 Ciudad et al.
2007/0097151 A1 5/2007 Rosenberg
2007/0097421 A1 5/2007 Sorensen et al.
2007/0101355 A1 5/2007 Chung et al.
2007/0112754 A1 5/2007 Haigh et al.
2007/0136778 A1 6/2007 Birger et al.
2007/0152984 A1 7/2007 Ording et al.
2007/0186154 A1 8/2007 Anthony et al.
2007/0192741 A1 8/2007 Yoritate et al.
2007/0204225 A1 8/2007 Berkowitz et al.
2007/0229678 A1 10/2007 Barrus et al.
2007/0245236 A1 10/2007 Lee et al.
2007/0262964 A1 11/2007 Zotov et al.
2007/0271340 A1 11/2007 Goodman et al.
2008/0022343 A1 1/2008 Hodzic et al.
2008/0030456 A1 2/2008 Asadi et al.
2008/0036743 A1 2/2008 Westerman et al.
2008/0057941 A1 3/2008 Scott et al.
2008/0059888 A1 3/2008 Dunko
2008/0062141 A1 3/2008 Chaudhri
2008/0133697 A1 6/2008 Stewart et al.
2008/0152201 A1 6/2008 Zhang et al.
2008/0152297 A1 6/2008 Ubillos
2008/0155474 A1 6/2008 Duhig et al.
2008/0165141 A1 7/2008 Christie
2008/0168349 A1 7/2008 Lamiraux et al.
2008/0168402 A1 7/2008 Blumenberg
2008/0282202 A1 11/2008 Sunday
2008/0309632 A1 12/2008 Westerman et al.
2009/0021576 A1 1/2009 Linder et al.
2009/0063414 A1 3/2009 White et al.
2009/0063542 A1 3/2009 Bull et al.
2009/0077460 A1 3/2009 Li et al.
2009/0113315 A1 4/2009 Fisher et al.
2009/0132921 A1 5/2009 Hwangbo et al.
2009/0158214 A1 6/2009 Arnold et al.
2009/0198359 A1 8/2009 Chaudhri
2009/0210793 A1 8/2009 Yee et al.
2009/0216806 A1 8/2009 Feuerstein et al.
2009/0222757 A1 9/2009 Gupta et al.
2009/0237367 A1 9/2009 Ryu et al.
2009/0259967 A1 10/2009 Davidson et al.
2009/0278806 A1 11/2009 Duarte et al.
2009/0282371 A1 11/2009 Curl et al.
2009/0284551 A1 11/2009 Stanton
2009/0307623 A1 12/2009 Agarawala et al.
2009/0313580 A1 12/2009 Nakata et al.
2009/0319472 A1 12/2009 Jain et al.
2010/0042926 A1 2/2010 Bull et al.
2010/0083173 A1 4/2010 Germann et al.
2010/0103321 A1 4/2010 Ishikawa et al.
2010/0110228 A1 5/2010 Ozawa et al.
2010/0124967 A1 5/2010 Lutnick et al.
2010/0125786 A1 5/2010 Ozawa et al.
2010/0153386 A1 6/2010 Tysowski
2010/0169784 A1 7/2010 Weber et al.
2010/0179874 A1 7/2010 Higgins et al.
2010/0207892 A1 8/2010 Lin et al.
2010/0211575 A1 8/2010 Collins et al.
2010/0214442 A1 8/2010 Uemura et al.
2010/0251167 A1 9/2010 Deluca et al.
2010/0253807 A1 10/2010 Matsumoto et al.
2010/0287053 A1 11/2010 Ganong et al.
2010/0299601 A1 11/2010 Kaplan et al.
2010/0302179 A1 12/2010 Ahn et al.
2011/0035700 A1 2/2011 Meaney et al.
2011/0050564 A1 3/2011 Alberth et al.
2011/0050640 A1 3/2011 Lundback et al.
2011/0072394 A1 3/2011 Victor et al.
2011/0078717 A1 3/2011 Drummond et al.
2011/0099199 A1 4/2011 Stalenhoef et al.
2011/0126148 A1 5/2011 Krishnaraj et al.
2011/0145275 A1 6/2011 Stewart
2011/0163969 A1 7/2011 Freddy et al.
2011/0163971 A1 7/2011 Wagner et al.
2011/0267368 A1 11/2011 Casillas et al.
2011/0282867 A1 11/2011 Palermiti et al.
2012/0036433 A1 2/2012 Zimmer et al.
2012/0056830 A1 3/2012 Suzuki et al.
2012/0057081 A1 3/2012 Petersson et al.
2012/0058801 A1 3/2012 Nurmi
2012/0083294 A1 4/2012 Bray et al.
2012/0105444 A1 5/2012 Tokuda
2012/0190386 A1 7/2012 Anderson
2012/0206495 A1 8/2012 Endo et al.
2012/0308209 A1 12/2012 Zaletel
2012/0311444 A1 12/2012 Chaudhri
2012/0324357 A1 12/2012 Viegers et al.
2013/0010093 A1 1/2013 Redmann et al.
2013/0013650 A1 1/2013 Shum
2013/0014052 A1 1/2013 Frey et al.
2013/0021368 A1 1/2013 Lee et al.
2013/0036380 A1 2/2013 Symons
2013/0054634 A1 2/2013 Chakraborty et al.
2013/0061175 A1 3/2013 Matas et al.
2013/0145292 A1 6/2013 Cohen et al.
2013/0151523 A1 6/2013 Hsi
2013/0156275 A1 6/2013 Amacker et al.
2013/0198176 A1 8/2013 Kim
2013/0201185 A1 8/2013 Kochi
2013/0205210 A1 8/2013 Jeon et al.
2013/0230251 A1 9/2013 Kondo et al.
2013/0239049 A1 9/2013 Perrodin et al.
2013/0285948 A1 10/2013 Zhang
2013/0332871 A1 12/2013 Bucur et al.
2014/0025737 A1 1/2014 Kruglick
2014/0064572 A1 3/2014 Panzer et al.
2014/0074825 A1 3/2014 Wood et al.
2014/0082533 A1 3/2014 Kelley et al.
2014/0092291 A1 4/2014 Aoshima et al.
2014/0115465 A1 4/2014 Lee et al.
2014/0123005 A1 5/2014 Forstall et al.
2014/0164938 A1 6/2014 Petterson et al.
2014/0165000 A1 6/2014 Fleizach et al.
2014/0172622 A1 6/2014 Baronshin
2014/0181089 A1 6/2014 Desmond et al.
2014/0181205 A1 6/2014 Sherrets et al.
2014/0195918 A1 7/2014 Friedlander
2014/0198234 A1 7/2014 Kobayashi et al.
2014/0215365 A1 7/2014 Hiraga et al.
2014/0218394 A1 8/2014 Hochmuth et al.
2014/0225925 A1 8/2014 Hayashi et al.
2014/0229831 A1 8/2014 Chordia et al.
2014/0282011 A1 9/2014 Dellinger et al.
2014/0282262 A1 9/2014 Gregotski et al.
2014/0289222 A1 9/2014 Sharpe et al.
2014/0330824 A1* 11/2014 Johnson .............. G06F 21/6218 707/736
2014/0337324 A1 11/2014 Chao et al.
2014/0359441 A1 12/2014 Lehtiniemi et al.
2014/0362274 A1 12/2014 Christie et al.
2014/0372436 A1 12/2014 Makki et al.
2014/0372889 A1 12/2014 Lemay et al.
2014/0372898 A1 12/2014 Ayres et al.
2015/0039616 A1 2/2015 Rolston et al.
2015/0078680 A1 3/2015 Shakib et al.
2015/0082250 A1 3/2015 Wagner et al.
2015/0130719 A1 5/2015 Wehrenberg et al.
2015/0130740 A1 5/2015 Cederlund et al.
2015/0147048 A1 5/2015 Kim et al.
2015/0169503 A1 6/2015 Maharaj
2015/0177937 A1 6/2015 Poletto et al.
2015/0177979 A1 6/2015 Johansson et al.
2015/0180980 A1 6/2015 Welinder et al.

(56) References Cited

U.S. PATENT DOCUMENTS

| | | | |
|---|---|---|---|
| 2015/0185995 | A1 | 7/2015 | Shoemaker et al. |
| 2015/0213001 | A1 | 7/2015 | Levy et al. |
| 2015/0227166 | A1 | 8/2015 | Lee et al. |
| 2015/0227609 | A1 | 8/2015 | Shoemaker et al. |
| 2015/0227782 | A1 | 8/2015 | Salvador et al. |
| 2015/0228121 | A1 | 8/2015 | Tsukahara et al. |
| 2015/0242404 | A1 | 8/2015 | Underwood et al. |
| 2015/0242689 | A1 | 8/2015 | Mau |
| 2015/0256491 | A1 | 9/2015 | Eatough et al. |
| 2015/0262062 | A1 | 9/2015 | Burger et al. |
| 2015/0264305 | A1 | 9/2015 | Chastney et al. |
| 2015/0287162 | A1 | 10/2015 | Canan et al. |
| 2015/0309698 | A1 | 10/2015 | Senderek et al. |
| 2015/0347824 | A1 | 12/2015 | Saari et al. |
| 2015/0370323 | A1 | 12/2015 | Cieplinski et al. |
| 2016/0004820 | A1 | 1/2016 | Moore |
| 2016/0044269 | A1 | 2/2016 | Kang |
| 2016/0048263 | A1 | 2/2016 | Hiraga et al. |
| 2016/0054841 | A1 | 2/2016 | Yang et al. |
| 2016/0054845 | A1 | 2/2016 | Takahashi et al. |
| 2016/0073034 | A1 | 3/2016 | Mukherjee et al. |
| 2016/0110355 | A1 | 4/2016 | Charania et al. |
| 2016/0140146 | A1 | 5/2016 | Wexler et al. |
| 2016/0202889 | A1 | 7/2016 | Shin et al. |
| 2016/0219262 | A1 | 7/2016 | Cole et al. |
| 2016/0224213 | A1 | 8/2016 | Chen et al. |
| 2016/0226804 | A1 | 8/2016 | Hampson et al. |
| 2016/0234184 | A1 | 8/2016 | Liu et al. |
| 2016/0239724 | A1 | 8/2016 | Arfvidsson et al. |
| 2016/0255162 | A1 | 9/2016 | Frieder et al. |
| 2016/0283483 | A1 | 9/2016 | Jiang et al. |
| 2016/0321831 | A1 | 11/2016 | Nakamura et al. |
| 2017/0019587 | A1 | 1/2017 | Matas et al. |
| 2017/0026430 | A1 | 1/2017 | Beckhardt et al. |
| 2017/0041549 | A1 | 2/2017 | Kim et al. |
| 2017/0063753 | A1 | 3/2017 | Probasco et al. |
| 2017/0083189 | A1 | 3/2017 | Yang et al. |
| 2017/0093780 | A1* | 3/2017 | Lieb ...................... G06F 16/587 |
| 2017/0108924 | A1 | 4/2017 | Hurter |
| 2017/0139554 | A1 | 5/2017 | Nakabayashi et al. |
| 2017/0169295 | A1 | 6/2017 | Park et al. |
| 2017/0180811 | A1 | 6/2017 | Quirino et al. |
| 2017/0192625 | A1 | 7/2017 | Kim et al. |
| 2017/0220852 | A1* | 8/2017 | Salvador ............. H04L 61/4594 |
| 2017/0244959 | A1 | 8/2017 | Angela et al. |
| 2017/0344257 | A1 | 11/2017 | Gnedin et al. |
| 2017/0353423 | A1 | 12/2017 | Morrison et al. |
| 2017/0357382 | A1 | 12/2017 | Miura et al. |
| 2017/0357409 | A1 | 12/2017 | Wagner et al. |
| 2018/0034765 | A1 | 2/2018 | Keszler et al. |
| 2018/0039406 | A1 | 2/2018 | Kong et al. |
| 2018/0068019 | A1 | 3/2018 | Novikoff et al. |
| 2018/0077344 | A1 | 3/2018 | Bostick et al. |
| 2018/0083901 | A1 | 3/2018 | Mcgregor et al. |
| 2018/0121063 | A1 | 5/2018 | Lieb et al. |
| 2018/0143761 | A1 | 5/2018 | Choi et al. |
| 2018/0157381 | A1 | 6/2018 | Jung et al. |
| 2018/0181668 | A1 | 6/2018 | Zhang et al. |
| 2018/0204111 | A1 | 7/2018 | Zadeh et al. |
| 2018/0253194 | A1 | 9/2018 | Javadi |
| 2018/0286126 | A1 | 10/2018 | Schwarz et al. |
| 2018/0321048 | A1 | 11/2018 | Li et al. |
| 2018/0337994 | A1* | 11/2018 | Dachille ............. G06F 3/04842 |
| 2018/0364872 | A1 | 12/2018 | Miura et al. |
| 2018/0367862 | A1 | 12/2018 | Horii et al. |
| 2019/0073081 | A1 | 3/2019 | Takahashi et al. |
| 2019/0155382 | A1 | 5/2019 | Ikuta et al. |
| 2019/0258383 | A1 | 8/2019 | Wagner et al. |
| 2019/0313012 | A1 | 10/2019 | Matas |
| 2019/0339822 | A1 | 11/2019 | Devine et al. |
| 2019/0342616 | A1 | 11/2019 | Domm et al. |
| 2020/0042550 | A1* | 2/2020 | Chang .................... G06V 20/30 |
| 2020/0104038 | A1 | 4/2020 | Kamath et al. |
| 2020/0225746 | A1 | 7/2020 | Bar-zeev et al. |
| 2020/0304863 | A1 | 9/2020 | Domm et al. |
| 2020/0335133 | A1 | 10/2020 | Vaucher |
| 2020/0356222 | A1 | 11/2020 | Clarke et al. |
| 2020/0356590 | A1 | 11/2020 | Clarke et al. |
| 2020/0363932 | A1 | 11/2020 | Wagner et al. |
| 2020/0379560 | A1 | 12/2020 | Krasadakis |
| 2021/0191578 | A1 | 6/2021 | Miura et al. |
| 2021/0243356 | A1 | 8/2021 | Matas et al. |
| 2021/0286502 | A1 | 9/2021 | Lemay et al. |
| 2021/0287416 | A1 | 9/2021 | O'Hagan et al. |
| 2022/0027039 | A1 | 1/2022 | Wagner et al. |
| 2022/0057984 | A1 | 2/2022 | Yang et al. |
| 2022/0074754 | A1 | 3/2022 | Elder et al. |
| 2022/0121277 | A1 | 4/2022 | Azam et al. |
| 2022/0206647 | A1 | 6/2022 | Clarke et al. |
| 2022/0276750 | A1 | 9/2022 | Miura et al. |
| 2022/0345785 | A1 | 10/2022 | Yang et al. |
| 2022/0382443 | A1 | 12/2022 | Clarke et al. |
| 2023/0221836 | A1 | 7/2023 | Clarke et al. |
| 2023/0297206 | A1 | 9/2023 | Miura et al. |
| 2023/0315253 | A1 | 10/2023 | Wagner et al. |
| 2023/0412908 | A1 | 12/2023 | Matas et al. |
| 2024/0004521 | A1 | 1/2024 | Devine et al. |
| 2024/0028177 | A1 | 1/2024 | Pastrana Vicente et al. |
| 2024/0201829 | A1 | 6/2024 | Clarke et al. |
| 2024/0256101 | A1 | 8/2024 | Miura et al. |
| 2024/0319860 | A1 | 9/2024 | Chaudhri et al. |
| 2024/0346554 | A1 | 10/2024 | Green et al. |
| 2024/0402870 | A1 | 12/2024 | Lin et al. |
| 2025/0258581 | A1 | 8/2025 | Circlaeys et al. |
| 2025/0258591 | A1 | 8/2025 | Lin et al. |
| 2025/0258686 | A1 | 8/2025 | Federighi et al. |
| 2025/0350914 | A1 | 11/2025 | Chang et al. |

FOREIGN PATENT DOCUMENTS

| | | | |
|---|---|---|---|
| CN | 1648856 | A | 8/2005 |
| CN | 1717918 | A | 1/2006 |
| CN | 1756273 | A | 4/2006 |
| CN | 101128794 | A | 2/2008 |
| CN | 101796476 | A | 8/2010 |
| CN | 101854278 | A | 10/2010 |
| CN | 102483758 | A | 5/2012 |
| CN | 102681847 | A | 9/2012 |
| CN | 102693311 | A | 9/2012 |
| CN | 103081496 | A | 5/2013 |
| CN | 104035666 | A | 9/2014 |
| CN | 104981762 | A | 10/2015 |
| CN | 105103154 | A | 11/2015 |
| CN | 105264480 | A | 1/2016 |
| CN | 105378728 | A | 3/2016 |
| CN | 105874447 | A | 8/2016 |
| CN | 106575149 | A | 4/2017 |
| CN | 107122049 | A | 9/2017 |
| CN | 107430483 | A | 12/2017 |
| CN | 107710197 | A | 2/2018 |
| CN | 111314770 | A | 6/2020 |
| EP | 1124175 | A2 | 8/2001 |
| EP | 1148412 | A2 | 10/2001 |
| EP | 1289210 | A2 | 3/2003 |
| EP | 1550943 | A2 | 7/2005 |
| EP | 2455858 | A1 | 5/2012 |
| EP | 2509074 | A2 | 10/2012 |
| EP | 2698695 | A2 | 2/2014 |
| EP | 2562633 | B1 | 3/2016 |
| FR | 2830093 | A3 | 3/2003 |
| GB | 2420260 | A | 5/2006 |
| GB | 2550639 | A | 11/2017 |
| JP | 3-217976 | A | 9/1991 |
| JP | 6-309138 | A | 11/1994 |
| JP | 8-106469 | A | 4/1996 |
| JP | 9-322199 | A | 12/1997 |
| JP | 10-93848 | A | 4/1998 |
| JP | 10-198337 | A | 7/1998 |
| JP | 11-164175 | A | 6/1999 |
| JP | 11-168694 | A | 6/1999 |
| JP | 11-341425 | A | 12/1999 |
| JP | 2000-138883 | A | 5/2000 |
| JP | 2000-138888 | A | 5/2000 |
| JP | 2000-148591 | A | 5/2000 |

(56) References Cited

FOREIGN PATENT DOCUMENTS

JP 2000-163031 A 6/2000
JP 2000-221879 A 8/2000
JP 2000-244637 A 9/2000
JP 2000-244673 A 9/2000
JP 2000-350134 A 12/2000
JP 2001-136303 A 5/2001
JP 2001-265481 A 9/2001
JP 2001-309019 A 11/2001
JP 2002-73679 A 3/2002
JP 2002-152559 A 5/2002
JP 2003-163820 A 6/2003
JP 2003-338975 A 11/2003
JP 2003-345491 A 12/2003
JP 2003-348432 A 12/2003
JP 2004-15586 A 1/2004
JP 2004-32346 A 1/2004
JP 2004-145291 A 5/2004
JP 2004-153832 A 5/2004
JP 2004-288208 A 10/2004
JP 2004-336536 A 11/2004
JP 2004-336711 A 11/2004
JP 2005-38101 A 2/2005
JP 2005-92386 A 4/2005
JP 2005-100084 A 4/2005
JP 2005-515530 A 5/2005
JP 2005-150836 A 6/2005
JP 2005-175991 A 6/2005
JP 2005-182320 A 7/2005
JP 2005-202483 A 7/2005
JP 2005-202651 A 7/2005
JP 2005-303728 A 10/2005
JP 2005-321516 A 11/2005
JP 2005-339420 A 12/2005
JP 2006-67344 A 3/2006
JP 2006-139340 A 6/2006
JP 2006-140865 A 6/2006
JP 2006-195592 A 7/2006
JP 2006-203809 A 8/2006
JP 2006-236249 A 9/2006
JP 2006-293939 A 10/2006
JP 2007-515775 A 6/2007
JP 2007-525775 A 9/2007
JP 2007-287014 A 11/2007
JP 2007-292971 A 11/2007
JP 2008-106469 A 5/2008
JP 2008-518330 A 5/2008
JP 2009-59042 A 3/2009
JP 2010-503130 A 1/2010
JP 2010-539619 A 12/2010
JP 2011-159006 A 8/2011
JP 5162082 B2 12/2012
JP 2013-83689 A 5/2013
JP 2013-84282 A 5/2013
JP 2013-140171 A 7/2013
JP 2013-537670 A 10/2013
JP 2014-93003 A 5/2014
JP 2014-95979 A 5/2014
JP 2014-160461 A 9/2014
JP 2015-149634 A 8/2015
JP 5771242 B2 8/2015
JP 2016-35776 A 3/2016
JP 2016-62590 A 4/2016
JP 2016-158115 A 9/2016
JP 2016-167299 A 9/2016
JP 2016-527581 A 9/2016
JP 2016-201135 A 12/2016
JP 2017-4326 A 1/2017
JP 6112878 B2 4/2017
JP 2017-529577 A 10/2017
JP 6208151 B2 10/2017
JP 2017-538975 A 12/2017
JP 2018-22995 A 2/2018
JP 6345911 B2 6/2018
JP 2018-197828 A 12/2018
JP 2020-30853 A 2/2020
JP 2024-537657 A 10/2024
KR 10-2005-0072072 A 7/2005
KR 10-2005-0101162 A 10/2005
KR 10-2006-0032793 A 4/2006
KR 10-2012-0058539 A 6/2012
KR 10-2012-0092644 A 8/2012
KR 10-2013-0026541 A 3/2013
KR 10-2014-0067965 A 6/2014
KR 10-2015-0131257 A 11/2015
KR 10-2015-0131262 A 11/2015
KR 10-1611895 B1 4/2016
KR 10-2018-0114963 A 10/2018
KR 10-2019-0028574 A 3/2019
WO 99/54807 A1 10/1999
WO 01/29702 A2 4/2001
WO 03/023593 A1 3/2003
WO 03/081458 A1 10/2003
WO 2005/093550 A2 10/2005
WO 2005/103863 A2 11/2005
WO 2006/020305 A2 2/2006
WO 2006/047697 A2 5/2006
WO 2006/076557 A2 7/2006
WO 2008/030779 A2 3/2008
WO 2008/030976 A2 3/2008
WO 2009/032998 A1 3/2009
WO 2009/082814 A1 7/2009
WO 2009/155991 A1 12/2009
WO 2011/017653 A1 2/2011
WO 2011/028424 A1 3/2011
WO 2011/051091 A1 5/2011
WO 2011/084856 A1 7/2011
WO 2012/018513 A1 2/2012
WO 2012/097385 A2 7/2012
WO 2014/149473 A1 9/2014
WO 2014/149488 A1 9/2014
WO 2014/162659 A1 10/2014
WO 2014/195851 A1 12/2014
WO 2014/200734 A1 12/2014
WO 2015/200227 A1 12/2015
WO 2016/077834 A1 5/2016
WO 2016/160632 A1 10/2016
WO 2017/218194 A1 12/2017
WO 2021/096507 A1 5/2021
WO 2021/188439 A1 9/2021
WO 2022/086580 A1 4/2022
WO 2022/147146 A1 7/2022
WO 2022/256195 A1 12/2022
WO 2023/049418 A2 3/2023

OTHER PUBLICATIONS

Applicant-Initiated Interview Summary received for U.S. Appl. No. 17/542,947, mailed on Feb. 9, 2024, 4 pages.

Applicant-Initiated Interview Summary received for U.S. Appl. No. 18/117,998, mailed on Jan. 31, 2024, 4 pages.

Applicant-Initiated Interview Summary received for U.S. Appl. No. 18/117,998, mailed on May 3, 2024, 4 pages.

Corrected Notice of Allowance received for U.S. Appl. No. 18/114,794, mailed on Feb. 23, 2024, 4 pages.

Corrected Notice of Allowance received for U.S. Appl. No. 18/137,353, mailed on Jan. 31, 2024, 2 pages.

Extended European Search Report received for European Patent Application No. 23218010.9, mailed on Apr. 10, 2024, 13 pages.

Final Office Action received for U.S. Appl. No. 17/542,947, mailed on Apr. 18, 2024, 55 pages.

International Preliminary Report on Patentability received for PCT Patent Application No. PCT/US2022/044637, mailed on Apr. 4, 2024, 12 pages.

Non-Final Office Action received for U.S. Appl. No. 18/112,421, mailed on May 14, 2024, 28 pages.

Non-Final Office Action received for U.S. Appl. No. 18/117,998, mailed on Mar. 15, 2024, 11 pages.

Notice of Allowance received for Chinese Patent Application No. 201780033901.2, mailed on Apr. 16, 2024, 4 pages (1 page of English Translation and 3 pages of Official Copy).

Notice of Allowance received for Japanese Patent Application No. 2022-151671, mailed on Apr. 22, 2024, 4 pages (1 page of English Translation and 3 pages of Official Copy).

(56) References Cited

OTHER PUBLICATIONS

Office Action received for Chinese Patent Application No. 201780033901.2, mailed on Jan. 26, 2024, 14 pages (7 pages of English Translation and 7 pages of Official Copy).
Office Action received for Chinese Patent Application No. 202111244490.6, mailed on Apr. 3, 2024, 20 pages (11 pages of English Translation and 9 pages of Official Copy).
Office Action received for Indian Patent Application No. 202118050660, mailed on Mar. 18, 2024, 7 pages.
Technology for Teachers and Students, "Adding Music to PowerPoint Presentations—PowerPoint Tutorial", Online available at: https://www.youtube.com/watch?v=tBiwTRLVOd0, Aug. 6, 2018, 6 pages.
TRAVELVIDS—Video O, "How to quickly make a Slideshow video on iPhone (No 3rd party Apps required)", Online available at: https://www.youtube.com/watch?v=KpAzFvBQLf0, May 8, 2020, 4 pages.
Applicant-Initiated Interview Summary received for U.S. Appl. No. 17/542,947, mailed on Jul. 10, 2023, 4 pages.
Applicant-Initiated Interview Summary received for U.S. Appl. No. 18/112,421, mailed on Oct. 27, 2023, 4 pages.
Applicant-Initiated Interview Summary received for U.S. Appl. No. 18/117,998, mailed on Nov. 1, 2023, 2 pages.
Corrected Notice of Allowance received for U.S. Appl. No. 16/145,033, mailed on Jun. 23, 2023, 3 pages.
Decision to Refuse received for European Patent Application No. 20729331.7, mailed on Oct. 19, 2023, 28 pages.
Final Office Action received for U.S. Appl. No. 18/112,421, mailed on Dec. 12, 2023, 22 pages.
Final Office Action received for U.S. Appl. No. 18/117,998, mailed on Dec. 28, 2023, 12 pages.
International Preliminary Report on Patentability received for PCT Patent Application No. PCT/US2022/030589, mailed on Dec. 14, 2023, 22 pages.
International Search Report and Written Opinion received for PCT Patent Application No. PCT/US2023/021734, mailed on Sep. 7, 2023, 17 pages.
Invitation to Pay Additional Fees and Partial International Search Report received for PCT Patent Application No. PCT/US2023/021734, mailed on Jul. 12, 2023, 12 pages.
Leonie, "Can I interrupt slideshow music in Mac Photos?", Online available at: https://discussions.apple.com/thread/8027658?sortBy=best, Jul. 31, 2017, 1 page.
Non-Final Office Action received for U.S. Appl. No. 17/542,947, mailed on Dec. 15, 2023, 68 pages.
Non-Final Office Action received for U.S. Appl. No. 18/112,421, mailed on Aug. 17, 2023, 15 pages.
Non-Final Office Action received for U.S. Appl. No. 18/117,998, mailed on Oct. 10, 2023, 21 pages.
Non-Final Office Action received for U.S. Appl. No. 18/137,353, mailed on Nov. 9, 2023, 10 pages.
Notice of Acceptance received for Australian Patent Application No. 2022201810, mailed on Jun. 14, 2023, 3 pages.
Notice of Acceptance received for Australian Patent Application No. 2022235618, mailed on Aug. 25, 2023, 3 pages.
Notice of Acceptance received for Australian Patent Application No. 2022263576, mailed on Dec. 12, 2023, 3 pages.
Notice of Acceptance received for Australian Patent Application No. 2023237163, mailed on Dec. 21, 2023, 3 pages.
Notice of Allowance received for U.S. Appl. No. 16/145,033, mailed on Aug. 17, 2023, 8 pages.
Notice of Allowance received for U.S. Appl. No. 18/114,794, mailed on Aug. 16, 2023, 11 pages.
Notice of Allowance received for U.S. Appl. No. 18/114,794, mailed on Dec. 5, 2023, 8 pages.
Notice of Allowance received for U.S. Appl. No. 18/137,353, mailed on Jan. 9, 2024, 9 pages.
Office Action received for Australian Patent Application No. 2022235618, mailed on Jul. 4, 2023, 2 pages.
Office Action received for Australian Patent Application No. 2022235618, mailed on May 19, 2023, 2 pages.
Office Action received for Australian Patent Application No. 2022263576, mailed on Nov. 13, 2023, 3 pages.
Office Action received for Australian Patent Application No. 2023237163, mailed on Nov. 24, 2023, 3 pages.
Office Action received for Chinese Patent Application No. 201780033901.2, mailed on Jun. 28, 2023, 28 pages (14 pages of English Translation and 14 pages of Official Copy).
Office Action received for Chinese Patent Application No. 201780033901.2, mailed on Oct. 31, 2023, 17 pages (10 pages of English Translation and 7 pages of Official Copy).
Office Action received for Chinese Patent Application No. 202111487316.4, mailed on Jun. 7, 2023, 20 pages (10 pages of English Translation and 10 pages of Official Copy).
Office Action received for European Patent Application No. 22152524.9, mailed on Dec. 5, 2023, 8 pages.
Office Action received for Indian Patent Application No. 202117050360, mailed on Oct. 30, 2023, 10 pages.
Office Action received for Japanese Patent Application No. 2022-151671, mailed on Jan. 5, 2024, 6 pages (3 pages of English Translation and 3 pages of Official Copy).
Result of Consultation received for European Patent Application No. 20729331.7, mailed on Sep. 27, 2023, 27 pages.
Supplemental Notice of Allowance received for U.S. Appl. No. 18/114,794, mailed on Aug. 31, 2023, 2 pages.
Supplemental Notice of Allowance received for U.S. Appl. No. 18/114,794, mailed on Jan. 8, 2024, 2 pages.
Supplemental Notice of Allowance received for U.S. Appl. No. 18/114,794, mailed on Nov. 17, 2023, 2 pages.
Advisory Action received for U.S. Appl. No. 14/253,783, mailed on Feb. 15, 2017, 6 Pages.
Advisory Action received for U.S. Appl. No. 16/145,033, mailed on Nov. 2, 2021, 5 pages.
Applicant Initiated Interview Summary received for U.S. Appl. No. 16/109,487, mailed on Apr. 21, 2020, 5 pages.
Applicant Initiated Interview Summary received for U.S. Appl. No. 16/584,783, mailed on May 4, 2020, 3 pages.
Applicant-Initiated Interview Summary for U.S. Appl. No. 16/402,057, mailed on Mar. 16, 2020, 3 pages.
Applicant-Initiated Interview Summary received for U.S. Appl. No. 16/145,033, mailed on Apr. 30, 2021, 4 pages.
Applicant-Initiated Interview Summary received for U.S. Appl. No. 16/145,033, mailed on Jun. 29, 2020, 5 pages.
Applicant-Initiated Interview Summary received for U.S. Appl. No. 16/145,033, mailed on Nov. 24, 2020, 4 pages.
Applicant-Initiated Interview Summary received for U.S. Appl. No. 16/145,033, mailed on Oct. 7, 2021, 4 pages.
Applicant-Initiated Interview Summary received for U.S. Appl. No. 16/450,531, mailed on Aug. 11, 2020, 5 pages.
Applicant-Initiated Interview Summary received for U.S. Appl. No. 16/584,776, mailed on May 13, 2020, 9 pages.
Applicant-Initiated Interview Summary received for U.S. Appl. No. 16/584,776, mailed on Nov. 25, 2020, 5 pages.
Applicant-Initiated Interview Summary received for U.S. Appl. No. 17/153,703, mailed on May 11, 2022, 4 pages.
Applicant-Initiated Interview Summary received for U.S. Appl. No. 17/408,220, mailed on Oct. 18, 2022, 4 pages.
Applicant-Initiated Interview Summary received for U.S. Appl. No. 17/542,947, mailed on Apr. 28, 2023, 4 pages.
Applicant-Initiated Interview Summary received for U.S. Appl. No. 17/744,499, mailed on Jan. 27, 2023, 3 pages.
Board Opinion received for Chinese Reexamination Patent Application No. 200780001142.8, mailed on Oct. 21, 2014, 13 pages (1 page of English Translation and 12 pages of Official copy).
Brief Communication Regarding Oral Proceedings received for European Patent Application No. 18197554.1, mailed on Feb. 6, 2023, 8 pages.
Brief Communication Regarding Oral Proceedings received for European Patent Application No. 19724963.4, mailed on Jun. 22, 2021, 2 pages.
Canon IXUS 700—Additional Evidence and Information, 2023, 3 pages (Official Copy Only). {(See Communication under 37 CFR § 1.98(a) (3))}.

(56) References Cited

OTHER PUBLICATIONS

Canon, "Camera User Guide Canon (UK) Ltd", Online available at: https://bedienungsanleitungdeutsch.de/bedienungsanleitunghandbuch/Canon_Digital_Ixus_700_EN.pdf, 2005, 196 pages.
Certificate of Examination received for Australian Patent Application No. 2019100490, mailed on Oct. 16, 2019, 2 pages.
Corrected Notice of Allowance received for U.S. Appl. No. 13/666,943, mailed on Aug. 11, 2016, 2 pages.
Corrected Notice of Allowance received No. U.S. Appl. No. 15/281,524, mailed on Jun. 3, 2019, 2 pages.
Corrected Notice of Allowance received for U.S. Appl. No. 16/402,057, mailed Jul. 6, 2020, 2 pages.
Corrected Notice of Allowance received for U.S. Appl. No. 16/450,531, mailed Nov. 12, 2020, 2 pages.
Corrected Notice of Allowance received for U.S. Appl. No. 16/450,531, mailed Oct. 30, 2020, 2 pages.
Corrected Notice of Allowance received for U.S. Appl. No. 16/983,815, mailed Mar. 31, 2021, 6 pages.
Corrected Notice of Allowance received for U.S. Appl. No. 17/125,744, mailed Dec. 8, 2021, 2 pages.
Corrected Notice of Allowance received for U.S. Appl. No. 17/125,744, mailed Dec. 24, 2021, 2 pages.
Corrected Notice of Allowance received for U.S. Appl. No. 17/125,744, mailed Mar. 10, 2022, 2 pages.
Corrected Notice of Allowance received for U.S. Appl. No. 17/125,744, mailed Mar. 30, 2022, 2 pages.
Corrected Notice of Allowance received for U.S. Appl. No. 17/153,703, mailed Jan. 19, 2023, 2 pages.
Corrected Notice of Allowance received for U.S. Appl. No. 17/153,703, mailed Nov. 10, 2022, 2 pages.
Corrected Notice of Allowance received for U.S. Appl. No. 17/153,703, mailed on Sep. 14, 2022, 2 pages.
Corrected Notice of Allowance received for U.S. Appl. No. 17/697,539, mailed on Feb. 1, 2023, 2 pages.
Corrected Notice of Allowance received for U.S. Appl. No. 17/744,499, mailed on Mar. 21, 2023, 4 pages.
Decision on Appeal received for U.S. Appl. No. 16/145,033, mailed on Apr. 4, 2023, 9 pages.
Decision on Appeal received for U.S. Appl. No. 16/584,783, mailed on Oct. 14, 2021, 12 pages.
Decision to Grant received for Danish Patent Application No. PA201870385, mailed on Mar. 26, 2020, 2 pages.
Decision to Grant received for European Patent Application No. 11178259.5, mailed on Apr. 4, 2019, 3 pages.
Decision to Grant received for European Patent Application No. 19724963.4, mailed on Feb. 3, 2022, 2 pages.
Decision to Grant received for Japanese Patent Application No. 2009-526943, mailed on Dec. 2, 2011, Dec. 2, 2011, 3 pages (Official Copy only). {(See Communication under 37 CFR § 1.98(a) (3))}.
Decision to Grant received for the European Patent Application No. 07814633.9, mailed on Sep. 2, 2010, 3 pages.
Decision to Grant received for the European Patent Application No. 10172417.7, mailed on Nov. 14, 2013, 3 pages.
Decision to Grant received for the European Patent Application No. 11178257.9, mailed on Jun. 20, 2013, 3 pages.
Decision to Refuse received for European Patent Application No. 17813778.2, mailed on Jan. 24, 2022, 17 pages.
Decision to Refuse received for European Patent Application No. 18197554.1, mailed on Mar. 21, 2023, 17 pages.
European Search Report received for the European Application No. 11178259.5, mailed on Oct. 31, 2011, 8 pages.
European Search Report received for the European Patent Application No. 10172417.7, mailed on Jan. 7, 2011, Jan. 7, 2011, 4 pages.
Examiner's Answer to Appeal Brief received for U.S. Appl. No. 16/145,033, mailed on Aug. 4, 2022, 10 pages.
Examiner's Answer to Appeal Brief received for U.S. Appl. No. 16/584,783, mailed on Feb. 17, 2021, 9 pages.
Examiner's Pre-Review Report received for Japanese Patent Application No. 2018-138559, mailed on Jul. 29, 2020, 6 pages (3 pages of English Translation and 3 pages of Official Copy).
Extended European Search Report received for European Patent Application No. 11178257.9, mailed on Oct. 31, 2011, Oct. 31, 2011, 5 pages.
Extended European Search Report received for European Patent Application No. 17813778.2, mailed on Jan. 10, 2020, 12 pages.
Extended European Search Report received for European Patent Application No. 18197554.1, mailed on Jun. 3, 2019, 11 pages.
Extended European Search Report received for European Patent Application No. 22152524.9, mailed on May 2, 2022, 10 pages.
Extended European Search Report received for European Patent Application No. 22164099.8, mailed on Aug. 25, 2022, 9 pages.
Final Office Action received for U.S. Appl. No. 15/281,524, mailed on Dec. 27, 2018, 6 pages.
Final Office Action received for U.S. Appl. No. 16/145,033, mailed on Jul. 6, 2021, 113 pages.
Final Office Action received for U.S. Appl. No. 16/145,033, mailed on Sep. 22, 2020, 49 pages.
Final Office Action received for U.S. Appl. No. 16/402,057, mailed on Oct. 17, 2019, 23 pages.
Final Office Action received for U.S. Appl. No. 16/584,783, mailed on May 19, 2020, 19 pages.
Final Office Action received for U.S. Appl. No. 17/542,947, mailed on May 25, 2023, 55 pages.
Final Office Action received for U.S. Appl. No. 14/253,783, mailed on Sep. 30, 2016, 18 pages.
Fono et al., "EyeWindows: Evaluation of Eye-Controlled Zooming Windows for Focus Selection", CHI 2005, Conference Proceedings, Conference on Human Factors in Computing Systems, Apr. 2-7, 2005, pp. 151-160.
Hinckley et al., "Sensing Techniques for Mobile Interaction", Symposium on User Interface Software and Technology, CHI Letters, vol. 2, No. 2, Nov. 2000, pp. 91-100.
Hourunranta et al., "Video and Audio Editing for Mobile Applications", Proceedings/2006 IEEE international Conference on multimedia and expo, ICME 2006, Jul. 9, 2006, pp. 1305-1308.
Hughes Neil, "Apple Explores Merging Cloud Content with Locally Stored Media Library", Available at <http://appleinsider.com/articles/11/02/10/apple_explores_merging_cloud_content_with_locally_stored_media_library.html>, XP55040717, Feb. 10, 2011, 2 pages.
Hurwitz Jon, "Interface for Small-Screen Media Playback Control", Technical Disclosure Commons, online available at: https://www.tdcommons.org/cgi/viewcontent.cgi?article=4231&context=dpubs_series, Apr. 17, 2020, pp. 1-9.
Intention to Grant received for Danish Patent Application No. PA201870385, mailed on Jan. 24, 2020, 2 pages.
Intention to Grant received for European Patent Application No. 10172417.7, mailed on Jul. 9, 2013, Jul. 9, 2013, 10 pages.
Intention to Grant received for European Patent Application No. 11178257.9, mailed on Jan. 30, 2013, Jan. 30, 2013, 9 pages.
Intention to Grant received for European Patent Application No. 11178259.5, mailed on Nov. 8, 2018, 16 pages.
Intention to Grant received for European Patent Application No. 19724963.4, mailed on Sep. 20, 2021, 7 pages.
Intention to Grant received for the European Patent Application No. 07814633.9, mailed on Mar. 19, 2010, 4 pages.
International Preliminary Report on Patentability received for PCT Patent Application No. PCT/US2007/077441, issued on Mar. 10, 2009, 9 pages.
International Preliminary Report on Patentability received for PCT Patent Application No. PCT/US2011/020403, mailed on Jul. 19, 2012, 10 pages.
International Preliminary Report on Patentability received for PCT Patent Application No. PCT/US2017/035322, mailed on Dec. 27, 2018, 13 pages.
International Preliminary Report on Patentability received for PCT Patent Application No. PCT/US2019/024790, mailed on Nov. 19, 2020, 11 pages.
International Preliminary Report on Patentability received for PCT Patent Application No. PCT/US2020/031442, mailed on Nov. 18, 2021, 21 pages.

(56) References Cited

OTHER PUBLICATIONS

International Search Report and Written Opinion received for PCT Patent Application No. PCT/US2011/020403, mailed on May 26, 2011, May 26, 2011, 14 pages.
International Search Report and Written Opinion Received for PCT Patent Application No. PCT/US2017/035322, mailed on Oct. 5, 2017, 18 pages.
International Search Report and Written Opinion received for PCT Patent Application No. PCT/US2019/024790, mailed on Sep. 11, 2019, 18 pages.
International Search Report and Written Opinion received for PCT Patent Application No. PCT/US2020/031442, mailed on Oct. 30, 2020, 28 pages.
International Search Report and Written Opinion received for PCT Patent Application No. PCT/US2022/030589, mailed on Sep. 5, 2022, 26 pages.
International Search Report and Written Opinion received for PCT Patent Application No. PCT/US2022/044637, mailed on Mar. 15, 2023, 19 pages.
International Search Report and Written Opinion, received for PCT Patent Application No. PCT/US2007/077441, mailed on May 8, 2008, May 8, 2008, 13 pages.
Invitation to Pay Additional Fee received for PCT Patent Application No. PCT/US2019/024790, mailed on Jul. 18, 2019, 10 pages.
Invitation to Pay Additional Fees and Partial International Search Report received for PCT Patent Application No. PCT/US2022/044637, mailed on Jan. 20, 2023, 12 pages.
Invitation to Pay Additional Fees received for PCT Patent Application No. PCT/US2007/077441, mailed on Jan. 28, 2008, Jan. 28, 2008, 5 pages.
Invitation to Pay Additional Fees received for PCT Patent Application No. PCT/US2017/035322, mailed on Aug. 7, 2017, 4 pages.
Invitation to Pay Additional Fees received for PCT Patent Application No. PCT/US2020/031442, mailed on Aug. 25, 2020, 22 pages.
Jin-Chang et al., "Multi-modal Interface Techniques and Its Application for Multimedia Retrieval", China Academic Journal Electronic Publishing House, 2002, pp. 115-117 (Official Copy only). {(See Communication under 37 CFR § 1.98(a) (3))}.
Jobs Steve, "iPhone Introduction in 2007 (Complete)", available at <https://www.youtube.com/watch?v=9hUIxyE2Ns8>, Jan. 10, 2013, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Minutes of Oral Proceedings received for European Patent Application No. 11178259.5, mailed on Nov. 2, 2018, 9 pages.
Minutes of the Oral Proceedings received for European Patent Application No. 17813778.2, mailed on Jan. 21, 2022, 7 pages.
Minutes of the Oral Proceedings received for European Patent Application No. 18197554.1, mailed on Feb. 22, 2023, 9 pages.
Minutes of the Oral Proceedings received for European Patent Application No. 19724963.4, mailed on Sep. 3, 2021, 6 pages.
Mozilla Developer Network, "Mouse Gesture Events", Available online at <https://developer.mozilla.org/en-US/docs/Web/Guide/Events/Mouse_gesture_events>, May 14, 2009, 3 pages.
Non-Final Office Action received for U.S. Appl. No. 12/789,441, mailed on Jan. 17, 2013, Jan. 17, 2013, 24 pages.
Non-Final Office Action received for U.S. Appl. No. 14/253,783, mailed on Feb. 23, 2016, 18 pages.
Non-Final Office Action received for U.S. Appl. No. 11/848,210, mailed on Jun. 30, 2011, Jun. 30, 2011, 8 pages.
Non-Final Office Action received for U.S. Appl. No. 13/361,912, mailed on Mar. 22, 2012, Mar. 22, 2012, 8 pages.
Non-Final Office Action received for U.S. Appl. No. 15/275,294, mailed on Dec. 23, 2016, 18 pages.
Non-Final Office Action received for U.S. Appl. No. 15/275,294, mailed on Nov. 3, 2017, 29 pages.
Non-Final Office Action received for U.S. Appl. No. 15/281,524, mailed on Jun. 19, 2018, 23 pages.
Non-Final Office Action received for U.S. Appl. No. 15/687,384, mailed on Jul. 6, 2018, 19 pages.
Non-Final Office Action received for U.S. Appl. No. 16/109,487, mailed on Feb. 5, 2020, 19 pages.
Non-Final Office Action received for U.S. Appl. No. 16/145,033, mailed on Feb. 9, 2021, 55 pages.
Non-Final Office Action received for U.S. Appl. No. 16/145,033, mailed on Mar. 4, 2020, 50 pages.
Non-Final Office Action received for U.S. Appl. No. 16/402,057, mailed on May 23, 2019, 16 pages.
Non-Final Office Action received for U.S. Appl. No. 16/450,531, mailed on Jun. 10, 2020, 10 pages.
Non-Final Office Action received for U.S. Appl. No. 16/584,776, mailed on Aug. 18, 2020, 36 pages.
Non-Final Office Action received for U.S. Appl. No. 16/584,776, mailed on Feb. 13, 2020, 31 pages.
Non-Final Office Action received for U.S. Appl. No. 16/584,783, mailed on Jan. 30, 2020, 18 pages.
Non-Final Office Action received for U.S. Appl. No. 17/153,703, mailed on Mar. 30, 2022, 10 pages.
Non-Final Office Action received for U.S. Appl. No. 17/408,220, mailed on Aug. 3, 2022, 15 pages.
Non-Final Office Action received for U.S. Appl. No. 17/542,947, mailed on Mar. 2, 2023, 59 pages.
Non-Final Office Action received for U.S. Appl. No. 17/744,499, mailed on Dec. 7, 2022, 14 pages.
Non-Final Office Action received for U.S. Appl. No. 13/666,943, mailed on Oct. 26, 2015, 12 Pages.
Notice of Acceptance received for Australian Patent Application No. 2011265412, mailed on Nov. 12, 2014, 2 pages.
Notice of Acceptance received for Australian Patent Application No. 2015201028, mailed on Mar. 21, 2017, 3 Pages.
Notice of Acceptance received for Australian Patent Application No. 2017201548, mailed on Sep. 3, 2018, 3 pages.
Notice of Acceptance received for Australian Patent Application No. 2018214074, mailed on Aug. 6, 2019, 3 pages.
Notice of Acceptance received for Australian Patent Application No. 2019264623, mailed on Jan. 4, 2021, 3 pages.
Notice of Acceptance received for Australian Patent Application No. 2019266054, mailed on Nov. 25, 2021, 3 pages.
Notice of Acceptance received for Australian Patent Application No. 2019271873, mailed on Nov. 30, 2020, 3 pages.
Notice of Acceptance received for Australian Patent Application No. 2020267310, mailed on Feb. 23, 2022, 3 pages.
Notice of Acceptance received for Australian Patent Application No. 2020267396, mailed on Dec. 7, 2021, 3 pages.
Notice of Acceptance received for Australian Patent Application No. 2021202225, mailed on Jun. 20, 2022, 3 pages.
Notice of Acceptance received for Australian Patent Application No. 2022200514, mailed on Apr. 17, 2023, 3 pages.
Notice of Acceptance received for Australian Patent Application No. 2022201561, mailed on Jul. 22, 2022, 3 pages.
Notice of Acceptance received for Australian Patent Application No. 2017284958, mailed on Sep. 3, 2019, 3 Pages.
Notice of Acceptance received for Canadian Patent Application No. 2,935,875, mailed on May 3, 2017, 1 page.
Notice of Acceptance received for Canadian Patent Application No. 2,984,527, mailed on Apr. 30, 2020, 1 page.
Notice of Allowance received for Chinese Patent Application No. 201811136445.7, mailed on Aug. 11, 2021, 2 pages (1 page of English Translation and 1 page of Official Copy).
Notice of Allowance received for Chinese Patent Application No. 201811616429.8, mailed on Aug. 5, 2020, 3 pages (2 pages of English Translation and 1 page of Official Copy).
Notice of Allowance received for Japanese Patent Application No. 2013-140171, mailed on May 29, 2015, 4 pages (Official Copy only). {(See Communication under 37 CFR § 1.98(a) (3))}.
Notice Of Allowance received for Japanese Patent Application No. 2014-259225, mailed on Feb. 27, 2017, 3 pages. (Official Copy Only). {(See Communication under 37 CFR § 1.98(a) (3))}.
Notice of Allowance received for Japanese Patent Application No. 2015-129152, mailed on May 8, 2017, 3 pages (Official Copy only). {(See Communication under 37 CFR § 1.98(a) (3))}.

(56) References Cited

OTHER PUBLICATIONS

Notice of Allowance received for Japanese Patent Application No. 2017-057997, mailed on Apr. 23, 2018, 4 pages (1 page of English Translation and 3 pages of Official Copy).
Notice of Allowance received for Japanese Patent Application No. 2017-132229, mailed on Jun. 25, 2018, 4 pages (1 page of English Translation and 3 pages of Official Copy).
Notice of Allowance received for Japanese Patent Application No. 2018-138559, mailed on Dec. 3, 2021, 3 pages (1 page of English Translation and 2 pages of Official Copy).
Notice of Allowance received for Japanese Patent Application No. 2019-123115, mailed on Nov. 30, 2020, 4 pages (1 page of English Translation and 3 pages of Official Copy).
Notice of Allowance received for Japanese Patent Application No. 2020-079486, mailed on Oct. 21, 2022, 4 pages (1 page of English Translation and 3 pages of Official Copy).
Notice of Allowance received for Japanese Patent Application No. 2021-000224, mailed on May 7, 2021, 4 pages (1 page of English Translation and 3 pages of Official Copy).
Notice of Allowance received for Japanese Patent Application No. 2021-094529, mailed on Sep. 6, 2021, 4 pages (1 page of English Translation and 3 pages of Official Copy).
Notice of Allowance received for Japanese Patent Application No. 2021-566100, mailed on Jan. 27, 2023, 4 pages (1 page of English Translation and 3 pages of Official Copy).
Notice of Allowance received for Korean Patent Application No. 10-2018-7034875, mailed on Dec. 12, 2018, 4 pages (1 pages of English Translation and 3 pages of Official Copy).
Notice of Allowance received for Korean Patent Application No. 10-2019-7007053, mailed on Dec. 19, 2019, 6 pages (2 pages of English Translation and 4 pages of Official Copy).
Notice of Allowance received for Korean Patent Application No. 10-2019-7007053, mailed on Mar. 12, 2020, 6 pages (2 pages of English Translation and 4 pages of Official Copy).
Notice of Allowance received for Korean Patent Application No. 10-2020-7005314, mailed on Mar. 23, 2020, 6 pages (2 pages of English Translation and 4 pages of Official Copy).
Notice of Allowance received for Korean Patent Application No. 10-2020-7018255, mailed on Feb. 24, 2021, 5 pages (2 pages of English Translation and 3 pages of Official Copy).
Notice of Allowance received for Korean Patent Application No. 10-2021-7036310, mailed on Apr. 26, 2022, 5 pages (2 pages of English Translation and 3 pages of Official Copy).
Notice of Allowance received for the Canadian Patent Application No. 2,853,273, mailed on Jan. 12, 2016, Jan. 12, 2016, 1 page.
Notice of Allowance received for U.S. Appl. No. 11/848,210, mailed on Dec. 20, 2011, Dec. 20, 2011, 5 pages.
Notice of Allowance received for U.S. Appl. No. 12/789,441, mailed on Dec. 6, 2013, Dec. 6, 2013, 11 pages.
Notice of Allowance received for U.S. Appl. No. 13/361,912, mailed on Jul. 2, 2012, Jul. 2, 2012, 7 pages.
Notice of Allowance received for U.S. Appl. No. 13/666,943, mailed on Jun. 2, 2016, 9 pages.
Notice of Allowance received for U.S. Appl. No. 13/666,943, mailed on Jun. 17, 2015, 7 pages.
Notice of Allowance received for U.S. Appl. No. 14/253,783, mailed on Apr. 14, 2017, 12 Pages.
Notice of Allowance received for U.S. Appl. No. 14/253,783, mailed on Jul. 12, 2017, 5 pages.
Notice of Allowance received for U.S. Appl. No. 14/253,783, mailed on Sep. 5, 2017, 8 pages.
Notice of Allowance received for U.S. Appl. No. 15/275,294, mailed on Jun. 6, 2018, 8 pages.
Notice of Allowance received for U.S. Appl. No. 15/275,294, mailed on Jun. 30, 2018, 8 Pages.
Notice of Allowance received for U.S. Appl. No. 15/281,524, mailed on Apr. 11, 2019, 7 pages.
Notice of Allowance received for U.S. Appl. No. 15/687,384, mailed on Jan. 8, 2019, 8 pages.
Notice of Allowance received for U.S. Appl. No. 16/109,487, mailed on Aug. 18, 2020, 8 pages.
Notice of Allowance received for U.S. Appl. No. 16/109,487, mailed on May 12, 2020, 8 pages.
Notice of Allowance received for U.S. Appl. No. 16/109,487, mailed on Nov. 23, 2020, 3 pages.
Notice of Allowance received for U.S. Appl. No. 16/145,033, mailed on May 3, 2023, 5 pages.
Notice of Allowance received for U.S. Appl. No. 16/402,057, mailed on Mar. 25, 2020, 8 pages.
Notice of Allowance received for U.S. Appl. No. 16/450,531, mailed on Sep. 25, 2020, 7 pages.
Notice of Allowance received for U.S. Appl. No. 16/584,776, mailed on Feb. 1, 2021, 9 pages.
Notice of Allowance received for U.S. Appl. No. 16/584,783, mailed on Dec. 20, 2021, 7 pages.
Notice of Allowance received for U.S. Appl. No. 16/983,815, mailed on Jul. 26, 2021, 3 pages.
Notice of Allowance received for U.S. Appl. No. 16/983,815, mailed on Mar. 18, 2021, 11 pages.
Notice of Allowance received for U.S. Appl. No. 17/125,744, mailed on Feb. 7, 2022, 10 pages.
Notice of Allowance received for U.S. Appl. No. 17/125,744, mailed on Oct. 21, 2021, 11 pages.
Notice of Allowance received for U.S. Appl. No. 17/153,703, mailed on Aug. 30, 2022, 8 pages.
Notice of Allowance received for U.S. Appl. No. 17/153,703, mailed on Dec. 22, 2022, 7 pages.
Notice of Allowance received for U.S. Appl. No. 17/408,220, mailed on Nov. 15, 2022, 11 pages.
Notice of Allowance received for U.S. Appl. No. 17/697,539, mailed on Nov. 29, 2022, 10 pages.
Notice of Allowance received for U.S. Appl. No. 17/744,499, mailed on Mar. 15, 2023, 7 pages.
Notice of Allowance received for U.S. Appl. No. 12/789,441, mailed on Aug. 20, 2013, Aug. 20, 2013, 9 pages.
Notice of Allowance received for Australian Patent Application No. 2015201028, mailed on Mar. 15, 2016, 12 pages.
Office Action received for Australian Patent Application No. 2017201548, mailed on Feb. 26, 2018, 2 pages.
Office Action received for Australian Patent Application No. 2018214074, mailed on May 9, 2019, 2 pages.
Office Action received for Australian Patent Application No. 2019100490, mailed on Jul. 26, 2019, 4 pages.
Office Action received for Australian Patent Application No. 2019264623, mailed on Sep. 14, 2020, 3 pages.
Office Action received for Australian Patent Application No. 2019266054, mailed on Aug. 23, 2021, 4 pages.
Office Action received for Australian Patent Application No. 2019266054, mailed on Jun. 29, 2021, 3 pages.
Office Action received for Australian Patent Application No. 2019271873, mailed on Oct. 5, 2020, 3 pages.
Office Action received for Australian Patent Application No. 2020267310, mailed on Nov. 4, 2021, 2 pages.
Office Action received for Australian Patent Application No. 2021202225, mailed on Apr. 7, 2022, 3 pages.
Office Action received for Australian Patent Application No. 2022200514, mailed on Feb. 15, 2023, 2 pages.
Office Action received for Australian Patent Application No. 2022200514, mailed on Jan. 17, 2023, 3 pages.
Office Action received for Australian Patent Application No. 2022201561, mailed on May 2, 2022, 3 pages.
Office Action received for Australian Patent Application No. 2022201810, mailed on Mar. 15, 2023, 2 pages.
Office Action received for Australian Patent Application No. 2017284958, mailed on Dec. 13, 2018, 3 pages.
Office Action received for Canadian Patent Application No. 2,853,273, mailed on Feb. 23, 2015, 5 pages.
Office Action received for Canadian Patent Application No. 2,984,527 mailed on Sep. 11, 2018, 5 pages.
Office Action received for Canadian Patent Application No. 2,984,527, mailed on Jul. 25, 2019, 4 pages.

(56) References Cited

OTHER PUBLICATIONS

Office Action received for Chinese Patent Application No. 201780033901.2, mailed on Nov. 23, 2022, 44 pages (24 pages of English Translation and 20 pages of Official Copy).
Office Action received for Chinese Patent Application No. 201811136445.7, mailed on Apr. 14, 2021, 7 pages (4 pages of English Translation and 3 pages of Official Copy).
Office Action received for Chinese Patent Application No. 201811136445.7, mailed on Oct. 28, 2020, 17 pages (10 pages of English Translation and 7 pages of Official Copy).
Office Action received for Chinese Patent Application No. 201811616429.8, mailed on May 7, 2020, 8 pages (4 pages of English Translation and 4 pages of Official Copy).
Office Action received for Chinese Patent Application No. 201811616429.8, mailed on Sep. 4, 2019, 26 pages (15 pages of English Translation and 11 pages of Official Copy).
Office Action received for Chinese Patent Application No. 202011127969.7, mailed on Jul. 28, 2022, 25 pages (14 pages of English Translation and 11 pages of Official Copy).
Office Action received for Chinese Patent Application No. 202011127969.7, mailed on Mar. 17, 2023, 14 pages (7 pages of English Translation and 7 pages of Official Copy).
Office Action received for Chinese Patent Application No. 202011127969.7, mailed on Nov. 24, 2022, 26 pages (16 pages of English Translation 10 pages of Official Copy).
Office Action received for Chinese Patent Application No. 202111487316.4, mailed on Aug. 8, 2022, 25 pages (13 pages of English Translation and 12 pages of Official Copy).
Office Action received for Chinese Patent Application No. 202111487316.4, mailed on Dec. 28, 2022, 13 pages (8 pages of English Translation and 5 pages of Official Copy).
Office Action received for Danish Patent Application No. PA201670608, mailed on Jan. 14, 2019, 7 pages.
Office Action received for Danish Patent Application No. PA201670608, mailed on Jan. 23, 2018, 10 pages.
Office Action received for Danish Patent Application No. PA201670609, mailed on Jan. 26, 2018, 8 pages.
Office Action received for Danish Patent Application No. PA201670609, mailed on Mar. 1, 2019, 9 pages.
Office Action received for Danish Patent Application No. PA201670609, mailed on May 4, 2020, 7 pages.
Office Action received for Danish Patent Application No. PA201670609, mailed on May 7, 2018, 4 pages.
Office Action received for Danish Patent Application No. PA201870385, mailed on Aug. 23, 2019, 3 Pages.
Office Action received for Danish Patent Application No. PA201970535, mailed on May 20, 2020, 3 pages.
Office Action received for Danish Patent Application No. PA201970535, mailed on Oct. 27, 2020, 6 pages.
Office Action received for European Patent Application No. 07814633.9, mailed on Aug. 10, 2009, 3 pages.
Office Action received for European Patent Application No. 10172417.7, mailed on Oct. 31, 2011, 6 pages.
Office Action received for European Patent Application No. 11178259.5, mailed on Jan. 4, 2013, 8 pages.
Office Action received for European Patent Application No. 11178259.5, mailed on Nov. 10, 2015, 4 pages.
Office Action received for European Patent Application No. 17813778.2, mailed on Nov. 26, 2020, 10 pages.
Office Action received for European Patent Application No. 18197554.1, mailed on Jun. 15, 2020, 4 pages.
Office Action received for European Patent Application No. 19724963.4, mailed on Jul. 28, 2020, 6 pages.
Office Action received for European Patent Application No. 20729331.7, mailed on Jan. 4, 2023, 12 pages.
Office Action received for German Patent Application No. 112007000067.8, mailed on Apr. 23, 2009, 15 pages (7 pages of English Translation and 8 pages of Official Copy).
Office Action received for German Patent Application No. 112007000067.8, mailed on Sep. 14, 2010, 4 pages (2 pages of English Translation and 2 pages of Official Copy).
Office Action received for Indian Patent Application No. 202048019639, mailed on Sep. 27, 2022, 5 pages.
Office Action received for Indian Patent Application No. 9044/CHENP/2014, mailed on Jan. 24, 2020, 6 pages.
Office action received for Indian Patent Application No. 2797/CHENP/2008, mailed on Jan. 29, 2014, 3 pages.
Office Action received for Japanese Patent Application No. 2013-140171, mailed on Jul. 22, 2014, 4 pages (2 pages of English Translation and 2 pages of Official copy).
Office Action received for Japanese Patent Application No. 2014-259225, mailed on May 27, 2016, 4 pages (2 pages of English Translation and 2 pages of Official Copy).
Office Action Received for Japanese Patent Application No. 2014-259225, mailed on Nov. 20, 2015, 2 pages (Official Copy Only). {(See Communication under 37 CFR § 1.98(a) (3))}.
Office Action received for Japanese Patent Application No. 2015-129152, mailed on Sep. 23, 2016, 3 pages (1 page of English Translation and 2 pages of Official Copy).
Office Action received for Japanese Patent Application No. 2017-057997, mailed on Jan. 9, 2018, 6 pages (3 pages of English translation and 3 pages of official Copy).
Office Action received for Japanese Patent Application No. 2017-132229, mailed on Mar. 16, 2018, 7 pages (3 pages of English Translation and 4 pages of Official Copy).
Office Action received for Japanese Patent Application No. 2018-138559, mailed on Apr. 9, 2021, 30 pages (6 pages of English Translation and 24 pages of Official Copy).
Office Action received for Japanese Patent Application No. 2018-138559, mailed on Jan. 27, 2020, 7 pages (3 pages of English Translation and 4 pages of Official Copy).
Office Action received for Japanese Patent Application No. 2018-138559, mailed on Jul. 26, 2021, 37 pages (5 pages of English Translation and 32 pages of Official Copy).
Office Action received for Japanese Patent Application No. 2018-138559, mailed on May 13, 2019, 10 pages (5 pages of English Translation and 5 pages of Official Copy).
Office Action received for Japanese Patent Application No. 2019-123115, mailed on Aug. 31, 2020, 9 pages (4 pages of English Translation and 5 pages of Official Copy).
Office Action received for Japanese Patent Application No. 2020-079486, mailed on Jul. 16, 2021, 10 pages (5 pages of English Translation and 5 pages of Official Copy).
Office Action received for Japanese Patent Application No. 2020-079486, mailed on Mar. 11, 2022, 8 pages (4 pages of English Translation and 4 pages of Official Copy).
Office Action received for Japanese Patent Application No. 2021-566100, mailed on May 27, 2022, 7 pages (3 pages of English Translation and 4 pages of Official Copy).
Office Action received for Korean Patent Application No. 10-2019-7007053, mailed on Mar. 18, 2019, 12 pages (5 pages of English Translation and 7 pages of Official Copy).
Office Action received for Korean Patent Application No. 10-2019-7007053, mailed on Sep. 26, 2019, 9 pages (4 pages of English Translation and 5 pages of Official Copy).
Office Action received for Korean Patent Application No. 10-2020-7018255, mailed on Sep. 10, 2020, 12 pages (5 pages of English Translation and 7 pages of Official Copy).
Office Action received for Korean Patent Application No. 10-2021-7036310, mailed on Feb. 23, 2022, 6 pages (2 pages of English Translation and 4 pages of Official Copy).
Partial European Search Report received for European Patent Application No. 18197554.1, mailed on Jan. 22, 2019, 8 pages.
Record of Oral Hearing received for U.S. Appl. No. 16/145,033, mailed on Apr. 19, 2023, 16 pages.
Result of Consultation received for European Patent Application No. 17813778.2, mailed on Dec. 6, 2021, 17 pages.
Result of Consultation received for European Patent Application No. 18197554.1, mailed on Feb. 3, 2023, 3 pages.
Result of Consultation received for European Patent Application No. 19724963.4, mailed on Jul. 8, 2021, 3 pages.

(56) References Cited

OTHER PUBLICATIONS

Result of Consultation received for European Patent Application No. 19724963.4, mailed on May 31, 2021, 3 pages.
Search Report and opinion received for Danish Patent Application No. PA201670608, mailed on Jan. 3, 2017, 15 pages.
Search Report and Opinion received for Danish Patent Application No. PA201670609, mailed on Feb. 1, 2017, 11 pages.
Search Report and Opinion received for Danish Patent Application No. PA201870385, mailed on Nov. 16, 2018, 10 Pages.
Search Report and Opinion received for Danish Patent Application No. PA201970535, mailed on Nov. 5, 2019, 10 pages.
Summons to Attend Oral Proceeding received for European Patent Application No. 10172417.7, Jan. 28, 2013, 6 pages, Jan. 28, 2013, 6 pages.
Summons to Attend Oral Proceedings received for European Patent Application No. 11178259.5, mailed on Feb. 11, 2015, 9 pages.
Summons to Attend Oral Proceedings received for European Patent Application No. 11178259.5, mailed on Feb. 19, 2018, 12 pages.
Summons to Attend Oral Proceedings received for European Patent Application No. 17813778.2, mailed on Aug. 13, 2021, 13 pages.
Summons to Attend Oral Proceedings received for European Patent Application No. 18197554.1, mailed on Mar. 23, 2022, 7 pages.
Summons to Attend Oral Proceedings received for European Patent Application No. 19724963.4, mailed on Dec. 23, 2020, 8 pages.
Summons to Attend Oral Proceedings received for European Patent Application No. 20729331.7, mailed on May 22, 2023, 15 pages.
Summons to Oral Proceedings received for German Patent Application No. 112007000067.8, mailed on Dec. 8, 2021, 11 pages (5 pages of English Translation and 6 pages of Official Copy).
Supplemental Notice of Allowance received for U.S. Appl. No. 16/584,776, mailed on Feb. 18, 2021, 3 pages.
Supplemental Notice of Allowance received for U.S. Appl. No. 16/584,776, mailed on May 13, 2021, 4 pages.
Supplemental Notice of Allowance received for U.S. Appl. No. 17/697,539, mailed on Feb. 21, 2023, 2 pages.
T&GG Channel, "Canon IXUS 700 / Screenshots of deleting an image", Online available at: https://www.youtube.com/watch?v=8BL_L5hKZUM, May 2015, 2 pages.
Kyocera WX300K, "Way to Use a Camera", JP, Nov. 18, 2005, pp. 206-212. (Official Copy Only). {(See Communication under 37 CFR § 1.98(a) (3))}.
Willcom, "Operation Manual for WS003SH", JP, Dec. 2005, pp. 4-1 to 4-7. (Official Copy Only). {(See Communication under 37 CFR § 1.98(a) (3))}.
Final Office Action received for U.S. Appl. No. 18/117,998, mailed on May 31, 2024, 12 pages.
Office Action received for Australian Patent Application No. 2024202344, mailed on May 16, 2024, 3 pages.
2002-73679, JP, A, The Japanese Patent Office in an Office Action for related Patent Application No. 2022-151671 on Jan. 5, 2024.
2007-292971, JP, A, The Japanese Patent Office in an Office Action for related Patent Application No. 2022-151671 on Jan. 5, 2024.
2016-62590, JP, A, The Japanese Patent Office in an Office Action for related Patent Application No. 2022-151671 on Jan. 5, 2024.
2016-158115, JP, A, The Japanese Patent Office in an Office Action for related Patent Application No. 2022-151671 on Jan. 5, 2024.
2016-527581, JP, A, The Japanese Patent Office in an Office Action for related Patent Application No. 2022-151671 on Jan. 5, 2024.
2018-22995, JP, A, The Japanese Patent Office in an Office Action for related Patent Application No. 2022-151671 on Jan. 5, 2024.
Office Action received for European Patent Application No. 22152524.9, mailed on Jun. 25, 2024, 7 pages.
111314770, CN, A, The WIPO in an Office Action for related PCT Application No. PCT/US2024/030858 on Sep. 10, 2024.
Applicant-Initiated Interview Summary received for U.S. Appl. No. 17/542,947, mailed on Jun. 6, 2024, 4 pages.
Non-Final Office Action received for U.S. Appl. No. 17/542,947, mailed on Feb. 18, 2025, 57 pages.
Non-Final Office Action received for U.S. Appl. No. 18/367,934, mailed on Feb. 27, 2025, 12 pages.
Applicant-Initiated Interview Summary received for U.S. Appl. No. 18/117,998, mailed on Jul. 24, 2024, 4 pages.
Office Action received for European Patent Application No. 22164099.8, mailed on Jul. 29, 2024, 10 pages.
Applicant-Initiated Interview Summary received for U.S. Appl. No. 18/112,421, mailed on Sep. 3, 2024, 5 pages.
Notice of Allowance received for Japanese Patent Application No. 2024-077470, mailed on Aug. 23, 2024, 4 pages (1 page of English Translation and 3 pages of Official Copy).
Office Action received for Australian Patent Application No. 2024201844, mailed on Mar. 21, 2025, 5 pages,.
Office Action received for Japanese Patent Application No. 2024-515963, mailed on Mar. 7, 2025, 15 pages (7 pages of English Translation and 8 pages of Official Copy).
Kaceli Techtraining, "PowerPoint 2016: How to Insert and Embed a YouTube Video in PowerPoint (Oct. 30)", Available online at: https://www.youtube.com/watch?v=OEpbmaX2zJQ, May 19, 2017, 3 pages.
Non-Final Office Action received for U.S. Appl. No. 17/542,947, mailed on Aug. 13, 2024, 58 pages.
2010-539619, JP, A, The Japanese Patent Office in an Office Action for related Patent Application No. 2023-560216 on Sep. 20, 2024.
2017-538975, JP, A, The Japanese Patent Office in an Office Action for related Patent Application No. 2023-560216 on Sep. 20, 2024.
Notice of Allowance received for Chinese Patent Application No. 202111244490.6, mailed on Sep. 23, 2024, 2 pages (1 page of English Translation and 1 page of Official Copy).
Office Action received for Japanese Patent Application No. 2023-560216, mailed on Sep. 20, 2024, 14 pages (7 pages of English Translation and 7 pages of Official Copy).
Office Action received for Japanese Patent Application No. 2024-077470, mailed on Jun. 24, 2024, 5 pages (2 pages of English Translation and 3 pages of Official Copy).
Applicant-Initiated Interview Summary received for U.S. Appl. No. 18/374,562, mailed on Jul. 22, 2025, 2 pages.
Notice of Allowance received for Korean Patent Application No. 10-2022-7026174, mailed on Jul. 11, 2025, 8 pages (2 pages of English Translation and 6 pages of Official Copy).
Applicant-Initiated Interview Summary received for U.S. Appl. No. 18/367,934, mailed on May 29, 2025, 4 pages.
Final Office Action received for U.S. Appl. No. 17/542,947, mailed on Jun. 26, 2025, 59 pages.
Notice of Hearing received for Indian Patent Application No. 202117050360, mailed on Jun. 26, 2025, 7 pages.
Office Action received for Australian Patent Application No. 2024201844, mailed on Jul. 2, 2025, 3 pages.
Office Action received for European Patent Application No. 22741402.6, mailed on Jun. 24, 2025, 14 pages.
Applicant-Initiated Interview Summary received for U.S. Appl. No. 17/542,947, mailed on Dec. 30, 2024, 3 pages.
Applicant-Initiated Interview Summary received for U.S. Appl. No. 17/542,947, mailed on Nov. 1, 2024, 4 pages.
Applicant-Initiated Interview Summary received for U.S. Appl. No. 18/592,219, mailed on Apr. 4, 2025, 2 pages.
Final Office Action received for U.S. Appl. No. 17/542,947, mailed on Dec. 2, 2024, 58 pages.
Impossible Technical, "How to change Audio Language of movie | Audio Track | VLC Media Player | In Laptop/ Desktop", Online available at: https://www.youtube.com/watch?v=5PDwwqYStuk, Apr. 23, 2020, 10 pages.
International Preliminary Report on Patentability received for PCT Patent Application No. PCT/US2023/021734, mailed on Nov. 21, 2024, 12 pages.
International Search Report and Written Opinion received for PCT Patent Application No. PCT/US2024/030858, mailed on Oct. 31, 2024, 21 pages.
Invitation to Pay Additional Fees and Partial International Search Report received for PCT Patent Application No. PCT/US2024/030858, mailed on Sep. 10, 2024, 15 pages.
Non-Final Office Action received for U.S. Appl. No. 18/117,998, mailed on Nov. 6, 2024, 12 pages.
Non-Final Office Action received for U.S. Appl. No. 18/592,219, mailed on Jan. 3, 2025, 20 pages.

(56) References Cited

OTHER PUBLICATIONS

Notice of Acceptance received for Australian Patent Application No. 2024202344, mailed on Apr. 1, 2025, 3 pages.
Notice of Allowance received for Japanese Patent Application No. 2023-560216, mailed on Jan. 27, 2025, 4 pages (1 page of English Translation and 3 pages of Official Copy).
Notice of Allowance received for U.S. Appl. No. 18/112,421, mailed on Oct. 11, 2024, 16 pages.
Office Action received for Australian Patent Application No. 2023208169, mailed on Dec. 5, 2024, 3 pages.
Office Action received for Australian Patent Application No. 2023208169, mailed on Oct. 2, 2024, 3 pages.
Office Action received for Australian Patent Application No. 2024202344, mailed on Nov. 25, 2024, 4 pages.
Office Action received for Indian Patent Application No. 202248063719, mailed on Oct. 24, 2024, 5 pages.
Office Action received for Korean Patent Application No. 10-2022-7026174, mailed on Oct. 31, 2024, 14 pages (6 pages of English Translation and 8 pages of Official Copy).
Notice of Acceptance received for Australian Patent Application No. 2023208169, mailed on May 22, 2025, 3 pages.
Applicant-Initiated Interview Summary received for U.S. Appl. No. 17/542,947, mailed on May 1, 2025, 3 pages.
Examiner's Answer to Appeal Brief received for U.S. Appl. No. 18/117,998, mailed on May 5, 2025, 15 pages.
Final Office Action received for U.S. Appl. No. 18/592,219, mailed on Apr. 28, 2025, 22 pages.
Non-Final Office Action received for U.S. Appl. No. 18/374,562, mailed on May 19, 2025, 29 pages.
Office Action received for Australian Patent Application No. 2022352756, mailed on May 14, 2025, 4 pages.
Applicant-Initiated Interview Summary received for U.S. Appl. No. 18/614,032, mailed on Dec. 4, 2025, 3 pages.
International Preliminary Report on Patentability received for PCT Patent Application No. PCT/US2024/030858, mailed on Dec. 18, 2025, 15 pages.
Final Office Action received for U.S. Appl. No. 18/367,934, mailed on Sep. 2, 2025, 11 pages.
Final Office Action received for U.S. Appl. No. 18/374,562, mailed on Sep. 11, 2025, 45 pages.
Non-Final Office Action received for U.S. Appl. No. 18/614,032, mailed on Sep. 18, 2025, 17 pages.
Notice of Acceptance received for Australian Patent Application No. 2024201844, mailed on Sep. 12, 2025, 3 pages.
Office Action received for Japanese Patent Application No. 2024-515963, mailed on Sep. 1, 2025, 17 pages (8 pages of English Translation and 9 pages of Official Copy).
Applicant-Initiated Interview Summary received for U.S. Appl. No. 18/367,934, mailed on Nov. 20, 2025, 4 pages.
International Search Report and Written Opinion received for PCT Patent Application No. PCT/US2025/015130, mailed on Jul. 14, 2025, 23 pages.
Invitation to Pay Additional Fees and Partial International Search Report received for PCT Patent Application No. PCT/US2025/015130, mailed on May 22, 2025, 17 pages.
Office Action received for Australian Patent Application No. 2022352756, mailed on Aug. 8, 2025, 4 pages.

* cited by examiner

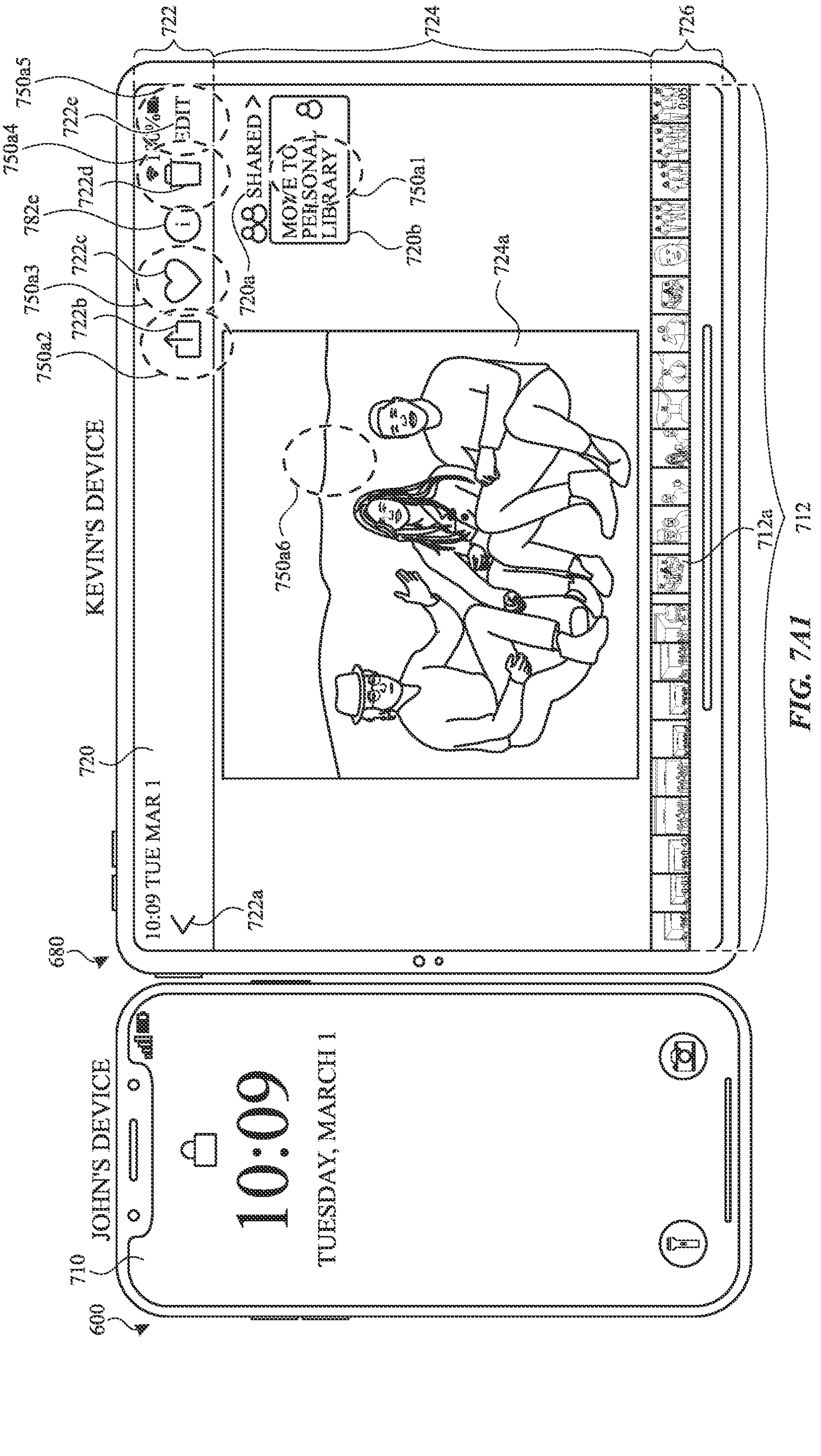
FIG. 7A1

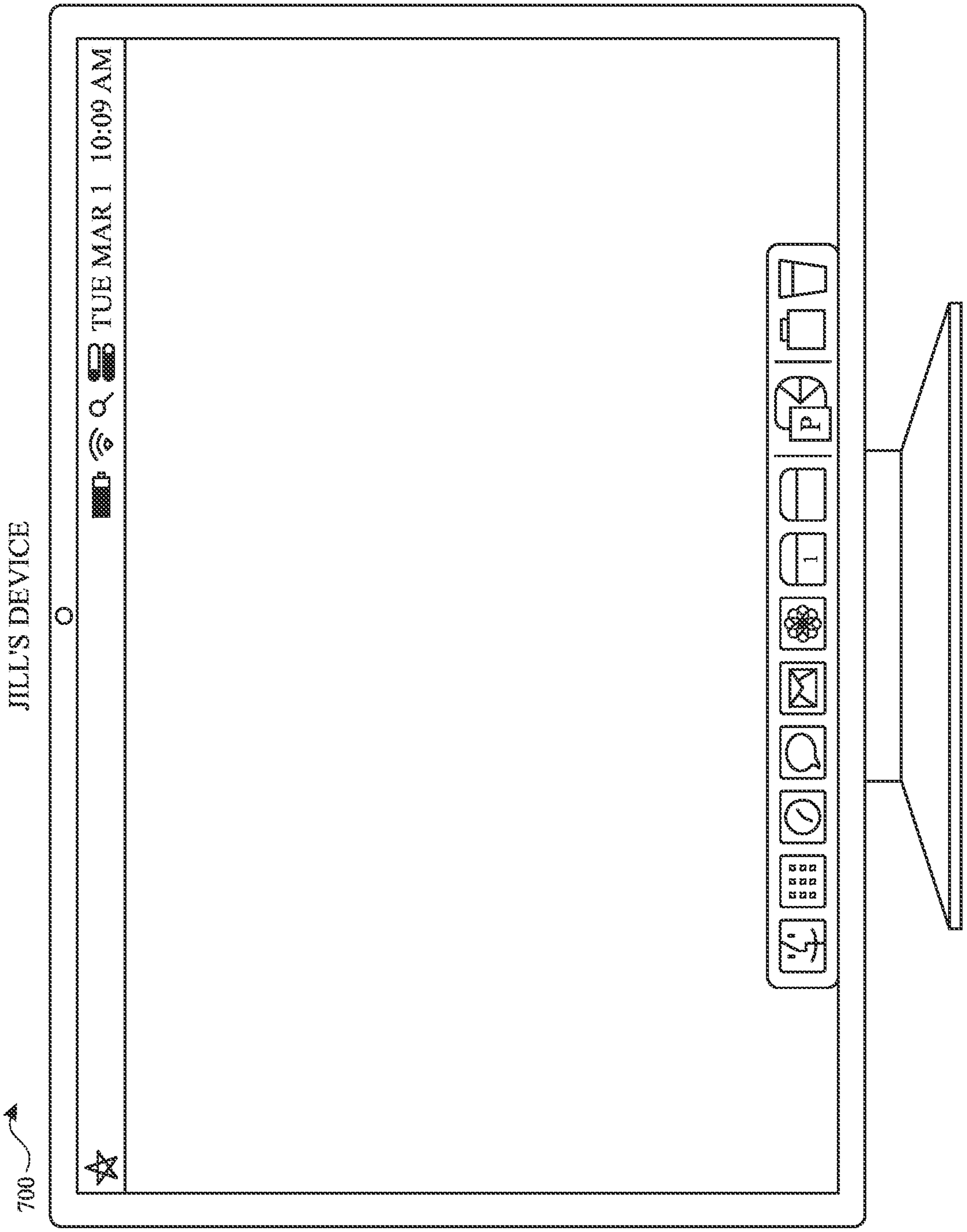
FIG. 7A2

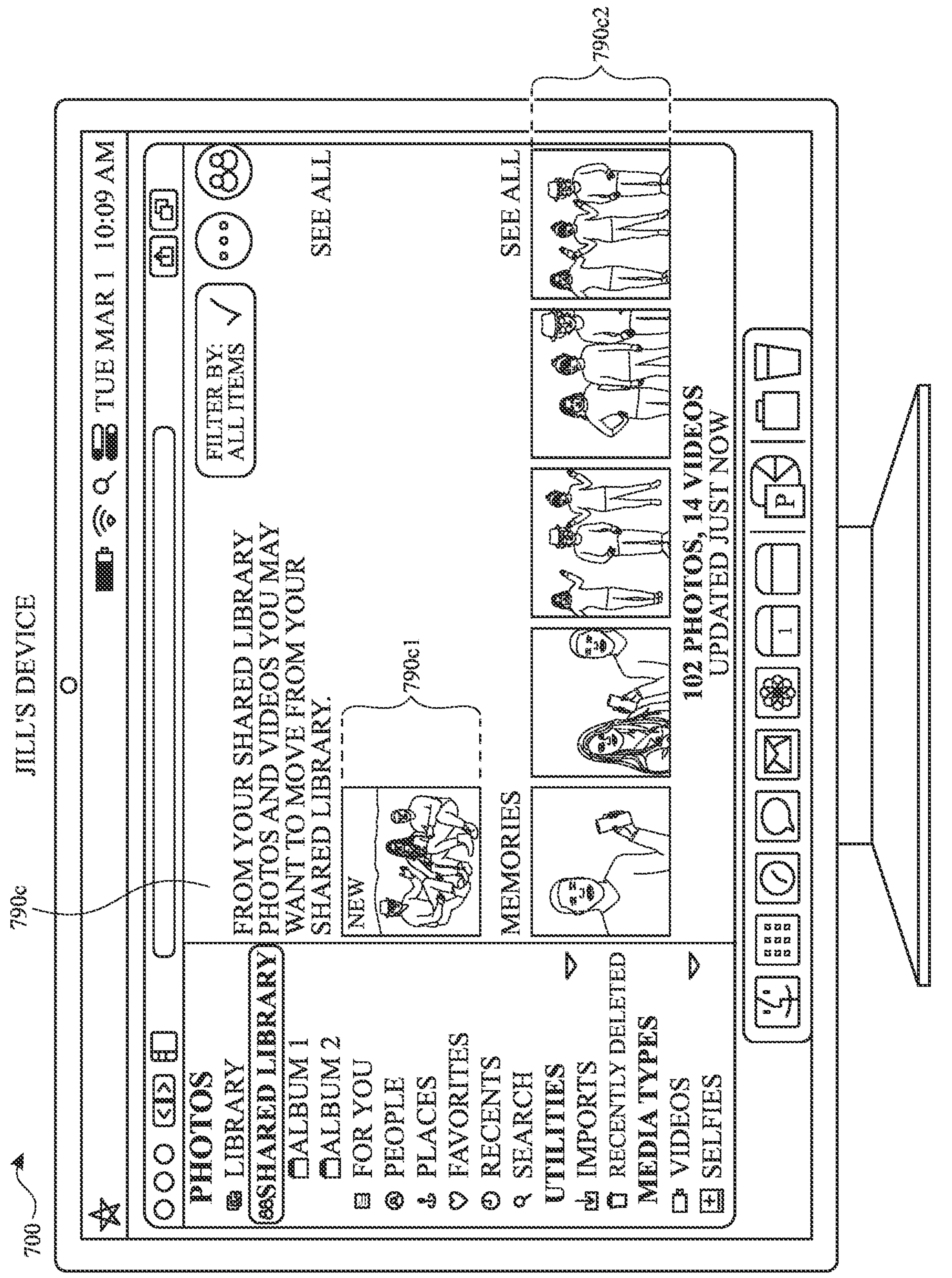
*FIG. 7J2*

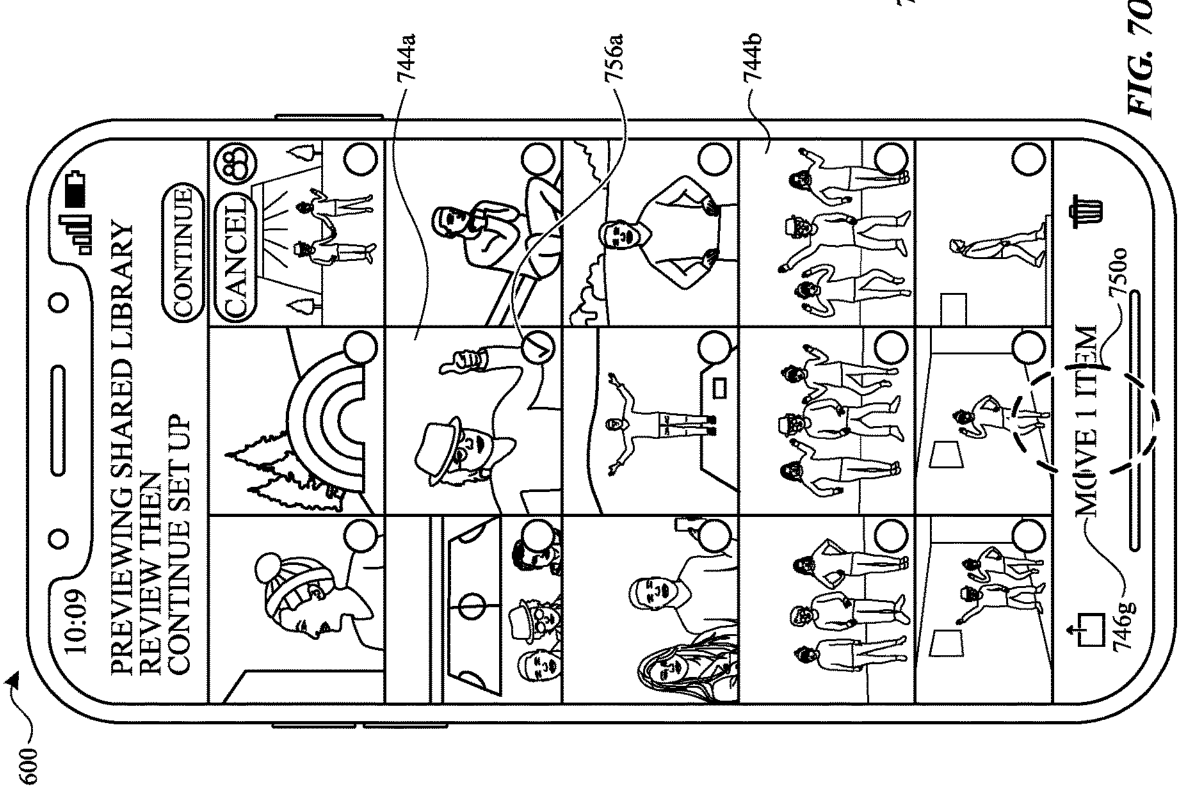

FIG. 7O

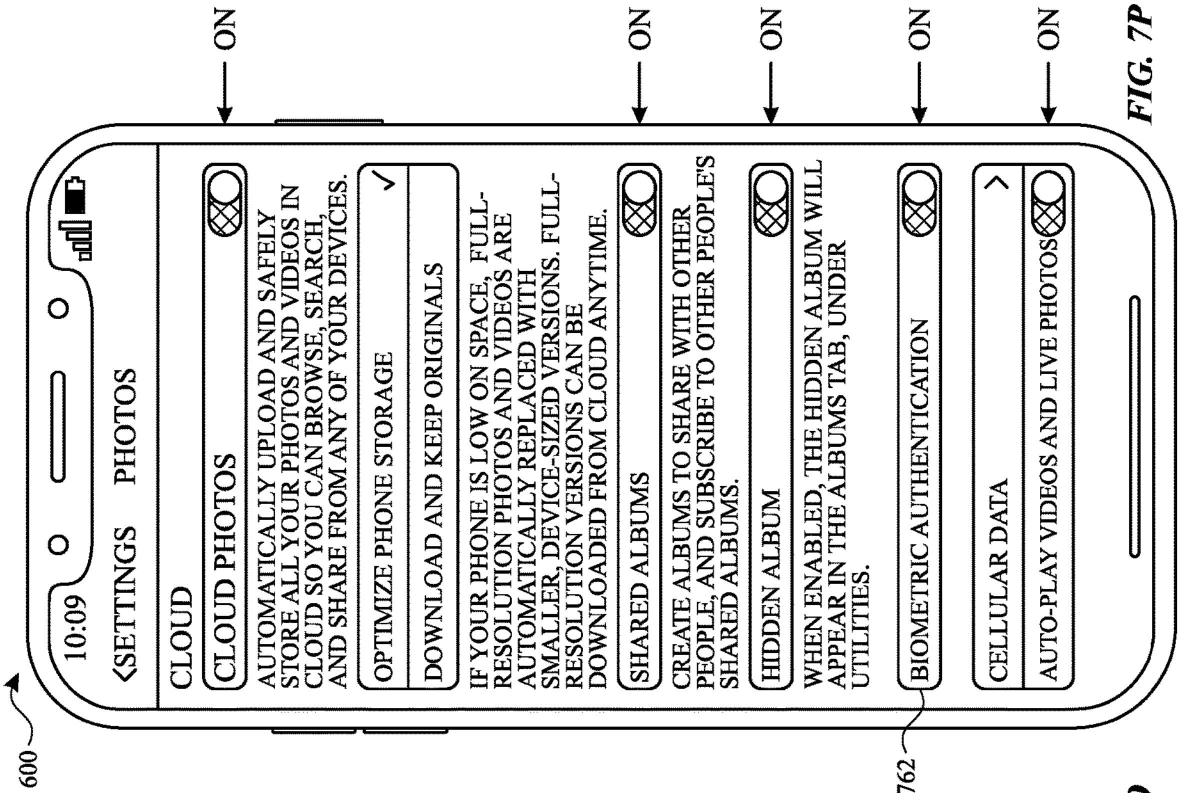

<SETTINGS   PHOTOS

CLOUD

CLOUD PHOTOS     ON →

AUTOMATICALLY UPLOAD AND SAFELY STORE ALL YOUR PHOTOS AND VIDEOS IN CLOUD SO YOU CAN BROWSE, SEARCH, AND SHARE FROM ANY OF YOUR DEVICES.

OPTIMIZE PHONE STORAGE    ✓

DOWNLOAD AND KEEP ORIGINALS

IF YOUR PHONE IS LOW ON SPACE, FULL-RESOLUTION PHOTOS AND VIDEOS ARE AUTOMATICALLY REPLACED WITH SMALLER, DEVICE-SIZED VERSIONS. FULL-RESOLUTION VERSIONS CAN BE DOWNLOADED FROM CLOUD ANYTIME.

SHARED ALBUMS     ON →

CREATE ALBUMS TO SHARE WITH OTHER PEOPLE, AND SUBSCRIBE TO OTHER PEOPLE'S SHARED ALBUMS.

HIDDEN ALBUM     ON →

WHEN ENABLED, THE HIDDEN ALBUM WILL APPEAR IN THE ALBUMS TAB, UNDER UTILITIES.

762

BIOMETRIC AUTHENTICATION     ON →

CELLULAR DATA     ON →

AUTO-PLAY VIDEOS AND LIVE PHOTOS   ∧

600

10:09

PREVIEWING SHARED LIBRARY

REVIEW THEN
CONTINUE SET UP

CONTINUE

CANCEL

744a

756a

744b

MOVE 1 ITEM 746g      750o

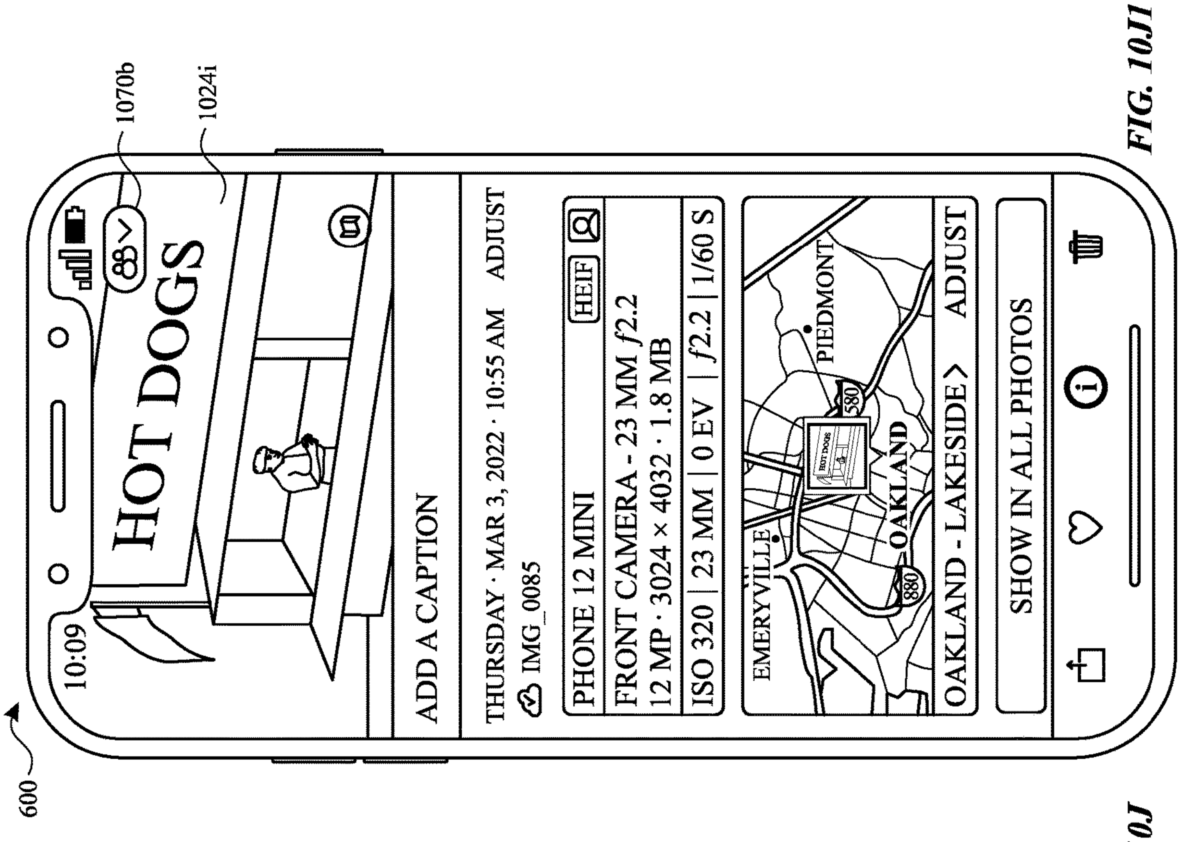
FIG. 10J1
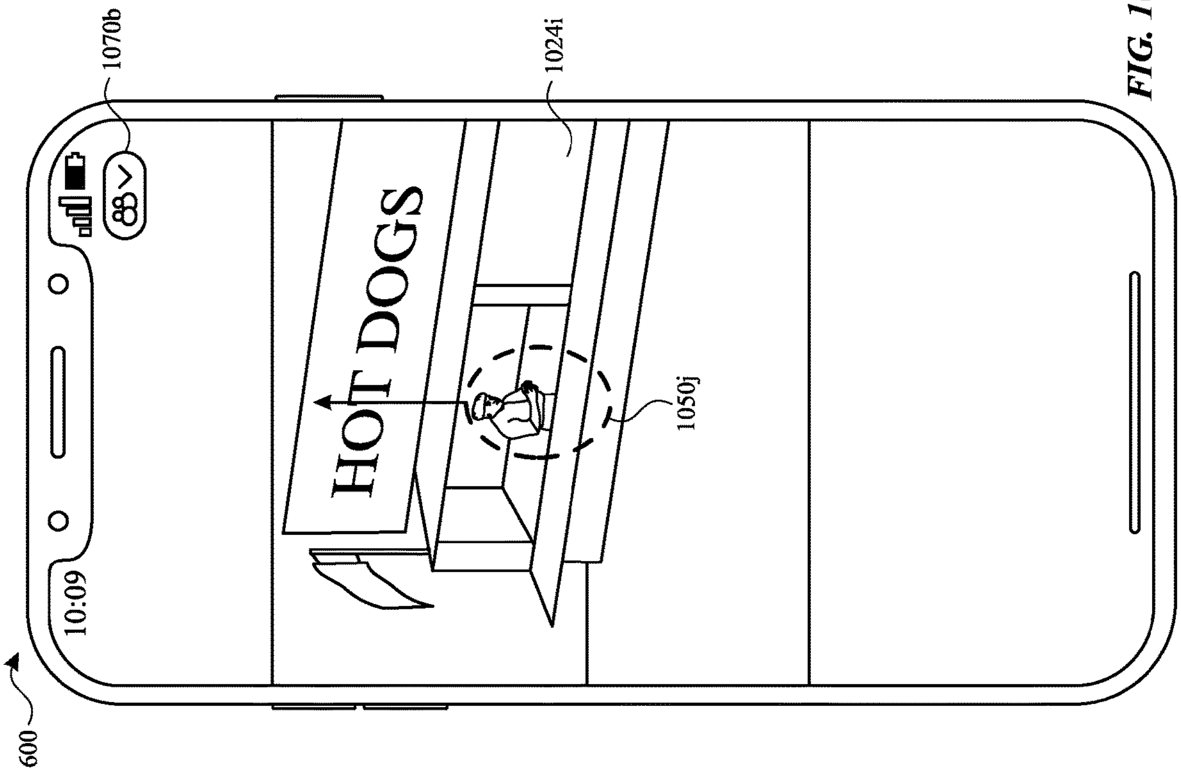
FIG. 10J

1200 �struck

```
                                    1202
While displaying, via the display generation component, a representation of a field-of-view of
the one or more cameras, detect a request to capture media corresponding to the field-of-view
                              of the one or more cameras.
```

```
                                    1204
In response to detecting the request to capture the media corresponding to the field-of-view of
the one or more cameras, capture a media item corresponding to the field-of-view of the one
                                 or more cameras.
```

```
                                    1206
After capturing the media item corresponding to the field-of-view of the one or more cameras
     and in accordance with a determination that the computer system is configured to share a
                  collection of media items with a set of one or more other users:

                                       1208
      In accordance with a determination that a set of media-sharing criteria is satisfied,
          automatically add the media item to a shared collection of media items.

                                       1210
       In accordance with a determination that the set of media-sharing criteria is not
   satisfied, automatically add the media item to a personal collection of media items
            without adding the media item to the shared collection of media items.
```

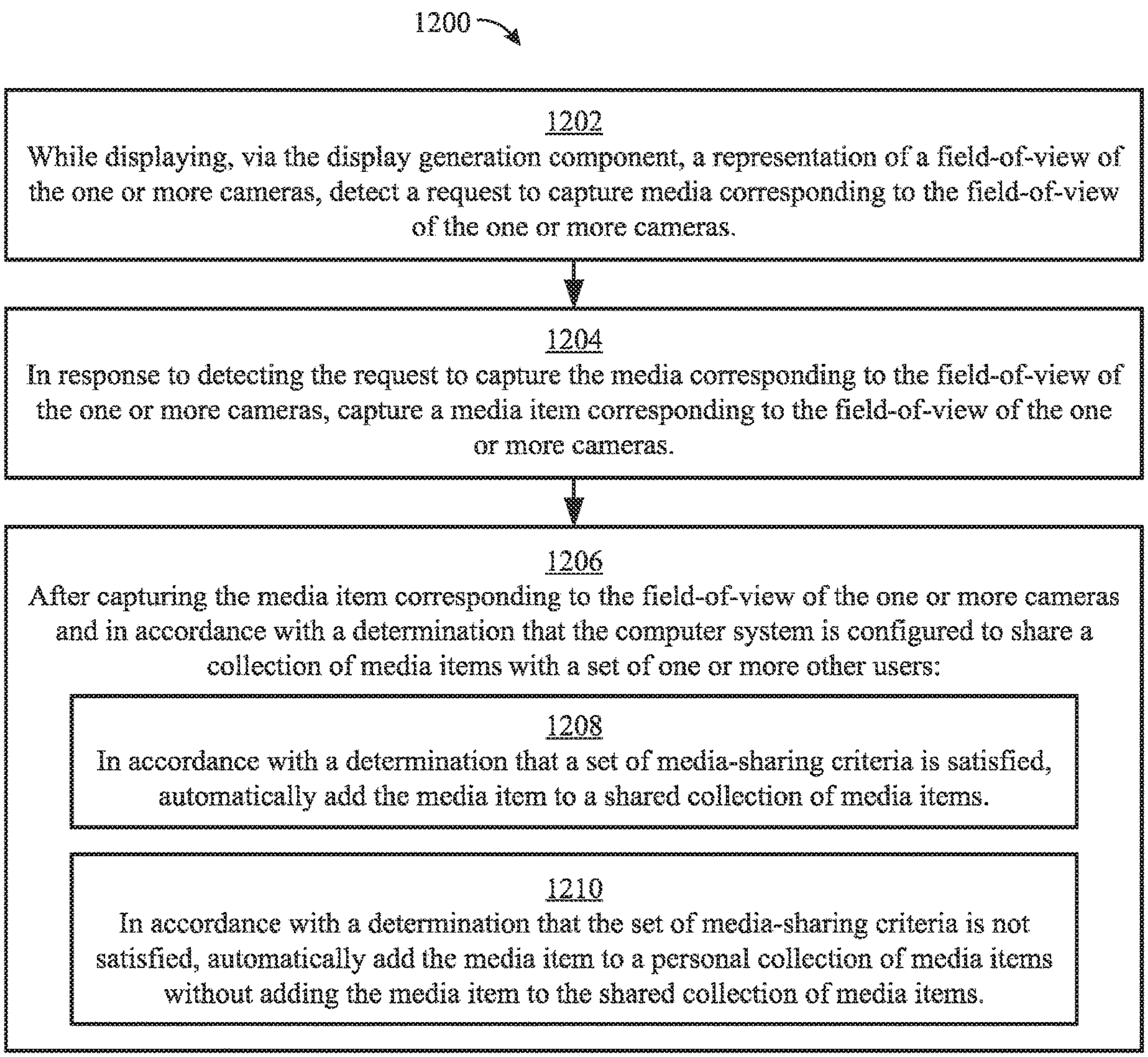

1302
While the user of the computer system is sharing a collection of media items with a set of one or more users that are different from the user of the computer system:

1304
In accordance with a determination that a set of notification criteria is satisfied, wherein the set of notification criteria includes a criterion that is satisfied when a determination is made that additional media items in a media library of the user satisfy a set of criteria for sharing in the collection of media items, provide, via the one or more output devices, a respective notification indicating that a respective suggested set of media items is suggested for addition to the collection of media items.

1306
In accordance with a determination that the set of notification criteria is not satisfied, forgo providing the respective notification indicating that the respective suggested set of media items is suggested for addition to the collection of media items.

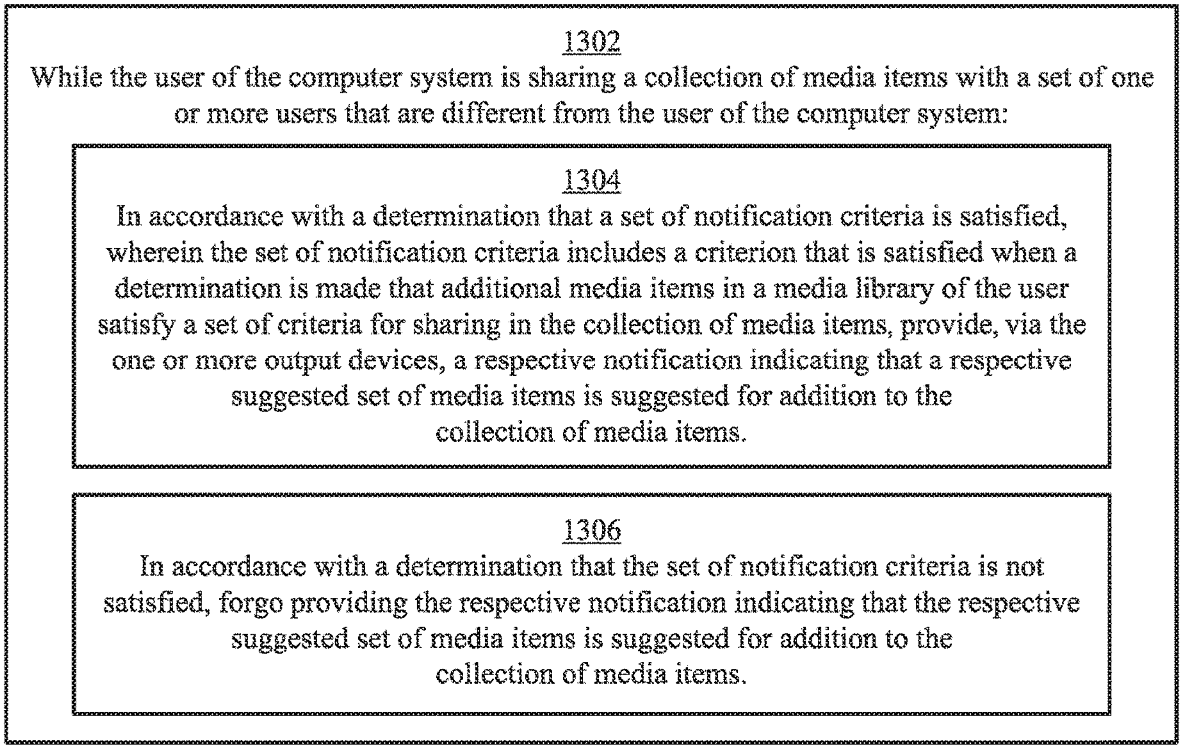

1502
While displaying, via the display generation component, an indication that a first media item is identified as a duplicate of a second media item, display, via the display generation component, a respective merge control, wherein the first media item corresponds to first metadata and the second media item corresponds to second metadata that is different from the first metadata.

1504
While displaying the respective merge control, detect, via the one or more input devices, a first set of one or more inputs that includes an input directed to the respective merge control.

1506
In response to detecting the first set of one or more inputs that includes the input directed to the respective merge control:

1508
Add at least a portion of the first metadata to the second metadata.

1510
Initiate a process for deleting the first media item.

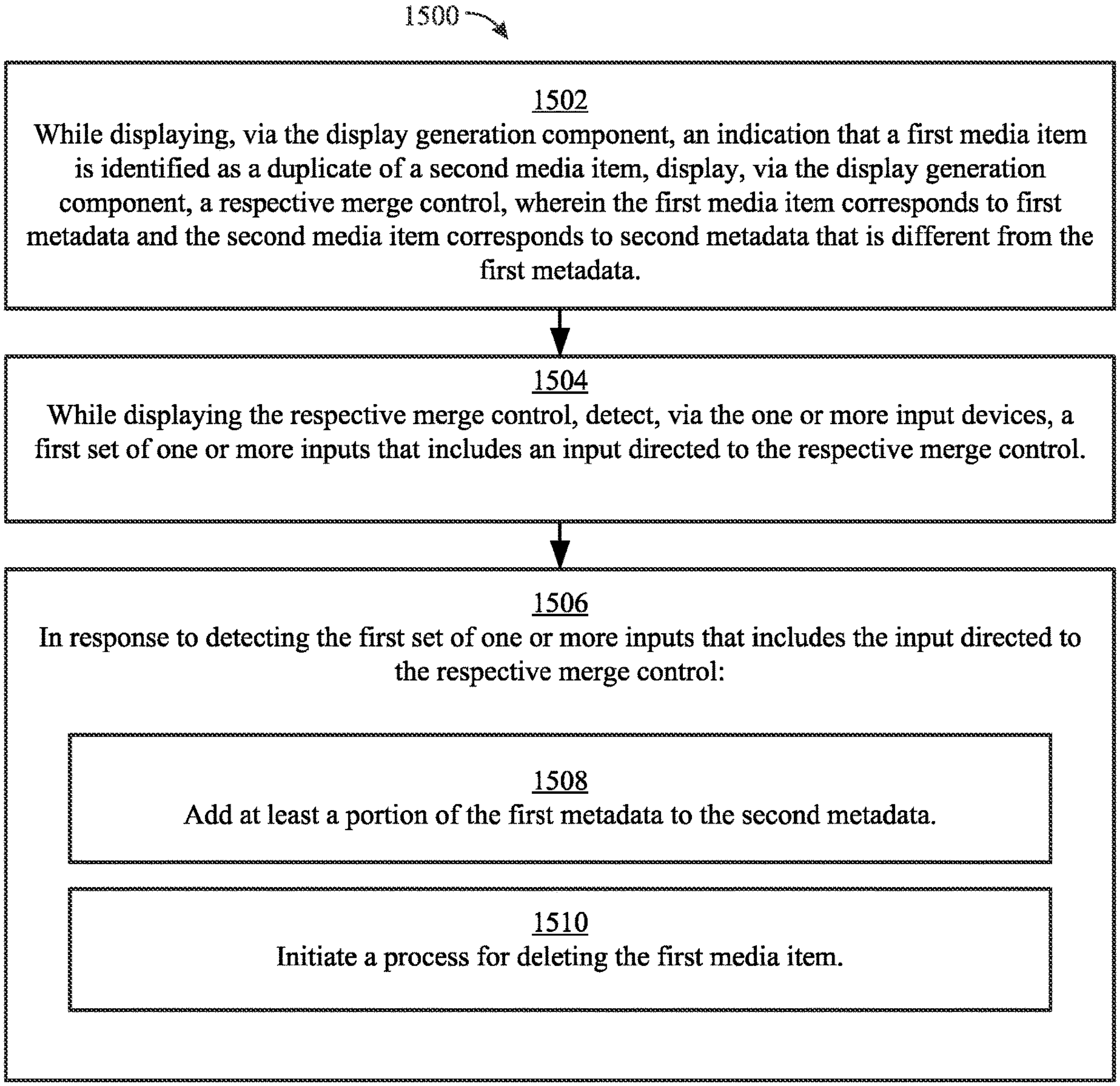

*FIG. 15*

USER INTERFACES FOR MANAGING MEDIA LIBRARIES

CROSS-REFERENCE TO RELATED APPLICATIONS

This application claims priority to U.S. Provisional Patent Application No. 63/349,145, entitled "USER INTERFACES FOR MANAGING MEDIA LIBRARIES," filed on Jun. 5, 2022, and U.S. Provisional Patent Application Ser. No. 63/340,410, entitled "USER INTERFACES FOR MANAGING MEDIA LIBRARIES," filed on May 10, 2022, the contents of which are hereby incorporated by reference in their entireties.

FIELD

The present disclosure relates generally to computer user interfaces, and more specifically to techniques for managing media libraries.

BACKGROUND

The present disclosure relates generally to computer user interfaces and, more specifically, to techniques for managing media libraries, including personal media libraries and shared media libraries.

BRIEF SUMMARY

Some techniques for managing media libraries using computer systems and/or electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing media libraries. Such methods and interfaces optionally complement or replace other methods for managing media libraries. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises, at a computer system that is in communication with a display generation component: detecting a request to share media items from a first collection of media items with a set of one or more users; and in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a request to share media items from a first collection of media items with a set of one or more users; and in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a request to share media items from a first collection of media items with a set of one or more users; and in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a computer system configured to communicate with a display generation component is described. The computer system comprises one or more processors; and memory storing one or more programs configured to be executed by the one or more processors, the one or more programs including instructions for: detecting a request to share media items from a first collection of media items with a set of one or more users; and in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a computer system configured to communicate with a display generation component is described. The computer system comprises: means for detecting a request to share media items from a first collection of media items with a set of one or more users; and means for, in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a computer program product is described. The computer program product comprises one or more programs configured to be executed by one or more processors of a computer system that is in communication with a display generation component, the one or more programs including instructions for: detecting a request to share media items from a first collection of media items with a set of one or more users; and in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein the plurality of media items that are recommended to be shared with the set of one or more users includes: a first set of one or more media items that correspond to a first event at which at least one user in the set of one or more users is determined to have been present, wherein the first event occurred during a first period of time; and a second set of one or more media items that correspond to a second event at least one user in the set of one or more users is determined to have been present, wherein the second event occurred during a second period of time that is different from the first period of time.

In accordance with some embodiments, a method is described. The method comprises, at a computer system that is in communication with a display generation component: detecting a request concerning a change event corresponding to a collection of media items that is shared between multiple users; and in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a request concerning a change event corresponding to a collection of media items that is shared between multiple users; and in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a request concerning a change event corresponding to a collection of media items that is shared between multiple users; and in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a computer system is described. The computer system is configured to communicate with a display generation component and comprises one or more processors; and memory storing one or more programs configured to be executed by the one or more processors, the one or more programs including instructions for: detecting a request concerning a change event corresponding to a collection of media items that is shared between multiple users; and in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a computer system is described. The computer system is configured to communicate with a display generation component and comprises: means for detecting a request concerning a change event corresponding to a collection of media items that is shared between multiple users; and means for, in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a computer program product is described. The computer program product comprises one or more programs configured to be executed by one or more processors of a computer system configured to communicate with a display generation component, the one or more programs including instructions for: detecting a request concerning a change event corresponding to a collection of media items that is shared between multiple users; and in response to detecting the request concerning the change event corresponding to the collection of media items that is shared between the multiple users: in accordance with a determination that a set of notification criteria are satisfied, wherein the set of notification criteria includes a criterion that is satisfied when the change event is a first type of change event, displaying, via the display generation component, an indication that the change event corresponding to the collection of media items has been detected; and in accordance with a determination that the set of notification criteria are not satisfied, forgoing displaying the indication that the change event corresponding to the collection of media items has been detected.

In accordance with some embodiments, a method is described. The method comprises, at a computer system that is in communication with a display generation component and one or more cameras: while displaying, via the display generation component, a representation of a field-of-view of the one or more cameras, detecting a request to capture media corresponding to the field-of-view of the one or more cameras; in response to detecting the request to capture the media corresponding to the field-of-view of the one or more cameras, capturing a media item corresponding to the field-of-view of the one or more cameras; and after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while displaying, via the display generation component, a representation of a field-of-view of the one or more cameras, detecting a request to capture media corresponding to the field-of-view of the one or more cameras; in response to detecting the request to capture the media corresponding to the field-of-view of the one or more cameras, capturing a media item corresponding to the field-of-view of the one or more cameras; and after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while displaying, via the display generation component, a representation of a field-of-view of the one or more cameras, detecting a request to capture media corresponding to the field-of-view of the one or more cameras; in response to detecting the request to capture the media corresponding to the field-of-view of the one or more cameras, capturing a media item corresponding to the field-of-view of the one or more cameras; and after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a computer system configured to communicate with a display generation component and one or more cameras is described. The computer system comprises one or more processors; and memory storing one or more programs configured to be executed by the one or more processors, the one or more programs including instructions for: while displaying, via the display generation component, a representation of a field-of-view of the one or more cameras, detecting a request to capture media corresponding to the field-of-view of the one or more cameras; in response to detecting the request to capture the media corresponding to the field-of-view of the one or more cameras, capturing a media item corresponding to the field-of-view of the one or more cameras; and after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a computer system configured to communicate with a display generation component and one or more cameras is described. The computer system comprises: means for, while displaying, via the display generation component, a representation of a field-of-view of the one or more cameras, detecting a request to capture media corresponding to the field-of-view of the one or more cameras; means for, in response to detecting the request to capture the media corresponding to the field-of-view of the one or more cameras, capturing a media item corresponding to the field-of-view of the one or more cameras; and means for, after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a computer program product is described. The computer program product comprises one or more programs configured to be executed by one or more processors of a computer system that is in communication with a display generation component and one or more cameras, the one or more programs including instructions for: while displaying, via the display generation component, a representation of a field-of-view of the one or more cameras, detecting a request to capture media corresponding to the field-of-view of the one or more cameras; in response to detecting the request to capture the media corresponding to the field-of-view of the one or more cameras, capturing a media item corresponding to the field-of-view of the one or more cameras; and after capturing the media item corresponding to the field-of-view of the one or more cameras and in accordance with a determination that the computer system is configured to share a collection of media items with a set of one or more other users: in accordance with a determination that a set of media-sharing criteria is satisfied, automatically adding the media item to a shared collection of media items; and in accordance with a determination that the set of media-sharing criteria is not satisfied, automatically adding the media item to a personal collection of media items without adding the media item to the shared collection of media items.

In accordance with some embodiments, a method is described. The method comprises, at a computer system that is in communication with one or more output devices: while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a non-transitory computer-readable storage medium is described. The non-transitory computer-readable storage medium storing one or more programs configured to be executed by one or more processors of a computer system that is in communication with one or more output devices, the one or more programs including instructions for: while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a transitory computer-readable storage medium is described. The transitory computer-readable storage medium stores one or more programs configured to be executed by one or more processors of a computer system that is in communication with one or more output devices, the one or more programs including instructions for: while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a computer system configured to communicate with one or more output devices is described. The computer system comprises one or more processors; and memory storing one or more programs configured to be executed by the one or more processors, the one or more programs including instructions for: while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a computer system configured to communicate with one or more output devices is described. The computer system comprises: means for, while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a computer program product is described. The computer program product comprises one or more programs configured to be executed by one or more processors of a computer system that is in communication with one or more output devices, the one or more programs including instructions for: while the user of the computer system is sharing a collection of media items with a set of one or more users that are different from the user of the computer system: in accordance with a determination that a set of notification criteria is satisfied, wherein the set of notification criteria includes a criterion that is satisfied when a determination is made that additional media items in a media library of the user satisfy a set of criteria for sharing in the collection of media items, providing, via the one or more output devices, a respective notification indicating that a respective suggested set of media items is suggested for addition to the collection of media items; and in accordance with a determination that the set of notification criteria is not satisfied, forgoing providing the respective notification indicating that the respective suggested set of media items is suggested for addition to the collection of media items.

In accordance with some embodiments, a method is described. The method comprises: at a computer system that is in communication with a display generation component and one or more input devices: while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; while displaying the respective merge control, detecting, via the one or more input devices, a first set of one or more inputs that includes an input directed to the respective merge control; and in response to detecting the first set of one or more inputs that includes the input directed to the respective merge control: adding at least a portion of the first metadata to the second metadata; and initiating a process for deleting the first media item.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; while displaying the respective merge control, detecting, via the one or more input devices, a first set of one or more inputs that includes an input directed to the respective merge control; and in response to detecting the first set of one or more inputs that includes the input directed to the respective merge control: adding at least a portion of the first metadata to the second metadata; and initiating a process for deleting the first media item.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; while displaying the respective merge control, detecting, via the one or more input devices, a first set of one or more inputs that includes an input directed to the respective merge control; and in response to detecting the first set of one or more inputs that includes the input directed to the respective merge control: adding at least a portion of the first metadata to the second metadata; and initiating a process for deleting the first media item.

In accordance with some embodiments, a computer system configured to communicate with a display generation component and one or more input devices is described. The computer system comprises: one or more processors; and memory storing one or more programs configured to be executed by the one or more processors, the one or more programs including instructions for: while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; while displaying the respective merge control, detecting, via the one or more input devices, a first set of one or more inputs that includes an input directed to the respective merge control; and in response to detecting the first set of one or more inputs that includes the input directed to the respective merge control: adding at least a portion of the first metadata to the second metadata; and initiating a process for deleting the first media item.

In accordance with some embodiments, a computer system configured to communicate with a display generation component and one or more input devices is described. The computer system comprises: means for, while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; means for, while displaying the respective merge control, detecting, via the one or more input devices, a first set of one or more inputs that includes an input directed to the respective merge control; and means for, in response to detecting the first set of one or more inputs that includes the input directed to the respective merge control: adding at least a portion of the first metadata to the second metadata; and initiating a process for deleting the first media item.

In accordance with some embodiments, a computer program product is described. The computer program product comprises one or more programs configured to be executed by one or more processors of a computer system that is in communication with a display generation component and one or more input devices, the one or more programs including instructions for: while displaying, via the display generation component, an indication that a first media item is identified as a duplicate of a second media item, displaying, via the display generation component, a respective merge control, wherein the first media item corresponds to first metadata and the second media item corresponds to second metadata that is different from the first metadata; while displaying the respective merge control, detecting, via the one or more input devices, a first set of one or more inputs that includes an input directed to the respective merge control; and in response to detecting the first set of one or more inputs that includes the input directed to the respective merge control: adding at least a portion of the first metadata to the second metadata; and initiating a process for deleting the first media item.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing media libraries, thereby increasing the effectiveness, efficiency, and user satisfaction with such devices. Such methods and interfaces may complement or replace other methods for managing media libraries.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A1-7U illustrate exemplary user interfaces for notifying participants of changes to one or more media libraries using a computer system in accordance with some embodiments.

FIG. 12 is a flow diagram illustrating methods for managing captured media for one or more media libraries using a computer system in accordance with some embodiments.

FIG. 13 is a flow diagram illustrating methods for recommending media items for one or more media libraries using a computer system in accordance with some embodiments.

FIG. 15 is a flow diagram illustrating methods for managing duplicate media in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media libraries. For example, users of electronic devices need to manage media libraries in an efficient, secure, and safe manner while also being able to share some media content with other users. Such techniques can reduce the cognitive burden on a user who manages media libraries, thereby enhancing productivity. Further, such techniques can reduce processor and battery power otherwise wasted on redundant user inputs.

Figure 8:
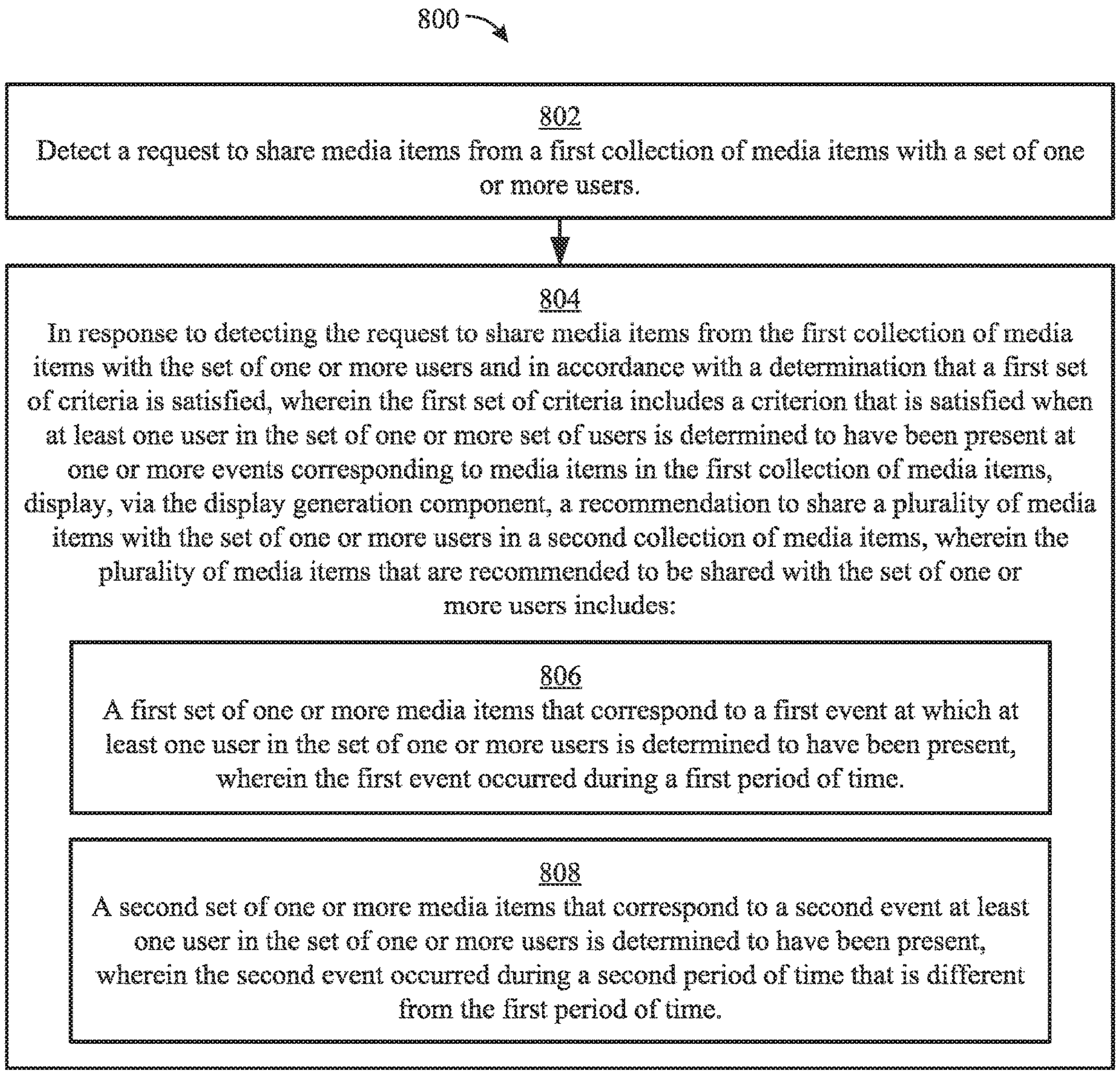
FIG. 8 is a flow diagram illustrating methods for managing one or more media libraries using a computer system in accordance with some embodiments.
Figure 9:
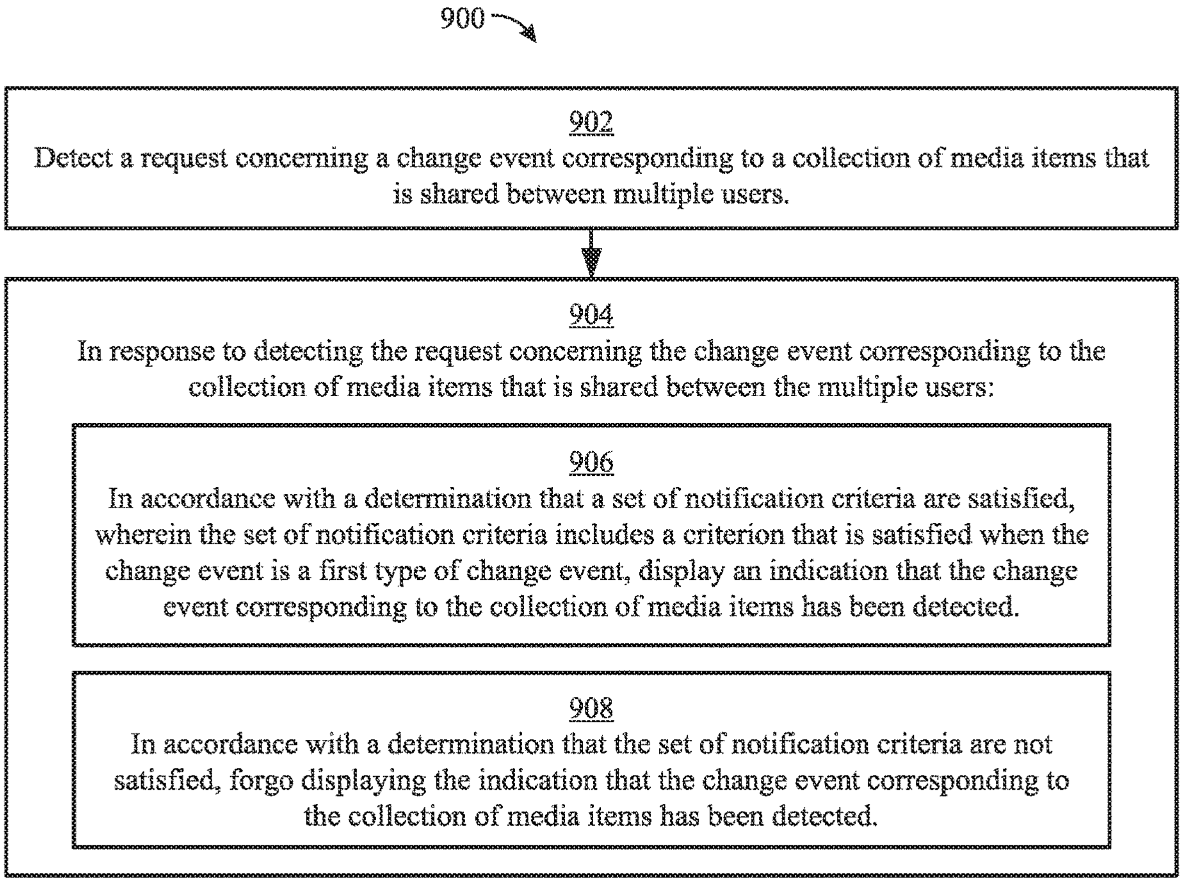
FIG. 9 is a flow diagram illustrating methods for notifying participants of changes to one or more media libraries using a computer system in accordance with some embodiments.

Below, FIGS. 1A-1B, 2, 3, 4A-4B, and 5A-5B provide a description of exemplary devices for performing the techniques for managing media libraries. FIGS. 6A-6AO illustrate exemplary user interfaces for managing one or more media libraries using a computer system in accordance with some embodiments. FIGS. 7A1-7U illustrate exemplary user interfaces for notifying participants of changes to one or more media libraries using a computer system in accordance with some embodiments. FIG. 8 is a flow diagram illustrating methods for managing one or more media libraries using a computer system in accordance with some embodiments. FIG. 9 is a flow diagram illustrating methods for notifying participants of changes to one or more media libraries using a computer system in accordance with some embodiments. The user interfaces in FIGS. 6A-6AO and FIGS. 7A1-7U are used to illustrate the processes described below, including the processes in FIGS. 8-9. FIGS. 10A-10N illustrate exemplary user interfaces for managing captured media for one or more media libraries using a computer system in accordance with some embodiments. FIG. 12 is a flow diagram illustrating methods for managing captured media for one or more media libraries using a computer system in accordance with some embodiments. The user interfaces in FIGS. 10A-10N are used to illustrate the processes described below, including the processes in FIG. 12. FIGS. 11A-11L illustrate exemplary user interfaces for recommending media items for one or more media libraries using a computer system in accordance with some embodiments. FIG. 13 is a flow diagram illustrating methods for recommending media items for one or more media libraries using a computer system in accordance with some embodiments. The user interfaces in FIGS. 11A-11L are used to illustrate the processes described below, including the processes in FIG. 13. FIGS. 14A-14M illustrate exemplary user interfaces for managing duplicate media in accordance with some embodiments. FIG. 15 is a flow diagram illustrating methods for managing duplicate media in accordance with some embodiments. The user interfaces in FIGS. 14A-14M are used to illustrate the processes described below, including the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, enhancing privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
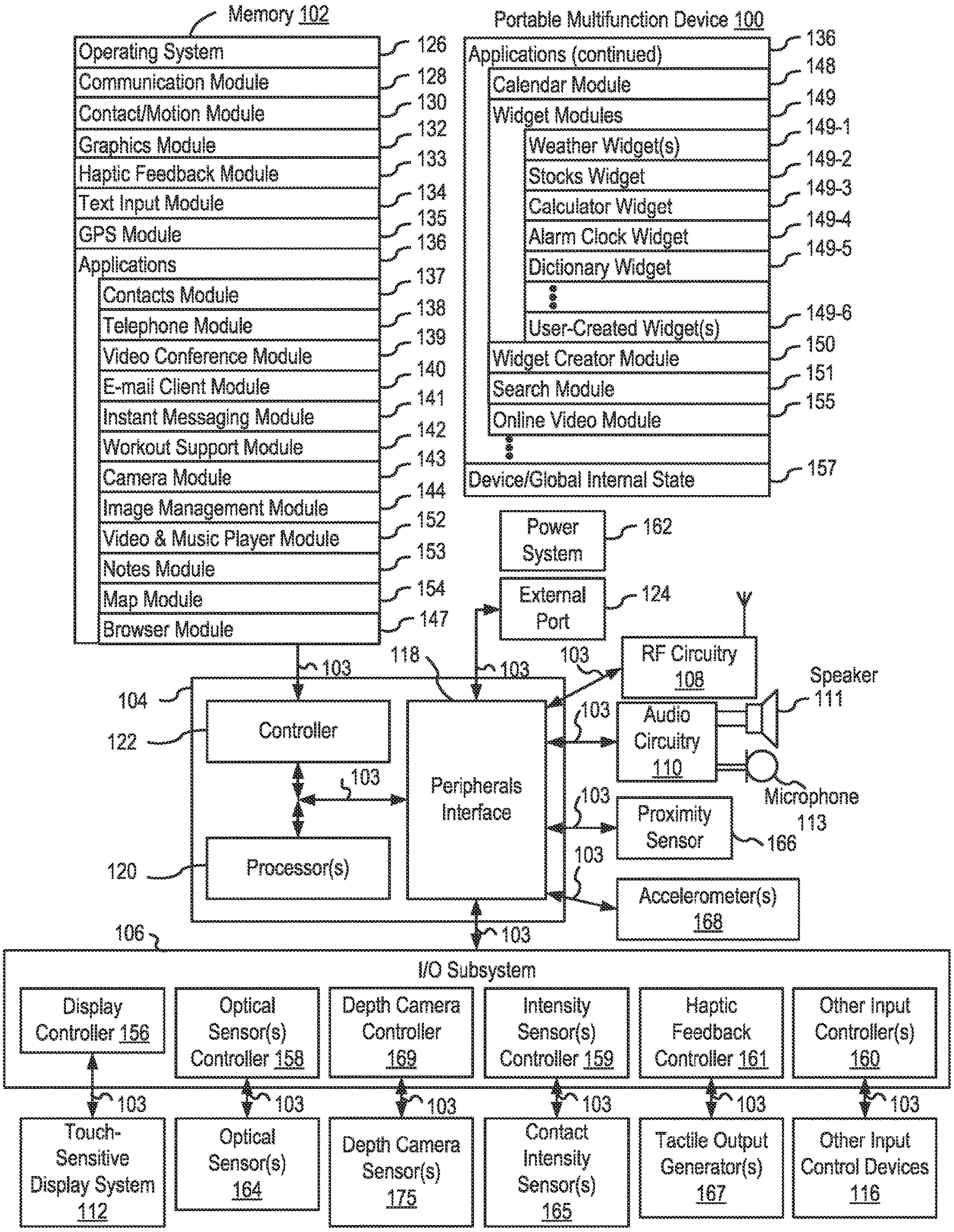
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three-dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
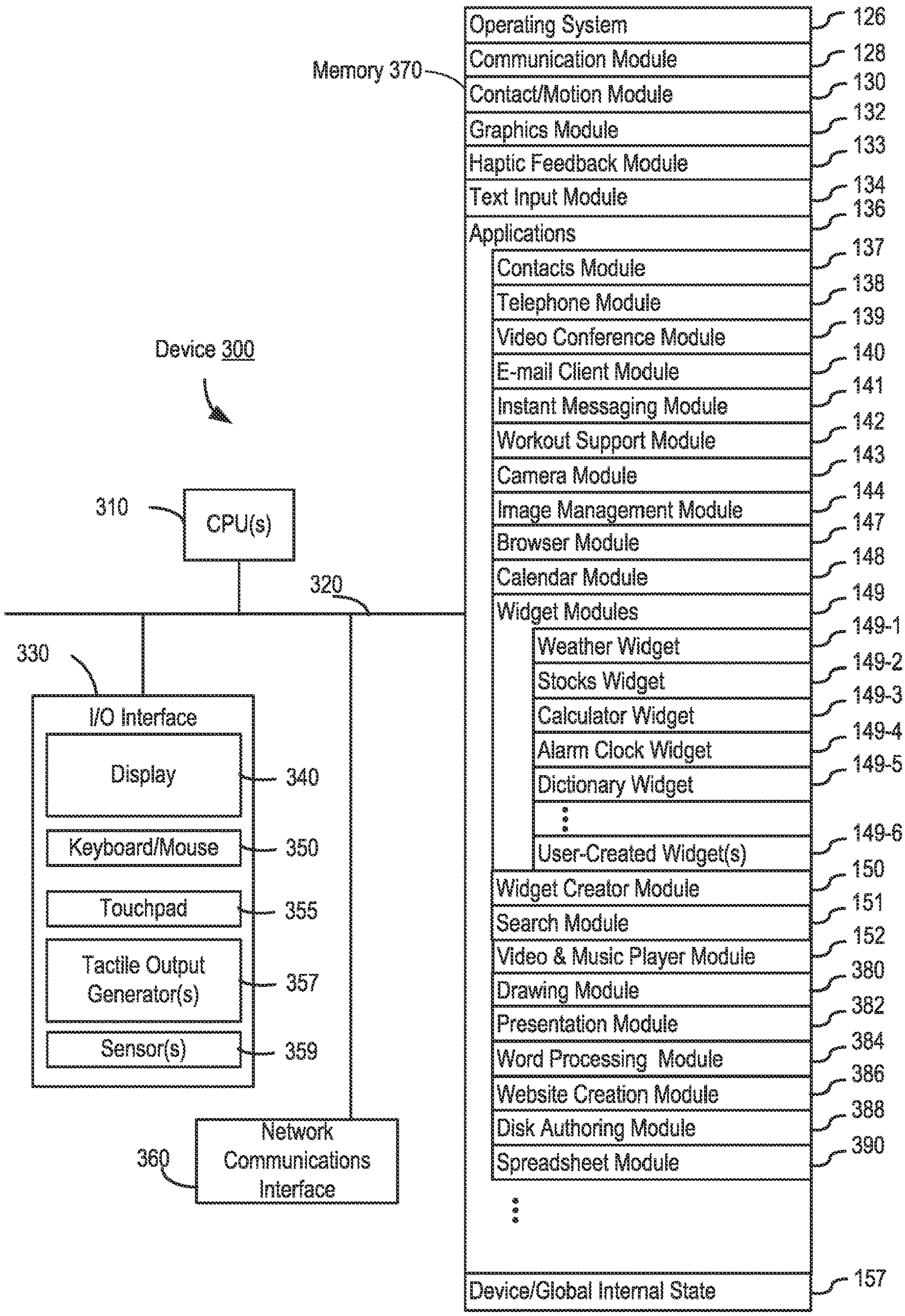
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
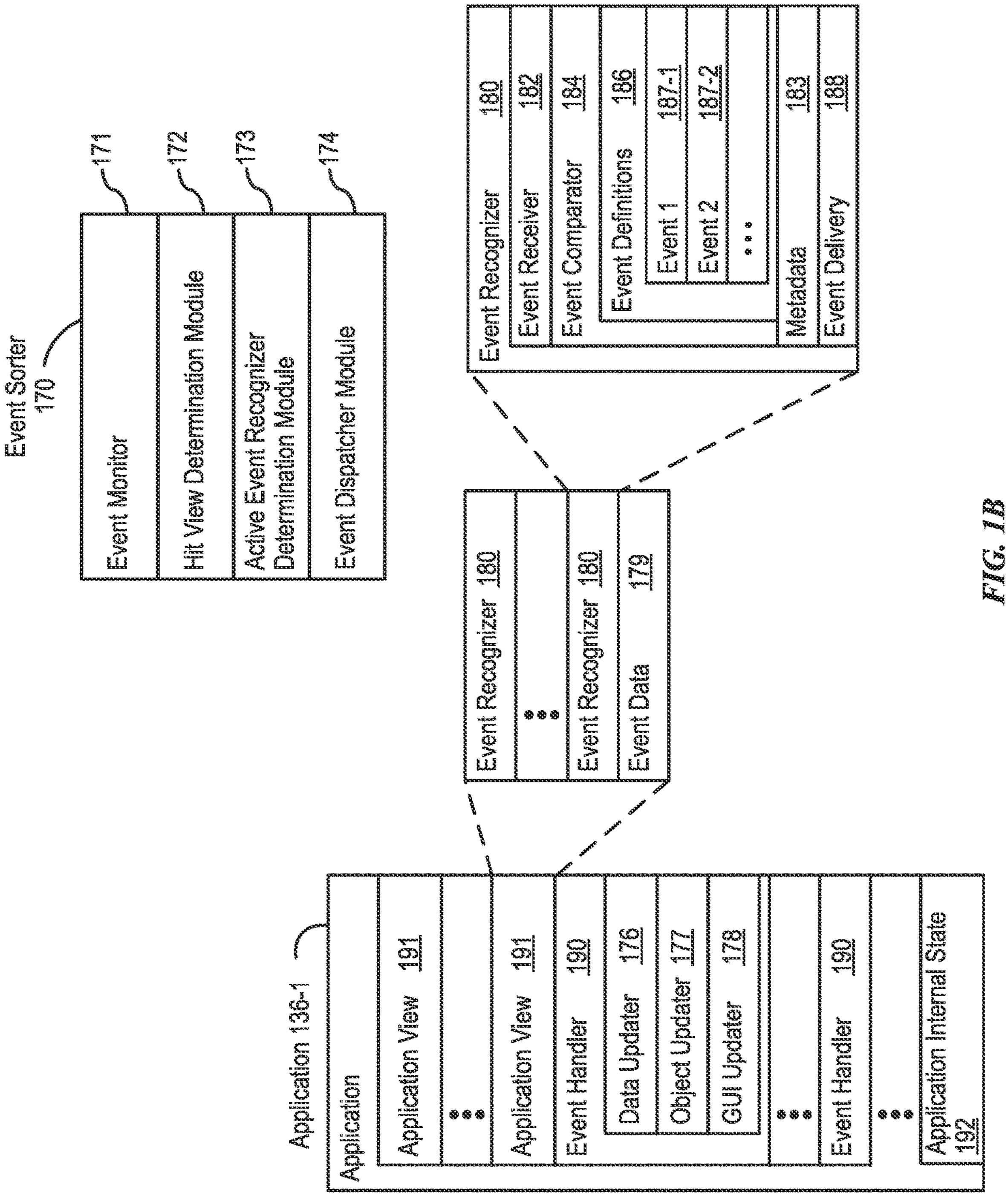
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
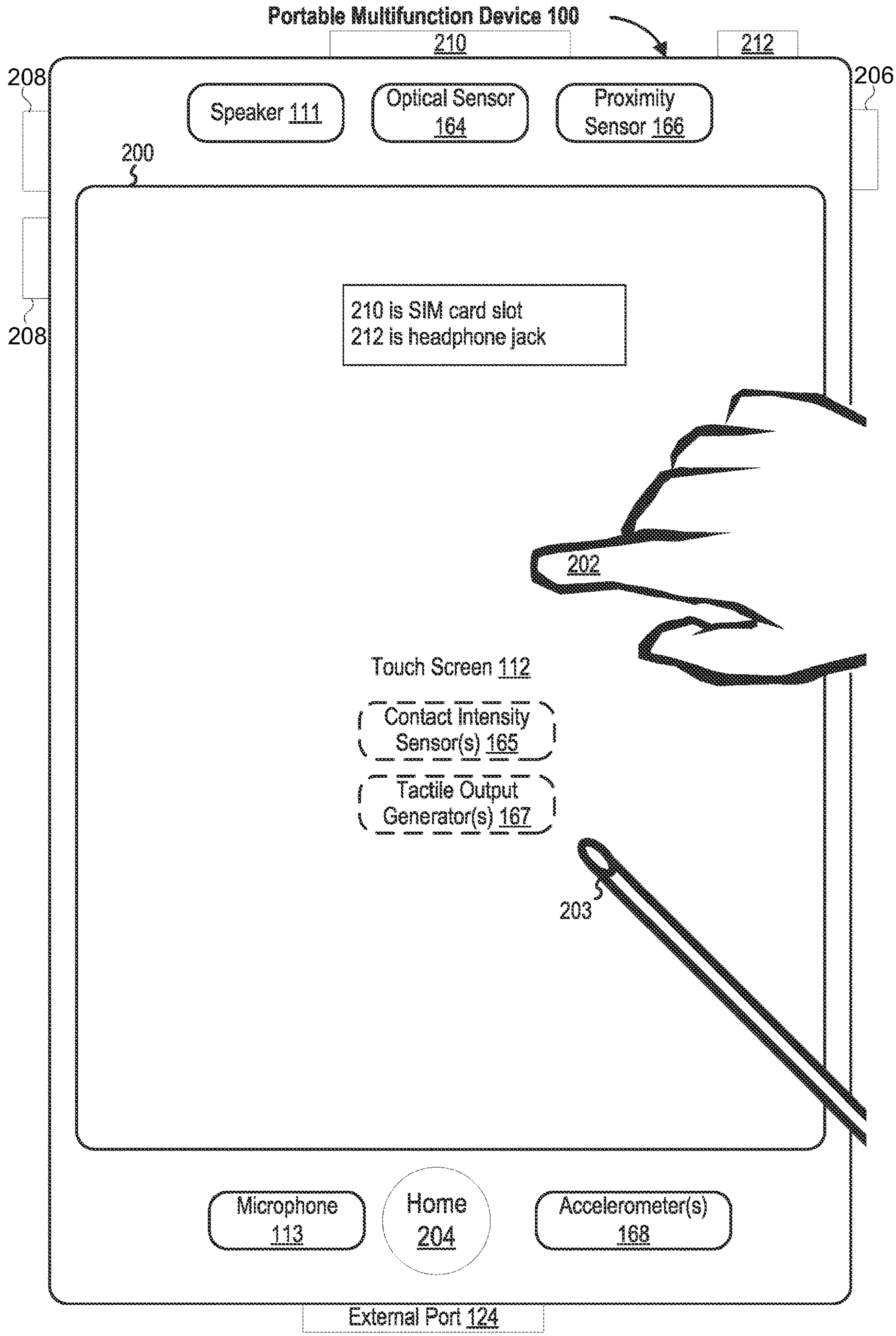
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
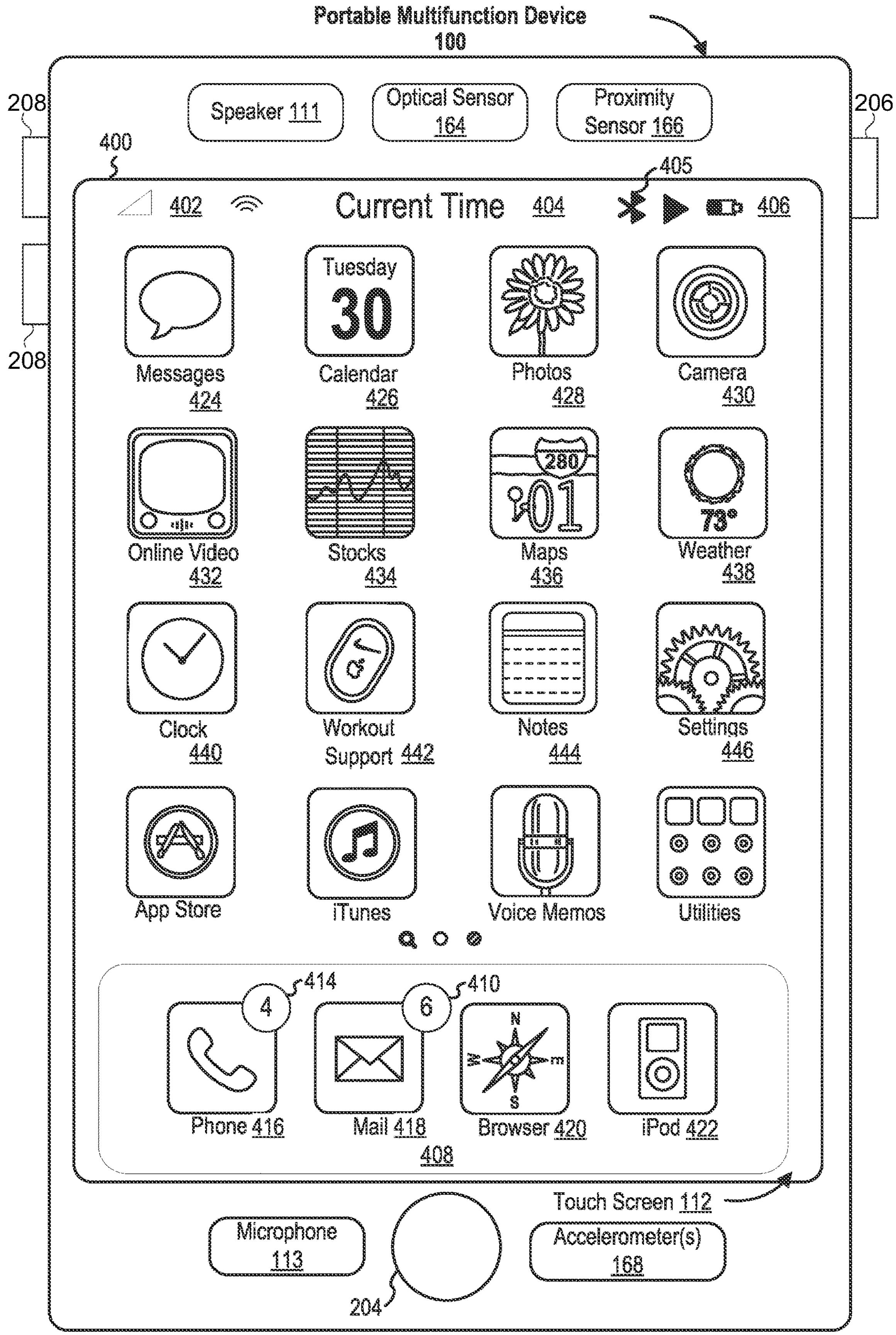
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
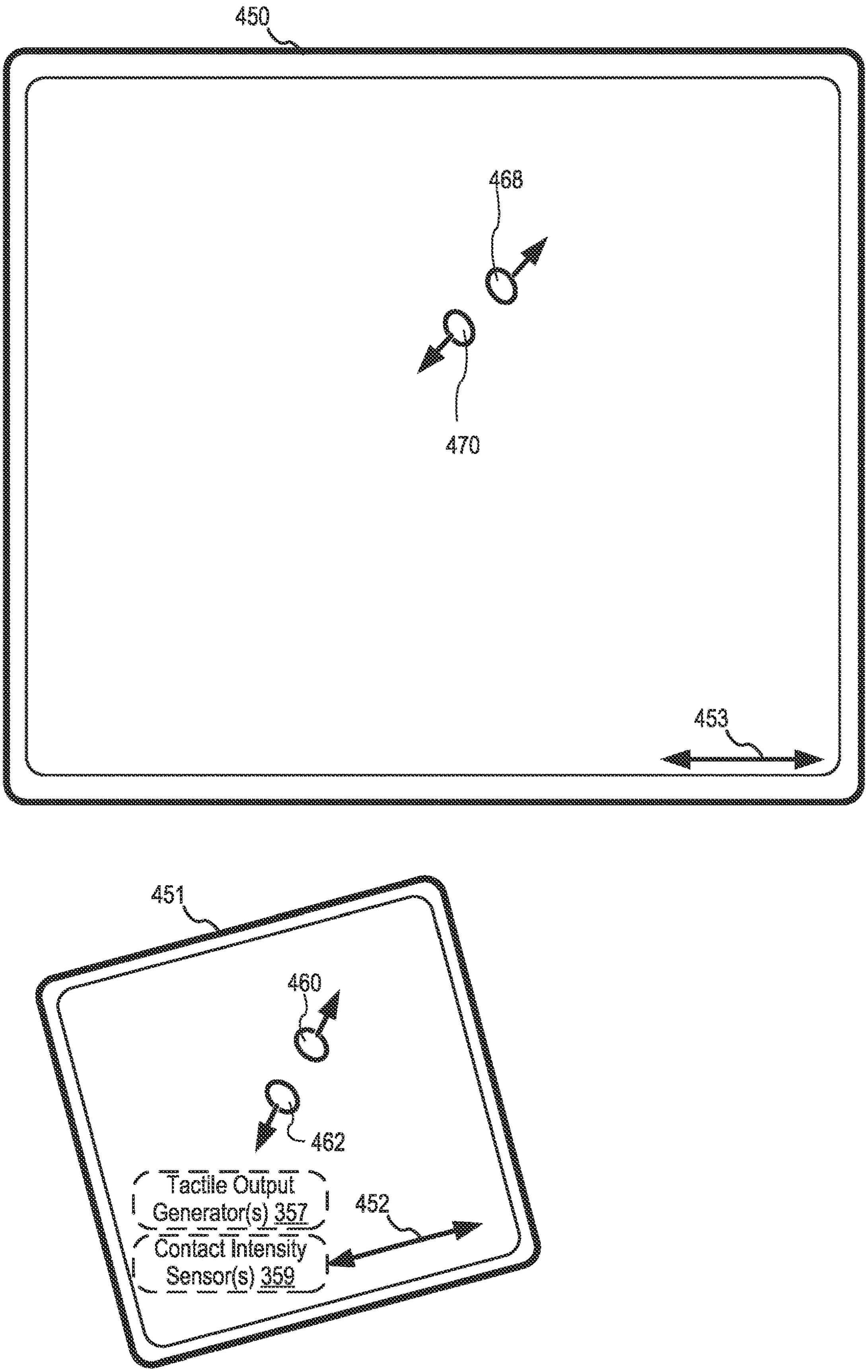
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
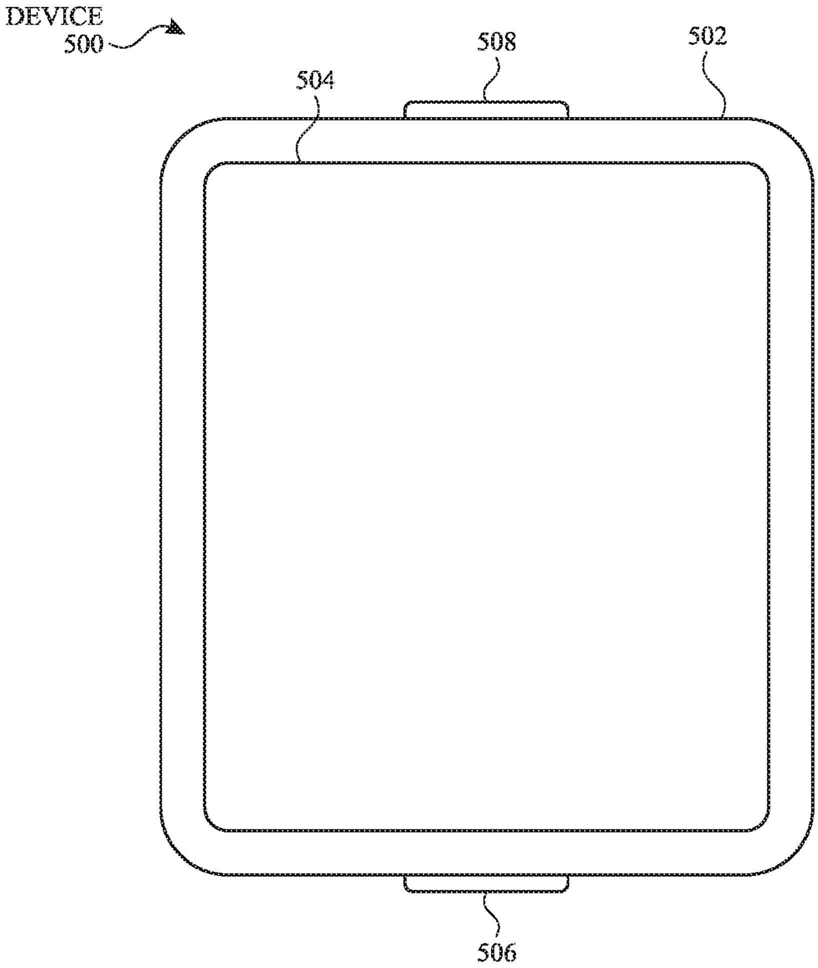
FIG. 5A illustrates a personal electronic device in accordance with some embodiments.
Figure 6A:
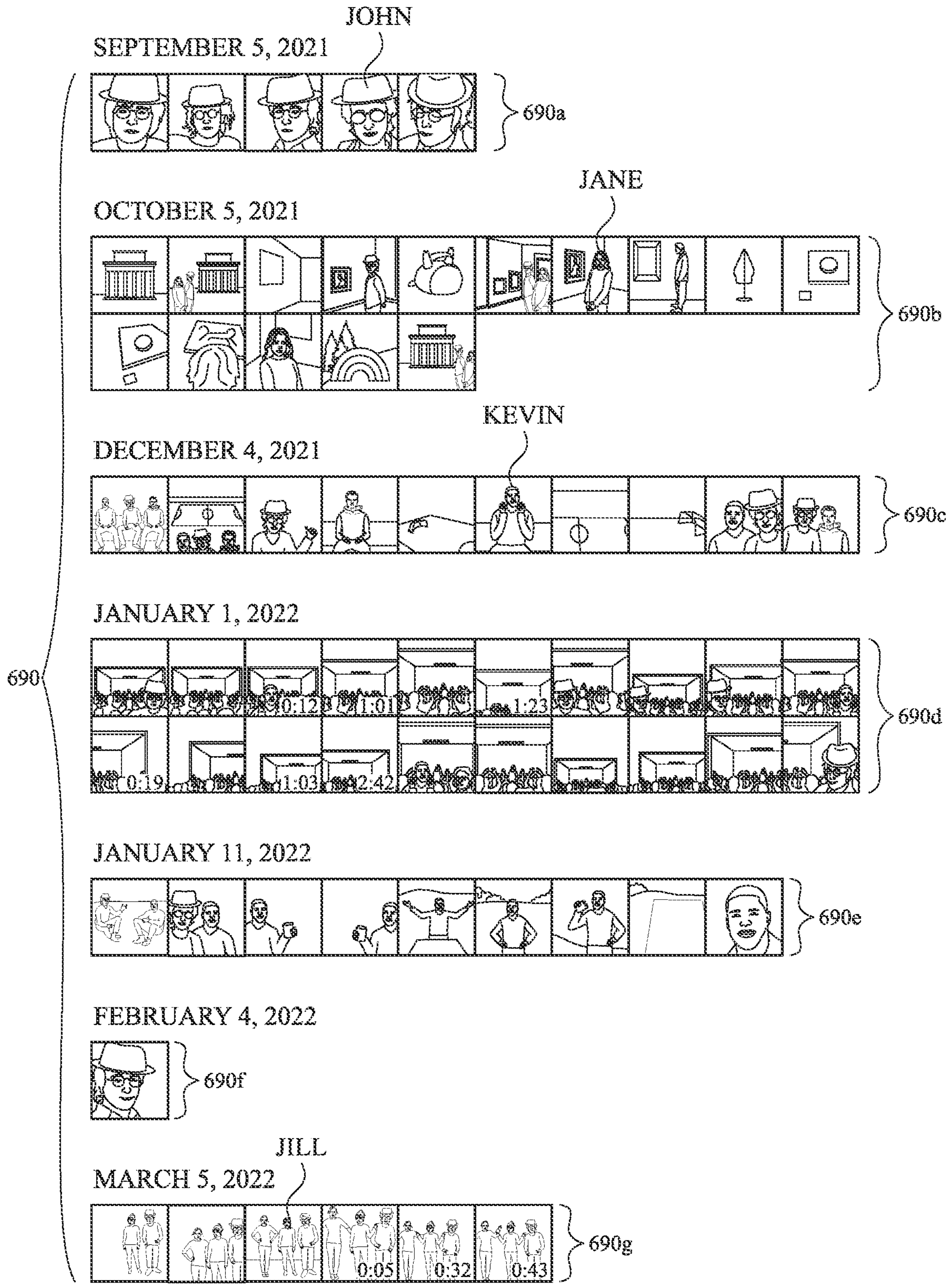
FIGS. 6A-6AO illustrate exemplary user interfaces for managing one or more media libraries using a computer system in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
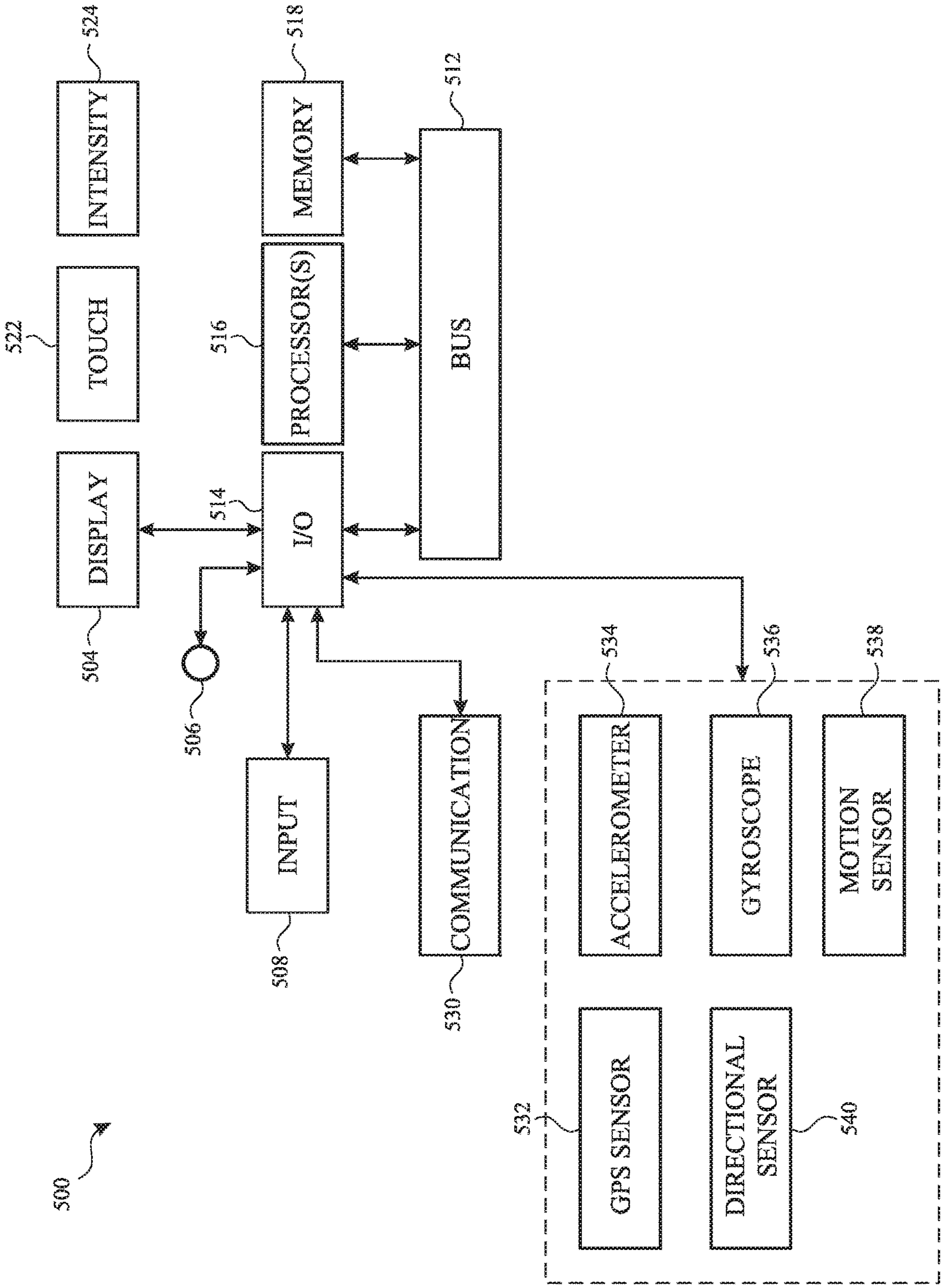
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 900, 1200, 1300, and 1500 (FIGS. 8, 9, 12, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AO illustrate exemplary user interfaces for managing one or more media libraries using a computer system in accordance with some embodiments. The user interfaces in these figures are used to illustrate the processes described below, including the processes in FIGS. 8, 9, 12, and 13.

FIG. 6A illustrates an exemplary set of media items 690 that are stored in a personal library belonging to John. As used herein, the term "personal library" is a collection of media items that is associated with a user of a particular computer system (e.g., computer system 600, which is described in further detail below in FIG. 6A). For purposes of the discussion provided herein, John is the user that is associated with (e.g., via a user account) computer system 600, and John's personal library is accessible via computer system 600. Other people, such as Kevin, Jane, and Jill (discussed below), have access to and privileges for (e.g., to modify, read, delete, and/or add media items) the media items in their own personal libraries but do not have access to and privileges for the media items in John's personal library. As used herein, the term "shared library" is a collection of media items that is associated with multiple people (and/or participants). When a shared library is shared with one or more participants, the organizer of the shared library and the one or more participants have access to and privileges for (e.g., to modify, read, delete, and/or add media items) the shared library (e.g., after agreeing to be a participant of the shared library). In some embodiments, the "organizer" of the shared library is a person who initially created the shared library. In some embodiments, a "participant" in the shared library is a person with whom the shared library is shared. In some embodiments, a person can be an organizer and a participant in the shared library.

As illustrated in FIG. 6A, media items 690 include media items 690*a*, media items 690*b*, media items 690*c*, media items 690*d*, media items 690*e*, media item 690*f*, and media items 690*g*. Media items 690*a* are photos of John (e.g., the user of computer system 600 and were captured on Sep. 5, 2021. Media items 690*b* are photos from a trip to the museum that John and Jane attended on Oct. 5, 2021. Some of media items 690*b* are photos of portions of the museum and do not include any of John and Jane while some of media items 690*b* are photos that include John and/or Jane. Media items 690*c* are photos from a soccer game that Kevin and John attended on Dec. 4, 2021. Some of media items 690*c* do not include any of John and Kevin while some of media items 690*c* include John and/or Kevin. Media items 690*d* are photos and videos from a concert that Kevin and John attended on Jan. 1, 2022. Some of media items 690*d* do not include any of John and Kevin while some of media items 690*d* include Kevin and/or John. Media items 690*e* are photos from a picnic that John and Kevin attended on Jan. 11, 2022. Some of media items 690*e* do not include any of John and Kevin while some of media items 690*e* include John and/or Kevin. Media item 690*f* is a photo of John that was taken on Feb. 4, 2022, and was not captured while John was attending an event with another person. Media items 690*g* are photos and videos from a media shoot that John and Jill attended and that were taken on Mar. 5, 2022. Some of media items 690*g* do not include any of John and Jill while some of media items 690*g* include John and/or Jill. It should be understood that media items 690 are provided to make the explanation that follows easier. It should be also understood that other media items exist in John's personal library besides media items 690. However, for the purposes of discussion below, there are no media items in John's personal library that include Jane, Jill, Kevin, or Valeria (e.g., discussed below) from a time earlier than Oct. 5, 2021.

For ease of discussion, media items 690*a*-690*g* correspond to one discrete event (e.g., John taking selfies, a museum trip, a soccer game, a concert, a picnic, and a photo shoot, respectively). In some embodiments, John's personal library includes media items that are different from media items 690. In some embodiments, John's personal library includes media items that were captured at different events from the events described above in relation to media items 690. In some embodiments, John's personal library includes media items that were captured on the same day as one or more of media items 690. For example, in some embodiments, media items from a meeting at the coffee shop that were captured on Dec. 4, 2021, are in John's personal library along with media items 690*c*, which were also captured on Dec. 4, 2021. In some embodiments, the media items captured at the coffee shop are registered by a computer system as corresponding to a different event than the soccer game. In some embodiments, an event is determined based on a collection of media items being captured at the same location (and/or within a geofenced boundary) during a range of time (e.g., all photos taken within 100 yards of a given location within a six-hour period). In some embodiments, the media items in a collection of media items associated with an event are included based on a determination that one or more (or all) of the media items were captured at a particular location (and/or within a geofenced boundary) within a predetermined amount of time of a preceding media item (e.g., immediately) being captured (e.g., to avoid large gaps in time between the media items in the collection of media items). In some embodiments, the media items associated with the event are included based on a determination that one or more respective people (e.g., people identified in FIG. 6F) attended the event while the media items were captured. In some embodiments, the determination is made that a respective person attended an event based on determining the location of John's computer system (e.g., the computer system capturing media) relative to the location of a computer system that is associated with the respective person.

Figure 6C:
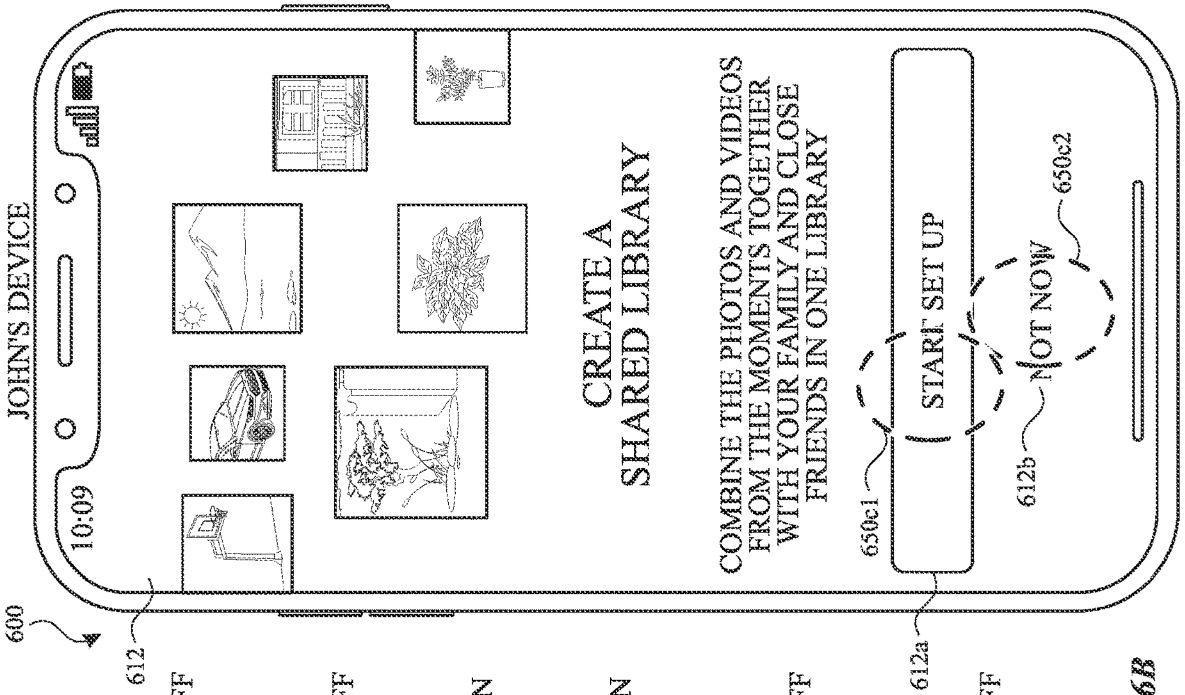
Figure 6B:
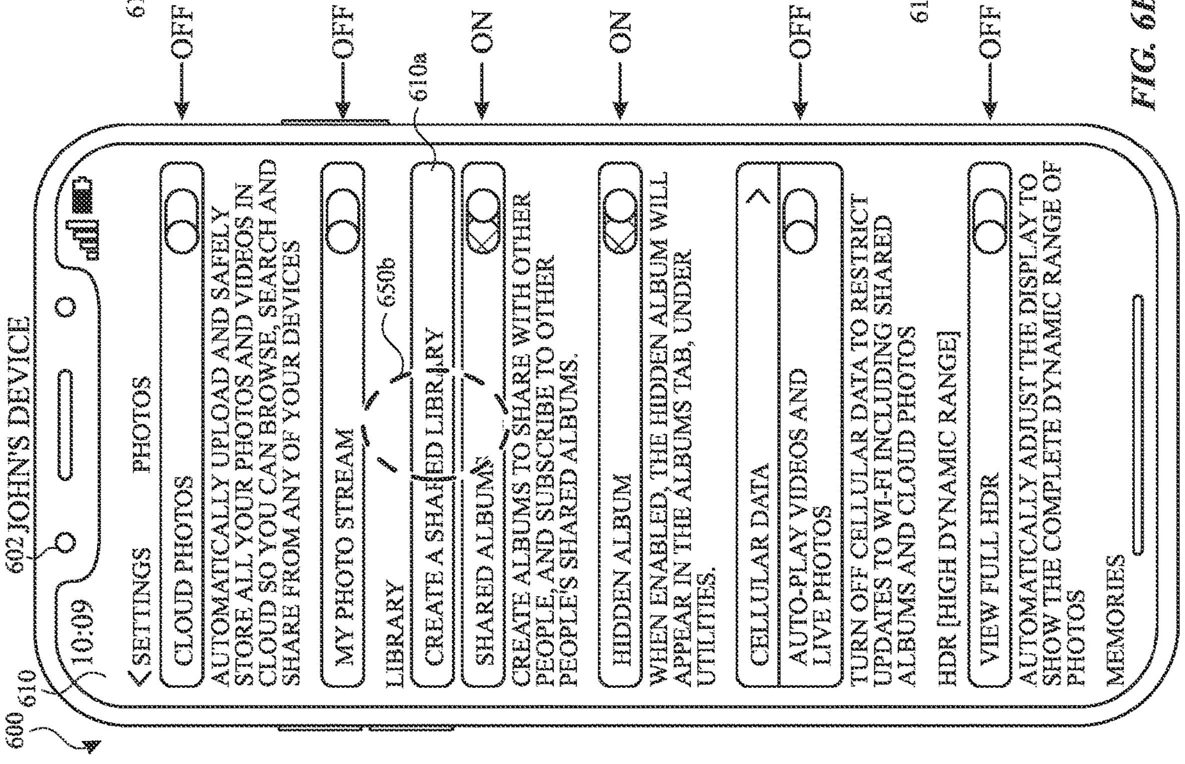

FIG. 6B illustrates computer system 600 displaying settings user interface 610. Settings user interface 610 includes multiple settings that control how computer system 600 manages media items, such as photos and/or videos. As illustrated in FIG. 6B, computer system 600 displays create-shared-library setting 610*a* as a part of the multiple settings. At FIG. 6B, computer system 600 detects tap input 650*b* on create-shared-library setting 610*a*. It should be understood that one or more inputs described herein as a particular type of input, such as a tap input, press-and-hold input, and/or swipe input, could alternatively be replaced with another input. In some embodiments, an input described as a tap input could be replaced with a press-and-hold input, a swipe input, a mouse click input, a left click input, or an air gesture input. In some embodiments, a press-and-hold input could be replaced with a tap input, a swipe input, a mouse click and hold input, an option click input, a right click input, or an alternate air gesture input. In some embodiments, a swipe input could be replaced with a tap input, a press-and-hold input, and/or a mouse click and drag input, or an alternate air gesture input.

At FIG. 6C, in response to detecting tap input 650*b* on create-shared-library setting 610*a*, computer system 600 initiates a process for creating a shared library. As illustrated in FIG. 6C, as a part of initiating the process for creating the shared library, computer system 600 displays create-shared-library user interface 612. Create-shared-library user interface 612 includes a prompt (e.g., "Create a Shared Library") that invites a user of the computer system to create a shared library. Create-shared-library user interface 612 also includes start control 612*a* and skip control 612*b* (e.g., "Not Now"). At FIG. 6C, computer system 600 detects tap input 650*c*1 on start control 612*a* or tap input 650*c*2 on skip control 612*b*. In some embodiments, in response to detecting tap input 650*c*2 on skip control 612*b*, computer system 600 ends the process for creating the shared library and displays the user interface of FIG. 6AL (or FIG. 6B), which is described in further detail below. In some embodiments, computer system 600 includes one or more features of device 100, device 300, and/or device 500.

Figure 6E:
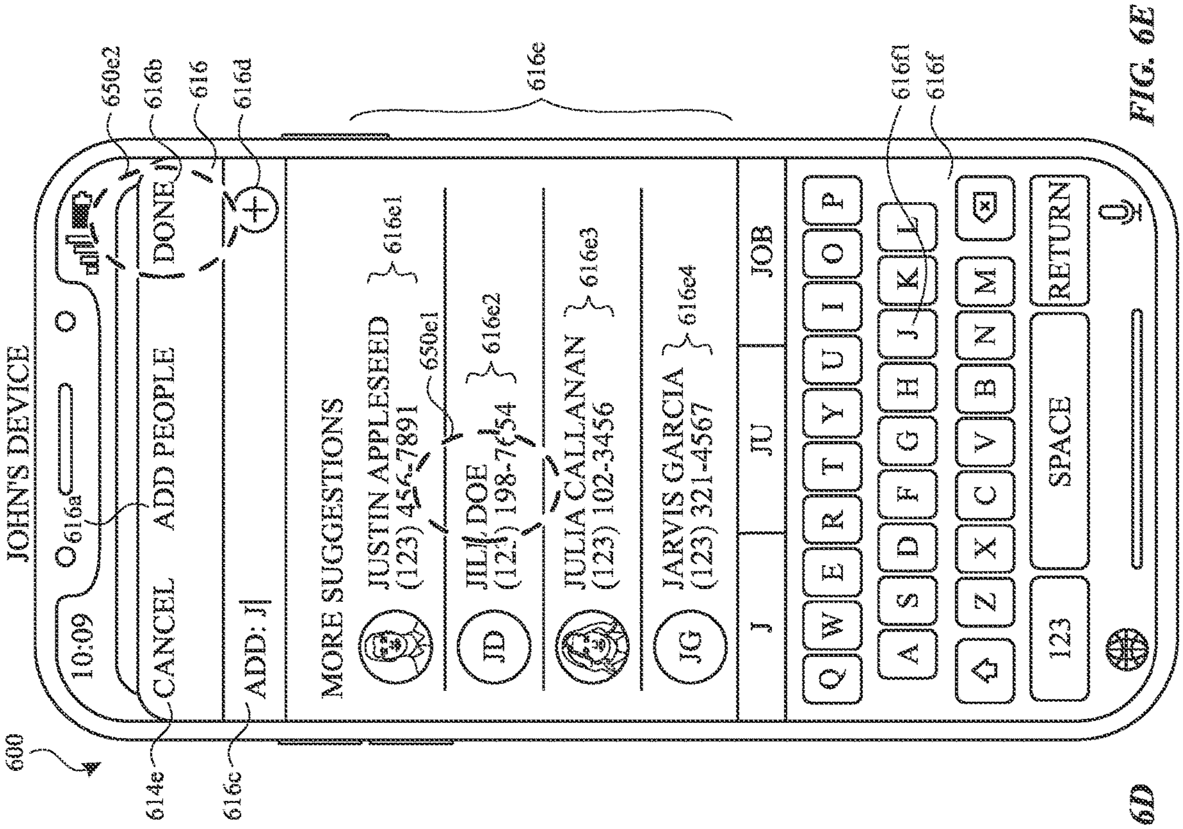
Figure 6D:
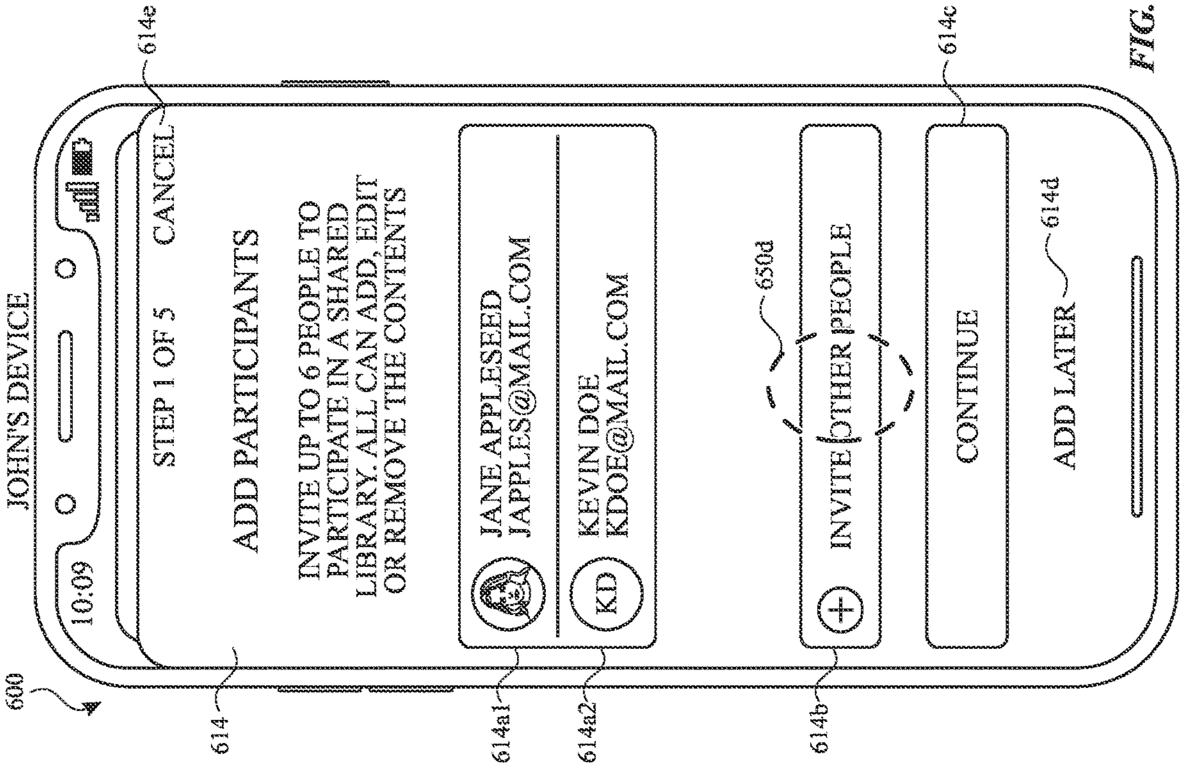

As illustrated in FIG. 6D, in response to detecting tap input 650*c*1 on start control 612*a*, computer system 600 displays add-participants-to-shared-library user interface 614. Add-participants-to-shared-library user interface 614 includes participant control 614*a*1, participant control 614*a*2, invite-other-participants control 614*b*, continue control 614*c*, skip control 614*d* (e.g., "Add Later"), and cancel control 614*e*. Participant control 614*a*1 indicates that "Jane Appleseed" (e.g., "Jane"), a person with the e-mail address of "japples@mail.com," will be a participant in the shared library that is being created (e.g., "the shared library"). Participant control 614*a*2 indicates that "Kevin Doe" (e.g., "Kevin"), a person with the e-mail address of "kdoe@mail.com," will be a participant in the shared library. As discussed above, for the examples provided in FIGS. 6A-6AO, 7A1-7U, 10A-10N, and 11A-11L, the user of computer system 600 (e.g., "John") is the organizer of the shared library, and Jane and Kevin are configured to be, at FIG. 6D, participants in the shared library. At FIG. 6D, computer system 600 automatically displays participant control 614*a*1 and/or automatically recommends (or lists) Jane as a participant of the shared library because a determination has been made that Jane is a family member of John, the organizer of the shared library. In some embodiments, computer system 600 identifies Jane as a family member of John via one or more contact cards, information input into a computer system by Jane and/or John, and/or based on a determination that John and Jane are associated with a shared family and/or household account. Moreover, at FIG. 6D, computer system 600 automatically displays participant control 614*a*2 and/or automatically recommends Kevin as a participant of the shared library because a determination has been made that Kevin has frequently appeared in media items in John's personal library (e.g., such as media items 690*c*-690*e* in FIG. 6A). In some embodiments, computer system 600 automatically recommendations Kevin as a participant of the shared library because a determination has been made that Kevin is among the people who have appeared in media items (or was present at events) in John's personal library the most (e.g., Kevin appears in media items 690 more than any other person besides John). In some embodiments, computer system 600 automatically displays a respective participant control and/or automatically recommends a respective person to be a participant of the shared library because of a determination is made that the respective person has shared a threshold number of media items (e.g., 10-100 or more media items) in the past with the organizer of the shared library and/or the respective person has shared the most (e.g., or is in the top 5-10 of contacts who share) media items when compared to the media items shared by one or more other people with the organizer of the shared library. In some embodiments, computer system 600 automatically displays a respective participant control and/or automatically recommends a respective person to be a participant of the shared library because of a determination that is made that the threshold number of media items has been shared between the respective person and the organizer of the shared library. Thus, in some embodiments, computer system 600 automatically displays a respective participant control and/or automatically recommends a respective person to be a participant of the shared library based on one or more predetermined criteria. In some embodiments, the recommend participants are sourced from a list of contacts for the user of computer system 600. At FIG. 6D, computer system 600 detects tap input 650*d* on invite-other-participants control 614*b*.

As illustrated in FIG. 6E, in response to detecting tap input 650*d* on invite-other-participants control 614*b*, computer system 600 displays search user interface 616. Search user interface includes cancel control 614*e*, indication 616*a* (e.g., "Add People"), done control 616*b*, input field 616*c*, add-additional-input control 616*d*, suggestions 616*e*, and keyboard 616*f*. At FIG. 6E, computer system 600 displays "J" in input field 616*c* and displays suggestions 616*e* based on the text in input field 616*c*. Suggestions 616*e* includes suggestion 616*e*1, suggestion 616*e*2, suggestion 616*e*3, and suggestion 616*e*4. At FIG. 6E, suggestions 616*e*1-616*e*4 all include a "J" because of the text (e.g., "J") in input field 616*c*. In some embodiments, one or more people represented by suggestions 616*e* is a contact (e.g., from a list of contacts) of the user of computer system 600. In some embodiments, in response to detecting an input on cancel control 614*e*, computer system 600 cancels an operation and re-displays the user interface that was previously displayed (e.g., the user interface of FIG. 6D). In some embodiments, in response to detecting an input on add-additional-input control 616*d*, computer system 600 displays an additional input field, where a person can enter another contact to be a participant of the shared library. In some embodiments, in response to detecting one or more inputs (e.g., such as an input on j-letter control 616*f*1) on keyboard 616*f*, computer system 600 populates input field 616*c* based on the one or more inputs detected on keyboard 616*f*. At FIG. 6E, computer system 600 detects tap input 650*e*1 on suggestion 616*e*2 (which corresponds to a contact ("Jill Doe")) of the user of computer system 600) and detects tap input 650*e*2 on done control 616*b*.

Figure 6G:
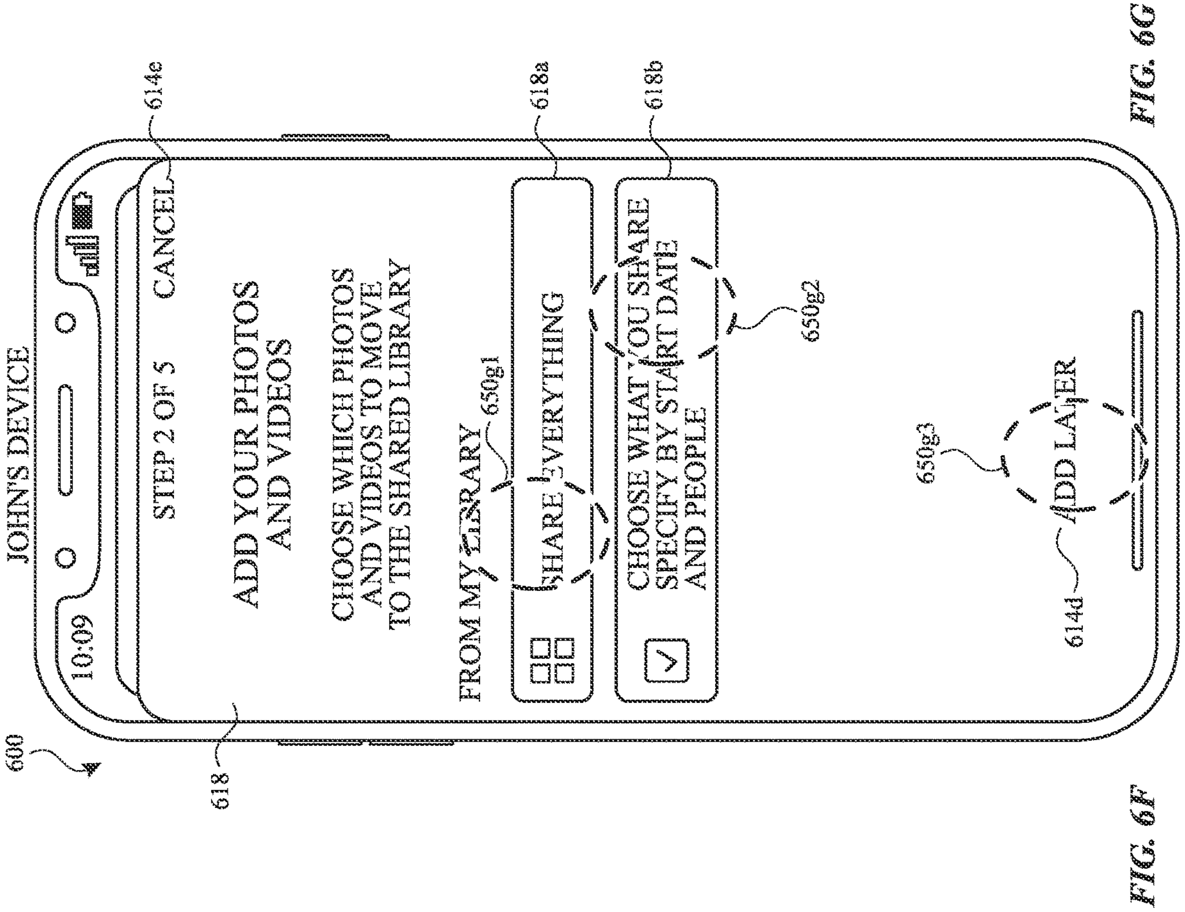
Figure 6F:
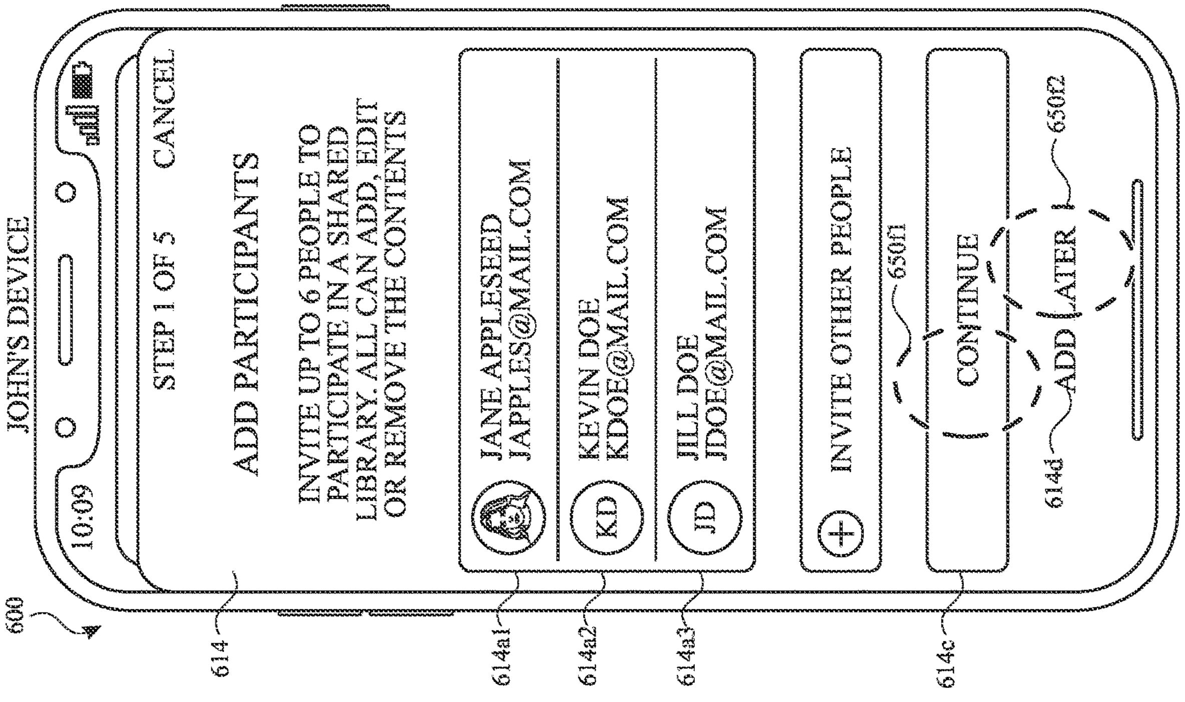

As illustrated in FIG. 6F, in response to detecting tap input 650*e*1 on suggestion 616*e*2 and detecting tap input 650*e*2 on done control 616*b*, computer system 600 selects suggestion 616*e*2 and displays participant control 614*a*3 on add-participants-to-shared-library user interface 614. At FIG. 6F, computer system 600 has added the user ("Jill Doe") represented by participant control 614*a*3 to the list of participants to the shared library. In some embodiments, in response to one or more inputs on add-participants-to-shared-library user interface 614, computer system 600 removes one or more of participant controls 614*a*1-614*a*3 and/or removes the participant that corresponds to the removed control from the list of participants with which the shared library will be shared. At FIG. 6F, computer system 600 detects tap input 650*f*1 on continue control 614*c* or tap input 650*f*2 on skip control 614*d*. In some embodiments, in response to detecting tap input 650*f*2 on skip control 614*d*, computer system 600 ends the process for creating the shared library and displays the user interface of FIG. 6AL (or FIG. 6B), which is described in further detail below. In some embodiments, in response to detecting tap input 650*f*2 on skip control 614*d*, computer system 600 does not register one or more additional participants to the shared library and display the user interface of FIG. 6G.

As illustrated in FIG. 6G, in response to detecting tap input 650*f*1 on continue control 614*c*, computer system 600 displays sharing user interface 618. Sharing user interface 618 includes share-everything control 618*a*, choose-what-to-share control 618*b*, and skip control 614*d*. In some embodiments, in response to detecting tap input 650*g*1 on share-everything control 618*a*, computer system 600 is configured to share all of the media items in John's personal library as a part of the shared library that is being created. In some embodiments, computer system 600 moves (and/or is configured to move upon completion of the creation of the shared library) all of the media items from John's personal library to the shared library that is being created, such that none of the moved media items exists in the John's personal library, after the move is completed. In some embodiments, computer system 600 copies all of the media items from the personal library to the shared library, such that the media items exist in John's personal library and the shared library that is being created. In some embodiments, in response to detecting tap input 650*g*3 on skip control 614*d*, computer system 600 ends the process for creating the shared library and displays the user interface of FIG. 6AL (or FIG. 6B), which is described in further detail below. In some embodiments, in response to detecting tap input 650*g*3 on skip control 614*d*, computer system 600 displays the user interfaces of FIG. 6U or FIG. 6AD described below. At FIG. 6G, computer system 600 detects tap input 650*g*2 on choose-what-to-share control 618*b*.

Figure 6H:
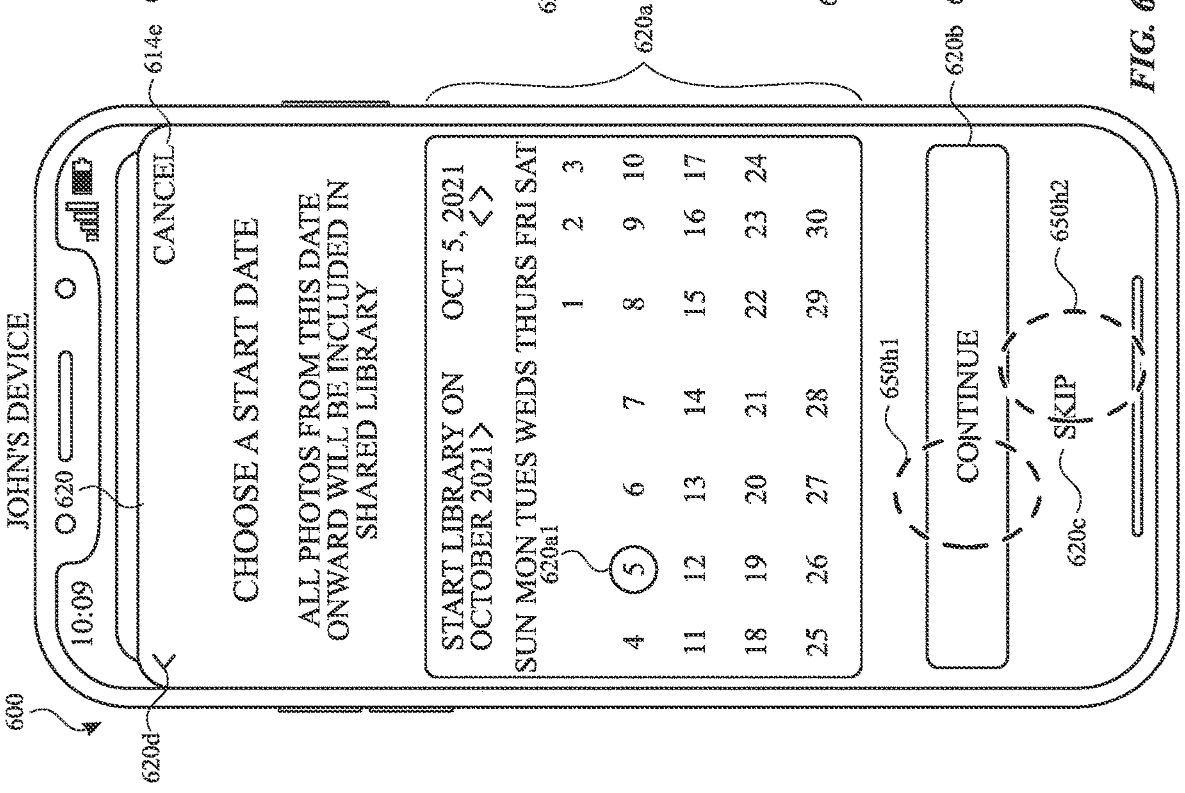

As illustrated in FIG. 6H, in response to detecting tap input 650*g*2 on choose-what-to-share control 618*b*, computer system 600 displays choose-start-date user interface 620. Choose-start-date user interface 620 includes cancel control 614*e*, date picker object 620*a*, continue control 620*b*, skip control 620*c*, and back control 620*d* (e.g., that, when selected, causes computer system 600 to re-display the user interface that was previously displayed (e.g., the user interface of FIG. 6G). Choose-start-date user interface 620 is a user interface for entering in a start date for selecting and/or suggesting media items in John's personal library for inclusion in the shared library that is being created. In other words, in response to detecting that a date is selected via date picker object 620*a*, computer system 600 is configured to include and/or recommend media items from John's personal library that were captured and/or stored from the selected date (and/or the start date) for inclusion in the shared library that is being created. As illustrated in FIG. 6H, computer system 600 displays selector 620*a*1 around the date corresponding to Oct. 5, 2021. Here, computer system 600 displays selector 620*a*1 around the date corresponding to Oct. 5, 2021, based on a determination that at least one of the participants (e.g., "Jane" and/or the participants listed in FIG. 6F) started to be included and/or appear in media items in John's personal library on (or after) Oct. 5, 2021. Looking back at FIG. 6A, the earliest captured media items in John's personal library were captured on Sep. 5, 2021. However, computer system 600 did not automatically select Sep. 5, 2021, as the selected date, because none of the participants (e.g., excluding the organizer, John) were included in media items 690*a*. Instead, computer system 600 selected Oct. 5, 2021, which is the date at which media items 690*b* were captured. Computer system 600 selected Oct. 5, 2021, as the selected date in FIG. 6H, because Jane (e.g., one of the added participants of the shared library) was included and/or represented in one or more of media items 690*b*, which is the earliest set of media items from John's personal library that includes at least one participant of the shared library. In some embodiments, computer system 600 uses one or more other criteria to automatically select the date, such as one or more criteria involving detecting that one or more of the participants (e.g., other than the organizer) attended an event where one or more media items in John's personal library were captured (e.g., without the media items necessarily including and/or depicting the one or more participants). At FIG. 6H, computer system detects tap input 650*h*1 on continue control 620*b* or tap input 650*h*2 on skip control 620*c*. In some embodiments, in response to detecting tap input 650*h*2 on skip control 620*c*, computer system 600 ends the process for creating the shared library and displays the user interface of FIG. 6AL (or FIG. 6B), which is described in further detail below. In some embodiments, in response to detecting tap input 650*h*2 on skip control 620*c*, computer system 600 does not register a date as being selected by a user and displays the user interface of FIG. 6I.

Figure 6I:
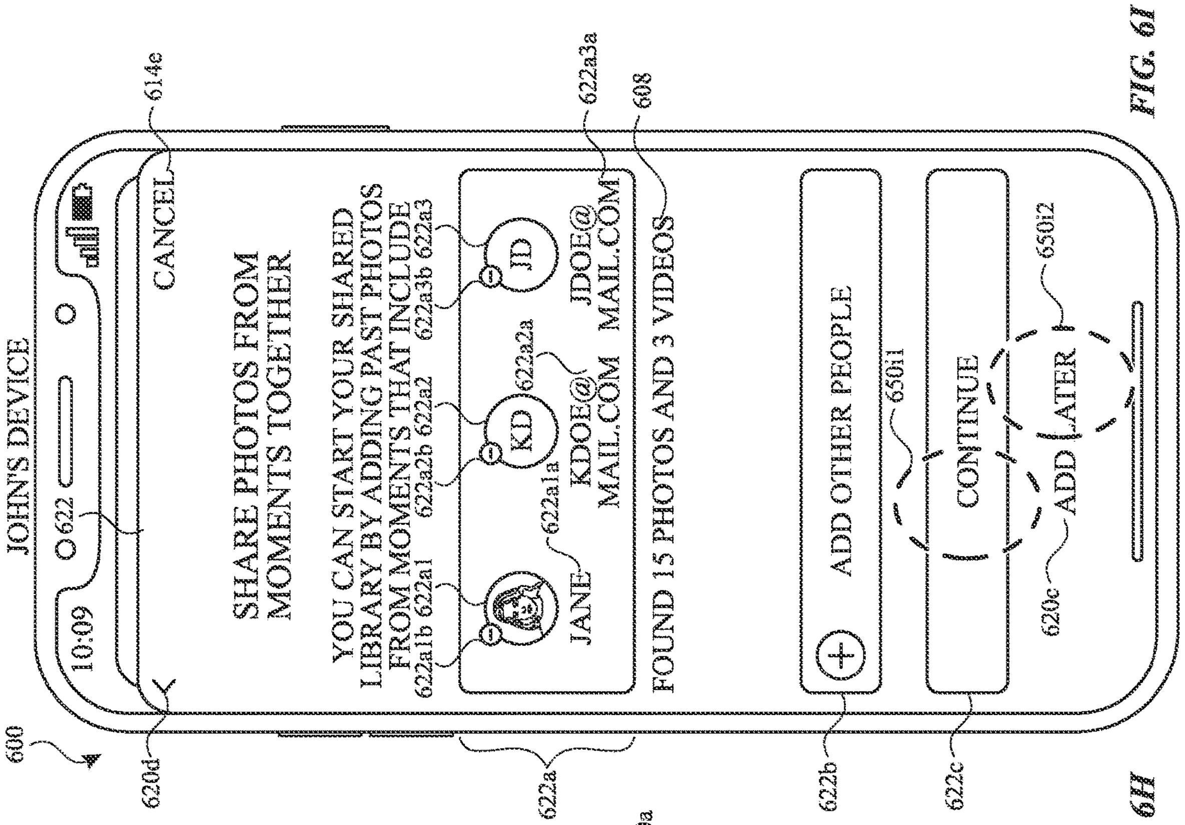

As illustrated in FIG. 6I, in response to detecting tap input 650*h*1 on continue control 620*b*, computer system 600 displays add-people-for-sharing user interface 622 and registers Oct. 5, 2021, as the start date (or selected date). Add-people-for-sharing user interface 622 includes back control 620*d*, cancel control 614*e*, selected-people controls 622*a*, add-other-people control 622*b*, continue control 622*c*, and skip control 620*c*. As illustrated in FIG. 6I, selected-people controls 622*a* include person-selection control 622*a*1, person-selection control 622*a*2, and person-selection control 622*a*3. The selected-people controls 622*a* correspond to the participants selected via add-participants-to-shared-library user interface 614 of FIG. 6F. In other words, computer system 600 automatically displays person-selection controls (e.g., a selected personal control) for the participants in the shared library that is being created. In FIG. 6I, person-selection control 622*a*1 represents a first person (e.g., "Jane") that computer system 600 (or another computer system) will use to recommended media items from John's personal library to add to the shared library that is being created, person-selection control 622*a*2 represents a second person (e.g., "Kevin") that computer system 600 (or another computer system) will use to recommended media items from John's personal library to add to the shared library that is being created, and person-selection control 622*a*3 represents a third person (e.g., "Jill") that computer system 600 (or another computer system) will use to recommended media items from John's personal library to add to the shared library that is being created. As illustrated in FIG. 6I, computer system 600 also displays remove control 622*a*1*b* (e.g., that, when selected, removes person-selection control 622*a*1 or removes Jane from being a selected person), remove control 622*a*2*b* (e.g., that, when selected, removes person-selection control 622_a_2 or removes Kevin from being a selected person), and remove control 622_a_3_b_ (e.g., that, when selected, removes person-selection control 622_a_3 or removes Jill from being a selected person). At FIG. 6I, computer system 600 displays recommendation indication 608, which indicates that fifteen photos and three videos from John's personal library are recommended to be added to the shared library based on the people indicated by the selected-people controls 622_a_ and the start date (e.g., Oct. 5, 2021) chosen via tap input 650_h_1 and date picker object 620_a_ of FIG. 6H. In some embodiments, at FIG. 6I, one or more of the fifteen photos and three videos from John's personal library were chosen based on one or more (or all) of the respective media items satisfying media sharing criteria. In some embodiments, a respective media item satisfies the media sharing criteria when a determination is made that one or more selected people (e.g., represented by a selected-person control) are included and/or represented in the respective media item (e.g., such as the face of one or more of the people being represented in the respective media item (e.g., a media item in media items 690_b_ that includes "Jane")). In some embodiments, a respective media item satisfies the media sharing criteria when a determination is made that one or more of the selected people are detected at an event (e.g., during one or more camera sessions) that includes the respective person (e.g., a media item in media items 690_b_ that does not include "Jane") and the respective media item was captured during the event. In some embodiments, computer system 600 determines that a particular selected person was at an event based on communication between computer system 600 (or another electronic device belonging to John that captured the media item) and a computer system of the particular person. In some embodiments, the communication includes Wi-Fi communication and/or Bluetooth communication. In some embodiments, computer system 600 determines that a particular person was at an event based on the location of computer system 600 and the location of the computer system of the particular person during the event (or when the media was captured). In some embodiments, computer system 600 determines the location of the computer system and/or the location of the computer system of the particular participant based on the communication between computer system 600 and the computer system of the particular person. In some embodiments, the fifteen photos and three videos from John's personal library were chosen based on at least one of the selected people being associated with a chosen media item (e.g., that satisfied the media sharing criteria). In some embodiments, the fifteen photos and three videos from John's personal library were chosen based on all the selected people being associated with all of the chosen media items. In some embodiments, if add-people-for-sharing user interface 622 was displayed in response to detecting tap input 650_h_2 on skip control 620_c_, the fifteen photos and three videos from John's personal library are not chosen based on selected date (e.g., Oct. 5, 2021, in FIG. 6H). In some embodiments, if add-people-for-sharing user interface 622 was displayed in response to detecting tap input 650_h_2 on skip control 620_c_ and a determination is made that at least one selected person cannot be associated with (e.g., identified in) a media item in John's personal library, computer system 600 does not display a recommendation to add any media items to the shared library.

Notably, at FIG. 6I, person-selection control 622_a_1 includes a representation of an actual photo of Jane and is displayed with indication 622_a_1_a_ ("Jane") of the name that has been associated with Jane's profile (e.g., via computer system 600). However, person-selection control 622_a_2 and person-selection control 622_a_3 are displayed with placeholder representations (e.g., not an actual representation of the respective participants) and is displayed with indications 622_a_2_a_ (e.g., "kdoe@mail") and 622_a_3_a_ (e.g., "jdoe@mail"), which are e-mail addresses and indicate that a name has not been associated with profiles that correspond to Kevin and Jill. At FIG. 6I, computer system 600 has properly identified the profile of Jane as being associated with media in John's personal library but has not properly identified the profile of Kevin and Jill as being associated with media items in John's personal library. Moreover, although Jane, Kevin, and Jill are contacts of John, computer system 600 has not been given enough information to associated Kevin and Jill in media items in John's personal library with the existing contacts for Kevin and Jill. As discussed above, recommendation indication 608 indicates that fifteen photos and three videos from John's personal library are recommended to be added. At FIG. 6I, these photos and videos include media items 690_b_ of FIG. 6A, which include Jane, but do not include media items 690_c_-690_e_, which include Kevin (and do not include Jane) because computer system 600 has not properly identified the profile of Kevin and Jill as being associated with media items in John's personal library. In addition, at FIG. 6I, these photos and videos indicated by recommendation indication 608 do not include media item 690_f_ because media item 690_f_ includes John (and does not include one or more of the selected people).

At FIG. 6I, computer system detects tap input 650_i_1 on continue control 622_c_ or tap input 650_i_2 on skip control 620_c_. In some embodiments, in response to detecting tap input 650_i_2 on skip control 620_c_, computer system 600 ends the process for creating the shared library and displays the user interface of FIG. 6AL (or FIG. 6B), which is described in further detail below. In some embodiments, in response to detecting tap input 650_i_2 on skip control 620_c_, computer system 600 does not display a recommendation to share one or more media items from John's personal library based on a selected person.

Figure 6K:
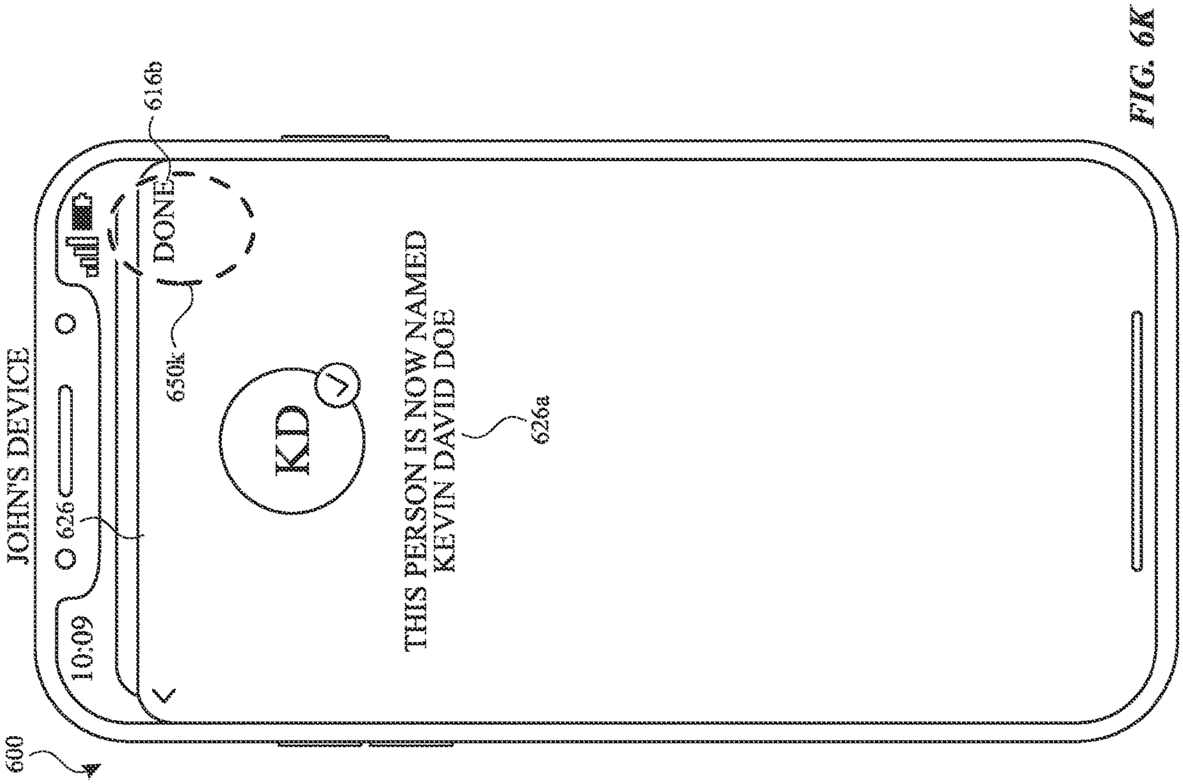
Figure 6J:
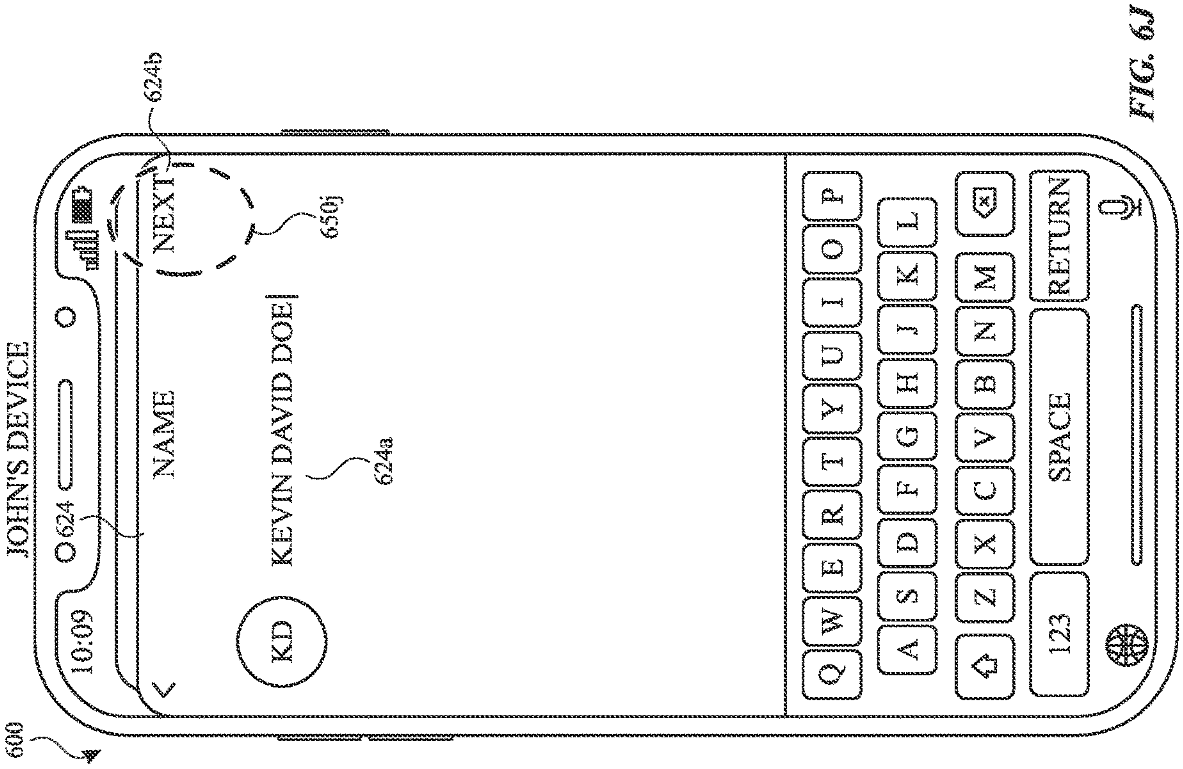

As illustrated in FIG. 6J, in response to detecting tap input 650_i_1 on continue control 622_c_, computer system 600 displays name-editing user interface 624. Computer system 600 displays name-editing user interface 624 (e.g., in response to detecting tap input 650_i_1) because a determination is made that computer system 600 does not have a name that is associated with Kevin with respect to managing media items. In other words, computer system 600 prompts the user to enter a name for Kevin after this respective determination was made. FIG. 6J is shown at a time where the user of computer system 600 has entered in a name for Kevin (e.g., "Kevin David Doe"). At FIG. 6J, computer system 600 detects tap input 650_j_ on next control 624_b_. As illustrated in FIG. 6K, in response to detecting tap input 650_j_ on next control 624_b_, computer system 600 displays name confirmation screen 626, which includes indication 626_a_ and done control 616_b_. Indication 626_a_ indicates that "Kevin David Doe" has been entered to identify Kevin (and/or the user that corresponds to person-selection control 622_a_2). At FIG. 6K, computer system 600 detects tap input 650_k_ on done control 616_b_.

Figure 6M:
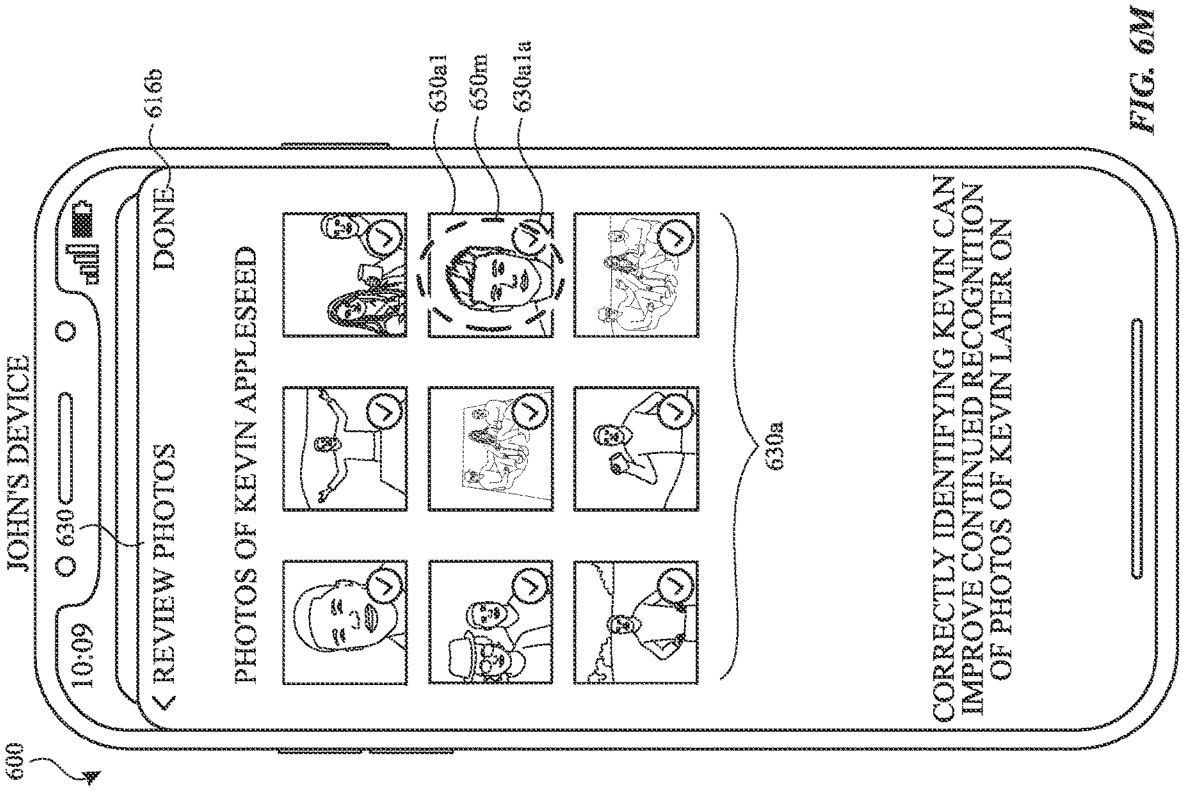
Figure 6L:
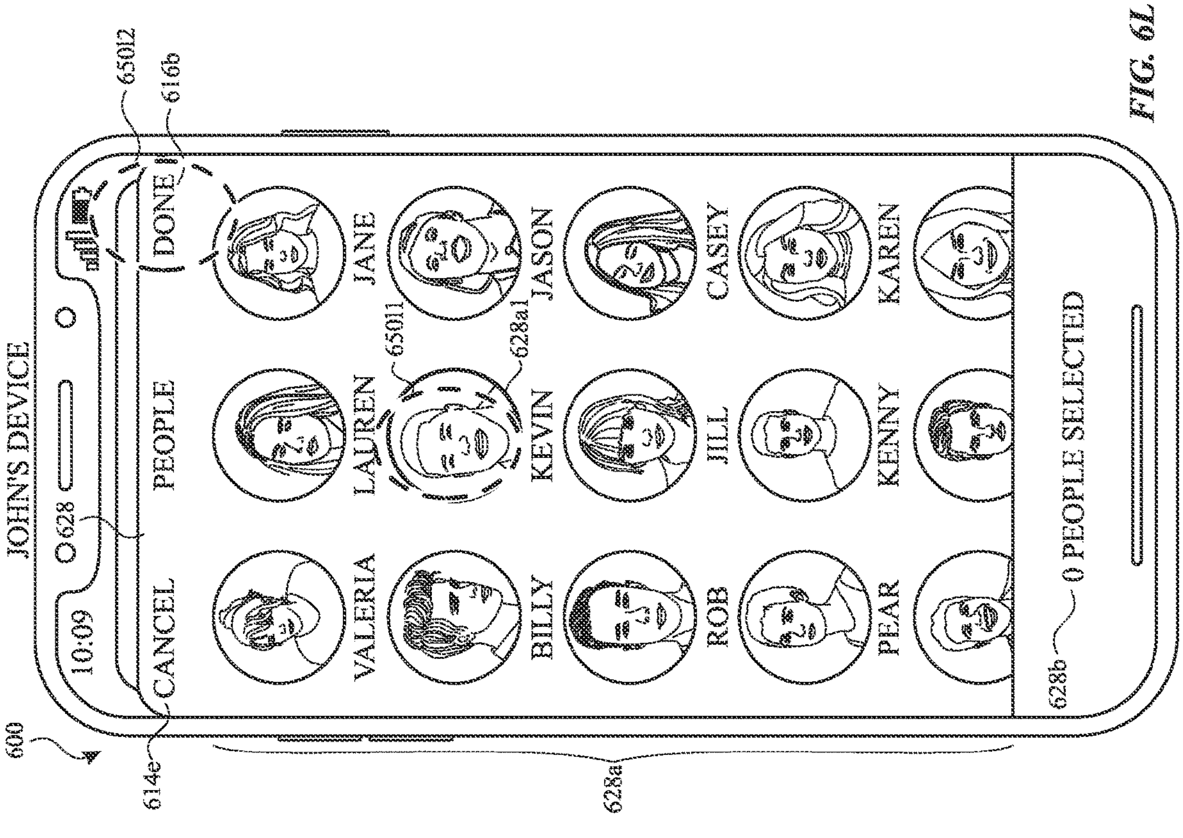

As illustrated in FIG. 6L, in response to detecting tap input 650_k_ on done control 616_b_, computer system 600 displays person-identifier user interface 628, which includes representation controls 628_a_. Computer system 600 displays person-identifier user interface 628 (e.g., in response to detecting tap input 650_k_) because a determination is made that computer system 600 does not have enough information to identify the face of Kevin and/or to detect media items based on one or more known representation of Kevin. In other words, computer system 600 prompts the user to identify a representation of Kevin (e.g., a representation associated with the media items in John's personal library) so that computer system 600 can more accurately identify and recommend potential more media items in John's personal library for sharing in the shared library. At FIG. 6L, computer system 600 detects tap input 650/1 on representation control **628*a*1 (e.g., a representation of Kevin) and tap input 650/2 on done control 616*b***.

Figure 6N:
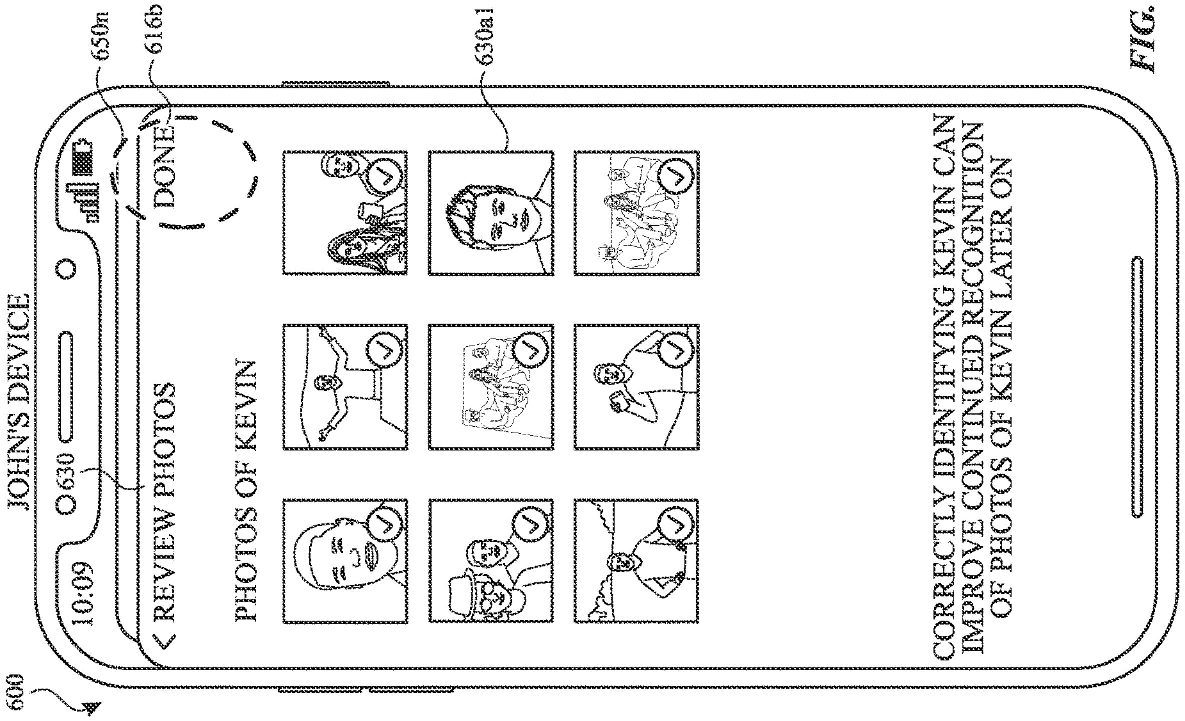

At FIG. 6L, in response to detecting tap input 650/1 on representation control **628*a*1 and tap input 650/2 on done control 616*b*, computer system 600 registers the representation depicted on control 628*a*1 as a representation of Kevin. As illustrated in FIG. 6M, in response to detecting tap input 650/1 on representation control 628*a*1 and tap input 650/2 on done control 616*b*, computer system 600 displays review user interface 630 that includes suggested media items 630*a* and done control 616*b*. Suggested media items 630*a* are media items that computer system 600 has determined to likely include Kevin (e.g., based on the selected representation control 628*a*1 in FIG. 6L and one or more facial recognition algorithms and/or processes). At FIG. 6M, computer system 600 displays suggested media items 630*a* to verify computer system 600 is properly identifying media items that include Kevin. At FIG. 6M, computer system 600 detects tap input 650*m* on suggested media item 630*a*1 (e.g., a media item that does not include Kevin). As illustrated in FIG. 6N, in response to detecting tap input 650*m*, computer system 600 deselects suggested media item 630*a*1 while continuing to display the other suggested media items as being selected (e.g., selection indication 630*a*1*a* is removed in FIG. 6N when compared to FIG. 6M). Thus, at FIG. 6N, suggested media item 630*a*1 will not be used to identify additional media items that include Kevin while one or more of the selected suggested media items can be used to identify additional media items that include Kevin (e.g., for sharing in the shared library). At FIG. 6N, computer system 600 detects tap input 650*n* on done control 616*b***.

Figure 6O:
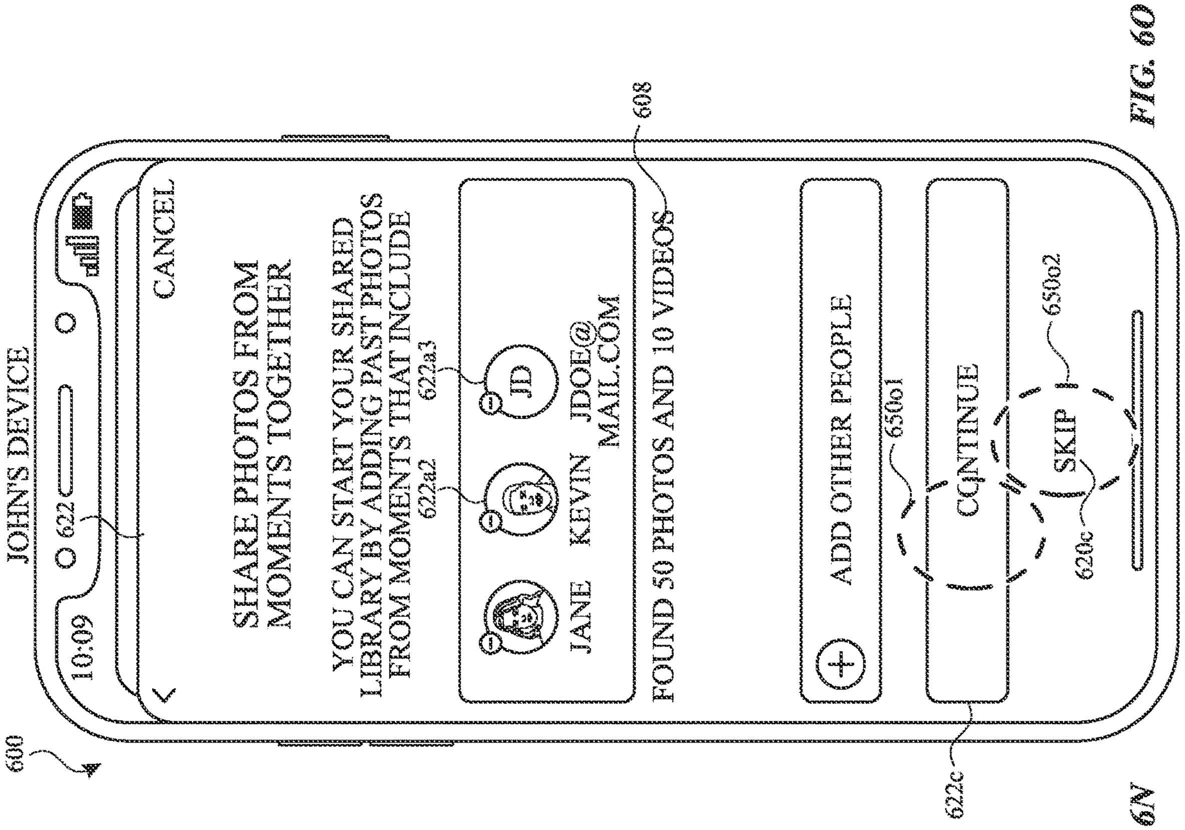

As illustrated in FIG. 6O, in response to detecting tap input **650*n* on done control 616*b*, computer system 600 updates recommendation indication 608 to indicate that fifty photos and ten videos from John's personal library were chosen based people corresponding to selected-people controls 622*a* and the selected start date (e.g., which was selected in FIG. 6H). At FIG. 6O, computer system 600 is recommending more media items to be shared in the shared library when compared to FIG. 6I because computer system 600 is identifying more media items associated with Kevin due to the additional information that was provided in FIGS. 6J-6N. In addition, in response to detecting tap input 650*n*, computer system 600 updates person-selection control 622*a*2 by replacing the placeholder photo of FIG. 6I with an actual photo of Kevin (e.g., the one selected via tap input 650/1 at FIG. 6L) at FIG. 6O. Person-selection control 622*a*3 continues to be displayed with a placeholder photo because additional information has not been provided for Jill. At FIG. 6O, computer system 600 detects tap input 650*o*1 on continue control 622*c* and tap input 650*o*2 on skip control 620*c*. In some embodiments, in response to detecting tap input 650*o*2 on skip control 620*c*, computer system 600 displays the user interface of FIG. 6U. In some embodiments, in response to detecting input 650*o*1 on continue control 622*c*, computer system 600 displays one or more user interfaces of FIGS. 6J-6N so that a user of computer system 600 can provide information for Jill (e.g., a name, one or more faces of Jill, and/or one or more media items that include Jill for confirmation that Jill has been correctly selected by computer system 600) that is similar to the information that was provided for Kevin (e.g., as discussed above in relation to FIGS. 6J-6**N).

Figure 6P:
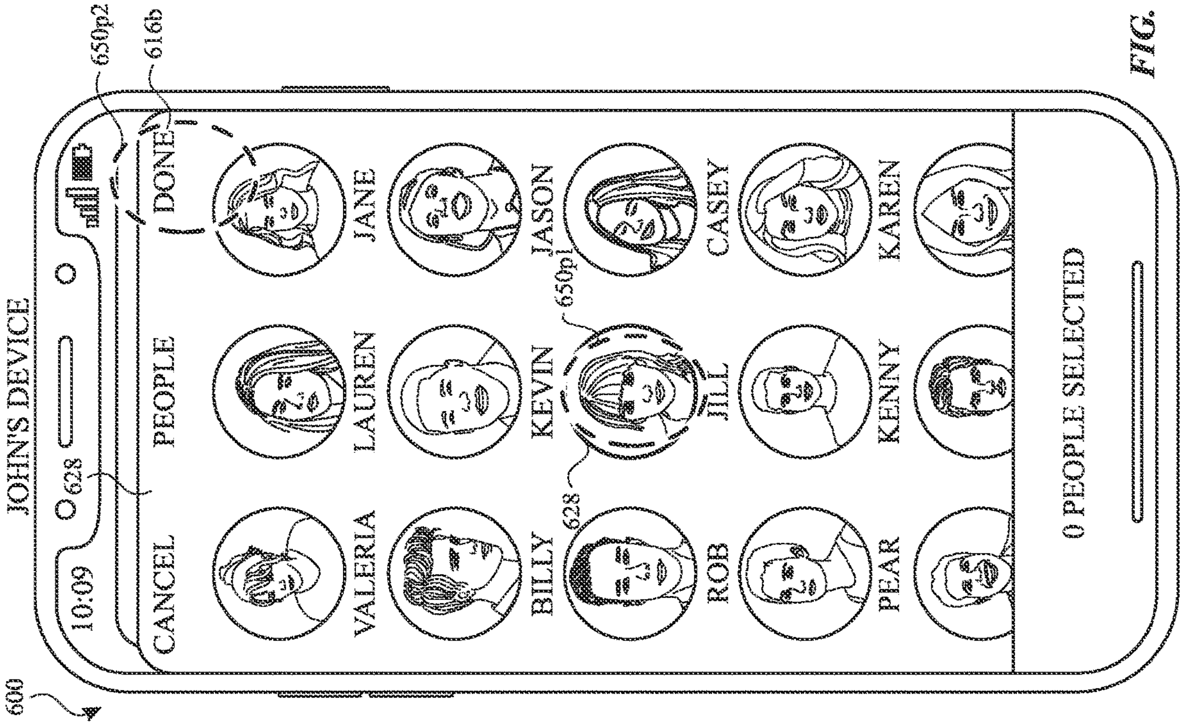

FIG. 6P illustrates computer system 600 displaying person-identifier user interface 628, which includes representation controls **628*a*. At FIG. 6P, computer system 600 detects tap input 650*p*1 on representation control 628*a*2 and tap input 650*p*2 on done control 616*b*. In response to detecting tap input 650*p*1 on representation control 628*a*2 and tap input 650*p*2 on done control 616*b*, computer system 600 associates the representation corresponding to representation control 628*a*2 with Jill (and/or person-selection control 622*a*3). In some embodiments, in response to detecting tap input 650*p*1 on representation control 628*a*2 and tap input 650*p*2 on done control 616*b*, computer system 600 displays one or more user interfaces for confirming media items that include Jill, using one or more similar techniques as those described above in relation to FIGS. 6M-6L. Thus, in some embodiments, computer system 600 displays one or more user interfaces to prompt the user to provide information for a person (e.g., for whom the computer system does not have enough information) and re-displays one or more of the user interfaces to prompt the user to provide information for a different person. In some embodiments, the one or more user interfaces for confirming media items that includes Jill is displayed because a determination is made that computer system 600 can identify one or more potential media items (or more than a threshold number (e.g., 0-10)) that include Jill. In some embodiments, in response to detecting tap input 650*p*1 on representation control 628*a*2 and tap input on done control 616*b*, computer system 600 does not display the one or more user interfaces for confirming media items when a determination is made that computer system 600** cannot identify any (or less than the threshold number of) potential media items that include Jill for sharing in the shared library.

Figure 6Q:
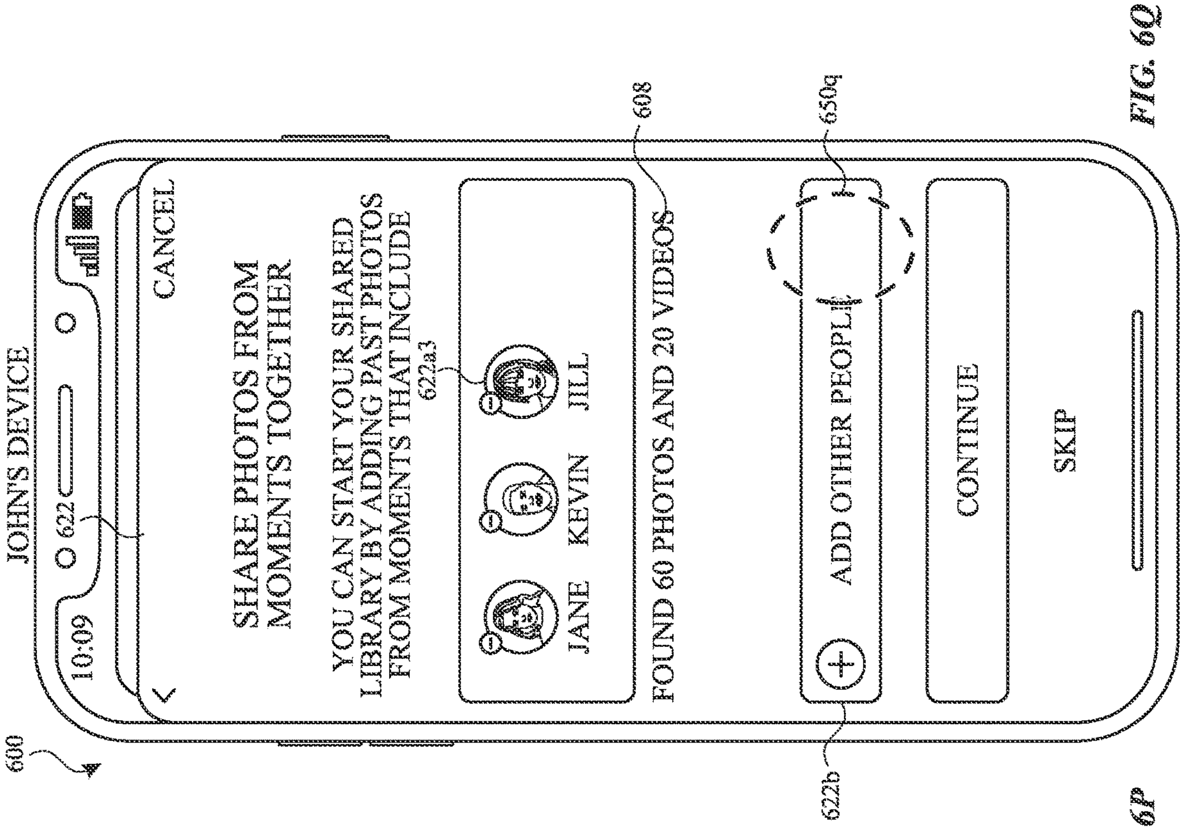
Figure 6S:
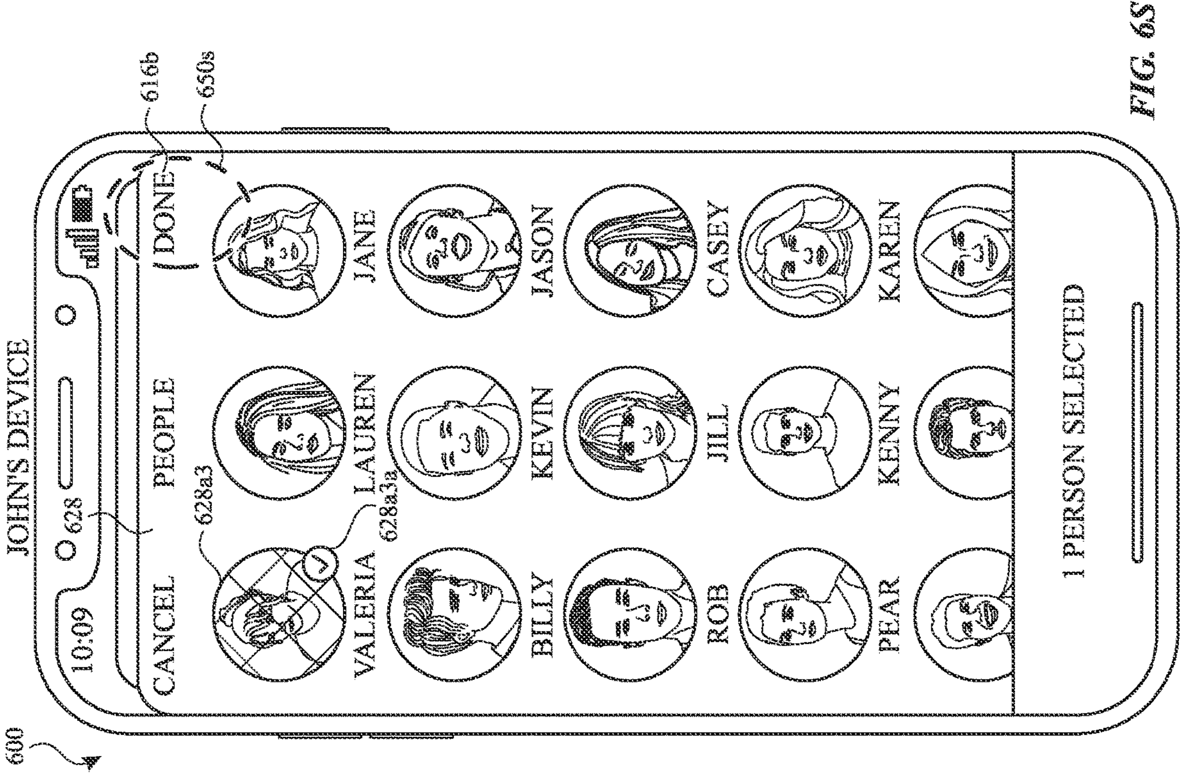
Figure 6R:
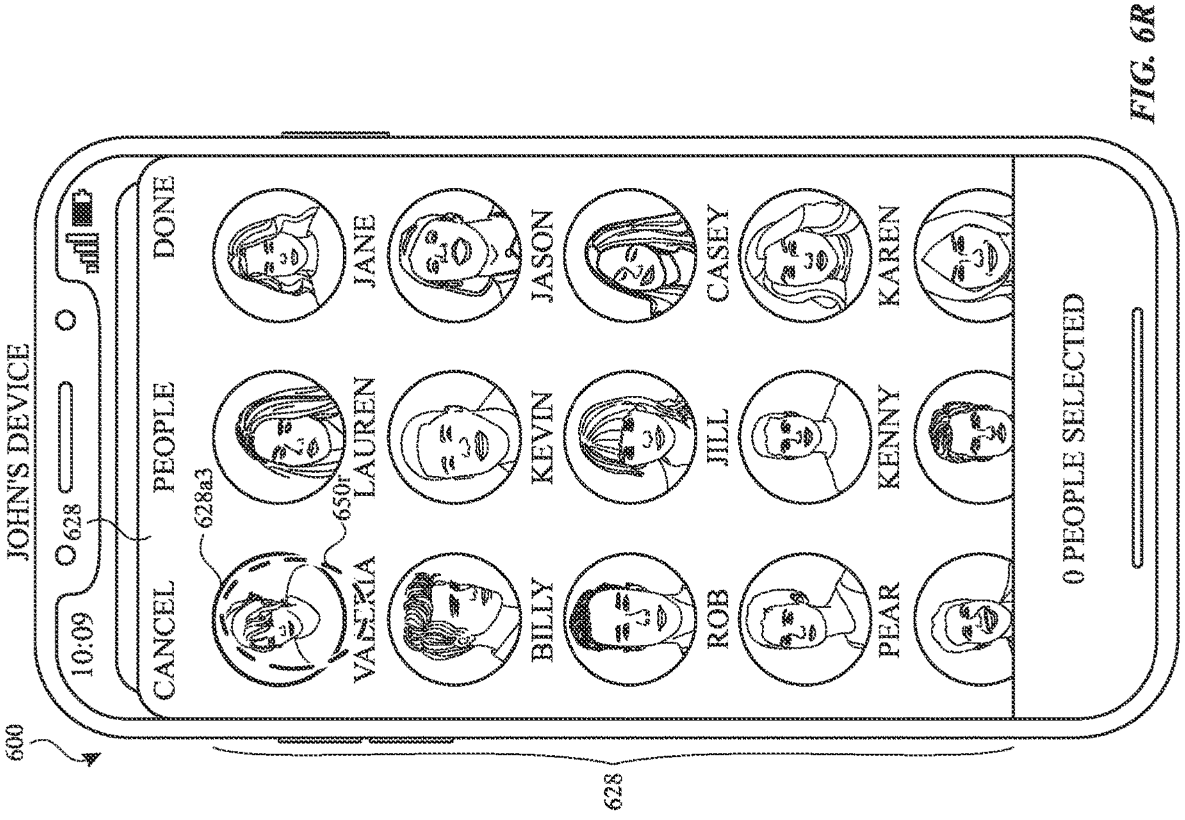
Figure 6T:
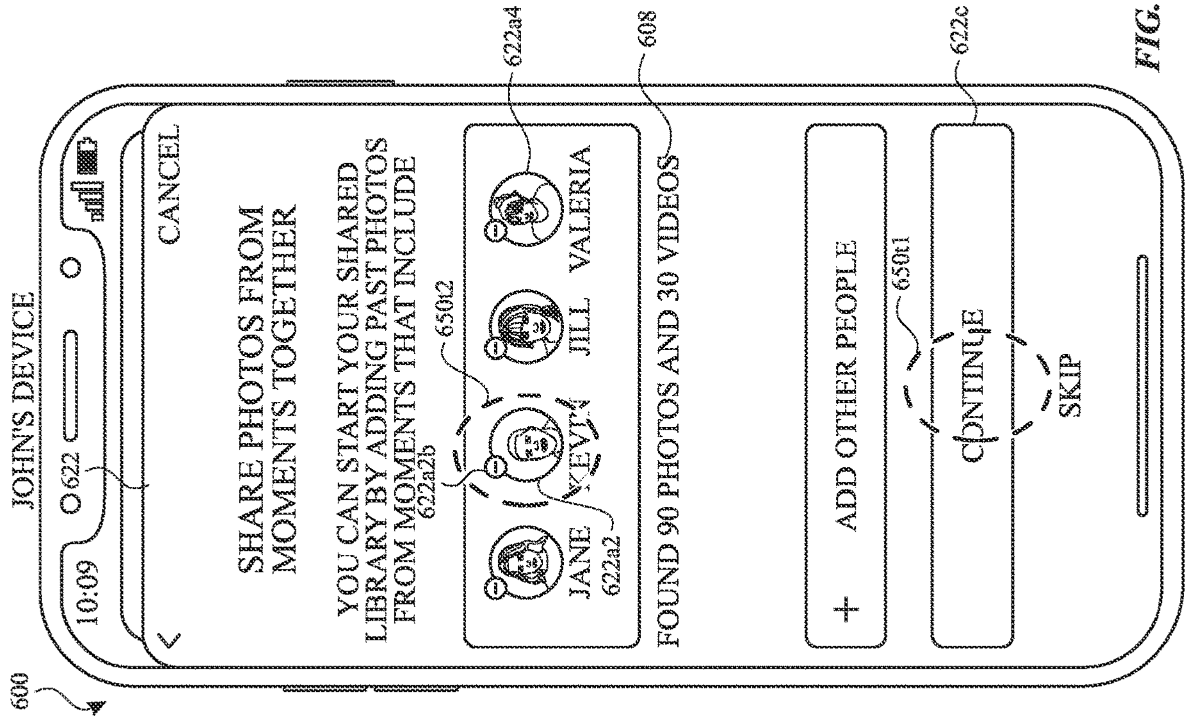

FIG. 6Q illustrates computer system 600 displaying add-people-for-sharing user interface 622, where person-selection control **622*a*3 is displayed with an actual photo of Jill (e.g., selected via one or more user interfaces to provide additional information for Jill, which are similar to the one or more user interfaces of FIGS. 6J-6N) instead of the placeholder displayed in FIG. 6I. In addition, recommendation indication 608 has been updated (e.g., sixty photos and twenty videos) based on additional information that has been provided for Jill (e.g., such as media items 690*g* of FIG. 6A). In some embodiments, in response to detecting a selection of any of the selection controls (e.g., such as 622*a*3), computer system 600 displays one or more user interfaces of FIGS. 6J-6N so that a user can provide additional information for the person who corresponds to the selected selection control. At FIG. 6Q, computer system 600 detects tap input 650*q* on add-other-people control 622*b*. As illustrated in FIG. 6R, in response to detecting tap input 650*q* on add-other-people control 622*b*, computer system 600 displays person-identifier user interface 628. At FIG. 6R, computer system 600 detects tap input 650*r* on representation control 628*a*3, which corresponds to a person named "Valeria". As illustrated in FIG. 6S, in response to detecting tap input 650*r*, computer system 600 displays representation control 628*a*3 as being selected (e.g., as indicated by selection indicator 628*a*3*a* being displayed). At FIG. 6S, computer system 600 displays tap input 650*s* on done control 616*b* while representation control 628*a*3 is selected. As illustrated in FIG. 6T, in response to detecting tap input 650***s* on done control 616*b*, computer system 600 displays person-selection control 622*a*4 as being a part of selected-people controls 622*a*. In addition to displaying person-selection control 622*a*4, computer system 600 updates recommendation indication 608 to indicate that ninety photos and thirty videos are being recommended to be included in the shared library that is being created. Here, computer system 600 updates recommendation indication 608 because computer system 600 has identified additional media items after "Valeria" was added as a person that should be identified in media items from John's personal library to add to the shared library. Notably, at FIG. 6T, while Valeria is being used to identify media items to add to the shared library, computer system 600 is not configured to share the shared library with Valeria (e.g., Valeria is not a participant of the shared library like Jane, Kevin, and Jill, as discussed above). At FIG. 6T, computer system 600 detects tap input 650*t*1 on continue control 622*c* and/or tap input 650*t*2 on remove control 622*a*2*b*. In some embodiments, in response to detecting tap input 650*t*2 on remove control 622*a*2*b*, computer system 600 removes Kevin from the list of people who are being used to identify media items for sharing in the shared library. In some embodiments, when computer system 600 removes Kevin from the list, computer system 600 updates recommendation indication 608 to include less media items because Kevin is no longer being used to identify media items for sharing in the shared library. In some embodiments, when computer system 600 removes Kevin from the list, computer system 600 continues to be configured to share the shared library with Kevin. Thus, in some embodiments, a person can be a participant of the shared library without being used to identify media items for sharing in the shared library.

Figure 6U:
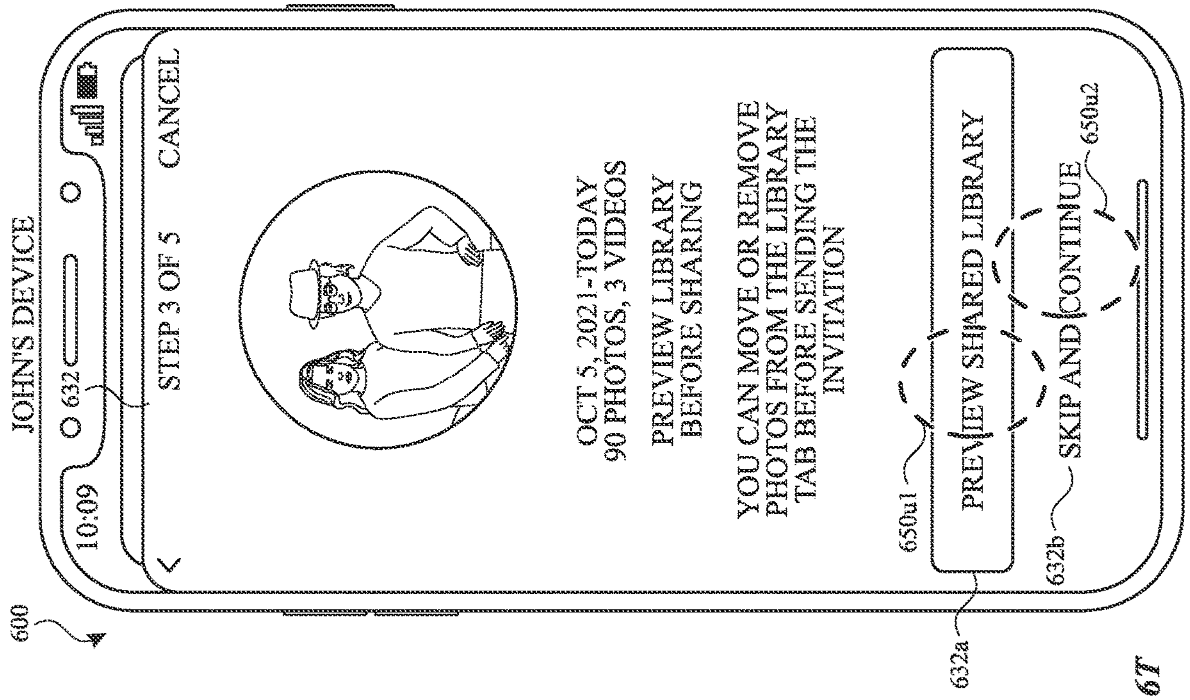

As illustrated in FIG. 6U, in response to detecting tap input 650*t*1 on continue control 622*c*, computer system 600 displays review user interface 632. Review user interface 632 includes review control 632*a* and skip control 632*b*. At FIG. 6U, computer system 600 detects tap input 650*u*1 on review control 632*a* or tap input 650*u*2 on skip control 632*b*. In some embodiments, in response to detecting tap input 650*u*2 on skip control 632*b*, computer system 600 displays the user interface of FIG. 6AD.

Figure 6W:
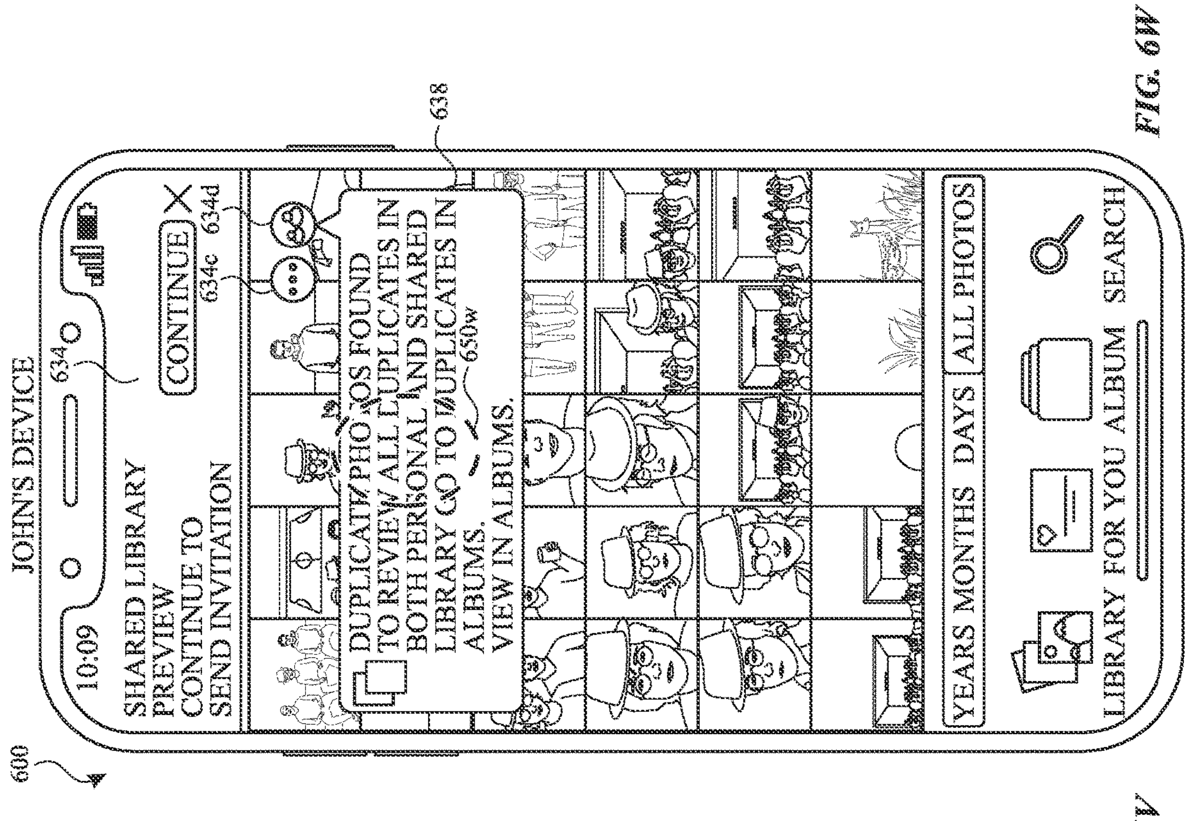
Figure 6V:
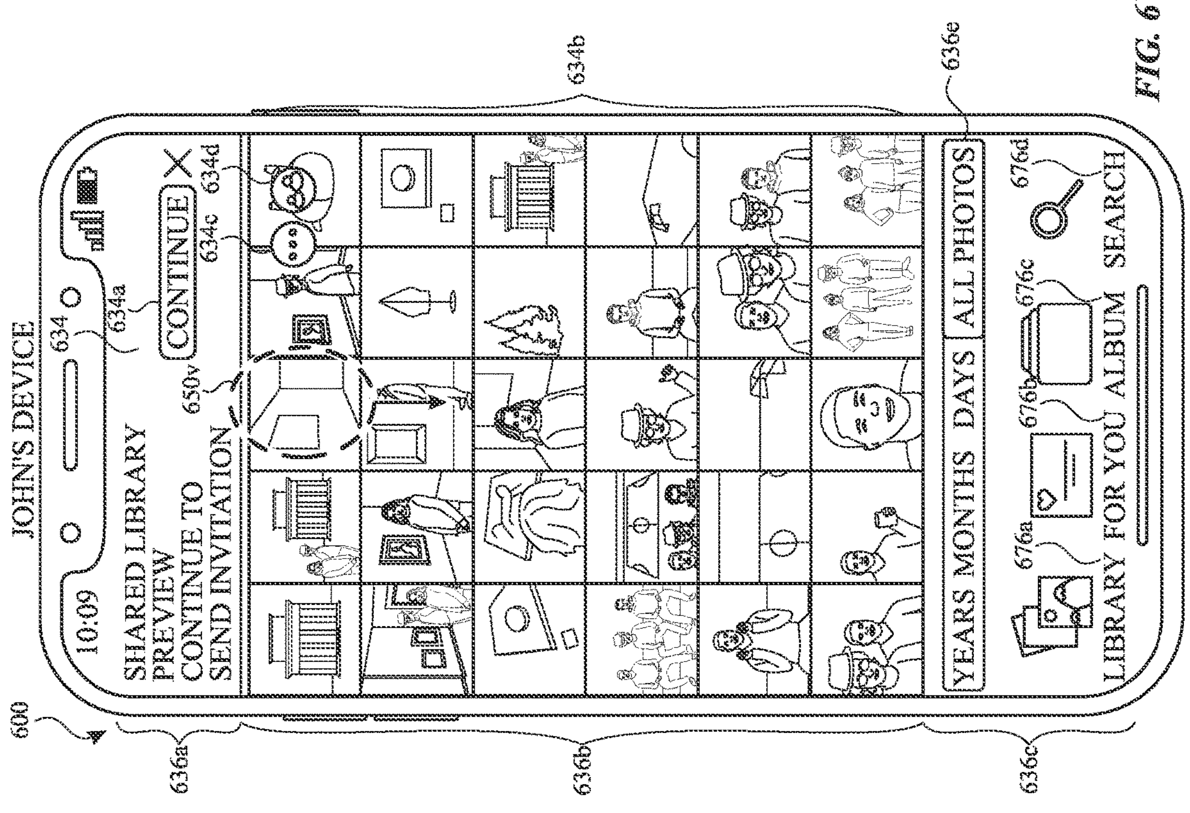

As illustrated in FIG. 6V, in response to detecting tap input 650*u*1 on review control 632*a*, computer system 600 displays review interface 634. Review user interface 634 includes control region 636*a*, review region 636*b*, and control region 636*c*. Control region 636*a* includes continue control 634*a*. Review region 636*b* includes media items 634*b*, menu control 634*c*, and shared library indication 634*d* (e.g., which indicates that a person is viewing the shared library). Control region 636*c* includes library view 676*a*, for-you view 676*b*, album view 676*c*, search view 676*d*, and media filter 676*e*. Media items 634*b* are media items that have been selected for sharing with the shared library that is being created. Notably, media items 634*b* includes media items 690*a*-690*e* and 690*g* of FIG. 6A because media items 690*a*-690*e* and 690*g* were identified based on media sharing criteria (e.g., as discussed in relation to FIGS. 6I-6O), such as one or more of the people being represented a respective media item and/or being detected at an event where a respective media item was captured. However, media items 634*b* do not include media item 690*f* of FIG. 6A because media item 690*f* does not satisfy the media sharing criteria (e.g., includes a representation of John without being detected at an event at which one or more of the selected people were detected). In some embodiments, review user interface 634 includes the same controls (e.g., such as menu control 634*c*, shared/personal library indicators, and/or shared/personal library indications) as one or more user interfaces of a photo application (e.g., such as one or more of the user interfaces 688 of FIG. 6AN, user interface 720 of FIG. 7A1, the user interface of FIGS. 6H-6I, and/or the user interfaces of FIGS. 11D-11F and 11K) to make it easy for a user to navigate review user interface 634. In some embodiments, media items 634*b* do not include any media items that are marked as private or hidden in John's personal library. In some embodiments, computer system 600 does not recommend any media items that are marked as private or hidden in John's personal library for sharing in the shared library. At FIG. 6V, computer system 600 detects downward swipe input 650*v* on review region 636*b*.

Figure 6X:
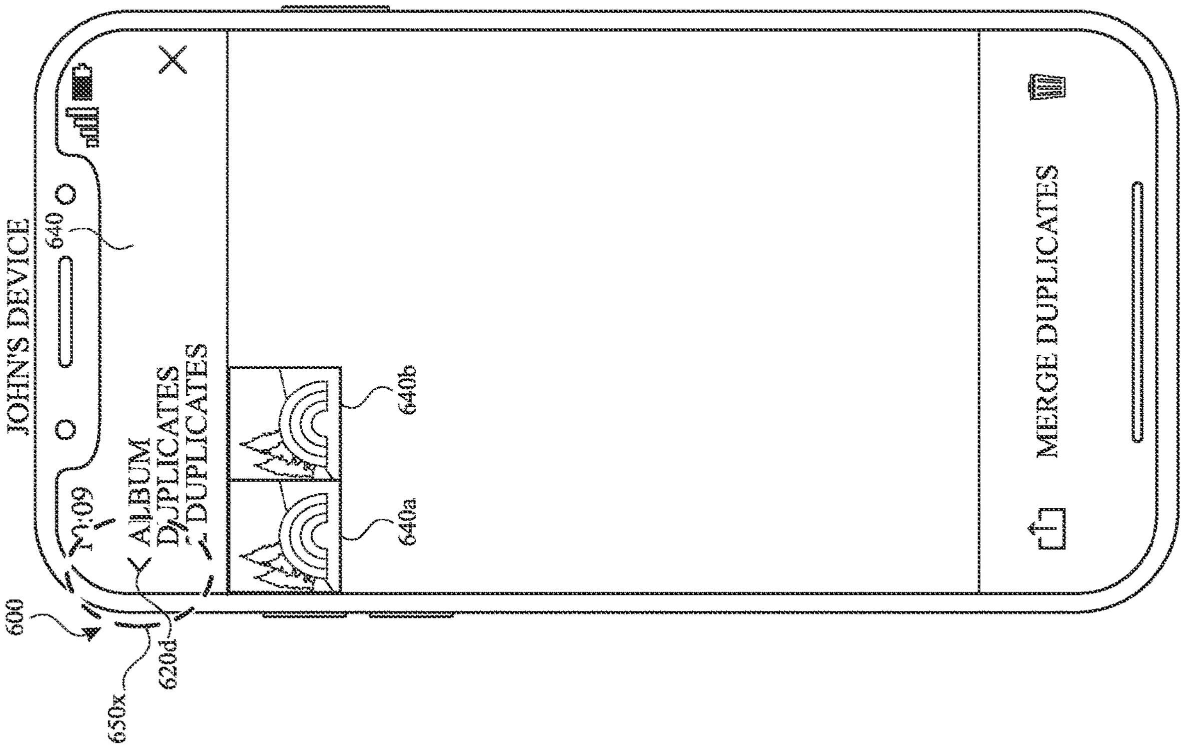

As illustrated in FIG. 6W, in response to detecting downward swipe input 650*v*, computer system 600 scrolls the media items displayed in FIG. 6V to display additional media items in review region 636*b*. Moreover, in response to detecting swipe input 650*v*, computer system displays duplicate notification 638, which indicates that John's personal library and the shared library will have duplicate media items based on the current configuration of the shared library being created. At FIG. 6W, computer system 600 detects tap input 650*w* on duplicate notification 638. As illustrated in FIG. 6X, in response to detecting tap input 650*w* on duplicate notification 638, computer system 600 displays duplicate-review user interface 640. Duplicate-review user interface 640 includes media items 640*a*-640*b*, which are duplicate media items. Notably, looking back at FIG. 6W, media items 640*a*-640*b* were not displayed in FIG. 6W because computer system 600 is configured to hide duplicate media items. In some embodiments, when computer system 600 is not configured to hide duplicate media items, one or more of media items 640*a*-640*b* are displayed at FIG. 6W. In some embodiments, at FIG. 6X, computer system 600 removes one or more of the duplicate media items in response to detecting one or more inputs directed to delete control 640*c*. In some embodiments, computer system 600 merges the duplicate media items in response to detecting an input, such as a tap input directed to "Merge Duplicates" on duplicate-review user interface 640. In some embodiments, duplicate media items can be detected, viewed, and/or addressed after the shared library has been created in different user interfaces (e.g., photo application user interfaces and/or media gallery user interface (e.g., such as one or more of the user interface 688 of FIG. 6AN, user interface 720 of FIG. 7A1, the user interface of FIGS. 6H-6I, and/or the user interfaces of FIGS. 11D-11F and 11K)), using one or more similar techniques to those described above in relation to FIGS. 6V-6X. In some embodiments, the duplicate media items can be addressed (e.g., changed, deleted, and/or modified) by any participant in the shared library. In some embodiments, the duplicate media items can be addressed by the contributor of the duplicate media items and cannot be addressed by a non-contributor of the duplicate media items. In some embodiments, the duplicate media items can be hidden at a computer system of a participant in the shared library when a hide duplicate media items setting is enabled (or not hidden when the setting is disabled).

Figure 6Y:
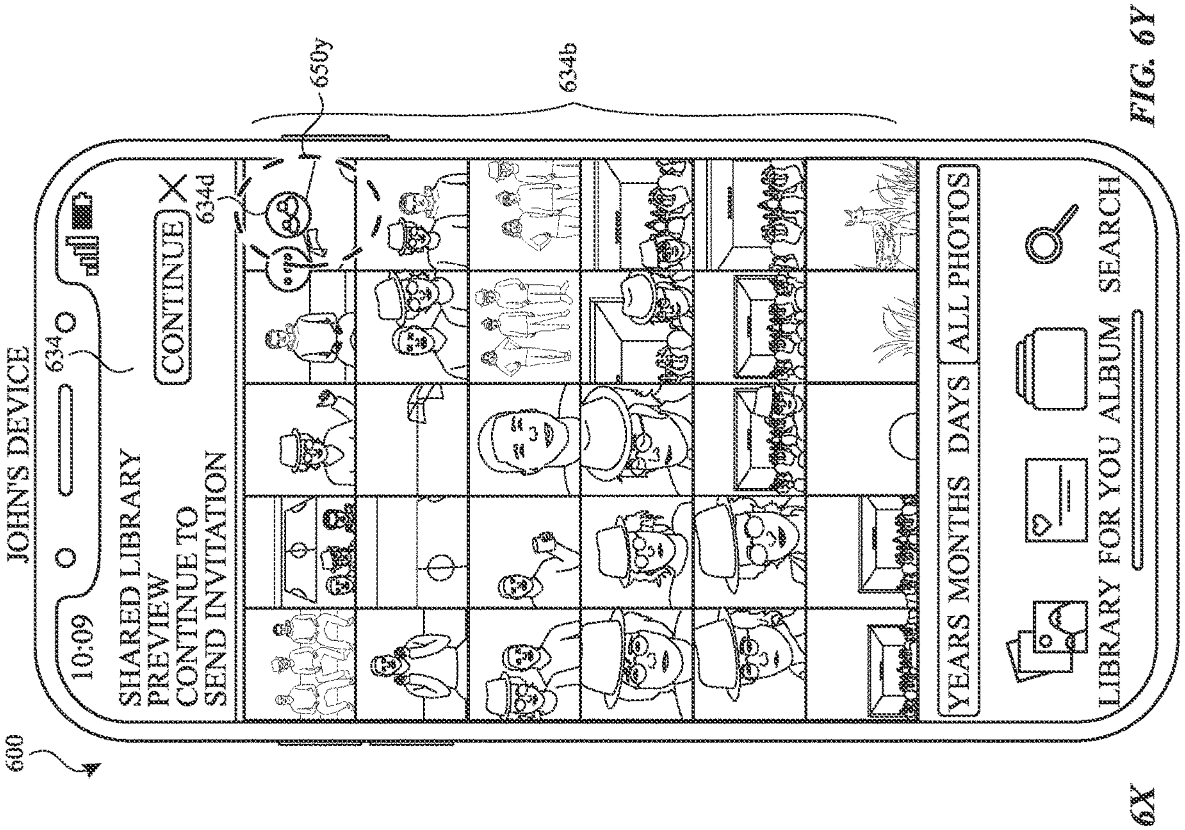
Figure 6A:
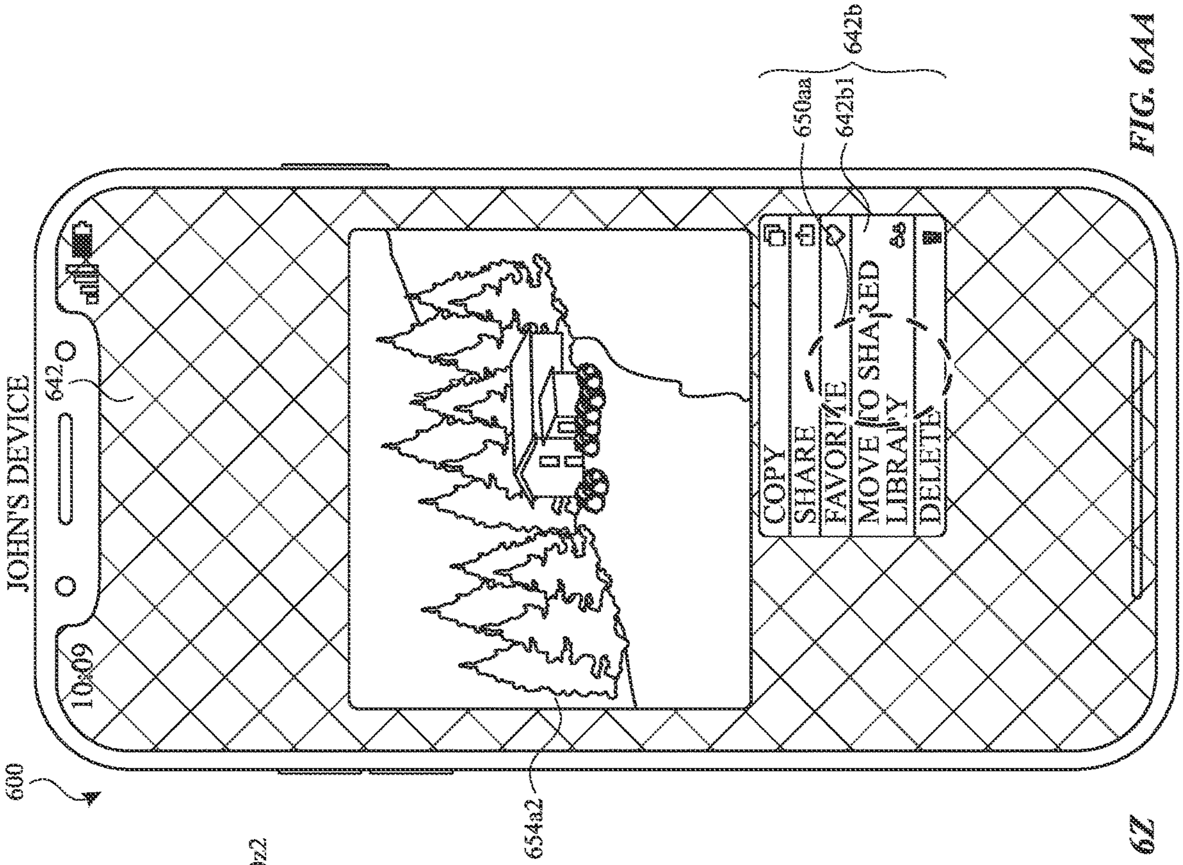
Figure 6Z:
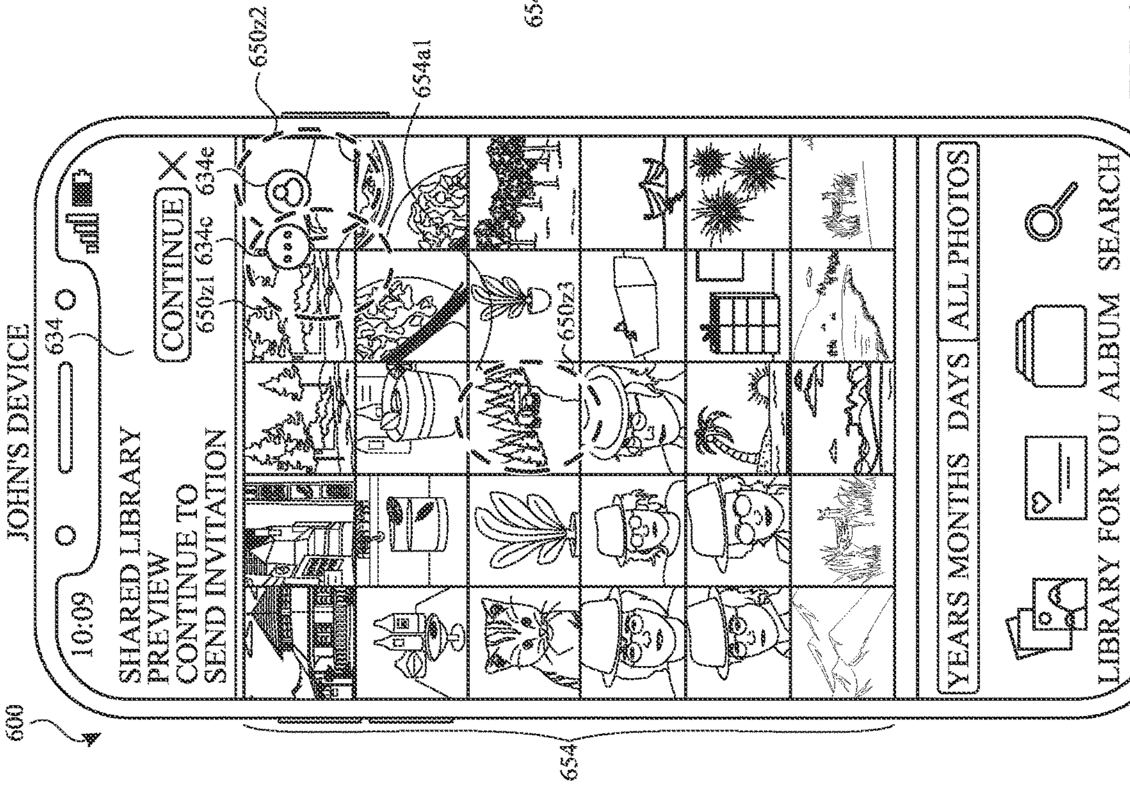
Figure 6A:
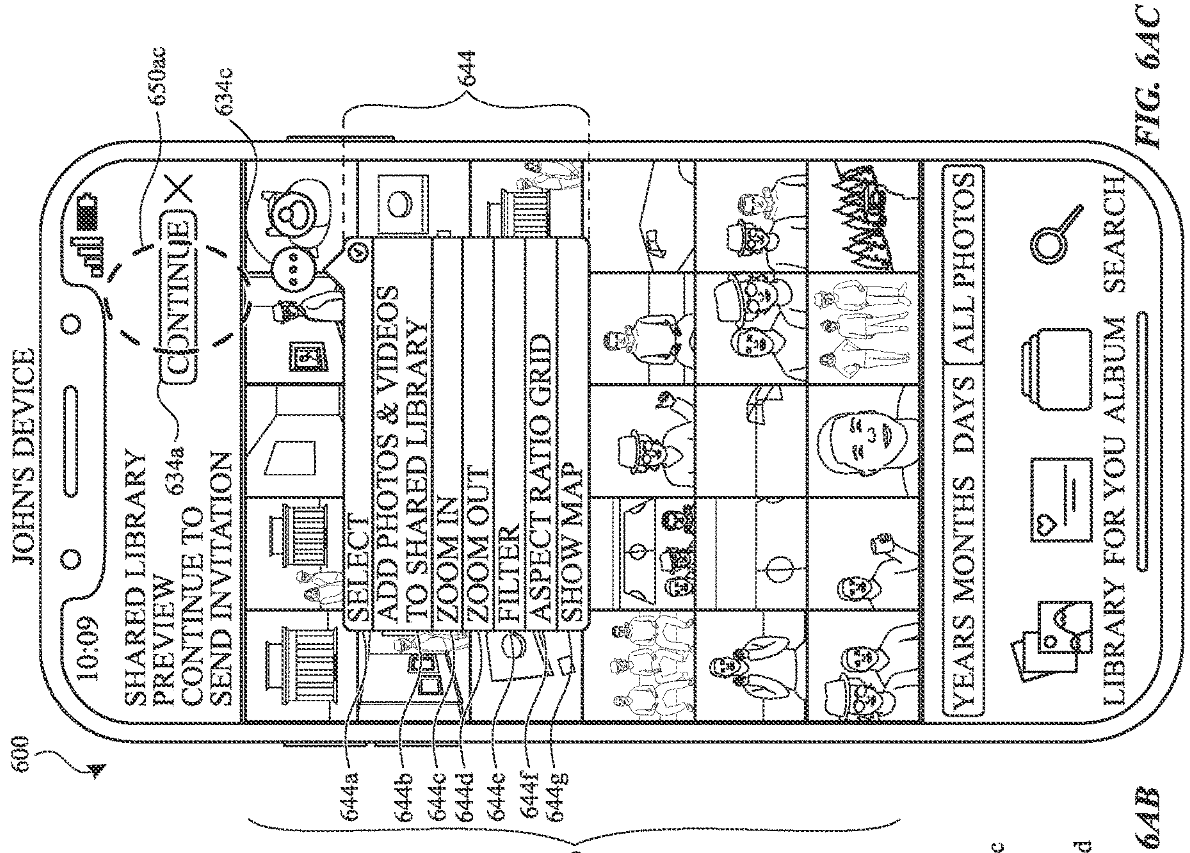
Figure 6A:
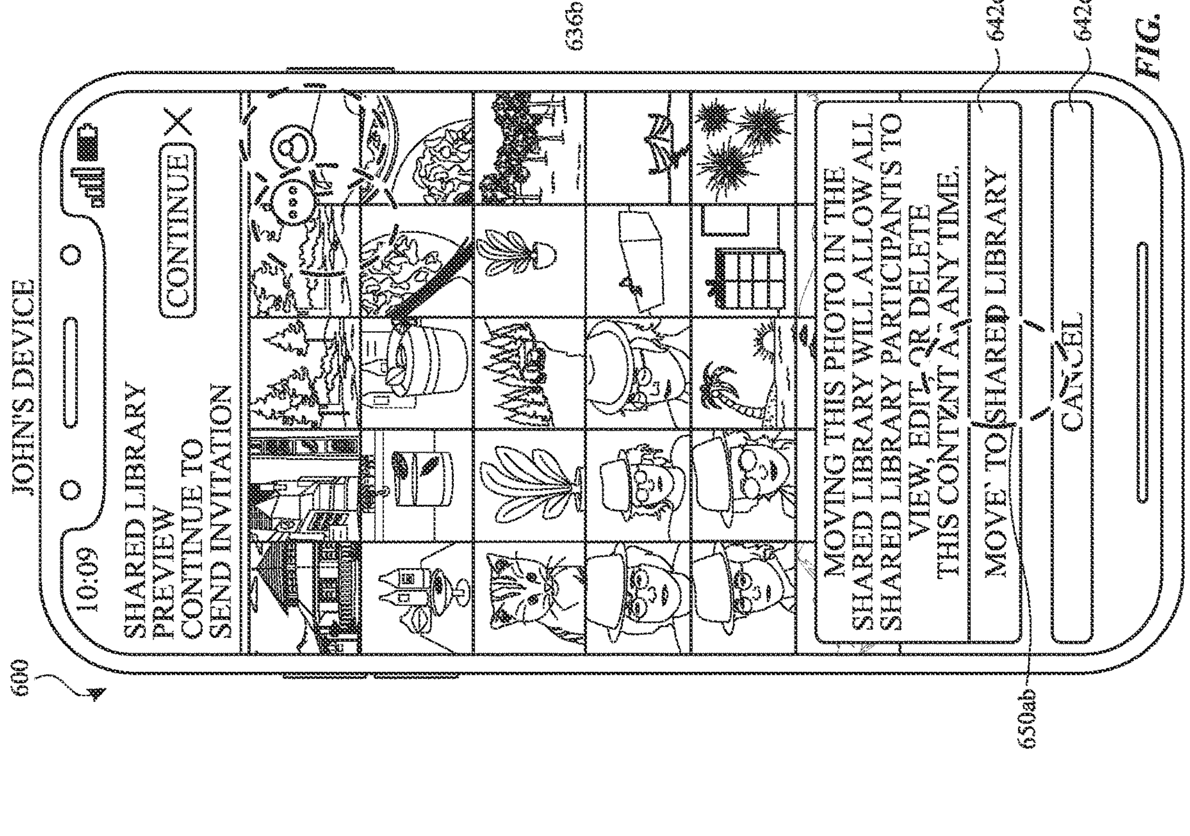
Figure 6A:
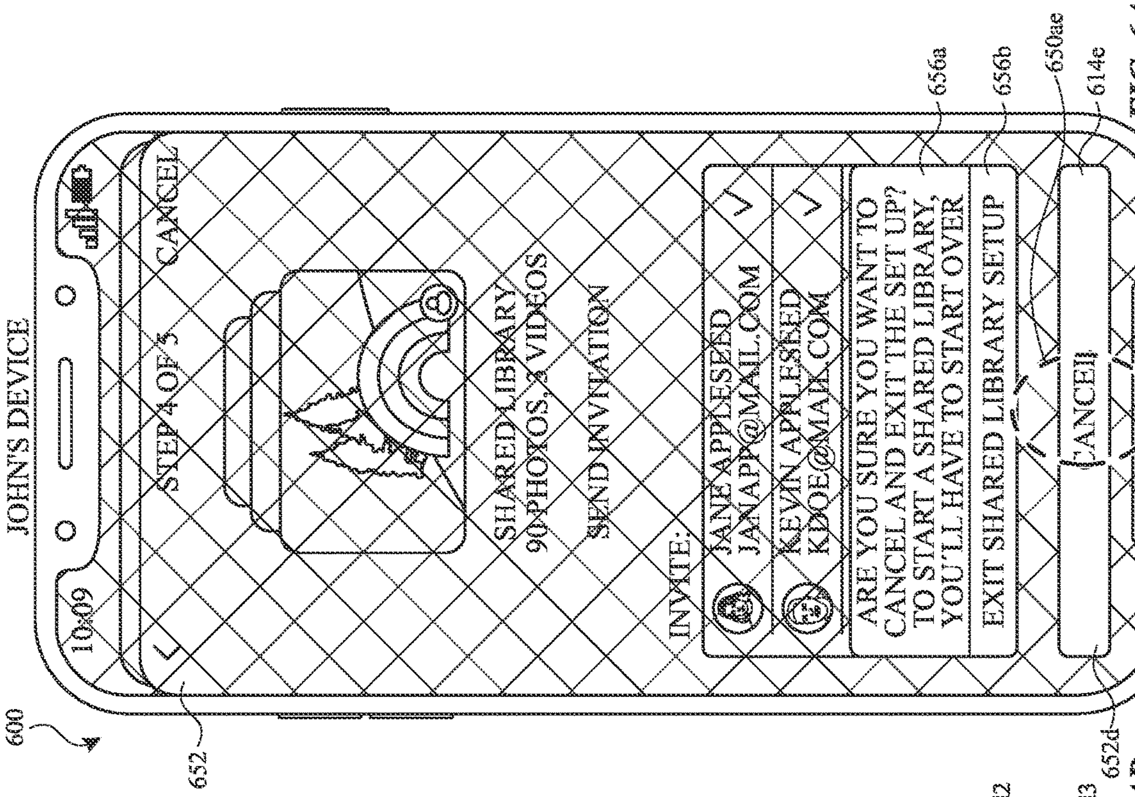
Figure 6A:
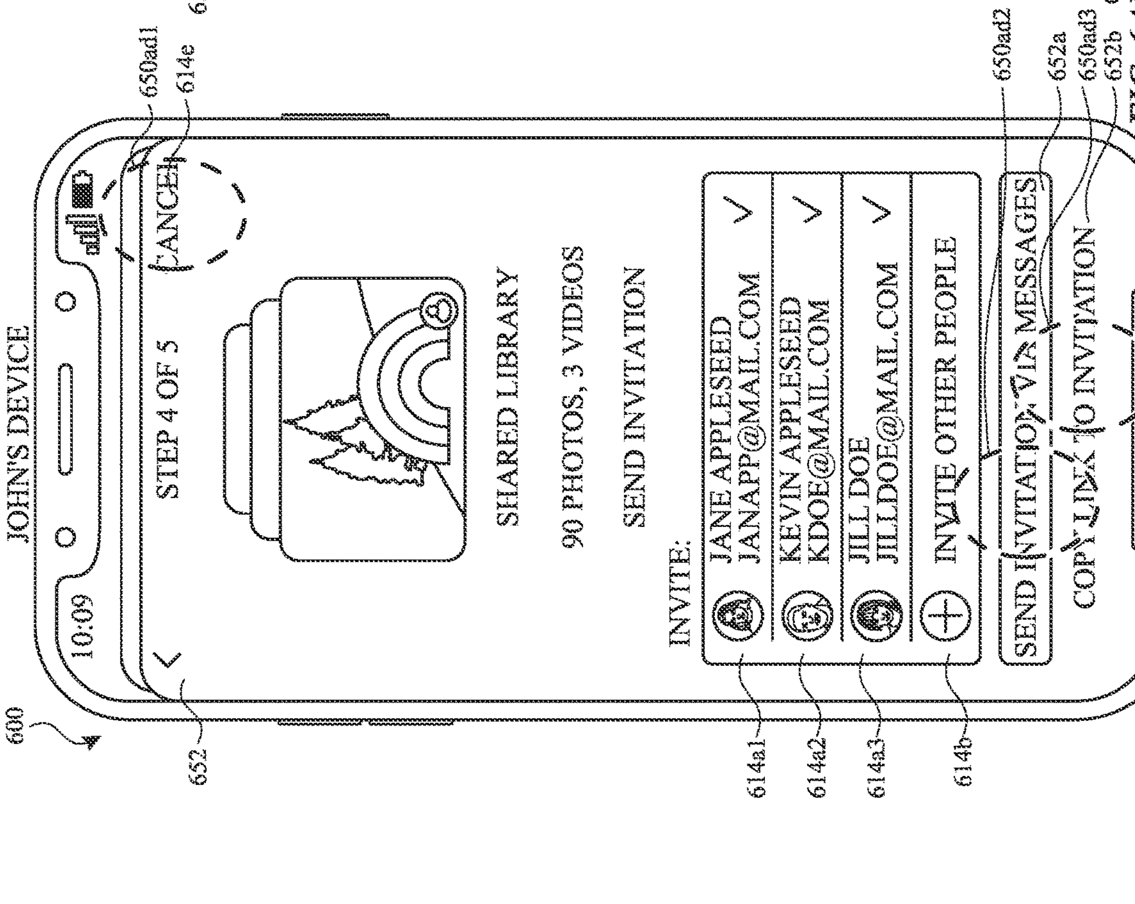
Figure 6A:
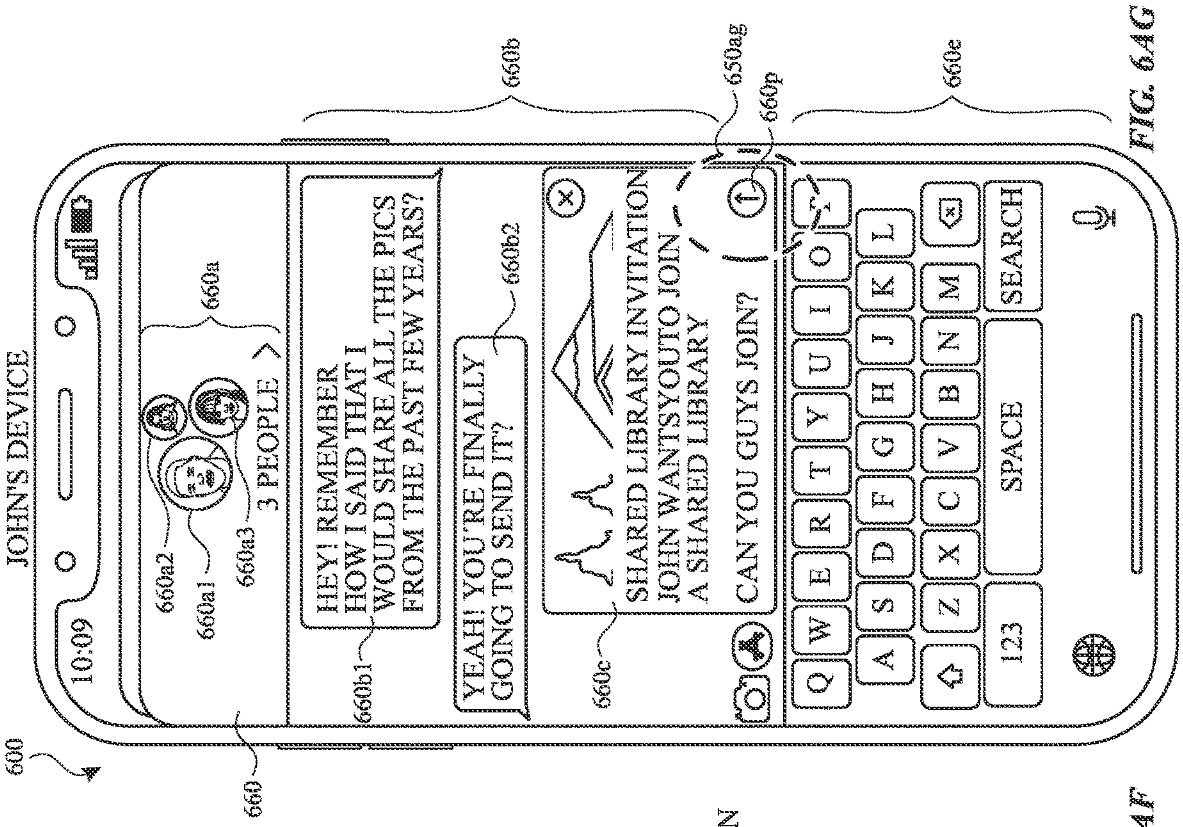
Figure 6A:
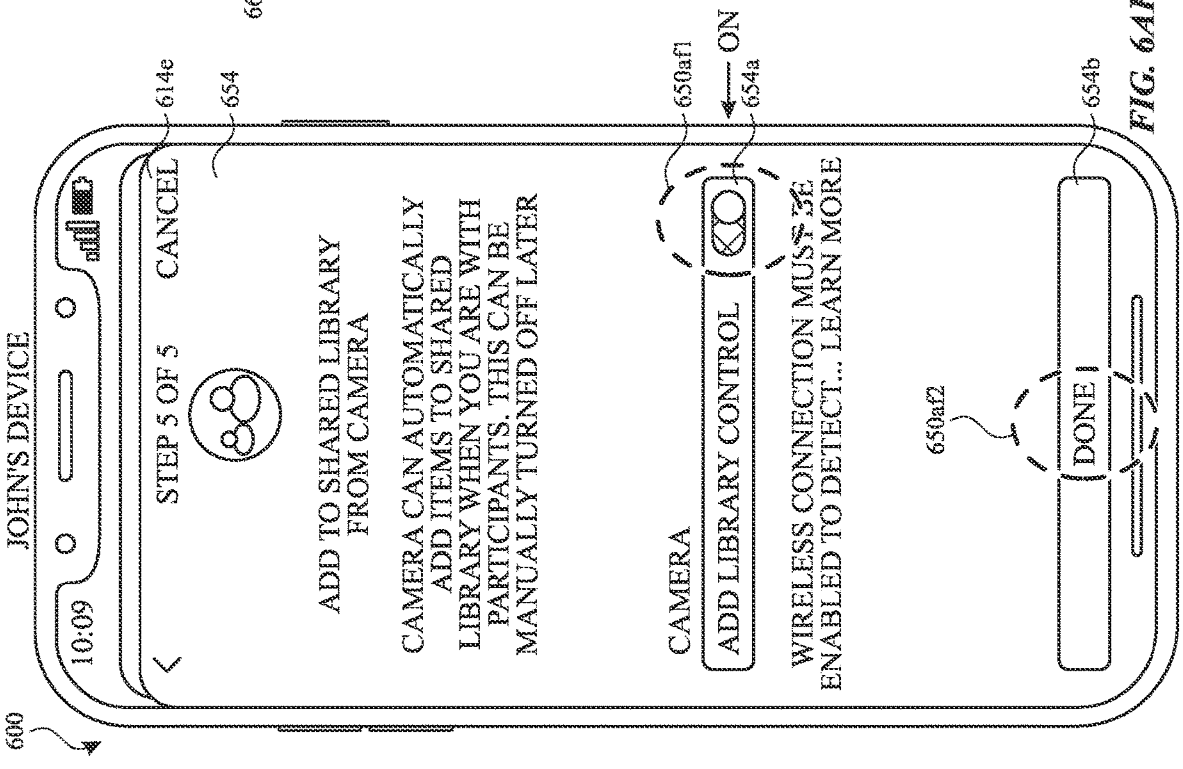
Figure 6A:
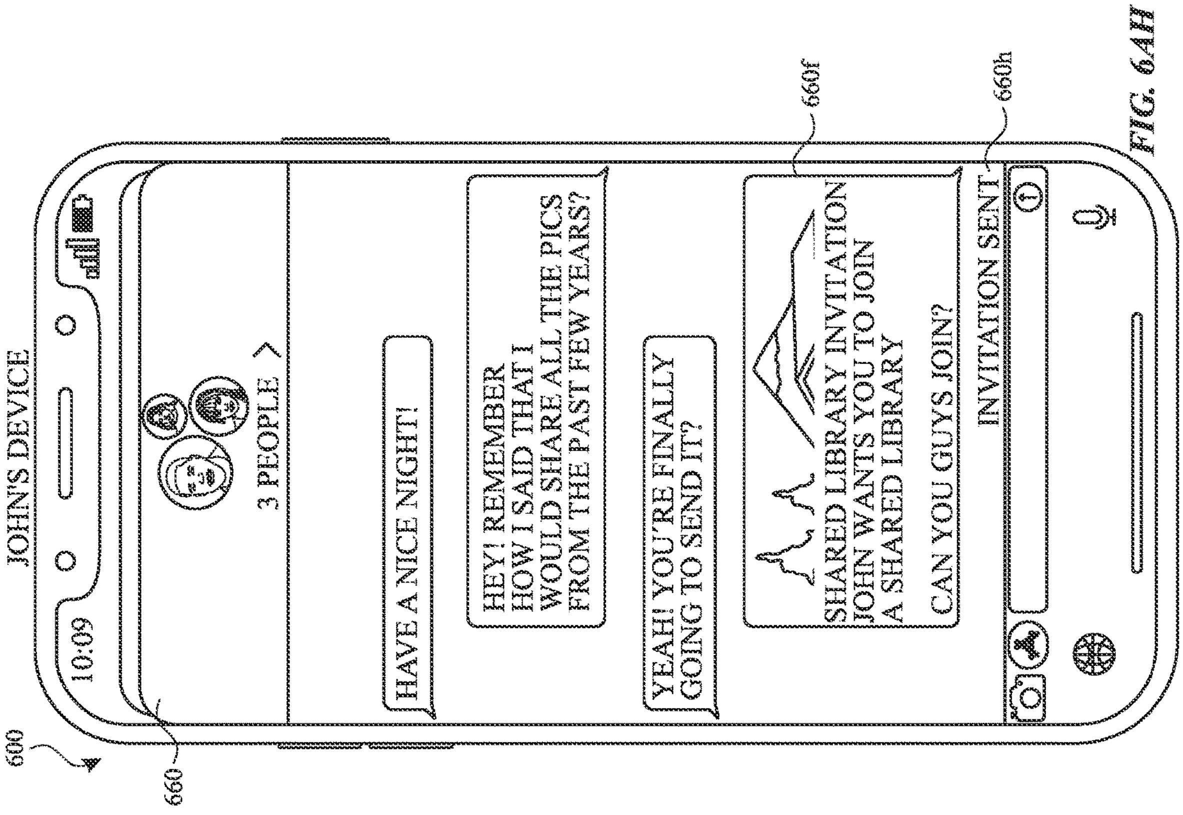
Figure 6A:
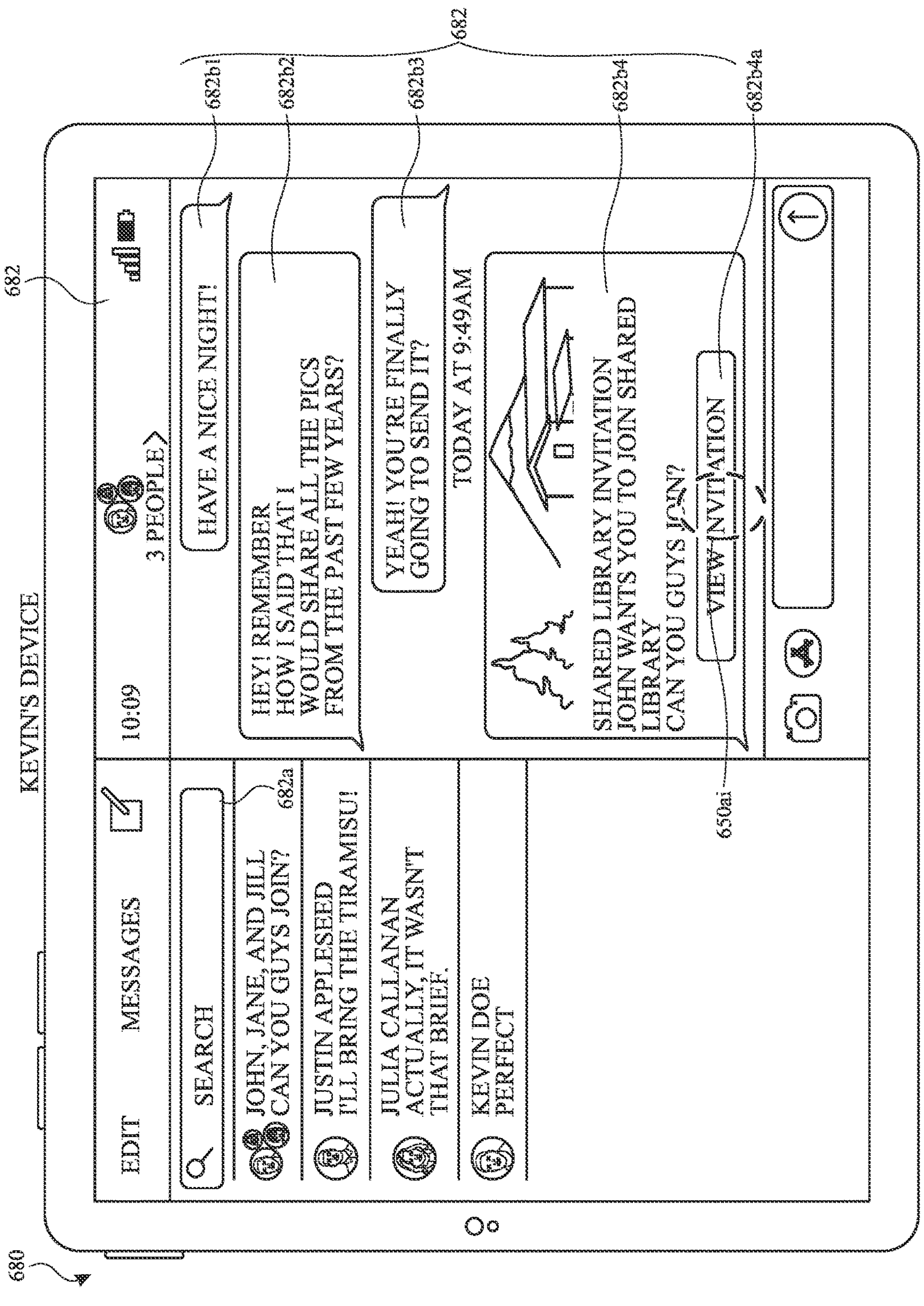
Figure 6A:
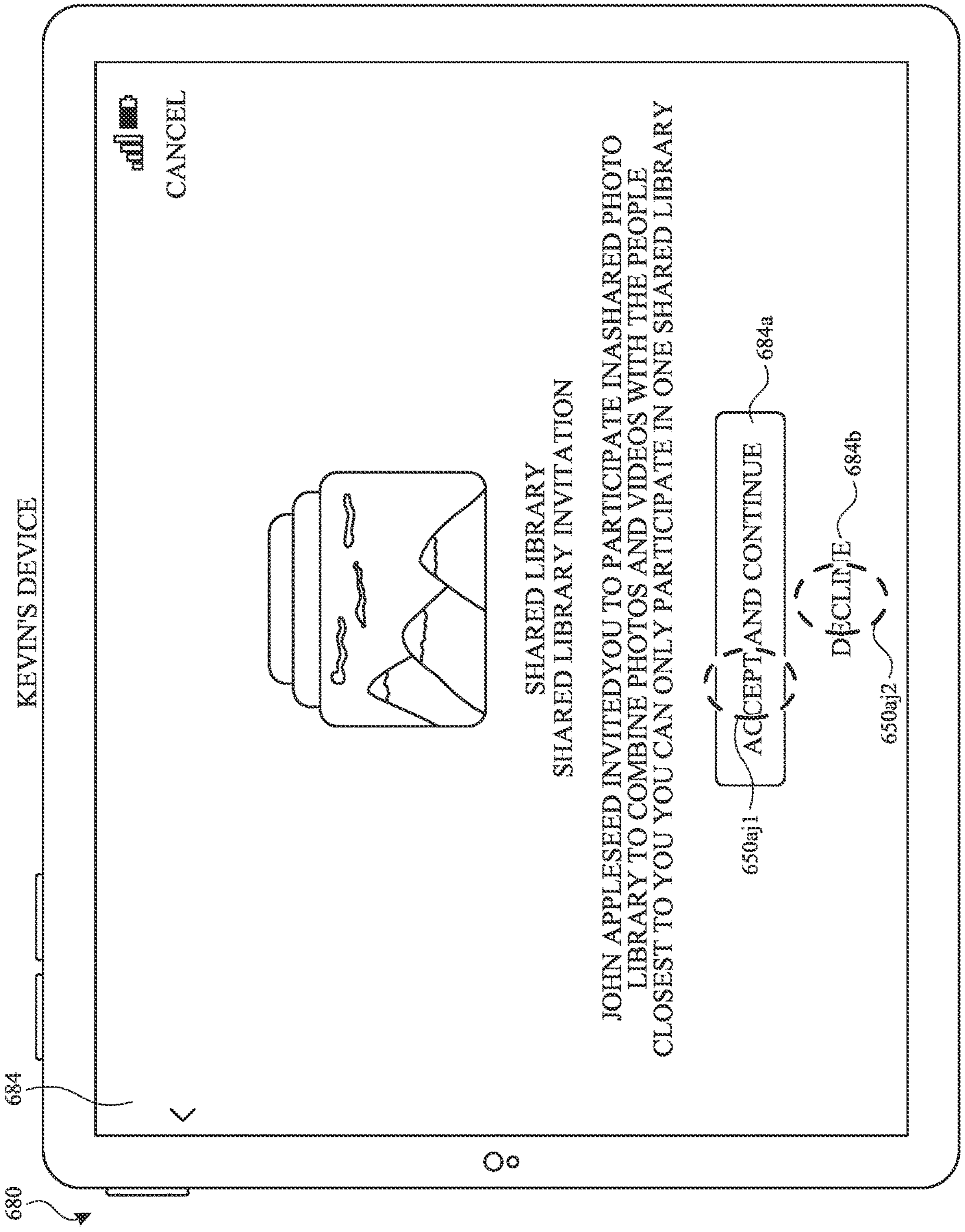
Figure 6A:
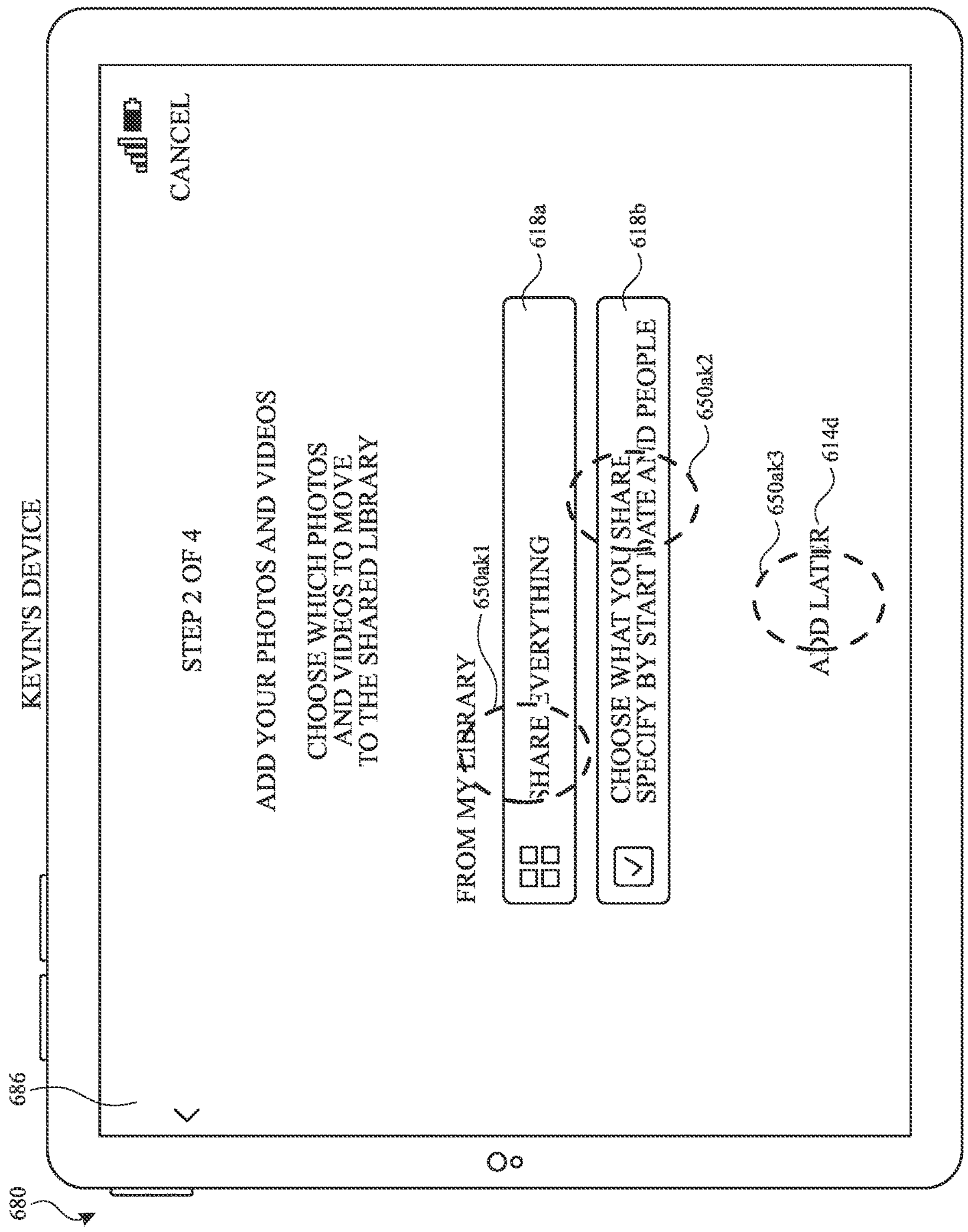
Figure 6A:
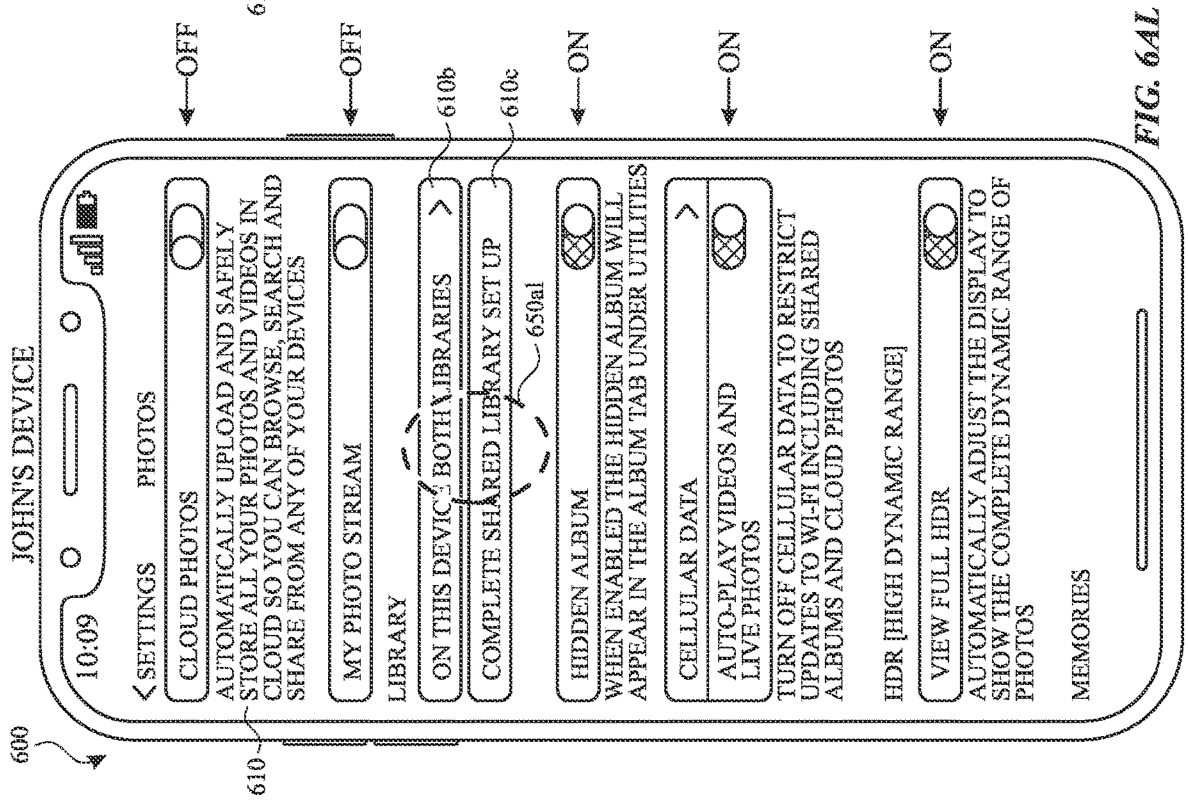
Figure 6A:
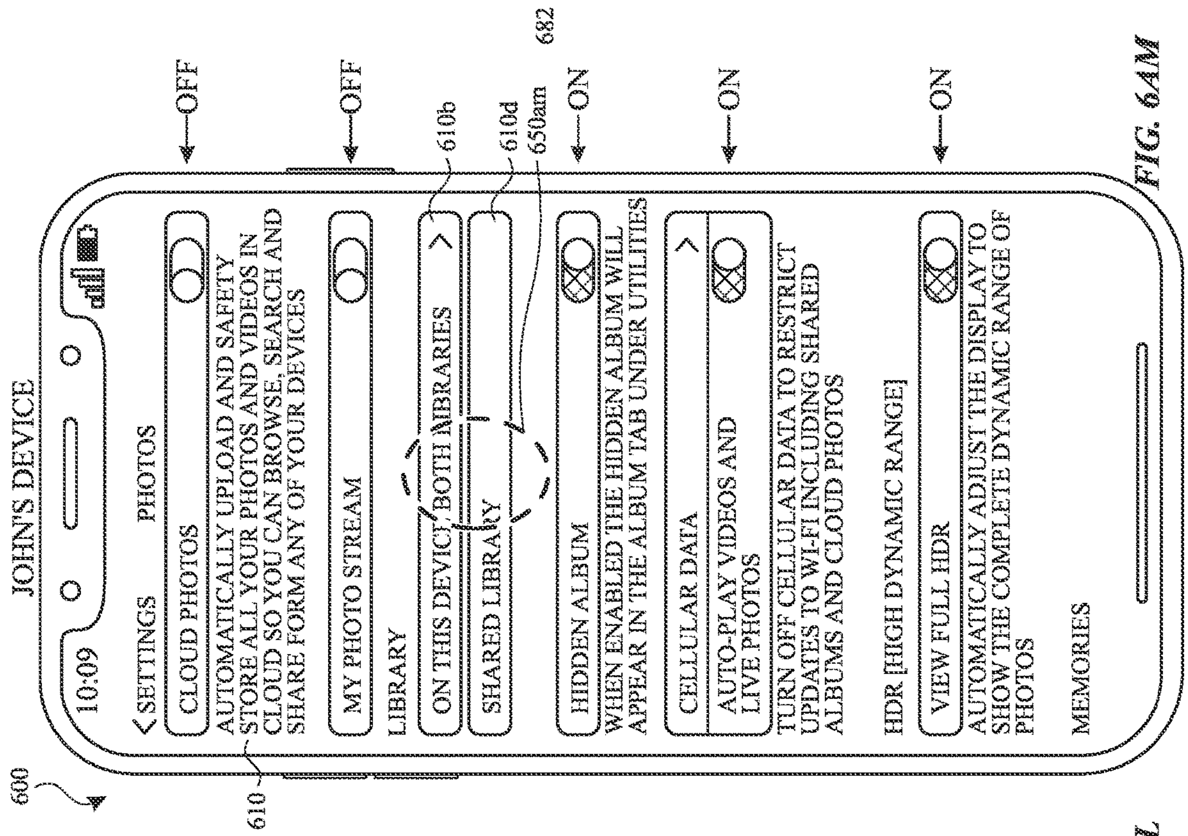
Figure 6A:
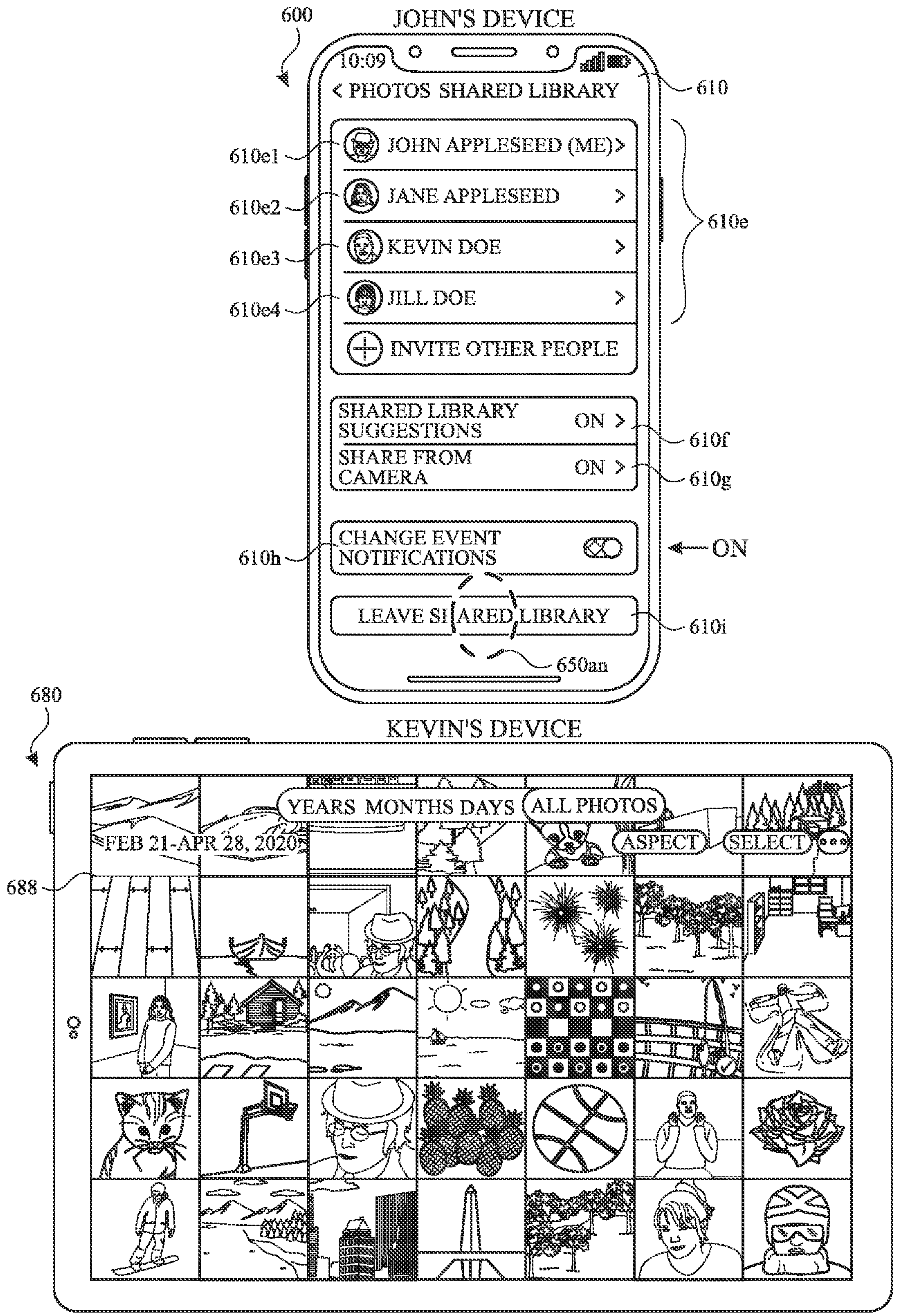
Figure 6A:
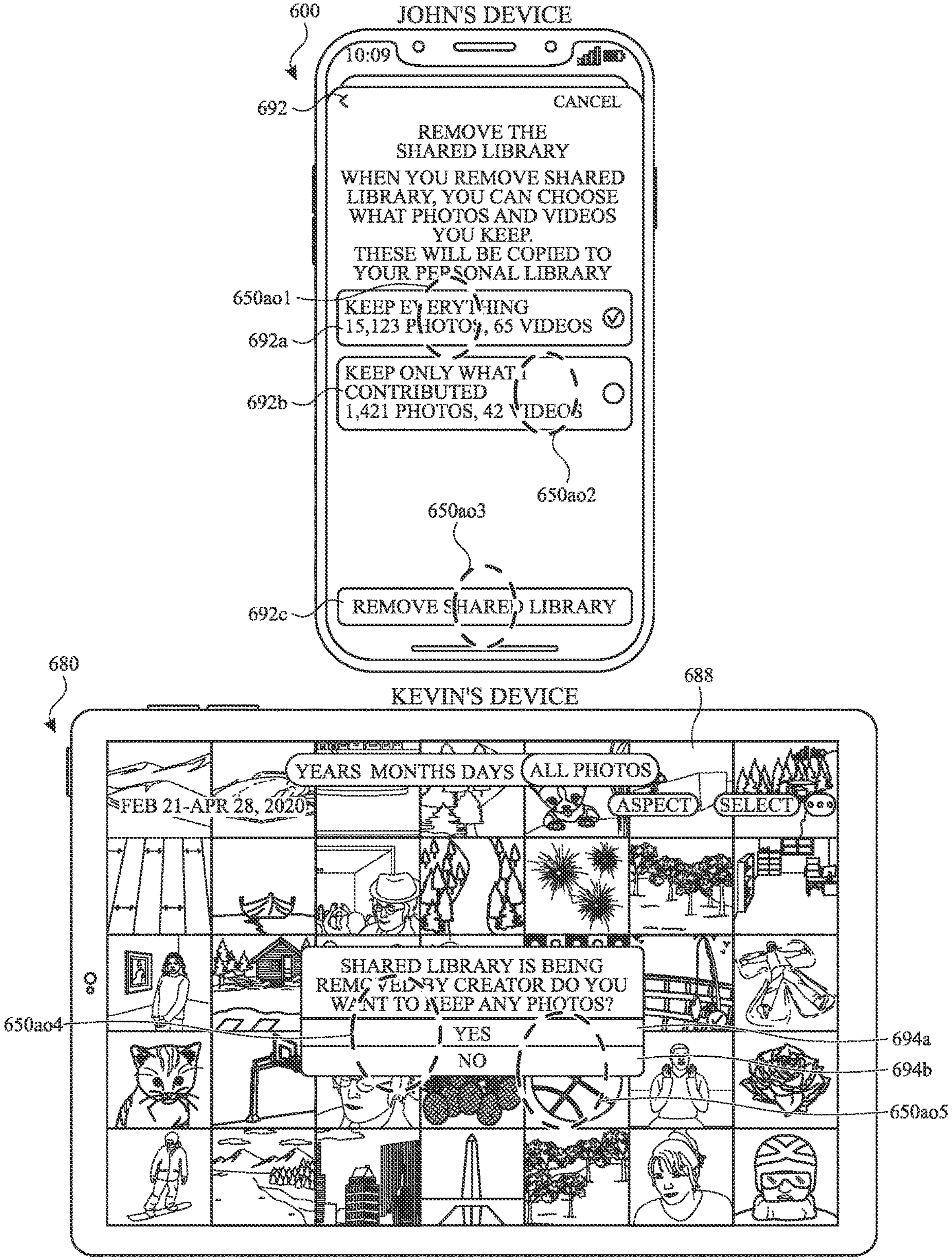

At FIG. 6X, computer system 600 detects tap input 650*x* on back control 620*d*. As illustrated in FIG. 6Y, in response to detecting tap input 650*x* on back control 620*d*, computer system 600 re-displays review interface 634 that includes the media items for sharing with the shared library that is being created. At FIG. 6Y, computer system 600 detects tap input 650*y* on shared library indication 634*d*. As illustrated in FIG. 6Z, in response to detecting tap input 650*y* on shared library indication 634*d*, computer system 600 removes media items for sharing with the shared library (e.g., media items 634*b*) and displays media items 654 that are currently in John's personal library. In addition, in response to detecting tap input 650*y* on shared library indication 634*d*, computer system 600 replaces shared library indication 634*d* with personal library indication 634*e* to indicate that media items in John's personal library (and not the shared library that is being created) are being displayed. At FIG. 6Z, computer system 600 detects tap input 650*z*1 on menu control 634*c*, detects tap input 650*z*2 on personal library indication 634*e*, or detects long-press input 650*z*3 on media item representation 654*a*1. In some embodiments, in response to detecting tap input 650*z*2 on personal library indicator, computer system 600 re-displays the user interface of FIG. 6Y (e.g., media items for the shared library) and ceases to display media items in John's personal library.

As illustrated in FIG. 6AA, in response to detecting long-press input 650*z*3 on media item representation 654*a*1, computer system 600 enlarges media item representation 654*a*1 to display enlarged representation 654*a*2 and ceases to display one or more elements of review interface 634, including personal library indication 634*e*. In addition, in response to detecting long-press input 650*z*3 on media item representation 654*a*1, computer system 600 displays menu 642*b*, which includes move-to-shared library control 642*b*1. In some embodiments, move-to-shared library control 642*b*1 is displayed because the media item represented by enlarged representation 654*a*2 (and media item representation 654*a*1) is associated with John's personal library and not the shared library. In some embodiments, a move-to-personal library control is displayed in response to detecting long-press input 650*z*3 on a media item that is associated with the shared library. In some embodiments, in response to detecting tap input 650*aa* on move-to-shared library control 642*b*1, computer system 600 causes the media item represented by enlarged representation 654*a*2 to be associated with the shared library. In some embodiments, in response to detecting an input on the move-to-personal library control, computer system 600 causes the media item represented by a respective enlarged representation to be associated with John's personal library and/or to not be associated with the shared library.

At FIG. 6AA, computer system 600 detects tap input 650*aa* on move-to-shared library control 642*b*1. As illustrated in FIG. 6AB, in response to detecting tap input 650*aa* on move-to-shared library control 642*b*1, computer system 600 displays move-to-shared-library confirmation control 642*c* and cancel control 642*d*. In some embodiments, in response to detecting tap input 650*ab* on move-to-shared-library confirmation control 642*c*, computer system 600 causes the media item represented by enlarged representation 654*a*2 to be associated with the shared library (or, in some embodiments, to not be associated with the shared library when conforming a move to the personal library or not to share with the shared library).

As illustrated in FIG. 6AC, in response to 600 detecting tap input 650*z*1 on menu control 634*c*, computer system 600 displays menu 644. Menu 644 includes select control 644*a*, add-media-to-shared-library control 644*b*, zoom-in control 644*c*, zoom-out control 644*d*, filter control 644*e*, aspect ratio grid control 644*f*, and show map control 644*g*. In some embodiments, in response to detecting an input on filter control 644*e*, computer system 600 displays a user interface for filtering the media being presented. In some embodiments, the user interface for filtering the media includes a control that, when selected, causes computer system 600 to filter the presented media items by a selected person or a participant of the shared library (e.g., view all media items of John or view all media items of Jane in the shared library). In some embodiments, the user interface for filtering the media includes a control that, when selected, causes computer system 600 to hide duplicate media items (and/or to not hide duplicate media items). In some embodiments, the user interface for filtering the media includes a control that, when selected, causes the computer system 600 to filter the presented media items by library (e.g., view media items from the shared library and the personal library, view media items from the shared library, and/or view media items from the personal library without viewing media items from a different library). In some embodiments, the user interface for filtering the media includes a control that, when selected, causes the computer system 600 to filter the presented media items by contributor (e.g., media items contributed by John, media items contributed by Jane, etc.), by the media items that the user of computer system 600 contributed (e.g., "all media items contributed by John") to the shared library, by the media items that the user of computer system 600 did not contribute to the shared library (e.g., "all media items that were not contributed by John"). In some embodiments, in response to detecting an input on add-media-to-shared-library control 644*b*, computer system 600 initiates a process to add additional items to the shared library (e.g., by re-displaying the user interface of FIG. 6T and/or displaying media items in John's personal library that are not included in the media items (e.g., media items 634*b*) that are being reviewed). At FIG. 6AC, computer system 600 detects tap input 650*ac* on continue control 634*a*.

As illustrated in FIG. 6AD, in response to detecting tap input 650*ac* on continue control 634*a*, computer system 600 displays send-invitation user interface 652. Send invitation user interface 652 includes participant control 614*a*1, participant control 614*a*2, and participant control 614*a*3 because these controls indicate that Jane, Kevin, and Jill have been invited to be participants in the shared library (e.g., as described above in relation to FIGS. 6D-6F). Notably, there is no participant control for Valeria because she was not added as a participant of the shared library (e.g., as discussed above in relation to FIGS. 6Q-6T). Send invitation user interface 642 also includes invite-other-participants control 614*b*, send-invitation-via-messages control 652*a*, copy-link-to-invitation control 652*b*, and cancel control 614*e*. At FIG. 6AD, computer system 600 detects tap input 650*ad*1 on cancel control 614*e*, tap input 650*ad*2 on send-invitation-via-messages control 652*a*, or tap input 650*ad*3 on copy-link-to-invitation control 652*b*.

As illustrated in FIG. 6AE, in response to detecting tap input 650*ad*1 on cancel control 614*e*, computer system 600 displays cancellation confirmation indication 656*a*, cancellation confirmation control 656*b*, and cancel control 614*e*. Cancel confirmation indication 656*a* indicates that the setting up of the shared library can be canceled. In some embodiments, in response to detecting a tap input on cancellation confirmation control 656*b*, computer system 600 ends the process for creating the shared library and displays the user interface of FIG. 6AL (or FIG. 6B), which is described in further detail below. At FIG. 6AE, computer system 600 detects tap input 650*ae* on cancel control 614*e* and, in response to detecting tap input 650*ae*, re-displays the user interface of FIG. 6AD.

As illustrated in FIG. 6AF, in response to detecting tap input 650*ad*2 on send-invitation-via-messages control 652*a* or tap input 650*ad*3 on copy-link-to-invitation control 652*b*, computer system 600 displays add-to-sharing-library-fromcamera-configuration user interface 654. Add-to-sharing-library-from-camera-configuration user interface 654 includes add-library-control setting 654*a* and done control 654*b*. At FIG. 6AF, computer system 600 will be configured to automatically add media that has been captured by a camera of computer system 600 to the shared library (e.g., after tap input 650*af*2 is detected) (e.g., as further described below in relation to FIGS. 10A-10N) because add-library-control setting 654*a* is enabled. In some embodiments, in response to detecting tap input 650*af*1 on add-library-control setting 654*a*, computer system 600 would not be configured to automatically add media that has been captured by a camera of computer system 600 to the shared library (e.g., after tap input 650*af*2 is detected) and add-library-control setting 654*a* is disabled. At FIG. 6AF, computer system 600 detects tap input 650*af*2 on done control 654*b*. In some embodiments, after detecting tap input 650*af*2 on done control 654*b*, computer system 600 creates the shared library and/or ends the process for creating the shared library. In some embodiments, after detecting tap input 650*af*2 on done control 654*b*, computer system 600 is configured to automatically add media that has been captured by a camera of computer system 600 to the shared library if add-library-control setting 654*a* was enabled when tap input 650*af*2 was detected. In some embodiments, after detecting tap input 650*af*2 on done control 654*b*, computer system 600 is not configured to automatically add media that has been captured by a camera of computer system 600 to the shared library if add-library-control setting 654*a* was disabled when tap input 650*af*2 was detected.

Looking back at FIG. 6AD, computer system 600 detected tap input 650*ad*2 on send-invitation-via-messages control 652*a* or tap input 650*ad*3 on copy-link-to-invitation control 652*b*. In some embodiments, in response to detecting tap input 650*ad*2 on send-invitation-via-messages control 652, computer system 600 sends one or more invitations (e.g., an invitation per participant and/or an invitation to all participants or some participants), such that a messaging user interface is displayed in a messaging application with the invitation being sent as further described below in FIG. 6AH. In some embodiments, in response to detecting tap input 650*ad*2 on send-invitation-via-messages control 652, computer system 600 prepares one or more invitations for sending, such that a messaging user interface is displayed in a messaging application with the invitation prepared to be sent as further described below in FIG. 6AG. In some embodiments, in response to detecting tap input 650*ad*3 on copy-link-to-invitation control 652*b*, computer system 600 does not send an invitation and/or prepare an invitation to be sent. In some embodiments, in response to detecting tap input 650*ad*3 on copy-link-to-invitation control 652*b*, computer system 600 copies data corresponding to the invitation (e.g., a link to the invitation) into a copy buffer.

FIG. 6AG illustrates computer system 600 displaying messaging user interface 660 sometime after tap input 650*ad*2 or tap input 650*ad*3 was detected at FIG. 6AD. As illustrated in FIG. 6AG, messaging user interface 660 recipient region 660*a*, message transcript region 660*b*, messaging body field 660*d*, keyboard region 660*e*, and send control 660*f*. Recipient region 660*a* includes recipient representations 660*a*1-660*a*3. One or more (or all) recipient representation corresponds to a person that is a part of a messaging conversation (e.g., as denoted by messages 660*b*1-660*b*2 in messaging transcript region 660*b*) with John (e.g., the user of computer system 600). At FIG. 6AG, one or more (or all) recipient representations 660*a*1-660*a*3 corresponds to one of Jane, Kevin, and Jill. Thus, at FIG. 6AG, the user of computer system 600 is in a group messaging conversation with Jane, Kevin, and Jill. Notably, Valeria (e.g., discussed above in relation FIGS. 6Q-6T) is not a part of the messaging conversation because Valeria has been designated as a person whose face is being used to filter media items for the shared library and not as participant with which the shared library is shared (e.g., discussed above in relation FIGS. 6Q-6T). At FIG. 6AG, messaging body field 660*c* includes invitation 660*c* along with some text ("Can you guys join?"). In some embodiments, the text is inserted into messaging body field 660*c* in response to detecting one or more inputs that are directed to keyboard region 660*e*. At FIG. 6AG, computer system 600 detects input 650*ag* on send control 660*f*.

As illustrated in FIG. 6AH, in response to detecting input 650*ag* on send control 660*f*, computer system 600 sends the message that is in messaging body field 660*d* (e.g., invitation 660*c* along with some text ("Can you guys join?"), which is indicated by sent message 660*g*. At FIG. 6AH, computer system 600 also displays invitation status indication 660*h*, which indicates a current status ("invitation sent") that is related to invitation 660*c*. In some embodiments, invitation status indication 660*h* is dynamic and updates whether one or more invitation milestones has taken place. In some embodiments, in response to detecting that Kevin (or another participant) has accepted (or rejected, viewed, read, and/or opened) the invitation, invitation status indication 660*h* is updated to indicate that Kevin (or another participant) has accepted (or rejected, viewed, read, and/or opened) the invitation. Looking at FIGS. 6B-6AH, it should be understood that one or more user interfaces described above can be skipped and/or shown out of the order presented herein while a person is creating a shared library. In some embodiments, FIGS. 6B-6AH are presented to a person in different combinations and/or in different orders than the combination and order that are provided in FIGS. 6B-6AH.

FIGS. 6AI-6AK illustrate an exemplary embodiment, where an invitation to participate in a shared library is sent to a prospective participant. FIG. 6AI illustrates computer system 680 displaying messaging user interface 682 that includes search region 682*a* and messaging transcript region 682*b* (e.g., along with one or more similar elements to those described above in relation to messaging user interface 660 of FIG. 6AG). Messaging transcript region 682*b* includes messages 682*b*1-682*b*4, where message 682*b*4 is the message that was sent by computer system 600 at FIGS. 6AG-6AH. Message 682*b*4 includes view-invitation control 682*b*4*a*. In some embodiments, computer system 680 includes one or more features of device 100, device 300, device 500, and/or 600. At FIG. 6AI, computer system 680 detects tap input 650*ai* on view-invitation control 682*b*4*a*.

As illustrated in FIG. 6AJ, in response to detecting tap input 650*ai* on view-invitation control 682*b*4*a*, computer system 680 displays participant-confirmation user interface 684. Participant-confirmation user interface 684 includes accept control 684*a* and decline control 684*b* and information concerning shared library, such as "John" being the person who sent the invitation. In some embodiments, participant-confirmation user interface 684 includes information, such as when the invitation was sent, types of media items included in the shared library, and/or the quantity of media items included in the shared library. At FIG. 6AJ, computer system 680 detects tap input 650*aj* 1 on accept control 684*a* or tap input 650*aj*2 on decline control 684*b*. In some embodiments, in response to detecting tap input 650*aj*2 on decline control 684*b*, computer system 680 sends an instruction that causes the user of computer system 680

(e.g., Kevin) to not be a participant of the shared library that was organized (and/or created) by John in FIGS. 6B-6AH.

As illustrated in FIG. 6AK, in response to detecting tap input 650*aj* 1 on accept control 684*a*, computer system 680 displays sharing user interface 686 (e.g., which is similar to sharing user interface 618 described above in relation to FIG. 6G). Sharing user interface 686 includes share-everything control 618*a*, choose-what-to-share control 618*b*, and skip control 614*d*. In some embodiments, in response to detecting tap input 650*ak*1 on share-everything control 618*a*, computer system 680 is configured to share all items in Kevin's personal library (e.g., using similar techniques as described above in relation to FIG. 6G) in the shared library that John organized (e.g., in FIGS. 6B-6H). In some embodiments, in response to detecting tap input 650*ak*2 on choose-what-to-share control 618*b*, computer system 680 displays one or more user interfaces that are similar to user interfaces 6AB-6AF so that Kevin can choose media items to add, choose how to identify additional media items, choose whether captured media items should automatically be added to the shared library, and/or preview media items (e.g., amongst other things). In some embodiments, in response to detecting tap input 650*ak*3 on skip control 614*d*, computer system 680 does not add any media items from Kevin's personal library to the shared library. In some embodiments, after detecting an input on sharing user interface 686, computer system 680 displays a user interface that includes automatic-adding control 654*a*. In some embodiments, in response to detecting tap input 650*aj* 1 on accept control 684*a*, computer system 680 sends an instruction that causes Kevin to become a participant in the shared library that was organized (and/or created) by John in FIGS. 6B-6AH.

FIG. 6AL illustrates computer system 600 displaying settings user interface 610. Settings user interface 610 includes view-libraries control 610*b* and complete-set-up control 610*c*. Computer system 600 displays settings user interface 610 after detecting one or more user input on skip controls, decline controls, and/or done controls (e.g., as described above in relation to FIGS. 6B-6AH and 6AK). In other words, computer system 600 displays settings user interface 610 of FIG. 6AL when an organizer has started to create a shared library but has not finished created the shared library. In some embodiments, in response to detecting an input on view-libraries control 610*b*, computer system 600 displays a user interface for identifying information concerning John's personal library and the shared library, such as settings user interface 610 of FIG. 6AN (e.g., described below). In some embodiments, in response to detecting tap input 650*a*1 on complete-set-up control 610*c*, computer system 600 displays one or more user interfaces of FIGS. 6B-6AH, so that a person (e.g., John) can finish setting up the shared library. In some embodiments, the initial user interface that is displayed in response to detecting an input on complete-set-up control 610*c* is determined based on the portions of the process to create the shared library that were skipped (e.g., in FIGS. 6B-6AH).

FIG. 6AM illustrates computer system 600 displaying settings user interface 610. Settings user interface 610 includes view-libraries control 610*b* and view-shared-library-settings control 610*d*. In some embodiments, settings user interface 610 is displayed after a person has completed the process to create the shared library (e.g., in response to tap input 650*af*2 of FIG. 6AF). At FIG. 6AM, computer system 600 detects tap input 650*am* on view-shared-library-settings control 610*d*.

As illustrated in FIG. 6AN, in response to detecting tap input 650*am* on view-shared-library-settings control 610*d*, computer system 600 displays settings user interface 610 with participant settings 610*e*1-610*e*4 (e.g., which represents to participants to the shared library that was created), shared-library-suggestions-setting 610*f*, share-from-camera-setting 610*g*, change-events-notifications setting 610*h*, and leave-shared-library control 610*i*. In some embodiments, when shared-library-suggestions setting 610*f* is enabled, computer system 600 is configured to output suggestion notifications concerning recommendations for media items to be included in the shared library (e.g., as further discussed below in relation to FIGS. 11A-11L) (e.g., and not configured when disabled). In some embodiments, when share-from-camera-setting 610*g* is enabled, computer system 600 is configured to allow captured media items to be shared via a camera application (e.g., as further discussed below in relation to FIGS. 10A-10N) (e.g., and not configured when disabled). In some embodiments, change-events-notifications setting 610*h* is enabled, computer system 600 is configured to allow computer system 600 to display notification concerning one or more media items that have been changed (e.g., as further discussed below in relation to FIGS. 7A1-7J2).

At FIG. 6AN, computer system 600 detects tap input 650*an* on leave-shared-library control 610*i*. As illustrated in FIG. 6AO, in response to detecting tap input 650*an*, computer system 600 displays leave-shared-library user interface 692. Leave-shared-library user interface 692 include keep-everything control 692*a*, keep-your-contributions control 692*b*, and remove-shared-library control 692*c*. At FIG. 6AO, computer system 600 detects tap input 650*ao*1 on keep-everything control 692*a*, tap input 650*ao*2 on keep-your-contributions control 692*b*, or tap input 650*ao*3 on remove-shared-library control 692*c*. In some embodiments, in response to detecting tap input 650*ao*1 on keep-everything control 692*a*, computer system 600 displays keep-everything control 692*a* as being selected and keep-your-contributions control 692*b* as being unselected. In some embodiments, in response to detecting tap input 650*ao*2 on keep-your-contributions control 692*b*, computer system 600 displays keep-everything control 692*a* as being unselected and keep-your-contributions control 692*b* as being selected. In some embodiments, in response to detecting tap input 650*ao*3 on remove-shared-library control 692*c*, computer system 600 initiates a process to remove and/or delete the shared library. In some embodiments, in response to detecting tap input 650*ao*3 on remove-shared-library control 692*c* while keep-everything control 692*a* is displayed as being selected, computer system 600 moves the media items in the shared library to John's personal library. In some embodiments, in response to detecting tap input 650*ao*3 on remove-shared-library control 692*c* while keep-your-contributions control 692*b* is displayed as being selected, computer system 600 moves the items that John contributed to the shared library to John's personal library without moving items that others contributed to John's personal library.

At FIG. 6AO, in response to detecting tap input 650*ao*3 on remove-shared-library control 692*c*, computer system 600 causes computer system 680 to display confirm removal notification 694, which indicates that the shared library is being removed and prompts the user of computer system 680 to move media items from the shared library (e.g., that is being removed) to Kevin's personal library. At FIG. 6AO, in response to detecting input 650*ao*4 on yes-control 694*a*, computer system 680 displays a similar user interface to user interface 692 (e.g., that is displayed on computer system 600 in FIG. 6AO) in order to allow Kevin to choose between keeping everything from the shared library and/or items that Kevin contributed (e.g., without keeping items that others contributed). At FIG. 6AO, in response to detecting input 650*ao*5 on no-control 694*b*, computer system 680 ceases to display removal notification and, in some embodiments, no items are moved from the shared library to Kevin's personal library. In some embodiments, Kevin has the opportunity to keep items from the shared library until a predetermined period of time has elapsed (e.g., 1-7 days) after the shared library has been removed.

FIGS. 7A1-7U illustrate exemplary user interfaces for notifying participants of changes to one or more media libraries using a computer system in accordance with some embodiments. The user interfaces in these figures are used to illustrate the processes described below, including the processes in FIG. 9.

FIG. 7A1 illustrates computer system 600 displaying lock screen user interface 710 and computer system 680 displaying media viewer user interface 720. Computer system 600 belongs to "John" (e.g., as described above in relation to FIGS. 6A-6AO) while computer system 680 belongs to "Kevin" (e.g., as described above in relation to FIGS. 6A-6AO). At FIG. 7A1, lock screen user interface 710 displayed by computer system 600 does not include any notifications. Moreover, at FIG. 7A1, media viewer user interface 720 displayed by computer system 680 includes media viewer region 724 positioned between application control region 722 and application control region 726. Media viewer region 724 includes enlarged representation 724*a*, which is representative of the same media item as thumbnail media representation 712*a*. Media viewer region 724 is not substantially overlaid with controls, while application control region 722 and application control region 726 are substantially overlaid with controls. Enlarged representation 724*a* is displayed with shared library indication 720*a*, which indicates that the media represented by representation 724*a* is configured to be shared with the shared library (and, in some embodiments, not Kevin's personal library). In addition, enlarged representation 724*a* is also displayed with move-to-personal-library control 720*b*. Application control region 722 optionally includes an indicator of a time (e.g., "10:09" in FIG. 7A1), a cellular signal status indicator that shows the state of a cellular signal, and a battery level status indicator that shows the state of the remaining battery life of computer system 680. Application control region 722 also includes back control 722*a* (e.g., that, when selected, causes computer system 680 to re-display media gallery user interface 710), share control 722*b* (e.g., that, when selected, causes computer system 680 to initiate a process to share the media represented by enlarged representation 724*a* with one or more other participants), favorites control 722*c* (e.g., that, when selected, causes computer system 680 to designate the media represented by enlarged representation 724*a* as a favorited media item), information control 782*e* (e.g., that, when selected, causes computer system 680 to display metadata and/or additional information concerning the media represented by enlarged representation 724*a*), delete control 722*d* (e.g., that, when selected, causes computer system 680 to remove the media represented by enlarged representation 724*a*), and edit control 722*e* (e.g., that, when selected, causes computer system 680 to display a media editing user interface (e.g., user interface 786 of FIG. 7G)). Application control region 726 includes some of thumbnail media representations 712, which are displayed in a single row. Because enlarged representation 724*a* is displayed in media viewer region 724, thumbnail media representation 712*a* is displayed as being selected. In particular, thumbnail media representation 712*a* is displayed as being selected in FIG. 7A1 by being spaced from the other thumbnail media representations. FIG. 7A2 illustrates computer system 700 displaying a home screen user interface that does not include any notifications. Computer system 700 belongs to Jill, a participant of the shared library (e.g., as discussed above in relation to FIGS. 6A-6AO). Looking back at FIG. 7A1, computer system 680 detects tap input 750*a*1 on move-to-personal-library control 720*b*, tap input 750*a*2 on share control 722*b*, tap input 750*a*3 on favorites control 722*c*, tap input 750*a*4 on delete control 722*d*, tap input 750*a*5 on edit control 722*e*, or press-and-hold input 750*a*6 on enlarged representation 724*a*. In some embodiments, in response to detecting press-and-hold input 750*a*6, computer system 680 enlarges enlarged representation 724*a* and ceases to display one or more elements of media viewer user interface 720, such as shared library indication 720*a* (e.g., for one or more similar reasons as further discussed below in FIG. 10J). In some embodiments, a menu control (e.g., menu control 634*c* of FIG. 6AC) is displayed as a part of media view user interface 720. In some embodiments, one or more of computer systems 600, 680, and/or 700 include one or more features of device 100, device 300, or device 500. In some embodiments, one or more of computer system 600, 680, and/or 700 include one or more features of each other. It should be understood that one or more inputs described herein as a particular type of input, such as a tap input, press-and-hold input, and/or swipe input, could alternatively be replaced with another input. In some embodiments, an input described as a tap input could be replaced with a press-and-hold input, a swipe input, a mouse click input, a left click input, or an air gesture input. In some embodiments, a press-and-hold input could be replaced with a tap input, a swipe input, a mouse click and hold input, an option click input, a right click input, or an alternate air gesture input. In some embodiments, a swipe input could be replaced with a tap input, a press-and-hold input, and/or a mouse click and drag input, or an alternate air gesture input.

Figure 7B:
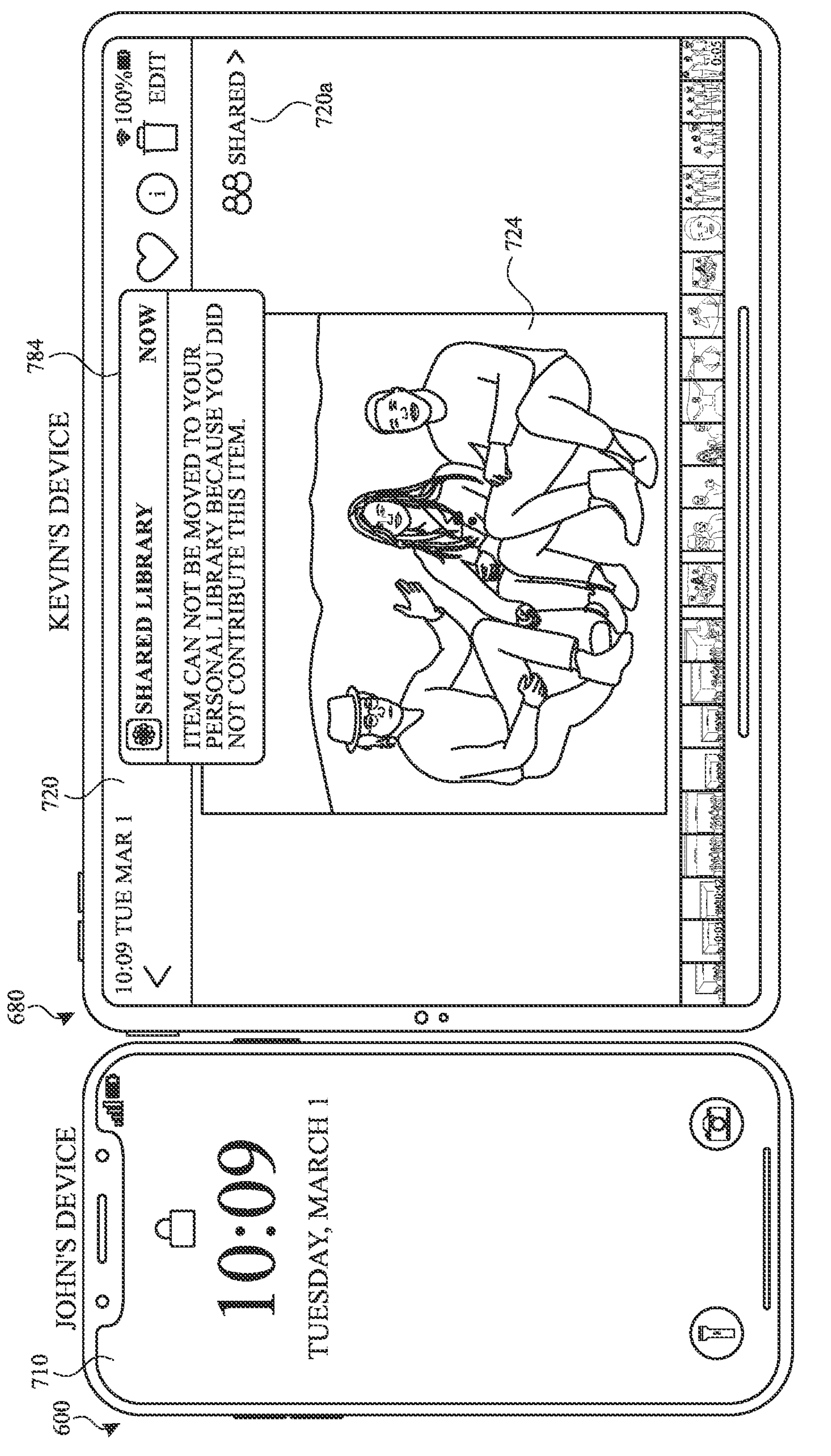

FIG. 7B illustrates an exemplary embodiment where a non-contributor of a respective media item (e.g., a person who did not contribute the respective media item to the shared library, such as a person who did not capture the respective media item and/or a person who did not add the respective item to the shared library) tries to move the respective media item from the shared library to a personal library (e.g., the non-contributor's personal library). As illustrated in FIG. 7B, in response to detecting tap input 750*a*1 on move-to-personal-library control 720*b*, computer system 680 displays notification 784, which indicates that Kevin cannot move the media represented by enlarged representation 724*a* to Kevin's personal library. At FIG. 7B, in response to detecting tap input 750*a*1 on move-to-personal-library control 720*b*, computer system 680 does not move the media represented by enlarged representation 724*a* from the shared library to Kevin's personal library. Here, Kevin cannot move the media represented by enlarged representation 724*a* to Kevin's personal library because a determination was made that Kevin did not contribute the media item represented by enlarged representation 724*a* to the shared library. In some embodiments, Kevin can move the media represented by enlarged representation 724*a* to Kevin's personal library, irrespective of a determination being made that Kevin did not contribute the media item represented by enlarged representation 724*a* to the shared library. In some embodiments, computer system 680 does not display move-to-personal-library control 720*b* in FIG.

7A1 (or grays it out) because Kevin did not contribute the media represented by enlarged representation 724*a* to the shared library.

Figure 7C:
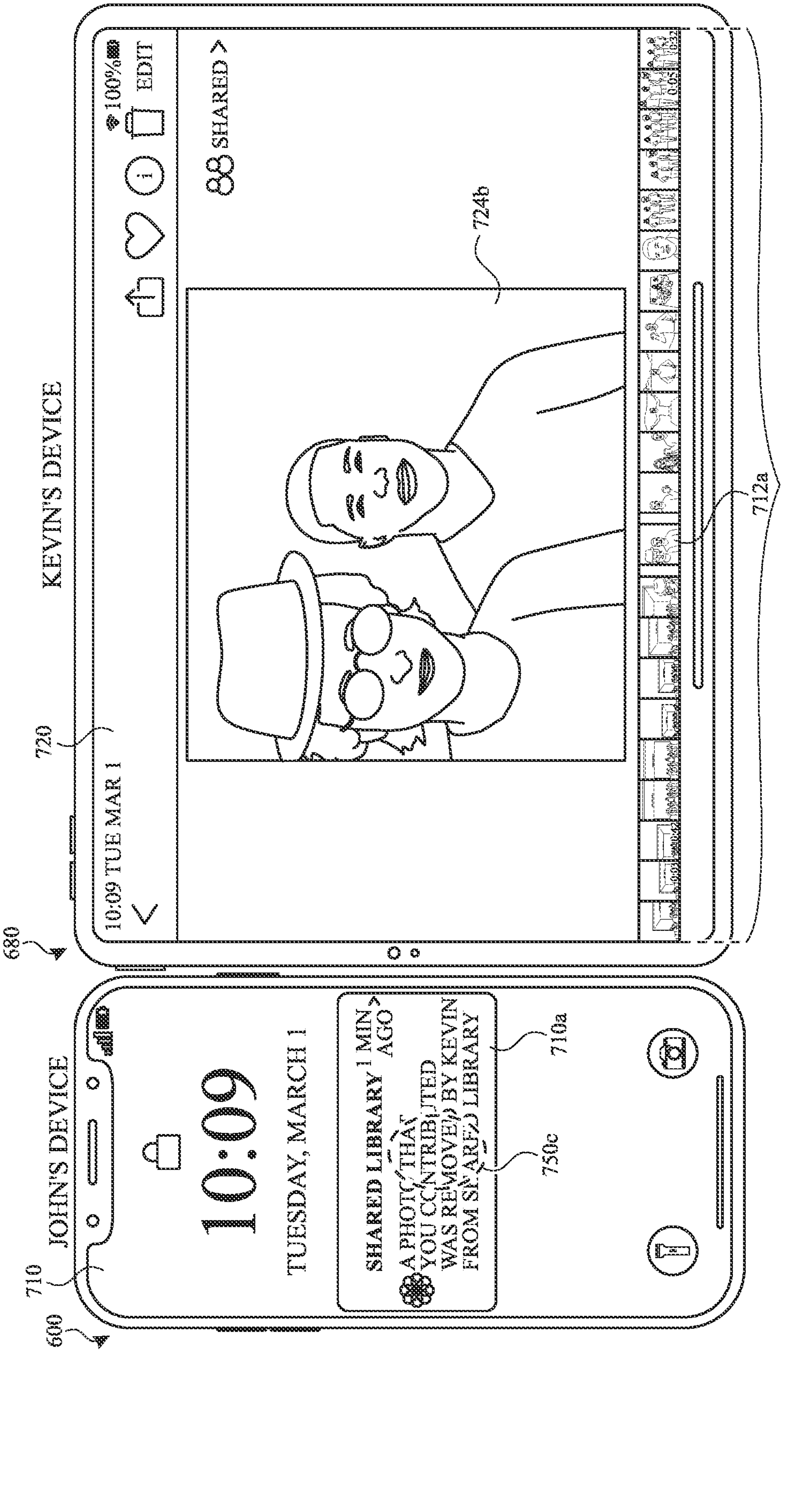

FIG. 7C illustrates an exemplary embodiment where a person, who did not contribute a respective media item to the shared library, attempts to make a change that is classified as destructive to the respective media item. As illustrated in FIG. 7C, in response to detecting tap input 750*a*4 on delete control 722*d*, computer system 680 removes the media item represented by enlarged representation 724*a* from the shared library (e.g., as indicated by enlarged representation 724*a* not being displayed in FIG. 7C and thumbnail representation 712*a* being removed from thumbnail media representations 712). In some embodiments, while computer system 680 has removed the media item represented by enlarged representation 724*a* from the shared library, the media item represented by enlarged representation 724*a* still remains in and/or is moved to the personal library of the contributor of the media item (e.g., John). In some embodiments, the media item represented by enlarged representation 724*a* still remains in and/or is moved to the personal library of the contributor of the media item (e.g., John) because Kevin did not contribute the media item represented by enlarged representation 724*a* (e.g., and John contributed the media item). In some embodiments, the media item represented by enlarged representation 724*a* is removed temporarily from the shared library (e.g., where it is moved permanently when the contributor of the media item confirms that the media item should be removed from the shared library and/or a confirmation has not been provided by the contributor of the media item for more than a predetermined time (e.g., two-months to a year) since the media item was temporarily moved).

As illustrated in FIG. 7C, computer system 600 displays notification 710*a* because a determination has been made that a set of notification criteria has been satisfied. Here, the set of notification has been satisfied because removing the media item represented by enlarged representation 724*a* from the shared library was classified as a destructive change event and the destructive change event was caused by someone who did not contribute the media item (e.g., the media impacted (or that will be impacted) by the change event occurring). In other words, Kevin's decision to delete the media item (e.g., that Kevin did not contribute to the shared library) at FIG. 7A1 from the shared library caused a notification to be displayed at the computer system of John (e.g., the contributor of the media item being deleted by Kevin). In some embodiments, at FIG. 7C, computer system 700 of FIG. 7A2 does not display a notification corresponding to the removal event (e.g., as described above in relation to FIG. 7C) because Jill did not contribute the media item represented by enlarged representation 724*a*. Thus, in some embodiments, contributors of respective media items are notified concerning change events (e.g., caused by non-contributors of the respective media items) that impact the respective media items and non-contributors of respective media items are not notified. For ease of discussion, a destructive change event is a change that causes (or will causes) a media item to be removed and/or deleted from the shared library or edited in a non-reversible manner. In some embodiments, the set of notification criteria are also satisfied at FIG. 7C at computer system 600 because a change-events-notifications setting is enabled on computer system 600 (e.g., as discussed above in relation to change-events-notifications setting 610*h* of FIG. 6AN). In some embodiments, the set of notification criteria cannot be satisfied when the change-events-notifications setting is disabled. Thus, in some embodiments where the change-events-notifications setting is disabled, computer system 600 does not display an notification corresponding to a destructive change event, irrespective of whether removing the media item represented by enlarged representation 724*a* from the shared library was classified as a destructive change event and the destructive change event was caused by someone who did not contribute the media item impacted (or that will be impacted) by the change event occurring. Looking back at FIG. 7B, computer system 600 did not display any notifications related to the operation caused by computer system 680 detecting tap input 750*a*1 (e.g., an operation to move a media item from the shared library to the personal library) because the operation to move the media item from the shared library to the personal library by a non-contributor (e.g., as described above in relation to FIG. 7B) was not classified as a destructive change (or change the media item at all).

Figure 7D:
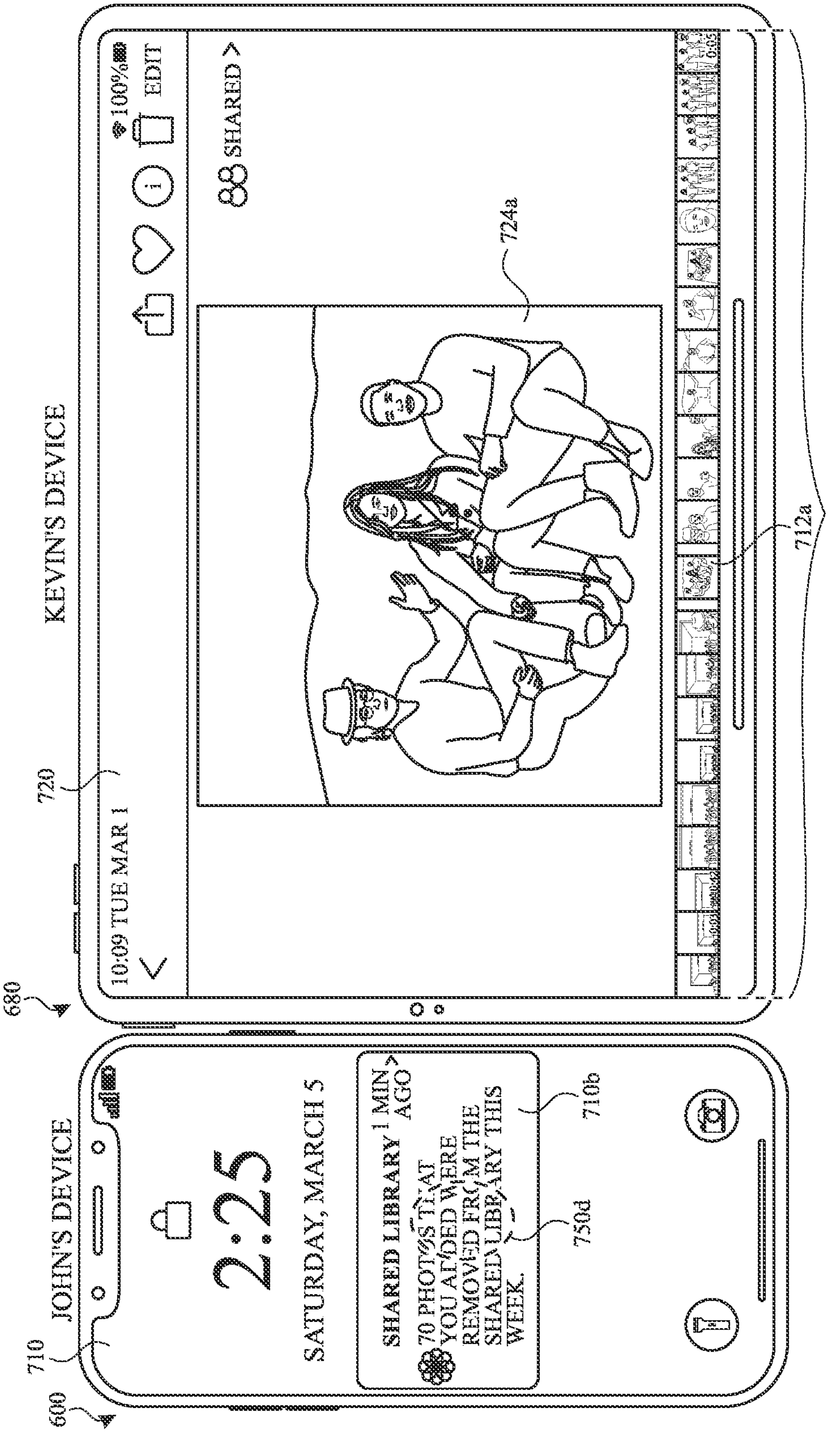

FIG. 7D illustrates an alternative embodiment to the embodiment described above in relation to FIG. 7C. At FIG. 7D, in response to detecting tap input 750*a*4 on delete control 722*d*, computer system 680 does not remove the media item represented by enlarged representation 724*a* from the shared library (e.g., as indicated by enlarged representation 724*a* being displayed and thumbnail representation 712*a* not being removed from thumbnail media representations 712 in FIG. 7C). Here, the user interface of computer system 680 is being provided to demonstrate that notifications (e.g., notification 710*b*) concerning change events can be displayed at a computer system of the contributor without the change actually impacting the media item before the notification is displayed. Thus, in some embodiments, computer system 680 causes computer system 600 to display a notification concerning the removal change event after a change event has been requested and before the change event occurs. In some embodiments, the change event impacts the media item after the contributor of the media item confirms that the media item should be impacted by the change event.

Moreover, at FIG. 7D, computer system 600 displays notification 710*b* because a determination has been made that a set of notification criteria has been satisfied. In some embodiments, at FIG. 7D, computer system 700 of FIG. 7A2 does not display a notification corresponding to the removal event (e.g., notification 710*a* of FIG. 7C and notification 710*b* of FIG. 7D) because Jill did not contribute the media item represented by enlarged representation 724*a* (e.g., as discussed above in relation to FIGS. 7D and 7A2). Looking back at FIG. 7D, notification 710*b* of FIG. 7D is different from notification 710*a* of FIG. 7C. Notification 710*b* indicates that 70 photos that were added by John have been removed from the shared library this month. Here, notification 710*b* can be referred to as a bulk notification (or a notification that corresponds to multiple change events) while notification 710*a* can be referred to as a non-bulk notification (or a notification that corresponds to a single change event). Bulk notifications are displayed according to a predetermined time interval (e.g., every day, week, month, and/or year) and include change events that are classified as destructive changes to media items occurring during the predetermined time interval (e.g., such as the removal change event discussed above that occurred during a month interval of time (e.g., between February $5^{th}$-March $5^{th}$)). Thus, the removal change event that occurred Tuesday, March $1^{st}$ (e.g., as evidenced by tap input 750*a*4 being detected while computer system 680 indicated that the data was "TUE MAR 1")) caused notification 710*b* to indicate that 70 photos have been removed from the shared library this month instead of indicating that 69 photos have been removed from the shared library this month (e.g., without causing a non-bulk notification to be displayed, such as notification 710*a*, before notification 710*b* was displayed). On the other hand, non-bulk notifications are displayed as soon as the change event occurs and irrespective of any predetermined time interval. Looking back at FIG. 7C, notification 710*a* of FIG. 7C is a non-bulk notification, which is an indication that a particular change event occurred. In some embodiments, non-bulk notifications are displayed after (e.g., immediately after and/or as soon as) the change event occurs, irrespective of any predetermined time interval and/or the quantity of change events that have occurred during a predetermined time interval. In some embodiments, a bulk notification is not displayed unless a predetermined number (e.g., 10-50) of change events (e.g., that have been classified as destructive) have occurred during the predetermined interval of time. In some embodiments, computer system 600 is configured to display either bulk notifications and/or non-bulk notifications based on one or more settings of computer system 600. In some embodiments, notifications and/or non-bulk notifications are suppressed when a change-events-notifications setting (e.g., as discussed above in relation to change-events-notifications setting 610*h* of FIG. 6AN) is disabled on computer system 600. As discussed above, FIG. 7D are being provided as an alternate embodiment to FIG. 7C. It should be understood that one or more aspects discussed above in relation to FIG. 7D can be modified and/or combined with one or more aspects discussed above in related to FIG. 7C. In some embodiments, a bulk sharing notification can be displayed after a media item is removed from the shared library. In some embodiments, a non-bulk notification can be displayed before a media item is removed from the shared library (e.g., and/or after a request to perform the change event has been detected by a computer system). At FIG. 7D, computer system 600 detects tap input 750*d* on notification 710*b* (or, in some embodiments, detects tap input 750*c* on notification 710*a* at FIG. 7C).

Figure 7E:
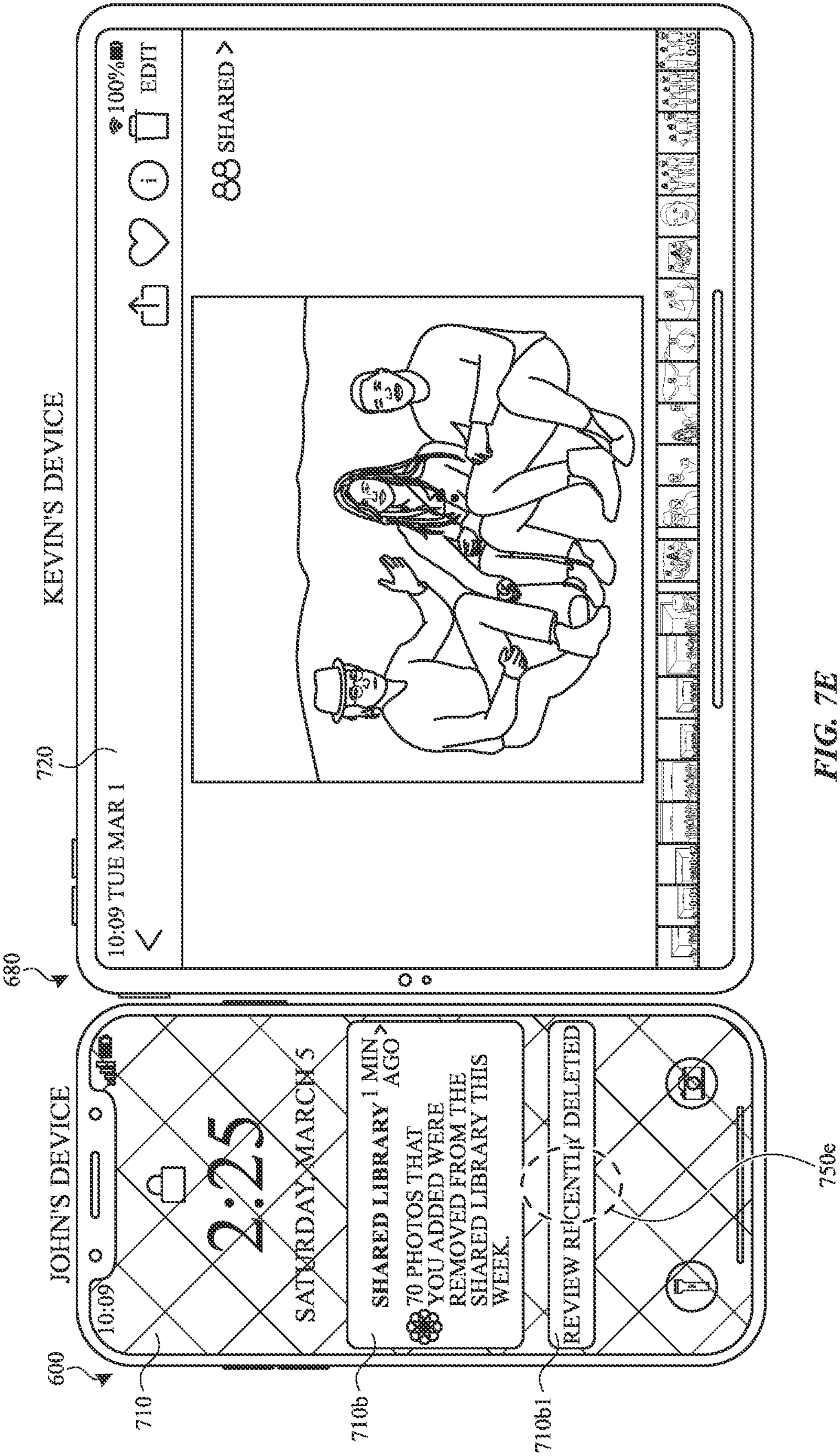
Figure 7F:
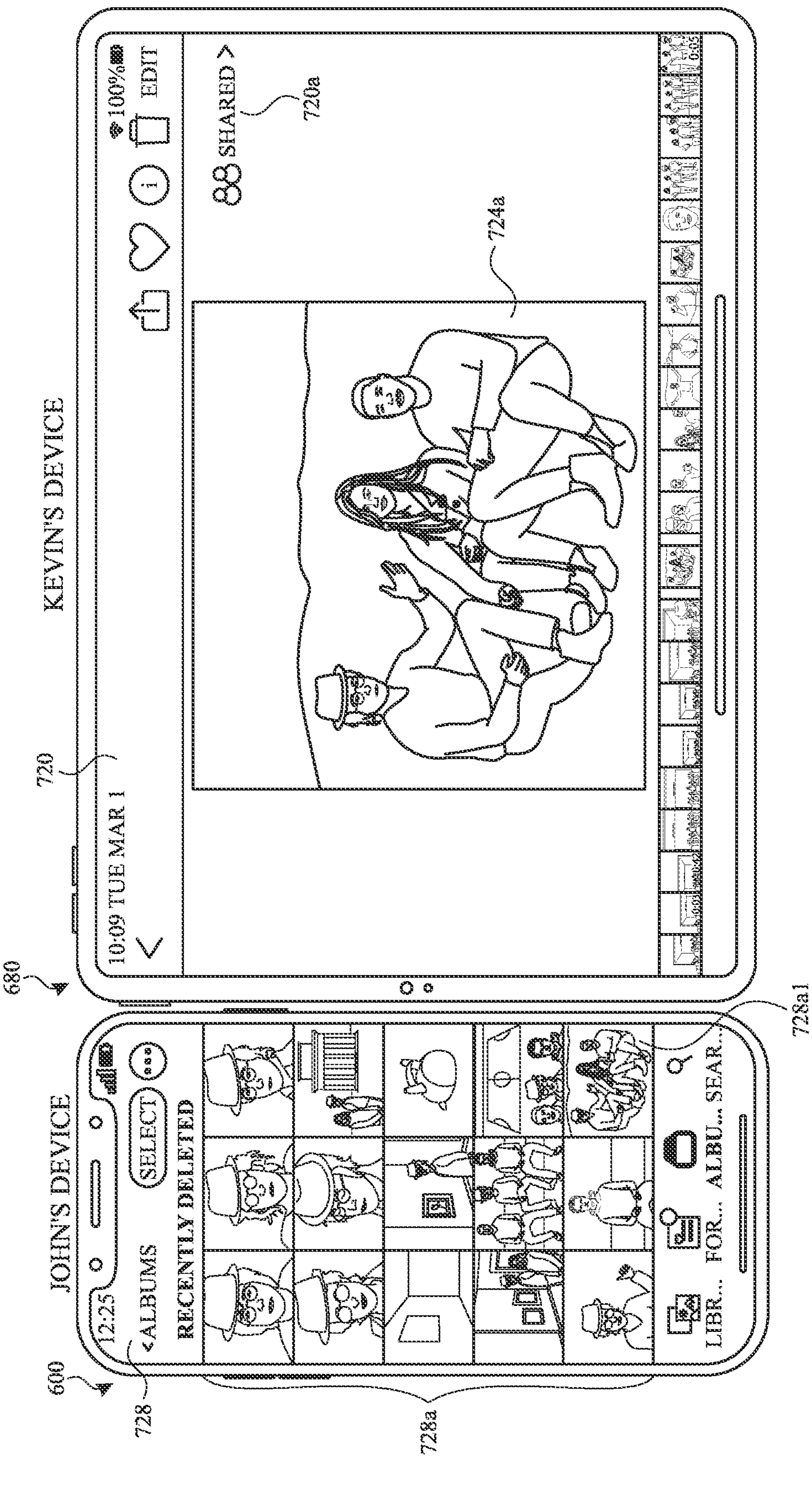

As illustrated in FIG. 7E, in response to detecting tap input 750*d* (or, in some embodiments, detecting tap input 750*c* on notification 710*a* at FIG. 7C), computer system 600 displays review control 710*b*1 (e.g., while concurrently displaying notification 710*b*). At FIG. 7E, computer system 600 detects tap input 750*e* on review control 710*b*1. As illustrated in FIG. 7F, in response to detecting tap input 750*e* on review control 710*b*1, computer system 600 displays review-change-events user interface 728 that includes media representations 728*a*, which are representations of media items that have been (or will be) impacted by change events that are classified as destructive change events. At FIG. 7F, media representations 728*a* includes media representation 728*a*1, which corresponds to the media item represented by enlarged representation 724*a* of FIG. 7A1 (e.g., that was displayed when the removal change event was detected (e.g., via tap input 750*a*4) by computer system 680). In some embodiments, in response detecting one or more inputs on review-change-events user interface 728, the computer system removes one or more media items from the shared library and/or removal of the one or more media items is confirmed. In some embodiments, in response to detecting one or more inputs on review-change-events user interface 728, the computer system removes one or more media items from the shared library and/or one or more media items are restored to the shared library. In some embodiments, when removal of the one or more media items is confirmed by the contributor of the media item, the removed media item is purged (and/or completely removed from the shared library, the personal library of the contributor, and/or a cloud computing system). In some embodiments, when removal of the one or more media items is not confirmed by the contributor of the media item, the removed media item is not purged even if the media item was removed from the shared library by someone who did not contribute the media item.

Figure 7G:
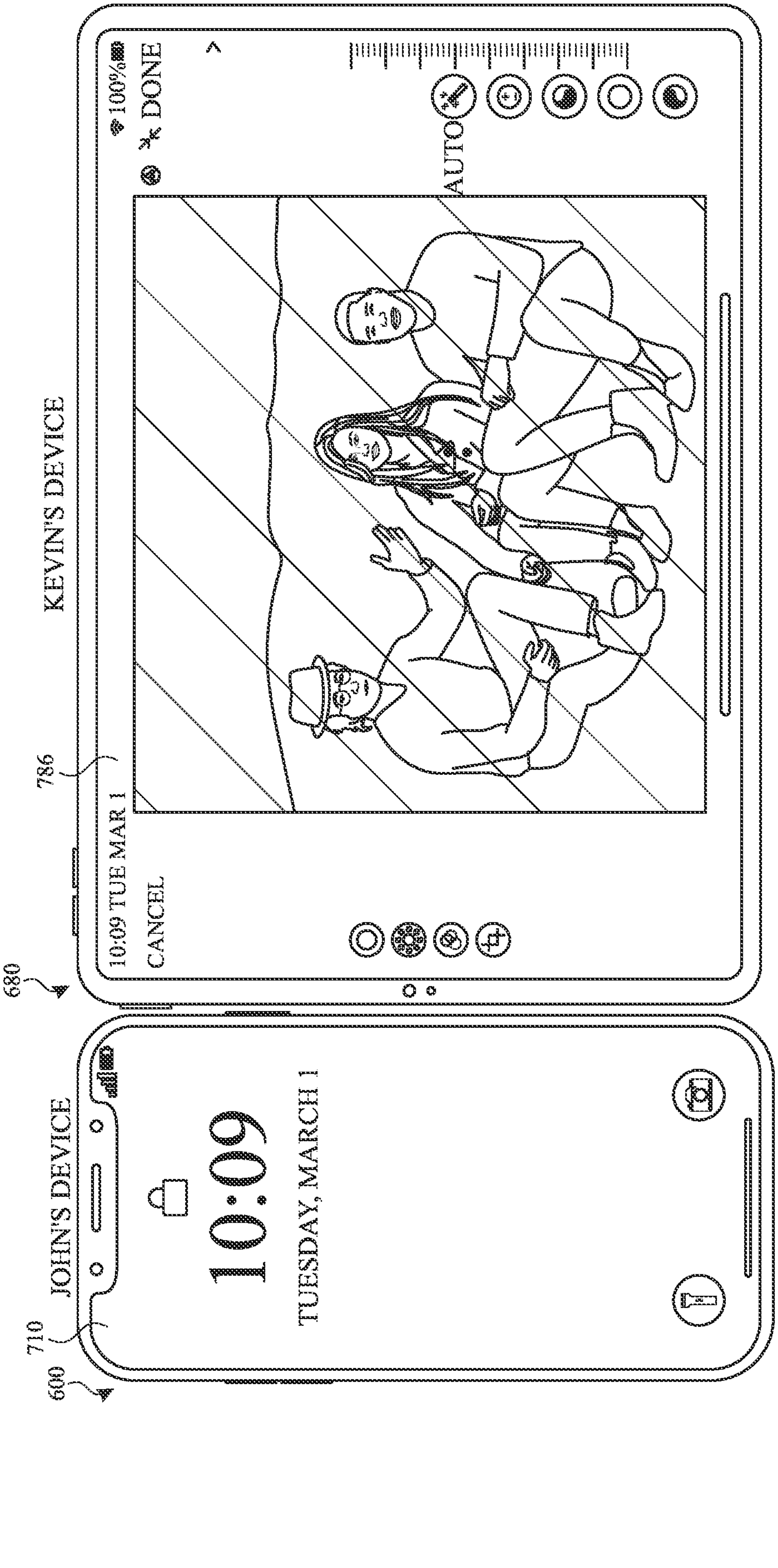

FIG. 7G illustrates an exemplary embodiment where a person, who did not contribute a respective media item in the shared library, attempts to change the respective media item, where the change to the respective media item is classified as a non-destructive change. Looking back at FIG. 7A1, computer system 680 detected tap input 650*a*5 on edit control 722*e*. As illustrated in FIG. 7G, after detecting tap input 650*a*5 on edit control 722*e* and after the media item represented by enlarged representation 724*a* has been edited (e.g., denoted by the hatching in FIG. 7G), computer system 600 does not display a notification on lock screen 710 because the editing of a media item is classified as a non-destructive change event (e.g., and/or because the set of notification criteria has been not satisfied when a change event is classified as a non-destructive change event). In some embodiments, computer system 600 does not display a notification that corresponds to a change event after (or in response to) computer system 680 detecting tap input 750*a*2 on share control 722*b*, tap input 750*a*3 on favorites control 722*c*, or press-and-hold input 750*a*6 on enlarged representation 724*a* because the operations that performed in response to detecting these inputs (e.g., sharing media, favoriting media, and/or displaying a representation of media) are not classified as destructive change events. In some embodiments, at FIG. 7G, computer system 700 of FIG. 7A2 (e.g., that corresponds to Jill who is a participant of the shared library but who is not a contributor of the respective media item) does not display a notification in response to computer system 680 detecting a request to perform a non-destructive change to a media item (e.g., in response to and/or after detecting tap input 750*a*5 on edit control 722*e*, tap input 750*a*2 on share control 722*b*, tap input 750*a*3 on favorites control 722*c*, or press-and-hold input 750*a*6 on enlarged representation 724*a*).

Figure 7H:
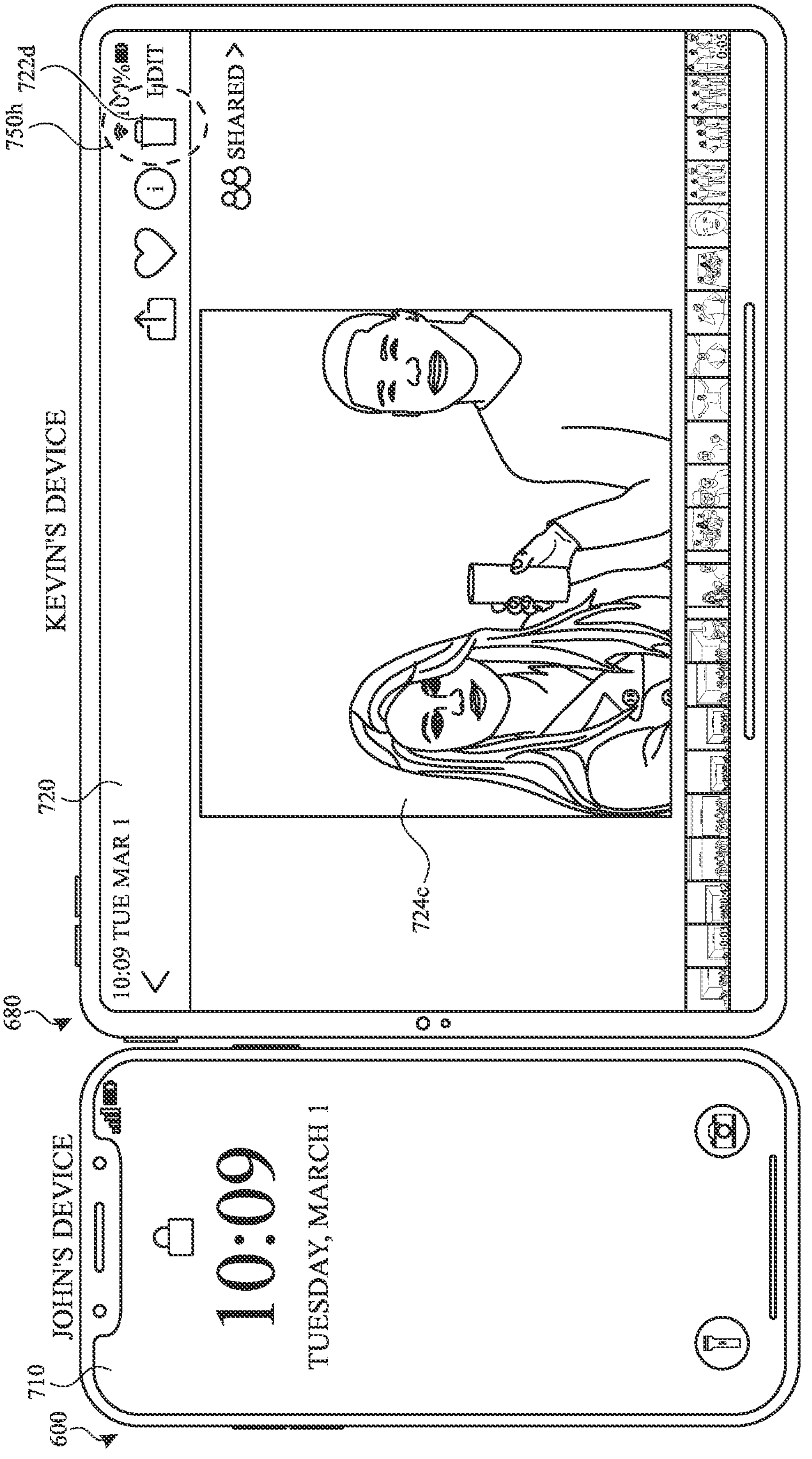
Figure 7I:
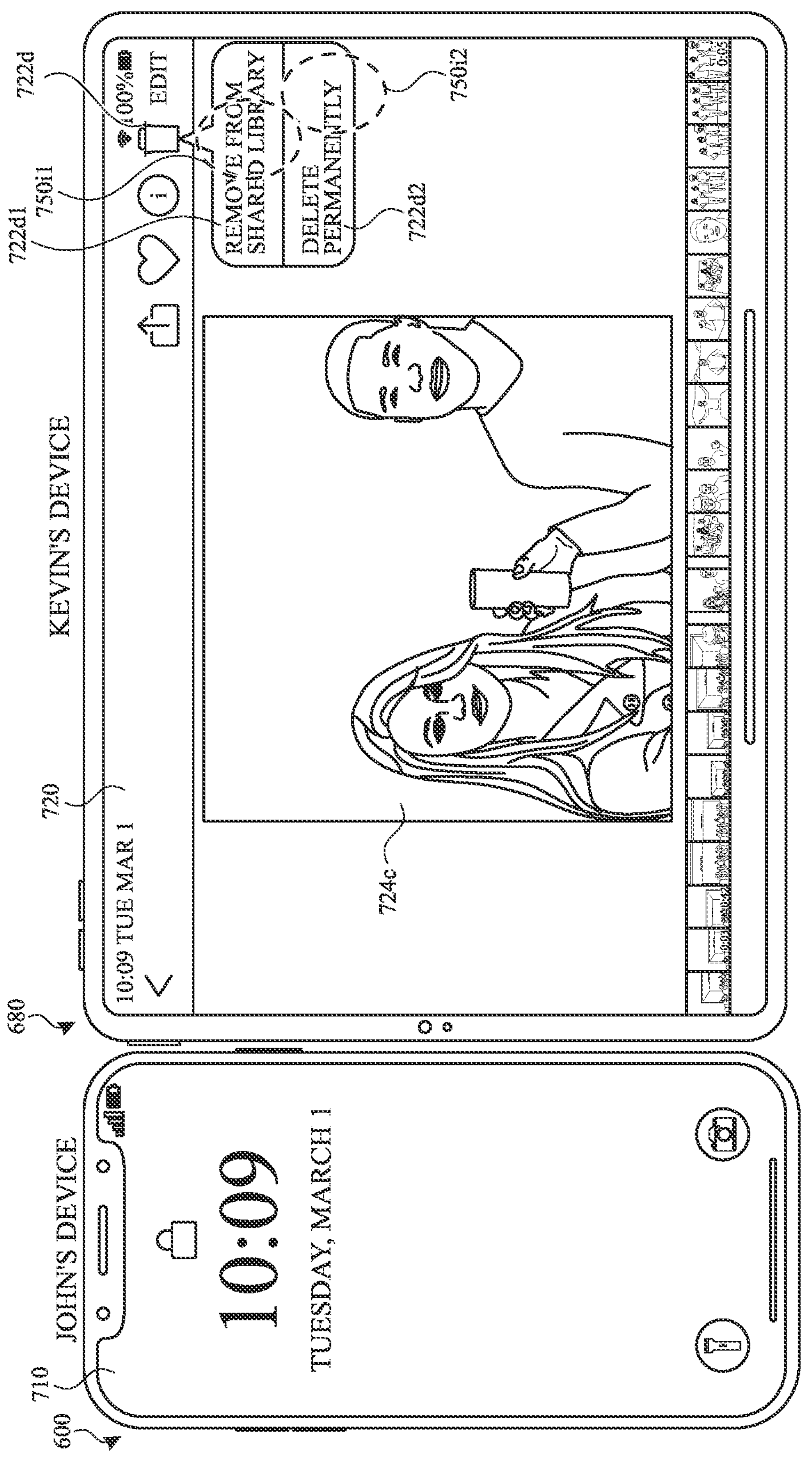

FIGS. 7H-7I illustrate an exemplary embodiment where a person, who contributed a respective media item in the shared library, attempts to change the respective media item, where the change to the respective media item is classified as a destructive change. At FIG. 7H, computer system 680 detects tap input 750*h* on delete control 722*d* while displaying enlarged representation 724*c*. Enlarged representation 724*c* is a media item that was contributed by Kevin. As illustrated in FIG. 7I, in response to detecting tap input 750*h* on delete control 722*d*, computer system 600 displays remove-from-shared-library control 722*d*1 and delete permanently control 722*d*2. In some embodiments, in response to detecting tap input 750*i*1 on remove-from-shared-library control 722*d*1, computer system 680 removes the media item represented by enlarged representation 724*c* from the shared library without purging (e.g., permanently deleting from the shared library and all of the participant's personal library and/or making the media item to not be accessible by any of the participants to the shared library and/or contributors of the media item) the media item represented by enlarged representation 724*c*. In some embodiments, in response to detecting input 750*i*2 on delete permanently control 722*d*2, computer system 680 removes and purges the media item represented by enlarged representation 724*c* from the shared library. In some embodiments, computer system 600 does not display a notification concerning the removal or purging of the media item because the media item was removed by the contributor of the media item (e.g., where the contributor of the media item represented by enlarged representation 724*c* is Kevin and not John, so John's device (e.g., computer system 600) does not display a notification concerning the change event). In some embodiments, delete permanently control 722*d*2 is displayed upon determining that Kevin is a contributor of enlarged representation 724*c* (e.g., in response to detecting tap input 750*h* on delete control 722*d*).

Figure 7J:
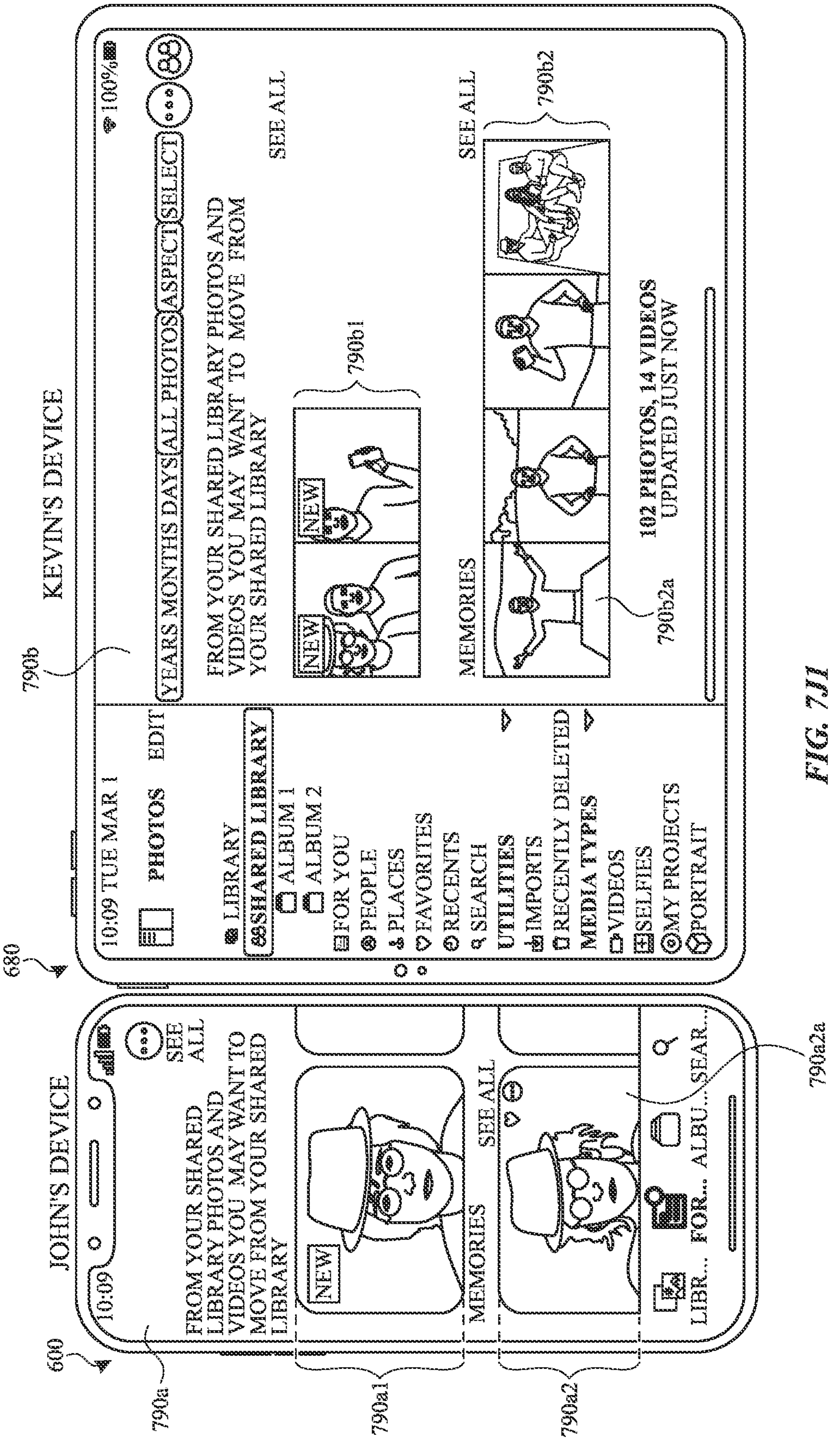

FIGS. 7J1-7J2 illustrate an exemplary embodiment, where computer systems 600, 680, and 700 are displaying different media gallery user interfaces (e.g., 790*a*, 790*b*, and 790*c*). The media gallery user interfaces include different notifications (e.g., suggestion notifications 790*a*1, 790*b*1, and 790*c*1 and memory notifications 790*a*2, 790*b*2, and 790*c*2) concerning different collections of media items. For example, memory notifications 790*b*2 of FIG. 7J1 are different (e.g., visually different from) from memory notifications 790*a*2 of FIG. 7J1 and memory notifications 790*c*2 of FIG. 7J2 because memory notifications 790*a*2 correspond to sets of media items (e.g., from the shared library and from the personal library of the user (e.g., Kevin)) that have been curated differently from the sets of media items (e.g., from the shared library and from the personal library of the user (e.g., John) of computer system 600) that correspond to memory notifications 790*a*2 and the sets of media items (e.g., from the shared library and from the personal library of the user (e.g., Jill) of computer system 700) that correspond to memory notifications 790*c*2 of FIG. 7J2. In some embodiments, the sets of media items are curated differently because some of the media items for a particular notification are media items from a particular personal library that is associated with the particular computer system (e.g., and that is not accessibly by another computer system). In some embodiments, the sets of media items are curated differently based on one or more characteristics of the particular user of a particular computer system. For example, memory notification 790*a*2*a* includes a representation of John (e.g., as discussed above in relation to FIGS. 6A-6AO) because memory notification 790*a*2*a* is provided at computer system 600 (e.g., the computer system associated with John) while memory notification 790*b*2*a* includes a representation of Kevin (e.g., as discussed above in relation to FIGS. 6A-6AO) because memory notification 790*b*2*a* is provided at computer system 680 (e.g., the computer system associated with Kevin). In some embodiments, the media items represented by memory notification 790*a*2*a* are different from the media items represented by memory notification 790*b*2*a*.

Figure 7L:
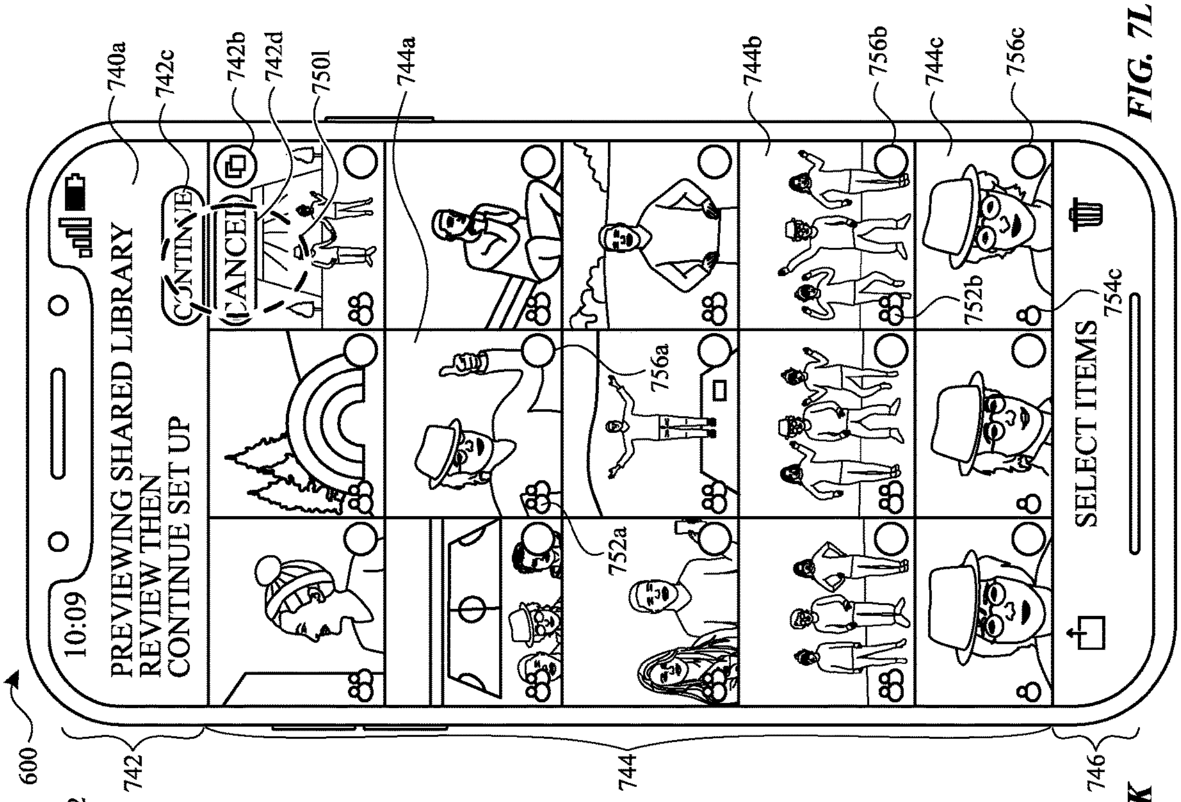
Figure 7K:
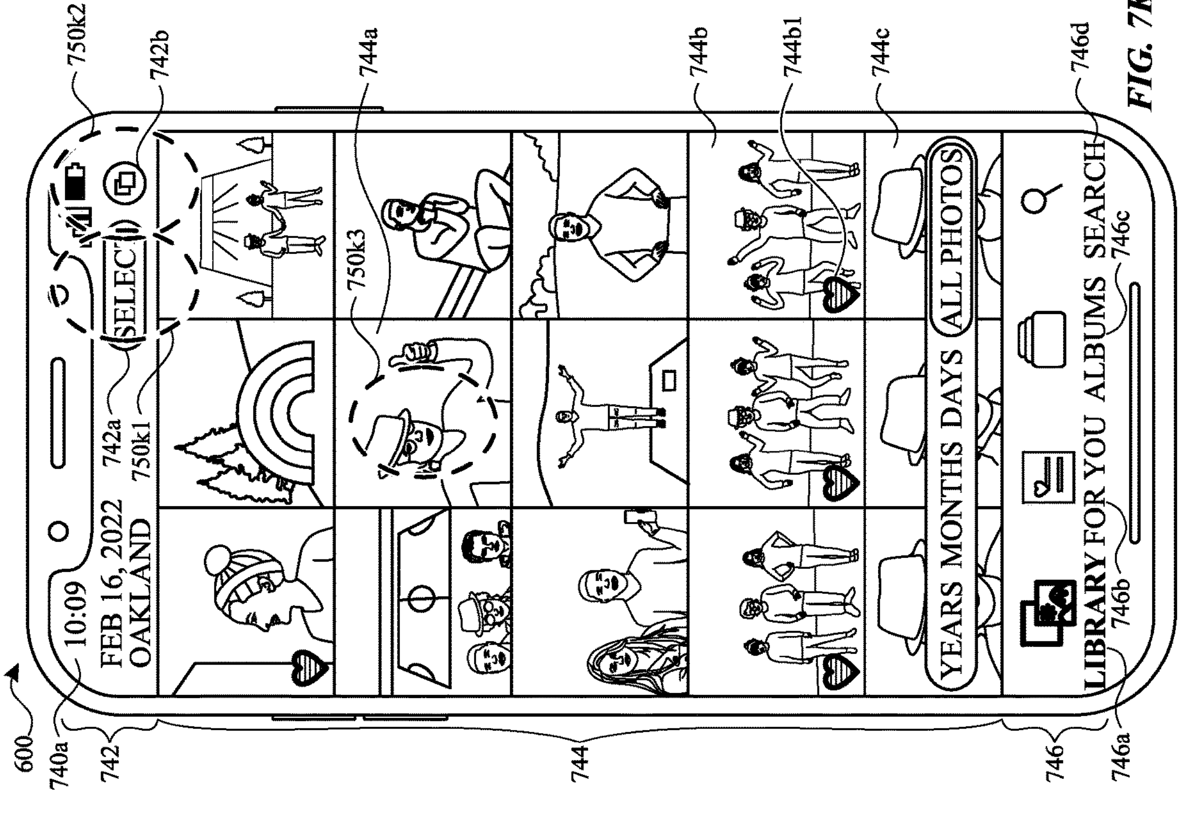

FIG. 7K illustrates computer system 600 displaying media gallery user interface 740*a*. Media gallery user interface 740*a* includes control region 742, gallery region 744, and control region 746. Control region 742 includes select control 742*a* and library-navigation control 742*b*. Gallery region 744 includes multiple media items, including media item 744*a*, media item 744*b*, and media item 744*c*. As illustrated in FIG. 7K, computer system 600 displays favorites indicator 744*b*1 on media item 744*b*, which indicates that media item 744*b* has been favorited by a user. On the other hand, in FIG. 7K, computer system 600 does not display a favorites indicator on media item 744*a* and media item 744*b* because these media items have not been favorited by a user. Control region 746 includes library view 746*a*, for-you view 746*b*, albums view 746*c*, and search view 746*d*, which are displayed and operate according to the techniques described above in relation to views 676*a*-676*d*.

At FIG. 7K, computer system 600 displays media gallery user interface 740*a* while library view 746*a* is selected. Library view 746*a* being selected indicates that computer system 600 is displaying the library view for media gallery user interface 740*a* at FIG. 7K. In some embodiments, computer system 600 displays media gallery user interface 740*a* in response to detecting an input on a photo application icon, In some embodiments, computer system 600 displays the photo application icon concurrently with other application icons (e.g., while detecting the input on the photo application icon). In some embodiments, computer system 600 displays media gallery user interface 740*a* in response to detecting tap input 650*u*1 at FIG. 6U (and/or in replace of review user interface 634, which is described above in relation to FIGS. 6V-6W). In some embodiments, computer system 600 displays media gallery user interface 740*a* using one or more techniques discussed above in relation to review user interface 634. At FIG. 7K, computer system 600 detects tap input 750*k*1 on select control 742*a*, tap input 750*k*2 on library-navigation control 742*b*, or tap input 750*k*3 on media item 744*a*.

At FIG. 7K, in response to detecting tap input 750*k*1 on select control 742*a*, computer system 600 is transitioned to operate in a selection mode (e.g., a mode where one or more media items can be selected for removal, deletion, moving to a collection of media items, and/or sharing with one or more other users). As illustrated in FIG. 7L, in response to detecting tap input 750*k*1 on select control 742*a*, computer system 600 displays a select control on the media items in gallery region 744. As illustrated in FIG. 7K, computer system 600 displays select control 756*a* on media item 744*a*, select control 756*b* on media item 744*b*, and select control 756*c* on media item 744*c*. Moreover, in response to detecting tap input 750*k* on select control 742*a*, computer system 600 displays indicators on the media in gallery region 744 that indicates the particular library to which a respective media items belongs. Media items 744*a*-744*b* belong to the shared library (e.g., the collection of media items that are shared with multiple users), and media item 744*c* belongs to the personal library. Thus, at FIG. 7L, computer system 600 displays shared library indicator 752*a* on media item 744*a* and shared library indicator 752*b* on media item 744*b* while displaying personal library indicator 754*c* on media item 744*c*. Shared library indicator 752*a* and shared library indicator 752*b* have the same visual appearance (e.g., an icon with two people), which indicates that media items 744*a*-744*b* belong to the shared library. However, personal library indicator 754*c* has a different visual appearance (e.g., icon with one person) than the shared library indicators because media item 744*c* belongs to the personal library. Looking at media item 744*b*, computer system 600 replaces favorites indicator 744*b*1 of FIG. 7K with shared library indicator 752*b* (e.g., displays shared library indicator 752*b* at the location at which favorites indicator 744*b*1 was previously displayed) in response to detecting tap input 750*k*1 on select control 742*a*. In some embodiments, computer system 600 replaces a favorites indicator with a shared media indicator because knowing the library status of a media item can be more important than knowing whether the media item is favorited while the computer system is operating in the selection mode. In some embodiments, in response to detecting tap input 750*k* on select control 742*a*, computer system 600 displays shared library indicators on media items that belong to the shared library but does not display personal library indicators on media items that belong to the personal library, or vice-versa.

At FIG. 7L, in response to detecting tap input **750*k*1 on select control 742*a*, computer system 600 updates control region 742 to include continue control 742*c* and cancel control 742*d* and displays library-navigation control 742*b* in gallery region 744. In some embodiments, computer system 600 displays media gallery user interface 740*a* of FIG. 7L while the shared library is being set up (e.g., in FIGS. 6A-6AO). In some embodiments, computer system 600 displays library-navigation control 742*b* and cancel control 742*d* in control region 742 at FIG. 7L while the shared library is not being set up and/or items are not being reviewed for being added to the shared library. In some embodiments, computer system 600 displays library-navigation control 742*b* and cancel control 742*d* in control region 742 at FIG. 7L after computer system 600 has displayed the media gallery user interface in response to detecting an input on a photo application icon. At FIG. 7L, computer system 700 detects tap input 750*l* on cancel control 742*d* and, in response, computer system 600** re-displays the user interface of FIG. 7K (e.g., replaces the shared library indicator with the favorites indicator).

Figure 7N:
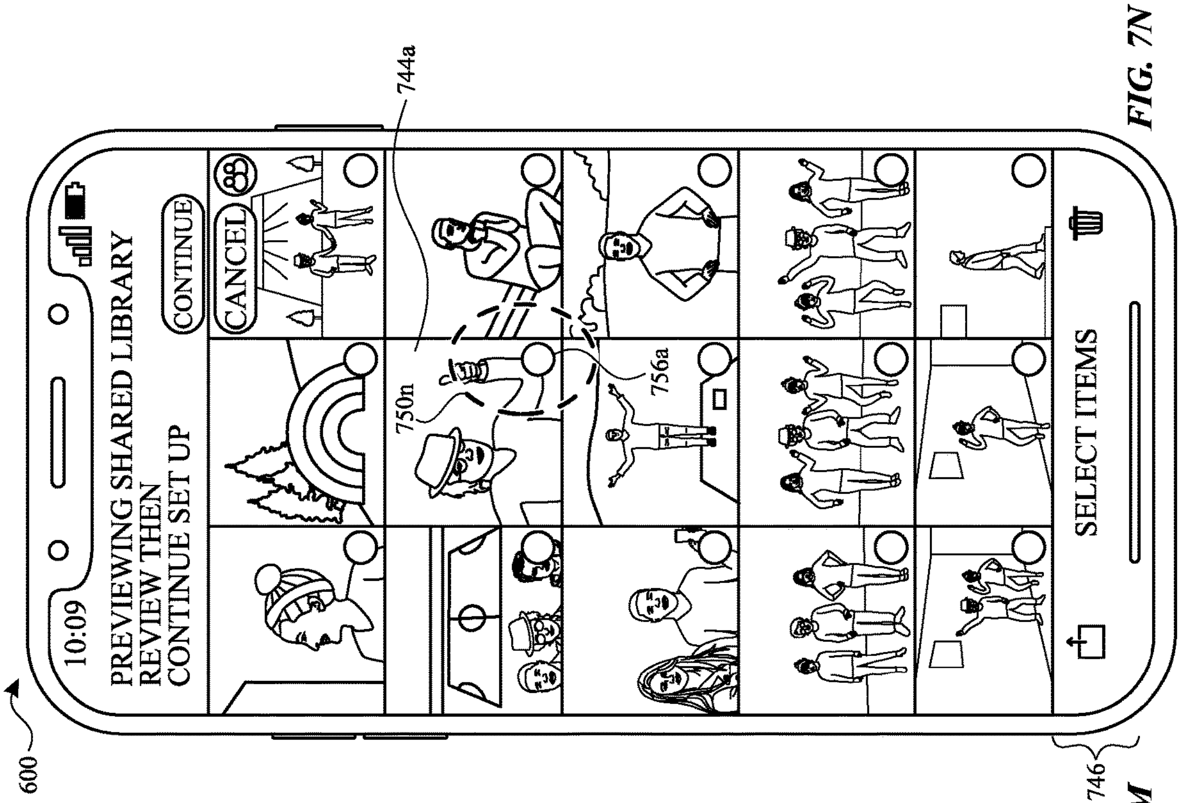
Figure 7M:
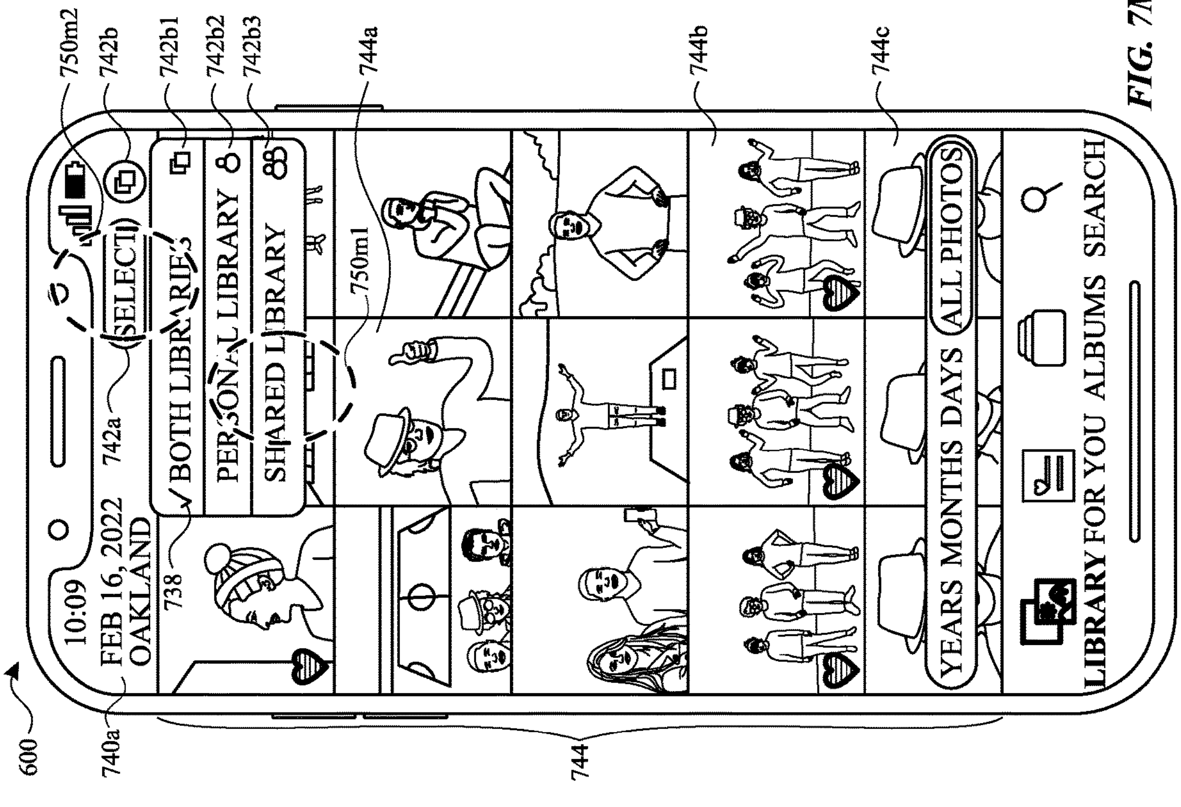
Figure 7R:
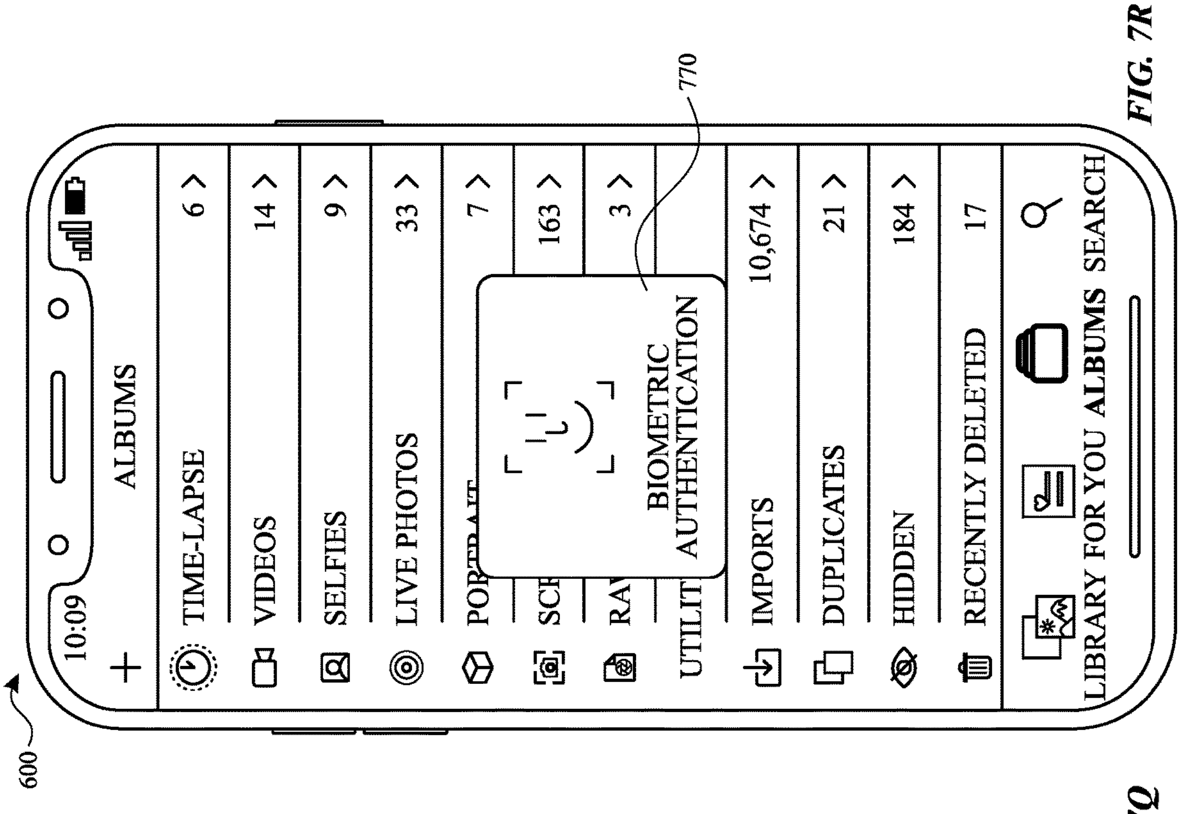

As illustrated in FIG. 7M, in response to detecting tap input **750*k*2 on library-navigation control 742*b* (e.g., at FIG. 7K), computer system 600 displays both-libraries-navigation control 742*b*1, personal-library-navigation control 742*b*2, and shared-library-navigation control 742*b*3. At FIG. 7M, computer system 600 displays both-libraries-navigation control 742*b*1 with selection indicator 738, which indicates that computer system 600 is displaying media items from both libraries (e.g., the shared library and the personal library) in media gallery user interface 740*a*. At FIG. 7M, computer system 600 detects tap input 750*m*1 on shared-library navigation control 742*b*3 and detects tap input 750*m*2 on select control 742*a***.

As illustrated in FIG. 7N, in response to detecting tap input **750*m*1 on shared-library navigation control 742*b*3, computer system 600 updates gallery region 744 to include media items that belong to the shared library without including media items that belong to another library. Notably, computer system 600 ceases to display media item 744*c* of FIG. 7M in media gallery region 744 because media item 744*c* belongs to the personal library. In response to detecting tap input 750*m*1, computer system 600 updates the appearance of library-navigation control 742*b* to include a shared library icon at FIG. 7N instead of a both libraries icon (e.g., appearance of library-navigation control 742*b* at FIG. 7K). At FIG. 7N, computer system 600 updates the appearance of library-navigation control 742*b* to include a shared library icon because computer system 600 has been configured to include media items that belong to the shared library (e.g., in response to detecting tap input 750*m*1) without including media items that belong to other libraries. As illustrated in FIG. 7N, in response to detecting tap input 750*m*2 on select control 742*a*, computer system 600 transitions to the selection mode and displays selection indicators on a plurality of (or all of) media items in gallery region 744. Notably, at FIG. 7N, computer system 600 does not display any shared library indicators on the media items in media gallery region 744 because media gallery region 744 includes media items that belong to the shared library (e.g., without including media items that do not belong to the shared library). Thus, computer system 600 does not display library indicators for media items when computer system 600 displays media items that belong to one library without displaying media items that belong to another library (e.g., or computer system 600 is configured to display media items that belong to one library (e.g., without displaying media items that belong to a different library)). In some embodiments, at FIG. 7N, computer system 600 continues to display a favorites control on media items that are favorited (e.g., while computer system 600 displays media items that belong one library). In some embodiments, in response to detecting a tap input on personal-library-navigation control 742*b*2 at FIG. 7M, computer system 600 updates gallery region 744 to include media items that belong the personal library without including other media items. At FIG. 7N, computer system 600 detects tap input 750*n* on select control 756*a* that corresponds to 0. As illustrated in FIG. 7O, in response to detecting tap input 750*n* on select control 756*a*, computer system 600 displays select control 756*a* as being selected. In response to detecting tap input 750*n*, computer system 600 displays move item control 746*g*. At FIG. 7O, computer system 600 detects tap input 750*o* on move item control 746*g*. In response to detecting tap input 750*o*, computer system 600 moves media item 744*a*** from the shared library to the personal library.

FIG. 7P illustrates computer system 600 displaying biometric authentication control 762 in an on state, which indicates that successful biometric authentication is required to access certain media items and/or media item albums or folders. In some embodiments, in response to detecting an input on biometric authentication control 762, computer system 600 changes biometric authentication control 762 from an on state to an off state.

Figure 7Q:
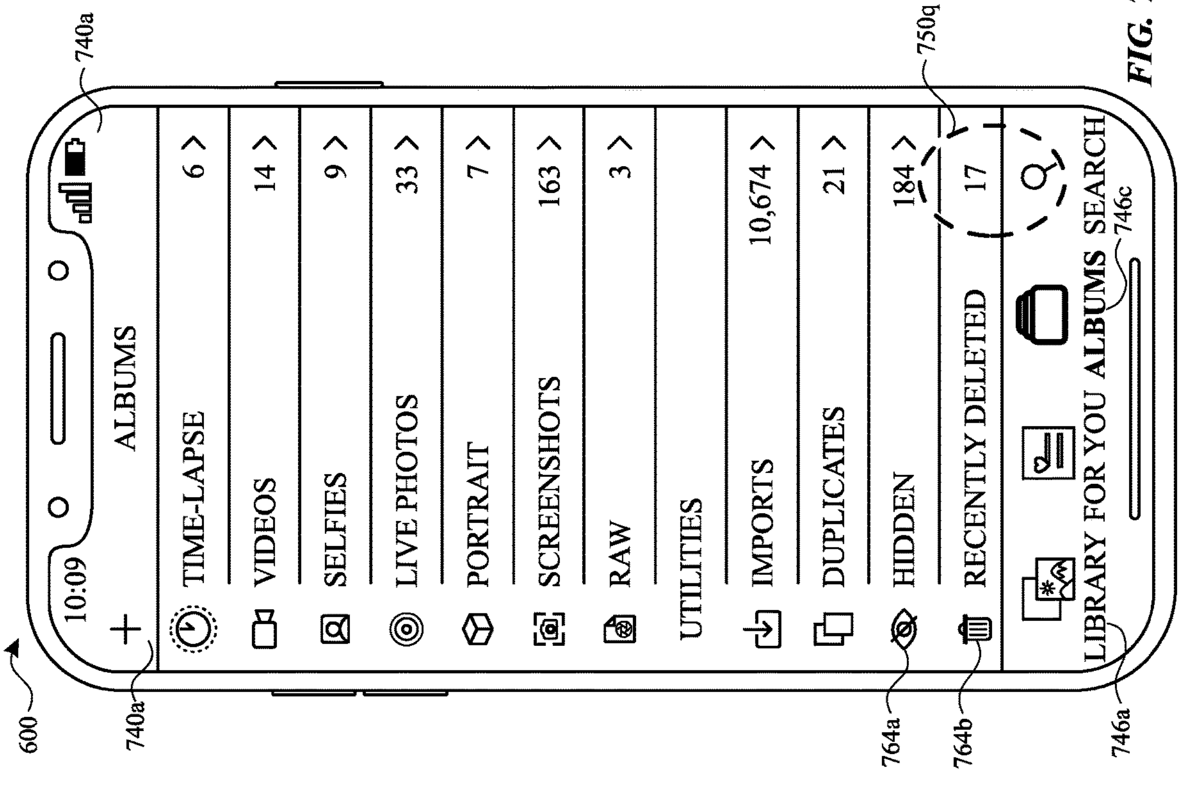
Figure 7T:
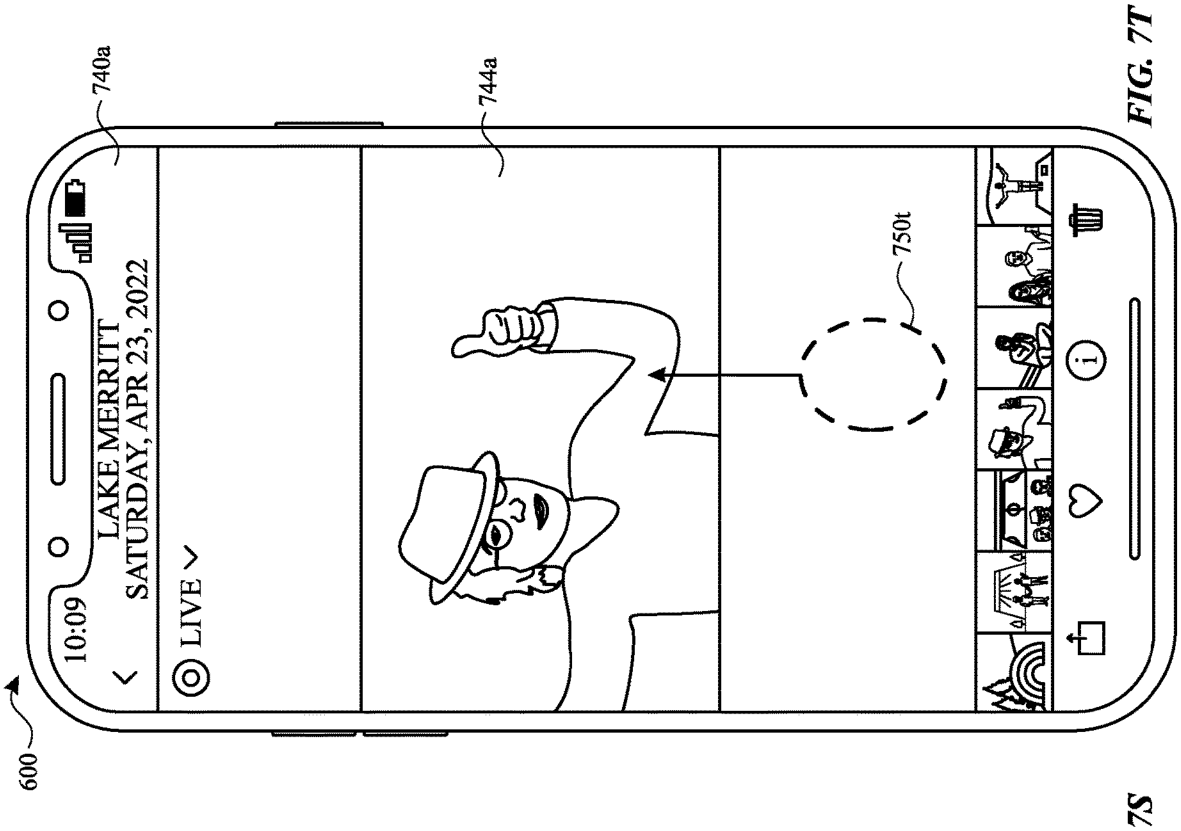
Figure 7S:
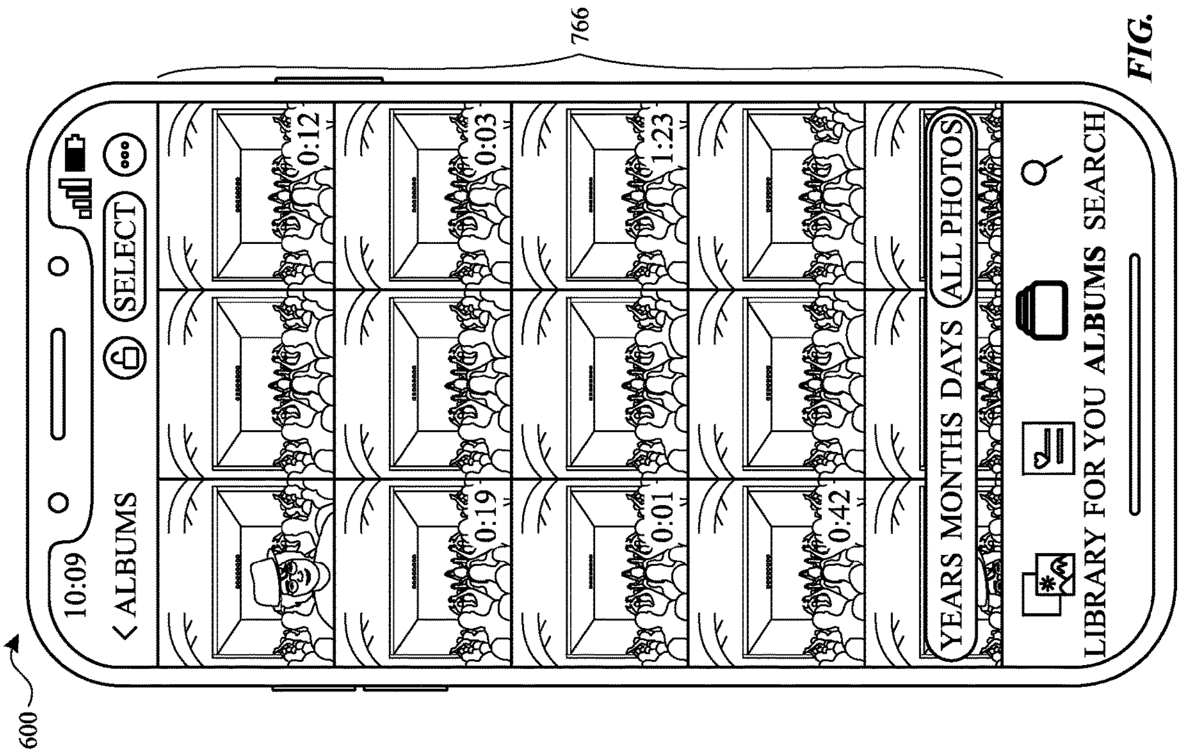

At FIG. 7Q, computer system 600 displays the albums view of media gallery user interface **740*a* (e.g., as indicated by albums view 746*c* being selected (e.g., bolded in FIG. 7Q)). Computer system 600 is not displaying library view 746*a* at FIG. 7Q because library view 746*a* is not selected (e.g., not bolded) in FIG. 7Q. At FIG. 7Q, media gallery user interface 740*a* includes hidden album control 764*a* and deleted album control 764*b*. At FIG. 7Q, computer system 600 detects tap input 750*q* on deleted album control 764*b*. As illustrated in FIG. 7Q, in response to detecting tap input 750*q* on deleted album control 764*b*, computer system 600 determines whether biometric authentication control 762 of FIG. 7P is in the on state. At FIG. 7R, because biometric authentication control 762 is in the on state, computer system 600 initiates biometric authentication. At FIG. 7R, computer system 600 displays prompt 770 and captures biometric data (e.g., via a fingerprint sensor, a facial recognition sensor (e.g., one or more optical and/or infrared cameras, and/or an iris scanner) and a determination is made that the biometric data results in successful biometric authentication. As illustrated in FIG. 7S, in response to determining that the biometric data results in successful biometric authentication, computer system 600 displays the contents of the deleted album, which includes deleted media items 766. In some embodiments, in response to determining that the biometric data results in unsuccessful biometric authentication, computer system 600 does not display the contents of the deleted album. In some embodiments, in response to determining that the biometric data results in unsuccessful biometric authentication, computer system 600 initiates non-biometric authentication (e.g., password, passcode, pattern authentication) process. In some embodiments, instead of initiating biometric authentication at FIG. 7R, computer system 600 initiates the non-biometric authentication process. In some embodiments, in response to determining that non-biometric authentication is successful, computer system 600 displays the contents of the deleted album. In some embodiments, in response to determining that non-biometric authentication is unsuccessful, computer system 600** does not display the contents of the deleted album.

In some embodiments, in response to detecting tap input 750*q* and a determination that biometric authentication control 762 of FIG. 7P is in the off state, computer system 600 displays the contents of the deleted album without capturing biometric authentication or requiring another form of authentication. In some embodiments, computer system 600 can perform one or more of the techniques described above (e.g., FIGS. 7P-7R) in response to detecting an input on hidden album control 764*a*.

Figure 7U:
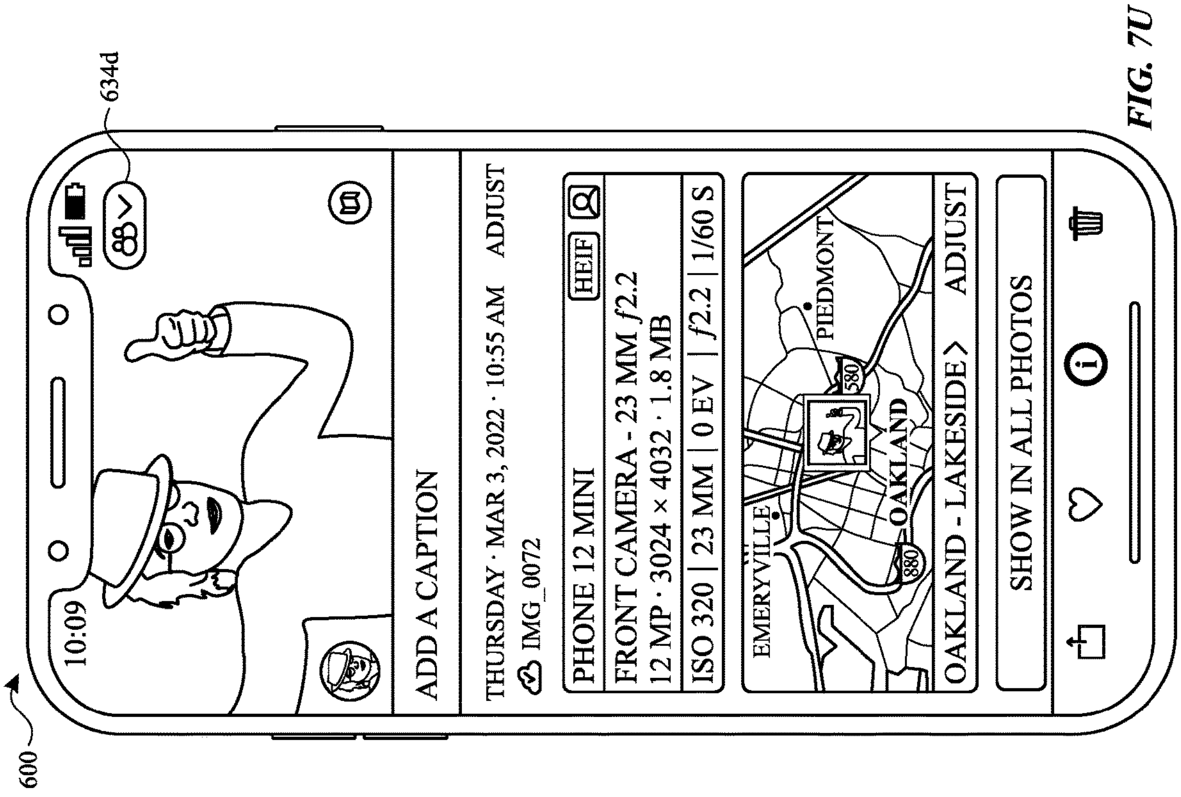

Looking back at FIG. 7K, computer system 600 detects tap input 750*k*3 on media item 744*a*. As illustrated in FIG. 7T, in response to detecting tap input 750*k*3, computer system 600 displays an enlarged representation of media item 744*a* in media gallery user interface 740*a*. At FIG. 7T, computer system 600 detects swipe input 750*t* (e.g., an upwards swipe) on media gallery user interface 740*a*. As illustrated in FIG. 7U, in response to detecting upward swipe input 750*t*, computer system 600 moves enlarged representation of media item 744*a* up to display metadata that corresponds to media item 744*a*. As illustrated in FIG. 7U, in response to detecting upward swipe input 750*t*, computer system 600 displays shared library indication 634*d* (e.g., which operates using one or more techniques as described above in relation to FIGS. 6Z and 6AC). In some embodiments, in response to detecting one or more inputs that includes a tap input on shared library indication 634*d*, computer system 600 performs one or more operations as described above in relation to FIGS. 6Z and 6AC. In some embodiments, in response to detecting one or more inputs that includes a tap input on shared library indication 634*d*, computer system 600 displays media items from the personal library (or media items from the shared library). In some embodiments, in response to detecting one or more inputs that includes a tap input on shared library indication 634*d*, computer system 600 displays a menu (e.g., such as menu 644 in FIG. 6AC). In some embodiments, in response to detecting upward swipe input 750*t* while displaying an enlarged representation that belongs to a personal library, computer system 600 displays personal indication 634*e* (e.g., if the selected media item is associated with the personal library).

FIG. 8 is a flow diagram illustrating methods for managing one or more media libraries using a computer system in accordance with some embodiments. Method 800 is performed at a computer system (e.g., 100, 300, 500, 600 and/or 680) (e.g., a smartphone, a desktop computer, a laptop, a tablet, or a head mounted device (e.g., a head mounted augmented reality and/or extended reality device)) that is in communication with a display generation component (e.g., a display controller, a touch-sensitive display system, and/or a head mounted display system). In some embodiments, the computer system is in communication with one or more input devices (e.g., a touch-sensitive surface, a camera, a mouse, and/or a trackpad) and/or one or more output devices (e.g., one or more display generation components, speakers, and/or sensors (e.g., haptic sensors and/or light sensors)). Some operations in method 800 are, optionally, combined, the orders of some operations are, optionally, changed, and some operations are, optionally, omitted.

As described below, method 800 provides an intuitive way for managing one or more media libraries. The method reduces the cognitive burden on a user for managing one or more media libraries, thereby creating a more efficient human-machine interface. For battery-operated computing devices, enabling a user to manage one or more media libraries faster and more efficiently conserves power and increases the time between battery charges.

The computer system detects (802) (e.g., via one or more input devices) a request (e.g., 650*g*1, 650*g*2, 650*h*1, and/or 650*l*2) to share media items from a first (e.g., a personal and/or private to the set of one or more users) collection (e.g., a media library, a folder that contains one or more media items, and/or a label or identifier that points to one or more media items) of media items (e.g., one or more media items (e.g., photos (e.g., a still photo and/or a portrait photo), videos, and/or an animated images (e.g., a series of images)) with a set of one or more users (e.g., "John," "Jane," and/or "Jill") (e.g., one or more users that are not assigned to the computer system and/or one or more users that have been previously selected (e.g., by the user of the computer system) from a larger set of users) (and/or one or more computer systems that are associated with and/or belong to the one or more users) (e.g., while displaying, via the display generation component, a user interface that includes a representation (e.g., an image and/or text that indicates of the particular collection of photos and/or a user interface object that, when selected, causes the computer system to detect the request to share the media items from the particular collection of media items) that corresponds to the media items). In some embodiments, the one or more computer systems are different from the computer system (e.g., the claimed computer system). In some embodiments, as a part of detecting the request to share a collection of media items with the set of one or more users, the computer system detects an input (e.g., a tap input or, in some embodiments, a non-tap input (e.g., a dragging input, a mouse click, a gaze input, and/or a press-and-hold input)) that is directed to a user interface object, such as a share control.

In response to detecting the request (e.g., 650*g*1, 650*g*2, 650*h*1, and/or 650*l*2) to share media items from the first collection of media items with the set of one or more users and in accordance with a determination that a first set of criteria is satisfied, where the first set of criteria includes a criterion that is satisfied when at least one user in the set of one or more set of users is determined (e.g., determined by the computer system; determined by an external computer system; previously determined; and/or determined at the time of the request) to have been present at one or more events corresponding to media items in the first collection of media items (e.g., is included in, is detected as being, and/or determined to be depicted in), the computer system displays (804), via the display generation component, a recommendation (e.g., 608) to share a plurality of media items (e.g., 634*b*) with the set of one or more users in a second (e.g., shared and/or not private to the set of one or more users) collection of media items. In some embodiments, an event and/or an event corresponding to media items is determined based on a group of media items being captured at approximately the same location or captured at one or more locations within a set of locations within a geofenced boundary and/or within a set of geofenced locations, being captured within a range of times (e.g., 1-5 hours) (e.g., 3-4 µm and 6-7 pm) at approximately the same location or captured at locations within a set of locations within a geofenced boundary (e.g., where the computer system does not capture another media item at a different location and/or within a different geofenced boundary during the range of time) (e.g., the time at which a media item (e.g., in a respective group of media items) is captured and the time at which the proceeding (e.g., immediately preceding) media item was captured (e.g., in the respective group of media items) is within a threshold period of time (e.g., 5 mins-60 mins) from each other), and/or being captured while the computer system is within a range (e.g., 1-100 meters) of another computer system that is associated with a participant and/or a person that is associated with the second collection of media items. The plurality of media items (e.g., 634*b*) that are recommended to be shared with the set of one or more users includes: a first set (806) of one or more media items (e.g., 690*a*-690*g*) that correspond to a first event at which at least one user (e.g., a first set of one or more users) in the set of one or more users (e.g., one or more users with whom the second collection of media items is being (e.g., and/or will be and/or configured to be) shared) is determined (e.g., automatically determined based on detection of the user in media items corresponding to the first event and/or detection of proximity of a user's device to one or more other devices that captured media at the first event) to have been present, where the first event occurred during a first period of time (and/or a first event (e.g., denoted by a particular time period, place, and/or location)); and a second set (808) of one or more media items (e.g., 690*a*-690*g*) that correspond to a second event at least one user (e.g., the first set of one or more users and/or a second set of one or more users that is different from the first set of users) in the set of one or more users (e.g., one or more users with whom the second collection of media items is being (and/or will be and/or configured to be) shared)) is determined (e.g., automatically determined based on detection of the user in media items corresponding to the second event and/or detection of proximity of a user's device to one or more other devices that captured media at the second event) to have been present, where the second event occurred during a second period of time (and/or a second event (e.g., denoted by a particular time period, place, and/or location) that is different from the first event) that is different from (e.g., and non-overlapping with) the first period of time (and, in some embodiments, concurrently with the representation that corresponds to the first and/or second collection of media items). In some embodiments, the plurality of media items includes media items that do not include a particular user. In some embodiments, one or more users of the set of the users are not present in the plurality of media items. In some embodiments, in accordance with a determination that the first set of criteria is not satisfied, the computer system forgoes displaying a user interface object indicating a recommendation for sharing media items in the second collection of media items and/or the recommendation to share the plurality of media items with the set of one or more users. In some embodiments, in accordance with a determination that the at least one user is a first user, the first set of one or more media items includes a first media item and a second media item (and does not include the third media item and/or the fourth media item); and in accordance with a determination that the at least one user is a second user that is different from the first user, the first set of one or more media items includes a third media item and a fourth media item (and does not include the first media item and/or the second media item). In some embodiments, in accordance with a determination that the at least one user is the first user, the first set of one or more media items is a first respective set of media items; and in accordance with a determination that the at least one user is the second user, the first set of one or more media items is a second respective set of media items that is different form the first respective set of media items. In some embodiments, the first respective set of one or more media items corresponds to a time period that is different from the time period in which the second respective set of one or more media items corresponds. Displaying a recommendation to share a plurality of media items with the set of one or more users in a second collection of media items based on the first set of criteria being satisfied allows the computer system to automatically provide recommendations for media items that can in a shared collection of media items with the set of one or more users and reduces the risk that unintended media items are recommended and potentially erroneously and/or unintentionally shared with other users, which performs an operation when a set of conditions has been met without requiring further user input, reduces the number of inputs needed to select media items to be shared, provides visual feedback concerning media items that are more likely to be preferred candidates for sharing with the one or more other participants, enhances the privacy/security of the computer system and/or a collection of media items, and provides additional control options without unnecessarily cluttering the user interface.

In some embodiments, the plurality of media items (e.g., 634*b*) does not include (e.g., excludes or is selected so as to exclude) one or more media items from the first collection of media items that correspond to an event that was not attended by (e.g., was not determined to be attended by) at least one user (e.g., a set of one or more users) in the set of one or more users (e.g., as described above in relation to FIG. 6A) (e.g., a third set of one or more media items from events at which none of the set of one or more users were present) (e.g., where the one or more media items are available to be recommended to be included in the second collection of media items but are excluded in the plurality of media items that are recommended to be shared). In some embodiments, the plurality of media items excludes some media items that don't include users included in the shared library. Displaying a recommendation to share a plurality of media items, where some media items corresponding to an event that was not attended by at least one user in the set of one or more users are excluded from the plurality of media items, based on the first set of criteria being satisfied allows the computer system to automatically provide recommendations for media items that can be in a shared collection of media items without including media items that are not likely to be relevant, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, the plurality of media items (e.g., 634*b*) does not include (e.g., excludes or is selected so as to exclude) one or more media items from the first collection of media items that correspond to a third event. In some embodiments, the third event was determined to be (e.g., by the computer system and/or another computer system) attended by an organizer (e.g., the user of the computer system and/or a user of the one or more users) of the second collection of media items and not attended by one or more users in the set of one or more users that are not an organizer of the second collection of media items (e.g., as described above in relation to FIG. 6A) (e.g., where the one or more media items are available to be recommended to be included in the second collection of media items but are excluded in the plurality of media items that are recommended to be shared). In some embodiments, an organizer of the second collection of media items is the creator and/or a user that complete the initial set up of the second collection of media items. In some embodiments, the plurality of media items excludes some media items (e.g., media items from the first collection of media items) at events that were attended by the organizer of the second collection of media items but not by any of the other people in the sharing request. Displaying a recommendation to share a plurality of media items, where some of the media items are media items that correspond to events that were attend by the organizer of the shared collection of the media items but were not attend by other users, based on the first set of criteria being satisfied allows the computer system to automatically provide recommendations for media items that can in a shared collection of media items without all the media items having to include a user in the set of one or more users, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, the plurality of media items (e.g., 634*b*) includes one or more media items from the first collection of media items that do not include a representation (e.g., one or more representations of) of (e.g., in the content (e.g., visual content) of the one more media items (e.g., for visual media items, the at least one user is not determined to be visually within the contents of the media item)) at least one user (e.g., a set of one or more users) in the set of one or more users (e.g., as described above in relation to FIG. 6A) (e.g., because at least one user in the set of one or more users were determined to be at an event to which at least one or more media items corresponds and/or because a user is at an event that include one or more people who are represented in the first and/or second collection of media items but are not in the set of one or more users). Displaying a recommendation to share a plurality of media items, where some of the media items are media items do not include a representation of at least one user in the set of one or more users, based on the first set of criteria being satisfied allows the computer system to automatically provide recommendations for media items that can in a shared collection of media items without all the media items having to include a user in the set of one or more users, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, in response to detecting the request (e.g., 650*g*1, 650*g*2, 650*h*1, and/or 650*l*2) to share media items from the first collection of media items with the set of one or more users and in accordance with a determination that the first set of criteria is not satisfied (e.g., because there is no or below a threshold number (e.g., 5-20) of media items that meets the criteria), the computer system forgoes displaying, via the display generation component, the recommendation (e.g., 608) to share the plurality of media items with the set of one or more users in the second collection of media items (and/or any other recommendation to share the plurality of media items with the set of one or more users) (and, in some embodiments, displaying an indication that there are no media items that meet the first set of criteria). Forgoing displaying, via the display generation component, the recommendation to share the plurality of media items with the set of one or more users in the second collection of media items based on the first set of criteria not being satisfied allows the computer system to automatically choose to not display the recommendation in situations which are not likely to be relevant, which performs an operation when a set of conditions has been met without requiring further user input and provides additional control options without unnecessarily cluttering the user interface.

In some embodiments, after the second collection of media items is shared with the set of one or more users and after the set of one or more users have accepted (e.g., 650*aj*) an invite to share the second collection of media items, the set of one or more users can modify (e.g., add, remove, move, and/or edit media items in) the second collection of media items (and, in some embodiments, cannot modify the first collection of media items).

In some embodiments, before detecting the request (e.g., 650*g*1, 650*g*2, 650*h*1, and/or 650*l*2) to share media items from the first collection of media items with the set of one or more users and in accordance with a determination that one or more candidate users (e.g., one or more users from the set of one or more users and/or one or more users that are different from the one or more user sin the set of one or more users) satisfy a second set of criteria, the computer system displays, via the display generation component, an indication (e.g., 614*a*1-614*a*2) (e.g., a notification, a message, and/or updating an icon, an affordance, and/or a control) that the one or more candidate users are suggested to be included in the set of one or more users (e.g., as described above in relation to FIG. 6D). In some embodiments, in accordance with a determination that one or more candidate users does not satisfy the second set of criteria, forgoing providing the indication that the one or more candidate users are suggested to be included in the set of one or more users. Displaying, via the display generation component, an indication that the one or more candidate users are suggested to be included in the set of one or more users when a second of criteria is satiated allows the computer system to automatically suggest one or more users with which the shared collection of media items could be shared, which performs an operation when a set of conditions has been met without requiring further user input and reduces the number of inputs needed to find and/or add users with which the shared collection of media items should be shared.

In some embodiments, the second set of criteria includes a criterion that is satisfied when a determination is made that the one or more candidate users have engaged (e.g., recently engaged (e.g., in the last week, month, and/or year)) in media sharing activities (e.g., sharing with and/or receiving shared media from (e.g., the user of computer system and/or one or more users in the set of one or more users)) (e.g., as described above in relation to FIG. 6D). Displaying, via the display generation component, an indication that the one or more candidate users are suggested to be included in the set of one or more users based on the one or more candidate users engaging in media sharing activities allows the computer system to automatically and intelligently suggest one or more users with which the shared collection of media items could be shared, which performs an operation when a set of conditions has been met without requiring further user input, reduces the number of inputs needed to find and/or add users with which the shared collection of media items should be shared, and enhances the privacy/security of the computer system and/or collection of media items because suggesting recipients that the user has previously shared with increases privacy/security by reducing the risk that media will be inadvertently shared with unintended recipients.

In some embodiments, the second set of criteria includes a criterion that is satisfied when a determination is made that the one or more candidate users (e.g., John, Jane, and/or Jill) appear more than a threshold number of times (e.g., 10-1000 times) (and/or appears frequently and/or above a percentage (e.g., 5% or more)) (e.g., in media items) in the first (and/or, in some embodiments, second) collection of media items (and/or media items associated with (e.g., stored on and/or accessible by) the computer system (and/or in the first collection of media items)) (e.g., as described above in relation to FIG. 6D). In some embodiments, the threshold number of times is based on the average number of times that users appear in the collection of media items and/or a minimum threshold number of times that is determined by the number of times that the most frequent users appear in the collocation of media items (e.g., relative frequency (e.g., the most frequently identified people in the collection of media items). Displaying, via the display generation component, an indication that the one or more candidate users are suggested to be included in the set of one or more users based on the one or more candidate users appearing more than a threshold number of times in a collection of media allows the computer system to automatically and intelligently suggest one or more users with which the shared collection of media items could be shared, which performs an operation when a set of conditions has been met without requiring further user input, reduces the number of inputs needed to find and/or add users with which the shared collection of media items should be shared, and enhances the privacy/security of the computer system and/or collection of media items by suggesting people that the user has media items of rather than people of which the user does not have media items.

In some embodiments, the second set of criteria includes a criterion that is satisfied when a determination is made that the one or more candidate users are associated with (e.g., identified by) one or more accounts (and/or profiles) that have been linked (e.g., in software) (e.g., linked as having a relationship (e.g., a family relationship and/or a friend and/or a close friend)) (e.g., via contact associates (e.g., contact cards and/or contact information) and/or a shared family account) to one or more accounts of one or more users of the computer system (e.g., 600) (e.g., as described above in relation to FIG. 6D). In some embodiments, in accordance with a determination that family sharing is set up and/or is active, the set of one or more users includes all identified family members of the user of the computer system. In some embodiments, in accordance with a determination that family sharing is not set up and/or is not active, the computer system suggests the one or more candidate users based off of frequency and/or recency of photo sharing activity. Displaying, via the display generation component, an indication that the one or more candidate users are suggested to be included in the set of one or more users based on the one or more candidate users appearing more than a threshold number of times in a collection of media allows the computer system to automatically and intelligently suggest one or more users with which the shared collection of media items could be shared, which performs an operation when a set of conditions has been met without requiring further user input, reduces the number of inputs needed to find and/or add users with which the shared collection of media items should be shared, and enhances the privacy/security of the computer system and/or collection of media items by suggesting people that the user has a relationship with rather than people with which the user does not have a relationship.

In some embodiments, before detecting the request to share media items from the first collection of media items with the set of one or more users, the computer system provides (e.g., displaying) a list of users to be included in the set of one or more users (e.g., with which the second collection of media items is being shared). In some embodiments, while providing the list of users (e.g., 614*a*1 and 614*a*2, the computer system detects a request to modify the list of users (e.g., add, edit, and/or remove one or more users from the list of one or more users). In some embodiments, in response to detecting the request to modify the list of users, the computer system modifies the list of users (e.g., as described above in relation to FIGS. 6D-6F). Modifying the list of users in response to detecting the request to modify the list of users provides the user with more control of the computer system by allowing the user to modify a list of users with which the shared collection of media items will be shared, which provides additional control options without unnecessarily cluttering the user interface and enhances the privacy/security of the computer system and/or collection of media items by allowing the user to modify whom with which the collection of media items is shared.

In some embodiments, the computer system detects a request (e.g., 650*q*) to add a first user (and/or a contact of the user of the computer system) to the set of one or more users. In some embodiments, in response to detecting the request to add the first user to the set of one or more users (e.g., with which the second collection of media items is to be shared) and in accordance with a determination that the first user (e.g., Kevin or Jill in FIGS. 6A-6AO) is not associated with (e.g., not detected to correspond to) at least one media item that can be shared with the one or more users (e.g., in the first and/or second collection of media items and/or a media item is accessible by the computer system), the computer system displays, via the display generation component, an indication (e.g., 628 and/or 630*a*) that the first user should be associated with one or more respective media items. In some embodiments, the indication includes one or more respective media items. In some embodiments, in response to detecting an input (e.g., a tap input or, in some embodiments, a non-tap input (e.g., a dragging input, a mouse click, a gaze input, and/or a press-and-hold input)) directed to a first respective media item of the one or more respective media items, the computer system associates the first user with the respective accessible media item (e.g., without associating the user with one or more other media items of the one or more respective media items). In some embodiments, the indication includes an affordance that, when selected, initiates a process for associating the first user with one or more media items in the first collection. Displaying, via the display generation component, an indication that the first user should be associated with one or more respective media items when prescribed conditions are met allows the computer system to prompt the user that it is preferable for the first user to be associated with one or more media items, which performs an operation when a set of conditions has been met without requiring further user input and provides visual feedback to the user with relevant information concerning sharing collection of media items.

In some embodiments, the computer system detects a request (e.g., 650*q*) to add a second user (e.g., "Valeria" in FIGS. 6A-6AO) (e.g., and/or face of a user and/or portion of a face of the user) for identification in the second collection of media items. In some embodiments, the second user is not a user in the set of one or more users (e.g., the second collection of media items is not being and/or not currently being shared with the second user). In some embodiments, in response to detecting the request to add the second user for identification in the second collection of media items, the computer system adds a representation (e.g., 622a4) (e.g., a representation of a face of) of the second user to a set of representations of one or more users without adding the second user to the set of one or more users (e.g., without sharing the collection items with the second user). In some embodiments, the set of representations of one or more users are used to identify one or more media items to be shared in the second collection of media items. In some embodiments, in response to detecting the request to add the second user for identification in the second collection of media items, the computer system adds one or more media items, based on identifying the second user, to the second collection of media items without adding the second user to the set of one or more users (e.g., without sharing the collection items with the second user). In some embodiments, the set of representations of the one or more users include representations corresponding to one or more users (or each) in the set of one or more users. Adding a representation of the user to a set of representation of one or more users without adding the second user to the set of one or more users in response to detecting the request to add the second user for identification in the second collection of media items allows the computer system to use users with which the second collection of media items is not being shared as an input to identify media items that are likely to be relevant to the second collection of media items without having to share the second collection of media items with these users, which performs an operation when a set of conditions has been met without requiring further user input.

In some embodiments, in response to detecting the request to add the second user (e.g., as discussed above in relation to Valeria in FIGS. 6A-6AO) for identification in the second collection of media items and in accordance with a determination that the second user has not been associated with a name (e.g., and/or contact information and/or a contact card), the computer system displays, via the display generation component, an indication (e.g., user interfaces of FIGS. 6J-6K) that a name should be associated with the second user. In some embodiments, in response to detecting the input (e.g., a tap input or, in some embodiments, a non-tap input (e.g., a dragging input, a mouse click, a gaze input, and/or a press-and-hold input)) directed to the indication that the name should be associated with the second user, the computer system displays a control for entering the name for the second user. In some embodiments, in response to detecting one or more inputs directed to the control, the computer system associates the name (e.g., entered via the one or more inputs) with the second user. Displaying, via the display generation component, an indication that a name should be associated with the second user when prescribed conditions are met allows the computer system to prompt the user that it is preferable for the first user to be associated with a name, which performs an operation when a set of conditions has been met without requiring further user input and provides visual feedback to the user with relevant information concerning sharing collection of media items.

In some embodiments, detecting the request to share media items from the first collection of media items with the set of one or more users includes detecting selection of a first control option (e.g., 618a) (e.g., an affordance, a button, and/or an indication). In some embodiments, in response to detecting the request to share media items from the first collection of media items with the set of one or more users and in accordance with a determination that the first control option (e.g., 618a) was selected (e.g., 650g1), the computer system initiates a process to share all (and/or at least the majority) of the media items from the first collection of media items (e.g., and/or the majority of media items in the second collection of media items) with the set of one or more users (e.g., in the second collection of media items). In some embodiments, the first set of criteria includes a criterion that is satisfied when a determination is made that the first control option was not selected and/or a second control option that is different from the first control option was selected. In some embodiments, the first control option is displayed concurrently with the second control option. In some embodiments, as a part of initiating the process to share the majority of the second collection of media items with the set of one or more users, the computer system does not display the recommendation to share the plurality of media items. Initiating a process to share at least the majority (and/or all) of the media items from the first collection of media items (e.g., the majority of media items in the second collection of media items) with the set of one or more users in response to detecting the request to share media items from the first collection of media items with the set of one or more users and in accordance with a determination that the first control option was selected reduces the number of inputs needed for a user to share the majority of the media items from the first collection of media items with the set of one or more users.

In some embodiments, after displaying, via the display generation component, the recommendation to share the plurality of media items with the set of one or more users (and/or, in some embodiments, after selecting the set of one or more users) and after selecting one or more users (e.g., that includes at least one user from the set of one or more users and/or that includes at least one user who is not in the set of one or more users) for identification (e.g., in the first collection of media items), the computer system displays, via the display generation component, one or more indications (e.g., 630a) that the selected one or more users can be associated with one or more media items in one or more respective sets of media items. In some embodiments, the one or more indications that the selected one or more users can be associated with one or more media items in a respective set of media items is concurrently displayed with one or more indications that include one or more representations of the one or more users for identification. In some embodiments, in response to detecting an input (e.g., a tap input or, in some embodiments, a non-tap input (e.g., a dragging input, a mouse click, a gaze input, and/or a press-and-hold input)) of a first media item in the one or more respective sets of media items and while displaying at least one of the one or more indications, the computer system associates the first media item with a first user in the selected one or more users without associating the first media item with a second user of the selected in the selected one or more users and/or without associating a second media item in the one or more respective sets of media items with the first user (and, in some embodiments, without adding the one or more media items in the one or more respective sets of media items to the second collection of media items). Displaying, via the display generation component, the one or more indications that the selected one or more users can be associated with one or more media items in the one or more respective sets of media items provides the user with feedback that the selected one or more users can be associated with media items to identify candidate media items that can be shared in the second collection of media items, which provides improved visual feedback and reduces the number of inputs needed for the user to add additional media items at a different point in time.

In some embodiments, the one or more media items (e.g., 630*a*) in the one or more respective sets of media items include one or more media items (e.g., from the first collection of media items) that have been determined to (e.g., by the computer and/or another computer) include an appearance (e.g., of a detected portion of the face, body, and/or shape) similar to the appearance (e.g., an appearance that is potentially the third user but that has not been associated definitively with the third user) of a first user (e.g., a selected user) of the selected one or more users (e.g., as described above in relation to FIGS. 6M-6N). Displaying, via the display generation component, the one or more indications that the selected one or more users can be associated with one or more media items in the one or more respective sets of media items provides the user with feedback that the selected one or more users can be associated with media items that are likely to be relevant for identifying candidate media items that can be shared in the second collection of media items, which provides improved visual feedback and reduces the number of inputs needed for the user to add additional media items at a different points in time.

In some embodiments, displaying, via the display generation component, one or more indications (e.g., 630*a*) that the selected one or more users can be associated with one or more media items in the one or more respective sets of media items includes: displaying a first indication (e.g., 630*a*) that a second user of the selected one or more users can be associated with one or more media items a first respective set of media items in the one or more respective sets of media items; after displaying the first indication (e.g., 630*a*), detecting that a user of the computer system has provided one or more decisions regarding whether the one or more media items in the first respective set of media items should be associated with the second user; and after detecting (e.g., 650*n*) that the user of the computer system has provided the one or more decisions regarding whether the one or more media items in the first respective set of media items should be associated with the second user, displaying, via the display generation component, a second indication (e.g., 630*a*) that a third user of the selected one or more users can be associated with one or more media items in a second respective set of media items in the one or more respective sets of media items (e.g., as described below in FIGS. 6M-6P). the selected one or more users can be associated with one or more media items in the one or more respective sets of media items, the second respective set of (e.g., one or more) media items is different from the first respective set of (e.g., one or more media items. Displaying, via the display generation component, the second indication after displaying the first indication provides the user with feedback that a different user can be associated with a set of media items for identifying candidate media items for sharing in the second collection of media items after feedback is provided concerning additional items for a different user, which provides improved visual feedback and reduces the number of inputs needed for the user to add additional media items at a different points in time.

In some embodiments, a fourth user is included in the selected one or more users. In some embodiments, displaying, via the display generation component, the one or more indications (e.g., 630*a*) that the selected one or more users can be associated with one or more media items in one or more respective sets of media items includes: in accordance with a determination that a number of media items in the one or more respective sets of media items corresponding to the fourth user (e.g., has a representation of a user that has a similar appearance of the fourth user and/or corresponds to the fourth user based on the appearance of the fourth user) in the selected one or more users (e.g., different from the first, second, and/or third users in the selected one or more users and the user of the computer system) is above a first threshold number of media items (e.g., above 1-10), displaying, via the display generation component, a fourth indication (e.g., 630*a*) that the fourth user in the selected one or more users can be (and/or should be) associated with at least one media item in the one or more respective sets of media items (e.g., as described below in FIGS. 6M-6P); and in accordance with a determination that the number of media items in the one or more respective sets of media items corresponding to the fourth user in the selected one or more users (e.g., different from the first, second, and/or third users in the selected one or more users and the user of the computer system) is not above the first threshold number of media items (e.g., above 1-10), forgoing displaying the fourth indication (e.g., 630*a*) (e.g., as described below in FIGS. 6M-6P). Choosing whether to display the fourth indication when prescribed conditions are met allows the computer system to automatically determine, based on the number of additional media items, whether feedback should be provided concerning the identification of media items that are associated with the fourth user of the one or more selected users, which provides improved visual feedback and performs an operation when a set of conditions has been met without requiring further user input.

In some embodiments, displaying, via the display generation component, the one or more indications (e.g., 630*a*) that the selected one or more users can be associated with one or more media items in one or more respective sets of media items includes: in accordance with a determination that the number of media items in the one or more respective sets of media items corresponding to the fourth user in the selected one or more users is not above a second threshold number of media items (e.g., 0-10 media items), displaying, via the display generation components, an indication (e.g., 628*a* and/or 630*a*) that an initial set of one or more other media items (e.g., from the first collection of media items) can be used to identify the fourth user (and/or can be used to identify one or more other media items (e.g., different from the one or more media items in the one or more respective sets of media items) (and/or an indication that no media items were found to include a representation of the fourth user and one or more other media items should be provided to identify the fourth user). In some embodiments, the second threshold number is lower than the first threshold number of media items. In some embodiments, the second threshold number of media items is zero and the first threshold number of media items is a non-zero number. In some embodiments, the first threshold number of media items and the second threshold number of media items are the same and/or equal. In some embodiments, accordance with a determination that the number of media items in the one or more respective sets of media items corresponding to the fourth user in the selected one or more users is above a second threshold number of media items (e.g., 0-10 media items), displaying, via the display generation components, an indication that an initial set of one or more other media items (e.g., from the first collection of media items) can be used to identify the fourth user, the computer system does not display the indication that an initial set of one or more other media items (e.g., from the first collection of media items) can be used to identify the fourth user. Displaying, via the display generation components, an indication an initial set of one or more other media items can be used to identify the fourth user allows the computer system to automatically provide a mechanism for identifying media items with users who have not been detected in enough media items, which provides improved visual feedback and performs an operation when a set of conditions has been met without requiring further user input.

In some embodiments, a fifth user, different from the fourth user, is included in the selected one or more users. In some embodiments, displaying, via the display generation component, the one or more indications that the selected one or more users can be associated with one or more media items in one or more respective sets of media items includes: after (e.g., immediately after) displaying, via the display generation components, the indication (e.g., 628*a* and/or 630*a*) that the initial set of one or more other media items (e.g., from the first collection of media items) can be used to identify the fourth user (and/or after one or more media items are selected to identify the fourth user) and in accordance with a determination that the number of media items in the one or more respective sets of media items corresponding to the fifth user in the selected one or more users is not above the second threshold number of media items (e.g., 0-10 media items), displaying, via the display generation components, an indication (e.g., 628*a* and/or 630*a*) that an initial set of one or more other media items (e.g., from the first collection of media items) can be used to identify the fifth user (e.g., as described below in FIGS. 6M-6P).

In some embodiments, after displaying the recommendation to share the plurality of media items with the set of one or more users in the second collection and prior to sharing the second collection of media items with the set of one or more users, the computer system displays, via display generation component, a review control (632*a*) that, when selected (e.g., 650*u*1), causes the computer system to display a review user interface (e.g., 634) that includes a plurality of selected media items (e.g., 634*b*) (e.g., selected automatically via the computer system and/or selected manually via user of the computer system) (e.g., from the first collection of media items and/or in the second collection of media items) that are to be shared with the set of one or more users. In some embodiments, the selected media item includes one or more of the plurality of media items. Displaying the review control provides user with an additional control option to confirm the media items that will be shared in the shared collection of media items, which provides additional control options without unnecessarily cluttering the user interface and provides visual feedback regarding the state of the shared collection of media items.

In some embodiments, while displaying the review control (e.g., 632*a*), the computer system detects a first input (e.g., 650*u*1) (e.g., a tap input or, in some embodiments, a non-tap input (e.g., a dragging input, a mouse click, a gaze input, and/or a press-and-hold input)) directed to the review control. In some embodiments, in response to detecting the first input (e.g., 650*u*1) directed to the review control (e.g., 632*a*), the computer system displays the review user interface (e.g., 634) that includes one or more media items in the second collection of media items. In some embodiments, while displaying the review user interface (e.g., 634) that the one or more media items (e.g., 634*b*) in the second collection of media items, the computer system detects one or more inputs that includes an input (e.g., a tap input or, in some embodiments, a non-tap input (e.g., a dragging input, a mouse click, a gaze input, and/or a press-and-hold input)) that is directed to a first media item in the second collection of media items (e.g., in the plurality of selected media items, and/or not in the plurality of selected media items but in the first and/or second collection of media items) (e.g., as described above in relation to FIG. 6V). In some embodiments, the review user interface includes controls that are similar to and/or the same as control for a standard media viewing user interface (e.g., a media gallery and/or a media viewing user interface) (e.g., on the computer system) to make navigating through the second collection of media items more intuitive for the user of the computer system. In some embodiments, in response detecting one or more inputs that includes the input that is directed to the first media item in the second collection of media items and in accordance with a determination that the one or more inputs includes a first set of inputs, the computer system removes the first media item from the second collection of media items (e.g., as described above in relation to FIGS. 6V-6AC). In some embodiments, removing the first media from the second collection of media items includes removing a large number of media items (e.g., more than twenty) (e.g., 100, 500, 1000, and/or 10000 or more) from the second collection of media items. In some embodiments, in response detecting one or more inputs that includes the input that is directed to the first media item in the second collection of media items and in accordance with a determination that the one or more inputs includes a second set of inputs that are different from the first set of inputs, the computer system adds the first media item to the second collection of media items (e.g., as described above in relation to FIGS. 6V-6AC). In some embodiments, the review user interface includes a user-interactive graphical user interface object (e.g., an approve affordance) that, when selected, initiates a process to share the plurality of media items with the one or more users. In some embodiments, adding the first media from the second collection of media items includes adding a large number of media items (e.g., more than twenty) (e.g., 100, 500, 1000, and/or 10000 or more) from the second collection of media items. Removing the respective media item from the plurality of selected media items or adding the respective media item to the plurality of selected media items in response detecting one or more inputs that includes an input that is directed to the respective media item provides the user with the ability to modify the shared collection of media items (e.g., before sharing the media items with the set of one or more users), which provides additional control options without unnecessarily cluttering the user interface and enhances privacy/security by allowing a user an additional opportunity to confirm whether a media item should be included in the shared collection.

In some embodiments, while displaying the review control (e.g., 632*a*), the computer system detects a second input (e.g., 650*u*1) (e.g., a tap input or, in some embodiments, a non-tap input (e.g., a dragging input, a mouse click, a gaze input, and/or a press-and-hold input)) directed to the review control. In some embodiments, in response to detecting the second input directed to the review control (e.g., 632*a*), the computer system displays the review user interface, including: in accordance with a determination that a second media item in the plurality of selected media items satisfies a set of privacy criteria (e.g., whether or not the media item is hidden and/or private), displaying a second media item (e.g., as a part of the plurality of selected media items and/or in the user interface that includes the plurality of selected media items) (e.g., as discussed above in relation to FIGS. 6V-6AC); and in accordance with a determination that the second media item in the plurality of selected media items does not satisfy the set of privacy criteria, forgoing displaying the second media item (e.g., as discussed above in relation to FIGS. 6V-6AC) (e.g., as a part of the plurality of selected media items and/or in the user interface that includes the plurality of selected media items). In some embodiments, in accordance with a determination that the second media item in the plurality of selected media items does not satisfy the set of privacy criteria, the second media item is not included in the shared collection of media items. In some embodiments, in accordance with a determination that the second media item in the plurality of selected media items does satisfy the set of privacy criteria, the second media item can be included in the shared collection of media items. Choosing whether to display the second media in accordance with a determination that a second media item in the plurality of selected media items satisfies a set of privacy criteria allows the computer system to automatically media items that should not be shown and/or included in the second collection of media items, which provides additional control options without unnecessarily cluttering the user interface and enhances privacy/security by reducing the chances of a private and/or hidden median being shared unintentionally with one or more users.

In some embodiments, after displaying the recommendation (e.g., 608) to share the plurality of media items (e.g., 634*b*) with the set of one or more users in the second collection and prior to sharing the second collection of media items with the set of one or more users (and/or media items in the second collection of media items), the computer system displays, via the display generation component, a skip control (e.g., 612*b*, 614*b*, 620*c*, and/or 632*b*) (e.g., while concurrently displayed review control). In some embodiments, while displaying the skip control, the computer system detects an input (e.g., 650*u*2) (e.g., a tap input or, in some embodiments, a non-tap input (e.g., a dragging input, a mouse click, a gaze input, and/or a press-and-hold input)) directed to the skip control. In some embodiments, in response to detecting the input (e.g., 650*u*2) directed to the skip control, the computer system forgoes displaying the preview user interface (e.g., as described above in relation to FIG. 6U).

In some embodiments, the first set of one or more media items (e.g., 690) that correspond to the first event (and/or, in some embodiments, the second set of one or more media items that correspond to the second event) includes a first respective media item that has been determined to include (e.g., depicting) a representation (e.g., a depiction of, a scene that includes, and/or a capture of) of at least one of the set of one or more users (e.g., one or more of the users with whom the second collection of media items is being shared) (e.g., as discussed above in relation to FIG. 6A and FIGS. 6I-6T). Displaying a recommendation to share a plurality of media items, where some media items include one or more users in the set of one or more users, based on the first set of criteria being satisfied allows the computer system to automatically provide recommendations for media items that can be in a shared collection of media items, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, the first set of one or more media items (e.g., 690) that correspond to the first event include a second respective media item that does not have a representation (e.g., a depiction of, a scene that includes, and/or a capture of) of any users in the set of one or more users (e.g., any of users at all) (e.g., as discussed above in relation to FIG. 6A and FIGS. 6I-6T). Displaying a recommendation to share a plurality of media items, where some media items are from events attend by but do not include one or more users in the set of one or more users, based on the first set of criteria being satisfied allows the computer system to automatically provide recommendations for media items that can be in a shared collection of media items, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, detecting the request to share media items from the first collection of media items with the set of one or more users includes: displaying one or more timeframe options (e.g., 620*a*) for selecting media items from the first collection of media items; and in response to detecting a set of one or more inputs (e.g., as described above in relation to FIG. 6H) (e.g., one or more tap inputs or, in some embodiments, a non-tap input (e.g., a dragging input, a mouse click, a gaze input, and/or a press-and-hold input)) directed to the one or more timeframe options, determining that a first timeframe (e.g., 620*a*1) has been selected (e.g., as described above in relation to FIG. 6H). In some embodiments, after determining that the first timeframe has been selected and in accordance with a determination that a second set of criteria is satisfied, the computer system displays a second plurality of media items (e.g., 634*b*) that are recommended (e.g., 608) to be shared with the set of one or more users (e.g., in the second collection of media items). In some embodiments, the second plurality of media items that are recommended to be shared with the set of one or more users were captured during the first timeframe. In some embodiments, the first set of criteria includes the second set of criteria. In some embodiments, the second set of criteria includes a criterion that is satisfied when a determination is made that a respective media item from the first collection of media items was captured during a selected time frame. Displaying a second plurality of media items that are recommended to be shared with the set of one or more users that were captured during the first timeframe based on a determination that is made that a respective media item from the first collection of media items was captured during a selected time frame provides the user with more control over the computer system by allowing the user to filter potential recommendations that are provided by the computer system, which performs an operation when a set of conditions has been met without requiring further user input, reduces the number of inputs needed to select media items to be shared, provides visual feedback concerning media items that are more likely to be preferred candidates for sharing with the one or more other participants, and provides additional control options without unnecessarily cluttering the user interface.

In some embodiments, the one or more timeframe options (e.g., 620*a*) include a start date option (e.g., 620*a*). In some embodiments, the start date option (e.g., 620*a*) includes a default start date (e.g., as indicated by 620*a*1) that is selected based on at least one user in the set of one or more users started being represented in media items in the first collection of media items that were captured on a date that corresponds to the default date (e.g., as described above in relation to FIG. 6H). Having a start date option includes a default start date that is selected based on at least one user in the set of one or more users started being represented media items in the first collection of media items that were captured on a date that corresponds to the default date allows the computer system to automatically display a default value that is more than likely more relevant to the user and reduces the number of inputs needed to switch the option to the more relevant data, which performs an operation when a set of conditions has been met without requiring further user input and reduces the number of inputs needed for the user to add additional media items at a different points in time.

In some embodiments, after displaying the recommendation (e.g., 608) to share the plurality of media items with the set of one or more users, the computer system detects a request to display a menu (e.g., 634*c* and/or 610*a*). In some embodiments, in response to detecting the request to display the settings user interface, the computer system displays, via the display generation component, the menu (e.g., 634*c*, 644, and/or 610*a*). In some embodiments, the menu includes a sharing control (e.g., 610*a* and/or 618*a*). In some embodiments, detecting the request to share media items from the first collection of media items with the set of one or more users includes detecting selection of (e.g., via an input e.g., one or more tap inputs or, in some embodiments, a non-tap input (e.g., a dragging input, a mouse click, a gaze input, and/or a press-and-hold input)) directed to) the sharing control In some embodiments, after displaying the recommendation (e.g., 608) to share the plurality of media items with the set of one or more users, the computer system detects a request (e.g., 650*ad*2, 650*ad*3, 650*af*2) to confirm that the second collection of media items is ready to be shared with the set of one or more users. In some embodiments, in response to detecting the request to confirm that the second collection of media items is ready to be shared with the set of one or more users, the computer system sends, via a messaging application, one or more messages (e.g., 6600 to at least one user in the set of one or more users. In some embodiments, the one or more messages include one or more invitations to enable sharing of the second collection of media items (e.g., as discussed above in relation to FIGS. 6AG-6AH). In some embodiments, a recipient of the invitation, upon accessing a photo viewing application, receives an indication of the invitation. Sending, via a messaging application, one or more messages to at least one user in the set of one or more users. In some embodiments, the one or more messages include one or more invitations to enable sharing of the second collection of media items in response to detecting the request to confirm that the second collection of media items is ready to be shared with the set of one or more users allows the user to control when invitations to join the shared collection of media items are sent to the set of one or more users, which performs an operation when a set of conditions has been met without requiring further user input and enhances privacy/security by allowing the user of the computer system to control the sharing of media items.

In some embodiments, the one or more messages (e.g., 6600 are sent as a group message to a group of recipients (e.g., 660*a*1-660*a*3). In some embodiments, the group of recipients include (and/or are) the one or more users. In some embodiments, as a part of sending, via a messaging application, one or more messages to at least one user in the set of one or more users includes, the computer system: sends, via the message application, a first message that includes a first invitation of the one or more messages to a respective first user (e.g., in the set of one or more users) without sending the first message to the second user; and sends, via the message application, a second message that includes a second invitation of the one or more invitations to a respective second user (e.g., in the set of one or more users) (e.g., a user that is different from the first respective user) without sending the second message to the first respective user.

In some embodiments, the one or more invitations include one or more current statuses (e.g., 660*h*) (e.g., invitation sent, accepted, and/or rejected). In some embodiments, the one or more current statuses (e.g., 660*h*) (that correspond to the one or more invitations) are updated in the messaging application over time. Having current statuses for the one or more invitations that are updated over time provides the user with feedback concerning how one or more recipients of have responded to the one or more invitations, which provides improved visual feedback and enhances privacy/security by providing the user with information regarding the status of invitation.

In some embodiments, selection (e.g., 650*ai*) of a second invitation (e.g., who sent the invitation is from, size of the collection of media items, all participants and/or identifiers for the set of the one or more users, and/or a preview of content and/or media items that are proposed to be and/or are currently being shared in the collection of media items) of the one or more invitations causes information (e.g., 650*aj*1) concerning the second collection of media items to be displayed (e.g., at the computer system of a user, in the one or more set of users, who selected the third invitation). Causing information concerning the second collection of media items to be displayed based on selection of the invitation provides a respective user with feedback concerning the shared collection of media items that are being proposed to be shared with the respective user, which provides improved visual feedback and enhances privacy/security by providing the user with information regarding the status of invitation.

In some embodiments, after (and, in some embodiments, in response to) detecting the request to confirm that the second collection of media items is ready to be shared with the set of one or more users, the computer system displays, via the display generation component, an automatic-adding control (e.g., 654*a*). In some embodiments, while displaying the automatic-adding control, the computer system detects an input (e.g., 650*af*1) (e.g., a tap input or, in some embodiments, a non-tap input (e.g., a dragging input, a mouse click, a gaze input, and/or a press-and-hold input)) directed to the automatic-adding control (e.g., 654*a*). In some embodiments, in response to detecting the input directed to the automatic-adding control (e.g., 654*a*), the computer system transitions the computer system between being configured to not automatically add captured media to the second collection of media items (with or without adding captured media to the first collection of media items) in response to detecting a request to capture media when respective criteria (e.g., set of media sharing criteria as described below in relation to FIGS. 10A-10N and method 1200) are satisfied and being configured to automatically add captured media to the second collection of media items (with or without adding captured media to the first collection of media items) in response to detecting a request to capture media when respective criteria are satisfied (e.g., as described above in relation to FIG. 6AF). In some embodiments, in response to detecting the input directed to the automatic-adding control and in accordance with a determination that the computer system was configured to automatically add captured media to the second collection of media items in response to detecting a request to capture media when respective criteria are satisfied when the input was detected, the computer system is not configured to automatically add captured media to the second collection of media items in response to detecting a request to capture media when respective criteria are satisfied when the input was detected; and in response to detecting the input directed to the automatic-adding control and in accordance with a determination that the computer system was configured to not automatically add captured media to the second collection of media items in response to detecting a request to capture media when respective criteria are satisfied when the input was detected, the computer system is configured to automatically add captured media to the second collection of media items in response to detecting a request to capture media when respective criteria are satisfied when the input was detected.

In some embodiments, after displaying the recommendation to share the plurality of media with the set of one or more users in the second collection of media items, the computer system (e.g., 600) displays a user interface (e.g., 740*a*) (e.g., a media gallery user interface and/or a media viewer user interface, where the computer system is in a selection mode) (e.g., a user interface that is displayed in response to detecting an input (e.g., 750*k*1) directed to a selection control (e.g., 742*a*) that, when selected, configures allows a user to select (e.g., via 756*a*-756*c*) one or more media items) that includes a third media item (e.g., 744*a*-744*b*) and a fourth media item (e.g., 744*c*), including: in accordance with a determination that the third media item is in (and/or is associated with) the second collection of media items (e.g., as described above in relation to FIGS. 7K-7L) and the fourth media item is not in the second collection of media items (e.g., as described above in relation to FIGS. 7K-7L), visually distinguishing (e.g., via an indication (e.g., 752*a*, 752*b*, and/or 754*c*) (e.g., graphical indicator and/or an icon) and/or a badge that is displayed on top of a respective media item (in some embodiments, multiple or all media items that are in the second collection have an indication; in some embodiments, multiple or all items that are not in the second collection have an indication) the fourth media item from the third media item (e.g., as described below in relation to method 900). Visually distinguishing the fourth media item from the third media item in accordance with a determination that the third media item is in the second collection of media items and the fourth media item is not in the second collection of media items provides the user with visual feedback concerning whether a media item is included in the shared collection of media items or not, which provides improved visual feedback.

Note that details of the processes described above with respect to method 800 (e.g., FIG. 8) are also applicable in an analogous manner to the methods described below. For example, method 800 optionally includes one or more of the characteristics of the various methods described in relation to method 900. For example, method 800 can be used to create a shared media library between one or more people and method 900 can be used to notify at least one of the people concerning changes to the shared media library. For brevity, these details are not repeated below.

FIG. 9 is a flow diagram illustrating methods for notifying participants of changes to one or more media libraries using a computer system in accordance with some embodiments. Method 900 is performed at a computer system (e.g., 100, 300, 500, 600, 680, and/or 700) (e.g., a smartphone, a desktop computer, a laptop, a tablet, or a head mounted device (e.g., a head mounted augmented reality and/or extended reality device)). In some embodiments, the computer system is in communication with a display generation component (e.g., a display controller, a touch-sensitive display system, and/or a head mounted display system). In some embodiments, the computer system is in communication with one or more input devices (e.g., a touch-sensitive surface a camera, a mouse, and/or a trackpad) and/or one or more output devices (e.g., one or more display generation components, speakers, and/or sensors (e.g., haptic sensors and/or light sensors)). Some operations in method 900 are, optionally, combined, the orders of some operations are, optionally, changed, and some operations are, optionally, omitted.

As described below, method 900 provides an intuitive way for notifying participants of changes to one or more media libraries. The method reduces the cognitive burden on a user for notifying participants of changes to one or more media libraries, thereby creating a more efficient human-machine interface. For battery-operated computing devices, enabling a user to notify participants of changes to one or more media libraries faster and more efficiently conserves power and increases the time between battery charges.

The computer system (e.g., 100, 300, 500, 600, 680, and/or 700) detects (902) a request (e.g., 750*a*1-750*a*6 and/or 750*h*) concerning (e.g., a request to perform the change event, a request where the change event have been performed, and/or a request that the change event will be performed) a change event (e.g., a change event, such as a request add, delete, or modify one or more items in the collection or a change that was performed in response to user input at the computer system and/or another computer system) corresponding to a collection of media items that is shared between multiple users (e.g., one or more media items (e.g., photos (e.g., a still photo and/or a portrait photo), videos, and/or an animated image)) (e.g., a media library, a folder that contains one or more media items, and/or a label or identifier that points to one or more media items). In some embodiments, as a part of detecting the request concerning the change event to the collection of media items, the computer system detects that a change to the collection of media items has occurred. In some embodiments, as a part of detecting the request concerning the change event to the collection of media items, the computer system detects that a change to the collection of media items has not occurred. In some embodiments, the computer system detects the request to change the collection of media items while a representation (e.g., as described above in relation to FIGS. 6A-6AO and method 800) of the collection of media items is displayed).

In response to (904) detecting the request (e.g., 750*a*1-750*a*6 and/or 750*h*) concerning the change event corresponding to the collection of media items that is shared between the multiple users, the computer system, in accordance with a determination that a set of notification criteria are satisfied, where the set of notification criteria includes a criterion that is satisfied when the change event (e.g., the requested change event and/or the change event that has occurred in response to detecting the request to change the collection of media items) is a first type of change event (e.g., a destructive change, such as deleting media), displays (906) (and/or transmitting indirectly (e.g., via one or more other external devices, such as one or more servers) and/or directly) (e.g., via a display generation component) an indication (e.g., 710*a* and/or 710*b*) that the change event corresponding to the collection of media items has been detected. In some embodiments, a contributor of the collection of media items is a user who caused a respective media item to be in the collection of media items (e.g., who caused the media item to be assigned and/or saved to the collection of media items) and/or a user who captured the collection of media items. In some embodiments, transmitting the indication causes the external device to notify the contributor (e.g., via displaying one or more notifications, via issuing one or more haptic outputs, and/or via outputting audio (e.g., without intervening user input (e.g., without intervening user input after the indication has been transmitted) from the contributor and/or user of the external device)). In some embodiments, the set of notification criteria includes a criterion that the requested change corresponds to a media item that was contributed to the media collection by a user other than a user (e.g., a user account) associated with the computer system. In some embodiments, in accordance with a determination that a set of notification criteria are satisfied, the change event is completed (e.g., the media item is deleted from the collection of media items that is shared between multiple users and ceases to be displayed in the collection of media items (e.g., a media library) along with an indication/alert (and/or the indication that the change event corresponding to the collection of media items has been detected) to the user that the media item has been deleted (e.g., although the two changes are not necessarily displayed concurrently)).

In response to (904) detecting the request (e.g., 750*a*1-750*a*6 and/or 750*h*) concerning the change event corresponding to the collection of media items that is shared between the multiple users, the computer system, in accordance with a determination that the set of notification criteria are not satisfied (e.g., the requested change is a second type of change (e.g., a non-destructive change, such as adding, editing, and/or favoriting media) that is different from the first type of change, or the change is directed to media that the user of the computer system contributed to the media collection), forgoes displaying (908) the indication (e.g., 710*a* and/or 710*b*) that the change event corresponding to the collection of media items has been detected. In some embodiments, in response to detecting the request concerning the change event corresponding to the collection of media items that is shared between the multiple users (and in accordance with a determination that the set of notification criteria are or are not satisfied), the collection of media items is changed (e.g., a media item in the collection is edited, updated, deleted, and/or removed and/or a media item is added to the collection of media items). In some embodiments, when/after the collection of media items is changed, a computer system displayed the collection of media items in a changed state that is different from a state at which the collection of media items was displayed before the change event was detected. In some embodiments, in accordance with a determination that a set of notification criteria are not satisfied, the change event is completed. Choosing whether to display the indication that the change event corresponding to the collection of media items has been detected based on prescribed conditions allows the computer system to automatically choose to display the indication based on at least the change event's type (e.g., where indications for change events of certain type(s) are displayed and where indications for change events for other type(s) are not displayed, which performs an operation when a set of conditions has been met without requiring further user input and provides improved visual feedback to the user.

In some embodiments, the request (e.g., 750*a*1-750*a*6 and/or 750*h*) concerning the change event is a request to change (e.g., edit, move, and/or delete) a first media item (e.g., 724*a* and/or 724*c*) (e.g., in the collection of media items and/or a candidate media item to be include and/or added in the collection of media items). In some embodiments, the set of notification criteria includes a criterion that is satisfied when a determination is made that the request to change the first media item was requested by (and/or was caused by) a user (e.g., of the multiple users) who is not a contributor of (or who did not contribute (e.g., cause the media item to be added to the collection of media items and/or cause the media item to be captured)) the first media item to the collection of media items (e.g., as discussed in relation to FIGS. 7C-7J2). Choosing whether to display the indication that the change event corresponding to the collection of media items has been detected based on prescribed conditions allows the computer system to automatically choose to display the indication when a user who is not a contributor of the media item caused the change event concerning the media item, which performs an operation when a set of conditions has been met without requiring further user input, provides improved visual feedback to the user, and enhances privacy by notifying user(s) concerning a request to change a collection of media items to which the user who requested the change did not contribute.

In some embodiments, the first type of change event is one or more of a first set of change events (e.g., 750*a*4) that are classified (e.g., by the computer system and/or another computer system, such as a server) as destructive changes and is not one or more of a second set of change events (e.g., 750*a*2-750*a*3 and/or 750*a*5) that are classified (e.g., by the computer system and/or another computer system, such as a server) as non-destructive changes items (e.g., as discussed in relation to FIGS. 7C-7J2). In some embodiments, a second type of change event that is different from the first change event is one or more of the second set of change events and not one or more of the first set of change events. In some embodiments, the first set of changes are destructive changes (e.g., changes that cause the media item to be removed from the collection of media items, making a non-reversible edit to the media item, and/or permanently deleted) and the second set of changes are non-destructive changes (e.g., adding a tag, renaming, changing a date, and/or making a reversible edit to a media item). Choosing whether to display the indication that the change event corresponding to the collection of media items has been detected based on prescribed conditions allows the computer system to automatically choose to display the indication based on the change being a first set of changes (and not a second set of changes), which performs an operation when a set of conditions has been met without requiring further user input, provides improved visual feedback to the user, and enhances privacy by notifying user(s) concerning a certain set of changes (e.g., destructive changes) and not notifying the user about another set of changes (e.g., non-destructive changes).

In some embodiments, the first set of change events (e.g., 750*a*4) includes an event (e.g., 750*a*4) that causes (and/or initiates a process for causing) deletion of a second media item (e.g., represented by 724*a*) from the collection of media items (e.g., permanently deleted and/or removed from the collection of media items) (e.g., by the first computer system and/or another computer system (e.g., a computer system at which the event was initiated)) (e.g., as discussed above in relation to FIGS. 7A1-7I). Choosing whether to display the indication that the change event corresponding to the collection of media items has been detected based on prescribed conditions allows the computer system to automatically choose to display the indication when the change event causes deletion of a media item in the collection of media items, which performs an operation when a set of conditions has been met without requiring further user input, provides improved visual feedback to the user, and enhances privacy by notifying user(s) when a change event that causes a deletion occurs.

In some embodiments, the second set of change events includes an event (e.g., 750$a$5) that causes (and/or initiates a process for causing) modification (e.g., editing and/or modifying one or more visual characteristics of media, such as color, contrasts, tint, aspect ratio, size, and/or distortion and/or applying one or more filters to a media item) of a third media item (e.g., represented by 724$a$) in the collection of media items (e.g., by the first computer system and/or another computer system (e.g., a computer system at which the event was initiated)). In some embodiments, the second set of change events includes an event that causes (and/or initiates a process for causing) a fourth media item (e.g., represented by 724$a$) to be added to the collection of media items (e.g., as described above in relation to FIGS. 7A1-7J2) (e.g., a media item that was not added to the collection of media items before the event (e.g., that causes a third media item to be added to the collection of media items) occurred) (e.g., by the first computer system and/or another computer system (e.g., a computer system at which the event was initiated)). In some embodiments, after the event that causes a third media item to be added to the collection of media items occurs, the third media is shared with the multiple users as a part of the collection of media items. In some embodiments, the second set of change events includes an event (e.g., 722$c$) that causes a fifth media item (e.g., represented by 724$a$) in the collection of media items to be designated as belonging to a group of media items (e.g., favorited media items and/or shared media items) (e.g., by the first computer system and/or another computer system (e.g., a computer system at which the event was initiated)). In some embodiments, while the fourth media item is designated as belonging to a group of media items (and/or after the event (e.g., that causes a fourth media item in the collection of media items to be designated as belonging to a group of media items) occurs, the fourth media item continues to be in the collection of media items.

In some embodiments, the request (e.g., 750$a$1-750$a$6 and/or 750$h$) concerning the change event is a request (e.g., 750$a$1) to move a sixth media item in the collection of media items that is shared between multiple users (e.g., multiple devices of multiple users) to a respective (and/or personal) collection of media items that is not shared with multiple users. In some embodiments, the collection of media items that is not shared with multiple users is shared with multiple devices for a user and/or one user. In some embodiments, in response to detecting the request concerning the change event including detecting the request to move the sixth media item in the collection of media items that is shared between multiple users to the respective collection of media items that is not shared with multiple users, the computer system: in accordance with a determination that a user of the computer system contributed (e.g., added) the sixth media item (e.g., represented by 724$a$) to the collection of media items that is shared between multiple users, moves the sixth media item to the respective collection of media items that is not shared with multiple users (e.g., as described above in relation to FIGS. 7A1-7B); and in accordance with a determination that the user of the computer system did not contribute the sixth media item to the collection of media items, forgoes moving the sixth media (e.g., represented by 724$a$) item to the respective collection of media items that is not shared with multiple users (and, in some embodiments, continuing to include the sixth media item in the collection of media items) (e.g., as described above in relation to FIGS. 7A1-7B). In some embodiments, in accordance with a determination that the user of the computer system contributed the sixth media item to the collection of media items, the sixth media item is removed from (e.g., by the computer system or another computer system) the collection of media items that is shared between multiple users. In some embodiments, in accordance with a determination that the user of the computer system contributed the sixth media item to the collection of media items, the sixth media item is not removed from (e.g., by the computer system or another computer system) the collection of media items that is shared between multiple users. In some embodiments, in accordance with a determination that a respective user did not contribute the sixth media item to the collection of media items, an option (e.g., 720$b$) to move the sixth media item is not displayed at the device of the respective user (e.g., in a menu (e.g., 634$c$) and/or in a media viewing user interface (e.g., 720). In some embodiments, in accordance with a determination that a respective user did contribute the sixth media item to the collection of media items, the option (e.g., 720$b$) to move the sixth media item is displayed at the device of the respective user (e.g., in a menu and/or in a media viewing user interface). Moving the sixth media item to the respective collection of media items that is not shared with multiple users in response to detecting the request concerning the change event including detecting the request to move the sixth media item in the collection of media items that is shared between multiple users to the respective collection of media items that is not shared with multiple users based on a determination that a user of the computer system contributed the sixth media item enhances the security/privacy of the computer system and/or the shared collection of media items by allowing contributors of media items to move media items that the user contributed to the shared collection of media items without allowing non-contributors to move media items that the non-contributors did not contribute to the collection of media items.

In some embodiments, the set of notification criteria includes a criterion that is periodically (e.g., daily, weekly, and/or monthly) satisfied based on an interval (e.g., a display, week, and/or month) of time (in some embodiments, the interval of time is shorter than the amount of time before a media item that is marked for deletion is permanently deleted (e.g., as described in relation to FIG. 7I). In some embodiments, the change event corresponding to the collection of media items occurred at a first time during the interval of time. In some embodiments, in accordance with a determination that the set of notification criteria are satisfied, the computer system displays, concurrently with the indication that the change event corresponding to the collection has been detected, one or more indications (e.g., 710$b$) of one or more change events corresponding to the collection of media items (e.g., as described above in relation to FIG. 7D). In some embodiments, at least one of the one or more changes events was detected at a second time during the interval of time that is different from the first time (e.g., as described above in relation to FIG. 7D). In some embodiments, in accordance with a determination that the set of notification criteria are not satisfied, the computer system forgoes displaying one or more indications of one or more change events corresponding to the collection of media items. In some embodiments, at least one of the one or more changes events was detected at a second time during the interval of time that is different from the first time. Displaying, concurrently with the indication that the change event corresponding to the collection has been detected, one or more indications of one or more change events corresponding to the collection of media items, where at least one of the one or more changes events was detected at a second time during the interval of time that is different from the first time when prescribed conditions are met allows the computer system to display indications concerning change events periodically in order to provide the user with feedback without constantly disturbing the user of the computer system and/or without cluttering the user interface, which performs an operation when a set of conditions has been met without requiring further user input and provides improved visual feedback.

In some embodiments, the change event corresponding to the collection of media items was detected at a third time. In some embodiments, an additional change event corresponding to the collection of media items was detected at a fourth time that occurs before the third time. In some embodiments, before detecting the request concerning the change event corresponding to the collection of media items that is shared between multiple users, an indication (e.g., 710*a*) that the additional change event corresponding to the collection of media items has been detected was initially displayed at a time that is based on the fourth time (e.g., as described above in relation to FIG. 7C). In some embodiments, in accordance with a determination that the set of notification criteria are satisfied (and while the indication that the additional change event corresponding to the collection of media items has been detected continues to be displayed), the indication (e.g., 710*a*) that the change event corresponding to the collection of media items has been detected is initially (e.g., for the first time and/or before the change event was displayed) displayed at a time that is based on the third time and not the fourth time (e.g., as described above in relation to FIG. 7C). Displaying the indication that the change event corresponding to the collection of media items has been detected initially based on a time at which the change event occurred provides the user with visual feedback concerning the change event, which provides improved visual feedback.

In some embodiments, while displaying the indication (e.g., 710*a* and/or 710*b*) that the change event corresponding to the collection of media items has been detected, a disable-notification setting (e.g., 610*h*) is in a first state (e.g., an off state). In some embodiments, after displaying the indication that the change event corresponding to the collection of media items has been detected and while the disable-notification setting is in the first state, the computer system detects an input directed to a control for changing the disable-notification setting (e.g., 610*h*). In some embodiments, in response to detecting the input (e.g., a tap input or, in some embodiments, a non-tap input (e.g., a dragging input, a mouse click, a gaze input, and/or a press-and-hold input)) directed to the control for changing the disable-notification setting, the computer system changes the disable-notification setting (e.g., 610*h*) to be in a second state (e.g., on state) that is different from the first state (e.g., as described above in relation to FIG. 7C). In some embodiments, while the disable-notification setting is in the second state, the computer system detects a request concerning (e.g., a request to perform the change event, a request where the change event have been performed, and/or a request that the change event will be performed) an additional change event (e.g., a change event, such as a request add, delete, or modify one or more items in the collection or a change that was performed in response to user input at the computer system and/or another computer system) corresponding to the collection of media items that is shared between multiple users (e.g., as described above in relation to FIG. 7C). In some embodiments, in response to detecting the request concerning the additional change event corresponding to the collection of media items that is shared between multiple users while the disable-notification setting is in the second state, the computer system forgoes displaying an indication that the additional change event corresponding to the collection of media items that is shared between multiple users (e.g., as described above in relation to FIG. 7C) (e.g., irrespective of whether or not the set of notification criteria are satisfied). In some embodiments, in response to detecting a request concerning another change event corresponding to the collection of media items that is shared between multiple users while the disable-notification setting is in the first state, the computer system displays an indication that the other change event corresponding to the collection of media items that is shared between multiple users. In some embodiments, computer system will display one or more notifications that do not correspond to change events while the disable-notification setting is in the second state but will not display one or more notifications that correspond to change events while the disable-notification setting is in the second state. In some embodiments, the set of notification criteria includes a criterion that is satisfied when a respective setting is in a first state (e.g., an active state). In some embodiments, while the respective setting is in the first state (e.g., active state), the computer system is configured to display one or more indications corresponding to change events of the first type. In some embodiments, the set of notification criteria includes a criterion that is satisfied when the respective setting is not in a second state (e.g., an inactive state) that is different from the first state. In some embodiments, in response to detecting an input directed to the respective setting (and/or a request to change the state of the respective setting), the computer system is transitioned from not being configured to display one or more indications corresponding to change events of the first type to being configured to display one or more indications corresponding to change events of the first type (or vice-versa). In some embodiments, while the respective setting is in the second state, the computer system is not configured to display one or more indications corresponding to change events of the first type. Having a control that allows the user to disable notifications corresponding to change events provides the user with an additional control option to allow the display of the one or more indications to be disabled, which provides additional control options without unnecessarily cluttering the user interface.

In some embodiments, while displaying the indication that the change event corresponding to the collection of media items have been detected, the computer system detects an input (e.g., 750*e*) (e.g., a tap input or, in some embodiments, a non-tap input (e.g., a dragging input, a mouse click, a gaze input, and/or a press-and-hold input)) that is directed to the indication (e.g., 710*a* and/or 710*b*) that the change event corresponding to the collection of media items have been detected. In some embodiments, in response to detecting the input (e.g., 750*e*) that is directed to the indication that the change event corresponding to the collection of media items have been detected, the computer system displays a first user interface (e.g., 728) that indicates that a first set of one or more media items (e.g., that correspond to and/or are associated with change events of the first type and/or corresponding to and/or associated with the indication that the change event corresponding to the collection has been detected) that correspond to (e.g., that are impacted and/or affected by and/or that will be impacted and/or affected by) the change event can be reviewed. In some embodiments, the first user interface includes one or more media items corresponding to the change event (e.g., without including one or more media items in the collection of media items that do not correspond to the change event and/or change events of the first type). In some embodiments, in response to detecting the input that is directed to the indication that the change event corresponding to the collection of media items have been detected, the computer system displays one or more media items corresponding to the change event. Displaying a first user interface that indicates that one or more media items in the collection of media items can be reviewed in response to detecting the input that is directed to the indication that the change event corresponding to the collection of media items have been detected provides the user with an additional control option to review one or more media items in the collection of the media items, which provides additional control options without unnecessarily cluttering the user interface and enhances privacy/security of the computer system.

In some embodiments, while displaying the first user interface (e.g., 728), the computer system detects one or more inputs (e.g., one or more tap inputs or, in some embodiments, non-tap inputs (e.g., dragging inputs, mouse clicks, and/or a press-and-hold inputs)) directed to the first user interface (e.g., as described above in relation to FIG. 7F). In some embodiments, in response to detecting one or more inputs directed to the first user interface, the computer system displays (e.g., as a part of the first user interface) a second set of one or more media items (e.g., 728*a*) (e.g., a section of a user interface that includes one or more media items contributed by the user of the computer system and/or a contributor that have been deleted (or requested to be deleted), media items that have been deleted (or requested to be deleted) by another user of another computer system, and/or media items contributed by the user and/or a contributor that have been deleted (or requested to be deleted) by another user) corresponding to (e.g., that are impacted and/or affected by and/or that will be impacted and/or affected by) the change event (and/or corresponding to and/or associated with the indication that the change event corresponding to the collection has been detected) (e.g., without including one or more media items in the collection of media items that do not correspond to the change event and/or change events of the first type) (e.g., as described above in relation to FIG. 7F). Displaying one or more media items corresponding to the change event in response to detecting one or more inputs directed to the first user interface provides the user with feedback concerning the one or more media items impacted by the change event, which provides visual feedback to the user.

In some embodiments, after displaying the indication (e.g., 710*a* and/or 710*b*) that the change event corresponding to the collection has been detected (and, in some embodiments, after the collection of media items has been modified due to the change event) and in accordance with a determination that a user of the computer system (e.g., 600) contributed a seventh media item (e.g., represented by 724*a* and/or 728*a*1), in the collection of media items, that corresponds to the change event (e.g., a media item that was and/or will be impacted and/or changed by the change event) and a determination that the change event was detected within a predetermined period of time (e.g., 5-90 days) (in some embodiments, before a media item (e.g., the seventh media item) that is marked for deletion is permanently deleted (e.g., as described above in relation to FIGS. 7A1-7E) and/or, in some embodiments, since the indication that the change event has been displayed), the computer system displays a control for reversing the change event (e.g., as described above in relation to FIGS. 7A1-7J2). In some embodiments, while displaying the control for reversing the change event, the computer system detects an input (e.g., a tap input or, in some embodiments, a non-tap input (e.g., a dragging input, a mouse click, a gaze input, and/or a press-and-hold input)) directed to the control for reversing the change event (e.g., as described above in relation to FIGS. 7A1-7J2). In some embodiments, in response detecting the input directed to the control for reversing the change event, the computer system reverses changes to the collection of media items caused by the change event (e.g., as described above in relation to FIGS. 7A1-7J2) (and, in some embodiments, causing the collection of media items to revert back to a state that the collection of media items was in before (e.g., immediately before) the change event was detected) (e.g., adding the seventh media item back in the collection of media items). In some embodiments, the computer system detects a request to reverse the change event corresponding to the collection of media items. In some embodiments, in response to detecting the request to reverse the change event corresponding to the collection of media items and in accordance with a determination that a user of the computer system contributed a seventh media item, in the collection of media items, that corresponds to the change event and a determination that the change event was detected within a predetermined period of time, the computer system causes the collection of media items to revert back to a state that the collection of media items was in before (e.g., immediately before) the change event was detected (e.g., adding the seventh media item back in the collection of media items). In some embodiments, in response to detecting the request to reverse the change event corresponding to the collection of media items and in accordance with a determination that a user of the computer system did not contribute a seventh media item, in the collection of media items, that corresponds to the change event (e.g., a media item that was and/or will be impacted and/or changed by the change event) or a determination that the change event was not detected within a predetermined period of time (e.g., 5-90 days), the computer system does not cause (or forgoes causing) the collection of media items to revert back to a state that the collection of media items was in before (e.g., immediately before) the change event was detected (e.g., adding the seventh media item back in the collection of media items). Causing the collection of media items to revert back to a state that the collection of media items was in before the change event was detected in response detecting the input directed to the control for reversing the change event provides the user with more control over the user interface to reverse the impact of a change event that occurred, which provides additional control options without unnecessarily cluttering the user interface and enhances privacy/security of the computer system and/or collection of media items.

In some embodiments, causing the collection of media items to revert back to a state that the collection of media items was in before the change event was detected includes adding the seventh media item back to the collection of media items (e.g., as described above in relation to FIGS. 7A1-7J2) (e.g., restoring one or more media items that were caused to be deleted due to the change event (e.g., due to the occurrence of the change event and/or the change event being detected)). Adding the seventh media item back to the collection of media as a part of causing the collection of media items to revert back to a state that the collection of media items was in before the change event was detected in response detecting the input directed to the control for reversing the change event provides the user with more control over the user interface to reverse the impact of a change event that occurred, which provides additional control options without unnecessarily cluttering the user interface and enhances privacy/security of the computer system and/or collection of media items.

In some embodiments, after displaying the indication (e.g., 710*a* and/or 710*b*) that the change event corresponding to the collection has been detected, the computer system detects a request (e.g., 750*a*4 and/or 750*i*2) to purge (and/or permanently deleting and, in some embodiments, more than removing the media item from the collection of media items) an eighth media item (e.g., 724*a*-724*c*) that corresponds to the change event. In some embodiments, in response to detecting the request to purge the eighth media item that corresponds to the change event and in accordance with a determination that a user of the computer system contributed the eighth media item, the computer system purges the eighth media item (e.g., as described above in relation to FIGS. 7A1-7B and FIG. 7I). In some embodiments, after displaying the indication that the change event corresponding to the collection has been detected (and, in some embodiments, after the collection of media items has been modified due to the change event) and in accordance with a determination that a user of the computer system contributed an eighth media item, in the collection of media items, that corresponds to the change event (e.g., a media item that was and/or will be impacted and/or changed by the change event), the computer system displays a control for purging (and/or permanently deleting and, in some embodiments, more than removing the media item from the collection of media items) the eighth media item. In some embodiments, while displaying the control for purging the eighth media item, the computer system detects an input directed to the control for purging the eighth media item. In some embodiments, in response to detecting the input directed to the control for purging the eighth media item, the computer system purges the eighth media item. In some embodiments, after an item is purged, the item is not in a shared collection of media items and the contributor's personal collection of media items. Purging the eighth media item when prescribed conditions are met enhances the privacy/security of the computer system by allowing users who have contributed to media items the ability to purge the media items without allowing other users to purge the media items, which enhances privacy/security of the computer system and/or collection of media items.

In some embodiments, after displaying the indication that the change event corresponding to the collection has been detected, the computer system detects a request (e.g., 750*a*4, 750*i*1, and/or 750*i*2) to remove (and/or permanently deleting and, in some embodiments, more than removing the media item from the collection of media items) a ninth media item that corresponds to the change event. In some embodiments, in response to detecting the request (e.g., 750*a*4, 750*i*1, and/or 750*i*2) to purge the ninth media item that corresponds to the change event and in accordance with a determination that a user of the computer system contributed the ninth media item, the computer system removes the ninth media item (e.g., 724*a*) from the collection of media items and purging the ninth media item (e.g., as described above in relation to FIGS. 7A1-7B and FIG. 7I). In some embodiments, in response to detecting the request (e.g., 750*a*4, 750*i*1, and/or 750*i*2) to purge the ninth media item that corresponds to the change event and in accordance with a determination that the user of the computer system did not contribute the ninth media item, the computer system removes the ninth media item (e.g., 724*a*) from the collection of media items without purging the ninth media item (e.g., as described above in relation to FIGS. 7A1-7B and FIG. 7I). In some embodiments, after removing the ninth media item from the collection of media items without purging the ninth media item, the media item is in the contributor's personal collection of media items. In some embodiments, in accordance with a determination that a respective user did not contribute the ninth media item to the collection of media items, an option (e.g., 722*d* and/or 722*d*2) to request that the purge the ninth media item is not displayed at the device of the respective user (e.g., in a menu (e.g., 634*c*) and/or in a media viewing user interface (e.g. 720). In some embodiments, in accordance with a determination that a respective user did contribute the ninth media item to the collection of media items, the option (e.g., 722*d* and/or 722*d*2) to request that the purge the ninth media item is not displayed at the device of the respective user (e.g., in a menu (e.g., 634*c*). Removing the ninth media item from the collection of media items without purging the ninth media item when prescribed conditions are met enhances the privacy/security of the computer system by allowing users who did not contribute media items to remove media items to the collection without allowing these users to purge the media items, which enhances privacy/security of the computer system by preventing unauthorized changes to the media items and/or provides additional control options without unnecessarily cluttering the user interface.

In some embodiments, after displaying the indication (e.g., 710*a* and/or 710*b*) that the change event corresponding to the collection has been detected (and, in some embodiments, after the collection of media items has been modified due to the change event) and in accordance with a determination that a user of the computer system contributed a tenth media item (or, in some embodiments, at least one media item (e.g., that is not the tenth media item)), in the collection of media items, that corresponds to the change event (e.g., a media item that was and/or will be impacted and/or changed by the change event) (or in accordance with a determination that the user of the computer system was the organizer and/or creator of the collection of media items (e.g., enabled and/or setup the collection of media items to be shared between the multiple users), the computer system displays an option (e.g., 722*d*1 and/or 722*d*2) for removing the tenth media item from the collection of media items (e.g., as described above in relation to FIGS. 7A1-7B and FIG. 7I). In some embodiments, in response to displaying the option for removing the tenth media item from the collection of media items, the computer system causes the tenth media item to be removed from the collection of media items (e.g., as described above in relation to FIGS. 7A1-7B and FIG. 7I). In some embodiments, after displaying the indication that the change event corresponding to the collection has been detected (and, in some embodiments, after the collection of media items has been modified due to the change event) and in accordance with a determination that a user of the computer system did not contribute a tenth media item, in the collection of media items, that corresponds to the change event (e.g., a media item that was and/or will be impacted and/or changed by the change event) (or in accordance with a determination that the user of the computer system was the organizer and/or creator of the collection of media items (e.g., enabled and/or setup the collection of media items to be shared between the multiple users), the computer system does not display the option for removing the tenth media item from the collection of media items. Displaying an option for removing the tenth media item from the collection of media items when prescribed conditions are met allows the computer system to automatically provide a certain user more control over the computer system by allowing the user to remove a media item, which enhances privacy/security of the computer system, performs an operation when a set of conditions has been met without requiring further user input, provides additional control options without unnecessarily cluttering the user interface, and provides visual feedback.

In some embodiments, while displaying media items corresponding to a respective collection of media items (after, while, and/or before detecting the request concerning the change event) and a first control for switching (e.g., toggling and/or adjusting) between collections of media items, the computer system detects an input (e.g., 650*y* and/or 650*z*1) (e.g., a tap input or, in some embodiments, a non-tap input (e.g., a dragging input, a mouse click, a gaze input, and/or a press-and-hold input)) directed to the first control (e.g., 634*d* and/or 634*e*) for switching between collections of media items. In some embodiments, in response to detecting the input directed to the first control for switching between collections of media items and in accordance with a determination that the first control (e.g., 634*d* and/or 634*e*) for switching between the collection of media items was in a first state before the input directed to the first control for switching between collections of media items was detected, the computer system replaces the respective collection of media items with the collection of media items that is shared between multiple users (e.g., ceasing display of the respective collection of media items with the collection of media items that is shared between multiple users) (e.g., as described above in relation to detecting input 650*y*). In some embodiments, the respective collection of media items was a collection of media items that is not shared between multiple users before the input directed to the first control for switching between collections of media items was detected. In some embodiments, in response to detecting the input directed to the first control for switching between collections of media items and in accordance with a determination that the first control for switching between the collection of media items was in a first state before the input directed to the first control for switching between collections of media items was detected, the computer system changes the first control from the first state to the second state. In some embodiments, in response to detecting the input directed to the first control for switching between collections of media items and in accordance with a determination that the first control (e.g., 634*d* and/or 634*e*) for switching between the collection of media items was in a second state before the input directed to the first control for switching between collections of media items was detected, the computer system replaces the respective collection of media items with the collection of media items that is not shared between multiple users (e.g., ceasing to display the respective of media items with the collection of media items that is not shared between multiple users) (e.g., described above in relation to detecting input 650*z*2). In some embodiments, the respective collection of media items was the collection of media items that is shared between multiple users before the input directed to the first control for switching between collections of media items was detected. In some embodiments, in response to detecting the input directed to the first control for switching between collections of media items and in accordance with a determination that the first control for switching between the collection of media items was in a second state before the input directed to the first control for switching between collections of media items was detected, the computer system changes the first control from the second state to the first state. Providing the first control for switching between collections of media items provides the user with more control to allow the user to switch between collections of media items, which provides additional control options without unnecessarily cluttering the user interface.

In some embodiments, the first control (e.g., 634*d* and/or 634*e*) for switching between collections of media items is included in a menu. In some embodiments, the menu (e.g., 634) (e.g., a "more" menu) is displayed in a first application that includes a first view (e.g., user interface and/or a page of a user interface) that corresponds to a first manner of categorizing media items (e.g., categorizing by the media items being located within a particular collection of media items, categorizing by events that correspond to media items, categorizing media items based on date) and a second view (e.g., user interface) that corresponds to a second manner of categorizing media items (e.g., categorizing by the media items being located within a particular collection of media items, categorizing by events that correspond to media items, categorizing media items based on date) that is different from the first manner of categorizing media items (e.g., as described above in relation to FIGS. 6A-6AO and/or 7J1-7J2). In some embodiments, the menu is displayed while the computer system displays the first view (e.g., the user interface of FIG. 6AC) and while the computer system displays the second view (e.g., 790*a*-790*c*) (e.g., as described above in relation to FIGS. 6A-6AO). In some embodiments, the menu is displayed irrespective of whether the collection of media items that is shared between multiple users or the respective collection of media items with the collection of media items that is not shared between multiple users are displayed. Displaying the same menu in multiple views provides the user with more control to allow the user to switch between collections of media items while using the first application, which provides additional control options without unnecessarily cluttering the user interface.

In some embodiments, while displaying media items (e.g., 634*b*) corresponding to the collection of media items that is shared between multiple users (after, while, and/or before detecting the request concerning the change event) and a second control (e.g., 634*d*) for switching between collections of media items, the computer system detects an input (e.g., 650*y*)(e.g., a tap input or, in some embodiments, a non-tap input (e.g., a dragging input, a mouse click, a gaze input, and/or a press-and-hold input)) directed to the second control for switching between collections of media items. In some embodiments, in response to detecting the input directed to the second control for switching between collections of media items, the computer system replaces the collection of media items that is shared between multiple users with a different collection of media items that is shared between multiple users (e.g., as described above in relation to 6Y and 6Z). In some embodiments, the collection is shared between a first group (or set) of users and the different respective collection of media items is shared between a second group (or set) of users. In some embodiments, the first group of users are different from the second group of users. In some embodiments, one or more users in the first group of users is not in the second group of users, or vice-versa. In some embodiments, one or more users in the first group of users is in the second group of users. Providing the second control for switching between collections of media items provides the user with more control to allow the user to switch between collections of media items, which provides additional control options without unnecessarily cluttering the user interface.

In some embodiments, the first application includes a third view that is different from the first view (e.g., the user interface of FIG. 6AC) and the second view (e.g., 790*a*-790*c*). In some embodiments, the menu (e.g., 634) is not displayed while the computer system displays the third view (e.g., as described above in relation to 6Y and 6Z). Providing the second control for switching between collections of media items provides the user with more control to allow the user to switch between collections of media items in different subsets of view of an application, which provides additional control options without unnecessarily cluttering the user interface.

In some embodiments, while displaying, in a fourth view (e.g., 790*a*-790*c*) (e.g., user interface and/or a page (e.g., a media library page, an media albums page, a media gallery page that has been curated based on one or more characteristics of the user, and/or a media gallery page that has not been curated based on one or more characteristics of the user (e.g., a show all media page)) of a user interface), a third control (e.g., 634*d* and/or 634*e*) for switching (e.g., toggling and/or adjusting) between collections of media items in a first state and a collection of media items of a first type (e.g., 634*b*) (e.g., shared or personal collection of media items), the computer system detects an input (e.g., a tap input or, in some embodiments, a non-tap input (e.g., a dragging input, a mouse click, a gaze input, and/or a press-and-hold input)) directed to the third control for switching between collections of media items. In some embodiments, in response to detecting the input directed to the third control for switching between collections of media items: displays, via the display generation component and in the fourth view, a collection of media items of a second type (e.g., 654) that is different from the first state; and changes (e.g., in the fourth view) the third control for switching between collections of media items from being displayed in the first state (e.g., with a representation that personal media items are being displayed or a representation that shared media items are being displayed) to being displayed in a second state that is different from the first state (e.g., 634*e*). In some embodiments, while displaying, in the fourth view, the collection of media items of the second type that is different from the first state, the computer system detects an input directed to the fourth view (e.g., as described above in relation to FIGS. 6Y-6Z). In some embodiments, in response to detecting the input directed to the fourth view, the computer system displays a fifth view (e.g., user interface and/or a page of a user interface) that is different from the fourth view (e.g., as described above in relation to FIGS. 6Y-6Z), including: in accordance with a determination that the third control (e.g., 634*d* and/or 634*e*) for switching between collections of media items was in the second state when the input directed to the fourth view was detected, displaying at least one or more of the collection of media items of the second type (e.g., 654) without displaying one or more of (and/or any of) the collection of media items of the first type (e.g., 634*b*) (e.g., as described above in relation to FIGS. 6Y-6Z); and in accordance with a determination that the third control (e.g., 634*d* and/or 634*e*) for switching between collections of media items was in the first state when the input directed to the fourth view was detected, displaying at least one or more of the collection of media items of the first type (e.g., 634*b*) without displaying one or more of (and/or any of) the collection of media items of the second type (e.g., 654) (e.g., as described above in relation to FIGS. 6Y-6Z). In some embodiments, the second control for switching between collections of media items is displayed in a second application that includes multiple views (and/or user interfaces). In some embodiments, the second control for switching between collections of media items is displayed (and/or active) while any of the multiple views are displayed. Providing the third control for switching between collections of media items provides the user with more control to allow the user to switch between collections of media items in a one view and maintain which collection of media items are displayed for multiple views, which provides additional control options without unnecessarily cluttering the user interface.

In some embodiments, displaying (before, while, and/or after detecting the request concerning the change event) the collection of media items that is shared between multiple users, includes, in accordance with a determination that a set of one or more media items in the collection of media items that is shared between multiple users are one or more duplicates of one or more media items in a collection of media items that is associated with the computer system and that is not shared between multiple users, forgoing displaying the set of one or more media items (e.g., as discussed above in relation to FIGS. 6V-6Y) (e.g., as a part of the collection of media items). In some embodiments, in accordance with a determination that the set of one or more media items in the collection of media items that is shared between multiple users are not one or more duplicates of one or more media items in the collection of media items that is associated with the computer system and that is not shared between multiple users, the computer system does not display the set of one or more media items (e.g., as a part of the collection of media items). Choosing not to display the set of one or more media items when prescribed conditions are met allows the computer system to automatically hide media items that are duplicates to avoid cluttering the user interface, which performs an operation when a set of conditions has been met without requiring further user input.

In some embodiments, in accordance with a determination that a set of one or more media items in the collection of media items that is shared between multiple users are one or more duplicates of one or more media items in a collection of media items that is associated with the computer system and that is not shared between multiple users, the computer system displays an indication (e.g., 638) that the set of one or more media items is not being displayed as a part of the collection of media items (e.g., as discussed above in relation to FIGS. 6V-6Y) (and, in some embodiments, while displaying the collection of media items that is shared between multiple users). In some embodiments, in accordance with a determination that the set of one or more media items in the collection of media items that is shared between multiple users are not one or more duplicates of one or more media items in the collection of media items that is associated with the computer system and that is not shared between multiple users, the computer system does not display the indication that the set of one or more media items is not being displayed as a part of the collection of media items. Displaying an indication that the set of one or more media items is not being displayed as a part of the collection of media items provides the user with feedback that media items are being hidden, which provides improved visual feedback.

In some embodiments, while displaying (before, while, and/or after detecting the request concerning the change event) the collection of media items that is shared between multiple users, the computer system detects an input (e.g., 650*w*) (e.g., a tap input or, in some embodiments, a non-tap input (e.g., a dragging input, a mouse click, a gaze input, and/or a press-and-hold input)) directed to a respective control to view a second set of one or more media items in the collection of media items that is shared between multiple users that are duplicates of one or more media items in one or more collection of media items that are not shared between multiple users. In some embodiments, in response to detecting the input directed to the respective control, the computer system displays the second set (e.g., 640*a* and/or 640*b*) of one or more media items in the collection of media items. Displaying the second set of one or more media items in the collection of media items in response to detecting the input directed to the respective control provides the user with more control over the computer system to review media items that are duplicate media items and that could be hidden, which provides additional control options without unnecessarily cluttering the user interface.

In some embodiments, displaying a curated set of media items that includes: in accordance with a determination that a user of the computer system is a first user of the multiple users, a first plurality of media items without including a second plurality of media items (e.g., as described above in relation to 7J1-7J2); and in accordance with a determination that the user of the computer system is a second user of the multiple users that is different from the first user of the multiple users, the second plurality of media items without including the first plurality of media items (e.g., as described above in relation to 7J1-7J2). Displaying a curated set of media items that includes a set of media items that is based on whether a user is a particular user allows the computer system to automatically curate a set of media items differently for different users, which provides additional control options without unnecessarily cluttering the user interface.

In some embodiments, the first plurality of media items is a set of media items (e.g., 790*a*2, 790*b*2, and/or 790*c*2) from the collection of media items that have been curated in a first manner (e.g., curated based on a set of memories and/or events that associated with a particular user and/or using media items from a personal collection associated with a first user) (e.g., as described above in relation to 7J1-7J2). In some embodiments, the second plurality of media items (e.g., 790*a*2, 790*b*2, and/or 790*c*2) is a set of media items from the collection of media that have been curated in a second manner (e.g., curated based on a set of memories and/or events that associated with a particular user and/or using media items from a personal collection associated with a second user) that is different from the first manner (e.g., as described above in relation to 7J1-7J2). Displaying a curated set of media items that includes a set of media items that is based on whether a user is a particular user allows the computer system to automatically curate a set of media items in different manners for different users, which provides additional control options without unnecessarily cluttering the user interface.

In some embodiments, the first plurality of media items (e.g., 790*a*2, 790*b*2, and/or 790*c*2) (or the second plurality of media items) includes a set of media items from the collection of media items that is shared between multiple users and a set of media items from a collection of media items that is not shared between multiple users (and, in some embodiments, that is associated with the user of the computer system) (e.g., as described above in relation to 7J1-7J2). Displaying a curated set of media items that includes a set of media items that is based on whether a user is a particular user allows the computer system to automatically curate a set of media items with media items from a shared collection of media items and media items from a user's personal media items, which provides additional control options without unnecessarily cluttering the user interface.

In some embodiments, while displaying a fourth set of one or more media items, the computer system detects a request to move the fourth set of one or more media items between the collection of media items that is shared between multiple users and a collection of media items that is not shared between multiple users. In some embodiments, in response to detecting the request (e.g., 650*g*1 and/or 650*g*2) to move the fourth set of one or more media items, the computer system moves the fourth set of one or more media items between the collection of media items that is shared between multiple users and a collection of media items that is not shared between multiple users. Moving the fourth set of one or more media items between the collection of media items that is shared between multiple users and a collection of media items that is not shared between multiple users in response to detecting the request to move the fourth set of one or more media items gives a user additional control over the computer system by allowing the user to share media between collections of media items, which provides additional control options without unnecessarily cluttering the user interface.

In some embodiments, the computer system receives a request to display metadata (e.g., 634*d* and/or 634*e*) that corresponds to a twelfth media item. In some embodiments, in response to receiving the request to display metadata that corresponds to the twelfth media item, the computer system displays metadata (e.g., 634*d* and/or 634*e*) that corresponds to the twelfth media item, including: in accordance with a determination that the twelfth media item is included in the collection of media items that is shared between multiple users, displaying a first indication (e.g., 634*d*) that the media item is currently being shared in the collection of media items that is shared between multiple users; and in accordance with a determination that the twelfth media item is included in a collection of media items that is not shared between multiple users (and/or in accordance with a determination that the twelfth media item is not included in the collection of media items that is shared between multiple users), the computer system displays a second respective indication (e.g., 634*d*) that the media item is currently being shared in the collection of media items that is not shared between multiple users. In some embodiments, the first indication is different from the second indication. In some embodiments, the first indication is not displayed while the second indication is displayed. Displaying a respective indication concerning the collection of media items that is being shared provides the user with visual feedback concerning the media, which provides improved visual feedback.

In some embodiments, while the collection of media items is currently shared between multiple users, the computer system detects a respective request (e.g., 650*h*), from a third user of the multiple users, for the collection of media items that is shared between multiple users to not be shared with the third user. In some embodiments, in response to detecting the respective request (e.g., 650*h*), the computer system displays a control (e.g., 692*a*) that, when selected, causes the computer system to initiate a process for automatically copying only one or more media items in the collection of one or more media items that were contributed by the third user (e.g., to the collection of media items that is shared between multiple users) (e.g., as described above in relation to FIGS. 6AN-6AO); and displays a control (e.g., 692*b*) that, when selected, causes the computer system to initiate a process for automatically copying the one or more media items in the collection of one or more media items that were contributed by the third user and one or more media items in the collection of one or more media items that were not contributed by one or more users who are different from the third user (e.g., to the collection of media items that is shared between multiple users) (e.g., as described above in relation to FIGS. 6AN-6AO). Displaying a control that, when selected, causes the computer system to initiate a process for automatically copying only one or more media items in the collection of one or more media items that were contributed by the third user and displaying a control that, when selected, causes the computer system to initiate a process for automatically copying the one or more media items in the collection of one or more media items that were contributed by the third user and one or more media items in the collection of one or more media items that were not contributed by one or more users who is different from the third user provides the user with additional controls to select how media items are shared, which provides additional control options without unnecessarily cluttering the user interface.

In some embodiments, while the collection of media items is currently shared between multiple users, the computer system detects a request (e.g., 650*an*) (e.g., by the creator and/or organizer of the collection of media items) to cease sharing the collection of media items (e.g., to dissolve/end the shared media collection) between the multiple users (e.g., by the organizer of the collection of media items) (e.g., as described above in relation to FIGS. 6AN-6AO). In some embodiments, in response to detecting the request to cease sharing the collection of media items between the multiple users, the computer system initiates a process to give one or more of (or, optionally, each) of the multiple users an option to automatically copy media items a respective user (e.g., one or more particular users of the multiple users) contributed to the collection of media items that was shared between multiple users and/or media items the respective user did not contribute to the collection of media items that is shared between multiple users (e.g., as described above in relation to FIGS. 6AN-6AO).

In some embodiments, the computer system displays a third plurality of media items. In some embodiments, a first set of media items in the third plurality of media items are from the collection of media items that is shared between multiple users and a second set of media items in the third plurality of media items are from a collection of media items that are not shared between multiple users. In some embodiments, after display the third plurality of media items, the computer system detects a request to search that includes a respective search term. In some embodiments, in response to detecting the request that includes the respective search term and in accordance with a determination that the respective search term is a first search term (e.g., a term restricting the search to the shared collection), the computer system displays the first set of media items in the third plurality of media items without displaying the second set of media items in the third plurality of media items. In some embodiments, in response to detecting the request that includes the respective search term and in accordance with a determination that the respective search term is a second search term (e.g., a term restricting the search to the collection that is not shared) that is different from the first search term, the computer system displays the second set of media items in the third plurality of media items without displaying the first set of media items in the third plurality of media items. Displaying a set of media items in response to detecting the request that includes the respective search term when prescribed conditions are met reduces the number of inputs needed to display the set of media items, which reduces the number of inputs needed to perform an operation.

In some embodiments, while displaying the first set of media items in the third plurality of media items, the computer system detects a request to filter the first set of media items by a first contributor who is included in the multiple users (e.g., as described above in relation to 644*e* and FIG. 6AC). In some embodiments, in response to detecting the request to filter the first set of media items by a first contributor who is included in the multiple users, the computer system continues to display one or more media items of the first set of media items in the third plurality of media items that were contributed, to the collection of media items that is shared between multiple users, by the first contributor while ceasing to display one or more media items of the first set of media items in the third plurality of media items that were not contributed, to the collection of media items that is shared between multiple users, by the first contributor (e.g., as described above in relation to 644*e* and FIG. 6AC). Continuing to display one or more media items that were contributed by a first user without displaying other media items that were displayed in response to detecting the request to filter the first set of media items by a first contributor who is included in the multiple users when prescribed conditions are met reduces the number of inputs needed to display the set of media items, which reduces the number of inputs needed to perform an operation.

In some embodiments, the computer system detects a request to interact with the collection of media items that is shared between multiple users (e.g., upon selection of "shared albums" in FIG. 6B). In some embodiments, in response to detecting the request to interact with the collection of media items that is shared between multiple users (e.g., upon selection of "shared albums" in FIG. 6B), the computer system: in accordance with a determination that the computer system is a type of computer system that, based on a user-selectable setting, can interact with the collection of media items that is shared between multiple users, initiates a process for interacting with the collection of media items that is shared between multiple users (e.g., upon selection of "shared albums" in FIG. 6B); and in accordance with a determination that the computer system is a type of computer system that, based on the user-selectable setting, cannot interact with the collection of media items that is shared between multiple users, forgoes initiating the process for interacting with the collection of media items that is shared between multiple users (e.g., upon selection of "shared albums" in FIG. 6B). Choosing whether to initiate a process for interacting with the collection of media items that is shared between multiple users when prescribed conditions are met allows the collection of media items to be restricted on certain types of devices while not being restricted on other types of devices, which provides additional control options without unnecessarily cluttering the user interface and enhances the security/privacy of the computer system.

In some embodiments, while the computer system (e.g., 600) is configured to be in a selection mode (and, in some embodiments, in accordance with a determination that the computer system is in a selection mode), the computer system displays a first respective media item (e.g., 724*a*-724*c* and/or 1130*b* (described below)) that is being shared in the collection of media items that is shared between multiple users and a second respective media item that is not being shared in the collection of media items that is shared between multiple users, including: displaying one or more of a first indication (e.g., 634*d*, 634*e*, 744*a*-744*b*, and/or 752*a*-752*b*) that indicates that the first respective media item is being shared in the collection of media items that is being shared between multiple users and a second indication (e.g., 634*d*, 634*e*, 744*c*, and/or 754*c*) that indicates that the second respective media item is not being shared in the collection of media items that is shared between multiple users (e.g., as described above in relation to FIGS. 7A1-7U and FIGS. 11G-11H). In some embodiments, in accordance with a determination that the computer system is not configured to be in the selection mode, the computer system does not display one or more of a first indication that indicates that the first respective media item is being shared in the collection of media items that is being shared between multiple users and a second indication that indicates that the second respective media item is not being shared in the collection of media items that is shared between multiple users. Displaying one or more of a first indication that indicates that the first respective media item is being shared in the collection of media items that is being shared between multiple users and a second indication that indicates that the second respective media item is not being shared in the collection of media items that is shared between multiple users when prescribed conditions are met provides the user with visual feedback concerning the media, which provides improved visual feedback.

In some embodiments, displaying the first respective media item (e.g., 744*a*-744*b*) and the second respective media item (e.g., 744*c*) includes visually distinguishing (e.g., as discussed above in relation to method 700) the first respective media item from the second respective media item. Visually distinguishing the first respective media item from the second respective media item provides the user with visual feedback concerning whether a media item is included in the shared collection of media items or not, which provides improved visual feedback.

In some embodiments, the first indication (e.g., 752*a*-752*b*) is displayed with (e.g., overlaid on or positioned adjacent to) the first respective media item (e.g., 744*a*-744*b*). In some embodiments, the first indication (e.g., 752*a*-752*b*) has a first appearance. In some embodiments, the second respective media item (e.g., 744*c*) is displayed without an indication (e.g., without any indication) that has the first appearance (e.g., without any indications that look the same as the first indication). In some embodiments, the first respective media item is badged with first indication and the second respective indication does not have the same badge. Displaying the first indication overlaid on the first respective media item without displaying an indication that the second respective media item is being shared in the collection of media items that is shared between multiple users overlaid on the second respective media item provides the user with visual feedback concerning whether a particular media item is included in the shared collection of media items or not, which provides improved visual feedback.

In some embodiments, while the computer system (e.g., 600) is configured to be in the selection mode and while displaying the first indication (and, in some embodiments, the second indication) (e.g., as discussed above in relation FIG. 7L), the computer system detects a request (e.g., 750*l*) (e.g., a tap input on a selection (e.g., select) affordance or, in some embodiments, a non-tap input (e.g., a dragging input, a mouse click, a gaze input, and/or a press-and-hold input) on a selection affordance) to configure the computer system to be in a mode that is different than the selection mode. In some embodiments, in response to detecting the request to configure the computer system to be in the mode that is different than the selection mode, the computer system: configures the computer system to be in the mode that is different from the selection mode; and replaces the first indication (e.g., 752*b*) with a preference indication (e.g., 744*b*1) (e.g., a favorites control) that indicates whether the first respective media item is (e.g., designated as, marked as, and/or stored with metadata and/or a tag that is associated with being a preferred media item) a preferred media item (e.g., favorited media item and/or a media item having one or more characteristics that have been designated by a user) (or, in some embodiments, a non-preferred media item) (e.g., displaying the preference indication at a location at which the first indication was previously displayed). In some embodiments, in response to detecting the request to configure the computer system to be in the mode that is different in the selection mode, the computer system replaces the second indication with another preference indication that indicates whether the first respective media item is a preferred media item. In some embodiments, in response to detecting the request to configure the computer system to be in the selection mode, the computer system replaces the preference indication with the first indication. Replacing the first indication with the preference indication in response to detecting the request to configure the computer system to be in the mode that is different in the selection mode allows computer system to swap between displaying icons in situations that may be more relevant to the user (e.g., one icon is more relevant to the user while the computer system is in the selection mode than another icon; however, the other icon is more relevant to the user while the computer system is not in the selection mode), which provides improved visual feedback and conserves screen real estate.

In some embodiments, displaying one or more of the first indication (e.g., 752*a*-752*b*) and the second indication (e.g., 754*c*) includes concurrently displaying: the first respective media item (e.g., 744*a*-744*b*) with (e.g., with the indication on top, overlaid on, and/or near the media item) the first indication (e.g., 752*a*-752*b*) along with one or more other media items with the first indication; and the second respective media item (e.g., 744*c*) without (e.g., without the indication on top, overlaid on, and/or near the media item) an indication (e.g., 754*c*) that indicates that the second respective media item is being shared in the collection of media items along with one or more other media items without the first indication. Concurrently displaying the first respective media item with the first indication and the second respective media item without an indication that indicates that the second respective media item is being shared in the collection of media items provides the user with visual feedback concerning whether multiple media item are included in the shared collection of media items or not, which provides improved visual feedback.

In some embodiments, while displaying the first respective media item (e.g., 744*a*-744*b*), the second respective media item (e.g., 744*c*), and the first indication (e.g., 752*a*-752*b*), the computer system detects a first request (e.g., an input selecting a shared media library view/filter) to view (e.g., to view and/or display) media items in the collection of media items that is shared between the multiple users, without viewing media items that are not in the collection of media items that is shared between the multiple users. In some embodiments, in response to the first request to review the media items in the collection of media items that is shared between multiple users (e.g., 750*m*1), the computer system ceases to display media items that are not in the collection of media items that is shared between the multiple users including ceasing to display the second respective media item (e.g., 744). In some embodiments, in response to the first request to review the media items in the collection of media items that is shared between multiple users (e.g., 750*m*1), the computer system displays a plurality of representations of media items that are in the collection of media items that is shared between the multiple users without displaying the first indication on the media items (e.g., as discussed in relation to FIG. 7N) (e.g., when the first respective media item is displayed it is displayed without the first indication). In some embodiments, in response to the first request to review the media items in the collection of media items that is shared between multiple users, the computer system ceases to display the first indication. In some embodiments, in response to the first request to review the media items in the collection of media items that is shared between multiple users, the computer system continues to display the first respective media item (e.g., the same position on screen, in a different position on the screen). In some embodiments, while the computer system is configured to be in the selection mode, the computer system displays a media viewing user interface (e.g., a media gallery user interface) that includes displaying a third set of media items. In some embodiments, the third set of media items includes the first respective media item, and wherein displaying the third set of media items includes: in accordance with a determination that the third set of media items are the media items that are displayed in the media viewing user interface (e.g., at a single instance in time) (e.g., without displaying other media items) and multiple or all of the third set of media items are in the collection of media items that is shared between multiple users, displaying the first respective media item (e.g., displaying a visual representation of the first respective media item) without displaying the first indication (e.g., because all of the displayed media items are shared media items); and in accordance with a determination that the third set of media items are the media items that are displayed in the media viewing user interface and multiple or all of the third set of media items are not in the collection of media items that is shared between multiple users, displaying the first respective media item and the first indication. Displaying the first respective media item without displaying the first allows the computer system to conserve screen real estate in situations where the first indication could provide redundant information (e.g., because multiple or all of the displayed media items are being shared).

In some embodiments, the first set of change events includes an event that causes a third respective media item to be moved to a deleted items (e.g., recently (e.g., within the past month, week, and/or 1-10 days) deleted items) folder (e.g., from the collection that is shared between multiple users) (or an event that causes the third respective media item to be moved to a hidden items folder). In some embodiments, the computer system a request (e.g., 750*q*) to access the deleted items folder (e.g., 746*b*) (e.g., to display the third respective media item) (or, in some embodiments, the hidden items folder (e.g., 746*a*)). In some embodiments, in response to detecting the request to access the deleted items folder, the computer system: in accordance with a determination that access to the deleted items folder requires authentication, provides a prompt (e.g., as illustrated in and discussion in relation to FIG. 7R) to obtain authentication before allowing access to the deleted items folder (e.g., displaying content in the deleted items folder, such as the third respective media item); and in accordance with a determination that access to the deleted items folder does not require authentication, allows access to the deleted items folder without displaying the prompt (e.g., as discussed above in relation to FIG. 7R).

In some embodiments, after providing the prompt to obtain authentication, computer system 600 detects that the user is providing (or has provided) authentication information (e.g., biometric information such as a face, iris, or fingerprint and/or user input authentication information such as a passcode, password, or movement pattern) and/or obtains (e.g., receives) authentication information. In some embodiments, in response to detecting that the user is providing (or has provided) authentication information and/or computer system has obtained authentication information, the computer system determines whether or not to allow access to the folder based on whether the authentication information corresponds to authorized authentication information (e.g., an authorized and/or trusted biometric profile and/or a saved and/or trusted passcode, password, or movement pattern). For example, in response to detecting that the user is providing (or has provided) authentication information, in accordance with a determination that the authentication information corresponds to authorized authentication information, the computer system allows access to contents of the folder and in accordance with a determination that the authentication information does not correspond to authorized authentication information, the computer system prevents access to contents of the folder. Providing a prompt to obtain authentication before allowing access to the deleted items folder in accordance with a determination that access to the deleted items folder requires authentication enhances the security of the computer system by allowing the deleted items folders to be locked until authentication is provided.

In some embodiments, determining that access to the deleted items folder requires authentication includes determining that a lock setting (e.g., 762) for the deleted items folder is enabled. In some embodiments, determining that access to the deleted items folder does not require authentication includes determining that a lock setting for the deleted items folder is disabled. In some embodiments, when the lock setting is enabled, access to the deleted items folder requires authentication. In some embodiments, when the lock setting is disabled, access to the deleted items folder does not require authentication. In some embodiments, while displaying a control for the lock setting, the computer system detects an input (e.g., a tap input, a mouse click, a gaze input, an air gesture and/or input, and/or a press-and-hold input) that is directed to the control for the lock setting. In some embodiments, the computer system changes the lock setting. In some embodiments, in response to detecting the input that is directed to the control for the lock setting, the computer system: in accordance with a determination that the input that is directed to the control for the lock setting was detected while the lock setting is enabled, disables the lock setting; and in accordance with a determination that the input that is directed to the control for the lock setting was detected while the lock setting is disabling, enables the lock setting. Providing a prompt to obtain authentication before allowing access to the deleted items folder based on whether or not a setting is enabled or disabled gives a user control over whether authentication has to be provided to access a folder or not, which provides the user with additional control over the computer system and enhances the security of the computer system.

Note that details of the processes described above with respect to method 900 (e.g., FIG. 9) are also applicable in an analogous manner to the methods described below/above. For example, method 800 optionally includes one or more of the characteristics of the various methods described in relation to method 900. For example, method 800 can be used to create a shared media library between one or more people and method 900 can be used to notify at least one of the people concerning changes to the shared media library. For brevity, these details are not repeated below.

FIGS. 10A-10N illustrate exemplary user interfaces for managing captured media for one or more media libraries using a computer system in accordance with some embodiments. The user interfaces in these figures are used to illustrate the processes described below, including the processes in FIG. 12.

FIG. 10A illustrates computer system 600 displaying settings user interface 610. Settings user interface 610 includes multiple settings that control how computer system 600 manages media items, such as photos and/or videos. Settings user interface 610 includes participant settings **610*e*1-610*e*4 (e.g., which represents to participants to the shared library that was created in FIGS. 6A-6AO), invite-other-participants control 614*b* (e.g., which operates using similar techniques as described above in relation to FIGS. 6D-6F), shared-library suggestions-setting 610*f*, disable-auto-sharing-at-work setting 1040*a*, disable-auto-sharing-at-home setting 1040*b*, auto-library-control setting 1040*c*, share-from-camera-setting 610*g*, and leave-shared-library control 610*i*. Auto-library-control setting 1040*c* is a setting that controls whether computer system 600 will automatically choose to share captured media in the shared library. When auto-library control setting 1040*c* is enabled, computer system 600 is configured to automatically share captured media with the shared library when certain criteria are satisfied (e.g., as further discussed below). However, when auto-library control setting 1040*c* is disabled, computer system 600 is not configured to automatically share captured media with the shared library when certain criteria are satisfied. Disable-auto-sharing-at-work setting 1040*a* is a setting that controls whether computer system 600 will automatically capture and save media in the shared library while the computer system 600 is located at a predetermined work location of the user ("John's work"). Similarly, disable-auto-sharing-at-home setting 1040*b* is a setting that controls whether computer system 600 will automatically capture and save media in the shared library while the computer system 600 is located at a predetermined home location of the user ("John's home"). In some embodiments, disable-auto-sharing-at-work setting 1040*a* and disable-auto-sharing-at-home setting 1040*b* are combined into a disable-auto-sharing-at-excluded-locations setting, where computer system 600 will not automatically capture and save media in the shared library while the computer system 600 is located at an excluded location (e.g., home location or work location) when the setting is enabled. In some embodiments, shared-library suggestions-setting 610*f*, share-from-camera-setting 610*g*, and leave-shared-library control 610*i* include one or more characteristics as described above in relation to FIGS. 6AN-6AO. In some embodiments, computer system 600 includes one or more features of device 100, device 300, and/or device 500. At FIG. 10A, computer system detects rightward swipe input 1050*a* on settings user interface 610**. It should be understood that one or more inputs described herein as a particular type of input, such as a tap input, press-and-hold input, and/or swipe input, could alternatively be replaced with another input. In some embodiments, an input described as a tap input could be replaced with a press-and-hold input, a swipe input, a mouse click input, a left click input, or an air gesture input. In some embodiments, a press-and-hold input could be replaced with a tap input, a swipe input, a mouse click and hold input, an option click input, a right click input, or an alternate air gesture input. In some embodiments, a swipe input could be replaced with a tap input, a press-and-hold input, and/or a mouse click and drag input, or an alternate air gesture input.

Figure 10B:
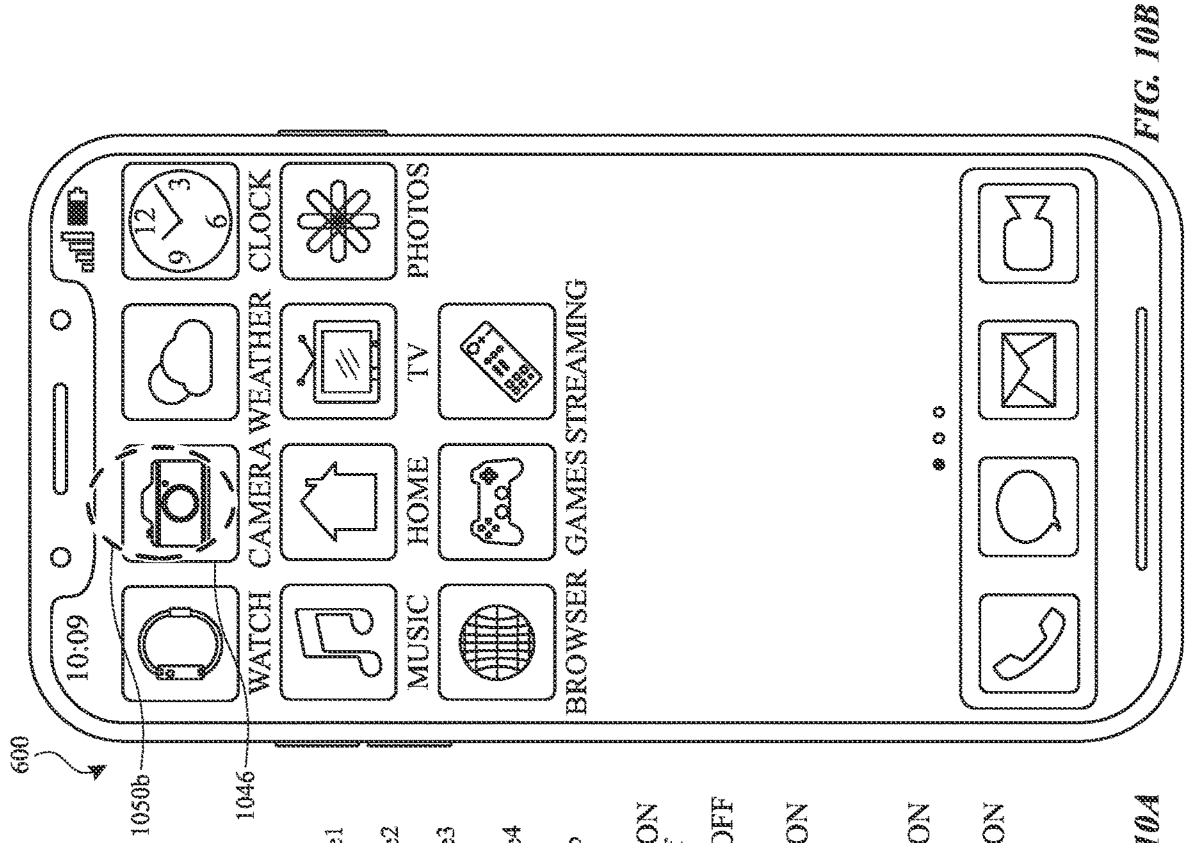
FIGS. 10A-10N illustrate exemplary user interfaces for managing captured media for one or more media libraries using a computer system in accordance with some embodiments.
Figure 10A:
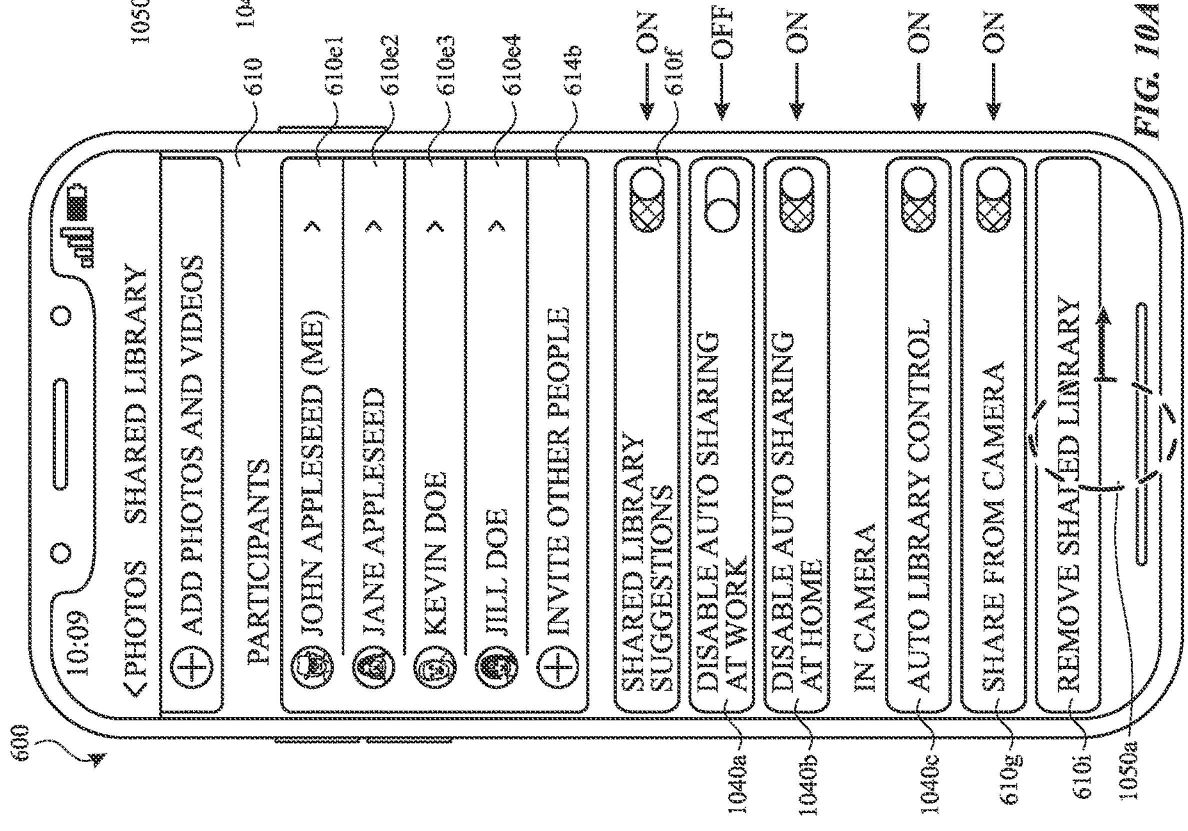
Figures 10C, 10D:
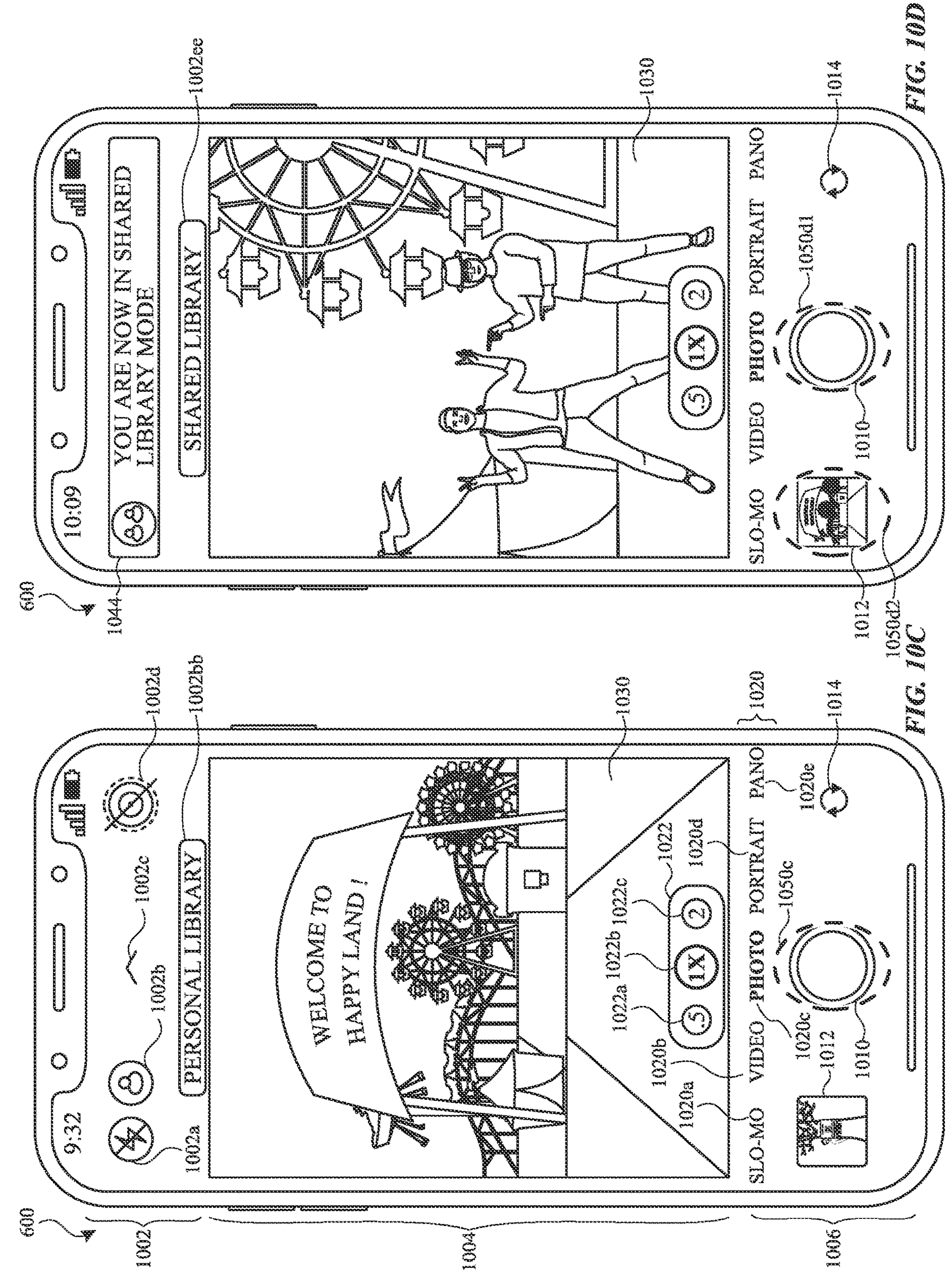
Figure 10F:
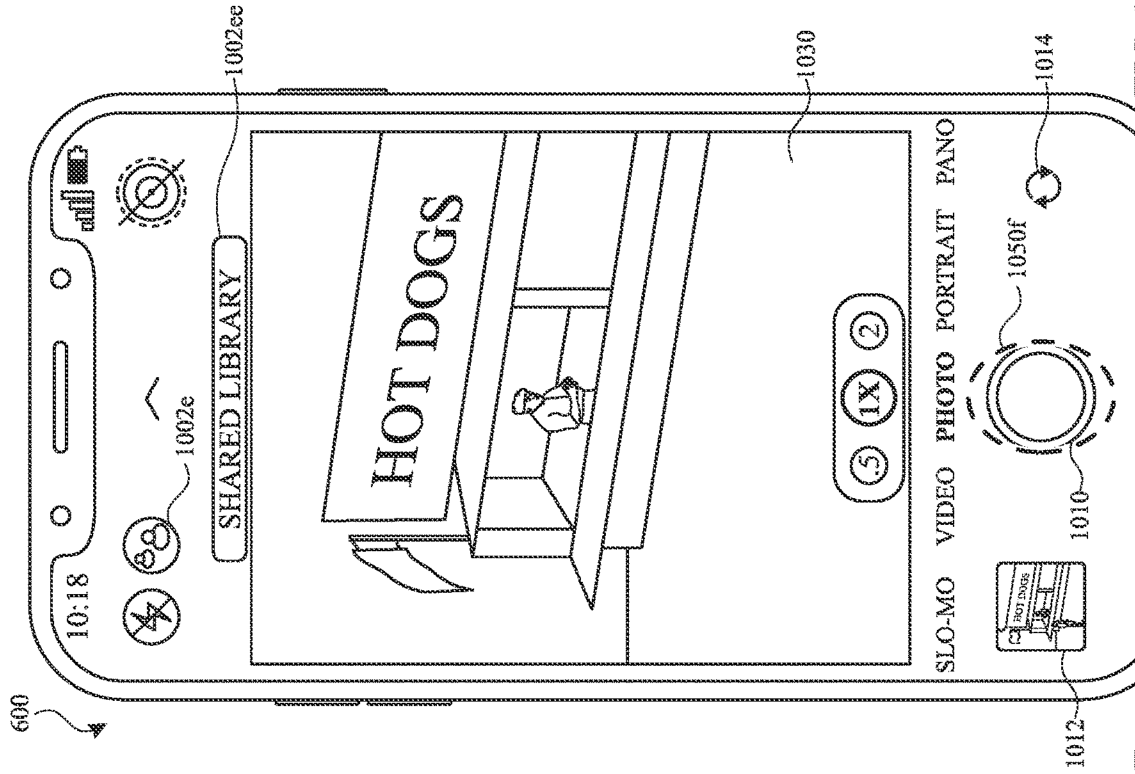

As illustrated in FIG. 10B, in response to detecting rightward swipe input **1050*a* on settings user interface 610, computer system 600 displays a user interface that includes camera application control 1046. At FIG. 10B, computer system 600 detects tap input 1050*b* on application control 1046. As illustrated in FIG. 10C, in response to detecting tap input 1050*b* on application control 1046, computer system 600 launches a camera application and displays a camera application user interface that includes indicator region 1002, display region 1004, and control region 1006. Indicator region 1002 and control region 1006 are positioned relative to live preview 1030 such that the indicators and controls are displayed concurrently with live preview 1030. Camera display region 1004 is positioned between indicator region 1002 and control region 1006 and is not substantially overlaid with indicators or controls (e.g., controls). Live preview 1030 shows a particular scene (e.g., the entrance to a theme park) that is in the field-of-view of one or more cameras of computer system 600. Live preview 1030 is a representation of a (e.g., partial or full) field-of-view of at least a first camera of one or more cameras of computer system 600 ("the FOV"). Live preview 1030 is based on images detected in the FOV. In some embodiments, computer system 600 captures images using a plurality of camera sensors and combines them to display live preview 1030. In some embodiments, computer system 600 captures images using a single camera sensor to display live preview 1030**.

As illustrated in FIG. 10C, indicator region 1002 includes indicators, such as flash indicator **1002*a*, personal library indicator 1002*b*, mode-to-settings switcher 1002*c*, animated image indicator 1002*d*, and personal library indication 1002*bb*. Flash indicator 1002*a* indicates whether the flash is on, off, or in another mode (e.g., automatic mode). In FIG. 10C, flash indicator 1002*a* indicates that the flash is off (and, optionally, can be selected to enable the flash). Personal library indicator 1002*b* and personal library indication 1002*bb* indicate that computer system 600 is configured to automatically add captured media to a personal library (e.g., "John's personal library") and/or not automatically configured to add captured media to the shared library. Personal library indicator 1002*b* can optionally be selected to enable the computer system to automatically add captured media to the shared library (e.g., as described in detail below in relation to FIGS. 10C-10N). Mode-to-settings switcher 1002*c* indicates whether one or more camera mode controls are being shown (e.g., camera modes 1020) (e.g., in control region 1006, in some embodiments) or whether one or more settings for a particular camera mode is being shown (e.g., in control region 1006, in some embodiments) (and, optionally, can be selected to switch between computer system 600 displaying one or more camera mode controls in control region 1006 and displaying one or more settings for a particular camera mode in control region 1006). Animated image indicator 1002*d* indicates whether the camera is configured to capture a single image or a plurality of images (e.g., in response to detecting a single request to capture media) (and, optionally, can be selected to switch between computer system 600 being configured to capture a single image in response to detecting a single request to capture media and being configured to capture a plurality of images in response to detecting a single request to capture media). Here, animated image indicator 1002*d* indicates that the camera is configured to capture a single image. In some embodiments, indicator region 1002 is overlaid onto live preview 1030** and optionally includes a colored (e.g., gray and/or translucent) overlay.

As illustrated in FIG. 10C, camera display region 1004 includes live preview 1030 and zoom controls 1022. Zoom controls 1022 include 0.5× zoom control 1022*a,* 1× zoom control 1022*b*, and 2× zoom control 1022*c*. In FIG. 10C, 1× zoom control 1022*b* is selected, which indicates that live preview 1030 is being displayed at a 1× zoom level.

As illustrated in FIG. 10C, control region 1006 includes shutter control 1010, a representation of media collection 1012, camera switcher control 1014, and camera mode controls 1020. Shutter control 1010, when activated, causes computer system 600 to capture media (e.g., a photo and/or a video), using the one or more camera sensors, based on the current state of live preview 1030 and the current state of the camera application. The captured media is stored locally at computer system 600 and/or transmitted to a remote server for storage. In some embodiments, the captured media is stored and/or associated with a library of media items (e.g., a collection of media items), such as a personal library or a shared library. Camera switcher control 1014, when activated, causes computer system 600 to switch to showing the field-of-view of a different camera in live preview 1030, such as by switching between a rear-facing camera sensor and a front-facing camera sensor. The representation of media collection 1012 illustrated in FIG. 10C is a representation of a media item (a photo or a video) that was most recently captured by computer system 600. In some embodiments, in response to detecting an input on the media collection 1012, computer system 600 displays a similar user interface to the user interface illustrated in FIGS. 10H-10L (discussed below).

As illustrated in FIG. 10C, camera mode controls 1020 includes slow-motion mode control 1020*a*, video mode control 1020*b*, photo mode control 1020*c*, portrait mode control 1020*d*, and panoramic mode control 1020*e*. As illustrated in FIG. 10C, photo mode control 1020*c* is selected, which is indicated in FIG. 10C by photo mode control 1020*c* being bolded. When photo mode control 1020*c* is selected, computer system 600 is operating in a photo capture mode and initiates capture of (e.g., and/or captures) photo media (e.g., a still photo) in response to computer system 600 detecting an input directed to shutter control 1010. The photo media that is captured by computer system 600 is representative of live preview 1030 that is displayed when (or after) the input is directed to shutter control 1010 is detected. In some embodiments, in response to detecting an input directed to slow-motion mode control 1020*a*, computer system 600 operates in a slow-motion media capture mode and initiates capture of media (e.g., a video with a slow-motion effect applied, a slow-motion video) that is played back at a slower speed than the speed at which the media was captured. In some embodiments, in response to detecting an input directed to video mode control 1020*b*, computer system 600 operates in a video capture mode and initiates capture of video media (e.g., a video). In some embodiments, in response to detecting an input directed to portrait mode control 1020*d*, computer system 600 operates in a portrait mode and initiates capture of portrait media (e.g., a still photo and/or a still photo having a simulated bokeh or simulated depth of field effect applied). In some embodiments, in response to detecting an input directed to panoramic mode control 1020*e*, computer system 600 operates in a panoramic mode and initiates capture of panoramic media (e.g., a panoramic photo). In some embodiments, the indicators and/or controls displayed on the camera application user interface are based on the mode that is selected (e.g., and/or the mode that computer system 600 is configured to operate in based on the selected camera mode). In some embodiments, control region 1006 is overlaid onto live preview 1030 and optionally includes a colored (e.g., gray and/or translucent) overlay.

As illustrated in FIG. 10C, computer system 600 is positioned in front of a theme park ("Happy Land") as represented in live preview 1030. John, the owner of computer system 600 does not work at the theme park for purposes of the embodiments herein. At FIG. 10C, computer system 600 displays personal library indicator 1002*b* and personal library indication 1002*bb* because computer system 600 is currently configured to automatically add captured media to John's personal library and not the shared library (e.g., the shared library that was created in relation to FIGS. 6A-6AO). Here, computer system 600 is currently configured to automatically add captured media to John's personal library and not the shared library because a respective set of criteria is not satisfied. The respective set of criteria is not satisfied at FIG. 10C because computer system 600 is detected as being far from (e.g., not within a threshold distance of) a selected person (e.g., as discussed above in relation to FIG. 6I) associated with the shared library and/or a participant of the shared library. In this embodiment, the respective set of criteria are satisfied when a determination has been made that auto-sharing-control setting 1040*c* of FIG. 10A is enabled, share-from-camera setting 610*g* of FIG. 10A is enabled, and one or more other criteria are satisfied. In some other embodiments, the respective set of criteria are satisfied when a determination that one or more of (and/or any combination of) auto-sharing-control setting 1040*c* of FIG. 10A is enabled, share-from-camera setting 610*g* of FIG. 10A is enabled, and/or one or more other criteria are satisfied. In some embodiments, the one or more other criteria are satisfied when a determination is made that computer system 600 is not at an excluded location and a setting for disabling the automatic sharing of captured media with the shared library is enabled (e.g., computer system 600 is not at (or detected to be at) a predetermined work location and disable-auto-sharing-at-work setting 1040*a* of FIG. 6A is enabled and/or computer system 600 is not at a predetermined home location and disable-auto-sharing-at-home setting 1040*b* of FIG. 6A is enabled). In some embodiments, the one or more other criteria are satisfied when a determination is made that computer system 600 is near a particular person, such as selected person (e.g., as discussed above in relation to FIG. 6I) associated with the shared library and/or a participant of the shared library. In some embodiments, computer system 600 determines that computer system 600 is near the particular person based on communication between computer system 600 (or another electronic device belonging to John that captured the media item) and a computer system of the particular person. In some embodiments, the communication includes Wi-Fi communication and/or Bluetooth communication. In some embodiments, computer system 600 determines that computer system 600 is near the particular person based on the location of computer system 600 and the location of the computer system of the particular person during a time while the application camera user interface is being displayed. At FIG. 10C, computer system 600 detects tap input 1050*c* on shutter control 1010. At FIG. 10C, in response to detecting tap input 1050*c*, computer system 600 captures media representative of live preview 1030 and associates (e.g., saves in, stores with and/in, shares with, assigns to) the captured media with John's personal library without associating it with the shared library. Here, the captured media is associated with John's personal library and not shared library because the respective set of criteria is not satisfied.

FIG. 10D illustrates computer system 600 displaying the camera application user interface sometime after John has walked into the theme park while the computer system 600 is displaying the camera application user interface and John has met Kevin in the theme park. At FIG. 10D, a determination has been made (e.g., without any intervening user input) that computer system 600 should be configured to automatically add captured media to the shared library. At FIG. 10D, computer system 600 makes this determination based on detecting that a computer system associated with Kevin (e.g., who is shown via live preview 1030 with John) is near computer system 600 (e.g., and that the respective set of criteria are satisfied, as described above in relation to FIG. 10C). As illustrated in FIG. 10D, computer system 600 replaces personal library indicator 1002*b* and personal library indication 1002*bb* with shared library indicator 1002*e* (e.g., which is covered by notification 1044 in FIG. 10D) and shared library indication 1002*ee* in the camera application user interface. Shared library indicator 1002*e* and shared library indication 1002*ee* indicate that computer system 600 is now configured to automatically add captured media to the shared library. At FIG. 10D, computer system 600 also displays notification 1044 to indicate that computer system 600 has been recently automatically configured to add (e.g., to automatically add) captured media to the shared library ("You are now in shared library mode"). In some embodiments, when computer system 600 automatically changes (e.g., not based on input that is directed to a control in the camera application user interface and/or as described above in relation to FIG. 10D) between being configured to automatically add captured media to the shared library and being configured to not automatically add captured media to the shared library, computer system 600 displays a notification that indicates the change between these configurations. In some embodiments, when computer system 600 manually changes (e.g., based on input that is directed to a control in the camera application user interface) between being configured to automatically add captured media to the shared library and being configured to not automatically add captured media to the shared library, computer system 600 does not display a notification that indicates the change between these configurations (e.g., as described below in relation to FIGS. 10E-10F). Moreover, as illustrated in FIG. 10D, computer system 600 has updated media collection 1012 to include a representation of the media that in response to detecting tap input 1050*c* at FIG. 10C. At FIG. 10D, computer system 600 detects tap input 1050*d*1 on shutter control 1010 or detects tap input 1050*d*2 on media collection 1012 (where the detection of input 1050*d*2 will be further discussed below in relation to FIG. 10H). At FIG. 10D, in response to detecting tap input 1050*d*1, computer system 600 captures media representative of live preview 1030 and associates the captured media with (e.g., saves the captured media in, stores the captured media with and/in, shares the captured media with, assigns the captured media to) John's personal library. Here, the captured media is associated with John's personal library without being associated with the shared library because the respective set of criteria is satisfied. In some embodiments, computer system 600 does not associate the captured media with John's personal library; in other embodiments, computer system 600, does.

Figure 10E:
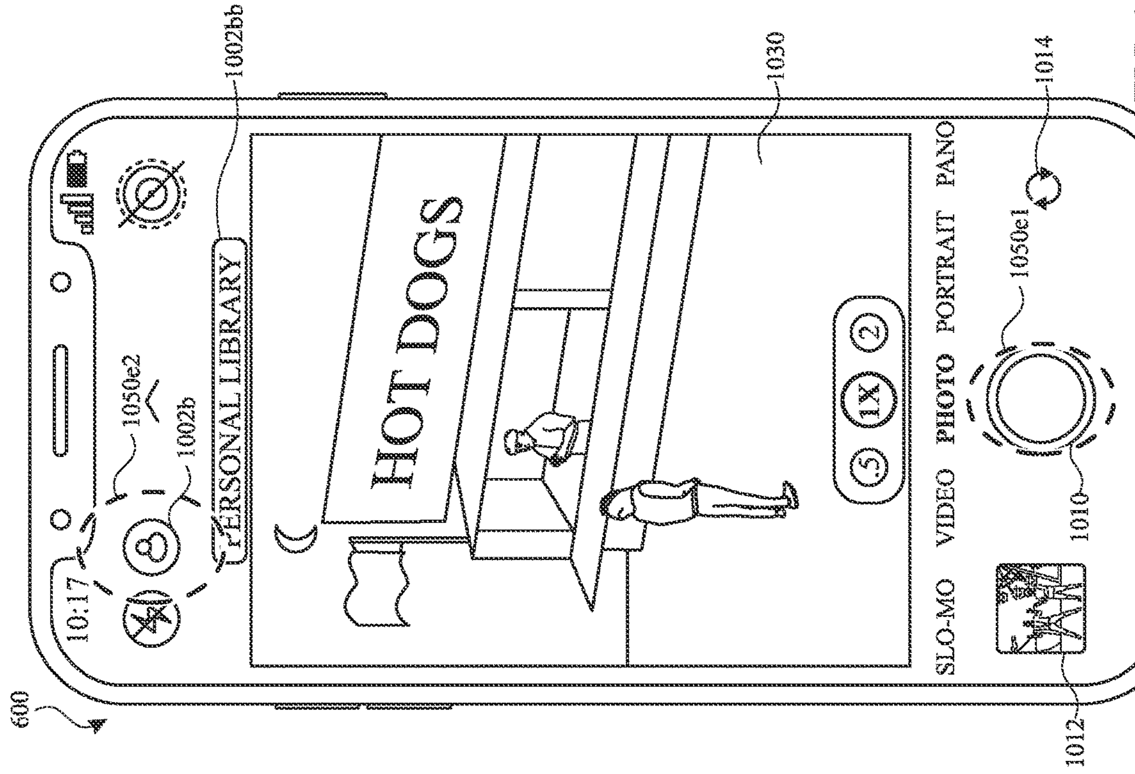

FIG. 10E illustrates computer system 600 displaying the camera application user interface sometime after Kevin has left the theme park and John is positioned in front of a hotdog stand (e.g., as shown via live preview 1030). At FIG. 10E, a determination has been made (e.g., without any intervening user input) that computer system 600 should not be configured to automatically add media to the shared library (and/or that computer system 600 should be configured to automatically add captured media to the personal library without adding it to the shared library). At FIG. 10E, computer system 600 makes this determination based on detecting that the computer system associated with Kevin (e.g., who's shown via live preview 1030 of FIG. 10D with John) is not near (e.g., within a predetermined distance of) computer system 600 (e.g., and determining the respective set of criteria is not satisfied, using similar techniques to those described above in relation to FIG. 10C). As illustrated in FIG. 10E, computer system 600 replaces shared library indicator 1002*e* and shared library indication 1002*ee* with personal library indicator 1002*b* and personal library indication 1002*bb* to indicate that computer system 600 is configured to automatically add captured media to the personal library without automatically adding the captured media to the shared library. In some embodiments, computer system 600 displayed a notification to indicate that the change in configuration occurred based on a determination (e.g., determined automatically without intervening user input) that the respective set of criteria is not satisfied at FIG. 10E (e.g., using one or more techniques as described above in relation to FIG. 10D). At FIG. 10E, computer system 600 detects tap input 1050*e*1 on shutter control 1010 and/or detects tap input 1050*e*2 on personal library indicator 1002*b*. At FIG. 10E, in response to detecting tap input 1050*e*1 on shutter control 1010, computer system 600 captures media representative of live preview 1030 and associates the captured media with John's personal library without associating it with the shared library (e.g., because the respective set of criteria is not satisfied).

As illustrated in FIG. 10F, in response to detecting tap input 1050*e*2 on personal library indicator 1002*b*, computer system 600 replaces personal library indicator 1002*b* and personal library indication 1002*bb* with shared library indicator 1002*e* and shared library indication 1002*ee* to indicate that computer system 600 is now configured to automatically add captured media to the shared library. Here, computer system 600 does not display a notification of the change in configuration because computer system 600 was configured to automatically add captured media to the shared library in response to detecting tap input 1050*e*2 (e.g., manually configured to change the automatic adding configuration instead of being automatically configured to change the automatic adding configured). At FIG. 10F, computer system 600 is configured to automatically add captured media to the shared library until a determination has been made that a set of automatic revision criteria are satisfied. In some embodiments, the set of automatic revision criteria are satisfied when a determination is made that the respective set of criteria have changed from being satisfied (e.g., before the most recent change in the automatic adding configuration) to not being satisfied (e.g., after the most recent change in the automatic adding configuration) or have changed from not being satisfied (e.g., before the most recent change in the automatic adding configuration) to being satisfied (e.g., after the most recent change in the automatic adding configuration). In some embodiments, the set of automatic revision criteria are satisfied when a determination is made that a predetermined period of time (e.g., 1-60 minutes) has passed since the manual change (and/or, in some embodiments, the automatic change) to the automatic adding configuration occurred. In some embodiments, the set of automatic revision criteria are satisfied when a determination is made that, after a predetermined period of time has passed since the manual change (and/or, in some embodiments, the automatic change) to the automatic adding configuration occurred, the respective set of criteria have changed from being satisfied to not being satisfied or have changed from being not satisfied to being satisfied. At FIG. 10F, computer system 600 detects tap input 1050*f* on shutter control 1010. At FIG. 10F, in response to detecting tap input 1050*f* on shutter control 1010, computer system 600 captures media representative of live preview 1030 and associates the captured media with the shared library (e.g., because computer system 600 is currently configured, via tap input 1050*e*2, to automatically add captured media to the shared library). In some embodiments, in response to detecting a tap input on shared library indicator 1002*e*, computer system 600 is manually configured to automatically add captured media to John's personal library without adding the captured media to the shared library. In some embodiments, in response to detecting a tap input on shared library indicator 1002*e*, computer system 600 replaces shared library indicator 1002*e* and shared library indication 1002*ee* of FIG. 10F with personal library indicator 1002*b* and personal library indication 1002*bb* of FIG. 10E to indicate that computer system 600 is configured to automatically add captured media to the personal library without automatically captured media to the shared library. In some embodiments, when the computer system is manually configured to automatically add captured media to the personal library without automatically captured media to the shared library, computer system 600 reverts back to being configured to automatically add captured media to John's personal library until a determination is made that the set of reversion criteria are satisfied.

Figure 10G:
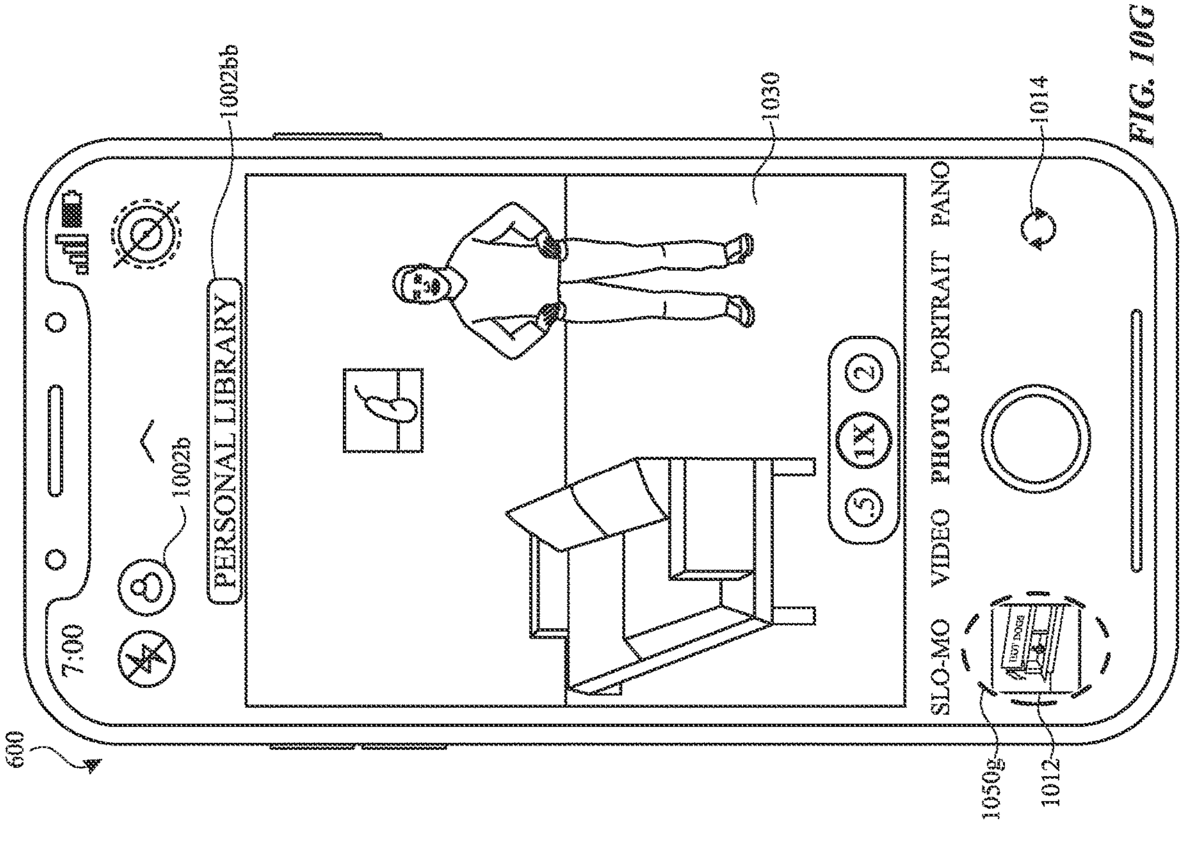
Figure 10H:
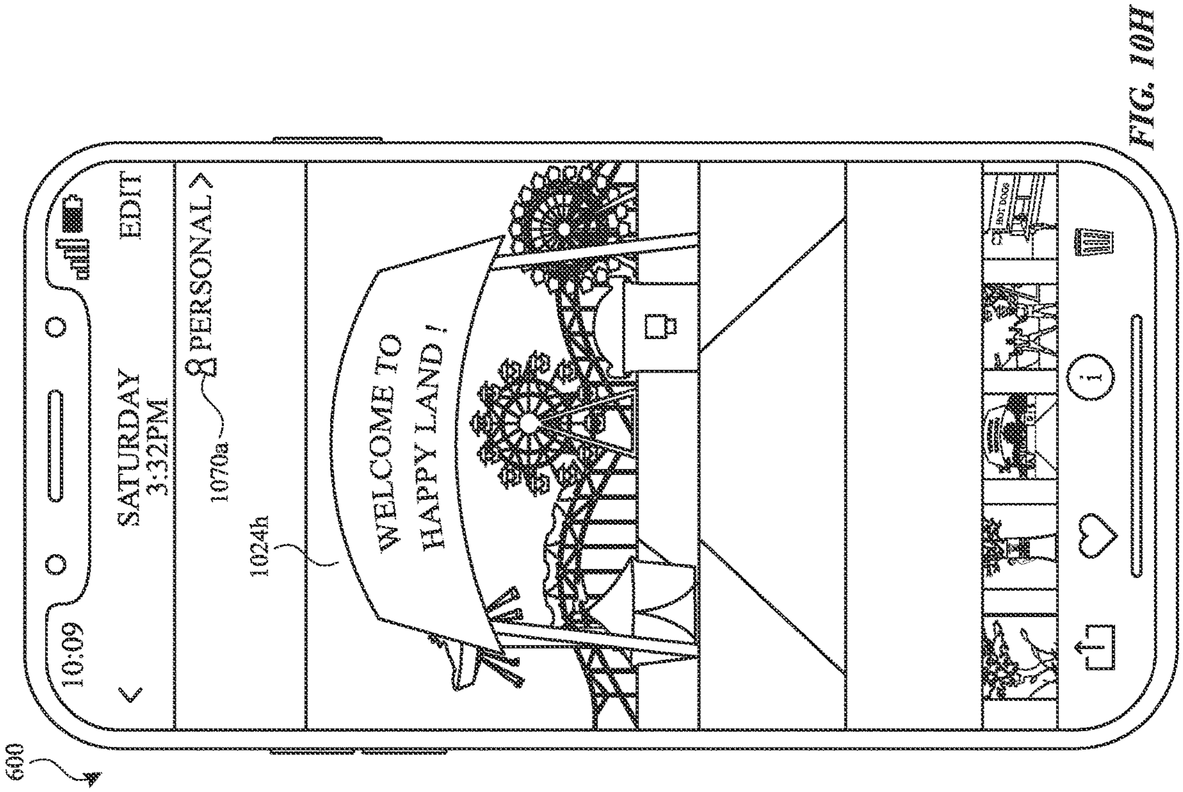
Figure 10I:
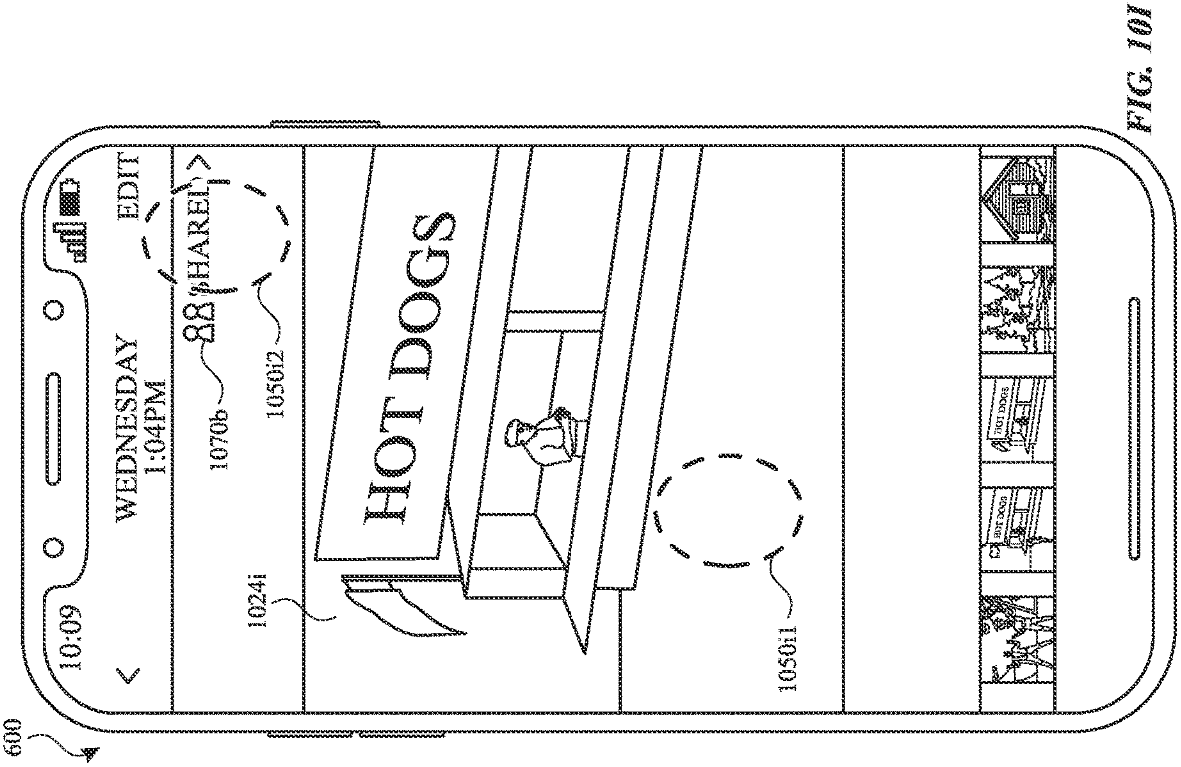

FIG. 10G illustrates computer system 600 displaying the camera application user interface sometime after John has left the theme park and has arrived home. At FIG. 10G, John is home and Kevin is positioned within the FOV (e.g., as shown via live preview 1030). At FIG. 10G, a determination has been made that the set of reversion criteria are satisfied because Kevin is located at an excluded location (e.g., "Home") and disable-auto-sharing-at-home setting 1040*b* is enabled (e.g., as described above in relation to FIG. 10A). At FIG. 10G, the set of reversion criteria is satisfied (and/or the respective set of criteria is satisfied) at FIG. 10G irrespective of whether a computer system associated with Kevin is near computer system 600. Moreover, because the determination has been made that the set of reversion criteria are satisfied, computer system 600 is transitioned to being configured (e.g., automatically) to add captured media to John's personal library. As illustrated in FIG. 10G, computer system 600 replaces shared library indicator 1002*e* and shared library indication 1002*ee* of FIG. 10F with personal library indicator 1002*b* and personal library indication 1002*bb* of FIG. 10G to indicate that computer system 600 is configured to automatically add captured media to the personal library without automatically captured media to the shared library. In some embodiments, in response to detecting an input directed to personal library indicator 1002*b*, computer system 600 is automatically configured to add captured media to John's personal library (e.g., irrespective of whether or not computer system 600 is at home and/or another excluded location). At FIG. 10G, computer system 600 detects tap input 1050*g* on media collection 1012 (where the detection of input 1050*g* will be further discussed below in relation to FIG. 10I).

Looking back at FIG. 10D, computer system 600 detected tap input 1050*d*2 on media collection 1012. At FIG. 10H, computer system 600 displays a media viewer user interface (and/or a photo gallery user interface) that includes enlarged media representation 1024*h*. Enlarged representation 1024*h* is a representation of the media captured via input 1050*c* of FIG. 10C, which was detected when computer system 600 was configured to automatically add captured media to John's personal library without adding the captured media to the shared library. At FIG. 10H, enlarged representation 1024*h* is displayed with personal library indication 1070*a* to indicate that enlarged representation 1024*h* (and/or the media represented by enlarged representation 1024*h*) is currently associated with John's personal library.

Looking back at FIG. 10G, computer system 600 detects tap input 1050*g* on media collection 1012. At FIG. 10I, computer system 600 displays a media viewer user interface that includes enlarged media representation 1024*i*. Enlarged representation 1024*i* is a representation of the media captured via input 1050*f* of FIG. 10F, which was detected when computer system 600 was configured to automatically add captured media to the shared library. At FIG. 10I, enlarged representation 1024*i* is displayed with shared library indication 1070*b* to indicate that enlarged representation 1024*i* (and/or the media represented by enlarged representation 1024*i*) is currently associated with the shared library. At FIG. 10I, computer system 600 detects tap input 1050*i*1 on enlarged media representation 1024*i*, tap input 1050*i*2 on shared library indication 1070*b*, or upward swipe input 1050*i*3 on enlarged representation 1024*i*. As illustrated in FIG. 10J, in response to detecting input 1050*i*1 on enlarged media representation 1024*i*, computer system 600 expands enlarged media representation 1024*i* and ceases to display one or more user interface elements of the photo gallery user interface of FIG. 10I, including shared library indication 1070*b*. As illustrated in FIG. 10J1, in response to detecting upward swipe input 1050*i*3 on enlarged representation 1024*i* in FIG. 10I, computer system 600 moves enlarged media representation 1024*i* up and displays metadata corresponding to enlarged media representation 1024*i*. At FIG. 10J1, computer system 600 continues to display shared library indication 1070*b* concurrently with a portion of enlarged media representation 1024*i*. Looking back at FIGS. 7T-7U and FIGS. 10I-10J1, computer system 600 did not display the shared library indicator in FIG. 7T because computer system 600 was displaying the enlarged representation of FIG. 7T in media gallery user interface 740*a* and/or accessed from the media gallery application. However, at FIG. 10I, computer system 600 displays the shared library indicator because the enlarged representation was displayed in the media viewer user interface and/or accessed from the camera application via tap input 1050*g* on media collection 1012. In some embodiments, computer system 600 uses one or more techniques to display and respond to inputs directed to shared library indication 1070*b* as computer system 600 uses to display and respond to inputs directed to shared library indication 634*d*, as described above in relation to FIG. 7U.

Figure 10L:
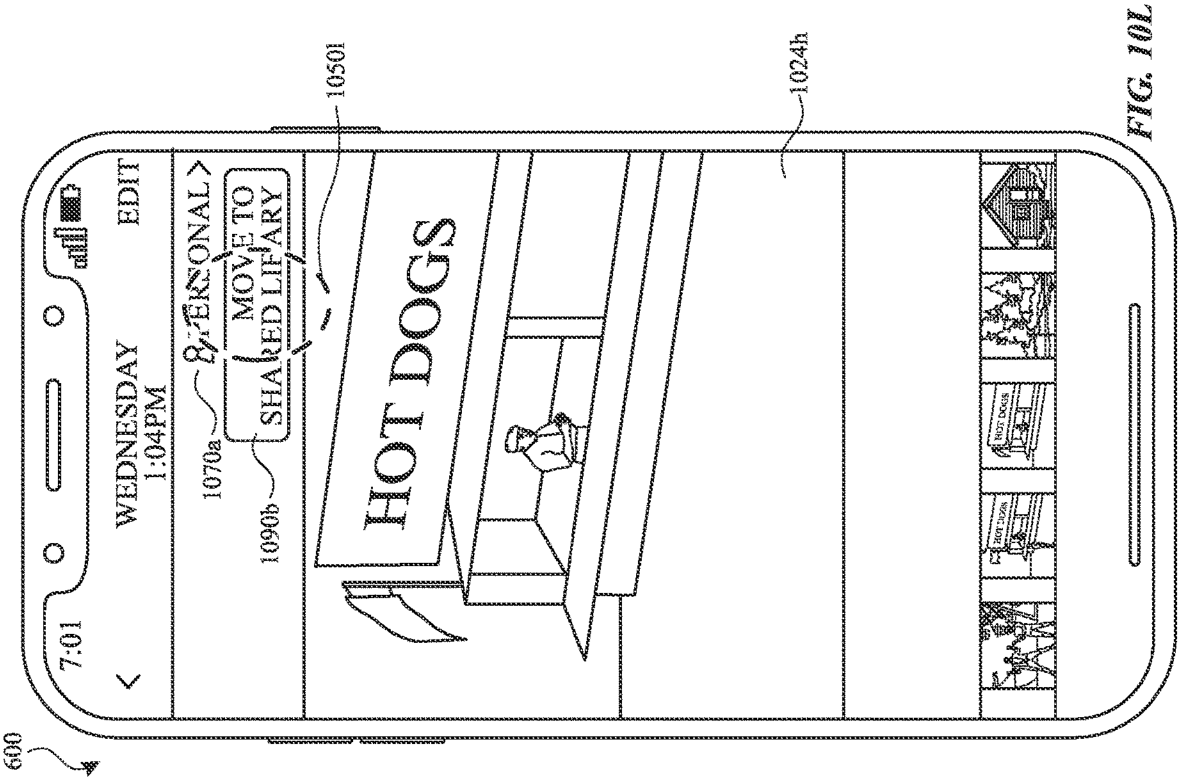
Figure 10K:
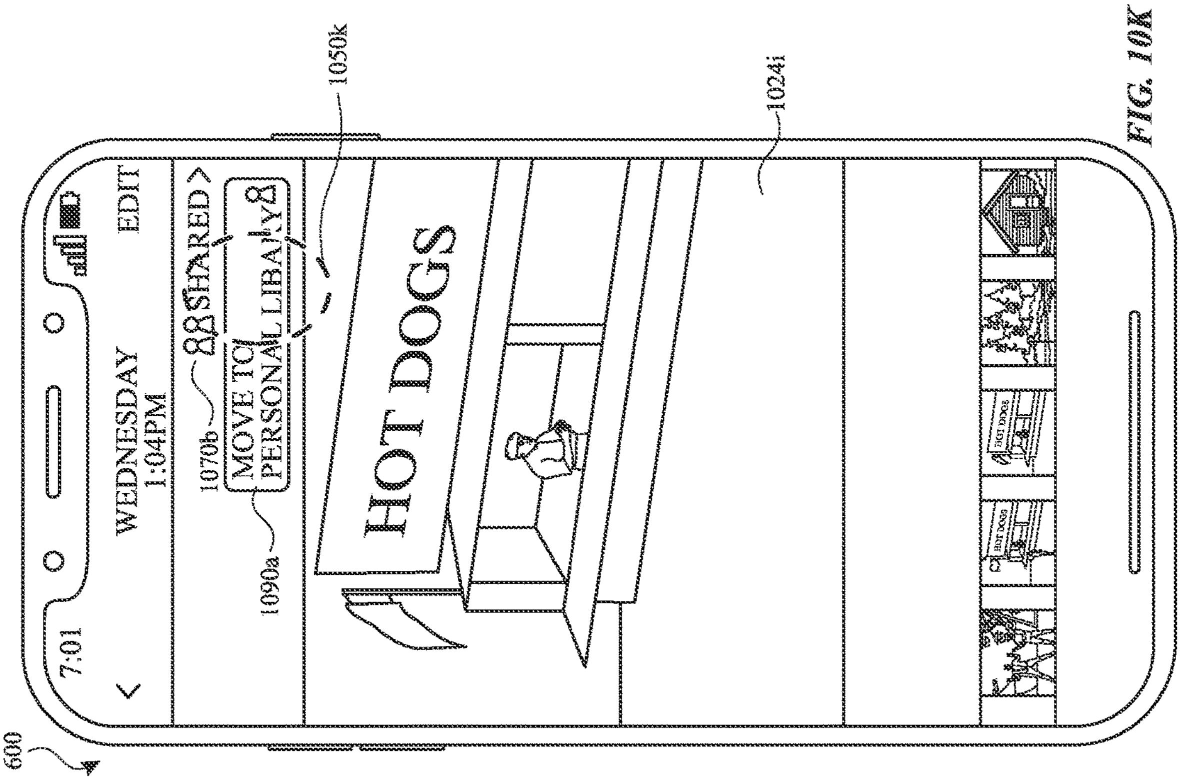

As illustrated in FIG. 10K, in response to detecting tap input 1050*i*2 on shared library indication 1070*b*, computer system 600 displays move-to-personal-library control 1090*a*. At FIG. 10K, computer system 600 detects tap input 1050*k* on move-to-personal-library control 1090*a*. At FIG. 10L, in response to detecting tap input 1050*k* on move-topersonal-library control 1090*a*, computer system 600 changes the media represented by enlarged representation 1024*i* to be associated with John's personal library (e.g., instead of being associated with the shared library). As illustrated in FIG. 10L, in response to detecting tap input 1050*k* on move-to-personal-library control 1090*a*, computer system 600 replaces shared library indication 1070*b* with personal library indication 1070*a* to indicate that the media represented by enlarged representation 1024*i* is associated with John's personal library without being associated with the shared library. In addition, in response to detecting tap input 1050*k* on move-to-personal-library control 1090*a*, computer system 600 replaces move-to-personal-library control 1090*a* with move-to-shared-library control 1090*b*. In some embodiments, computer system 600 detects tap input 1050*l* on move-to-shared-library control 1090*b* and, in response, changes the media represented by enlarged representation 1024*i* to be associated with John's shared library and/or re-displays the user interface of FIG. 10K. In some embodiments, in response to detecting tap input 1050*k* on move-to-personal-library control 1090*a*, computer system 600 ceases to display move-to-personal-library control 1090*a* and does not display move-to-shared-library control 1090*b*. In some embodiments, computer system 600 displays move-to-shared-library control 1090*b* upon detecting an input on personal library indication 1070*a*.

Figure 10M:
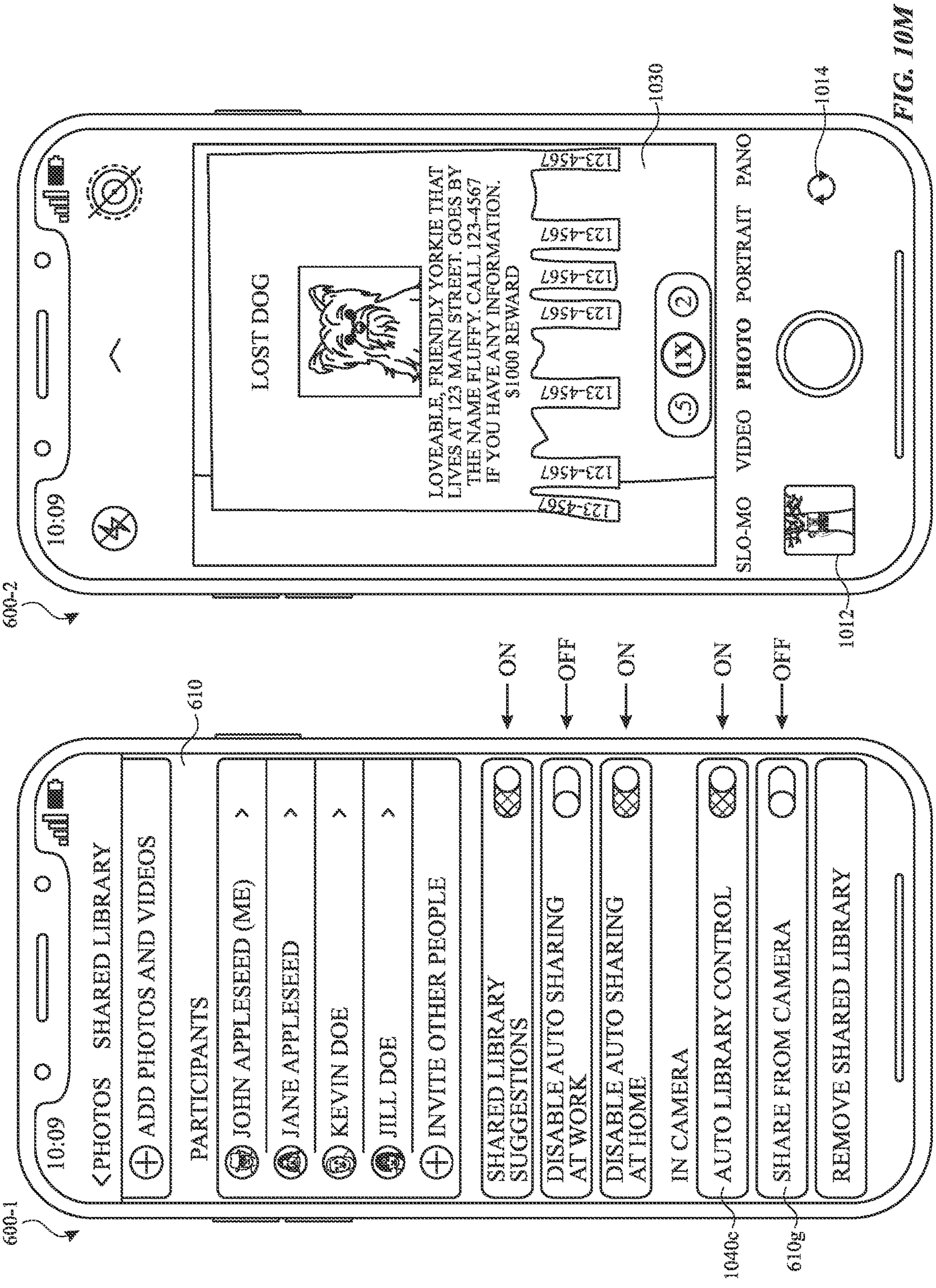
Figure 10N:
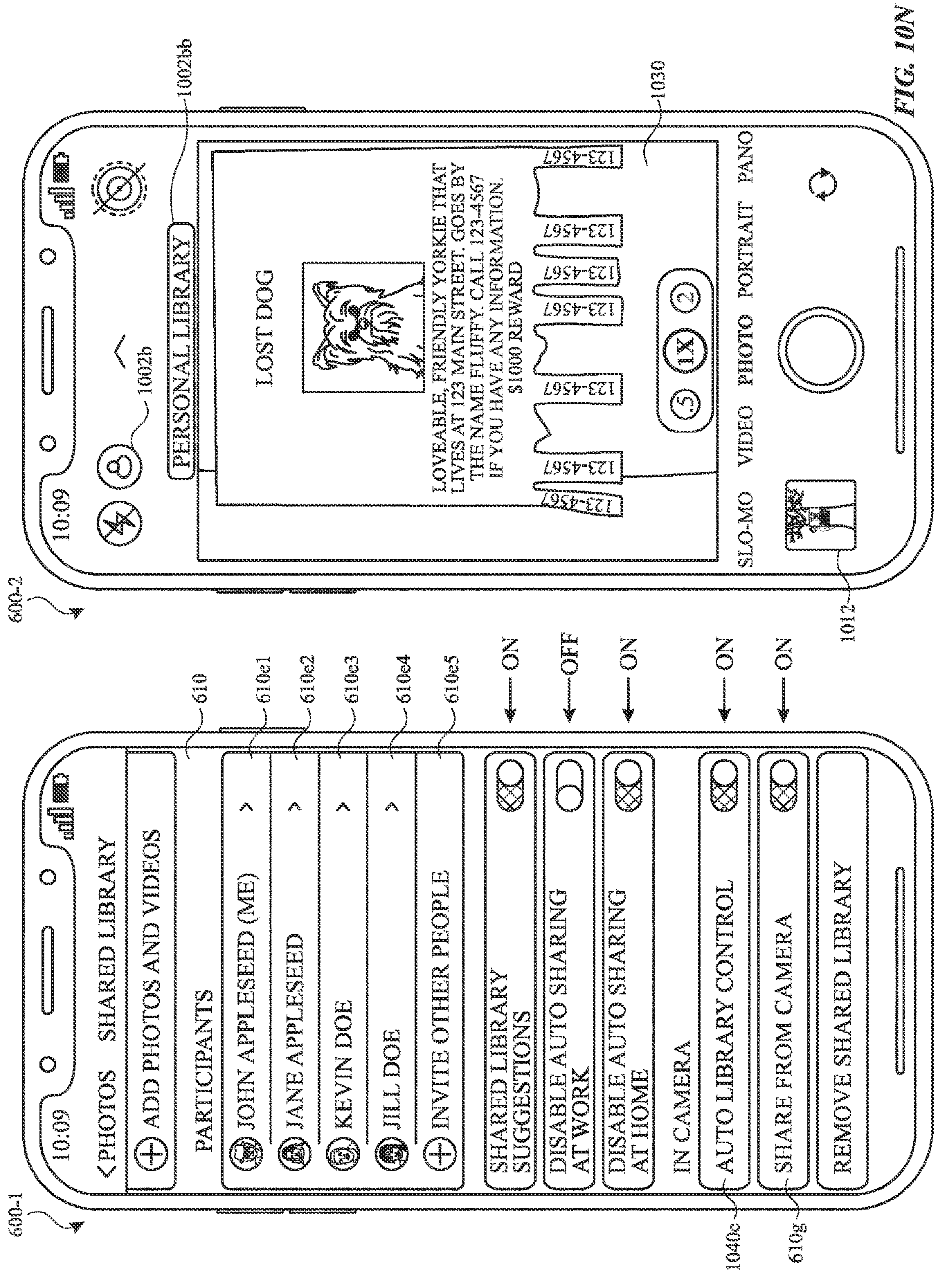

FIG. 10M illustrates the state of the camera user interface (e.g., computer system 600-2) when auto-sharing-control setting 1040*c* is enabled and share-from-camera setting 610*g* is disabled (e.g., computer system 600-1). As illustrated in FIG. 10M, when auto-sharing-control setting 1040*c* is enabled and share-from-camera setting 610*g* is disabled (e.g., computer system 600-1), the computer system does not display any automatic sharing indicators (or indications) (e.g., personal library indicator 1002*b*, personal library indication 1002*bb*, shared library indicator 1002*e*, and shared library indication 1002*ee*, as described above). FIG. 10N illustrates the state of the camera user interface (e.g., computer system 600-2) when auto-sharing-control setting 1040*c* is enabled and share-from-camera setting 610*g* is enabled (e.g., computer system 600-1). As illustrated in FIG. 10N, when auto-sharing-control setting 1040*c* is enabled and share-from-camera setting 610*g* is enabled (e.g., computer system 600-1), the computer system displays automatic sharing indicators, such as personal library indicator 1002*b* and personal library indication 1002*bb* at FIG. 10N. In some embodiments, when share-from-camera setting 610*g* is disabled, the computer system cannot be manually configured to automatically add captured media to the shared library (e.g., because none of the sharing indicators are displayed, so an input cannot be directed to a sharing indicator). In some embodiments, when share-from-camera setting 610*g* is disabled, the computer system cannot be automatically configured to automatically add captured media to the shared library (e.g., irrespective of whether auto-sharing-control setting 1040*c* is enabled or disabled). In some embodiments, when auto-sharing-control setting 1040*c* is enabled and share-from-camera setting 610*g* is disabled, the computer system cannot be automatically configured to add captured media to the shared library but can be manually configured to add captured media to the shared library.

FIGS. 11A-11L illustrate exemplary user interfaces for recommending media items for one or more media libraries using a computer system in accordance with some embodiments. The user interfaces in these figures are used to illustrate the processes described below, including the processes in FIG. 13.

Figure 11B:
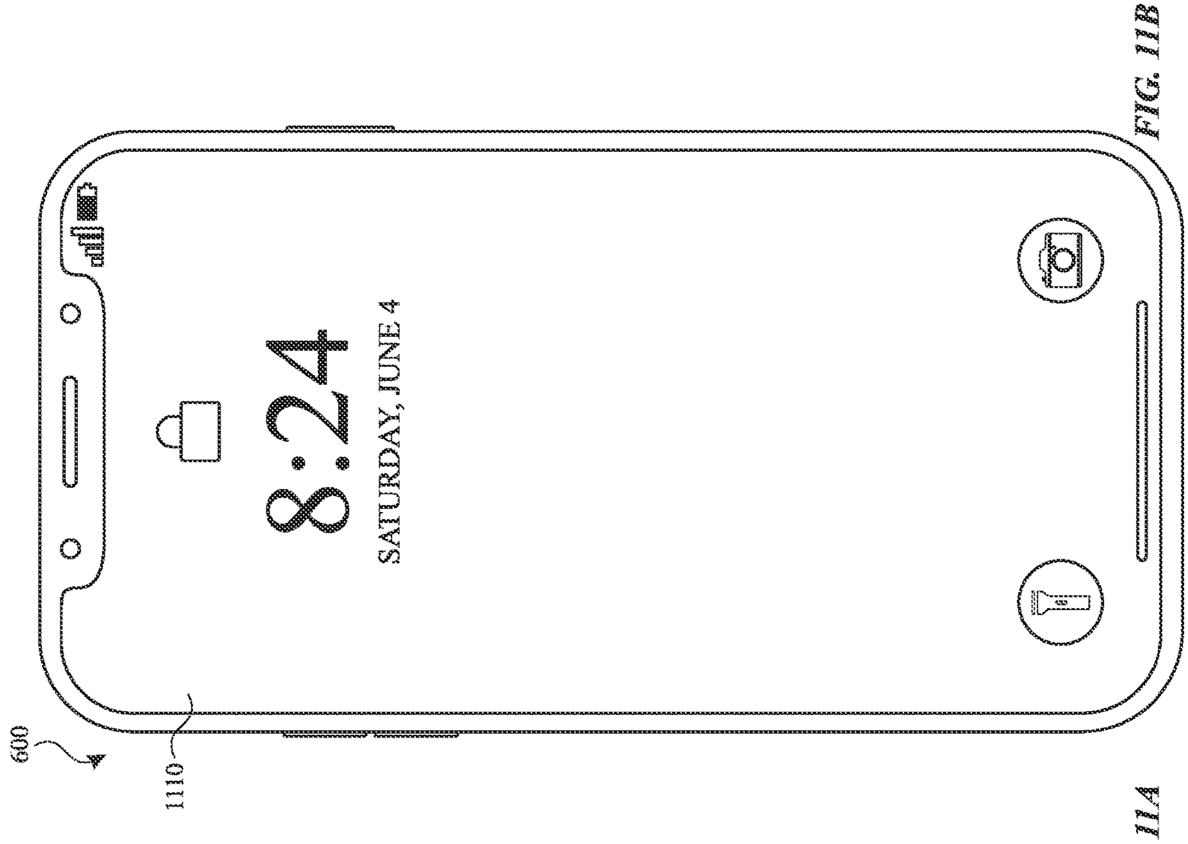
FIGS. 11A-11L illustrate exemplary user interfaces for recommending media items for one or more media libraries using a computer system in accordance with some embodiments.
Figure 11A:
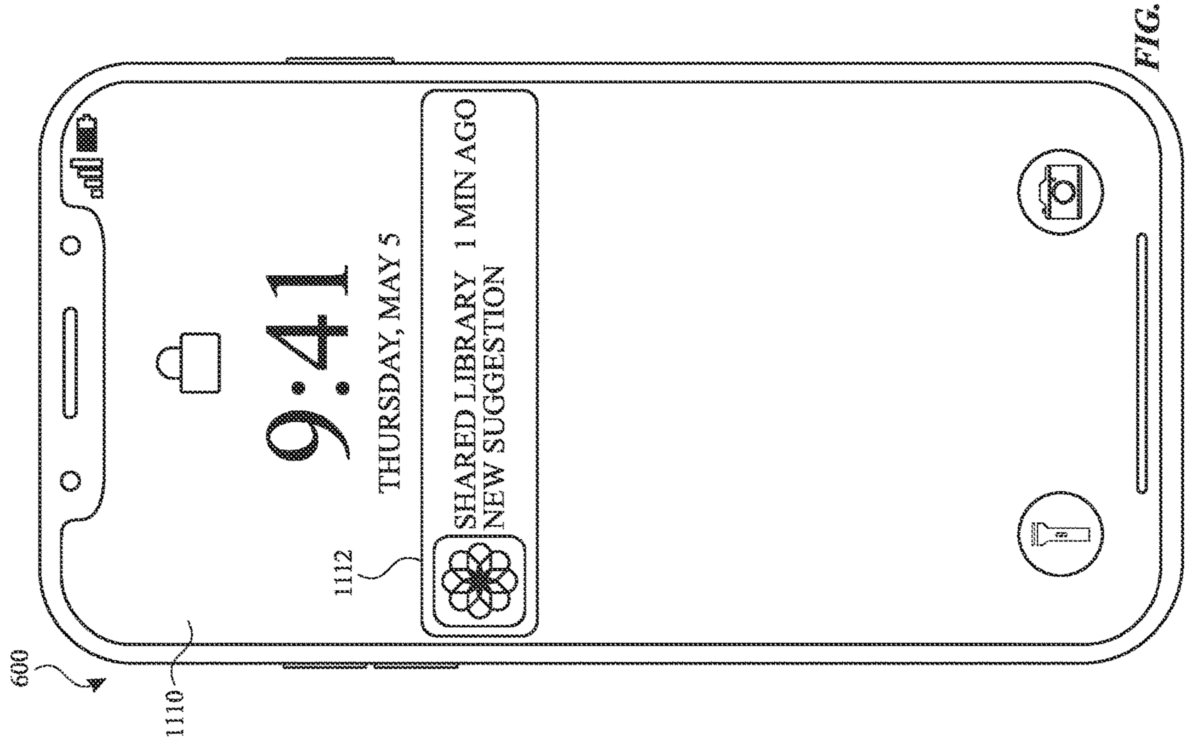

FIG. 11A illustrates computer system 600 displaying lock screen user interface 1110 on Thursday, May 5$^{th}$, at 9:41. Lock screen user interface 1110 includes media-suggestion notification 1112, which indicates that one or more media items are being suggested to be moved from John's personal library to a shared library (e.g., library shared between John, Jane, Kevin, and Jill, as described above in relation to FIGS. 6A-6AO). In some embodiments, the one or more media items that are being suggested were captured and/or saved in John's personal library after the shared library was created (e.g., in FIGS. 6A-6AO) and on or before Thursday, May 5$^{th}$, at 9:41. In some embodiments, the one or more suggested media items are being suggested because the one or more media items satisfy media sharing criteria (e.g., a similar criteria as discussed above in relation to recommending media items in relation to recommendation indication 608 of FIG. 6I). In some embodiments, a respective media item satisfies the sharing criteria when a determination is made that one or more of the selected people (e.g., as discussed above in relation to FIG. 6AI) are detected at an event (e.g., during one or more camera sessions) that includes the respective person (e.g., a media item in media items 690*b* that does not include "Jane") and the respective media item was captured during the event. In some embodiments, computer system 600 determines that a particular selected person was at an event based on communication between computer system 600 (or another electronic device belonging to John that captured the media item) and a computer system of the particular person. In some embodiments, the communication includes Wi-Fi communication and/or Bluetooth communication. In some embodiments, computer system 600 determines that a particular person was at an event based on the location of computer system 600 and the location of the computer system of the particular person during the event (or when the media was captured). In some embodiments, computer system 600 determines the location of the computer system and/or the location of the computer system of the particular participant based on the communication between computer system 600 and the computer system of the particular person.

FIG. 11B illustrates computer system 600 displaying lock screen user interface 1110 on Saturday, June 4$^{th}$, at 8:24. Lock screen user interface 1110 of FIG. 11B is being displayed after media-suggestion notification 1112 was cleared from computer system 600 in FIG. 11A. It should be understood that for the purposes of this description, computer system 600 has identified media items at FIG. 11B that satisfy the media sharing criteria in John's personal library, and these media items are available to be suggested because they are not included in the shared library. However, at FIG. 11B, computer system 600 does not display a media-suggestion notification because one or more notification criteria are not satisfied. Here, the notification criteria include a criterion that is satisfied when an interval of time (e.g., one month, in this embodiment) has not passed since media-suggestion notification 1112 was displayed (e.g., since a media-suggestion notification was displayed). In some embodiments, the notification criteria include a criterion that is satisfied when more than a threshold number of media items (e.g., over 10-50 media items) are available to be suggested that satisfy the media sharing criteria. In some embodiments, the notification criteria include a criterion that is satisfied when shared-library-suggestions setting 610*f* of FIG. 10A is enabled. In some embodiments, the notification criteria are not met when shared-library-suggestions setting 610*f* of FIG. 10A is disabled.

Figure 11D:
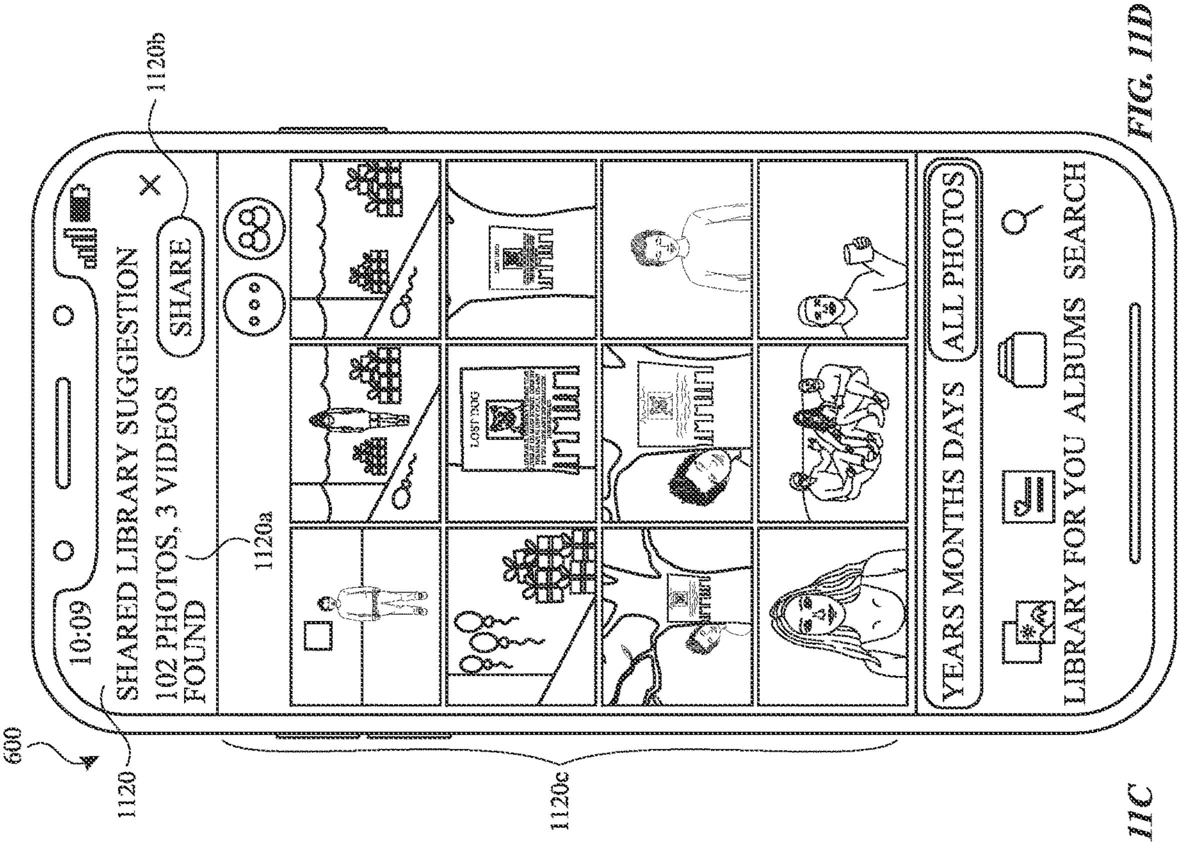
Figure 11C:
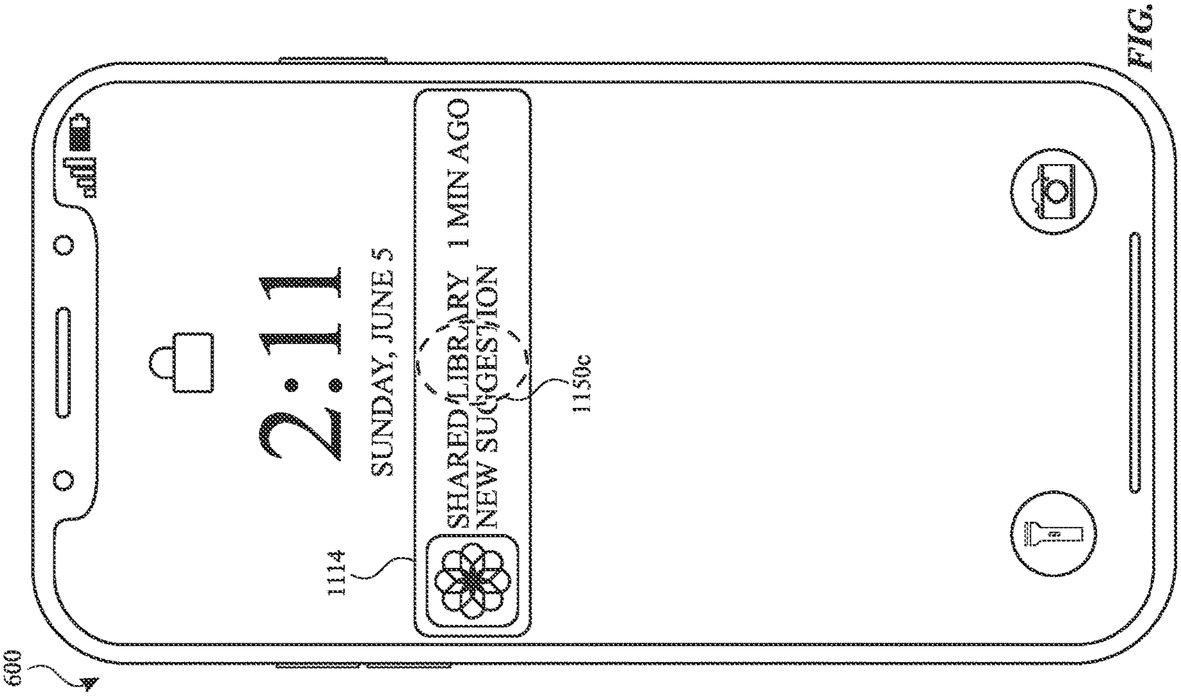

FIG. 11C illustrates computer system 600 displaying lock screen user interface 1110 on Sunday, June $5^{th}$, at 2:11. At FIG. 11C, computer system 600 displays media-suggestion notification 1114 that indicates that one or more media items are being suggested because one or more notification criteria are satisfied. Here, the notification criteria are satisfied because a time interval has passed (e.g., one month, in this embodiment) since previous media-suggestion notification 1112 (e.g., that last media-suggestion notification corresponding to suggested media items for sharing) was displayed and more than a threshold number of media items are available to be suggested that satisfy the media sharing criteria. Media-suggestion notification 1114 of FIG. 11C corresponds to a new suggestion for different media items for sharing in the shared library as compared to the suggestion for media items for sharing in the shared library that corresponded to media-suggestion notification 1112 of FIG. 11A. At FIG. 11C, computer system 600 detects tap input 1150*c* on media-suggestion notification 1114. It should be understood that one or more inputs described herein as a particular type of input, such as a tap input, press-and-hold input, and/or swipe input, could alternatively be replaced with another input. In some embodiments, an input described as a tap input could be replaced with a press-and-hold input, a swipe input, a mouse click input, a left click input, or an air gesture input. In some embodiments, a press-and-hold input could be replaced with a tap input, a swipe input, a mouse click and hold input, an option click input, a right click input, or an alternate air gesture input. In some embodiments, a swipe input could be replaced with a tap input, a press-and-hold input, and/or a mouse click and drag input, or an alternate air gesture input.

As illustrated in FIG. 11D, in response to detecting tap input 1150*c*, computer system 600 displays review user interface 1120 that includes suggestion indication 1120*a*. Suggestion indication 1120*a* indicates that 102 photos and three videos from John's personal library are being suggested to be shared with the shared library. Review user interface 1120 also includes add-control 1120*b* and media representations 1120*c*. Media representations 1120*c* are representations of the suggested media items that satisfy the media sharing criteria in FIG. 11C. In some embodiments, in response to detecting a tap input on add-control 1120*b*, computer system 600 adds one or more of the suggested media items (e.g., all and/or all of the selected media items) to the shared library. In some embodiments, in response to detecting one or more inputs, computer system 600 selects some of media representations 1120*c* without selecting some of the other media representations 1120*c* and adds the media items that corresponds to the selected media representations (e.g., as further described below in relation to FIGS. 11G-11J) (e.g., without adding one or more other media items). In some embodiments, computer system 600 responds to detecting one or more inputs directed to review user interface 1120, using one or more techniques as discussed above in relation to review user interface 634 (e.g., of FIG. 6V).

Figure 11F:
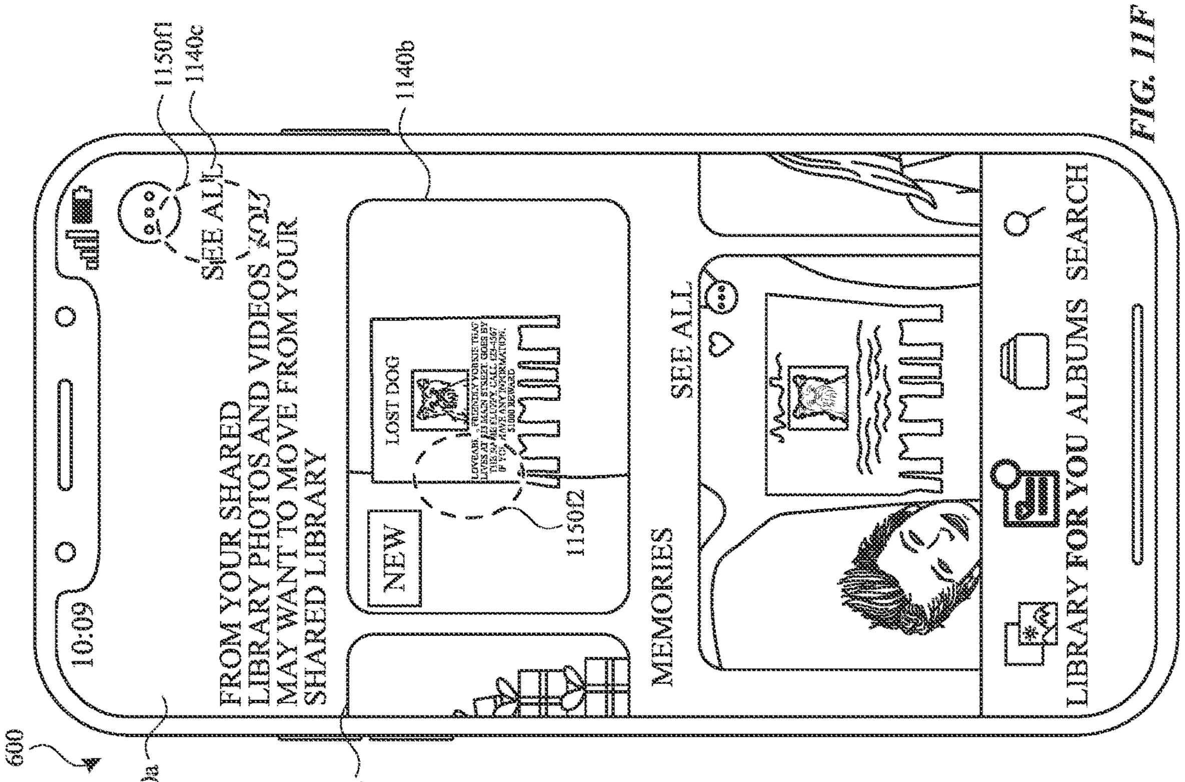
Figure 11E:
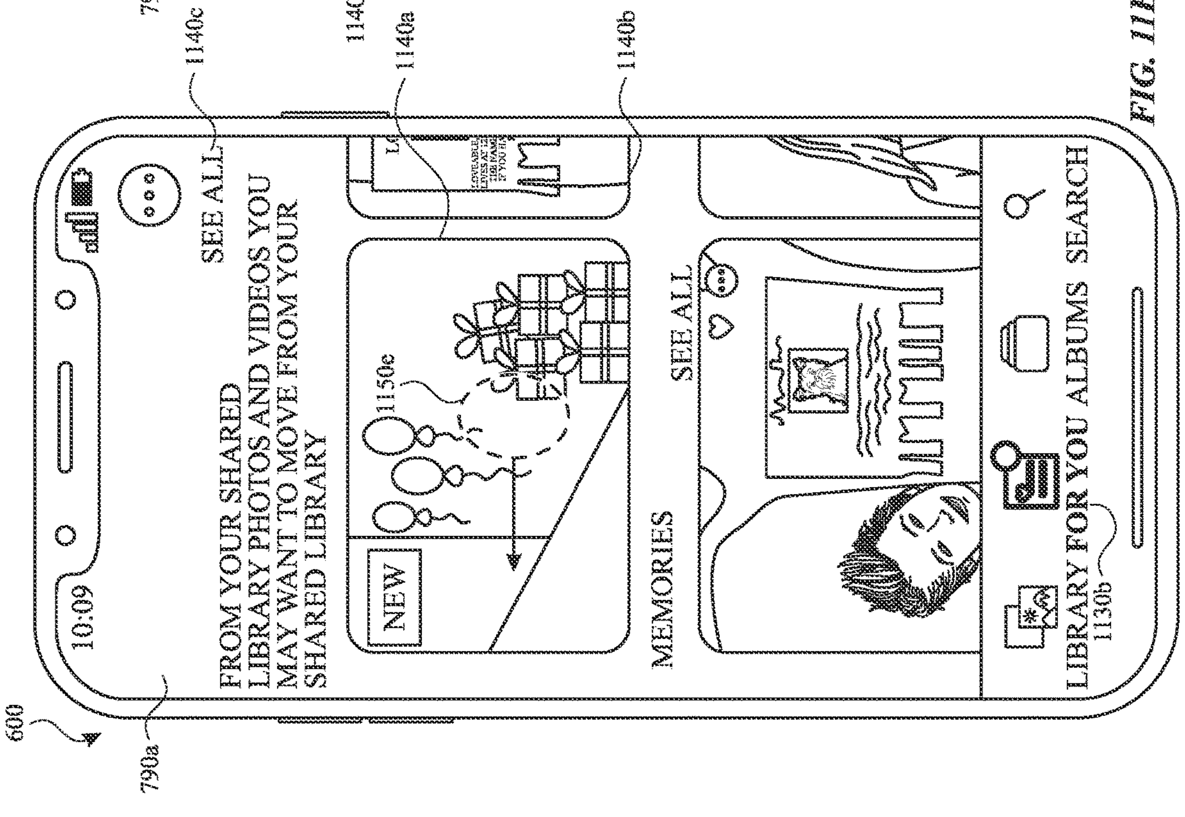

FIG. 11E illustrates computer system 600 displaying photo application user interface 790*a*. Photo application user interface 790*a* includes media-suggestion notification 1140*a*, media-suggestion notification 1140*b*, see-all control 1140*c*, and menu control 634*c*. As illustrated in FIG. 11E, photo application user interface 790*a* is displayed in the for-all view (e.g., as indicated by for-you control 1030*b*) being selected. In some embodiments, in response to detecting an input on another view (e.g., library view, album view, and/or search view), one or more user interface elements (e.g., menu control 634*c*) that are displayed in FIG. 11E is also displayed while computer system 600 displays the other view. Media suggestion notification 1140*a* and media-suggestion notification 1140*b* are displayed because the media items corresponding to media suggestion notification 1140*a* and media-suggestion notification 1140*b* satisfied the media sharing criteria and the notification criteria are satisfied. Media suggestion notification 1140*a* corresponds to suggested media items from an event (e.g., a discreet event) that is different from the event at which media-suggestion notification 1140*b* corresponds. As a part of showing that media-suggestion notification 1140*a* and media-suggestion notification 1140*b* are different, computer system 600 displays media-suggestion notification 1140*a* and media-suggestion notification 1140*b* with different appearances (e.g., different representations). In some embodiments, the appearance of a respective media-suggestion notification indicates the respective event that corresponds to the respective media-suggestion notification. In some embodiments, an event is determined based on a particular period of time at which media items are captured (and/or saved) and/or a location at which the media items were captured (e.g., as described above in relation to FIG. 6A). In some embodiments, photo application user interface 790*a* is displayed using one or more similar techniques as discussed above in relation to FIG. 7J1-7J2.

At FIG. 11E, computer system 600 detects leftward swipe input 1150*e* on photo application user interface 790*a*. As illustrated in FIG. 11F, in response to detecting swipe input 1150*e*, computer system 600 scrolls the media suggestion notifications to the right. At FIG. 11F, computer system 600 detects tap input 1150*f*1 on see-all control 1140*c* or tap input 1150*f*2 on media-suggestion notification 1140*b*.

Figure 11H:
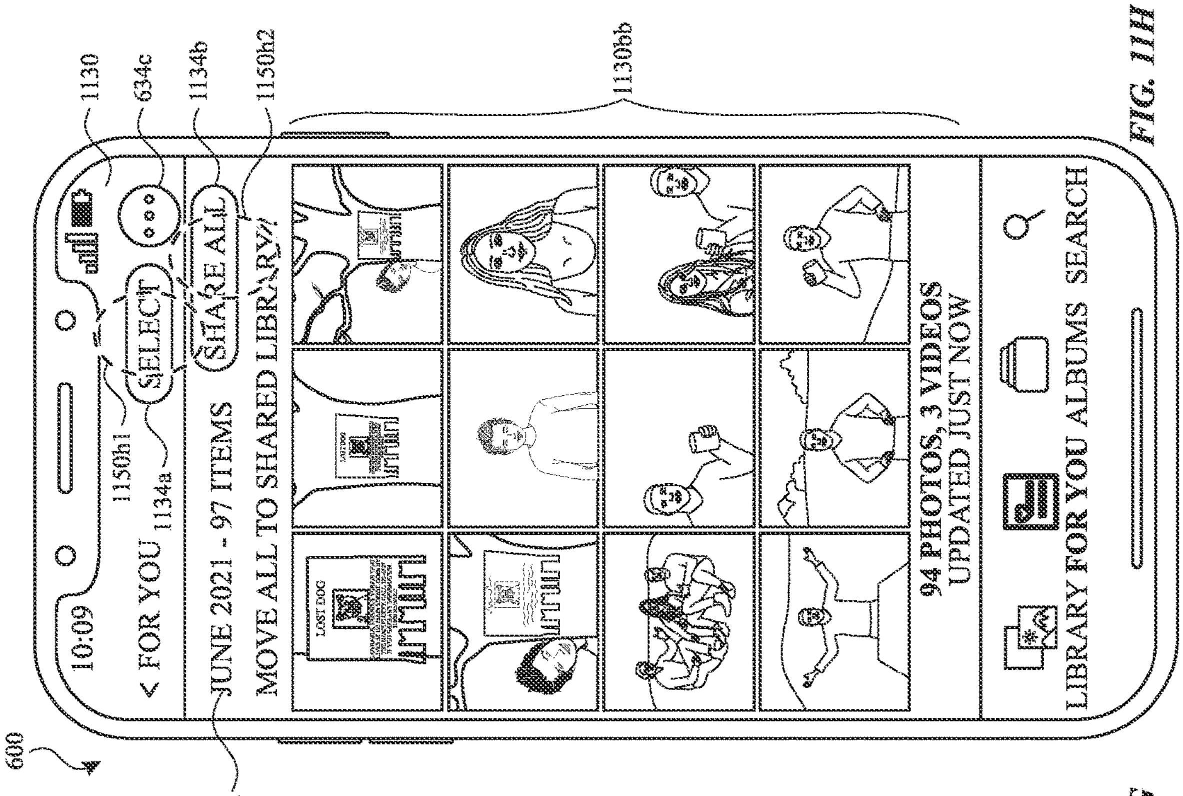
Figure 11G:
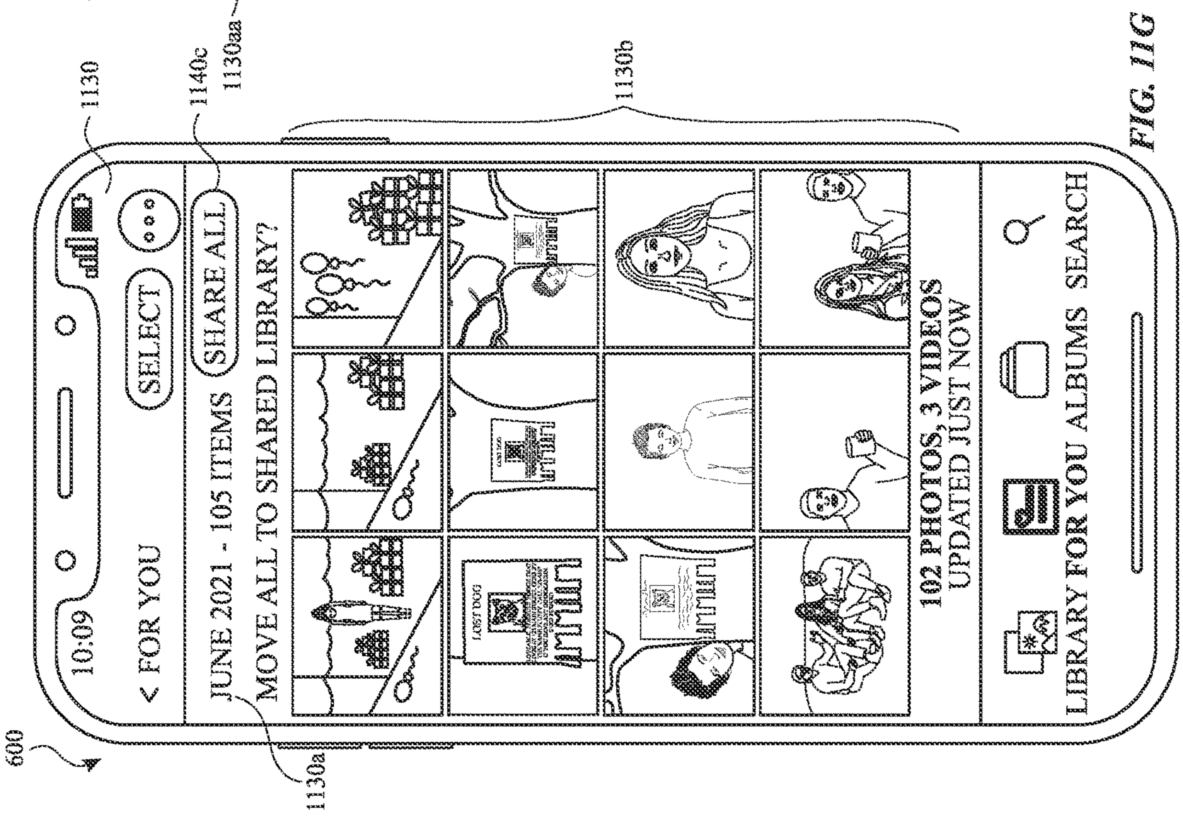

As illustrated in FIG. 11G, in response to detecting tap input 1150*f*1 on see-all control 1140*c*, computer system 600 displays review user interface 1130 that includes media items indication 1130*a* and media items 1130*b*. Media items indication 1130*a* indicates that all of the suggested media items are being provided in review user interface 1130 (e.g., 105 items). In other words, computer system 600 has made all of the suggested media items (e.g., media items that correspond to media-suggestion notification 1140*a* and media-suggestion notification 1140*b*) available to be reviewed by a user of computer system 600 in response to detecting tap input 1150*f*1 on see-all control 1140*c* at FIG. 11F.

As illustrated in FIG. 11H, in response to detecting tap input 1150*f*2 on media-suggestion notification 1140*b*, computer system 600 displays review user interface 1130 that includes media items indication 1130*aa*, media items 1130*bb*, and menu 634. Media items indication 1130*aa* indicates that a subset (e.g., 97 items) of the suggested media items are being provided in review user interface 1130. At FIG. 11H, media items 1130*bb* includes the suggested media items that correspond to media-suggestion notification 1140*b* of FIG. 11F (e.g., without including the suggested media items that correspond to media-suggestion notification 1140*a* of FIG. 11F) (e.g., without including other suggested media items). Thus, a person is able to review all the suggested media items at once (e.g., at FIG. 11G) or to review a subset of the suggested media items (e.g., FIG. 11H) (e.g., without reviewing one or more other subsets of the suggested media items). At FIG. 11H, computer system 600 displays select-control 1134*a* and share-all control 1134*b*. At FIG. 11H, computer system detects tap input 1150*h*1 on select control 1134*a* or tap input 1150*h*2 on share-all control 1134*b*. In some embodiments, in response to detecting tap input 1150*h*2 on share-all control 1134*b*, computer system 600 shares all of the suggested media items that are in John's personal library to the shared library.

Figure 11J:
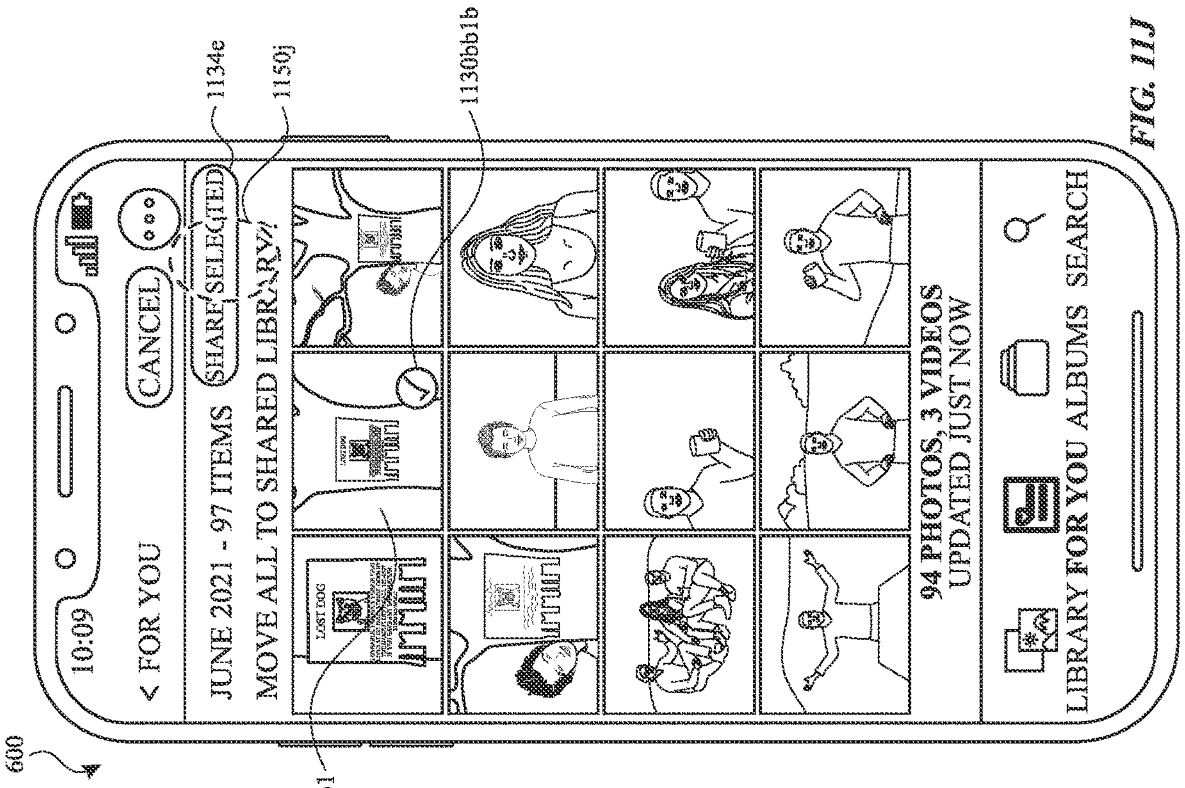
Figure 11I:
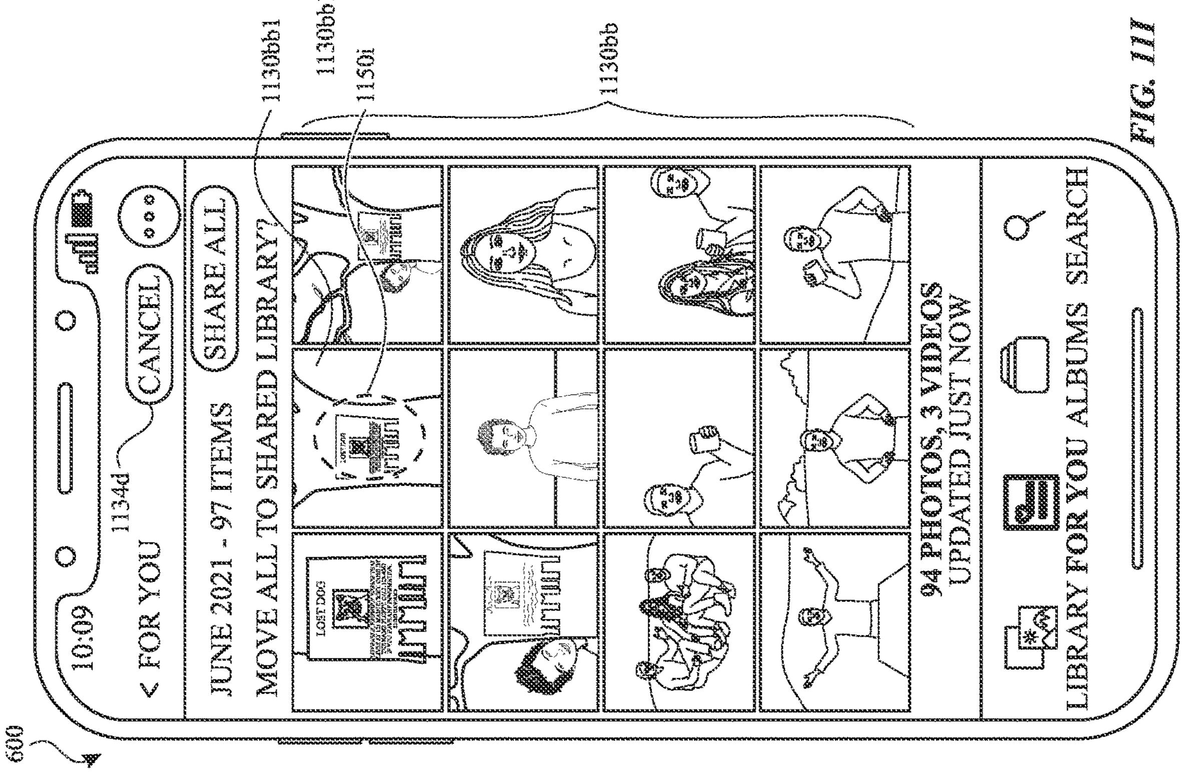

At FIG. 11I, in response to detecting tap input 1150*h*1 on select control 1134*a*, computer system 600 transitions computer system 600 into a selection mode. As illustrated in FIG. 11I, while in the selection mode, computer system 600 replaces select control 1134*a* of FIG. 11H with cancel control 1134*d* (e.g., that, when selected, causes computer system 600 to be transitioned out of the selection mode) in FIG. 11I. While in the selection mode, computer system 600 detects tap input 1150*i* on media item 1130*bb*1. As illustrated in FIG. 11J, in response to detecting tap input 1150*i* on media item 1130*bb*1, computer system 600 displays selection indication 1130*bb*1*b* to indicate that media item 1130*bb*1 is selected. Moreover, in response to detecting tap input 1150*i* on media item 1130*bb*1, computer system 600 replaces share-all control 1134*b* of FIG. 11I with share-selected control 1134*e* of FIG. 11J. At FIG. 11J, computer system 600 detects tap input 1150*j* on share-selected control 1134*e*. In some embodiments, in response to detecting tap input 1150*j* on share-selected control 1134*e*, computer system 600 shares the selected suggested media item(s) (e.g., media item 1130*bb*1) and does not share the unselected media items that are in John's personal library to the shared library. In some embodiments, after sharing the suggested media items, computer system 600 ceases to display a notification (e.g., 1112, 1114, 1140*a*, and/or 1140*b*) concerning the suggested media items that were shared. Thus, in some embodiments, computer system 600 allows a user to share suggested media items from a respective event without sharing other suggested media items from the respective event.

Figure 11L:
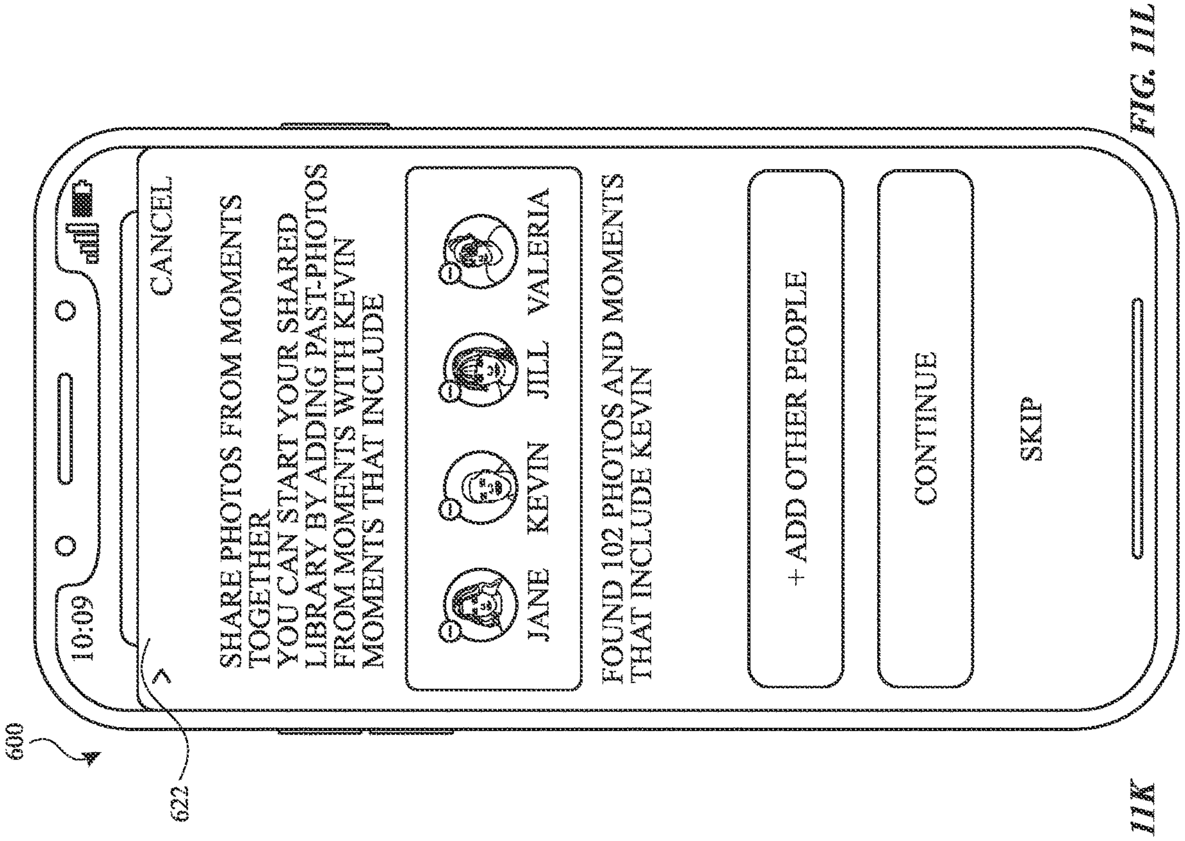
Figure 11K:
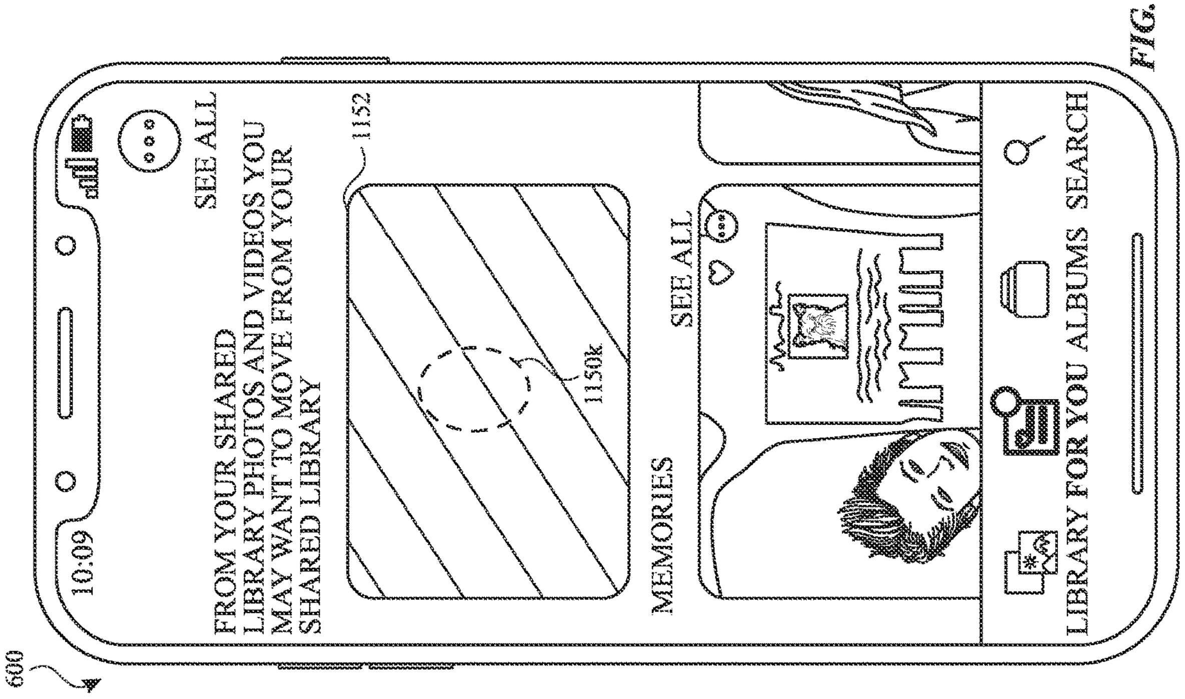

FIG. 11K illustrates an exemplary embodiment where no media items are available in John's personal library that satisfy the media sharing criteria. As illustrated in FIG. 11K, computer system 600 displays placeholder suggestion notification 1152 because no media items (or less than a threshold number of media items) are available in John's personal library that satisfy the media sharing criteria. In some embodiments, computer system 600 displays placeholder suggestion notification 1152 because no media items (or less than a threshold number of media items) are available in John's personal library that satisfy the media sharing criteria and the notification criteria are satisfied. In some embodiments, computer system 600 displays placeholder suggestion notification 1152 because no media items (or less than a threshold number of media items) are available in John's personal library that satisfy the media sharing criteria and/or the notification criteria are not satisfied. At FIG. 11K, computer system 600 detects tap input 1150*k* on placeholder suggestion notification 1152. As illustrated in FIG. 11L, in response to detecting tap input 1150*k* on placeholder suggestion notification 1152, computer system 600 displays add-people-for-sharing user interface 622, using one or more techniques as described above in relation to FIGS. 6I-6T (e.g., where a person can add and/or remove selected people to recommend/suggest future media items to share with the shared library).

FIG. 12 is a flow diagram illustrating methods for managing captured media for one or more media libraries using a computer system in accordance with some embodiments. Method 1200 is performed at a computer system (e.g., 100, 300, 500, and/or 600) (e.g., a smartphone, a desktop computer, a laptop, a tablet, or a head mounted device (e.g., a head mounted augmented reality and/or extended reality device)) that is in communication with a display generation component (e.g., a display controller, a touch-sensitive display system, and/or a head mounted display system) and with one or more cameras (e.g., one or more cameras (e.g., dual cameras, triple camera, or quad cameras) on the same side or different sides of the computer system (e.g., a front camera, or a back camera))). In some embodiments, the computer system is in communication with one or more input devices (e.g., a touch-sensitive surface a camera, a mouse, and/or a trackpad) and/or one or more output devices (e.g., one or more display generation components, speakers, and/or sensors (e.g., haptic sensors and/or light sensors)). Some operations in method 900 are, optionally, combined, the orders of some operations are, optionally, changed, and some operations are, optionally, omitted.

As described below, method 1200 provides an intuitive way for managing captured media for one or more media libraries. The method reduces the cognitive burden on a user for managing captured media for one or more media libraries, thereby creating a more efficient human-machine interface. For battery-operated computing devices, enabling a user to manage captured media for one or more media libraries faster and more efficiently conserves power and increases the time between battery charges.

While displaying, via the display generation component, a representation (e.g., 1030) of a field-of-view of the one or more cameras, the computer system detects (1202) a request (e.g., 1050*c*, 1050*d*1, 1050*e*1, and/or 1050*f*) (e.g., a tap gesture on a selectable user interface object for capturing media) (in some embodiments, a non-tap gesture (e.g., a press-and-hold gesture, a swipe gesture) directed to a selectable user interface object for capturing media) (e.g., via one or more input devices) to capture media corresponding to the field-of-view of the one or more cameras.

In response to detecting the request (e.g., 1050*c*, 1050*d*1, 1050*e*1, and/or 1050*f*) to capture the media corresponding to the field-of-view of the one or more cameras, the computer system captured (1204) a media item (e.g., photos media (e.g., a still photo and/or a portrait photo), video media, and/or an animated image media)) corresponding to the field-of-view of the one or more cameras.

After (and, in some embodiments, in response to) capturing (1206) the media item corresponding to the field-of-view of the one or more cameras and in accordance with a determination that the computer system is configured (e.g., currently configured) to share a collection of media items (e.g., collection of media items, as described above in relation to method 800 and FIGS. 6A-6AO) with a set of one or more other users (e.g., one or more users, as described above in relation to FIG. 6AD) (e.g., as discussed above in relation to FIGS. 10A-10N) and in accordance with a determination that a set of media-sharing criteria is satisfied (e.g., a set of shared-library criteria), the computer system automatically adds (1208) (e.g., without intervening user input after detecting the request to capture the media item) the media item (e.g., represented by 1012 of FIGS. 10E and 10G) to a shared collection (e.g., the collection of media items and/or another collection of media items (e.g., a designated collection of media items)) (e.g., collection of media items, as described above in relation to method 800) (e.g., a collection of media items that are associated with multiple accounts and/or multiple users and/or accessible by multiple accounts and/or multiple users) of media items (e.g., such that the media is shared with the set of one or more users and/or a different set of one or more users) (and, in some embodiments, without adding the media to a personal collection of media items). In some embodiments, adding the media to the respective collection of media items includes assigning the media item to the collection of media items.

After (and, in some embodiments, in response to) capturing (1206) the media item corresponding to the field-of-view of the one or more cameras and in accordance with a determination that the computer system is configured (e.g., currently configured) to share a collection of media items (e.g., collection of media items, as described above in relation to method 800 and FIGS. 6A-6AO) with a set of one or more other users (e.g., one or more users, as described above in relation to FIG. 6AD) (e.g., as discussed above in relation to FIGS. 10A-10N and in accordance with a determination that the set of media-sharing criteria is not satisfied, the computer system automatically adds (1210) (e.g., without intervening user input after detecting the request to capture the media item) the media item (e.g., represented by 1012 of FIGS. 10D and 10F) to a personal collection of media items (e.g., a collection of media items that are associated with one account and/or one user and/or accessible by one account and/or one user) without adding the media item to the shared collection of media items (e.g., and/or forgoes adding the media to the shared collection of media items). In some embodiments, after (and, in some embodiments, in response to) capturing the media corresponding to the field-of-view of the one or more cameras and in accordance with a determination that the computer system is not configured (e.g., currently configured) to share a collection of media items with the set of one or more other users, the computer system adds the media to the personal collection of media items without adding the media to the shared collection of media items (e.g., and/or forgoes adding the media to the shared collection of media items). In some embodiments, while displaying the representation of the field-of-view of the one or more cameras, the computer system displays a camera control region that includes a plurality of selectable user interface objects for camera capture modes. In some embodiments, one or more camera modes (e.g., video, photo/still, live photo (e.g., one or more images that are displayed in sequence (in some embodiments, a set of one or more of the images in the sequence were captured before the request to initiate capture was detected and one or more of the images in the sequence were captured after the request to initiate capture was detected), such as a media item that saved in the graphical interface file format), portrait, slow-motion, cinematic mode, and/or panoramic modes) has a plurality of settings (e.g., for a portrait capture mode: a studio lighting setting, a contour lighting setting, a stage lighting setting) with multiple values (e.g., levels of light for one or more (or all) settings) of the mode (e.g., portrait capture mode) that a camera (e.g., a camera sensor) is operating in to capture media (including post-processing performed automatically after capture). In this way, for example, capture modes are different from modes which do not affect how the camera operates when capturing media or do not include a plurality of settings (e.g., a flash mode having one setting with multiple values (e.g., inactive, active, auto)). In some embodiments, capture modes allow user to capture different types of media (e.g., photos or video) and the settings for one or more of the modes (or all) can be optimized to capture a particular type of media corresponding to a particular mode (e.g., via post processing) that has specified properties (e.g., shape (e.g., square, rectangle), speed (e.g., slow motion and/or time elapse), audio, and/or video). For example, when the computer system is configured to operate in a still photo capture mode, the one or more cameras of the computer system, when activated, captures media of a first type (e.g., rectangular photos) with particular settings (e.g., flash setting, and/or one or more filter settings); when the computer system is configured to operate in a square capture mode, the one or more cameras of the computer system, when activated, captures media of a second type (e.g., square photos) with particular settings (e.g., flash setting and/or one or more filters); when the computer system is configured to operate in a slow motion capture mode, the one or more cameras of the computer system, when activated, captures media that media of a third type (e.g., slow motion videos) with particular settings (e.g., flash setting, and/or frames per second capture speed); when the computer system is configured to operate in a portrait capture mode, the one or more cameras of the computer system captures media of a fifth type (e.g., portrait photos (e.g., photos with blurred backgrounds)) with particular settings (e.g., amount of a particular type of light (e.g., stage light, studio light, and/or contour light), f-stop, and/or blur); when the computer system is configured to operate in a panoramic capture mode, the one or more cameras of the computer system captures media of a fourth type (e.g., panoramic photos (e.g., wide photos) with particular settings (e.g., zoom, and/or amount of field to view to capture with movement). In some embodiments, when switching between capture modes, the display of the representation of the field-of-view changes to correspond to the type of media that will be captured by the capture mode (e.g., the representation is rectangular while the computer system is operating in a still photo capture mode and the representation is square while the computer system is operating in a square capture mode). Choosing whether to automatically add a media item to a shared collection of media items when prescribed conditions are satisfied allows the computer system to automatically add media items to a shared collection of media items in situations that are deemed appropriate and/or secure, which reduces the number of inputs needed to manually add appropriate media items to the shared collection of media items, enhances privacy/security of the computer system and/or collection of media items by allowing media items to be added to a shared collection of media items when certain conditions are satisfied, and performs an operation when a set of conditions has been met without requiring further user input.

In some embodiments, the set of media-sharing criteria includes a criterion that is satisfied when a determination is made that a second computer system (e.g., computer system of Kevin as described above in relation to FIG. 10D) corresponding to (e.g., of and/or belong to) a user (e.g., is associated with, belongs to, and/or is logged into an account or is being tracked as belong to) associated with the shared collection of media items (e.g., one of the users in the set of one or more users and/or one or more other users that are represented and/or included in the shared collection of media items) is currently within a predetermined distance (e.g., 0.1-100 meters) of the computer system (e.g., at the time at which the media item was captured). In some embodiments, the user (e.g., Kevin as described above in relation to FIG. 10D) associated with the shared collection of the media items is different from a user (e.g., John as described above in relation to FIG. 10D) of the computer system (e.g., 600). Choosing whether to automatically add a media item to a shared collection of media items when prescribed conditions are satisfied (e.g., whether a user who is sharing the share collection of media items is currently within a predetermined distance of the computer system) allows the computer system to automatically add media items to a shared collection of media items in situations that are deemed appropriate and/or secure, which reduces the number of inputs needed to manually add appropriate media items to the shared collection of media items, enhances privacy/security of the computer system and/or collection of media items by allowing media items to be added to a shared collection of media items when certain conditions are satisfied, and performs an operation when a set of conditions has been met without requiring further user input.

In some embodiments, the set of media-sharing criteria includes a criterion that is satisfied when a determination is made that an automatic-adding setting is enabled (e.g., 1040*c*) (e.g., a setting that, when enabled, configures the computer system to automatically add captured media to the shared collection of media items and a setting that, when disabled, configures the computer system to not automatically add captured media to the shared collection of media items). Choosing whether to automatically add a media item to a shared collection of media items when prescribed conditions are satisfied (e.g., whether a setting is enabled) allows the computer system to automatically add media items to a shared collection of media items in situations that are deemed appropriate and/or secure and allows a user of the computer system control over when the computer system is allowed to add media items to the shared collection of media items, which reduces the number of inputs needed to manually add appropriate media items to the shared collection of media items, enhances privacy/security of the computer system and/or collection of media items by allowing media items to be added to a shared collection of media items based on the a user's preference, performs an operation when a set of conditions has been met without requiring further user input, and provides additional control options without unnecessarily cluttering the user interface.

In some embodiments, the automatic-adding setting is enabled (e.g., 1040*c* and 654*a*) in response to detecting a request (e.g., 650*af*1, 650*ad*2, 650*ad*3, and/or 650*af*2) to share the shared collection of media items with the set of one or more other users (and/or as a part of an initial configuration process to set up sharing the shared collection of media items with the set of one or more users) (e.g., as further described above in relation to FIGS. 6A-6AO and method 800). Automatically enabling the automatic adding setting in response to detecting a request to share the shared collection of media items with the set of one or more users reduces the number of inputs needed for a user to enable the setting at a later time, which reduces the number of inputs needed to perform an operation.

In some embodiments, a first control (e.g., 1040*c* and 654*a*) that, when selected, causes the automatic-adding setting to be enabled or disabled is displayed during a first set-up process (e.g., an initial set up process) to share the shared collection of media items with the set of one or more other users. In some embodiments, the first control is displayed at a computer system (e.g., 600) associated with a user (e.g., a user that organized and/or originally set up the shared collection of media items to be shared) that initially requested the shared collection of media items to be shared with the set of one or more other users (e.g., as described above in relation to FIG. 6AF). Displaying the first control during a set up process and at a computer system associated with a user that initially requested the shared collection of media items to be shared with the set of one or more users provides the user with control over the computer system by allowing the user to adjust the setting as desired to enable or disable the adding of media to the shared collection of media items and reduces the number of inputs needed to adjust the setting later, which provides additional control options without unnecessarily cluttering the user interface and reduces the number of inputs needed to perform an operation.

In some embodiments, a second control (e.g., 654*a* and/or 1040*c*) that, when selected, causes the automatic-adding setting to be enabled or disabled is displayed during a second set-up process (e.g., an initial set up process) to share the shared collection of media items with the set of one or more other users. In some embodiments, the second control (e.g., 654*a* and/or 1040*c*) is displayed at a computer system associated with a user (e.g., a participant user and not the user that organized and/or originally set up the shared collection of media items to be shared) in the set of one or more other users that did not initially request the shared collection of media items to be shared with the set of one or more users (e.g., users who were invited to share in a collection that was originated by a different, originating user) (e.g., as described above in relation to FIG. 6AF and FIG. 6AK). Displaying the second control during a set up process and at a computer system associated with a user that did not initially requested the shared collection of media items to be shared with the set of one or more users provides the user with control over the computer system by allowing the user to adjust the setting as desired to enable or disable the adding of media to the shared collection of media items and reduces the number of inputs needed to adjust the setting later, which provides additional control options without unnecessarily cluttering the user interface and reduces the number of inputs needed to perform an operation.

In some embodiments, the computer system is not configured to automatically add the media to the shared collection of media items (and/or is configured to automatically add the media item to the personal collection of media items without adding the media to the shared collection of media items) before detecting the request (e.g., 1050*c*, 1050*d*1, 1050*e*1, and/or 1050*f*) to capture the media corresponding to the field-of-view of the one or more cameras. In some embodiments, before detecting the request (e.g., 1050*c*, 1050*d*1, 1050*e*1, and/or 1050*f*) to capture the media corresponding to the field-of-view of the one or more cameras (and while displaying the representation of the field-of-view of the one or more cameras), the computer system displays a first automatic sharing control. In some embodiments, while displaying the first automatic sharing control (e.g., 1002*b*), the computer system detects an input (e.g., 1050*e*) (e.g., a tap input or, in some embodiments, a non-tap input (e.g., a dragging input, a mouse click, a gaze input, and/or a press-and-hold input)) directed to the first automatic sharing control. In some embodiments, in response to detecting the input directed to the first automatic sharing control, the computer system configures the computer system to automatically add captured media to the shared collection of media items in response to detecting a first respective request (e.g., 1050*c*, 1050*d*1, 1050*e*1, and/or 1050*f*) to capture media. In some embodiments, the computer system is configured to automatically add captured media to the shared collection of media items in response to detecting the first respective request to capture media (and, in some embodiments, to any requests to capture media that also meet the set of media-sharing criteria) (and, in some embodiments, in accordance with the set of media-sharing criteria being satisfied) for as long as a first set of automatic reversion criteria are not met. In some embodiments, in accordance with a determination that the first set of automatic reversion criteria are not met, the computer system continues to be configured to automatically add captured media to the shared collection of media items in response to detecting the first respective request to capture media. In some embodiments, in accordance with a determination that the first set of automatic reversion criteria are met, the computer system is transitioned from being configured to automatically add captured media to the shared collection of media items in response to detecting the first respective request to capture media to being configured to not automatically add captured media to the shared collection of media items in response to detecting the request to capture media (and/or to be configured to automatically add the media item to the personal collection of media items without adding the media to the shared collection of media items). Configuring the computer system to automatically add captured media to the shared collection of media items in response to detecting a first respective request to capture media allows the user control over whether or not the computer system is configured to automatically add media items to the shared collection of media items, which provides additional control options without unnecessarily cluttering the user interface and enhances privacy/security of the computer system and/or collection of media items by allowing the user to have control over the sharing of media items.

In some embodiments, the first set of automatic reversion criteria includes a criterion that is satisfied when a determination is made that a predetermined period of time has passed since the computer system was configured to automatically add captured media to the shared collection of media items (e.g., in response to detecting a respective request to capture media) in response to detecting the input directed to the first automatic sharing control (and, in some embodiments, and in accordance with the set of media-sharing criteria being satisfied) (e.g., as described above in relation to FIGS. 10E-10F). Configuring the computer system to automatically add captured media to the shared collection of media items for as a long as a predetermined period of time has passed reduces the number of inputs needed for the user to revert the computer system back to not automatically add captured media to the shared collection of media items in response to detecting the first respective request to capture media and improves privacy/security of the media items by reverting back to the original setting after a certain amount of time has passed to prevent the computer system from unintended sharing of media items, which reduces the number of inputs needed to perform an operation and enhances privacy/security of the computer system and/or collection of media items.

In some embodiments, the first set of automatic reversion criteria includes a criterion that is satisfied when a determination is made that the computer system is within a first proximity (e.g., determined based on the location (e.g., a GPS location and/or a coordinate location) of and/or associated with the computer system being a predetermined distance (e.g., 0.1-150 meters) away from the excluded location and/or determined based on the signal strength (e.g., via ranging via Bluetooth and/or non-triangulation via Wi-Fi) of the computer system and/or a device (e.g., a router and/or Bluetooth device) at the excluded location) of a first excluded location (e.g., as indicated by 1040*a*-1040*b*) (e.g., as described above in relation to FIG. 10G) (and/or one or more excluded locations) (e.g., an unpermitted location and/or a location that has been restricted/excluded by a user) (e.g., home and/or work). In some embodiments, a location can be excluded, such as home and/or work (e.g., the automatic determination as to whether or not to add captured media to a shared collection of media items is disabled when a user is inside the home and/or workplace of the user). Configuring the computer system to automatically add captured media to the shared collection of media items for as a long as the computer system is not within a first proximity of an excluded location reduces the number of inputs needed for the user to revert the computer system back to not automatically add captured media to the shared collection of media items in response to detecting the first respective request to capture media and improves privacy/security of the media items by reverting back to the original setting when the computer system is at the excluded location to prevent the computer system from unintended sharing of media items, which reduces the number of inputs needed to perform an operation and enhances privacy/security of the computer system and/or collection of media items.

In some embodiments, the first set of automatic reversion criteria includes a criterion that is satisfied when a determination is made that the computer system is within a second proximity (e.g., determined based on the location (e.g., a GPS location and/or a coordinate location) of and/or associated with the computer system being a predetermined distance (e.g., 0.1-150 meters) away from a location of and/or associated with the third computer system and/or determined based on the signal strength (e.g., via ranging via Bluetooth and/or non-triangulation via Wi-Fi) of the computer system and/or the third computer system (e.g., a smartphone, a desktop computer, a laptop, a tablet, or a head mounted device (e.g., a head mounted augmented reality and/or extended reality device)) of a third computer system (e.g., computer system of Kevin in FIGS. 10A-10N) (e.g., different from the computer system) that is associated with (e.g., belongs to and/or of) at least one user (e.g., different from the user of the computer system) in the set of one or more other users (e.g., as described above in relation to FIG. 10G). Configuring the computer system to automatically add captured media to the shared collection of media items for as a long as the computer system is within a second proximity of a third computer system reduces the number of inputs needed for the user to revert the computer system back to not automatically add captured media to the shared collection of media items in response to detecting the first respective request to capture media and improves privacy/security of the media items by reverting back to the original setting when the computer system is not within the second proximity of a user with which the shared collection of media items is being shared, which reduces the number of inputs needed to perform an operation and enhances privacy/security of the computer system and/or collection of media items.

In some embodiments, a determination of whether the computer system is within the second proximity of the third computer system is based on communication (e.g., wireless communication (e.g., Near-field communication, Bluetooth and/or Wi-Fi)) between the computer system and the third computer system (e.g., computer system of Kevin in FIGS. 10A-10N) (e.g., as described above in relation to FIG. 10G).

In some embodiments, the computer system (e.g., 600) is configured to automatically add the media to a shared collection of media items (and/or is configured to automatically add the media item to the personal collection of media items without adding the media to the shared collection of media items)) before detecting the request (e.g., 1050*c*, 1050*d*1, 1050*e*1, and/or 1050*f*) to capture the media corresponding to the field-of-view of the one or more cameras. In some embodiments, before detecting the request to capture the media corresponding to the field-of-view of the one or more cameras (and while displaying the representation of the field-of-view of the one or more cameras), the computer system displays a second automatic sharing control (e.g., 1002*e*). In some embodiments, while displaying the second automatic sharing control, the computer system detects an input (e.g., a tap input or, in some embodiments, a non-tap input (e.g., a dragging input, a mouse click, a gaze input, and/or a press-and-hold input)) directed to a second automatic sharing control (e.g., as described above in relation to FIG. 10E). In some embodiments, in response to detecting the input directed to the second automatic sharing control, the computer system configures the computer system to not automatically add captured media to the shared collection of media items in response to detecting a second respective request (e.g., 1050*c*, 1050*d*1, 1050*e*1, and/or 1050*f*) to capture media (e.g., and/or automatically add the media to a personal collection of media items without adding the media to the shared collection of media items in response to detecting the request to capture the media corresponding to the field-of-view of the one or more cameras) (e.g., as described above in relation to FIG. 10E). In some embodiments, the computer system is configured to not automatically add captured media to the shared collection of media items in response to detecting the second respective request to capture media for as long as a second set of automatic reversion criteria are not met. In some embodiments, in accordance with a determination that the second set of automatic reversion criteria are not met, the computer system continues to be configured to not automatically add captured media to the shared collection of media items (and/or to be configured to automatically add the media item to the personal collection of media items without adding the media to the shared collection of media items) in response to detecting the second respective request to capture media. In some embodiments, in accordance with a determination that the second set of automatic reversion criteria are met, the computer system is transitioned from being configured to not automatically add captured media to the shared collection of media items (and/or to be configured to automatically add the media item to the personal collection of media items without adding the media to the shared collection of media items) in response to detecting the second respective request to capture media to being configured to automatically add captured media to the shared collection of media items in response to detecting the request to capture media. Configuring the computer system to not automatically add captured media to the shared collection of media items in response to detecting a second respective request to capture media allows the user control over whether or not the computer system is configured to automatically add media items to the shared collection of media items, which provides additional control options without unnecessarily cluttering the user interface and enhances privacy/security of the computer system and/or collection of media items by allowing the user to have control over the sharing of media items.

In some embodiments, the second set of automatic reversion criteria includes a criterion that is satisfied when a determination is made that a predetermined period of time has passed since the computer system (e.g., 600) was configured to not automatically add captured media to the shared collection of media items (e.g., in response to detecting a respective request to capture media) in response to detecting the input directed to the second automatic sharing control (e.g., as described above in relation to FIG. 10F). Configuring the computer system to not automatically add captured media to the shared collection of media items for as a long as a predetermined period of time has passed reduces the number of inputs needed for the user to revert the computer system back to automatically add captured media to the shared collection of media items in response to detecting the first respective request to capture media and improves privacy/security of the media items by reverting back to the original setting after a certain amount of time has passed, which reduces the number of inputs needed to perform an operation and enhances privacy/security of the computer system and/or collection of media items.

In some embodiments, the first set of automatic reversion criteria includes a criterion that is satisfied when a determination is made that a third location associated with (e.g., of) the computer system is not a predetermined distance (e.g., 0.1-150 meters) away from a fourth location (e.g., as described above in relation to FIG. 10F) (e.g., a location associated with (e.g., of) a fourth computer system that is associated with (e.g., belongs to and/or of) at least one user (e.g., different from the user of the computer system) in the set of one or more other users and/or an excluded location). In some embodiments, a determination of whether the third location is (or is not) a predetermined distance away from the fourth location is based on communication (e.g., wireless communication (e.g., Bluetooth and/or Wi-Fi)) between the computer system and the fourth computer system. In some embodiments, the first set of automatic reversion criteria includes a criterion that is satisfied when a determination is made that the computer system is not location at and/or within a predetermined distance of an excluded location. Configuring the computer system to not automatically add captured media to the shared collection of media items for as a long as the computer system is not a predetermined distance away from a location reduces the number of inputs needed for the user to revert the computer system back to automatically add captured media to the shared collection of media items in response to detecting the first respective request to capture media and improves privacy/security of the media items by reverting back to the original setting after a certain amount of time has passed, which reduces the number of inputs needed to perform an operation and enhances privacy/security of the computer system and/or collection of media items.

In some embodiments, while the set of media-sharing criteria is satisfied, the computer system is configured to operate in a first mode (e.g., mode in 10E as indicated by 1002*b* or mode in 10F as indicated by 1002*e*) (e.g., a mode that corresponds to automatically adding media to the shared collection in response to detecting the request to capture the media corresponding to the field-of-view of the one or more cameras, or a mode that corresponds to not automatically adding media to the shared collection (and/or automatically adding the media to a personal collection of media items without adding the media to the shared collection of media items in response to detecting the request to capture the media) in response to detecting the request to capture the media corresponding to the field-of-view of the one or more cameras) without operating in a second mode (e.g., mode in 10E as indicated by 1002*b* or mode in 10F as indicated by 1002*e*) (e.g., a mode that corresponds to automatically adding media to the shared collection in response to detecting the request to capture the media corresponding to the field-of-view of the one or more cameras, or a mode that corresponds to not automatically adding media to the shared collection (and/or automatically adding the media to a personal collection of media items without adding the media to the shared collection of media items in response to detecting the request to capture the media) in response to detecting the request to capture the media corresponding to the field-of-view of the one or more cameras) that is different from (e.g., opposite from and/or an opposing mode) the first mode. In some embodiments, while the computer system is operating in the first mode (e.g., and while the representation of the field-of-view is displayed), the computer system detects an occurrence of a set of conditions for configuring the computer system to operate in the second mode (e.g., as described above in relation to FIGS. 10B-10G). In some embodiments, as a part of detecting the set of conditions for configuring the computer system to operate in the second mode, the computer system detects that the set of media-sharing criteria is no longer satisfied or has been satisfied (e.g., without detecting one or more inputs (e.g., one or more physical inputs and/or inputs directed to the directed to and/or on the display generation component and/or display)) (e.g., other user is nearby or ceases to be nearby). In some embodiments, as a part of detecting the set of conditions for configuring the computer system to operate in the second mode, the computer system detects one or more inputs directed to a control that causes the computer system to be transition from being configured to operate in the first mode to being configured to operate in the second mode. In some embodiments, in response to detecting the set of conditions for configuring the computer system to operate in the second mode, the computer system configures (e.g., automatically without user input) the computer system to operate in the second mode without operating in the first mode (e.g., as described above in relation to FIGS. 10B-10G). Configuring the computer system to operate in the second mode without operating in the first mode in response to detecting the set of conditions for configuring the computer system to operate in the second mode allows the computer system to switch between being configured to automatically add capture media and not configured to automatically add capture media to the shared collection of media items, which performs an operation when a set of conditions has been met without requiring further user input, reduces the number of inputs needed to perform an operation, and enhances privacy/security of the computer system and/or the collection of media items (e.g., based on whether certain conditions are satisfied).

In some embodiments, the set of conditions for configuring the computer system to operate in the second mode is detected when a determination is made that a set of automatic conditions (e.g., a condition that is not determined based on user input that is directed to a control that, when selected, causes the computer system to be transitioned between operating in the first mode and the second mode) has occurred (e.g., as described above in relation to FIGS. 10C-10D). In some embodiments, the set of automatic conditions occurs at least when a determination is made (e.g., without the occurrence of a manual input) that the set of media-sharing criteria has changed from no longer being satisfied to being satisfied or the set of media-sharing criteria has changed from being satisfied to no longer being satisfied (e.g., as described above in relation to FIGS. 10C-10D). Configuring the computer system to operate in the second mode without operating in the first mode in response to detecting the set of conditions for configuring the computer system to operate in the second mode allows the computer system to automatically switch between being configured to automatically add capture media and not configured to automatically add capture media to the shared collection of media items, which performs an operation when a set of conditions has been met without requiring further user input, reduces the number of inputs needed to perform an operation, and enhances privacy/security of the computer system and/or the collection of media items (e.g., based on whether certain conditions are satisfied).

In some embodiments, in response to detecting the set of conditions for configuring the computer system to operate in the second mode. In some embodiments, the set of conditions for configuring the computer system to operate in the second mode was detected because a determination was made that the set of automatic conditions has occurred (e.g., as described above in relation to FIGS. 10C-10D), the computer system displays, via the display generation component, a first banner indication (e.g., 1044) (e.g., a banner notification that is displayed along the side (e.g., top, bottom, left, and/or right) of the display and/or display generation component of the computer system) that the computer system is operating in the second mode that is different from the first mode (e.g., the computer system has been transitioned between being configured to automatically add captured media to the shared collection of media items and not being configured to automatically add captured media to a shared collection of media items in response to detecting the request to capture the media corresponding to the field-of-view of the one or more cameras (and/or is operating in the second mode)). In some embodiments, in response to detecting a request to configure the computer system to operate in the second mode that is different from the first mode, the computer system is configured to operate in the second mode without operating in the first mode. Displaying, via the display generation component, a first banner indication that the computer system is operating in the second mode that is different from the first mode in response to detecting the set of conditions for configuring the computer system to operate in the second mode provides visual feedback to the user regarding if media items are being added to the shared collection of media items and enhances privacy/security by allowing the user to be informed in order to reduce the unintended sharing of media, which provides improved visual feedback and enhances privacy/security of the computer system and/or the collection of media items (e.g., based on whether certain conditions are satisfied).

In some embodiments, the set of conditions for configuring the computer system to operate in the second mode is detected when a determination is made that a set of manual conditions (e.g., a condition that is not determined based on user input that is directed to a control that, when selected, causes the computer system to be transitioned between operating in the first mode and the second mode) has occurred (e.g., as described above in relation to FIGS. 10E-10F). In some embodiments, the set of manual conditions occur at least when a determination is made that an input (e.g., 1050*e*2) (e.g., a tap input or, in some embodiments, a non-tap input (e.g., a dragging input, a mouse click, a gaze input, and/or a press-and-hold input)) has been detected that is directed to a control that, when selected, causes the computer system to be transitioned between operating in the first mode and the second mode (e.g., as described above in relation to FIGS. 10E-10F). In some embodiments, the computer system, in response to detecting the set of conditions for configuring the computer system to operate in the second mode, where the set of conditions for configuring the computer system to operate in the second mode was detected because a determination was made that the set of manual conditions has occurred (e.g., as described above in relation to FIGS. 10E-10F), forgoes displaying, via the display generation component, a second banner indication (e.g., 1044) (e.g., a banner notification that is displayed along the side (e.g., top, bottom, left, and/or right) of the display and/or display generation component of the computer system) that the computer system is operating in the second mode. Not displaying a banner indication that the computer system is operating in the second mode when prescribed conditions are met allows the computer system to forgo display of notification in certain situations and reduces the amount of clutter on the user interface, performs an operation when a set of conditions has been met without requiring further user input and provides additional control options without unnecessarily cluttering the user interface.

In some embodiments, after capturing the media corresponding to the field-of-view of the one or more cameras (e.g., 1030), the computer system detects a request (e.g., 1050*g*) to display a camera roll user interface (e.g., the user interfaces of FIGS. 10H-10I and 10K-10L). In some embodiments, in response to detecting the request (e.g., 1050*g*) to display the camera roll user interface and in accordance with a determination that a most recent media item that was captured was added to the shared collection of media items, the computer system displays, via the display generation component, the camera roll user interface (e.g., the user interfaces of FIGS. 10H-10I and 10K-10L) in a shared-library view that includes a plurality of representations of media items from the shared collection of media items (without, in some embodiments, including representations of media items (non-duplicated media items) from the personal collection of media items). Displaying, via the display generation component, the camera roll user interface in a shared-library view when prescribed conditions are met allows the computer system to automatically direct the user to a respective user interface that is likely to be relevant and reduces the amount of inputs needed for the user to manually navigate to the respective user interface, which reduces the amount of inputs needed to perform an operation and performs an operation when a set of conditions has been met without requiring further user input.

In some embodiments, in response to detecting the request (e.g., 1050*d*2) to display the camera roll user interface and in accordance with a determination that the most recent media item that was captured was not added to the shared collection of media items (and/or was added to the personal collection of media items), the computer system displays, via the display generation component, the camera roll user interface (e.g., the user interfaces of FIGS. 10H-10I and 10K-10L) in a most recent view (e.g., personal library view, shared library view, and/or a library view that includes media items from the personal collection of media items and media items from the shared collection of media items) in which the camera roll user interface was previously displayed (e.g., before the camera user interface that includes the shutter control and/or media capture control was displayed and/or before the request to capture media was detected) (e.g., as described above in relation to FIG. 10H). Displaying, via the display generation component, the camera roll user interface in a most recent view in which the camera roll user interface was displayed when prescribed conditions are met allows the computer system to automatically direct the user to a respective user interface that is likely to be relevant and reduces the amount of inputs needed for the user to manually navigate to the respective user interface, which reduces the amount of inputs needed to perform an operation and performs an operation when a set of conditions has been met without requiring further user input.

In some embodiments, in response to detecting the request (e.g., 1050*d*2) to display the camera roll user interface and in accordance with a determination that the most recent media item that was captured was not added to the shared collection of media items (and/or was added to the personal collection of media items), the computer system displays, via the display generation component, the camera roll user interface (e.g., the user interfaces of FIGS. 10H-10I and 10K-10L) in a personal library view that includes a plurality of representations of media items from the personal collection of media items (without, in some embodiments, including representations of media items (non-duplicated media items) from the shared collection of media items). Displaying, via the display generation component, the camera roll user interface in a personal library view that includes a plurality of representations of media items from the personal collection of media items are met allows the computer system to automatically direct the user to a respective user interface that is likely to be relevant and reduces the amount of inputs needed for the user to manually navigate to the respective user interface, which reduces the amount of inputs needed to perform an operation and performs an operation when a set of conditions has been met without requiring further user input.

In some embodiments, before displaying, via the display generation component, the representation of a field-of-view of the one or more cameras, the computer system detects a request (e.g., 1050) to launch a camera application (e.g., detecting an input (e.g., a tap input or, in some embodiments, a non-tap input (e.g., a dragging input, a mouse click, a gaze input, and/or a press-and-hold input)) that is directed to a camera application icon) (e.g., as described above in relation to FIGS. 10B-10C). In some embodiments, in response to detecting the request (e.g., 1050) to launch the camera application, the computer system displays, via the display generation component, a camera application user interface that includes the representation of the field-of-view (e.g., 1030) of the one or more cameras and an indication (e.g., 1002*b* and/or 1002*bb*) that captured media will be automatically added to the personal collection of media items without being added to the shared collection of media items in response to detecting a third respective request (e.g., 1050*c*, 1050*d*1, 1050*e*1, and/or 1050*f*) to capture media. Displaying, via the display generation component, a camera application user interface that includes the representation of the field-of-view of the one or more cameras and an indication that captured media will be automatically added to the personal collection of media items without being added to the shared collection of media items in response to detecting the request to launch the camera application enhances the privacy/security of the computer system by defaulting to adding media items to the personal collection of media items and not the shared collection of media items.

In some embodiments, the set of media-sharing criteria includes a criterion that is satisfied when a determination is made that the computer system is within a third proximity (e.g., determined based on the location (e.g., a GPS location and/or a coordinate location) of and/or associated with the computer system being a predetermined distance (e.g., 0.1-150 meters) away from the excluded location and/or determined based on the signal strength (e.g., via ranging via Bluetooth and/or non-triangulation via Wi-Fi) of the computer system and/or a device (e.g., a router and/or Bluetooth device) at the excluded location) of a second excluded location (e.g., 1040*a* and/or 1040*b*) (e.g., as described above in relation to FIG. 10G) (and/or one or more excluded locations) (e.g., an unpermitted location and/or a location that has been restricted/excluded by a user) (e.g., home and/or work). In some embodiments, a location can be excluded, such as home and/or work (e.g., the automatic determination as to whether or not to add captured media to a shared collection of media items is disabled when a user is inside the home and/or workplace of the user). Automatically adding captured media to the shared collection of media items when a determination is made that the computer system is at an excluded location allows the computer system to automatically add captured media to the shared collection of media items based on the location of the computer system, which performs an operation when a set of conditions has been met without requiring further user input and enhances privacy/security of the computer system.

In some embodiments, the second location includes at least one of a home location (e.g., a location (e.g., a known location) that corresponds to the home of the user) and a work location (e.g., a location (e.g., a known location) that corresponds to work location of the user of the computer system) (e.g., for the user of the computer system) (e.g., as indicated by 1040*a* and/or 1040*b*) (e.g., as described above in relation to FIG. 10G).

In some embodiments, the computer system displays a user interface that includes a setting (e.g., 1040*a* and/or 1040*b*) (e.g., on the computer system and/or a setting for the computer system) for ceasing the automatic adding of captured media to the shared collection of media. In some embodiments, the setting for ceasing the automatic adding is enabled. In some embodiments, while displaying the setting for ceasing the automatic adding to the shared collection of media and while the setting for ceasing the automatic adding to the shared collection of media is enabled, the computer system detects an input (e.g., a tap input or, in some embodiments, a non-tap input (e.g., a dragging input, a mouse click, a gaze input, and/or a press-and-hold input)) directed to the setting for ceasing the automatic adding to the shared collection of media (e.g., as described above in relation to FIGS. 10A and 10G). In some embodiments, in response to detecting the input directed to the setting for ceasing the automatic adding to the shared collection of media items, the computer system disables the setting for ceasing the automatic adding to the shared collection of media items (e.g., as described above in relation to FIGS. 10A and 10G). In some embodiments, the computer system displays a user interface that includes one or more settings; and in response to detecting an input directed to the one or more settings, adds, or removes a location (e.g., a location selected by the user or predetermined locations such as work and/or home) from the one or more locations. In some embodiments, in response to detecting an input directed to the one or more settings, the computer system disables the setting for ceasing the automatic adding of captured media to the shared collection of media items. In some embodiments, the computer system makes the determination that the computer system is not at one or more locations when a setting for ceasing the automatic adding of captured media to the shared collection of media items. In some embodiments, when the setting for ceasing the automatic adding is enabled, the media-sharing criteria is not satisfied when a determination is made that the computer system is not located at one or more locations. In some embodiments, when the setting for ceasing the automatic adding is disabled, the media-sharing criteria is satisfied irrespective of whether a determination is made that the computer system is not located at one or more locations. Disabling the setting for ceasing the automatic adding to the shared collection of media items in response to detecting the input directed to the setting for ceasing the automatic adding to the shared collection of media items provides the user with more control over the computer system to impact the computer system's ability to automatically add captured media to the shared collection of media items while the computer system is located at one or more particular locations, which performs an operation when a set of conditions has been met without requiring further user input and enhances privacy/security of the computer system.

In some embodiments, after capturing the media corresponding to the field-of-view of the one or more cameras, the computer system displays, via the display generation component, a user interface (e.g., the user interfaces of FIGS. 10H-10I and 10K-10L) that includes a first plurality (e.g., 712) of previously captured media items. In some embodiments, the first plurality of previously captured media items includes the media item. In some embodiments, while displaying, via the display generation component, the first plurality of previously captured media items that includes the media item, the computer system: in accordance with a determination that the media item is added to the shared collection of media items, displays, via the display generation component, an indication (e.g., 1070*b*) that the media item is added to the shared collection of media items (and, in some embodiments, concurrently with a representation of the media item); and in accordance with a determination that the media item is not added to the shared collection of media items (and/or was added to the personal collection of media items), displays, via the display generation component, an indication (e.g., 1070*a*) that the media item is added to the personal collection of media items (and, in some embodiments, concurrently with a representation of the media item). Displaying, via the display generation component, an indication that the media item is added to the shared collection of media items or displaying, via the display generation component, an indication that the media item is added to the personal collection of media items based on prescribed conditions provides the user with visual feedback concerning the collection of media item to which the media item has been added.

In some embodiments, while displaying, via the display generation component, the first plurality of previously captured media items that includes the media item, the computer system detects a first input (e.g., 1050*i*1) (e.g., a tap input or, in some embodiments, a non-tap input (e.g., a dragging input, a mouse click, a gaze input, and/or a press-and-hold input)) that is directed to the media item. In some embodiments, in response to detecting the first input that is directed to the media item, the computer system displays, via the display generation component, an enlarged view (e.g., 1024*i*) (e.g., version and/or representation) of the media item; and forgoes display of (and/or, in some embodiments, ceasing to display) the indication (e.g., 1070*a* and/or 1070*b*) that the media item is added to the shared collection of media items and forgoing display of (and/or, in some embodiments, ceasing to display) the indication that the media item is added to the personal collection of media items.

In some embodiments, after capturing the media corresponding to the field-of-view of the one or more cameras, the computer system displays, via the display generation component, a user interface that includes a second plurality of previously captured media items (e.g., 712). In some embodiments, the second plurality of previously captured media items includes the media item. In some embodiments, while displaying, via the display generation component, the user interface that includes the second plurality of previously captured media items that includes the media item, the computer system detects a second input (e.g., 1050*i*1) (e.g., a tap input or, in some embodiments, a non-tap input (e.g., a dragging input, a mouse click, a gaze input, and/or a press-and-hold input)) the user interface that includes the second plurality of previously captured media items. In some embodiments, in response to detecting the second input (e.g., **1050*i*1 and/or as described above in relation to FIGS. 10I and 10K-10L) the user interface that includes the second plurality of previously captured media items, the computer system: in accordance with a determination that the media item is added to the shared collection of media items, displays a control (e.g., 1090*a*) that, when selected, causes the computer system to move the media item from the shared collection of media items to the personal collection of media items; and in accordance with a determination that the media item is added to the shared collection of media items, displays a control (e.g., 1090*b***) that, when selected, causes the computer system to move the media item from the personal collection of media items to the shared collection of media items. Displaying a control that, when selected, causes the computer system to move items between the shared collection of media items and the personal collection of media items provides the user with control concerning the collection of media items to which the media item is added, which performs an operation when a set of conditions has been met without requiring further user input and enhances privacy/security of the computer system.

In some embodiments, after capturing the media corresponding to the field-of-view of the one or more cameras, the computer system displays, via the display generation component, a respective user interface (e.g., as described above in relation to FIGS. 11D and 11E-11F) that includes media items that have been curated based on one or more characteristics of a user of the computer system (e.g., as described above in relation to FIGS. 11D and 11E-11F). In some embodiments, the respective user interface includes a plurality of media items that are recommended to be shared (e.g., with the set of one or more other users) (e.g., using one or more techniques as described above in relation to FIGS. 6A-6AO and method 800). In some embodiments, the plurality of media items that are recommended to be shared with the set of one or more users includes the media item. In some embodiments, the computer system displays the plurality of media items that are recommended to be shared at the top and/or bottom of the respective user interface. Displaying, via the display generation component, a respective user interface that includes media items that have been curated based on one or more characteristics of a user of the computer system, where the respective user interface includes a plurality of media items that are recommended to be shared provides the user with visual feedback concerning media items that are recommended to be added to the shared collection of media items, which provides improved visual feedback and reduces the number of operations needed to select the recommend media items.

In some embodiments, while displaying the respective user interface including the plurality of media items that are recommended to be shared with the set of one or more other users, the computer system detects a request to share the plurality of media items that are recommended to be shared (e.g., as described above in relation to FIGS. 11H-11J). In some embodiments, in response to detecting the request to share the plurality of media items that are recommended to be shared, the computer system adds one or more media items in the plurality of media items that are recommended to be shared to the shared collection of media items (e.g., as described above in relation to FIGS. 11H-11J); and ceases to display the plurality of media items that are recommended to be shared (e.g., as described above in relation to FIGS. 11H-11J). Adding one or more media items in the plurality of media items that are recommended to be shared to the shared collection of media items and ceasing to display the plurality of media items that are recommended to be shared in response to detecting the request to share the plurality of media items that are recommended to be shared provides the user with control over the media items that are added to the shared collection of media items, which provides additional control options without unnecessarily cluttering the user interface.

In some embodiments, detecting the request to share the plurality of media items that are recommended to be shared includes detecting a request (e.g., **1150*f*2**) to share a subset of the plurality of media items that are recommended to be shared. In some embodiments, the one or more media items that are added to the shared collection of media items (and/or one or more media items in the plurality of media items that are recommended to be shared) is a subset of the plurality of media items that are recommended to be shared to the shared collection of media items.

In some embodiments, detecting the request to share the plurality of media items that are recommended to be shared includes detecting a request (e.g., **1050*f*1**) to share all of the plurality of media items that are recommended to be shared. In some embodiments, the one or more media items that are added to the shared collection of media items (and/or one or more media items in the plurality of media items that are recommended to be shared) are all of the plurality of media items that are recommended to be shared to the shared collection of media items (and/or the one or more media items in the plurality of media items that are recommended to be shared are all of the plurality of media items that are recommended to be shared to the shared collection of media items).

In some embodiments, while displaying the respective user interface including the plurality of media items that are recommended to be shared with the set of one or more other users, the computer system displays a control (e.g., in menu control **634*c*) for clearing media items that are recommended to be shared. In some embodiments, while displaying a control for clearing media items that are recommended to be shared, the computer system detects an input (e.g., an input that includes 1050*f*3 and/or 1050*h*3) (e.g., a tap input or, in some embodiments, a non-tap input (e.g., a dragging input, a mouse click, a gaze input, and/or a press-and-hold input)) directed to the control for clearing media items that are recommended to be shared. In some embodiments, in response to detecting the input directed to the control for clearing media items that are recommended to be shared, the computer system ceases to display the plurality of media items (e.g., 1140*a* and/or 1140*b***) that are recommended to be share. Ceasing to display the plurality of media items that are recommended to be share in response to detecting the input directed to the control for clearing media items that are recommended to be shared provides the user with control over display of the recommendation media items, which provides additional control options without unnecessarily cluttering the user interface.

In some embodiments, after capturing the media corresponding to the field-of-view of the one or more cameras (e.g., as described above in relation to FIGS. 11A-11C) and in accordance with a determination that a set of notification criteria is satisfied. In some embodiments, the set of notification criteria includes a determination that additional media items in a media library (e.g., the personal collection of media items and/or another sharing of media items) of the user of the computer system (e.g., an organizer of the shared collection of media items and/or a participant in the collection of shared media items) satisfy a set of criteria for sharing in the shared collection of media items (e.g., using one or more techniques discussed in relation to methods 800 and/or 900), the computer system displays, via the one or more output devices, a notification (e.g., 1112 and/or 1114) indicating that a suggested set of media items (e.g., the additional media items) are suggested for addition to the shared collection of media items. In some embodiments, the suggested set of media items include the media item. In some embodiments, in accordance with a determination that the set of notification criteria is not satisfied, the computer system forgoes displaying the notification indicating that the suggested set of media items are suggested for addition to the collection of media items. In some embodiments, the set of notification criteria includes a determination of whether a period of time has passed (e.g., a week, a month, and/or a day) (e.g., providing a notification indicating suggested media items for addition to the shared library is periodic) since the last suggested set of media items were provided and/or the set of notification criteria is periodically (e.g., daily, weekly, and/or monthly) satisfied based on an interval (e.g., a display, week, and/or month) of time. Displaying, via the one or more output devices, a notification indicating that a suggested set of media items are suggested for addition to the shared collection of media items provides the user with visual feedback concerning media items that are recommended to be added to the shared collection of media items, which provides improved visual feedback (e.g., periodically) and reduces the number of operations needed to select the recommend media items.

In some embodiments, the set of notification criteria includes a criterion that is satisfied when a determination is made that at least a threshold number (e.g., greater than 10-100) (e.g., a predetermined threshold) of additional media items satisfy the set of criteria for sharing in the shared collection of media items (e.g., as described above in relation to FIGS. 11A-11C). Displaying, via the one or more output devices, a notification indicating that a suggested set of media items are suggested for addition to the shared collection of media items when a determination is made that at least a threshold number of additional media item satisfy the set of criteria for sharing in the shared collection of media items allows the computer system to automatically provide visual back concerning recommended media items without cluttering the user interface, which performs an operation when a set of conditions has been met without requiring further user input.

In some embodiments, the set of notification criteria includes a criterion that is satisfied when a determination is made that a previous set of additional media items have not been added to the shared collection of media items for at least a threshold period of time (e.g., as described above in relation to FIGS. 11A-11C) (e.g., one or more days, months, and/or weeks) (e.g., a predetermined threshold). In some embodiments, the of notification criteria includes a criterion that is satisfied when a determination is made that a respective notification indicating that a respective suggested set of media items has not been displayed and/or provided for at least the threshold period of time. Displaying, via the one or more output devices, a notification indicating that a suggested set of media items are suggested for addition to the shared collection of media items when a determination is made that a previous set of additional media items have not been added to the shared collection of media items for at least a threshold period of time allows the computer system to automatically provide visual back concerning recommended media items without cluttering the user interface, which performs an operation when a set of conditions has been met without requiring further user input.

In some embodiments, the suggested set of media items includes one or more media items from an event (e.g., as described above in relation to FIGS. 11A-11E). In some embodiments, a determination is made that one or more users in the set of other users were at the event (e.g., as described above in relation to FIGS. 11A-11E) (e.g., the location of one or more computer systems were within a predetermined distance from the computer system while the computer system was at the event and/or one or more users in the set of other users were at the event are represented in one or more media items corresponding to (e.g., captured at and/or associated with) the first event). Displaying, via the one or more output devices, a notification indicating that a suggested set of media items are suggested for addition to the shared collection of media items when a determination is made that one or more users in the set of other users were at the event allows the computer system to automatically provide visual feedback concerning recommended media items that are likely relevant to the shared collection of media items, which performs an operation when a set of conditions has been met without requiring further user input and enhances privacy/security of the computer system and/or the collection of media items.

In some embodiments, the computer system displays (e.g., concurrently with the representation of the field-of-view of the one or more cameras) (e.g., while the computer system is configured to enable the adding of captured media to the shared collection of media items) a third control (e.g., 1002*b* and/or 1002*e*) that, when selected, causes the computer system to be configured to automatically add the media item to the shared collection of media items (e.g., as described above in relation to FIGS. 10M-10N). In some embodiments, after displaying the third control, the computer system detects an input (e.g., a tap input or, in some embodiments, a non-tap input (e.g., a dragging input, a mouse click, a gaze input, and/or a press-and-hold input)) directed to a control (e.g., 610*g*) to disable adding captured media (e.g., and/or media that is captured in response to detecting the request to capture the media) to the shared collection of media items (e.g., as described above in relation to FIGS. 10M-10N). In some embodiments, in response to detecting the input directed to the control to disable the adding captured media to the shared collection of media items, the computer system configures the computer system to disable the adding of captured media to the shared collection of media items (e.g., as described above in relation to FIGS. 10M-10N). In some embodiments, while the computer system is configured to disable the adding captured media to the shared collection of media items, the computer system ceases to display (e.g., in a camera application user interface and/or a media capturing user interface) the third control (e.g., 1002*b*) (e.g., as described above in relation to FIGS. 10M-10N) (e.g., while continuing to display with the representation of a field-of-view of the one or more cameras). In some embodiments, in response to detecting another input directed to the control to disable the adding captured media to the shared collection of media items, the computer system is configured to enable the adding of captured media to the shared collection of media items. Ceasing to display the third control that, when selected, causes the computer system to add the media item to the shared collection of media items while the computer system is configured to display disable the adding of captured media to the shared collection of media items due to user input on another control provides the user with control over the computer system and declutters the user interface of one or more controls that are not needed while the computer system is configured to display adding captured media to the shared collection of media items, which performs an operation when a set of conditions has been met without requiring further user input and provides additional control options without unnecessarily cluttering the user interface.

In some embodiments, the computer system displays, concurrently with the representation of the field-of-view of the one or more cameras, a fourth control (e.g., 1002*b* and/or 1002*e*) that, when selected, causes the computer system to automatically add the media item to the shared collection of media items (e.g., while the computer system is configured to enable adding captured media to the shared collection of media items). In some embodiments, after displaying the fourth control (e.g., 1002*b* and/or 1002*e*), the computer system detects an input (e.g., a tap input or, in some embodiments, a non-tap input (e.g., a dragging input, a mouse click, a gaze input, and/or a press-and-hold input)) directed to a control (e.g., 1040*c*) to disable automatically adding captured media (e.g., and/or media that is captured in response to detecting the request to capture the media) to the shared collection of media items in response to detecting the request (e.g., 1050*c*, 1050*d*1, 1050*e*1, and/or 1050*f*) to capture media (e.g., as described above in relation to FIGS. 10M-10N). In some embodiments, in response to detecting the input directed to the control to disable automatically adding captured media to the shared collection of media items, the computer system configures the computer system to disable adding (e.g., automatically adding and/or sharing) captured media to the shared collection of media items (e.g., as described above in relation to FIGS. 10M-10N). In some embodiments, while the computer system is configured to disable adding captured media to the shared collection of media items, the computer system continues to display (e.g., in a camera application user interface and/or a media capturing user interface) the fourth control (e.g., as described above in relation to FIGS. 10M-10N). In some embodiments, in response to detecting another input directed to the control to disable automatically adding captured media to the shared collection of media items, the computer system is configured to enable adding captured media to the shared collection of media items. Continuing to display the second control that, when selected, causes the computer system to add the media item to the shared collection of media items concurrently with the representation of a field-of-view of the one or more cameras due to user input on another control provides the user with control over the computer system, which provides additional control options without unnecessarily cluttering the user interface.

In some embodiments, after capturing the media corresponding to the field-of-view of the one or more cameras, the computer system displays, via the display generation component, a media gallery user interface (e.g., 740*a*) that includes the captured media corresponding to the field-of-view of the one or more cameras. In some embodiments, the captured media is displayed at a first size. In some embodiments, while displaying the captured media at the first size, the computer system detects a request (e.g., via detecting a tap input that is directed to the captured media or, in some embodiments, a non-tap input (e.g., a dragging input, a mouse click, a gaze input, and/or a press-and-hold input)) to display an enlarged representation (e.g., as illustrated in FIG. 7T) of the captured media. In some embodiments, in response to detecting the request to display the enlarged representation of the captured media, the computer system concurrently displays, via the display generation component: a first control (e.g., 634*d* and/or 1070*b*) for switching between a plurality of collections of media items (e.g., as described above in relation to the first control for switching between collections of media items and method 900) that includes the shared collection of media items; and the captured media (e.g., 744*a*) at a second size that is greater than the first size (e.g., as illustrated in FIGS. 7T-7TU). Providing the first control for switching between collections of media items provides the user with more control to allow the user to switch between collections of media items, which provides additional control options without unnecessarily cluttering the user interface.

In some embodiments, the media gallery user interface (e.g., 740*d*) does not include the first control (e.g., 634*d* and/or 1070*b*) for switching between collections of media items (e.g., before detecting the request to display the enlarged representation of the captured media) (e.g., as discussed in relation to FIG. 7S).

In some embodiments, after capturing the media corresponding to the field-of-view of the one or more cameras, the computer system detects a request (e.g., 1050*g*) to display a camera roll user interface (e.g., as discussed above in relation to FIGS. 10A-10J1) that includes a plurality of media items, wherein the plurality of media items include the captured media corresponding to the field-of-view of the one or more cameras. In some embodiments, in response to detecting the request (e.g., 1050*g*) to display the camera roll user interface that includes the captured media, the computer system displays the captured media (and, in some embodiments, a different media that that is in the plurality of media items) at a third size (e.g., as discussed above in relation to FIGS. 10A-10J1) (e.g., thumbnail that representation 1024*i* in FIG. 10H) (and the different media item is displayed at the first size). In some embodiments, while displaying the captured media (e.g., a representation of the captured media) at the third size, the computer system detects one or more inputs that includes selection (e.g., via detecting a tap input that is directed to the captured media or, in some embodiments, a non-tap input (e.g., a dragging input, a mouse click, a gaze input, and/or a press-and-hold input)) of the captured media (e.g., as discussed above in relation to FIGS. 10A-10J1). In some embodiments, in response to detecting the one or more inputs that includes selection of the captured media, the computer system displays, via the display generation component, the captured media at a fourth size (e.g., 1024*i*) that is greater than the third size concurrently with a second control for switching between a second plurality of collections of media items (e.g., as described above in relation to the first control for switching between collections of media items and method 1800) that includes the shared collection of media items. In some embodiments, the second control for switching between collections of media items is displayed in the camera roll user interface (e.g., that includes thumbnail representations of one or more media items). In some embodiments, the computer system detects a request to display an enlarged representation of media (e.g., in a user interface such as the user interface described in relation to FIGS. 7T-7U and 10J1). In some embodiments, in response to detecting the request to display the enlarged representation (e.g., via an input directed a thumbnail representation in a media gallery and/or a thumbnail representation in a camera roll user interface), the computer system displays the enlarged representation of media. In some embodiments, in response to detecting the request to display the enlarged representation and in accordance with a determination that the previous user interface was accessed from a camera roll user interface (e.g., a user interface that is displayed in response to detecting a request to display representation of media while the computer system is displaying a media capture user interface, a camera user interface, a user interface that includes a live preview (e.g., 1030), the computer system displays the control for switching between the second plurality of collections of media items that includes the shared collection of media items (e.g., concurrently with the enlarged representation of the media). In some embodiments, in response to detecting the request to display the enlarged representation and in accordance with a determination that the previous user interface was accessed from a media gallery user interface (e.g., as discussed above in relation to FIGS. 7T-7U and/or 740*a*) (e.g., a user interface that was not accessed from the media capture user interface and/or the camera user interface and/or a user interface that includes a live preview), the computer system does not display the control for switching between the second plurality of collections of media items that includes the shared collection of media items (e.g., concurrently with the enlarged representation of the media). In some embodiments, the control for switching between the plurality of collection of media items is displayed in a camera roll user interface and is not displayed in a media gallery user interface. In some embodiments, the camera roll user interface includes a control that, when selected, causes the computer system to display a live preview, a shutter control (e.g., that, when selected, causes the computer system to capture media), and/or one or more capture setting controls. In some embodiments, the media gallery user interface does not include the control that, when selected, causes to the computer system to display the live preview, a shutter control, and/or one or more capture setting controls. Providing the second control for switching between collections of media items provides the user with the option to quickly remove a media item from the shared library that was not intended to be included in the shared library and provides the user with more control to allow the user to switch between collections of media items, which provides additional control options without unnecessarily cluttering the user interface and improves privacy and security.

Note that details of the processes described above with respect to method 1200 (e.g., FIG. 12) are also applicable in an analogous manner to the methods described below/above. For example, method 800 optionally includes one or more of the characteristics of the various methods described in relation to method 1200. For example, method 800 can be used to create a shared media library between one or more people and method 1200 can be used to automatically save captured media to the shared media library. For brevity, these details are not repeated below.

FIG. 13 is a flow diagram illustrating methods for recommending media items for one or more media libraries using a computer system in accordance with some embodiments. Method 1300 is performed at a computer system (e.g., a smartphone, a desktop computer, a laptop, a tablet, or a head mounted device (e.g., a head mounted augmented reality and/or extended reality device)) that is in communication with one or more output devices (e.g., one or more display generation components (e.g., a display controller and/or a touch-sensitive display system), speakers, and/or sensors (e.g., haptic sensors and/or light sensors). In some embodiments, the computer system is in communication with one or more input devices (e.g., a touch-sensitive surface a camera, a mouse, and/or a trackpad) and/or one or more output devices (e.g., one or more display generation components, speakers, and/or sensors (e.g., haptic sensors and/or light sensors)). Some operations in method 1300 are, optionally, combined, the orders of some operations are, optionally, changed, and some operations are, optionally, omitted.

As described below, method 1300 provides an intuitive for recommending media items for one or more media libraries. The method reduces the cognitive burden on a user for recommending media items for one or more media libraries, thereby creating a more efficient human-machine interface. For battery-operated computing devices, enabling a user to recommend media items for one or more media libraries faster and more efficiently conserves power and increases the time between battery charges.

The computer system, while (1302) (e.g., detecting that) the user of the computer system (e.g., 600) (e.g., a user account associated with the computer system) is sharing (e.g., configured to share (e.g., via one or more settings and/or data)) a collection of media items (e.g., as described above in relation to FIGS. 6A-6AO and method 800) with a set of one or more users (e.g., Jane, Kevin, and/or Jill as described above in relation to FIGS. 6A-6AO) that are different from the user of the computer system (and/or in response to detecting (or subsequent to detecting) that the user of the computer system is configured to share the collection of media items with the set of one or more users that are different from the user of the computer system and/or in response to detecting the addition of a new face (and/or users) to a list of shared faces (e.g., a list of shared faces that are identified in captured media (e.g., new media being added to the collection of media item that includes a representation of a face in the list of shared faces and/or existing media being process to identify new faces) that is shared and/or suggested to be shared in the collection of media items)) and in accordance with a determination that a set of notification criteria is satisfied (and/or after (and/or in response to) determining that the suggested set of media items are eligible to be added to the collection of media items), where the set of notification criteria includes a criterion that is satisfied when a determination (e.g., an automatic determination by the computer system or a remote computer system such as a media storage server) is made that additional media items in a media library (e.g., a collection of media items and/or a personal collection of media items) of the user satisfy a set of criteria for sharing in the collection of media items (e.g., a criterion that is satisfied a predetermined of time (e.g., 1-6 hours, 1-7 days, 1-6 weeks, and/or 1-6 months) has elapsed since one or more previous notifications indicating one or more media items (e.g., suggested media items and/or media items that are not a part of the collection of media items before the previous notification was provided) can be added to the collection of media items was provided (e.g., displayed and/or output) and/or a criterion that is satisfied when a determination is made that at least one notification (e.g., any notifications) that indicating one or more media items can be added to the collection of media items has not been provided (e.g., at the computer system, at another computer system that is associated with the user of the computer system, and/or at another (or any) computer system that is associated with (e.g., logged into) a user account that is associated with (e.g., belongs to) the user of the computer system) for at least a predetermined period of time (e.g., 1-6 hours, 1-7 days, 1-6 weeks, and/or 1-6 months)), the computer system provides (1304) (e.g., displaying and/or outputting), via the one or more output devices, a respective notification (e.g., 1112 and/or 1114) (and/or one or more notifications) indicating that a respective suggested set (e.g., 1112, 1114, 1140*a*, and/or 1140*b*) of media items (e.g., that were automatically selected by a computer system based on sharing criteria for the library selected by the user such as time and/or participant criteria) is suggested for addition to the collection of media items (e.g., without adding (e.g., initially adding before receiving confirmation from a user) (e.g., and/or without adding after the notification is displayed but confirmation has not been provided to add) the respective suggested set of media items to the collection of media). In some embodiments, the one or more notifications include a first notification and a second notification. In some embodiments, the first notification includes a representation (e.g., a visual representation (e.g., a photo and/or a video) of a first media item in the suggested set of media items. In some embodiments, the second notification includes a representation of a second media item in the suggested set of media items. In some embodiments, the first notification is displayed concurrently with the second notification. In some embodiments, the second notification is displayed after the first notification is displayed. In some embodiments, the set of notification criteria includes a criterion when a determination is made that the collection of media items does not include the suggested set of media items).

The computer system, while (1302) (e.g., detecting that) the user of the computer system (e.g., 600) (e.g., a user account associated with the computer system) is sharing (e.g., configured to share (e.g., via one or more settings and/or data)) a collection of media items (e.g., as described above in relation to FIGS. 6A-6AO and method 800) with a set of one or more users (e.g., Jane, Kevin, and/or Jill as described above in relation to FIGS. 6A-6AO) that are different from the user of the computer system (and/or in response to detecting (or subsequent to detecting) that the user of the computer system is configured to share the collection of media items with the set of one or more users that are different from the user of the computer system and/or in response to detecting the addition of a new face (and/or users) to a list of shared faces (e.g., a list of shared faces that are identified in captured media (e.g., new media being added to the collection of media item that includes a representation of a face in the list of shared faces and/or existing media being process to identify new faces) that is shared and/or suggested to be shared in the collection of media items)) and in accordance with a determination that the set of notification criteria is not satisfied, the computer system forgoes providing (1306) the respective notification (e.g., 1112, 1114, 1140*a*, and/or 1140*b*) (and/or one or more notifications) indicating that the respective suggested set of media items is suggested for addition to the collection of media items (e.g., as described above in relation to FIG. 11B). In some embodiments, in response to detecting that the user of the computer system is configured to share the collection of media items with the set of one or more users that are different from the user of the computer system, the computer system does not provide the one or more notifications that indicate that the suggested set of media items can be added to the collection of media items. In some embodiments, while (e.g., detecting that) the user of the computer system (e.g., a user account associated with the computer system) is sharing (e.g., configured to share (e.g., via one or more settings and/or data)) a collection of media items (e.g., as described above in relation to FIGS. 6A-6AO and method 800) with a set of one or more users that are different from the user of the computer system (and/or in response to detecting (or subsequent to detecting) that the user of the computer system is configured to share the collection of media items with the set of one or more users that are different from the user of the computer system), the computer system determines (and/or detecting) that a suggested set of media items that are eligible to (e.g., can be added, suggested to be added, and/or suggested to be added because the suggested media items include one or more characteristics that correspond to one or more characteristics of the collection of media items and/or one or more media items in the collection of media items) be added (e.g., to be suggested to be added) to the collection of media items; and In some embodiments, the suggested set of media items are not a part of the collection of media items before the computer system detects that the suggested set of media items are eligible to be added to the collection of media items. In some embodiments, as a part of determining the suggested set of media items that are eligible to be added to the collection of media items, the computer system determines that the suggested set of media items that are eligible to be added to the collection of media items and/or the computer system obtains and/or acquires the suggested set of media items and/or identifiers that correspond to the suggested set of media items from one or more different computer systems that have determined that the suggested set of media items that are eligible to be added to the collection of media items. Choosing whether to provide the respective notification when prescribed conditions are met allows the computer system to make adding suggested media items to the user convenient while maintaining privacy for the user by not automatically adding media items to the shared collection of media items, which performs an operation when a set of conditions has been met without requiring further user input and enhances the privacy/security of the computer system and/or the collection of media items.

In some embodiments, the respective notification (e.g., 1112, 1114, 1140*a*, and/or 1140*b*) is provided at a first time, In some embodiments, at a second time that is after the first time (and in accordance with a determination that the set of notification criteria is satisfied and/or that the additional items of the second suggested set of media items satisfy the set of criteria for sharing in the collection of media items), the computer system provides, via the one or more out devices, a second notification (e.g., 1112, 1114, 1140*a*, and/or 1140*b*) indicating that a second suggested set of media items is suggested for addition to the collection of media items (e.g., as described above in relation to FIGS. 11A-11C). In some embodiments, the second suggested set of media items is different from the respective suggested set of media items. In some embodiments, the second suggested set of media items does not include a media item from the respective suggested set of media items. In some embodiments, the second suggested set of media items includes a media item from the respective suggested set of media items. In some embodiments, the second notification is provided at a location on a display generation component and/or display at which the respective notification was previously displayed. In some embodiments, the second notification is not displayed concurrently with the first notification. Providing the second notification indicating that the second suggested set of media items is suggested for additional to the collection of media items after providing the respective notification allows the computer system to make adding suggested media items to the user convenient while maintaining privacy for the user by not automatically adding media items to the shared collection of media items, which performs an operation when a set of conditions has been met without requiring further user input and enhances the privacy/security of the computer system and/or the collection of media items.

In some embodiments, the second time is separated from the first time by at least a first predetermined interval of time (e.g., 1-10 hours, 1-5 days, 1-4 weeks, and/or a 1-6 months) (e.g., as described above in relation to FIGS. 11A-11C). Providing the second notification at a time that separated by at least a predetermined interval of time from when the respective notification was provide allows the computer system to make adding suggested media items to the user convenient while maintaining privacy for the user by not automatically adding media items to the shared collection of media items and cluttering the user interface, which enhances the privacy/security of the computer system and/or the collection of media items and performs an operation when a set of conditions has been met without requiring further user input and unnecessarily cluttering the user interface.

In some embodiments, the set of notification criteria (and/or the set of criteria for sharing in the collection of media items) includes a criterion that is satisfied when a determination is made that at least one notification (e.g., 1112, 1114, 1140*a*, and/or 1140*b*) indicating that at least one suggested set of media items is suggested for addition to the collection of media items has not been provided for at least a second predetermined interval of time (e.g., 1-10 hours, 1-5 days, 1-4 weeks, and/or 1-6 months) (e.g., as described above in relation to FIGS. 11A-11C). Providing the respective notification based on whether an interval of time has passed since a previous notification was provided allows the computer system to make adding suggested media items to the user convenient while maintaining privacy for the user by not automatically adding media items to the shared collection of media items and cluttering the user interface, which enhances the privacy/security of the computer system and/or the collection of media items and performs an operation when a set of conditions has been met without requiring further user input and unnecessarily cluttering the user interface.

In some embodiments, the set of notification criteria includes a criterion that is satisfied when a determination is made that at least threshold number (e.g., 5-50) of additional media items (e.g., new media items that have been added to the media library since the last notification) in the media library of the user satisfy the set of criteria for sharing in the collection of media items (e.g., as described above in relation to FIGS. 11A-11C). Providing the respective notification based on a determination being made that at least threshold number of additional media items in the media library of the user satisfy the set of criteria for sharing in the collection of media items allows the computer system to make adding suggested media items to the user convenient while maintaining privacy for the user by not automatically adding media items to the shared collection of media items and cluttering the user interface, which enhances the privacy/security of the computer system and/or the collection of media items and performs an operation when a set of conditions has been met without requiring further user input and unnecessarily cluttering the user interface.

In some embodiments, the set of criteria for sharing in the collection of media items includes a criterion that is satisfied when a determination is made that a first respective additional media item includes a first (e.g., respective) designated individual (e.g., Jane, Jill, Kevin, and/or Valeria, as described above in relation to FIGS. 6A-6AO) (e.g., a representation of a designated individual (e.g., designated by one or more participants and/or organizers of the collection of media items (e.g., using one or more techniques as described above in relation to FIGS. 6A-6AO and method 800) (e.g., a participant, a face, or a pet that has been selected for sharing)) who is included in (e.g., represented and/or captured in one or more media items in the collection of media items and/or designated to be a part of (a participant in and/or a subject whom is designated to be represented in) the collection of the one or more media items via a participant in the collection of the one or more media items, as described above in relation to FIGS. 6A-6AO and method 800) the collection of media items (e.g., as described above in relation to media items 690 in FIGS. 6A-6AO and as described above in relation to FIGS. 11A-11C). In some embodiments, a designated individual is a participant (e.g., has permission to read, write, delete, and/or update one or more items in the collection of media items) of, a contributor to the collection of media items, and/or one or more of the users that are different from the user of the computer system. Providing the respective notification with one or more media items that include the first designated individual who is included in the collection of media items allows the computer system to select media items that are likely relevant to be shared in the collection of media items while maintaining privacy of media items that do not have these characteristics to avoid unintended sharing of media items, which enhances the privacy/security of the computer system and/or the collection of media items and performs an operation when a set of conditions has been met without requiring further user input and unnecessarily cluttering the user interface.

In some embodiments, the set of criteria for sharing in the collection of media items includes a criterion that is satisfied when a determination is made that a second respective additional media item was captured at an event that included a second designated individual (e.g., different from or the same at the first designated individual (e.g., as described above in relation to media items 690 in FIGS. 6A-6AO and as described above in relation to FIGS. 11A-11C). Providing the respective notification with one or more media items that were captured at an event that included a second designated individual allows for the computer system to select media items that are likely relevant to be shared in the collection of media items while maintaining privacy of media items that do not have these characteristics to avoid unintended sharing of media items, which enhances the privacy/security of the computer system and/or the collection of media items and performs an operation when a set of conditions has been met without requiring further user input and unnecessarily cluttering the user interface.

In some embodiments, the determination that the second respective additional media item was captured at the event that included the second designated individual is made based on a determination that the user of the computer system (and/or the computer system) was within a first proximity of the event that included a second designated individual (e.g., as described above in relation to media items 690 in FIGS. 6A-6AO and as described above in relation to FIGS. 11A-11C). In some embodiments, the determination that the user of the computer system was with the first proximity of the event is determined based on the location (e.g., a GPS location and/or a location determined by communication (e.g., wireless communication (e.g., near-field communication, Bluetooth communication, and/or Wi-Fi communication))) between the computer system and a computer system that is associated with the second designated individual) of the computer system, based on the location of the computer system relative to one or more other computer systems (e.g., the computer system that captured one or more of the additional media items) and/or one or more other characteristics (e.g., activation of one or more settings) of the computer system. Providing the respective notification with one or more media items that were captured at an event that included a second designated individual and was determined to include the second designated individual based on the user of the computer system being within a first proximity of the event that included a second designated individual allows for the computer system to select media items that are likely relevant to be shared in the collection of media items while maintaining privacy of media items that do not have these characteristics to avoid unintended sharing of media items, which enhances the privacy/security of the computer system and/or the collection of media items and performs an operation when a set of conditions has been met without requiring further user input and unnecessarily cluttering the user interface.

In some embodiments, the determination that the second respective additional media item was captured at the event that included the second designated individual is made based on a determination that at least a portion (e.g., a detectable portion and/or more than a threshold portion (e.g., more than 5-50%)) of a face of the second designated individual was detected in at least an additional media item (the second respective additional media item and/or a respective additional media item that is different from the second respective additional media item) that was captured at the event that included a second designated individual (e.g., as described above in relation to media items 690 in FIGS. 6A-6AO and as described above in relation to FIGS. 11A-11C). Providing the respective notification with one or more media items that were captured at an event that included a second designated individual and was determined to include the second designated individual based on the face of the second designated individual being captured in media allows for the computer system to select media items that are likely relevant to be shared in the collection of media items while maintaining privacy of media items that do not have these characteristics to avoid unintended sharing of media items, which enhances the privacy/security of the computer system and/or the collection of media items and performs an operation when a set of conditions has been met without requiring further user input and unnecessarily cluttering the user interface.

In some embodiments, the event that included the second designated individual is determined based on a time corresponding to a set of media item (e.g., a time at which the set of media items were generated, captured, uploaded, and/or modified) and a location (e.g., a particular city, state, sports game, stadium, restaurant, concert, and/or entertainment venue) corresponding to the set of media items (e.g., a location (e.g., a physical location and/or a virtual location) at which the set of media items were generated, captured, uploaded, and/or modified) (e.g., as described above in relation to media items 690 in FIGS. 6A-6AO and as described above in relation to FIGS. 11A-11C). Providing the respective notification with one or more media items that were captured at an event that was determined based on a time corresponding to a set of media item and a location corresponding to the set of media items allows for the computer system to select media items that are likely relevant to be shared in the collection of media items while maintaining privacy of media items that do not have these characteristics to avoid unintended sharing of media items, which enhances the privacy/security of the computer system and/or the collection of media items and performs an operation when a set of conditions has been met without requiring further user input and unnecessarily cluttering the user interface.

In some embodiments, while providing (e.g., displaying and/or outputting), via the one or more output devices, the respective notification (e.g., 1140*a*) (and/or one or more notifications) indicating that the respective suggested set of media items (e.g., that were automatically selected by a computer system based on sharing criteria for the library selected by the user such as time and/or participant criteria) is suggested for addition to the collection of media items, the computer system concurrently provides a third notification (e.g., 1140*b*) indicating that a third suggested set of media items is suggested (and does not correspond to the second and/or first event). In some embodiments, the respective suggested set of media items corresponds to a first event. In some embodiments, the third suggested set of media items corresponds to a second event that is different from the first event (and does not correspond to the first event) (e.g., as described above in relation to media items 690 in FIGS. 6A-6AO and as described above in relation to FIGS. 11E-11J). Providing multiple discrete notifications concerning different sets of suggested media items when prescribed conditions are met allows the computer system to make adding suggested media items to the user convenient while maintaining privacy for the user by not automatically adding media items to the shared collection of media items, which performs an operation when a set of conditions has been met without requiring further user input and enhances the privacy/security of the computer system and/or the collection of media items.

In some embodiments, while concurrently providing the respective notification (e.g., 1140*a*) and the third notification (e.g., 1140*b*), detecting a first set of one or more inputs. In some embodiments, in response to detecting the first set of one or more inputs (e.g., 1105*f*2 and/or 1150*j*) (e.g., one or more tap inputs or, in some embodiments, non-tap inputs (e.g., dragging inputs, mouse clicks, and/or press-and-hold inputs)), the computer system: in accordance with a determination that the first set of one or more inputs are a second set of inputs (e.g., one or more tap inputs or, in some embodiments, non-tap inputs (e.g., dragging inputs, mouse clicks, and/or press-and-hold inputs), where at least one of the inputs is directed to a first location and/or a first control), adds the respective suggested set of media items to the collection of media items without adding the third suggested set of media items to the collection of media items (e.g., as described above in relation to FIGS. 11H-11J); and in accordance with a determination that that the first set of one or more inputs are a third set of inputs (e.g., one or more tap inputs or, in some embodiments, non-tap inputs (e.g., dragging inputs, mouse clicks, and/or press-and-hold inputs), where at least one of the inputs is directed to a second location that is different from the first location and/or to a second control that is different from the first control) that are different from the second set of inputs, adds the respective third set of media items to the collection of media items without adding the respective suggested set of media items to the collection of media items (e.g., as described above in relation to FIGS. 11H-11J). Adding different sets of media items based on a determination concerning the first set of one or more inputs provides the user with control over which sets of media items are added to the collection of media items, which provides additional control options without unnecessarily cluttering the user interface.

In some embodiments, while concurrently providing the respective notification (e.g., 1140*a*) and the third notification (e.g., 1140*b*), the computer system detects a fourth set of one or more inputs (e.g., 1150*f*1 and/or 1150*h*1) (e.g., one or more tap inputs or, in some embodiments, non-tap inputs (e.g., dragging inputs, mouse clicks, and/or press-and-hold inputs)). In some embodiments, in response to detecting the fourth set of one or more inputs (e.g., **1150*f*1 and/or 1150*h*1), the computer system displays, via the display generation of media items, a user interface that includes one or more representations (e.g., 1130*b*) of the respective suggested set of media items and one or more representations (e.g., 1130*b*) of the third suggested set of media items (e.g., as described above in relation to FIG. 11G); and adds the respective suggested set of media items and the third suggested set of media items to the collection of media items (e.g., as described above in relation to FIGS. 11G-11**H). Displaying a user interface user includes one or more representations of the respective suggested set of media items and one or more representations of the third suggested set of media items and adding the respective suggested set of media items and the third suggested set of media items to the collection of media items in response to detecting the fourth set of one or more inputs provides the user with control over which sets of media items are added to the collection of media items, which provides additional control options without unnecessarily cluttering the user interface and reduces the number of inputs needed to add media items to the collection of media items.

In some embodiments, while providing the respective notification (e.g., **1140*a* and/or 1140*b*), the computer system detects a fifth set of one or more inputs (e.g., 115012, 1150*h*1, 1150*i*, and/or 1150*j*) (e.g., one or more tap inputs or, in some embodiments, non-tap inputs (e.g., dragging inputs, mouse clicks, and/or press-and-hold inputs)). In some embodiments, in response to detecting the fifth set of one or more inputs, the computer system adds a first subset of the respective suggested set of media items (e.g., 1130*b*1*b*) to the collection of media items without adding a second subset of the respective suggested set of media items to the collection of media items (e.g., the other of 1130*bb* that are not 1130*b*1*b* at FIGS. 11I-11J) (e.g., as described above in relation to FIG. 11**J). Adding a first subset of the respective suggested set of media items to the collection of media items without adding a second subset of the respective suggested set of media items to the collection of media items in response to detecting the fifth set of one or more inputs provides the user with control over which sets of media items are added to the collection of media items, which provides additional control options without unnecessarily cluttering the user interface.

In some embodiments, while concurrently providing the respective notification and the third notification, the computer system detects a request to remove the third notification (e.g., and/or detecting one or more inputs that includes an input (via an input (e.g., a tap input and/or a non-tap input, such as mouse click, a dragging input, and/or a press-and-hold input)) that is directed to the third notification) (e.g., as described above in relation to FIGS. 11E-11J). In some embodiments, in response to detecting the request to remove the third notification, the computer system ceases to display the third notification while continuing to display the respective notification (e.g., as described above in relation to FIGS. 11E-11J).

In some embodiments, while the user of the computer system is sharing the collection of media items with the set of one or more users, the computer system detects the request to add a first selected user to the set of one or more users (e.g., as described above in relation to FIGS. 6C-6AO and FIG. 11L). In some embodiments, in response to detecting request to add the first selected user to the set of one or more users, the computer system adds the first selected user to the set of one or more users (e.g., as described above in relation to FIG. 11L) (and, in some embodiments, sharing the collection of media items and/or causing the collection of media items to be shared with the first selected user) (e.g., as described above in relation to FIGS. 6A-6AO and method 800). Adding a first selected user to the set of one or more users in response to detecting the request to add the first user provides the user with control over users with which the collection of media items is shared, which provides additional control options without unnecessarily cluttering the user interface.

In some embodiments, while the user of the computer system is sharing the collection of media items with the set of one or more users, the computer system detects a request to associated a second selected user (e.g., and/or a face of the second user) with the collection of media items (e.g., as described above in relation to FIG. 11L). In some embodiments, in response to detecting the request (via an input (e.g., a tap input and/or a non-tap input, such as mouse click, a dragging input, and/or a press-and-hold input)) directed to a user identification control and/or a face adding control) to associated the second selected user with the collection of media items, the computer system associates the second selected user with the collection of media items without adding the first selected user to the set of one or more users (e.g., initiating a process to identify the second selected user (e.g., and/or a face of the second user) in one or more media items without adding the first selected user to the set of one or more users (e.g., for sharing in the collection of media items) (e.g., as described above in relation to FIGS. 6A-6AO and method 800) (e.g., as described above in relation to FIGS. 6C-6AO and FIG. 11L). Initiating a process to identify a second selected user in one or more media items in response to detecting the input directed to the user identification control provides the user with control over users and/or faces of users who can be used to identify suggested media items to include in the shared collection of media items, which provides additional control options without unnecessarily cluttering the user interface.

In some embodiments, while the second selected user is associated with the collection of media items, the computer system detects a request to disassociate the second selected user with the collection of media items (e.g., as described above in relation to FIGS. 6C-6AO and FIG. 11L). In some embodiments, in response to detecting the request (via an input (e.g., a tap input and/or a non-tap input, such as mouse click, a dragging input, and/or a press-and-hold input)) directed to a user removal control and/or a face removal control) to disassociate the second selected user with the collection of media items, the computer system disassociates the second selected user with the collection of media items (for future suggested and/or recommended media items))) (e.g., as described above in relation to FIGS. 6C-6AO and FIG. 11L).

In some embodiments, the set of notification criteria includes a criterion that is satisfied when a determination is made that a suggestion setting (e.g., 6100 has been disabled (e.g., as described above in relation to FIGS. 11A-11N). In some embodiments, the computer system displays a respective control that, when selected (e.g., via a tap input or, in some embodiments, a non-tap input (e.g., a dragging input, mouse click, gaze input, and/or press-and-hold input)), toggles the suggestion setting from being disabled to being enabled. In some embodiments, the respective control is displayed in a settings user interface. Providing the respective notification based on a determination being made that a determination is made that a suggestion setting has been disabled allows the computer system to make adding suggested media items to the user convenient while maintaining privacy for the user by not automatically adding media items to the shared collection of media items and cluttering the user interface and having the automatic adding of media items under the user's control, which enhances the privacy/security of the computer system and/or the collection of media items, provides additional control options without unnecessarily cluttering the user interface, and performs an operation when a set of conditions has been met without requiring further user input and unnecessarily cluttering the user interface.

In some embodiments, providing, via the one or more output devices, the respective notification (e.g., 1140*a* and/or 1140*b*) includes displaying the notification at a respective location. In some embodiments, in accordance with a determination that the set of notification criteria is not satisfied, the computer system displays a placeholder notification (e.g., 1150*k*) at the first location. In some embodiments, while displaying the placeholder notification at the first location, the computer system detects an input (e.g., 1150*k*) (e.g., a tap input or, in some embodiments, a non-tap input (e.g., a dragging input, mouse click, gaze input, and/or press-and-hold input)) directed to the placeholder notification. In some embodiments, in response to detecting the input directed to the placeholder notification, the computer system displays a user interface (e.g., 622) that includes a process for identifying users control (e.g., as described above in relation to FIGS. 6C-6AO and FIG. 11L). In some embodiments, while displaying the user interface that includes the process for identifying users control, the computer system detects an input directed to the process for identifying users control (e.g., as described above in relation to FIGS. 6C-6AO and FIG. 11L). In some embodiments, in response to detecting the input directed to the process for identifying users control, the computer system initiates a process for identifying at least one additional user to be identified in the media library of the user in order to satisfy one or more criterion in the set of criteria for sharing in the collection of media items (e.g., as described above in relation to FIGS. 6C-6AO and FIG. 11L). In some embodiments, as a part of initiating the process for identifying at least one additional user to be identified in the media library of the user, the computer system initially displays one of the user interfaces of FIGS. 6A-6AO. Displaying a placeholder notification at the first location and displaying a user interface that includes a control that, when selected, initiates a process for identifying at least one additional user to be identified in the media library of the user in response to detecting the input directed to the placeholder notification provides the user with an option for identifying media items that can be added to the shared collection of media items, which provides additional control options without unnecessarily cluttering the user interface.

In some embodiments, while providing, via the one or more output devices, the respective notification (e.g., 1112, 1114, 1140*a*, and/or 1140*b*) indicating that the suggested set of media items are suggested for addition to the collection of media items, the computer system detects a first input (e.g., 1150*c* and/or 1150*f*2) (e.g., a tap input or, in some embodiments, a non-tap input (e.g., a dragging input, mouse click, gaze input, and/or press-and-hold input)) that is directed to the respective notification. In some embodiments, in response to detecting the first input that is directed to the respective notification, the computer system displays, via the display generation component, a user interface (e.g., 1130) for the collection of media items. In some embodiments, the user interface for the collection of media items includes one or more representations (e.g., 1130*b* and/or 1130*bb*) of the respective suggested set of media items (and, in some embodiments, with and/or without adding the respective suggested set of media items to the collection of media items). Displaying a user interface for the collection of media items, where the user interface for the collection of media items includes one or more representations of the respective suggested set of media items in response to detecting the first input that is directed to the respective notification provides the user with a control that allows the user to review the respective suggested set of media items before adding one or more of them to the collection of media items, which provides additional control options without unnecessarily cluttering the user interface and enhances privacy/security of the computer system and/or the collection of media items.

In some embodiments, after (e.g., and/or while) providing, via the one or more output devices, the respective notification (e.g., 1140*a* and/or 1140*b*) indicating that the suggested set of media items are suggested for addition to the collection of media items (and/or one or more representations of the suggested media items (e.g., 1130*b* and/or 1130*bb*), the computer system detects an input (e.g., 1150*h*2 and/or 1150*j*) (e.g., a tap input or, in some embodiments, a non-tap input (e.g., a dragging input, mouse click, gaze input, and/or press-and-hold input)) that is directed to a control for adding the respective suggested set of media items to the collection of media items (and/or, in some embodiments, directed to an affordance and/or selectable user interface object associated with the notification and/or an affordance displayed in response to selection of the notification). In some embodiments, in response to detecting the second input that is directed to the control for adding the respective suggested set of media items to the collection of media items, the computer system adds the respective suggested set of media items to the collection of media items (e.g., with and/or without displaying, via the display generation component, a user interface for the collection of media items, where the user interface for the collection of media items includes one or more representations of the respective suggested set of media items). In some embodiments, once a user removes a shared library suggestion and/or notification, the computer system does not suggest media items corresponding to the shared library suggestion and/or notification at a late date. In some embodiments, adding participants to the shared library and/or removing participants from the shared library, causes the computer system to modify previously provided suggestions and/or make suggestions differently (e.g., based on the changed participants) going forward. In some embodiments, removing a participant from the shared library does not cause (e.g., automatically cause) a suggestion notification to be removed that was already provided and/or does not cause (e.g., automatically cause) media items that were added to the shared library via a suggestion notification to be removed from the shared library. Adding the respective suggested set of media items to the collection of media items in response to detecting the second input that is directed to the respective notification reduces the number of inputs needed to add the respective suggested set of media items to the collection of media items, which reduces the number of inputs needed to perform an operation.

Note that details of the processes described above with respect to method 1300 (e.g., FIG. 13) are also applicable in an analogous manner to the methods described above. For example, method 800 optionally includes one or more of the characteristics of the various methods described in relation to method 1300. For example, method 800 can be used to create a shared media library between one or more people and method 1300 can be used to suggest media items to the shared library. For brevity, these details are not repeated below.

FIGS. 14A-14M illustrate exemplary user interfaces for managing duplicate media. The user interfaces in these figures are used to illustrate the processes described below, including the processes in FIG. 15.

Figures 14A, 14B:
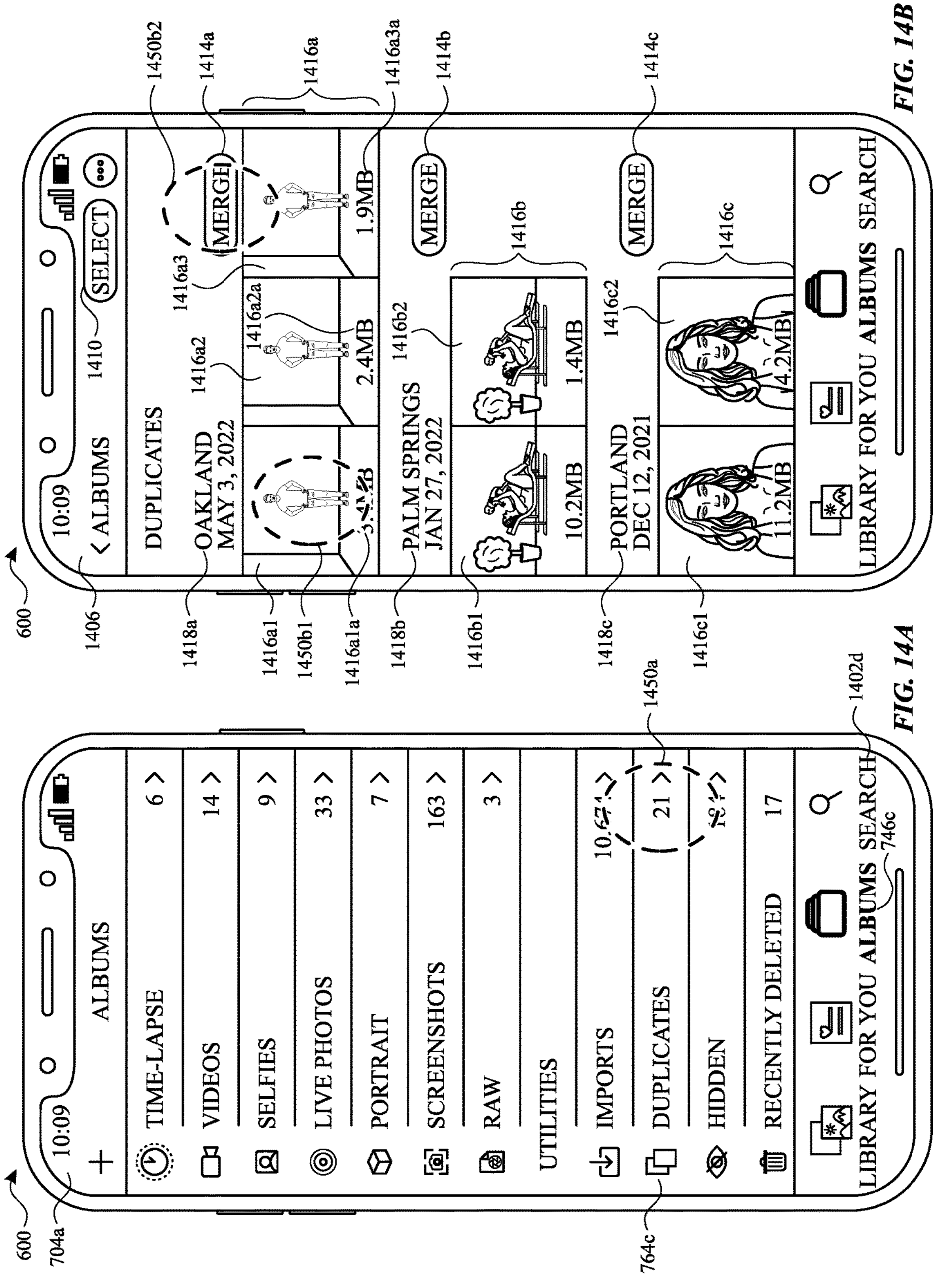
FIGS. 14A-14M illustrate exemplary user interfaces for managing duplicate media in accordance with some embodiments.

FIG. 14A illustrates computer system 600 displaying media gallery user interface 740*a*, using one or more techniques described above (e.g., in relation to FIG. 7Q). Media gallery user interface 740*a* includes duplicates album control 764*c*. Duplicates album control 764*c* includes an indication that computer system 600 has detected 21 duplicate media items (e.g., that belong to a shared library, a personal library, or a combination thereof). At FIG. 14A, computer system 600 detects tap input 1450*a* on duplicates album control 764*c*. As illustrated in FIG. 14B, in response to detecting tap input 1450*a*, computer system 600 displays duplicates album user interface 1406. Duplicates album user interface 1406 includes multiple sets of duplicate items that are displayed in rows. At FIG. 14B, the sets of duplicate media items include media item set 1416*a*, media item set 1416*b*, and media item set 1416*c*. In some embodiments, in response to detecting a swipe input on duplicates album user interface 1406, computer system 600 scrolls the sets of duplicate media items to display one or more other sets of duplicate media items and ceases to display media item set 1416*a*, media item set 1416*b*, and/or media item set 1416*c*.

As illustrated in FIG. 14B, media item set 1416*a* includes three media items (e.g., media items 1416*a*1-1416*a*3) that are duplicates of each other. Media item set 1416*b* includes two media items (e.g., 1416*b*1-1416*b*2) that are duplicates of each other, and media item set 1416*c* includes two media items (1416*c*1-1416*c*2) that are duplicates of each other. At FIG. 14B, computer system 600 displays an individual set of duplicate media items with an individual merge control that, when selected, initiates a process for merging media items in the respective set of duplicate media items. In FIG. 14B, computer system 600 displays merge control 1414*a* for merging duplicate media items in media set 1416*a*, merge control 1414*b* for merging duplicate media items in media item set 1416*b*, and merge control 1414*c* for merging duplicate media items in media item set 1416*c*. In some embodiments, an edited media item is not identified as a duplicate of another media item (e.g., because a user intentionally made the edited media item).

As illustrated in FIG. 14B, a plurality of sets of duplicate media items include corresponding identifiers that are associated with the corresponding set of duplicate media items. At FIG. 14B, the identifier includes a detected location and date that is associated with the set of duplicate media items (e.g., one or more media items in the set of duplicate media items). In FIG. 14B, identifier 1418*a* indicates that computer system 600 detected that media items 1416*a*1-1416*a*3 (e.g., media item set 1416*a*) were captured in Oakland on May 3, 2022. Identifier 1418*b* indicates that computer system 600 detected that media items 1416*b*1-1416*b*2 (e.g., media item set 1416*b*) were captured in Palm Springs on Jan. 27, 2022, and identifier 1418*c* indicates that computer system 600 detected that media items 1416*c*1-1416*c*2 (e.g., media item set 1416*c*) were captured in Portland on Dec. 12, 2021. At FIG. 14B, computer system 600 displays a file size indicator on a respective media item. When looking at media item set 1416*a*, computer system 600 displays file size indicator 1416*a*1*a* on media item 1416*a*1 to indicate that media item 1416*a*1 has a file size of 3.4 MB. Computer system 600 displays file size indicator 1416*a*2*a* on media item 1416*a*2 to indicate that media item 1416*a*2 has a file size of 2.4 MB, and computer system 600 displays file size indicator 1416*a*3*a* on media item 1416*a*3 to indicate that media item 1416*a*3 has a file size of 1.9 MB. As illustrated in FIG. 14B, the media item sets are ordered by file size (e.g., from largest to smallest). As denoted by file size indicators 1416*a*1*a*-1416*a*3*a*, media item 1416*a*1 is the largest media item (e.g., 3.4 MB) in media item set 1416*a*, so computer system 600 displays media item 1416*a*1 in the first position (e.g., position that is furthest to the left in the row of media items in FIG. 14B) in media item set 1416*a*. Media item 1416*a*2 is the second largest media item (e.g., 2.4 MB) in media item set 1416*a*, so computer system 600 displays media item 1416*a*2 in the second position (e.g., middle position in FIG. 14B) in media item set 1416*a*, and media item 1416*a*3 is the third largest media item (e.g., 1.9 MB) in media item set 1416*a*, so computer system 600 media item 1416*a*3 in the third position (e.g., position that is furthest to the right in the row of media items in FIG. 14B) in media item set 1416*a*. At FIG. 14B, computer system 600 detects tap input 1450*b*1 on media item 1416*a*1 and detects tap input 1450*b*2 on merge control 1414*a*.

Figures 14C, 14D:
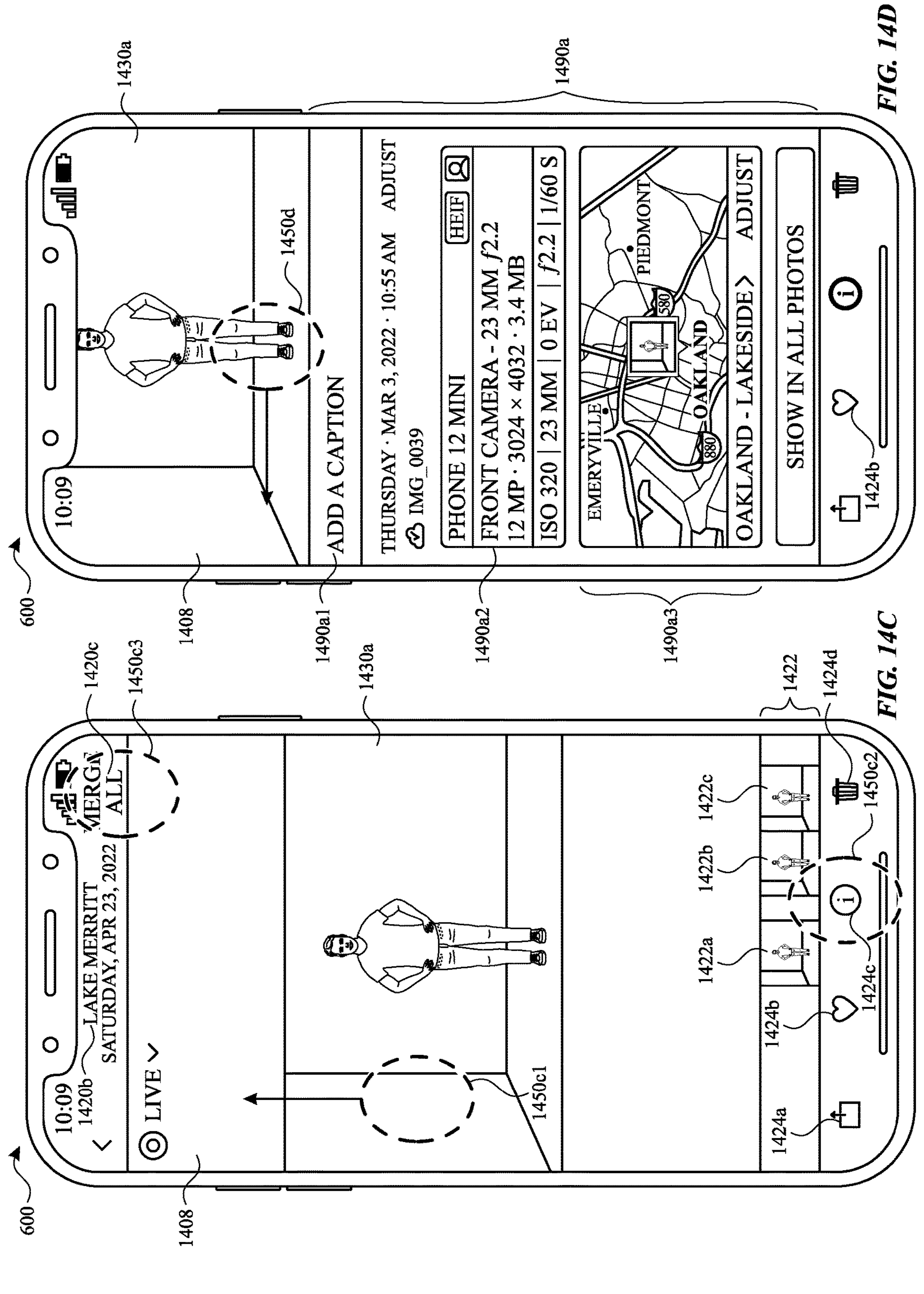

As illustrated in FIG. 14C, in response to detecting tap input 1450*b*1, computer system 600 displays media item set viewer user interface 1408. User interface 1408 is a user interface for viewing media items 1416*a*1-1416*a*3 (e.g., because computer system 600 detected tap input 1450*b*1 on a media item in media item set 1416*a*). User interface 1408 includes enlarged representation 1430*a*, which is an enlarged representation of media item 1416*a*1 of FIG. 14B (e.g., that was selected via tap input 1450*b*1). User interface 1408 also includes thumbnail representations 1422. Thumbnail representations 1422 include thumbnail representations 1422*a*-1422*c*. Thumbnail representation 1422*a* corresponds to media item 1416*a*1 of FIG. 14B. Thumbnail representation 1422*b* corresponds to media item 1416*a*2 of FIG. 14B, and thumbnail representation 1422*c* corresponds to media item 1416*a*3 of FIG. 14B. At FIG. 14B, computer system 600 displays thumbnail representation 1422*a* as being selected (e.g., having spaced from thumbnail representation 1422*b*-1422*c*) because enlarge representation 1430*a* is displayed. Because thumbnail representation 1422*a* is displayed as being selected, computer system 600 displays enlarged representation 1430*a* (e.g., because one or more of them (or all) correspond to media representation 1416*a*1 of FIG. 14B). At FIG. 14B, user interface 1408 includes thumbnail representations that correspond to media item set 1416*a* of FIG. 14B without including thumbnail representations that correspond to any other media item sets (e.g., media item sets 1416*b*-1416*d*). This is at least because computer system 600 allows access to the media items of the media item set that was selected (e.g., where at least one of the media items in the set was selected) at FIG. 14B (e.g., via tap input 1450*b*1) in response to detecting a respective type of navigation input (e.g., a swipe input or other next item input) without navigating through other media items in response to detecting the respective type of navigation input. Looking back at FIG. 14B, in response to detecting an input directed to a media item in media item set 1416*b*, computer system 600 displays user interface 1408, such that media items included in media item set 1416 are accessible from user interface 1408 in response to detecting a respective type of navigation input (e.g., a swipe input or other next item input) without navigating through other media items in response to detecting the respective type of navigation input.

As illustrated in FIG. 14C, user interface 1408 also includes share control 1424*a*, favorites control 1424*b*, information control 1424*c*, and deletion control 1424*d*. In response to detecting an input directed to share control 1424*a*, computer system 600 initiates a process for sharing the media item represented by the currently displayed enlarged representation (e.g., enlarged representation 1430*a* at FIG. 14C). In response to detecting an input directed to favorites control 1424*b*, computer system 600 changes a preferred status (user-preferred and/or favorites status) of the media item represented by the currently displayed enlarged representation. In response to detecting an input directed to information control 1424*c*, computer system 600 provides additional information (or metadata) that corresponds to the media item represented by the currently displayed enlarged representation. In response to detecting an input directed to delete control 1424*d*, computer system 600 initiates a process for deleting the media item that corresponds to the media item represented by the currently displayed enlarged representation. In some embodiments, in response to detecting a swipe input directed to user interface 1408, computer system 600 replaces enlarged representation 1430*a* with an enlarged representation that corresponds to thumbnail representation 1422*b* (e.g., the next thumbnail representation). At FIG. 14C, computer system 600 detects upward swipe input 1450*c*1 on user interface 1408 or tap input 1450*c*2 on information control 1424*c*.

Figure 14F:
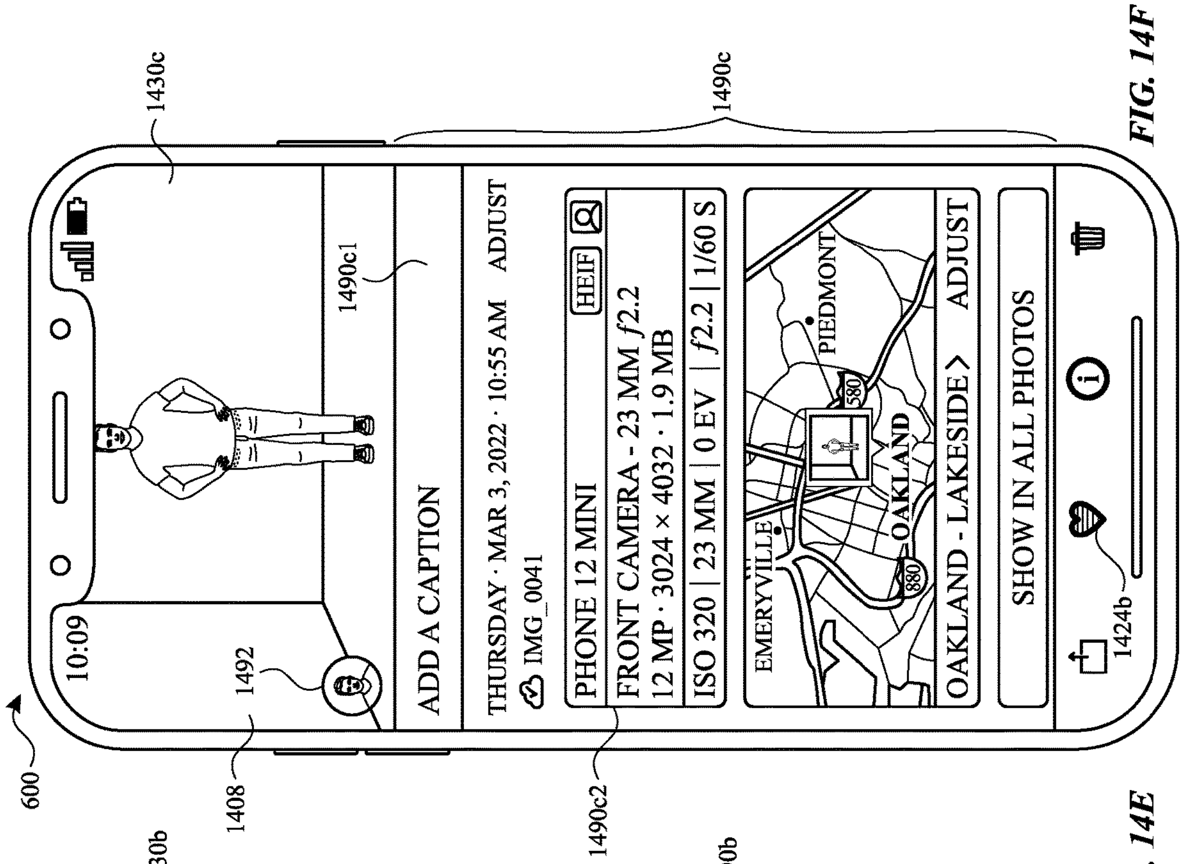
Figure 14E:
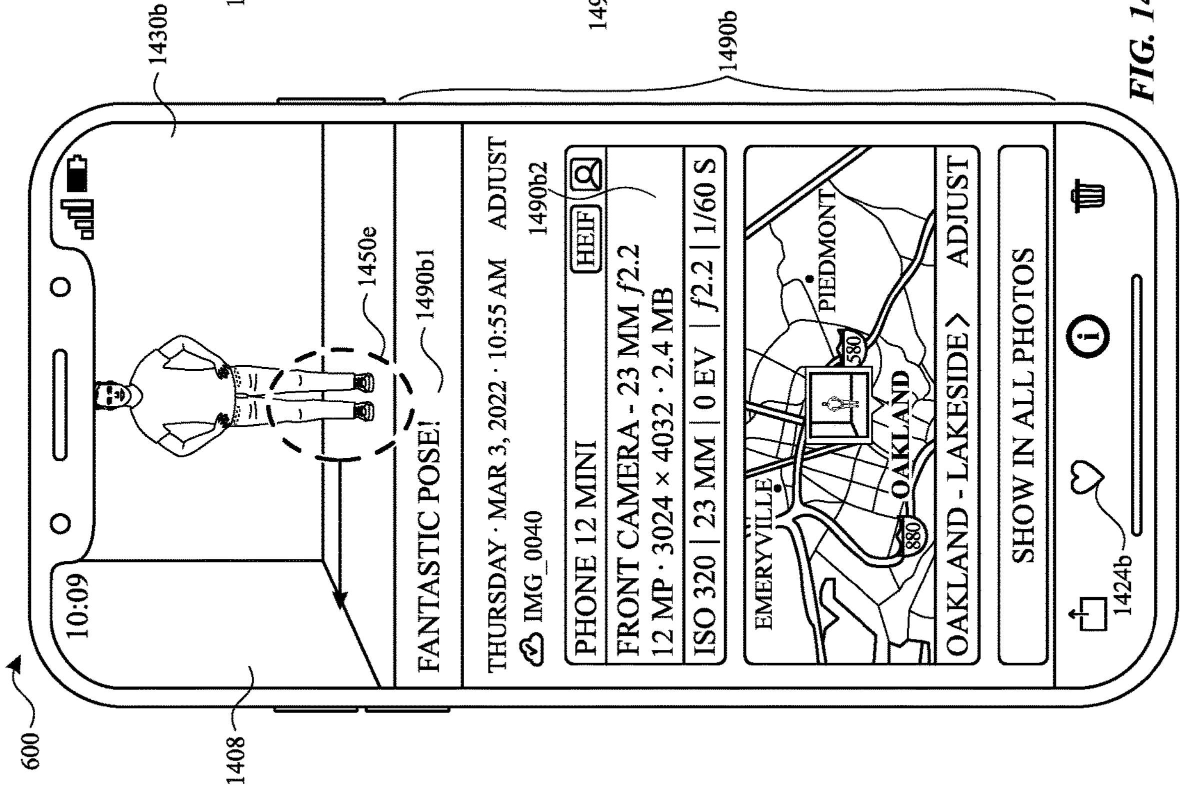

At FIG. 14D, in response to detecting tap upward swipe input 1450*c*1 on user interface 1408 or tap input 1450*c*2 on information control 1424*c*, computer system 600 moves enlarged representation 1430*a* up to display metadata 1490*a*. Metadata 1490*a* corresponds to media item 1416*a*1 of FIG. 14B (and/or enlarged representation 1430*a* of FIG. 14C). Among other things, metadata 1490*a* includes caption 1490*a*1, capture information 1490*a*2, and location information 1490*a*3. Caption 1490*a*1 indicates that a caption has not been associated with media item 1416*a*1 of FIG. 14B (e.g., because "ADD A CAPTION" is displayed in caption 1490*a*1). Capture information 1490*a*2 includes information related to the capture of media item 1416*a*1, including that media item 1416*a*1 has a file size of 3.4 MB. Location information 1490*a*3 indicates a location at which media item 1416*a*1 was captured (e.g., Oakland). At FIG. 14D, favorites control 1424*b* indicates that media item 1416*a*1 is not favorited (e.g., not bold in FIG. 14D). In FIGS. 14A-14M, a favorited status is also considered a part of the metadata that corresponds to a respective media item. In some embodiments, media item 1416*a*1 includes one or more other metadata, such as one or more of: tags, a location of media item in an album, faces captured in or associated with the media item, shared library status, and/or a user modified date and/or time. At FIG. 14D, computer system 600 detects leftward swipe input 1450*d* on user interface 1408. As illustrated in FIG. 14E, in response to detecting leftward swipe input 1450*d*, computer system 600 displays enlarged media representation 1430*b* with metadata 1490*b*. Metadata 1490*b* corresponds to media item 1416*a*2 of FIG. 14B (and/or enlarged representation 1430*b*). At FIG. 14E, metadata 1490*b* is similar to metadata 1490*a*2 of FIG. 14D. However, metadata 1490*b* includes caption 1490*b*1, which indicates that the "FANTASTIC POSE!" caption has been associated with media item 1416*a*2 of FIG. 14B. As described above in relation to FIG. 14D, media item 1416*a*1 of FIG. 14B was not associated with a caption. In addition, metadata 1490*b* includes capture information 1490*b*2, which indicates that media item 1416*a*2 has a file size of 2.4 MB. At FIG. 14E, favorites control 1424*b* indicates that media item 1416*a*1 is not favorited (e.g., not bold in FIG. 14E). At FIG. 14E, computer system 600 detects leftward swipe input 1450*e* on user interface 1408. As illustrated in FIG. 14F, in response to detecting leftward swipe input 1450*e*, computer system 600 displays enlarged media representation 1430*c* with metadata 1490*c*. Metadata 1490*c* corresponds to media item 1416*a*3 of FIG. 14B (and/or enlarged representation 1430*c*). At FIG. 14F, metadata 1490*c* is similar to metadata 1490*b* of FIG. 14E and metadata 1490*a* of FIG. 14D. However, computer system 600 displays face information 1492 (e.g., face metadata) that is associated with 1416*a*3. At FIG. 14F, face information 1492 depicts a face that matches the face of the person who is posing in enlarged representation 1424*c*. Metadata 1490*a* of FIG. 14D and metadata 1490*b* of FIG. 14E were not associated with face information. At FIG. 14F, metadata 1490*c* also includes capture information 1490*c*2, which indicates that media item 1416*a*3 has a file size of 1.9 MB. Moreover, at FIG. 14F, computer system 600 displays favorited icon 1424*b*, which indicates that media item 1416*a*3 has been favorited. As discussed above in relation to FIGS. 14D-14E, media items 1416*a*1 and 1416*a*2 of FIG. 14B are not favorited. Looking back at FIGS. 14B and 14C, computer system 600 detects tap input 1450*b* on merge control 1414*a* at FIG. 14B or detects tap input 1450*c*3 on merge-all control 1420*c* at FIG. 14C.

Figure 14H:
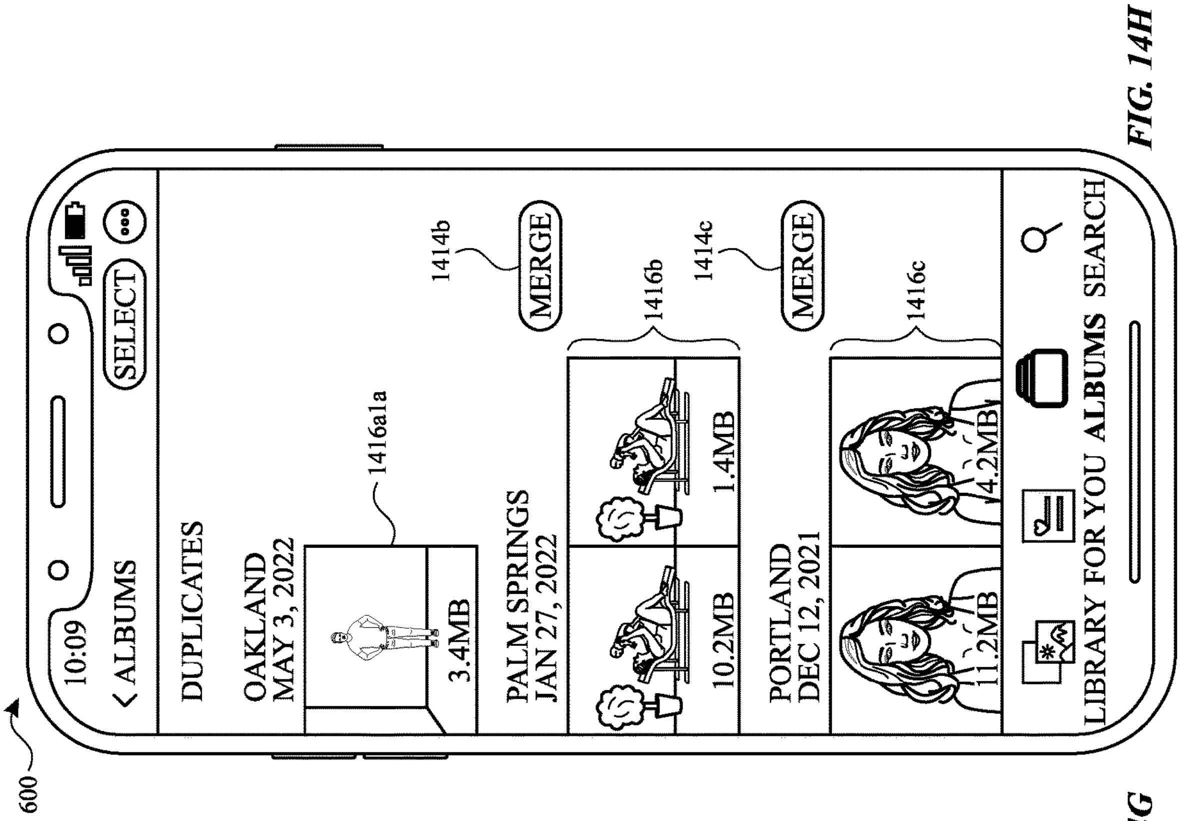
Figure 14G:
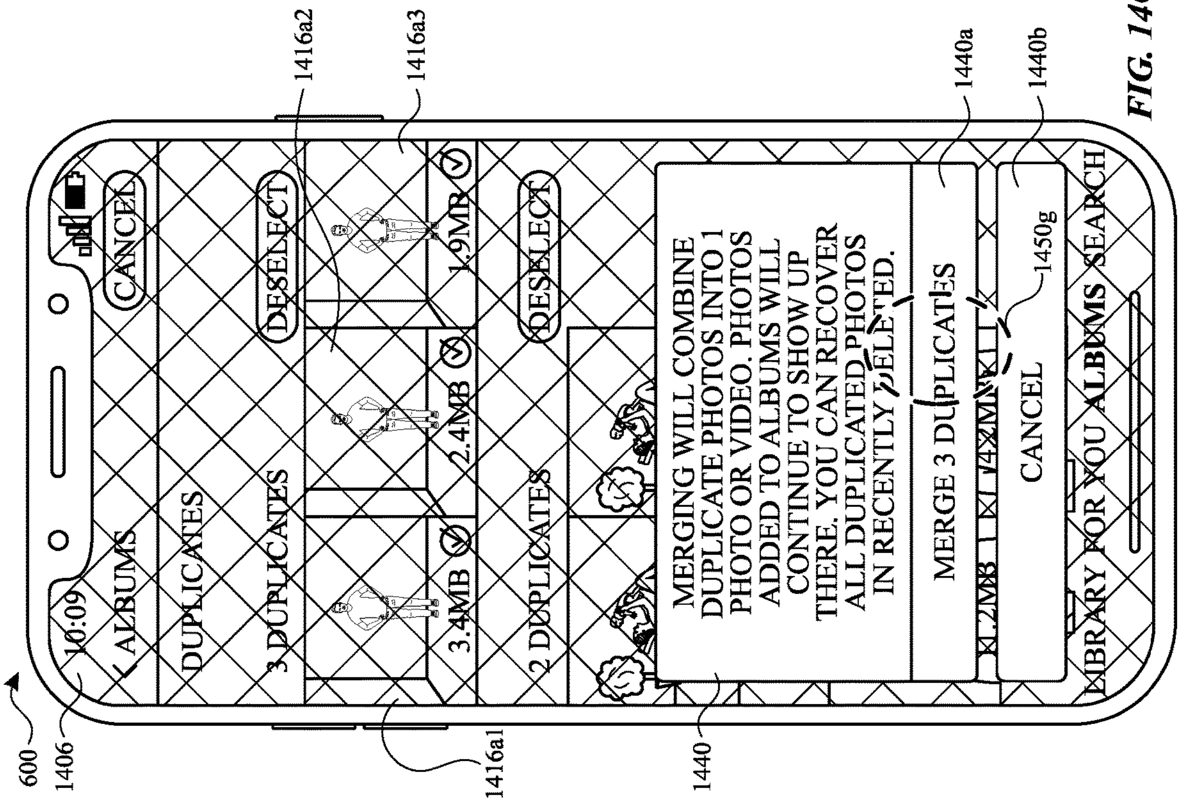

As illustrated in FIG. 14G, in response to detecting tap input 1450*b* or tap input 1450*c*3, computer system 600 displays prompt 1440 that indicates that 3 duplicate media items, media items 1416*a*1-1416*a*3 in media item set 1416*a*, can be merged into one media item. Prompt 1440 includes confirm merge control 1440*a* and cancel merge control 1430*b*. In some embodiments, in response to detecting a tap input on cancel merge control 1430*b*, computer system 600 does not merge the media items 1416*a*1-1416*a*3 and re-displays the user interfaces of FIGS. 14B-14C. At FIG. 14G, computer system 600 detects tap input 1450*g* on merge control 1430*b*. At FIG. 14G, in response to detecting tap input 1450*g*, computer system 600 merges media items 1416*a*1-1416*a*3.

FIG. 14H illustrates an optional user interface that computer system 600 can display after detecting tap input 1450*g*. As illustrated in FIG. 14H, in response to detecting tap input 1450*g*, computer system 600 displays duplicates album user interface 1406. At FIG. 14H, duplicates album user interface 1406 includes media item 1416*a*1 but does not include media items 1416*a*2-1416*a*3 because metadata from media items 1416*a*2-1416*a*3 have been merged into metadata from media items 1416*a*1. In some embodiments merging a set of media items includes merging one or more portions of metadata from a subset of media items into metadata for one respective (or more) duplicate media item of the subset of media items. In some embodiments, the subset of media items is marked for deletion (e.g., set to the recently deleted folder (e.g., as discussed above in relation to FIG. 7S) and/or delete the subset of media items. In some embodiments, the subset of media items does not include the one respective media item. In some embodiments, the subset of media items are deleted (e.g., after a predetermined period of time (e.g., 1-90 days).

Figure 14J:
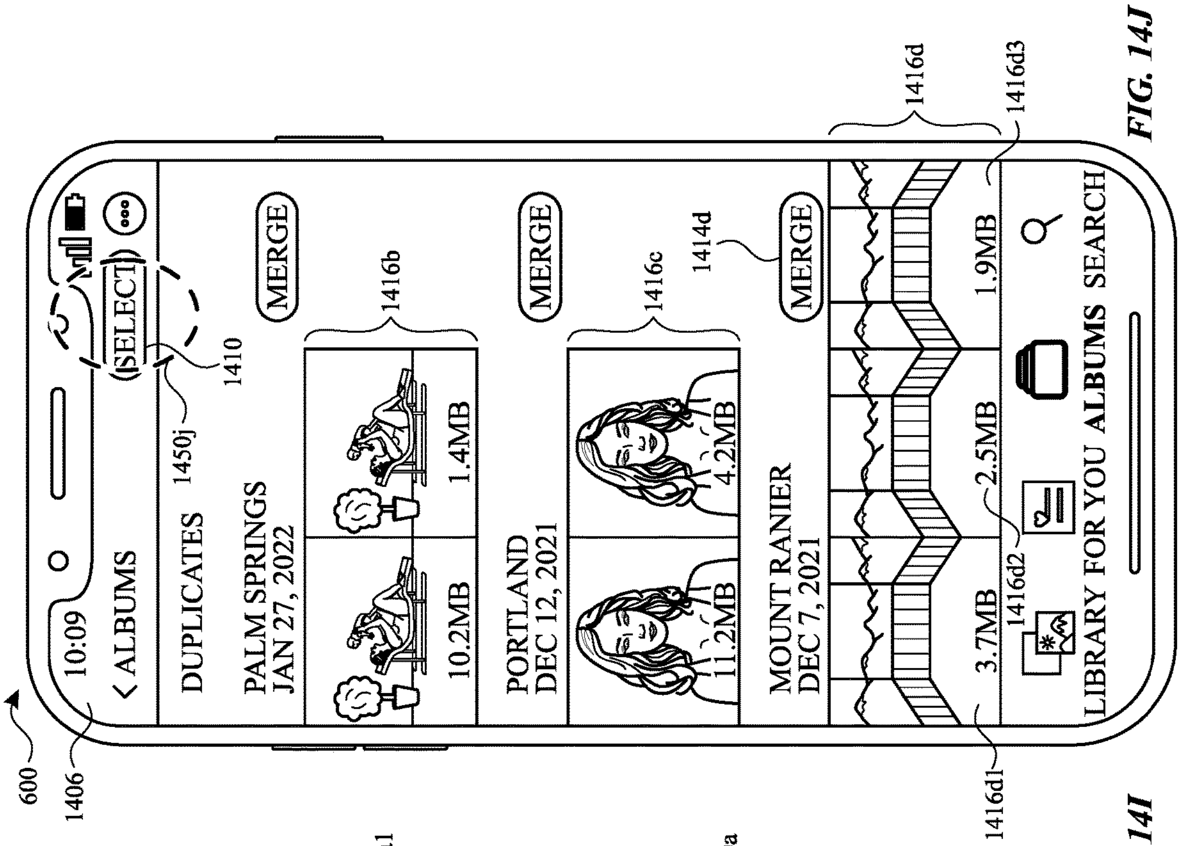
Figure 14I:
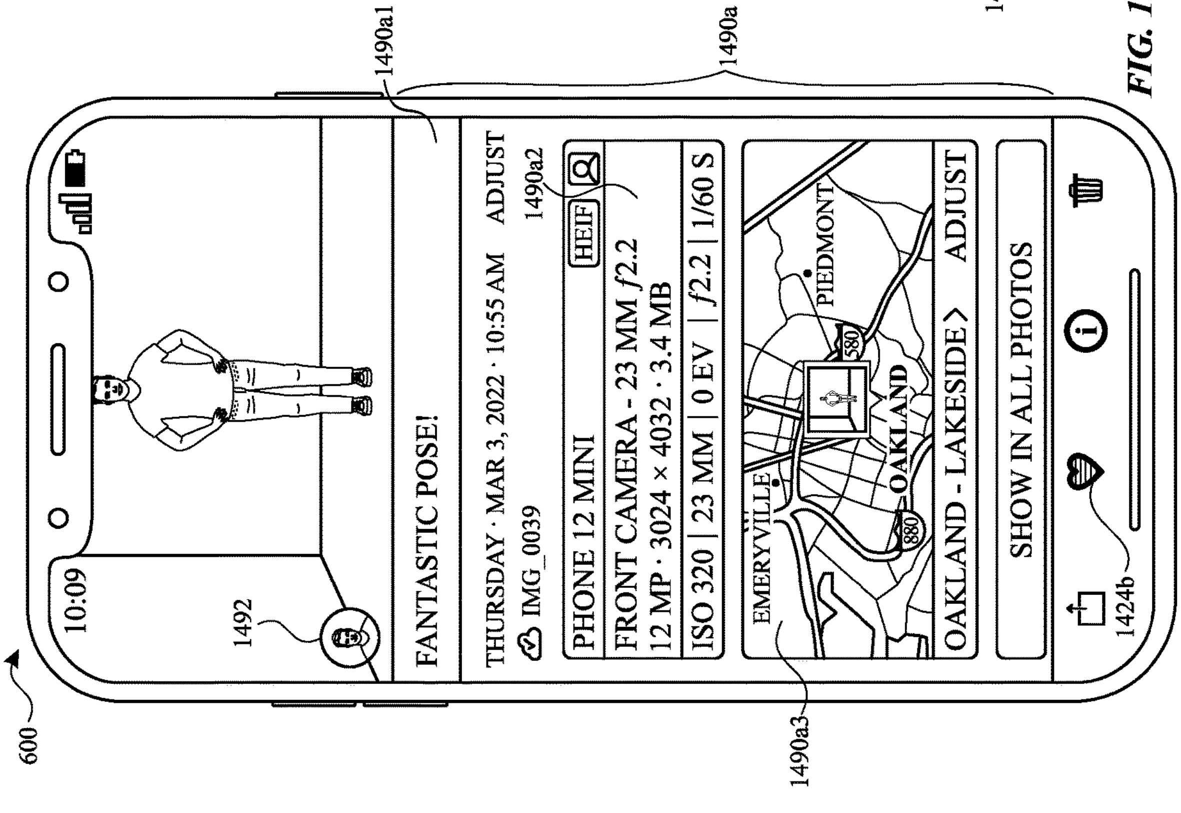

FIG. 14I illustrates computer system 600 displaying enlarged representation 1430*a* that corresponds to media item 1416*a*1. At FIG. 14I, computer system 600 is displayed enlarged representation 1430*a* of FIG. 14B after metadata (e.g., metadata 1490*b*-1490*c* as described above in relation to FIGS. 14E-14F) from media items 1416*a*2-1416*a*3 has been merged into metadata (e.g., as described above in relation to FIG. 14D) for media item 1416*a*1. As illustrated in FIG. 141, media item 1416*a*1 is now associated with face representation 1492 (which was associated with media item 1416*a*3 as discussed above in relation to FIG. 14F). In addition, metadata 690*a* includes caption 1490*a*1 (e.g., "FANTASTIC POSE!"), which is the caption that was associated with media item 1416*a*2 of FIG. 14B (e.g., as discussed above in relation to 1490*b*1 of FIG. 14E). Further, media item 1416*a*1 is also favorited (e.g., as indicated by 1424*b*), where media item 1416*a*3 was favorited as discussed above in relation to FIG. 14F.

FIG. 14J illustrates computer system 600 displaying duplicates album user interface 1406 (e.g., in response to detecting tap input 1450*g*). Because media item set 1416*a* of FIG. 14B was merged (e.g., as discussed above in relation to FIGS. 14H-14I), computer system removes media items 1416*a*1-1416*a*3 of FIG. 14B from duplicates album user interface 1406. After removing media items 1416*a*1-1416*a*3 of FIG. 14B, computer system 600 displays media item set 1416*d*, which includes three media items (e.g., media items 1416*d*1-1416*d*3) that are duplicates of each other. At FIG. 14J, computer system 600 detects tap input 1450*j* on select control 1410.

Figure 14L:
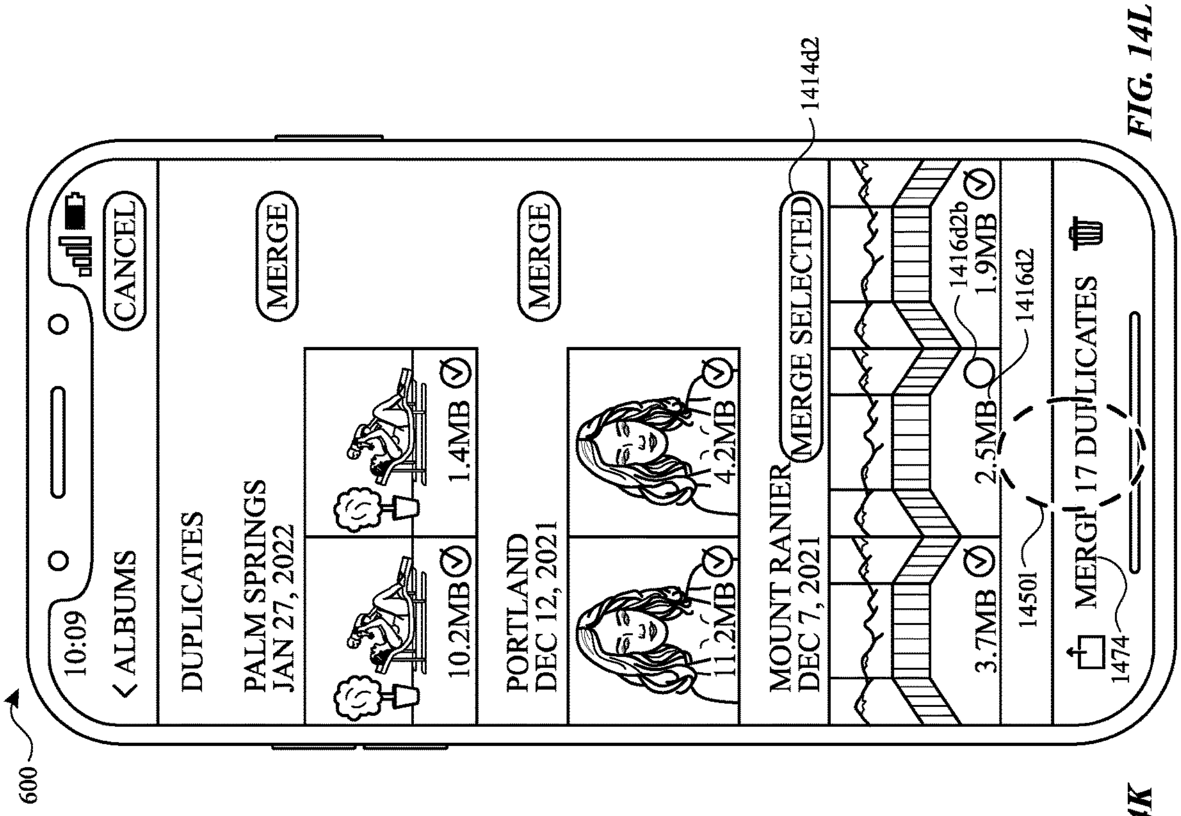
Figure 14K:
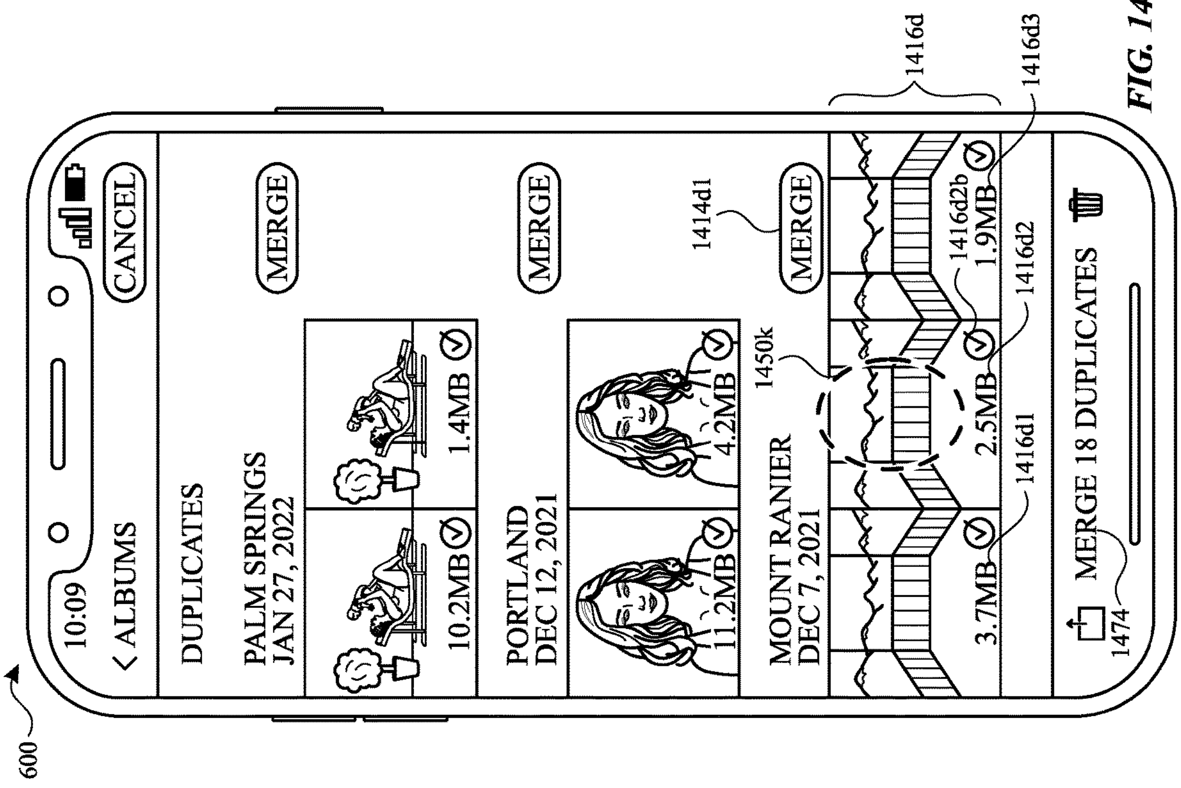

As illustrated in FIG. 14K, in response to detecting tap input 1450*j*, computer system 600 display a selection control on multiple media items on duplicates album user interface 1406, including selection control 1416*d*2*b* on media item 1416*d*2. At FIG. 14K, computer system 600 the selection controls as being selected (e.g., with a check mark). In response to detecting tap input 1450*j*, computer system 600 also displays merge-all-selected control 1474, which indicates that 18 duplicate media items are selected to be merged. At FIG. 14K, computer system 600 detects tap input 1450*k* corresponding to selection control 1416*d*2*b*. As illustrated in FIG. 14L, in response to detecting tap input 1450*k*, computer system 600 ceases to display selection control 1416*d*2*d* as being selected and updates merge control 1414*d*1 (e.g., "MERGE") of FIG. 14K to be merge-selected control 1414*d*2 (e.g., "MERGE SELECTED"). In some embodiments, in response to detecting an input on merge-selected control 1414*d*2, computer system 600 initiates a process (and/or or merges) to merge media items 1416*d*1 and 1416*d*3 without merging any other media items (e.g., including media item 1416*d*2 because selected control 1414*d*2 is not selected).

Figure 14M:
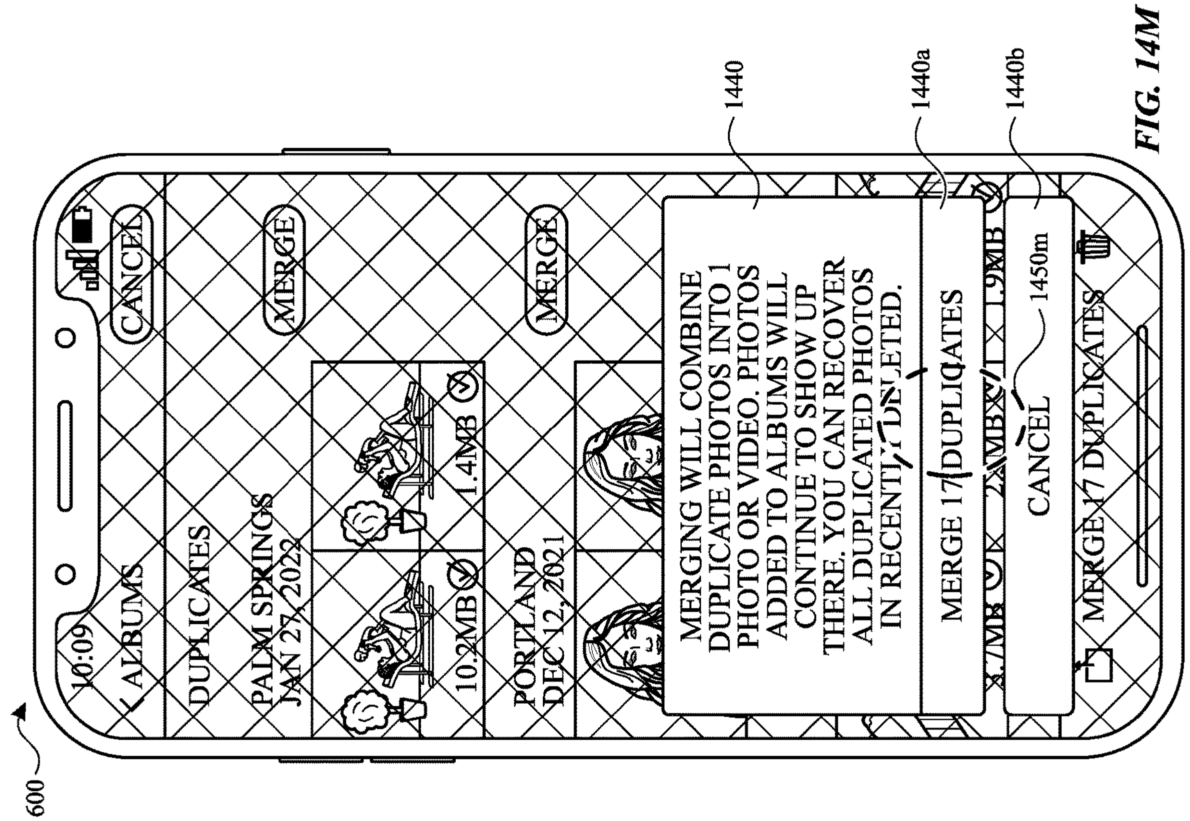

As illustrated in FIG. 14L, in response to detecting tap input 1450*k*, computer system 600 updates merge-all-selected control 1474 to indicate that 17 duplicate media items are selected to be merged (e.g., instead of 18 duplicate media items in FIG. 14K because merge-selected control 1414*d*2 was deselected). At FIG. 14L, computer system 600 detects tap input 14501 on merge-all-selected control 1474. As illustrated in FIG. 14M, in response to detecting tap input 14501, computer system displays prompt 1440 that indicates 17 duplicate media items will be merged. Prompt 1440 includes confirm merge control 1440*a* and cancel merge control 1440*b*. At FIG. 14M, computer system 600 detects tap input 1450*m* on confirm merge control 1440*a*. As illustrated in FIG. 14M, in response to detecting tap input 1450*m*, computer system 600 performs (or initiates a process to perform) a bulk merge operation. To perform the bulk merge operation, computer system 600 merges the 17 duplicates media items, where the selected media items are merged with their set of duplicate media items.

FIG. 15 is a flow diagram illustrating methods for managing duplicate media. FIG. 15 is a flow diagram illustrating methods for managing duplicate media using a computer system in accordance with some embodiments. Method 1500 is performed at a computer system (e.g., 600) (e.g., a smartphone, a desktop computer, a laptop, a tablet, or a head mounted device (e.g., a head mounted augmented reality and/or extended reality device)) that is in communication with a display generation component (e.g., a display controller, a touch-sensitive display system, and/or a head mounted display system) and one or more input devices (e.g., a touch-sensitive surface; a mouse; a keyboard). In some embodiments, the computer system is in communication with one or more input devices (e.g., a touch-sensitive surface, a camera, a mouse, and/or a trackpad) and/or one or more output devices (e.g., one or more display generation components, speakers, and/or sensors (e.g., haptic sensors and/or light sensors)).

While displaying, via the display generation component, an indication (e.g., 1418*a*-1418*c* and/or 1416*a*-146*c*) that a first media item (e.g., media item in 1416*a*-1416*d*) (e.g., a photograph, a video, and/or an audio clip) is identified as a duplicate of a second media item (e.g., media item in 1416*a*-1416*d*) (and/or that the second media item is identified as a duplicate of the first media item), the computer system display (1502), via the display generation component, a respective merge control (e.g., 1414*a*-1414*d*2, 1420*c*, and/or 1440*a*). In some embodiments, the first media item corresponds to first metadata (e.g., 1424*b*, 1490*a*-1490*c*, and/or 1492) (e.g., a set of data that describes and gives information (e.g., one or more of tags, favorite status (e.g., whether the media item was favorited or not), location of media item in an album, identification and/or representation of faces (e.g., of people and/or animals) and/or objects in the media item, location that corresponds to the media item, caption for the media item, personal library status, shared library status, and/or user modified date/time) about a media item) and the second media item corresponds to second metadata (e.g., 1424*b*, 1490*a*-1490*c*, and/or 1492) that is different from the first metadata. In some embodiments, the first media item does not correspond to the second metadata and the second media item does not correspond to the first metadata. In some embodiments, the computer system ceases to and/or forgoes displaying the respective merge control in accordance with a determination that the first media item is not a duplicate of the second media item. In some embodiments, the first media item is a different media item (e.g., a separately stored from and/or stored in a different file from) than the second media item.

While displaying the respective merge control (e.g., 1414*a*-1414*d*2, 1420*c*, and/or 1440*a*) (e.g., concurrently with a first representation of the first media item and the second representation of the second media item), the computer system detects (1504), via the one or more input devices, a first set of one or more inputs that includes an input (e.g., 1450*b*2) (e.g., a tap input or, in some embodiments, a non-tap input (e.g., a dragging input, an air gesture, a mouse click, a gaze input, a voice input, and/or a press-and-hold input)) directed to the respective merge control (e.g., 1414*a*-1414*d*2, 1420*c*, and/or 1440*a*).

In response to (1506) detecting the first set of one or more inputs that includes the input directed to the respective merge control (e.g., 1414*a*-1414*d*2, 1420*c*, and/or 1440*a*), the computer system adds (1508) (e.g., merging) at least a portion of the first metadata (e.g., 1424*b*, 1490*a*-1490*c*, and/or 1492) to the second metadata (e.g., 1424*b*, 1490*a*-1490*c*, and/or 1492) (e.g., such that the second media item corresponds to the portion of the first metadata that was added and not to a portion of the first metadata that was not added) (e.g., that corresponds to the second media item).

In response to (1506) detecting the first set of one or more inputs that includes the input directed to the respective merge control (e.g., 1414*a*-1414*d*2, 1420*c*, and/or 1440*a*), the computer system initiates (1510) a process for deleting the first media item (e.g., media item in 1416*a*-1416*d*) (e.g., deleting the first media item by removing the first media item from a storage location and/or ceasing display of the first media item or marking the media item for deletion (e.g., automatic deletion after a predetermined amount of time has passed since the media item was deleted and/or other predetermined deletion criteria have been met (e.g., as discussed above in relation to method 1200)) (e.g., and at least a portion of the first metadata that was not added to the second metadata). In some embodiments, in response to detecting a request to delete the first media item that does not corresponding to a request to merge the first media item and the second media item (e.g., does not include detecting the input directed to a respective merge control), the computer system does not add a portion (or any portion) of the first metadata to the second metadata and deletes the first media item. Adding at least a portion of the first metadata to the second metadata and initiating a process for deleting the first media item in response to detecting the first set of one or more inputs that includes the input directed to the respective merge control reduces the number of inputs needed to manage the removal of duplicate media items by allowing the user to preserve metadata from duplicate media items that have selected for removal in metadata for a duplicate media item that is being preserved; thereby, reducing the number of inputs needed to perform an operation.

In some embodiments, initiating the process for deleting the first media item includes removing the first media item (e.g., media item in 1416*a*-1416*d*) from (e.g., and/or removing display of a the first media item from and/or ceasing to display the first media item in) a media library (e.g., hiding the first media item from viewing by a user and/or hiding the first media item from standard browsing and/or searching views of the media library) before deleting the first media item (e.g., without removing the second media item from the media library (e.g., a shared collection of media items and/or a personal collection of media items, as discussed above in relation to method 800). Initiating a process for deleting the first media item that includes removing the first media item from a media library before deleting the first media item in response to detecting the first set of one or more inputs that includes the input directed to the respective merge control reduces the number of inputs needed to manage the removal of duplicate media items by allowing the user to preserve metadata from duplicate media items that have selected for removal in metadata for a duplicate media item that is being preserved and provide feedback that the first media item has been selected for removal; thereby, reducing the number of inputs needed to perform an operation and providing improved visual feedback.

In some embodiments, adding at least the portion of the first metadata (e.g., 1424*b*, 1490*a*-1490*c*, and/or 1492) to the second metadata (e.g., 1424*b*, 1490*a*-1490*c*, and/or 1492) includes replacing a portion of the second metadata with at least the portion of the first metadata. In some embodiments, as a part of adding the portion of the first metadata to the second metadata, the computer system does not replace a portion of the second metadata with a portion of the first metadata. Replacing a portion of the second metadata with at least the portion of the first metadata in response to detecting the first set of one or more inputs that includes the input directed to the respective merge control reduces the number of inputs needed to manage the removal of duplicate media items by allowing the user to preserve metadata from duplicate media items that have selected for removal in metadata for a duplicate media item that is being preserved; thereby, reducing the number of inputs needed to perform an operation.

In some embodiments, the first metadata (e.g., 1424*b*, 1490*a*-1490*c*, and/or 1492) (and/or the second metadata) includes metadata selected from the group consisting of: one or more tags (e.g., one or more categories, phrases, and/or designations that correspond to a media item), one or more preference identifiers (e.g., 1424*b*) (e.g., such as a favorite status (e.g., whether the media item was favorited or not)), an album location (e.g., which album or albums the media is located in, and/or a location of media item in one or more albums), one or more subject identifiers (e.g., 1492) (e.g., faces and/or identifiers that are associated with a subject (e.g., of people, animals, and/or objects) represented in a media item), one or more captions (e.g., 1490*c*1), one or more library statuses (e.g., shared library and/or personal library), one or more modification dates (e.g., data that a media item was modified), one or more modification times (e.g., time that a media item was modified), and a combination thereof (e.g., as discussed above in relation to FIGS. 14D-14F). Adding at least a portion of the first metadata (or second metadata) to the second metadata, where the metadata is selected from the group consisting of: one or more tags, one or more preference identifiers, an album location, one or more subject identifiers, one or more captions, one or more library statuses one or more modification dates, one or more modification times, and a combination thereof reduces the number of inputs needed to manage the removal of duplicate media items by allowing the user to preserve particular types of metadata from duplicate media items that have selected for removal in metadata for a duplicate media item that is being preserved; thereby, reducing the number of inputs needed to perform an operation.

In some embodiments, the indication (e.g., 1418*a*-1418*c* and/or 1416*a*-146*c*) further indicates that a third media item (e.g., media item in 1416*a*-1416*d*) has been identified as a duplicate of the first media item (e.g., media item in 1416*a*-1416*d*) and the second media item (e.g., media item in 1416*a*-1416*d*) (e.g., where the third media item is different from (e.g., a separately stored from and/or stored in a different file and/or a different memory location from the first media item and the second media item)). In some embodiments, in response to detecting the first set of one or more inputs that includes the input directed to the respective merge control (e.g., 1414*a*-1414*d*2, 1420*c*, and/or 1440*a*), the computer system initiates a process for deleting the third media item (e.g., media item in 1416*a*-1416*d*) (e.g., using one or more similar techniques as described above in relation to the process for deleting the first media item). Initiating a process for deleting the first media item and initiating a process for deleting the third media item in response to detecting the first set of one or more inputs that includes the input directed to the respective merge control reduces the number of inputs needed to manage the removal of multiple duplicate media items by allowing the user to preserve metadata from duplicate media items that have selected for removal in metadata for a duplicate media item that is being preserved; thereby, reducing the number of inputs needed to perform an operation.

In some embodiments, the third media item (e.g., media item in 1416*a*-1416*d*) corresponds to third metadata (e.g.,

1424*b*, 1490*a*-1490*c*, and/or 1492) that is different from the second metadata (and, in some embodiments, the first media item and the second media item do not correspond to the third metadata and/or the third metadata is not connected to and/or associated with (e.g., stored with and/or coupled with) the first media item and the second media item). In some embodiments, in response to detecting the first set of one or more inputs that includes the input directed to the respective merge control (e.g., 1414*a*-1414*d*2, 1420*c*, and/or 1440*a*), the computer system adds (e.g., merges) at least a portion of the third metadata to the second metadata (e.g., after, while, and/or before adding at least the portion of the first metadata to the second metadata). In some embodiments, adding at least the portion of the third metadata to the second metadata includes replacing and/or overwriting a portion of the second metadata (e.g., using an earlier date or a different location than are associated with the media item currently if the different date and/or location is determined to be more accurate, for example, using the earliest date or using a user-specified date and/or location (e.g., overwriting a date in the second metadata with a data from the third metadata). Adding at least a portion of the first metadata and at least a portion of the third metadata to the second metadata reduces the number of inputs needed to manage the removal of duplicate media items by allowing the user to preserve metadata from multiple duplicate media items that have selected for removal in metadata for a duplicate media item that is being preserved; thereby, reducing the number of inputs needed to perform an operation.

In some embodiments, adding at least the portion of the first metadata (e.g., 1424*b*, 1490*a*-1490*c*, and/or 1492) to the second metadata (e.g., 1424*b*, 1490*a*-1490*c*, and/or 1492) includes maintaining at least a portion of (and, in some embodiments, all of) the second metadata as a part of the second metadata (e.g., preserving at least a portion of the second metadata (e.g., as being a part of the second metadata and/or adding at least the portion of the first metadata to the second metadata without removing at least a portion of the second metadata) (e.g., preserving one or more tags and/or faces in the second metadata while adding one or more tags and/or faces from the first metadata to the second metadata)). Maintaining at least a portion of the second metadata as a part of the second metadata as a part of adding at least a portion of the first metadata to the second metadata in response to detecting the first set of one or more inputs that includes the input directed to the respective merge control reduces the number of inputs needed to manage the removal of duplicate media items by allowing the user to preserve metadata from duplicate media items that have selected for removal in metadata for a duplicate media item that is being preserved while also preserving at least a portion of the metadata for the duplicate media item that is being preserved; thereby, reducing the number of inputs needed to perform an operation.

In some embodiments, the first media item (e.g., media item in 1416*a*-1416*d*) is identified as the duplicate of the second media item (e.g., media item in 1416*a*-1416*d*) in accordance with a determination that at least one of the first media item and the second media item is not an edited media item (e.g., media item that has been edited from a common ancestor (e.g., great-grandparent, grandparent, parent, etc.)) (e.g., media items, where one of the media items have been edited from the other media item (e.g., first media item edited from second media item or second media item edited from the first media item)). In some embodiments, the second media item are a part of a first set of media items that are identified as the duplicate of the second media item, and wherein the first set of media items that are identified as the duplicate of the second media do not include a media item that has been edited (e.g., after being captured) (e.g., that is identified as the duplicate of the second media item). Having the first media item is identified as the duplicates of the second media item in accordance determination that the first media item and the second media items are not edited media items allows the computer system to automatically identify duplicate media items that are not edited media items of each other, which optionally provides relevant media items for deletion without requiring further user input; thereby, performing an operation when a set of conditions has been met without requiring further user input.

In some embodiments, while displaying the indication (e.g., 1418*a*-1418*c* and/or 1416*a*-146*c*) (e.g., and the respective merge control), the computer system: in accordance with a determination that a file size of the first media item (e.g., media item in 1416*a*-1416*d*) is larger than a file size of the second media item (e.g., media item in 1416*a*-1416*d*), displays, via the display generation component, a first representation (e.g., visual representation and/or a thumbnail) of the first media item and a first representation of the second media item in a first order (e.g., as discussed in relation to FIG. 14B) (e.g., displaying the first media item at a first position (e.g., on the display-generation component, in a list; and in space) and displaying the second media item at a second position (e.g., on a display, in a list; and in space) that is different from the first position) (e.g., the duplicate media items (e.g., and/or indications (e.g., a shape and/or text representing the duplicate media items) are ordered; and in accordance with a determination that the file size of the first media item is smaller than the file size of the second media item, displays, via the display generation component, the first representation of the first media item and the first representation of the second media item in a second order that is different from the first order (e.g., as discussed in relation to FIG. 14B) (e.g., displaying the first media item at the second position and displaying the second media item at the first position). Displaying the first representation of the first media item and the first representation of the second media item in a particular order based on the relative file sizes of the first media item and the second media allows the computer system to provided visual feedback to the user concerning the media item that will be preserved in response to detecting the first set of one or more inputs that includes the input directed to the respective merge control.

In some embodiments, while displaying the indication (e.g., 1418*a*-1418*c* and/or 1416*a*-146*c*) (e.g., and the respective merge control), the computer system displays, via the display generation component, a second representation of the first media item (e.g., media item in 1416*a*-1416*d*) concurrently with an indication (e.g., 1416*a*1*a*-1416*a*3*a*) of a respective file size of the first media item that is displayed near (e.g., on top of, adjacent to, and/or closer to the representation of the first media item than the representation of the second media item) (e.g., concurrently with a second representation of the second media item that is displayed with an indication of a respective file size of the second media item that is displayed near the representation of the second media item) the second representation of the first media item. Displaying an indication of a respective file size of the first media item that is displayed near the second representation of the first media item allows the computer system to provided visual feedback to the user concerning the relative sizes of the media items and/or the media item that will be preserved in response to detecting the first set of one or more inputs that includes the input directed to the respective merge control.

In some embodiments, while displaying the indication (e.g., 1418a-1418c and/or 1416a-146c) (e.g., and the respective merge control), the computer system displays, via the display generation component, a third representation of the first media item (e.g., media item in 1416a-1416d) (and/or a third representation of the second media item) that is displayed at a first size. In some embodiments, while displaying the third representation of the first media item, the computer system detects an input (e.g., 1450b1) (e.g., a tap input or, in some embodiments, a non-tap input (e.g., a dragging input, an air gesture, a mouse click, a gaze input, a voice input, and/or a press-and-hold input)) directed to the third representation of the first media item (e.g., media item in 1416a-1416d). In some embodiments, in response to detecting the input directed to the third representation of the first media item, the computer system displays, via the display generation component, a media navigation user interface (e.g., 1408) that includes a fourth representation (e.g., 1424a) of the first media item that is displayed at a second size that is larger than the first size (e.g., an enlarged representation as compared to the third representation of the first media item) (e.g., where the fourth representation is different from the third representation). In some embodiments, while displaying the media navigation user interface that includes the fourth representation of the first media item, the computer system detects an input (e.g., a tap input or, in some embodiments, a non-tap input (e.g., a dragging input, an air gesture, a mouse click, a gaze input, a voice input, and/or a press-and-hold input)) directed to the media navigation user interface. In some embodiments, in response to detecting the input directed to the media navigation user interface, the computer system displays, via the display generation component, a second representation (e.g., an enlarged representation) of the second media item in the media navigation user interface. In some embodiments, in response to detecting the input directed to the third representation of the first media item, the computer system ceases to display the respective merge control. Displaying, via the display generation component, a media navigation user interface that includes a fourth representation of the first media item in response to detecting the input directed to the third representation of the first media item provides control over the computer system by allowing a user to control when the media navigation user interface is displayed; thereby, providing additional control options without cluttering the user interface with additional displayed controls.

In some embodiments, while displaying the media navigation user interface (e.g., 1408), the computer system detects a request to perform an operation (e.g., select, delete, and/or share the respective media item) on a media item that is displayed at the second size (e.g., a currently selected media item; an item that is currently in focus) (e.g., as discussed in relation to FIGS. 14C and 1424a-1424d). In some embodiments, in response to detecting the request to perform the operation using the respective media item and in accordance with a determination that the first media is currently displayed at the second size (e.g., an enlarged representation of the first media item was displayed while the request to perform the operation using the respective media item was detected), the computer system performs the operation on (e.g., using) the first media item (e.g., without using the second media item) (e.g., as discussed in relation to FIGS. 14C and 1424a-1424d). In some embodiments, in response to detecting the request to perform the operation using the respective media item and in accordance with a determination that the second media item is currently displayed at the second size (e.g., an enlarged representation of the second media item was displayed while the request to perform the operation using the respective media item was detected), the computer system performs the operation on the second media item (e.g., without using the first media item) (e.g., as discussed in relation to FIGS. 14C and 1424a-1424d). Performing an operation using the first media item or using the second media item based on prescribed conditions allows the computer system to automatically perform an operation for a particular type of media item; thereby, performing an operation when a set of conditions has been met.

In some embodiments, the first media item and the second media item are included in a second set of media items (e.g., 1416a-1416d) that are identified as duplicates of the second media item. In some embodiments, the second set of media items (e.g., 1416a-1416d) are accessible in (e.g., available to be navigated to, can be displayed in, and/or available to be displayed) the media navigation user interface and one or more media items (e.g., any media item) outside of (e.g., that is not and/or from) the second set of media items are not accessible in the media navigation user interface (e.g., as discussed in relation to FIGS. 14C and 1424a-1424d).

In some embodiments, the indication (e.g., 1418a-1418c and/or 1416a-146c) and the respective control (e.g., 1414a-1414d) are concurrently displayed in a first user interface (e.g., a duplicate management user interface). In some embodiments, the computer system displays, concurrently with the indication in the first user interface, an indication that a fifth media item (e.g., a photograph, a video, and/or an audio clip) is identified as a duplicate of a sixth media item. In some embodiments, the fifth media item is not identified as a duplicate of the second media item (and, in some embodiments, or the first media item) (e.g., the first user interface includes a first set of duplicate media items and a separate, second set of duplicate media items). In some embodiments, the sixth media item is not identified as a duplicate of the second media item. Concurrently displaying, concurrently with the indication in the first user interface, an indication that a fifth media item is identified as a duplicate of a sixth media item provides feedback concerning multiple sets of duplicate media items at an instance in time; thereby, providing improved visual feedback to the user.

In some embodiments, the computer system displays, concurrently with the respective control in the first user interface, a second respective control (e.g., 1414a-1414d2, 1420c, and/or 1440a). In some embodiments, the fourth media item (e.g., media item in 1416a-1416d) corresponds to fourth metadata and the fifth media item corresponds to fifth metadata that is different from the fourth metadata. In some embodiments, while displaying the second respective merge control (e.g., 1414a-1414d2, 1420c, and/or 1440a), the computer system detects, via the one or more input devices, a second set of one or more inputs that includes an input (e.g., a tap input or, in some embodiments, a non-tap input (e.g., a dragging input, an air gesture, a mouse click, a gaze input, a voice input, and/or a press-and-hold input)) directed to the second respective merge control. In some embodiments, in response to detecting the second set of one or more inputs that includes the input directed to the second respective merge control (e.g., 1414a-1414d2, 1420c, and/or 1440a), the computer system: adds (e.g., merging) at least a portion of the fourth metadata to the fifth metadata (e.g., without adding at least the portion of the first metadata to the second metadata (e.g., and/or the first metadata)); and initiates a process for deleting the fourth media item (e.g., without initiating a process for deleting the first media item) (e.g., without initiating a process for deleting the second media item). Adding at least a portion of the fourth metadata to the fifth metadata and initiating a process for deleting the fourth media item in response to detecting the second set of one or more inputs that includes the input directed to the second respective merge control (e.g., that is displayed while the respective merge control is displayed) allows the computer system to provide additional control options for deleting a different set of media items; thereby, reducing the number of inputs needed to perform an operation and providing additional control options.

In some embodiments, the computer system displays, in the first user interface (and, in some embodiments, concurrently with the first and/or second respective control), a third respective control (e.g., 1420*c* and/or 1440*a*) (e.g., a merge all and/or merge multiple control). In some embodiments, while displaying the third respective merge control (e.g., 1420*c* and/or 1440*a*), the computer system detects, via the one or more input devices, a third set of one or more inputs that includes an input (e.g., a tap input or, in some embodiments, a non-tap input (e.g., a dragging input, an air gesture, a mouse click, a gaze input, a voice input, and/or a press-and-hold input)) directed to the third respective merge control. In some embodiments, in response to detecting the second set of one or more inputs: that includes the input directed to the third respective merge control, the computer system: adds (e.g., merging) at least a second portion (e.g., that is the same or different than the portion of the first metadata) of the first metadata to the second metadata; adds at least a second portion (e.g., that is the same or different than the portion of the fourth metadata) of the fourth metadata to the fifth metadata; initiates a process for deleting the first media item; and initiates a process for deleting the fourth media item. Adding at least a second portion of the first of the fourth metadata to the fifth metadata, adding at least a second portion of the fourth metadata to the fifth metadata, initiating a process for deleting the first media item, and initiating a process for deleting the fourth media item in response to detecting the second set of one or more inputs: that includes the input directed to the third respective merge control allows a user to delete multiple sets of duplicate media items with a reduce number of inputs; thereby, reducing the number of inputs needed to perform an operation.

In some embodiments, while displaying, via the display generation component, an indication that a sixth media item (e.g., media item in 1416*a*-1416*d*) is identified as a duplicate of a seventh media item (e.g., media item in 1416*a*-1416*d*), the computer system displays, via the display generation component, a fourth respective merge control (e.g., 1414*a*-1414*d*, 1420*c*, and/or 1440*a*). In some embodiments, the sixth media item corresponds to sixth metadata and the seventh media item corresponds to seventh metadata that is different from the sixth metadata. In some embodiments, while displaying the fourth respective merge control (e.g., concurrently with the respective merge control), the computer system detects, via the one or more input devices, a fourth set of one or more inputs that includes an input (e.g., a tap input or, in some embodiments, a non-tap input (e.g., a dragging input, an air gesture, a mouse click, a gaze input, a voice input, and/or a press-and-hold input)) directed to the fourth respective merge control. In some embodiments, in response to detecting the fourth set of one or more inputs (e.g., 1450*b*2 and/or 1450*c*3) that includes the input directed to the fourth respective merge control, the computer system: in accordance with a determination that the sixth media item satisfies a respective set of criteria and the seventh media item does not satisfy the respective set of criteria, wherein the respective set of criteria includes a criterion that is satisfied when a respective media item has a higher image quality (e.g., has a larger file size, a higher resolution and/or a lower compression) than an image quality of other media items that are identified as a duplicate of the respective media item (e.g., any other media item that are identified as a duplicate of the respective media item), initiates a process for deleting the seventh media item without initiating a process for deleting the sixth media item (e.g., preserving the sixth media item) (and, in some embodiments, adding a portion of the metadata corresponding to the seventh media item to metadata corresponding to the sixth media item); and in accordance with a determination that the sixth media item does not satisfy the set of criteria and the seventh media item meets the respective set of criteria, initiates the process for deleting the sixth media item without initiating the process for deleting the seventh media item (e.g., preserving the seventh media item) (and, in some embodiments, adding a portion of the metadata corresponding to the sixth media item to metadata corresponding to the seventh media item). In some embodiments, the process for deleting the first media item was initiated in accordance with a determination that the first media item is smaller than or has a lower resolution than the second media item). In some embodiments, in response to detecting the first set of one or more inputs that includes the input directed to the respective merge control, the computer system initiates a process to delete duplicate media items that are smaller than the largest media item (e.g., and/or not smaller than the largest media item) that is a duplicate of those media items. In some embodiments, in response to detecting the first set of one or more inputs that includes the input directed to the respective merge control, the computer system initiates a process to delete duplicate media items that have a lower resolution than the highest resolution media item that is a duplicate of those media items. In some embodiments, in response to detecting the first set of one or more inputs that includes the input directed to the respective merge control, the computer system adds metadata corresponding to the duplicate media items that are smaller than the largest media item of the duplicate media items to the metadata that corresponds to the largest media item of the duplicate media items. In some embodiments, in response to detecting the first set of one or more inputs that includes the input directed to the respective merge control, the computer system adds metadata corresponding to the duplicate media items that have a lower resolution than the highest resolution media item of the duplicate media items to the metadata that corresponds to the highest resolution media item of the duplicate media items. In some embodiments, the computer system initiates a process to delete duplicate media items that are smaller than the largest media item that is a duplicate of those media items because the largest media item often results the largest media item having more data than the data that was captured by one or more cameras than the smaller media item (e.g., data that generates better images). Initiating the process for deleting the sixth media item without initiating the process for deleting the seventh media item or initiating the process for deleting the seventh media without initiating the process for deleting the seventh media item when prescribed conditions are met allows the computer system to automatically select a media item from the set of duplicate media items that should be kept (and/or not deleted) without requiring further user input; thereby, performing an operation when a set of conditions has been met without requiring further user input.

As described below, method 1500 provides an intuitive for managing duplicate media. The method reduces the cognitive burden on a user for recommending media items for one or more media libraries, thereby creating a more efficient human-machine interface. For battery-operated computing devices, enabling a user to recommend media items for one or more media libraries faster and more efficiently conserves power and increases the time between battery charges.

Note that details of the processes described above with respect to method 1500 (e.g., FIG. 15) are also applicable in an analogous manner to the methods described above. For example, method 800 optionally includes one or more of the characteristics of the various methods described in relation to method 1500. For example, method 800 can be used to create a shared media library between one or more people and method 1500 can be used to manage duplicate media items in the shared library. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the sharing media content to media libraries. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recommend media content for sharing with other users. Accordingly, use of such personal information data enables users to share media content with other users and enables the computer system to recommend other users with which the media content can be shared. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the shared media libraries, the present technology can be configured to allow users to select to "opt in" or "opt out" of participation in the collection of personal information data during registration for services or anytime thereafter. In another example, users can select whether or not to share media content with others, users can select the particular media content to share with other users, and users can select the users with which the media content is shared. In another example, users are notified when other users change media items in certain manners. In a further another example, users can decide whether they want to cease sharing media items with other users and/or have the opportunity to remove media items that they have shared. In yet another example, users can limit how captured media items are automatically shared with participants of the shared libraries. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media content can be selected and shared with users by inferring preferences based on non-personal information data or a bare minimum amount of personal information, such as the content being requested by the device associated with a user, other non-personal information available to the media sharing services, or publicly available information.

What is claimed is:

1. A computer system configured to communicate with a display generation component, comprising:

one or more processors; and memory storing one or more programs configured to be executed by the one or more processors, the one or more programs including instructions for:

detecting a request to share media items from a first collection of media items with a set of one or more users;

in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein:

the plurality of media items that are recommended to be shared with the set of one or more users includes:

a first set of one or more media items that correspond to a first event at which at least one user in the set of one or more users is determined to have been present, wherein the first event occurred during a first period of time; and a second set of one or more media items that correspond to a second event at which at least one user in the set of one or more users is determined to have been present, wherein the second event occurred during a second period of time that is different from the first period of time; and the plurality of media items are recommended based on the set of one or more users that are identified in the request;

while displaying the recommendation to share the plurality of media items with the set of one or more users in the second collection of media items, detecting at least a first user input of a set of one or more user inputs, wherein the first user input is a request to add a respective user for identification in the second collection of media items, wherein the respective user is not a user in the set of one or more users; and in response to the set of one or more user inputs, adding a representation of the respective user to a set of representations of one or more users without adding the respective user to the set of one or more users, wherein the set of representations of one or more users are used to identify one or more media items to be shared with the set of one or more users in the second collection of media items.

2. The computer system of claim 1, wherein the plurality of media items does not include one or more media items from the first collection of media items that correspond to an event that was not attended by at least one user in the set of one or more users.

3. The computer system of claim 1, wherein the plurality of media items does not include one or more media items from the first collection of media items that correspond to a third event, and wherein the third event was determined to be attended by an organizer of the second collection of media items and not attended by one or more users in the set of one or more users that are not an organizer of the second collection of media items.

4. The computer system of claim 1, the one or more programs further including instructions for:

in response to detecting the request to share media items from the first collection of media items with the set of one or more users and in accordance with a determination that the first set of criteria is not satisfied, forgoing displaying, via the display generation component, the recommendation to share the plurality of media items with the set of one or more users in the second collection of media items.

5. The computer system of claim 1, wherein, after the second collection of media items is shared with the set of one or more users and after the set of one or more users have accepted an invite to share the second collection of media items, the set of one or more users can modify the second collection of media items.

6. The computer system of claim 1, the one or more programs further including instructions for:

before detecting the request to share media items from the first collection of media items with the set of one or more users:

in accordance with a determination that one or more candidate users satisfy a second set of criteria, displaying, via the display generation component, an indication that the one or more candidate users are suggested to be included in the set of one or more users.

7. The computer system of claim 1, the one or more programs further including instructions for:

before detecting the request to share media items from the first collection of media items with the set of one or more users, providing a list of users to be included in the set of one or more users;

while providing the list of users, detecting a request to modify the list of users; and in response to detecting the request to modify the list of users, modifying the list of users.

8. The computer system of claim 1, the one or more programs further including instructions for:

detecting a request to add a first user to the set of one or more users; and in response to detecting the request to add the first user to the set of one or more users and in accordance with a determination that the first user is not associated with at least one media item that can be shared with the set of one or more users, displaying, via the display generation component, an indication that the first user should be associated with one or more respective media items.

9. The computer system of claim 1, the one or more programs further including instructions for:

in response to detecting the request to add the respective user for identification in the second collection of media items and in accordance with a determination that the respective user has not been associated with a name, displaying, via the display generation component, an indication that a name should be associated with the respective user.

10. The computer system of claim 1, wherein detecting the request to share media items from the first collection of media items with the set of one or more users includes detecting selection of a first control option, the one or more programs further including instructions for:

in response to detecting the request to share media items from the first collection of media items with the set of one or more users and in accordance with a determination that the first control option was selected, initiating a process to share all of the media items from the first collection of media items with the set of one or more users.

11. The computer system of claim 1, the one or more programs further including instructions for:

after displaying, via the display generation component, the recommendation to share the plurality of media items with the set of one or more users and after selecting one or more users for identification, displaying, via the display generation component, one or more indications that a selected one or more users can be associated with one or more media items in one or more respective sets of media items.

12. The computer system of claim 11, wherein displaying, via the display generation component, one or more indications that the selected one or more users can be associated with one or more media items in the one or more respective sets of media items includes:

displaying a first indication that a second user of the selected one or more users can be associated with one or more media items a first respective set of media items in the one or more respective sets of media items;

after displaying the first indication, detecting that a user of the computer system has provided one or more decisions regarding whether the one or more media items in the first respective set of media items should be associated with the second user; and after detecting that the user of the computer system has provided the one or more decisions regarding whether the one or more media items in the first respective set of media items should be associated with the second user, displaying, via the display generation component, a second indication that a third user of the selected one or more users can be associated with one or more media items in a second respective set of media items in the one or more respective sets of media items.

13. The computer system of claim 11, wherein a fourth user is included in the selected one or more users; and wherein displaying, via the display generation component, the one or more indications that the selected one or more users can be associated with one or more media items in one or more respective sets of media items includes:

in accordance with a determination that a number of media items in the one or more respective sets of media items corresponding to the fourth user in the selected one or more users is above a first threshold number of media items, displaying, via the display generation component, a fourth indication that the fourth user in the selected one or more users can be associated with at least one media item in the one or more respective sets of media items; and in accordance with a determination that the number of media items in the one or more respective sets of media items corresponding to the fourth user in the selected one or more users is not above the first threshold number of media items, forgoing displaying the fourth indication.

14. The computer system of claim 13, wherein displaying, via the display generation component, the one or more indications that the selected one or more users can be associated with one or more media items in one or more respective sets of media items includes:

in accordance with a determination that the number of media items in the one or more respective sets of media items corresponding to the fourth user in the selected one or more users is not above a second threshold number of media items, displaying, via the display generation component, an indication that an initial set of one or more other media items can be used to identify the fourth user.

15. The computer system of claim 1, the one or more programs further including instructions for:

after displaying the recommendation to share the plurality of media items with the set of one or more users in the second collection of media items and prior to sharing the second collection of media items with the set of one or more users, displaying, via display generation component, a review control that, when selected, causes the computer system to display a review user interface that includes a plurality of selected media items that are to be shared with the set of one or more users.

16. The computer system of claim 15, the one or more programs further including instructions for:

while displaying the review control, detecting a first input directed to the review control; and in response to detecting the first input directed to the review control, displaying the review user interface that includes one or more media items in the second collection of media items;

while displaying the review user interface that the one or more media items in the second collection of media items, detecting one or more inputs that includes an input that is directed to a first media item in the second collection of media items; and in response detecting one or more inputs that includes the input that is directed to the first media item in the second collection of media items:

in accordance with a determination that the one or more inputs includes a first set of inputs, removing the first media item from the second collection of media items; and in accordance with a determination that the one or more inputs includes a second set of inputs that are different from the first set of inputs, adding the first media item to the second collection of media items.

17. The computer system of claim 15, the one or more programs further including instructions for:

while displaying the review control, detecting a second input directed to the review control; and in response to detecting the second input directed to the review control, displaying the review user interface, including:

in accordance with a determination that a second media item in the plurality of selected media items satisfies a set of privacy criteria, displaying a second media item; and in accordance with a determination that the second media item in the plurality of selected media items does not satisfy the set of privacy criteria, forgoing displaying the second media item.

18. The computer system of claim 15, the one or more programs further including instructions for:

after displaying the recommendation to share the plurality of media items with the set of one or more users in the second collection of media items and prior to sharing the second collection of media items with the set of one or more users, displaying, via the display generation component, a skip control;

while displaying the skip control, detecting an input directed to the skip control; and in response to detecting the input directed to the skip control, forgoing displaying the review user interface.

19. The computer system of claim 1, wherein the first set of one or more media items that correspond to the first event includes a first respective media item that has been determined to include a representation of at least one of the set of one or more users.

20. The computer system of claim 1, wherein:

detecting the request to share media items from the first collection of media items with the set of one or more users includes:

displaying one or more timeframe options for selecting media items from the first collection of media items; and in response to detecting a set of one or more inputs directed to the one or more timeframe options, determining that a first timeframe has been selected; and the one or more programs further include instructions for:

after determining that the first timeframe has been selected and in accordance with a determination that a second set of criteria is satisfied, wherein the second set of criteria includes a criterion that is satisfied when a determination is made that a respective media item from the first collection of media items was captured during a selected time frame, displaying a second plurality of media items that are recommended to be shared with the set of one or more users, wherein the second plurality of media items that are recommended to be shared with the set of one or more users were captured during the first timeframe.

21. The computer system of claim 20, wherein the one or more timeframe options include a start date option, and wherein the start date option includes a default start date that is selected based on at least one user in the set of one or more users started being represented in media items in the first collection of media items that were captured on a date that corresponds to the default start date.

22. The computer system of claim 1, the one or more programs further including instructions for:

after displaying the recommendation to share the plurality of media items with the set of one or more users, detecting a request to confirm that the second collection of media items is ready to be shared with the set of one or more users; and in response to detecting the request to confirm that the second collection of media items is ready to be shared with the set of one or more users, sending, via a messaging application, one or more messages to at least one user in the set of one or more users, wherein the one or more messages include one or more invitations to enable sharing of the second collection of media items.

23. The computer system of claim 22, wherein the one or more messages are sent as a group message to a group of recipients, and wherein the group of recipients include the set of one or more users.

24. The computer system of claim 22, the one or more programs further including instructions for:

after detecting the request to confirm that the second collection of media items is ready to be shared with the set of one or more users, displaying, via the display generation component, an automatic-adding control;

while displaying the automatic-adding control, detecting an input directed to the automatic-adding control; and in response to detecting the input directed to the automatic-adding control, transitioning the computer system between being configured to not automatically add captured media to the second collection of media items in response to detecting a request to capture media when respective criteria are satisfied and being configured to automatically add captured media to the second collection of media items in response to detecting a request to capture media when respective criteria are satisfied.

25. The computer system of claim 1, the one or more programs further including instructions for:

after displaying the recommendation to share the plurality of media items with the set of one or more users in the second collection of media items, displaying a user interface that includes a third media item and a fourth media item, including:

in accordance with a determination that the third media item is in the second collection of media items and the fourth media item is not in the second collection of media items, visually distinguishing the fourth media item from the third media item.

26. The computer system of claim 1, wherein:

the first event includes first respective media items based on information about a time and/or location of capture of the first respective media items; and the second event includes second respective media items based on information about a time and/or location of capture of the second respective media items.

27. A non-transitory computer-readable storage medium storing one of more programs configured to be executed by one or more processors of a computer system that is in communication with a display generation component, the one or more programs including instructions for:

detecting a request to share media items from a first collection of media items with a set of one or more users;

in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein:

the plurality of media items that are recommended to be shared with the set of one or more users includes:

a first set of one or more media items that correspond to a first event at which at least one user in the set of one or more users is determined to have been present, wherein the first event occurred during a first period of time; and a second set of one or more media items that correspond to a second event at which at least one user in the set of one or more users is determined to have been present, wherein the second event occurred during a second period of time that is different from the first period of time; and the plurality of media items are recommended based on the set of one or more users that are identified in the request;

while displaying the recommendation to share the plurality of media items with the set of one or more users in the second collection of media items, detecting at least a first user input of a set of one or more user inputs, wherein the first user input is a request to add a respective user for identification in the second collection of media items, wherein the respective user is not a user in the set of one or more users; and in response to the set of one or more user inputs, adding a representation of the respective user to a set of representations of one or more users without adding the respective user to the set of one or more users, wherein the set of representations of one or more users are used to identify one or more media items to be shared with the set of one or more users in the second collection of media items.

28. The non-transitory computer-readable storage medium of claim 27, the one or more programs further including instructions for:

before detecting the request to share media items from the first collection of media items with the set of one or more users, providing a list of users to be included in the set of one or more users;

while providing the list of users, detecting a request to modify the list of users; and in response to detecting the request to modify the list of users, modifying the list of users.

29. The non-transitory computer-readable storage medium of claim 27, the one or more programs further including instructions for:

detecting a request to add a first user to the set of one or more users; and in response to detecting the request to add the first user to the set of one or more users and in accordance with a determination that the first user is not associated with at least one media item that can be shared with the set of one or more users, displaying, via the display generation component, an indication that the first user should be associated with one or more respective media items.

30. The non-transitory computer-readable storage medium of claim 27, the one or more programs further including instructions for:

in response to detecting the request to add the respective user for identification in the second collection of media items and in accordance with a determination that the respective user has not been associated with a name, displaying, via the display generation component, an indication that a name should be associated with the respective user.

31. The non-transitory computer-readable storage medium of claim 27, wherein detecting the request to share media items from the first collection of media items with the set of one or more users includes detecting selection of a first control option, the one or more programs further including instructions for:

in response to detecting the request to share media items from the first collection of media items with the set of one or more users and in accordance with a determination that the first control option was selected, initiating a process to share all of the media items from the first collection of media items with the set of one or more users.

32. The non-transitory computer-readable storage medium of claim 27, the one or more programs further including instructions for:

after displaying the recommendation to share the plurality of media items with the set of one or more users in the second collection of media items and prior to sharing the second collection of media items with the set of one or more users, displaying, via display generation component, a review control that, when selected, causes the computer system to display a review user interface that includes a plurality of selected media items that are to be shared with the set of one or more users.

33. The non-transitory computer-readable storage medium of claim 32, the one or more programs further including instructions for:

while displaying the review control, detecting a first input directed to the review control; and in response to detecting the first input directed to the review control, displaying the review user interface that includes one or more media items in the second collection of media items;

while displaying the review user interface that the one or more media items in the second collection of media items, detecting one or more inputs that includes an input that is directed to a first media item in the second collection of media items; and in response detecting one or more inputs that includes the input that is directed to the first media item in the second collection of media items:

in accordance with a determination that the one or more inputs includes a first set of inputs, removing the first media item from the second collection of media items; and in accordance with a determination that the one or more inputs includes a second set of inputs that are different from the first set of inputs, adding the first media item to the second collection of media items.

34. The non-transitory computer-readable storage medium of claim 32, the one or more programs further including instructions for:

while displaying the review control, detecting a second input directed to the review control; and in response to detecting the second input directed to the review control, displaying the review user interface, including:

in accordance with a determination that a second media item in the plurality of selected media items satisfies a set of privacy criteria, displaying a second media item; and in accordance with a determination that the second media item in the plurality of selected media items does not satisfy the set of privacy criteria, forgoing displaying the second media item.

35. The non-transitory computer-readable storage medium of claim 27, the one or more programs further including instructions for:

after displaying the recommendation to share the plurality of media items with the set of one or more users in the second collection of media items, displaying a user interface that includes a third media item and a fourth media item, including:

in accordance with a determination that the third media item is in the second collection of media items and the fourth media item is not in the second collection of media items, visually distinguishing the fourth media item from the third media item.

36. A method, comprising:

at a computer system that is in communication with a display generation component:

detecting a request to share media items from a first collection of media items with a set of one or more users;

in response to detecting the request to share media items from the first collection of media items with the set of one or more users and in accordance with a determination that a first set of criteria is satisfied, wherein the first set of criteria includes a criterion that is satisfied when at least one user in the set of one or more users is determined to have been present at one or more events corresponding to media items in the first collection of media items, displaying, via the display generation component, a recommendation to share a plurality of media items with the set of one or more users in a second collection of media items, wherein:

the plurality of media items that are recommended to be shared with the set of one or more users includes:

a first set of one or more media items that correspond to a first event at which at least one user in the set of one or more users is determined to have been present, wherein the first event occurred during a first period of time; and a second set of one or more media items that correspond to a second event at which at least one user in the set of one or more users is determined to have been present, wherein the second event occurred during a second period of time that is different from the first period of time; and the plurality of media items are recommended based on the set of one or more users that are identified in the request;

while displaying the recommendation to share the plurality of media items with the set of one or more users in the second collection of media items, detecting at least a first user input of a set of one or more user inputs, wherein the first user input is a request to add a respective user for identification in the second collection of media items, wherein the respective user is not a user in the set of one or more users; and in response to the set of one or more user inputs, adding a representation of the respective user to a set of representations of one or more users without adding the respective user to the set of one or more users, wherein the set of representations of one or more users are used to identify one or more media items to be shared with the set of one or more users in the second collection of media items.

37. The method of claim 36, further comprising:

before detecting the request to share media items from the first collection of media items with the set of one or more users, providing a list of users to be included in the set of one or more users;

while providing the list of users, detecting a request to modify the list of users; and in response to detecting the request to modify the list of users, modifying the list of users.

38. The method of claim 36, further comprising:

detecting a request to add a first user to the set of one or more users; and in response to detecting the request to add the first user to the set of one or more users and in accordance with a determination that the first user is not associated with at least one media item that can be shared with the set of one or more users, displaying, via the display generation component, an indication that the first user should be associated with one or more respective media items.

39. The method of claim 36, further comprising:

in response to detecting the request to add the respective user for identification in the second collection of media items and in accordance with a determination that the respective user has not been associated with a name, displaying, via the display generation component, an indication that a name should be associated with the respective user.

40. The method of claim 36, wherein detecting the request to share media items from the first collection of media items with the set of one or more users includes detecting selection of a first control option, the method further comprising:

in response to detecting the request to share media items from the first collection of media items with the set of one or more users and in accordance with a determination that the first control option was selected, initiating a process to share all of the media items from the first collection of media items with the set of one or more users.

41. The method of claim 36, further comprising:

after displaying the recommendation to share the plurality of media items with the set of one or more users in the second collection of media items and prior to sharing the second collection of media items with the set of one or more users, displaying, via display generation component, a review control that, when selected, causes the computer system to display a review user interface that includes a plurality of selected media items that are to be shared with the set of one or more users.

42. The method of claim 41, further comprising:

while displaying the review control, detecting a first input directed to the review control; and in response to detecting the first input directed to the review control, displaying the review user interface that includes one or more media items in the second collection of media items;

while displaying the review user interface that the one or more media items in the second collection of media items, detecting one or more inputs that includes an input that is directed to a first media item in the second collection of media items; and in response detecting one or more inputs that includes the input that is directed to the first media item in the second collection of media items:

in accordance with a determination that the one or more inputs includes a first set of inputs, removing the first media item from the second collection of media items; and in accordance with a determination that the one or more inputs includes a second set of inputs that are different from the first set of inputs, adding the first media item to the second collection of media items.

43. The method of claim 41, further comprising:

while displaying the review control, detecting a second input directed to the review control; and in response to detecting the second input directed to the review control, displaying the review user interface, including:

in accordance with a determination that a second media item in the plurality of selected media items satisfies a set of privacy criteria, displaying a second media item; and in accordance with a determination that the second media item in the plurality of selected media items does not satisfy the set of privacy criteria, forgoing displaying the second media item.

44. The method of claim 36, further comprising:

after displaying the recommendation to share the plurality of media items with the set of one or more users in the second collection of media items, displaying a user interface that includes a third media item and a fourth media item, including:

in accordance with a determination that the third media item is in the second collection of media items and the fourth media item is not in the second collection of media items, visually distinguishing the fourth media item from the third media item.

* * * * *